US008468244B2

(12) United States Patent
Redlich et al.

(10) Patent No.: US 8,468,244 B2
(45) Date of Patent: *Jun. 18, 2013

(54) DIGITAL INFORMATION INFRASTRUCTURE AND METHOD FOR SECURITY DESIGNATED DATA AND WITH GRANULAR DATA STORES

(75) Inventors: Ron M. Redlich, Miami Beach, FL (US); Martin A. Nemzow, Miami Beach, FL (US)

(73) Assignee: Digital Doors, Inc., Miami Beach, FL (US)

( * ) Notice: Subject to any disclaimer, the term of this patent is extended or adjusted under 35 U.S.C. 154(b) by 254 days.

This patent is subject to a terminal disclaimer.

(21) Appl. No.: 12/453,124

(22) Filed: Apr. 29, 2009

(65) Prior Publication Data

US 2009/0254572 A1  Oct. 8, 2009

Related U.S. Application Data

(63) Continuation-in-part of application No. 11/746,440, filed on May 9, 2007.

(60) Provisional application No. 60/883,522, filed on Jan. 5, 2007.

(51) Int. Cl.
*G06F 15/16* (2006.01)

(52) U.S. Cl.
USPC ............. 709/225; 709/229; 709/246; 705/50; 726/26; 715/255

(58) Field of Classification Search
USPC ... 709/225, 229, 246; 705/50–57; 726/26–30; 715/255
See application file for complete search history.

(56) References Cited

U.S. PATENT DOCUMENTS

| 5,036,315 | A | 7/1991 | Gurley ........................ 340/721 |
| 5,485,474 | A | 1/1996 | Rabin ......................... 371/37.1 |
| 5,532,950 | A | 7/1996 | Moses ...................... 364/724.19 |
| 5,581,682 | A | 12/1996 | Anderson et al. ............. 395/792 |
| 5,832,212 | A | 11/1998 | Cragun et al. ........... 395/188.01 |
| 5,905,980 | A | 5/1999 | Masuichi et al. ................. 707/1 |

(Continued)

FOREIGN PATENT DOCUMENTS

WO   WO 00/75779 A2   12/2000

OTHER PUBLICATIONS

Oracle—Information Lifecycle Management (ILM) for Business Data-Lilian Hobbs.

(Continued)

*Primary Examiner* — David Lazaro
(74) *Attorney, Agent, or Firm* — Robert C. Kain, Jr.

(57) ABSTRACT

Distributed computer system processes data having select content (SC) represented by one or more predetermined words, characters, etc. The system has a plurality of SC data stores in a server cloud for respective security designated (Sec-D) data and granular data, each with respective access controls thereat. The data stores are operatively coupled over a network. An identification module identifies SC data and granular data stores for in the server cloud. A processor activates data stores in the server cloud thereby permitting access to the SC data and granular data stores based upon an application of access controls thereat. The processor has a reconstruction module operating as a data process employing the respective access controls to combine one or more of the Sec-D data and granular data.

2 Claims, 59 Drawing Sheets

U.S. PATENT DOCUMENTS

| | | | | |
|---|---|---|---|---|
| 5,933,498 | A | | 8/1999 | Schneck et al. .................... 380/4 |
| 5,960,080 | A | * | 9/1999 | Fahlman et al. ............. 380/252 |
| 5,996,011 | A | | 11/1999 | Humes .......................... 709/225 |
| 6,044,375 | A | | 3/2000 | Shmueli ........................ 707/101 |
| 6,055,544 | A | | 4/2000 | DeRose et al. ................ 707/104 |
| 6,073,165 | A | | 6/2000 | Narasimhan et al. ......... 109/206 |
| 6,078,907 | A | | 6/2000 | Lamm ............................. 705/40 |
| 6,094,483 | A | | 7/2000 | Fridrich et al. ................. 380/28 |
| 6,148,342 | A | | 11/2000 | Ho ................................ 709/225 |
| 6,192,472 | B1 | | 2/2001 | Garay et al. .................. 713/165 |
| 6,253,203 | B1 | | 6/2001 | O'Flaherty ...................... 707/9 |
| 6,301,668 | B1 | | 10/2001 | Gleichauf ..................... 713/201 |
| 6,389,542 | B1 | | 5/2002 | Flyntz ........................... 713/201 |
| 6,487,538 | B1 | | 11/2002 | Gupta ............................ 705/24 |
| 6,598,161 | B1 | | 7/2003 | Kluttz ........................... 713/166 |
| 6,602,298 | B1 | | 8/2003 | Kirshenbaum ............ 715/502.2 |
| 6,662,189 | B2 | | 12/2003 | Oyanagi ....................... 707/102 |
| 6,714,977 | B1 | | 3/2004 | Fowler .......................... 709/224 |
| 6,771,290 | B1 | | 8/2004 | Hoyle ........................... 345/745 |
| 6,874,139 | B2 | | 3/2005 | Krueger et al. ............... 717/127 |
| 6,925,454 | B2 | | 8/2005 | Lam et al. ....................... 706/45 |
| 7,103,915 | B2 | | 9/2006 | Redlich et al. .................. 726/27 |
| 7,140,044 | B2 | | 11/2006 | Redlich et al. .................. 726/27 |
| 7,146,644 | B2 | | 12/2006 | Redlich et al. .................. 726/27 |
| 2002/0073313 | A1 | | 6/2002 | Brown et al. ................. 713/165 |
| 2002/0116641 | A1 | | 8/2002 | Mastrianni ................... 713/201 |
| 2004/0054630 | A1 | | 3/2004 | Ginter ............................. 705/53 |
| 2005/0288939 | A1 | | 12/2005 | Peled et al. ....................... 705/1 |
| 2007/0087756 | A1 | * | 4/2007 | Hoffberg ..................... 455/450 |

OTHER PUBLICATIONS

Data Mobility Group—The ILM Puzzle—EMC puts all the piece together—Sep. 18, 2006.
Life Cycle—White paper10218_0115.txt—Practical Steps Toward Information Lifecycle Management.
MIMEsweeper—Content Security for E-mail, Web Browsing & Webmail, Nov. 12, 2001.
Cisco IDS Host Sensor Product, Oct. 16, 2001.
Ingrian 1100, Content Security Appliance (1 pages).
Element-Wise XML Encryption, Hiroshi Maruyama and Takeshi Imamura, IBM Research, Tokyo Research Laboratory (4 pages).
Survival Information Storage Systems by Jay J. Wylie, Michael W. Brigrigg, John D. Strunk, Gregory R. Ganger, Han Kiloccote Pradeep K. Khosla (8 pages).
ZD Net Interactive Week—IBS-SAP: XML to Boost Security Integration (1 page).
Myers, A.C. "Mostly-Static Decentralized Information Flow Control" M.I.T. Doctoral Thesis Jan. 1999.
The 1996 book, Applied Cryptography, by Schneier.
The Uniform Resource Locator article "FOLD OC".
Microsoft Word "Learning Microsoft Word 7.0".

* cited by examiner

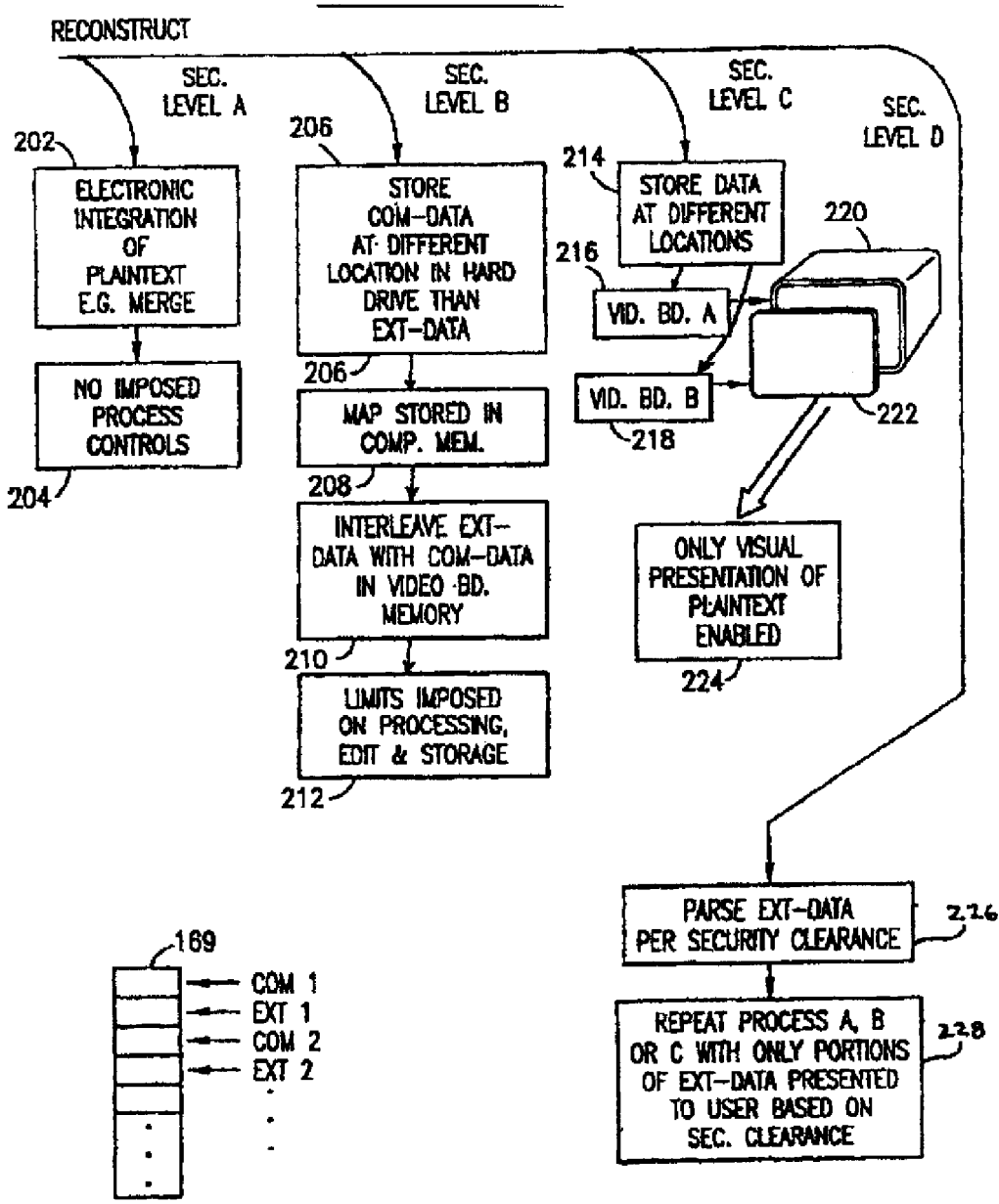

FIG. 23 — Table 1: Categorical Identifiers For Personal Identity name
address(es) and variants
telephone number(s) and variants
username
biometrics
gene typing
photograph
date of birth
age
marital status
gender
sexual orientation
sexual proclivities
disabilities
tattoos
scars
visible or functional injuries
age/age range
hair color
eye color
race profile
educational history
employment history
home price
ethnicity
personal interests
personal descriptive information (e.g., SWHM 38, Professional)
physical stigmata
skill set
credit history
credit reports (formal NCR, etc.)
social security number
patient ID or other location- or process-specific
user assignment
insurance number
credit card numbers
birthplace
heritage
health history
political party
political beliefs
association(s)
frequent flyer/buyer club info
remittance advice
investigation evidence
court evidence
EDI/EDIFACT records
applications
personal web sites Chain of trust forms
Chain of custody forms
skill set
religion
personal interests
travel log
number of siblings
business partners
business name
profession
account numbers (banking, services, suppliers)
service providers (physicians, insurers, hospitals, clinics, etc.)
X-rays
surveillance
dental charts
medical records
account balances
account transfer or transaction amounts
income range
neighborhood/city/region/country
license (driver, occupational, professional)
vehicle registration (license, tag, plate, etc.)
vehicle identification
vehicle make, type, model, color, year
date of life events
incident reports (legal, criminal, health services, news)
accident reports (auto, OSHA, EPA, EEOC, etc.)
criminal convictions
court records
abuse records
divorce proceedings
bankruptcy records
organization registrations
Corporation officers and registrations
tax records (chattel, land, local, state, Federal, and special use taxes)
property ownership
permit applications
donor lists
news reports
family history
family relationships
family health history
legal documents
consent forms
newsgroup postings FIG.24 -- Table 2: Ranked Identity Category name
address
telephone
username
biometrics
gene typing
photograph
date of birth
age
marital status
sex
sexual orientation
sexual proclivities disabilities
tattoos
scars
injuries
age range
hair color
eye color
race profile
education
employment
personal interests FIG. 25 -- Table 3: Categorical Identifiers for Manufacturing Business Manufacturing
- product brand names
- product generic name
- drawings
- tools (brand names and generic names)
    - hand tools
    - software
    - machines
- software, computer programs, etc.
- Research and Development
    - competitors products, competitor names, patent numbers, patent titles, project names, project personnel Sales
- personnel
- competitors
- sales data
    - quantity
    - geographic distribution
- customers
    - names, addresses, contacts
- sales projections Financial
- chart of accounts
- ledgers
- financial statements
- tax returns Human Resources
- see categorical identifiers for personal identity FIG. D-1 omitted
FIG. D-2 omitted
FIG. D-3 omitted
FIG. D-4 omitted
FIG. D-5 omitted TO FIG.31b (CONT.)

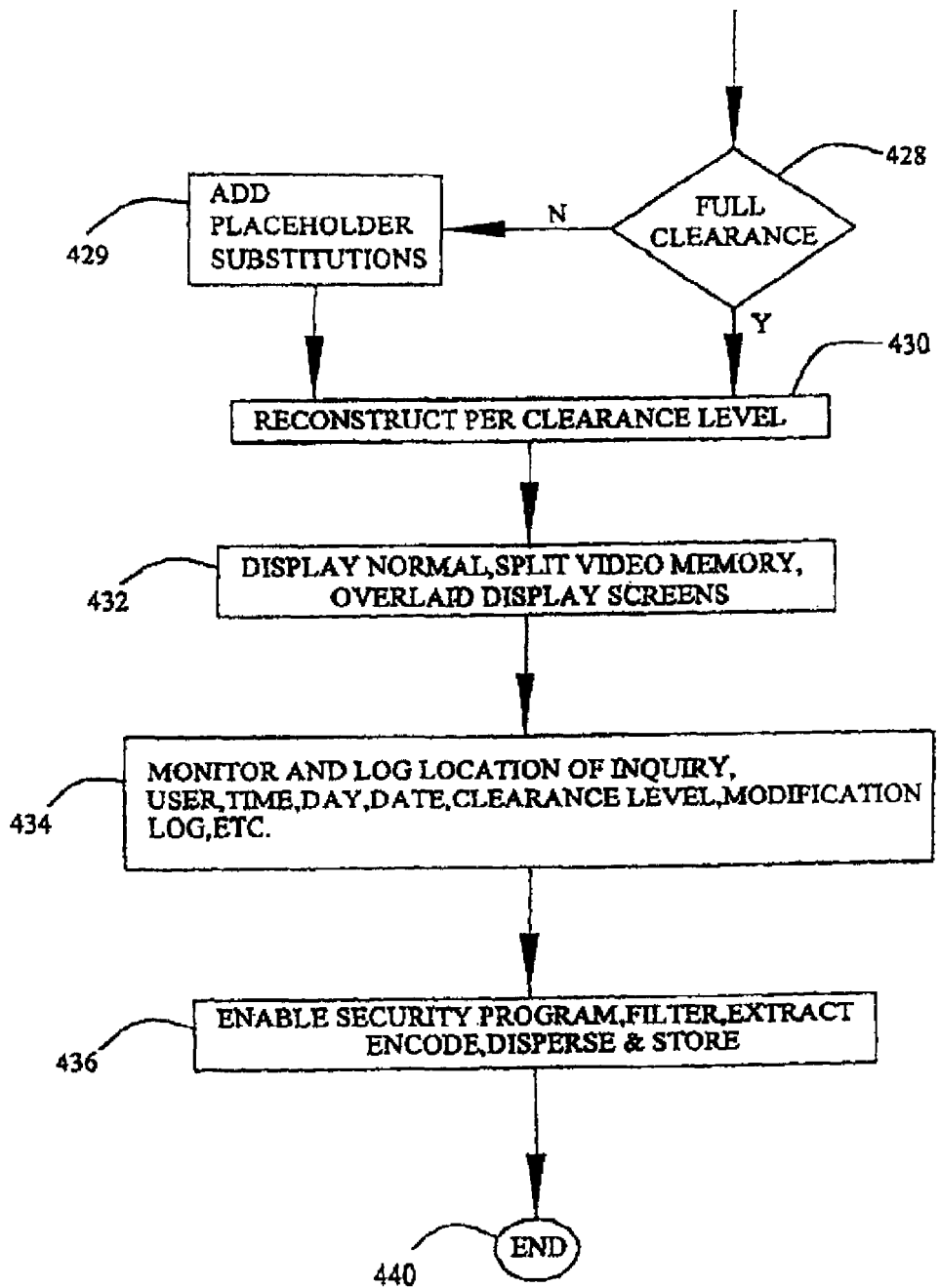

FIG.34

Standard Automatic Defenses Matrix Table

| Mode | Normal | Threat | Attack |
|---|---|---|---|
| Encryption | Targeted Encryption | Full Encryption | Multi Type Encryption |
| Extraction | Plain-text Extraction | Extraction of Encrypted Data | Extraction of Multi Type Encryption |
| Distributed Dispersion | Single Storage Location | Several Storage Locations | Many Storage Locations |
| Display | Single display | Color/Dither Protection | Multiple Displays |

FIG.35

Optional Automatic Defenses Matrix Table

| | Normal | Threat | Attack |
|---|---|---|---|
| Mode | Normal | Threat | Attack |
| Substitution of Code Words | None | Partial | Many |
| Substitution of Misinformation | None | Partial | Many |
| Controlled Release-Storage | Full | Partial | Conditional |
| Storage Locations | 2 | 4 | 10 or more |
| Time for release | Anytime | Working Hours | Conditional |
| Authorized Users | Many | Partial | Conditional |
| What to Release | All | Partial | Conditional |
| Secret Sharing | None | Two Users | As Configured |

FIG. 36

Security Meter Module Table

| | Normal Mode | Threat Mode | Attack Mode |
|---|---|---|---|
| ENCRYPTION | Targeted encryption | Full encryption | Multi layer encryption |
| | (Secret sharing) | (Secret sharing) | (Secret sharing) |
| EXTRACTION | Plain-text extraction | Extraction of encrypted Data | Extraction of multi encryption |
| Distributed Storage | 1 critical storage | few critical storage | many critical storage |
| Controlled Release-Storage | | | |
| Storage # ID | | | |
| Time for release | | | |
| Authorized Users | | | |
| What to release | | | |
| Special conditions | 2 users online | 2 users online | 3 or more users |
| Display | single display | single display | multiple displays |
| Substitution of code words | No | No | No |

FIG.37

Normal Work Mode Table

| | Extraction Level 1 | Level 2 | Level 3 | Level 4 | Storage Web | Offline | Remote | Removable | Local |
|---|---|---|---|---|---|---|---|---|---|
| social security | X | | | | | | | | |
| credit card | X | | | | | | X | | |
| last name | X | | | | | | | | |
| number | X | | | | | | X | | |
| telephone | | | X | | | | X | X | |
| name | | | X | | | | | X | |
| URL | | | X | | | | | X | |
| e-mail | | | X | X | | | | X | |
| uppercase | | | X | X | | | | X | |
| initial cap | | | X | X | | | | X | |
| currency | | | | X | | | | | X |
| postal code | | | | X | | | | | X |
| address | | | | | | | | | X |
| location | | | | | | | | | X |
| date | | | | | | | | | X |

FIG.38

Threat Mode Table

| | Extraction Level 1 | Level 2 | Level 3 | Level 4 | Storage Web | Offline | Remote | Removable | Local |
|---|---|---|---|---|---|---|---|---|---|
| social security | X | | | | | | | X | |
| credit card | X | | | | | | | X | |
| last name | X | | | | | | | X | |
| number | X | | | | | | | X | |
| telephone | | X | | | | | | X | |
| name | | X | | | | | | X | |
| URL | | X | | | | | | X | |
| e-mail | | X | | | | | | X | |
| uppercase | | X | | | | | | X | |
| initial capital | | X | | | | | | X | |
| currency | | | X | | | | | | X |
| postal code | | | X | | | | | | X |
| address | | | X | | | | | | X |
| location | | | X | | | | | | X |
| date | | | X | | | | | | X |

FIG.39

Attack Mode Table

| | Extraction Level 1 | Level 2 | Level 3 | Level 4 | Storage Web | Offline | Remote | Removable |
|---|---|---|---|---|---|---|---|---|
| social security | X | | | | | X | | |
| credit card | X | | | | | X | | |
| last name | X | | | | | X | | |
| number | X | | | | | X | | |
| telephone | X | | | | | | X | |
| name | X | X | | | | | X | |
| URL | X | X | | | | | X | |
| e-mail | X | X | | | | | X | |
| uppercase | X | X | | | | | X | |
| initial capital | X | X | | | | | X | |
| currency | | X | | | | | X | |
| postal code | | | | | | | X | |
| address | | | | | | | X | |
| location | | | | | | | X | |
| date | | | | | | | X | |

FIG. D-21 omitted
FIG. D-22 omitted
FIG. D-23 omitted

DIGITAL INFORMATION INFRASTRUCTURE AND METHOD FOR SECURITY DESIGNATED DATA AND WITH GRANULAR DATA STORES

This is a continuation-in-part patent application based upon and claiming the benefit of Ser. No. 11/746,440 filed May 9, 2007 which was regular patent application based upon provisional patent application Ser. No. 60/883,522 filed Jan. 5, 2007, the contents of both applications are incorporated herein by reference thereto.

A.0 INTRODUCTION

The present invention relates to information management data processing modules and computer software system and method enabling protection of confidential information, identification of such information, identification of select content, classification for the same, and security system for the same. Businesses and enterprises use information in many different types of forms and format. Structured information is typically data found in database or spreadsheet formats or stored in self-defining formats wherein the information is managed by a software application. A further example of self-defining format is XML documents in format schematics. Some information is "semi-structured" wherein the information has certain defined fields such as email and the structured data fields from, to, cc, bcc and subject, but the body of the email message is unstructured. Unstructured information includes documents generated by end users with the assistance of applications program such as Microsoft OFFICE, word processing programs, image processing programs (ADOBE), files downloaded from the Internet, audio and video files etc. Enterprises focus their attention on mission critical applications and data relative thereto which is often located in structured databases or other structured data formats. However, a large majority of information is contained in unstructured or semi-structured formats. There are significant risks involved in handling and locating confidential information in these information files as well as identifying and handling intellectual property data in those files.

The content of these information files are important from a legal standpoint, a data security standpoint, and a government regulation or compliance standpoint. Although the content of the information files may be searched and indexed, the resulting information must then be classified. The enterprise must establish policies which dictate how the information files are handled in light of legal, security and compliance risk factors. Further, enterprise policies regarding information or document retention and immutability (the degree and extent that a particular document or information file may be changed) must be established and enforced.

Simply indexing the content of an information file is not adequate. Semantic analysis, key word tagging and classification categorization (taxonomic analysis) should be conducted. Information tools and computer programs and methods should enable the users (an enterprise) to analyze, categorize and actively manage unstructured information in the enterprise. Theft or accidental loss of customers' information or employees' private information is no longer acceptable. Laws mandate disclosure of such data loses. Further, the public is acutely aware of identity theft and privacy issues. Also, theft or misuse of intellectual property and other confidential business information is a mission critical aspect of many enterprises. To complicate matters, businesses and enterprises do not operate closed informational systems but often times invite partners, customers, vendors, contractors and other third parties to participate in the enterprise informational system. Therefore, most enterprises operate an open ecosystem informational structure. Employees of the enterprise in addition to its partners, customers, vendors and others participate in the production of information and the use/and consumption of information.

In the past, most commentators believed that a breach of confidentiality and misuse of data was a result of an outsider "hacker" getting access to enterprise information by penetrating a firewall or other security system. However, there is a greater risk to the enterprise that rogue insider will take the information and misuse that information. Further, trusted employees constantly copy files onto laptops, PDAs (personal data assistance), USB thumb drives (flash memory), CDs and other removable media in order to fulfill the tasks assigned by the enterprise. This portable data can be easily misplaced or stolen. Further, the ease of electronic transfer of documents to others exposes the information contained therein to mis-directed addresses, as well as unauthorized theft and misuse.

Therefore, enterprises and organizations must manage the access to the information and use of the information and monitor such access and use and audit (log) these activities. A system of information rights management should concern the following aspects: (1) control who can open, print or edit a document or information file; (2) prevent or limit distribution of the information file; (3) enable the enterprise to change permissions on an information file per enterprise policy or changed conditions; and (4) maintain an audit trail of such activity.

The information infrastructure tools also must accommodate the changeable value of information over the life cycle of the information file. Although the information and content of the file does not change, the value of the information changes due to contextual events and external environmental conditions. External events which change the value of information and information file can be summarized as follows: (a) creation and modification and use of the information in the information file as it is processed by the enterprise; (b) completion of the project or event associated with the information file; (c) government regulations imposed on the information; (d) legal actions associated with the content of the information file and financial audits related to such information; (e) distributing the information in the information file to individuals with different access or security clearances or rights; (f) distribution of the information, both physically and electronically, to others who are not in the enterprise; (g) the types and operation of storage devices and the media which retain the information files; (h) the discovery of new uses for the information content in the file; (i) new software applications which replace obsolete applications; (k) personnel changes within the enterprise and associated changes and permissions to access, control and modify the information file; (l) expansion and contraction of the enterprise itself (organizational changes) and the changeable nature of business relationships with partners, customers and suppliers.

In view of the foregoing, it is necessary to have an information classification system or engine which automatically categorizes information in unstructured information files and labels the same and permits the enterprise to establish a policy for that information and implement the policy recommendation with specific actions to ensure that the information is properly handled, distributed, retained, deleted (document retention) and otherwise managed.

OBJECTS OF THE INVENTION

It is an object of the present invention to provide a system operator or CIO with data processing tools to manage and organize data processed by an enterprise.

It is a further object of the present invention to provide tools for securing secret or security sensitive sec-con data in the enterprise computer system and to locate, identify and secure select content SC which may be of interest or importance to the enterprise.

It is an additional object of the present invention to employ a dynamic, adaptive filter to enhance select content (SC) collection, to employ classification systems to organize such SC, and, in some cases, to do so continuously.

It is a further object of the present invention to assist in data processing or manipulation including processes such as coping, data extraction, data archiving, data distribution, data destruction (a document retention process), inter-enterprise and intra-enterprise data distribution, data access request processing, and data distribution denials.

SUMMARY

The present invention is a method of organizing and processing data in a distributed computing system. The invention is also implemented as a computer program on a computer medium and as a distributed computer system. Software modules can be configured as hardware. The method and system organizes select content which is important to an enterprise operating said distributed computing system. The select content is represented by one or more predetermined words, characters, images, data elements or data objects. The computing system has a plurality of select content data stores for respective ones of a plurality of enterprise designated categorical filters which include content-based filters, contextual filters and taxonomic classification filters, all operatively coupled over a communications network. A data input is processed through at least one activated categorical filter to obtain select content, and contextually associated select content and taxonomically associated select content as aggregated select content. The aggregated select content is stored in the corresponding select content data store. A data process from the group of data processes including a copy process, a data extract process, a data archive process, a data distribution process and a data destruction process is associated with the activated categorical filter and the method and system applies the associated data process to a further data input based upon a result of that further data being processed by the activated categorical filter utilizing the aggregated select content data. In effect, the system and process translates the sec-con or SC data and then stores the same in certain locations or secure stores. In this manner, a transformation of the data is achieved. By transposing the sec-con or SC data, higher levels of organization are realized or higher levels of security are implemented.

The enterprise designated filters screen data for enterprise policies such as a level of service policy, customer privacy policy, supplier privacy policy, enterprise human resource privacy policy, financial data handling policy, public company reporting policy, health care regulation policy, technical innovation policy, competitive reporting policy and document or data retention policy.

In another embodiment, the method and system extracts security sensitive content from a data input to obtain extracted security sensitive data for a corresponding security level and remainder data. This extracted security sensitive data is stored in a respective security sensitive extract store. Remainder data is stored in the distributed computer system. Distribution of the data input with respect to said distributed computing system is limited based upon throughput from at least one of the enterprise designated filters. The controlled release of corresponding extracted security sensitive data from the respective extract stores with the associated security clearances for corresponding security levels is permitted by the system. In this manner, security sensitive content is separately stored apart form the select content, which is stored in select content data stores.

Table of Contents

| | |
|---|---|
| AAA.1.0.0 | DigitalDoors Capabilities |
| AAA.1.1.0 | Architecture Specifications |
| AAA.1.2.0 | Scalability |
| AAA.1.3.0 | Product and Process Overview |
| AAA.1.4.0 | DigitalDoors implementation options: |
| AAA.1.5.0 | The Key for Net-Centric security |
| AAA.1.6.0 | Active defense and counterattacks versus common passive defense |
| AAA.1.7.0 | Technical Basis for DigitalDoors Technology |
| AAA.1.8.0 | Granular data control |
| AAA.1.9.0 | Collaboration will consist of: |
| AAA.1.10.0 | Granular tagging with metadata |
| AAA.1.11.0 | Coalition And Multinational Cross Domain Collaboration |
| AAA.1.12.0 | Incorporation into a trusted OS AAA.1.13.0 Survivable infrastructure |
| AAA.1.14.0 | Net Centric capabilities |
| AAA.1.15.0 | DigitalDoors Services overview |
| AAA.1.16.0 | DigitalDoors implementation options: |
| AAA.1.17.0 | defenses against outs |
| AAA.1.18.0 | collaboration elements: |
| AAA.1.19.0 | DigitalDoors cornerstones |
| AAA.1.20.0 | Granular content control |
| AAA.1.20.1 | Cross domain |
| AAA.1.21.0 | Security services |
| AAA.1.22.0 | solutions to vulnerabilities |
| AAA.1.23.0 | Replication for perpetual data availability |
| AAA.1.24.0 | Solving net centric needs |
| AAA.1.25.0 | Secured Discovery and publishing services |
| AAA.1.26.0 | Publishing; |
| AAA.1.27.0 | Meta data Posting |
| AAA.1.28.0 | Secured Mediation services for information sharing |
| AAA.1.29.0 | Other services |
| AAA.1.30.0 | Secured perpetual storage services |
| AAA.1.30.1 | Meta data posting |

-continued

| | Table of Contents |
|---|---|
| AAA.1.31.0 | Secured enterprise management services |
| AAA.1.32.0 | Access enforcement: |
| AAA.1.33.0 | Real time granular audit of all critical content in network |
| AAA.1.34.0 | Applications for operating an assured environment services- |
| AAA.1.35.0 | Processing |
| AAA.1.36.0 | Providing scalability, reliability, resilience, fault tolerance, speed |
| AAA.1.37.0 | Enabling generic and standardized data distribution services |
| AAA.1.38.0 | Storage |
| AAA.1.39.0 | Metrics |
| AAA.1.40.0 | Technical specifications, operating parameters, and network design specifications |
| AAA.1.41.0 | DigitalDoors Operating Parameters: |
| AAA.1.42.0 | DigitalDoors Network Design Specifications: |
| AA.1.0.0 | Background: Formlessness for Security |
| AA.1.1.0 | Introduction |
| AA.1.2.0 | Definition |
| AA.1.3.0 | Formlessness |
| AA.1.3.1 | How DigitalDoors Applies Formlessness |
| AA.1.4.0 | Formlessness as Security for Maps. |
| AA.1.4.1 | History and Concept |
| AA.1.5.0 | Security through: dispersion, formlessness, reversible chaos |
| AA.1.6.0 | Formlessness to secure maps |
| AA.1.7.0 | Formlessness by breaking context - hiding is not enough |
| AA.1.8.0 | Differentiation between Obscurity and Formlessness |
| AA.1.8.1 | Obscurity |
| AA.1.8.2 | Formlessness without context |
| AA.1.8.3 | Proverbial versus Actual Context Change |
| AA.1.8.4 | Obscurity and Formless Differentiation |
| AA.1.8.5 | Recovering from Obscurity and Formlessness |
| AA.1.8.6 | Formlessness through Microperimeterization |
| AA.1.8.7 | Formlessness the difference between Dispersion and Hiding |
| AA.1.1.8 | Dispersion as Asymmetric warfare |
| AA.1.9.0 | Overview of Formlessness: |
| AA.1.9.1 | The DigitalDoors Formlessness Doctrine |
| AA.1.9.2 | Establishing Formlessness: |
| AA.1.9.3 | Defending intellectual property and trade secrets: |
| AA.1.9.4 | Defending information in web sites: |
| AA.1.9.5 | Legal defenses with formlessness: |
| AA.1.9.6 | Measurement of the information inventory for risk: |
| AA.1.9.7 | Monetizing the information inventory: |
| AA.1.9.8 | The Global Information war |
| AA.1.10.0 | There is a need for a technological paradigm change. |
| AA.1.11.0 | DigitalDoors Hierarchical Security Sanitization and Reconstitution |
| AA.1.12.0 | Methodology Overview: |
| AA.1.13.0 | A new IT paradigm |
| AA.1.14.0 | Taking advantage of a major economic imbalance |
| AA.1.15.0 | Monetizing the organization's information assets: |
| AA.1.16.0 | Information disassembly and Reassembly |
| AA.1.16.1 | Disassemblying Information |
| AA.1.16.2 | The reasons for disassembly |
| AA.1.16.3 | Finding Value within Information |
| AA.1.16.4 | The Doctrine behind DigitalDoors |
| AA.1.16.5 | Reconstituting Information |
| AA.1.16.6 | Directory Files |
| AA.1.16.7 | A compound data stream that can be stripped into granular items |
| AA.1.16.8. | Data Unification |
| AA.1.16.9 | Conclusion |
| AA.1.17.0 | A New Information Security Paradigm: Neutralize the Loss of Perimeter |
| AA.1.18.0 | Why security is ignored |
| AA.1.19.0 | Security integration and the lack of attention to it |
| AA.1.20.0 | Security as the future foundation for information |
| AA.2.0.0 | Design and implementation |
| AA.2.1.0 | Implementation of Granular data control in data streams |
| AA.2.2.0 | Brief Functional Overview |
| AA.2.2.1 | Brief Structural Overview |
| AA.2.2.2 | Remote Storage Overview |
| AA.2.2.3 | Operating Parameters |
| AA.2.2.4 | Network Design Specifications |
| AA.2.2.5 | Operating Parameters |
| AA.2.2.6 | Network Design Specifications |
| AA.2.2.7 | Remote Storage Infrastructure |
| AA.2.2.8 | Brief Structural Overview |
| AA.2.2.9 | Remote Storage Overview |
| AA.2.3.0 | Upfront Processing |
| AA.2.4.0 | Proxy architecture |
| AA.2.5.0 | Reclassification-Reconstitution |
| AA.2.5.1 | ReClassification |
| AA.2.5.2 | Recovery Information |

-continued

| | Table of Contents |
|---|---|
| AA.2.5.3 | Processing with DeClassified Data |
| AA.2.5.4 | Content Filtering |
| AA.2.5.5 | Channel Transmission Protection |
| AA.2.6.0 | The Recovery map |
| AA.2.6.1 | Map Structure Variants and Granularity |
| AA.2.7.0 | Concurrency in granular data control |
| AA.2.8.0 | DeClassifying and ReClassifying E-Mail |
| AA.2.8.1 | Generation and Distribution |
| AA.2.8.2 | Receiving and ReClassification |
| AA.2.8.3 | Forwarding and Redelivery of E-Mail |
| AA.2.8.4 | Content Filtering |
| AA.2.8.5 | Processing E-Mail |
| AA.2.9.0 | Declassifying and ReClassifying while Browsing the web |
| AA.2.9.1 | Generation and Distribution: |
| AA.2.9.2 | Receiving and ReClassification |
| AA.2.10.0 | Creating multiple levels of categorization |
| AA.2.11.0 | Out-of-Channel Multitier Tagging |
| AA.2.12.0 | Multitier Hierarchical Overlapping Tag Structure |
| AA.2.13.0 | Dictionary Encoding AA.2.14.0 Declassification and scrubbing of maps |
| AA.2.14.1 | Channel Transmission Protection: |
| AA.2.15.0 | Distribution of MS word |
| AA.2.16.0 | Filters, sieves and capabilities |
| AA.2.16.1 | The DigitalDoors classification metadata can be transitory. |
| AA.2.16.2 | Applicability of Sieves and Filters |
| AA.2.16.3 | Manual, Assisted, an Automated Modes |
| AA.2.16.4 | Dictionaries |
| AA.2.16.5 | My Word List |
| AA.2.16.6 | My Group List |
| AA.2.16.7 | My Category List |
| AA.2.16.8 | My Policy List |
| AA.2.16.9 | AutoSEC |
| AA.2.16.10 | OPSEC |
| AA.2.16.11 | COMSEC |
| AA.2.16.12 | Manual Selection |
| AA.2.16.13 | Manual Mouseover Selection |
| AA.2.16.14 | Tearline Creation |
| AA.2.16.15 | Other configurations |
| AA.2.16.16 | Accuracy and Granularity |
| AA.2.17.0 | Automating filters and sieves |
| AA.2.17.1 | Classification Conflict Resolution |
| AA.2.18.0 | Processing sets |
| AA.2.18.1 | Collections |
| AA.2.18.2 | Sets |
| AA.2.19.0 | Failure of best of breed security |
| AA.2.20.0 | Integrated Single Files, Attachments, and Links |
| AA.2.20.1 | Stream Outputs |
| AA.2.21.0 | Hierarchical Security Sanitization and Reconstitution |
| AA.2.22.0 | Software implementation |
| AA.2.23.0 | Software operations: Sensitivity Level Hierarchy and tear line |
| AA.2.23.1 | Secure Editor application |
| AA.2.23.2 | DeClassifying and ReClassifying while Browsing the web |
| AA.2.23.3 | Generation and Distribution: |
| AA.2.23.4 | Receiving and ReClassification |
| AA.2.24.0 | DeClassification Mapping - Channels mapping |
| AA.2.24.1 | Channel Transmission Protection: |
| AA.2.25.0 | Security by dispersion - the cloud |
| AA.2.26.0 | Semantics dictionaries AA.3.0.0 Privacy and security: |
| AA.3.1.0 | Context: The difference between Security and Privacy |
| AA.3.2.0 | Security and privacy: protecting the crown jewels |
| AA.3.3.0 | Surrogate Keywords as unique identifiers for privacy and security |
| AA.3.4.0 | The Metrics of Privacy: Identification, De-Identification, and Permitted versus Forced Re-Identification |
| AA.3.4.1 | Privacy overview |
| AA.3.4.2 | Data Ownership |
| AA.3.3.3 | Definition of Identity |
| AA.3.4.4 | Uniqueness |
| AA.3.4.5 | Sufficiency |
| AA.3.4.6 | Direct and Indirect Identification |
| AA.3.4.7 | Unique Identification and Subset Identification |
| AA.3.4.8 | Indirect Identity Information Sources |
| AA.3.4.9 | Definition of Privacy |
| AA.3.4.10 | Implementing Privacy Policy |
| AA.3.4.11 | Privacy Measurements |
| AA.3.4.12. | Measuring Privacy |
| AA.3.4.13 | Measuring Uniqueness of Identification |
| AA.3.4.14 | Density of Identification |
| AA.3.4.15 | Inference |
| AA.3.4.16 | Conclusion |

-continued

| | Table of Contents |
|---|---|
| AA.3.5.0 | Personally identifiable information: Meta PII |
| AA.3.6.0 | Categories of Personally Identifiable Information (PII) |
| AA.3.6.1 | Technical Identifiers |
| AA.3.7.0 | Toxic spill of personally identifiable information (PII) |
| AA.3.8.0 | From aggregation, inference, reidentification to Anonymity |
| AA.39.0 | Control personally identifiable information (PII) through granular data control |
| AA.4.0.0 | Classification and categorization: |
| AA.4.1.0 | Multiple Hierarchical Tagging and Data Extraction |
| AA.4.2.0 | Commonality of Data: categorization, a multitier hierarchical overlapping tag Structure |
| AA.4.3.0 | Categorization structure tagging, risk measurement and context |
| AA.4.4.0 | Data and Metadata Granularity for decomposition to break context |
| AA.4.5.0 | In-Channel and Out-of-Channel Tags |
| AA.4.6.0 | Capitalization is content-, context-, and concept-driven |
| AA.4.6.1 | Categorization Specialization |
| AA.4.6.2 | Semantic Parsing Rules |
| AA.4.6.3 | Process |
| AA.4.6.4 | Conclusion |
| AA.4.7.0 | Data classification - the leakage threat |
| AA.4.8.0 | Semantics dictionaries |
| AA.4.9.0 | Difference between Content, Context, and Concept |
| AA.4.10.0 | Classification as Proxy for Scarcity |
| AA.4.11.0 | Threats of Meta Data |
| AA.4.12.0 | Degrees of data structure |
| AA.5.0.0 | Defining Information |
| AA.5.1.0 | The meaning of information and related context risk |
| AA.5.2.0 | Content Concept and Context - Correcting the Security Gap for Data Object Models |
| AA.5.3.0 | The Structure of Information |
| AA.5.3.1 | Information Structure |
| AA.5.3.2 | DNA versus RNA |
| AA.5.3.3 | Granular Content |
| AA.5.4.0 | Implementing of MS Office |
| AA.5.4.1 | Microsoft Office Suite and Applications |
| AA.5.4.2 | Repress Thoughts of Banishing MS Office |
| AA.5.4.3 | Office Versions, Releases, and the Data Object Models |
| AA.5.4.4 | Content Security |
| AA.5.4.5 | Implementing Document Protection |
| AA.5.4.6 | Conclusion |
| AA.5.5.0 | The contextual information matrix |
| AA.5.6.0 | Future direction for information awareness |
| AA.5.7.0 | Unstructured data |
| AA.5.8.0 | Information measurement and management |
| AA.5.9.0 | MS Office Document Structure: Protection and Processing |
| AA.5.9.1 | The MS Office Object Model |
| AA.5.10.0 | The criticality of right context |
| AA.6.0.0 | Search and data mining |
| AA.6.1.0 | Meta Data Hound search - Adjacency with Permutations and Combinations |
| AA.6.2.0 | Search Convergence and Search Divergence |
| AA.6.3.0 | Convergent search |
| AA.6.3.1 | Divergent Search Paradigm |
| AA.6.4.0 | Data mining and inference attacks |
| AA.6.5.0 | Metaseaerch data mining |
| AA.6.5.1 | Description of the DigitalDoors Metasearch Process |
| AA.6.5.2 | Combinations and Permutations |
| AA.6.5.3 | Automated Contextual Pruning |
| AA.6.6.0 | Knowledge Discovery: Search Convergence and Divergence |
| AA.6.6.1 | Initial Process |
| AA.6.6.2 | DigitalDoors MetaSearch |
| AA.6.6.3 | MLS-Compliant Search and Distributions |
| AA.7.0.0 | Security: |
| AA.7.1.0 | Security Keystone overview |
| AA.7.1.1 | Security |
| AA.7.2.0 | Malware attack the tentacles of Insecurity |
| AA.7.3.0 | Security is broken |
| AA.7.4.0 | Meta data dangerous double hedge sword |
| AA.7.5.0 | The transition content security via Data Leakage Prevention |
| AA.7.6.0 | The failure of best breed security |
| AA.7.7.0 | Why Security of information |
| AA.7.8.0 | Security as an open set |
| AA.7.9.0 | Dangers in information interactions, the need for granular content isolation |
| AA.7.10.0 | Prevention of leakage through context and range control |
| AA.7.11.0 | The vulnerability of perimeter security and the need for granular data control |
| AA.7.12.0 | Leakage from Data combination |
| AA.7.13.0 | The Risks from XML |
| AA.7.14.0 | The risks of new information infrastructures |
| AA.7.15.0 | Granular content dispersion as security |
| AA.7.16.0 | Security by the One-Time Pad |

| | Table of Contents |
|---|---|
| AA.7.16.1 | Perfect Secrecy |
| AA.7.17.0 | Risk in repurposing of information |
| AA.7.18.0 | The ineffectiveness of Perimeter security |
| AA.7.19.0 | Deficiencies in perimeter security and encryption |
| AA.7.20.0 | The breakdown of perimeter security and the need for Dispersion |
| AA.7.21.0 | Asymmetric Security |
| AA.7.22.0 | Dispersal security versus perimeter security |
| AA.7.23.0 | Metadata risks, the need for a lockdown |
| AA.7.24.0 | Competitive Analysis of Security Methods |
| AA.7.24.1 | security Technology |
| AA.7.24.2 | Encryption and Security History |
| AA.7.24.3 | Cipher Science |
| AA.7.24.4 | integrating disciplines |
| AA.7.24.5. | Unique Architecture |
| AA.7.24.6 | DigitalDoors versus Other Technologies |
| AA.7.25.0 | Security by dispersion to the cloud |
| AA.7.26.0 | Defenses in Depth: layered security |
| AA.7.26.1 | Why layered security works |
| AA.2.27.0 | Perimeter security, the failure of the Sandbox |
| AA.2.28.0 | The critical danger of Commercial off the shelf software |
| AA.2.29.0 | COTS Implementation |
| AA.7.29.1 | Unfolding Catastrophe |
| AA.7.30.0 | DigitalDoors Access and Rights |
| AA.7.30.1 | Authorization |
| AA.7.30.2 | Authentication Database |
| AA.7.30.3 | Registration/Rights database |
| AA.7.30.4 | Location Map Database(s) |
| AA.7.30.5 | Architecture Overview |
| AA.7.30.6 | Primary Benefits |
| AA.7.31.0 | Securing the Internet |
| AA.7.32.0 | Spread of viruses within meta data |
| AA.7.33.0 | Touchpoints and gateways as back doors |
| AA.8.1.0 | Multi level Security Information Sharing: |
| AA.8.1.1 | Information sharing overview |
| AA.8.2.0 | Multi Level Security: new concepts for information sharing |
| AA.8.3.0 | Information sharing through granular content control |
| AA.8.3.1 | Gaps in Controls |
| AA.8.3.2 | Risks from Distributed Stovepipes and Silos |
| AA.8.4.0 | The Failure of Tag Reflexivity for Information Sharing |
| AA.8.4.1 | Tag Reflexivity |
| AA.8.5.0 | Multi Level Security needs to adopt granular data control to achieve its objective |
| AA.8.6.0 | Accommodating the Bell LaPadula model |
| AA.8.6.1.0 | Maps and Recovery Information |
| AA.8.7.0 | Challenges of Multi level security information sharing |
| AA.8.8.0 | Implementing Cross-Domain MLS Information Flow |
| AA.8.9.0 | Multi level Security for the Internet |
| AA.8.9.1 | Cultural and Technical Constraints |
| AA.8.10.0 | A Paradigm Shift |
| AA.8.11.0 | Implementing Cross-Domain Information Flow - Multi level security |
| AA.8.12.0 | Negotiated multi level information sharing |
| AA.8.13.0 | Security through information Distribution |
| AA.8.14.0 | Implementation of information sharing with Rigorous Protections |
| AA.8.14.1 | General Concept |
| AA.8.14.2 | Implementation map |
| AA.8.14.3 | Technical Implementation |
| AA.8.14.4 | A Tool in a Toolbox |
| AA.8.14.5 | Maturity of the Paradigm Shift |
| AA.9.0.0 | Intangibles: |
| AA.9.1.0 | Creation and production of intangibles |
| AA.9.2.0 | Intangible data assetization |
| AA.9.2.1 | Assetization for Asset Monetization |
| AA.9.2.2 | Differential Valuation |
| AA.9.2.3 | Conclusion |
| AA.9.3.0 | The Intangible assets production model |
| AA.9.4.0 | Monetary information valuation |
| AA.9.4.1 | Monetary Valuation Methodology |
| AA.9.4.2 | Weighting Content, Context, and Concept |
| AA.9.4.3 | Discovering and Monetizing the Intangibles |
| AA.9.4.4 | Static and Dynamic |
| AA.9.4.5 | Conclusion |
| AA.9.5.0 | Assetitization of intangible content |
| AA.9.5.1 | Definitions |
| AA.9.5.2 | Conclusion |
| AA.9.6.0 | Attribution of monetary value to information |
| AA.9.6.1 | Monetization |
| AA.9.6.2 | Contextual Conflicts |
| AA.9.6.3 | DigitalDoors Methodology |

-continued

Table of Contents

| | |
|---|---|
| AA.9.6.4 | Weights |
| AA.9.6.5 | Hierarcharchial Assignments and Enhancements |
| AA.9.6.6 | Conclusion |
| AA.9.7.0 | Information Lifecycle Valuation |
| AA.9.8.0 | Security Gaps: Binding Infrastructure with Process with User with Data. The need for a new intangibles production model |
| AA.9.9.0 | Intangible Trade secrets |
| AA.9.9.1 | Background |
| AA.10.0.0 | Introduction to the Digitaldoors Dictionary |
| AA.10.1.0 | DigitalDoors Dictionary |
| A.1 | Creating An Information Infrastructure |
| A.2 | Sampling and Creation of a Simple Info Infrastructure |
| A.3 | System Tools and Processing Methods for an Information Infrastructure |
| A.4 | Information Dispersal - Basic |
| A.5 | Alternative to Information Dispersal Algorithm |
| A.6 | Adding Prior Art Information Dispersal Algorithms to Granular Data Dispersion |
| A.7 | Automatic Dispersal of Data to Remote Storage Locations |
| A.8 | Dispersal - Breaking Down the Context of Data Streams while Maintaining Access to the Content of its Parts |
| A.9 | Granular Tagging - Basic |
| A.10 | Automated Granular Data Level Manipulation |
| A.11 | Process for Creation of Automated Granular Tagging and Labeling |
| A.12 | Process for Creation of Automated Tagged Tear Lines |
| A.13 | Category Tags as Placeholders in Databases |
| A.14 | Controlled Release - Basic |
| A.15 | Layered Build-up of Data Streams, Layer upon Layer |
| A.16 | Granular Data Release from Third Party Repository |
| A.17 | Creation of Modular Data Components from Granular Data Streams |
| A.18 | "Rolling" Exposure of Granular Data Streams |
| A.19 | Controlled Release of Extracts after Verification |
| A.20 | Multi Purpose Usage of Filtering and Extraction Process |
| A.21 | Filtering and Copying "Selected Data" |
| A.22 | Combined Process of Extracting Part of the "Selected Data" and Copying Parts of the "Selected Data" |
| A.23 | Data Mining Search Results Basic - Distribution as Multi Level Security Versions |
| A.24 | Data Mining - A Search Creating Automatically Key Words |
| A.25 | Data Mining - Continuous Data Mining with Query Refinement |
| A.26 | Automatic Continuous Search - with Divergence and Convergence |
| A.27 | Distributed Data Mining |
| A.28 | Content Inference Engine - Basic |
| A.29 | An Inference Engine - Searching for the Unknowns |
| A.30 | Securing Information Sharing with an Inference Engine |
| A.31 | Automatic Web Data Inference Crawler Robots |
| A.32 | Changeable Data Classifications Based on Content Inference Threats |
| A.33 | Search Operations Creating New Continuously Growing Digital Data Streams |
| A.34 | Distributed Searches from Different Storage Nodes |
| A.35 | Storage of Separated Data Pieces in One Location |
| A.36 | Storage of Granular Data Streams - Basic |
| A.37 | Configuration of Granular Data Streams Dispersal to Distributed Storage Stores |
| A.38 | Granular Data Stream Transport |
| A.39 | Shuttling Data and Granular Data Streams Between Distributed Storage Stores |
| A.40 | Replication of Granular Data Streams with Minimal Security Risk |
| A.41 | Anonymizing Classified and Unclassified Storage Stores |
| A.42 | Controlled Release of Granular Data Streams - Granular Data Manipulation and Control |
| A.43 | Sanitization Process with Inference Filtering - Basic |
| A.44 | Process for Sanitizing Data on the Network for Privacy Security and Survivability |
| A.45 | Automated Sanitization of Important Data |
| A.46 | Sanitization of Non-Important Data |
| A.47 | Release of Granular Data Streams in With Increasing Levels of Access Identifiers |
| A.48 | Release of Granular Data Streams After Obtaining Consideration |
| A.49 | Secured Release of Granular Data Streams into Multiple Screens |
| A.50 | Ecosystem Based on "Granular Data Control" - Basic |
| A.51 | Eco System for Information Superiority and Survivability Based on "Granular Data Control" |
| A.52 | System and Method for Minimizing Data Exposure |
| A.53 | Creating "Digital Doors" for Access and Controlled Release in a Data Stream |
| A.54 | General Aspects - Basic |
| A.55 | Automatic Creation of a User or Object's Identification Profile |
| A.56 | Copying Filtered Granular Data and Dispersing |
| A.57 | Combining Extraction and Copying for Filtering of Filtered Granular Data |
| B.1 | Basic Operational Theory of Secure or Select Data Storage |
| B.2 | General Operation |
| B.3 | System Configurations |
| B.4 | Input or Initial Processing Considerations (Basic Filter Modules) |
| B.5 | Storage |
| B.6 | Extraction and Storage Enhancements |
| B.7 | Basic Reconstruction |
| B.8 | Reconstruction Techniques |
| C.0 | Testing the Security System |

-continued

Table of Contents

| | |
|---|---|
| C.1 | The Etiology of Information |
| C.2 | Metasearch Engine for Knowledge Discovery: Search Convergence and Divergence |
| C.3 | Initial Process - Metasearch Engine and Knowledge Expander |
| C.4 | Simple Metasearch Engine |
| C.5 | Automatic Metatagging |
| C.6 | Automatic secondary tagging of a "range" |
| C.7 | MLS, Multi-level Security-Compliant Search and Distributions |
| C.8 | Benefits of the Metasearch - Knowledge Expander |
| C.9 | Information Life Cycle Engine |
| C.10 | Information Life Cycle Searches |
| C.11 | Search With Prioritized Classifications |
| C.12 | Simple Filters |
| C.13 | Complex Filters |
| C.14 | The Editor As An Information Expander |
| C.15 | Document Object Model (DOM) - Protection and Processing |
| C.16 | Recognizing The Document Object Model (DOM) |
| C.17 | Content |
| C.18 | DOM Process Editor |
| C.19 | Five Informational Attributes |
| C.20 | Select Content Introns and Exons |
| C.21 | Hierarchical Taxonomic Class Examples |
| C.22 | Knowledge Expander (KE) Basic Program |
| C.23 | Secured Metasearch Engine Based on Granular Data Control |
| D.1 | Secure Editor, DOM Editor (General) and DOM Editor Applied as Extractor Modules |
| D.2 | Applications of the Secure and SC Data Systems |
| D.3 | Automatic Features |
| D.4 | Multiple Security Levels |
| D.5 | Sharing Data with Different Security Levels - Data Mining |
| D.6 | Multilevel Security through Sanitization with Reconstruction of Sanitized Content |
| D.7 | Multiple Independent Levels of Security (MILS) |
| D.8 | MLS Server and Workstation Components |
| D.9 | Flexibility of the Present MLS Approach |
| D.10 | Multiple Extraction Filters and Application Outline |
| D.11 | Multiple Security Features for Data |
| D.12 | Adaptive Data Security - Event Responsive System |
| D.13 | Email, Web-based and Other Types of Applications |
| D.14 | Portable Computing Device Environment |
| E.1 | General System Comments |

BRIEF DESCRIPTION OF THE DRAWINGS

Further objects and advantages of the present invention can be found in the detailed description of the preferred embodiments when taken in conjunction with the accompanying drawings in which:

FIG. 7 diagrammatically illustrates a basic flowchart showing reconstruction for various security levels.

FIG. 8 diagrammatically illustrates interleaving distinct data into different memory locations in a video memory.

FIGS. 23, 24 and 25 show examples of categorical identifiers, ranked id categories and categorical ids for a business.

FIGS. 31a, 31b diagrammatically illustrates a flowchart showing the key component steps for the multiple layer security program for the community of users.

FIGS. 34 to 39 show tabular examples of attack and response levels for Standard Automatic Defenses Matrix; Optional Automatic Defenses Matrix; Security Meter Module; Normal Work Mode; Threat Made Table; and, Attack Mode.

DETAILED DESCRIPTION OF THE PREFERRED EMBODIMENTS

Figure 1A:
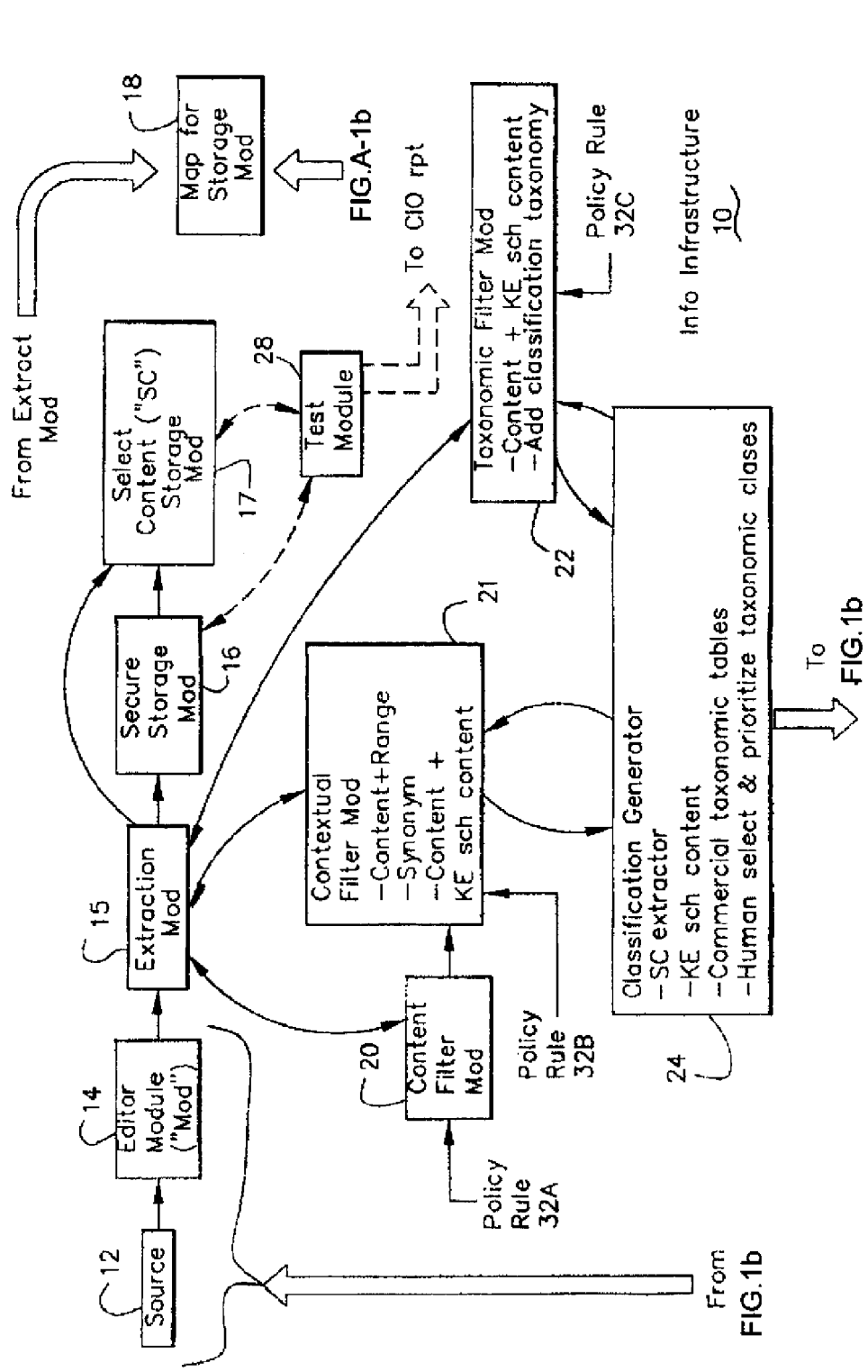
FIGS. 1*a* and 1*b* diagrammatically illustrates a basic system diagram, method and flow chart for an information infrastructure.

The present invention relates to an information infrastructure with many different features and characteristics. The infrastructure is a system, a methodology and a process implemented on a personal computer (PC) system, on a computer network (LAN or WAN) and over the Internet and computer programs and computer modules and an information processing system to accomplish the functions described herein. An Abbreviations Table is provided at the end of this specification. Also, the General System Comments section E.1 describes certain aspects relative to the implementation of this invention. In the drawings, and sometimes in the specification, reference is made to certain abbreviations. The Abbreviations Table (section E.1) near the end of the specification and the Digital Doors Dictionary at section AA.10.1.0 provide some correspondence between the abbreviations and the item or feature.

AAA.1.0.0 DigitalDoors Capabilities

DigitalDoors delivers security solutions which conform to the secured information sharing requirements as stated in the Presidential Executive Order 13356 of Aug. 27, 2004 and in the Senate's National Intelligence Reform Act passed in September 2005.

DigitalDoors delivers information assurance through security processes that secure automatically (or manually) the data content elements. This simultaneously enables data security, data privacy protection, secured sharing and collaboration, and survivability within a unified infrastructure.

DigitalDoors technology provides security against insiders and augments traditional perimeter-based security methods. It represents a major step toward granular data content security and secured leveled information sharing necessary for unified national security and protection of privacy. It introduces granular content security and privacy protection, while enabling data sharing without exposures of source, methods, and activities.

DigitalDoors is inherently platform-independent and process-independent; it is a single enterprise-wide solution for all types of platforms, network infrastructures, cross-platform distribution, extended information workflows, and traditional data processing operations. The DigitalDoors technology is fully flexible and compliant with existing and developing standards for databases, XML, and hierarchical metadata, as specified in this document.

Given the practical implementation of data security at a granular data level and the modular, multi-platform initiative, the core taxonomic technology enables anonymous information sharing so that organizations can share information to connect the dots in a practical, sustainable, and effective process.

AAA.1.1.0 Architecture Specifications

DigitalDoors configuration is robust enough to support security while maintaining data structures consistent with legacy data operations, traditional desktop applications, and most structured and formatted data types. Support for HTML and XML is available at this time. Specifically, DigitalDoors will operate with SOAP, WSDL, UDDI, WS-Interoperability, XACML, PKI, XKMS, X-KRSS, biometric, SAML, and most other web-enabled architectures, trusted platforms, Unix, Linux, as well as host-based legacy environments. The technology is feasible within or across domains, and can function within multiple level trusted domains.

In DigitalDoors existing network, system, data processing, ID assurance, encryption technology, Internet-based transaction processing, messaging, and database activities coexist with limited workflow complications. DigitalDoors reviews data sensitivity level at the payload and messaging level; as a result, it can interoperate with the GIG transport services, with core enterprise services, and any community of interest.

AAA.1.2.0 Scalability

DigitalDoors is scalable both vertically and horizontally, or any mix thereof. The functions can be run centralized or dispersed, or both. It can run as hardware or software. As software, it can run on low-end user desktops, servers, appliances, or massively-parallel hosts. Complex processes (or sense CPU-bound processes) can be offloaded to coprocessors or grid-based resources. Demonstrations show functionality on past generation PC hardware without any peculiar software or hardware, thereby confirming a simple scalability scenario. DigitalDoors is also designed from the ground up with networking awareness and sensitivity level awareness to support single user environments, networked client-server infrastructures, and complex distributed GIG-type scenarios. Location references support local and fully-qualified paths, X-paths, X-pointers, and other long addressing methods.

AAA.1.3.0 Product and Process Overview

DigitalDoors provides Defense in Depth security capabilities which ensure the Integrity and continuity of the information environment and the information it stores, processes, maintains, uses, shares, disseminates, disposes, displays, or transmits.

DigitalDoors presents solutions to the following vulnerabilities in networks, computing infrastructure, core services and discreet systems:

Creation of many single points of failure in a net centric environment

Survivability and lack of constant data availability

Lack of resiliency against attacks including denial of service attacks

Unsecured collaboration and cross domain data exchange leakage

Protection against insider attacks,

Defense against malicious traffic

Defense against war operations including spy ware

AAA.1.4.0 DigitalDoors Implementation Options:

It is an add security capability which can be overlaid and integrated into existing security management systems. It can function as a stand alone security service.

AAA.1.4.0 Perpetual Data Availability

DigitalDoors delivers basic security Access Management capabilities, however it goes far beyond that and delivers the capability for perpetual data availability. Perpetual data availability enables access to data even when different storage servers are attacked or compromised. Single points of failure, are eliminated by dispersing the data into different storage servers. To eliminate the risk in replication of the data the documents/data streams are split into granular data segments (both data and metadata).

Compromise of an encrypted granular data segment on a compromised server can't compromise the entire document or data stream.

AAA.1.5.0 The Key for Net-Centric Security

Net-Centric security will be based on granular content control. DigitalDoors products are based on breakthrough patented technologies, which deliver comprehensive solutions to critical net centric needs. The products deliver maximum security, survivability and collaboration capabilities through the introduction of security at the granular data level within documents and data streams. The process can be outlined as follows:

DigitalDoors creates automatically or manually a sanitized version of the original document and/or a data stream, which contains no sensitive data.

The system in essence creates a "lowest common denominator" a non classified, sanitized document.

That document version can be shared with many users including those with low or no clearances.

The critical granular content within the document or data stream is tagged, encrypted, extracted and dispersed to distributed storage.

The result: a remainder unclassified sanitized document/data stream with its critical/classified components stored in distributed storage.

An attack will not cause damage or only very limited damage since the critical classified granular content is not in the original document.

The sanitized document will be upgraded for each specific user according to his security level and role at wire speed. Sanitized, declassified documents and/or data streams will be converted back into classified documents, at wire speed, when a user presents his identification.

The reconstitution will take place based on the clearance levels and roles of each user. In essence different versions of the original document/data stream will be reconstructed according to the rights of each different user.

Users who present their credentials will see instantly those missing parts of the document that they are allowed to see. As an example a mid level intelligence analyst will see the most of the elements reconstituted back into the document while a local commanding officer will see a reconstituted version with all the original elements.

The remainder document is a critical element presented by DigitalDoors. The remainder document enables not only wide secured sharing but also a centralized management of documents and/or data streams while the secure elements are decentralized to avoid single points of failure. This includes solutions against malicious traffic:

AAA.1.6.0 Active Defense and Counterattacks Versus Common Passive Defense

Critical content is not there, creation of air gaps. Work within all 7 OSI layers with filters will process every header and payload packet.

Firewalls and intrusion detection appliances are not successful in detouring major malicious attacks. There are different systems analyzing packets headers and payloads for malicious data blocking. DigitalDoors takes a different approach. DigitalDoors sees those data blocking efforts as passive defenses. Passive defenses have been proven to be much less useful than active defenses and counterattacks. In active defenses, the defender takes advantage of the terrain and other elements.

DigitalDoors was designed to operate as an active defense and as counterattack. It assumes that even the best of breed systems will not be able to block thoroughly the growing number and sophistication of malicious traffic.

The basic assumption is that the attacker will always be a step ahead of the defender. DigitalDoors therefore creates the ultimate last line of defense by having the critical elements of content extracted to dispersed secure storage locations.

In essence DigitalDoors creates air gaps. Malicious attacks might hurt the non-critical remainder content but the critical content is kept away in highly secure distributed storage locations unknown to the attackers.

Controlled release of critical content from storage locations will take place only after extensive scans for malicious attacks.

DigitalDoors standard functionality is focused at ISO layer 7 and above; specifically, it is intended to function within the presentation and application layers of the ISO model and protect data within infinitely granular hierarchies. As more traditional networking filter implementation, it functions and can be separately implemented at layers 1 through 6. With the filters, each bit it comes into contact with, header or payload is analyzed. Malicious elements are filtered out at wire speed. DigitalDoors will add on the best of brand malicious filtering capabilities after their certification by DoD. The DigitalDoors new version will enable malicious attacks to trigger Digital-Doors defenses-in-depth's last line of defense. Intrusion detection alerts will trigger a double-tiered defense:

Substantial extractions of content from documents, data streams will take place. The extracted critical content will be transported to distributed storage.

The release of content from storage for reconstitution in documents and data streams will be stopped or minimized.

AAA.1.7.0 Technical Basis for DigitalDoors Technology

DigitalDoors is a novel but practical combination of well-known computing disciplines, including secret sharing, information dispersal algorithms, distributed computing and best of breed security methodologies. In essence, the system creates virtual "digital doors" in documents and data streams. Those digital doors establish security and enable secured collaboration through defenses-in-depth capabilities to ensure end to end integrity, continuity of the data in storage and in transfer. DigitalDoors offers distinct core solutions and advantages that are not solved by DOD initiatives and products like CIBIS, CASPER, cross domain guards, and best of breed commercial products.

DigitalDoors contributes to the security by implementation of granular data control. The DigitalDoors solutions include the following cornerstones:

Net centricity creates major benefits but also creates dangerous risks.

The key to manage those risks is through granular control of the critical elements within the networks.

The critical element within the networks is data, which needs to be controlled granularly at the granular data level.

Therefore documents/data streams need to be parsed manually or automatically into smaller granular content parts, in order to enable granular control.

These granular content parts need to be tagged and classified per security level and role.

Users will have access to those granular tagged parts according to the rights they were assigned in their user profile.

In essence there is a need in net centric environments for recreation of various digital versions, on the fly which are reconstructed according to different users rights and roles.

Creations of on the fly versions save costs both in bandwidth storage and speed. There is no need to keep in storage many different versions and there is no need to send full documents multiple times across networks.

To counter the major security risks of net centricity the granular content parts should be tagged, encrypted, extracted, and dispersed to distributed storage locations.

Providing perpetual data availability and data survivability by replication of the different granular parts and storing the replicated copies on many servers.

Replication on many servers is enabled without security risk because the replicated items are very granular and even if they are compromised they are out of any context and do not compromise the bigger document or data stream.

AAA.1.8.0 Granular Data Control

There is a need to create "digital doors" in documents and data streams to enable granular control and achieve maximum collaboration, security, survivability, confidentiality, and privacy.

Digitaldoors Creates Granular Digital Rights Management for Collaboration. The core enabler of the DigitalDoors collaboration product is the creation and control of granular data segments within a document and/or a data stream. The parsing of granular content segments in a documents and/or data stream, can be done manually, automatically, or a combination of both. Metatags are assigned manually and also automatically to the newly created granular data segments. The Metatags include user roles, and define who and what processes are allowed to access each segment. When a user requests data through the discovery services, an automatic matching process will take place, matching user's profile with the metatags. The control of granular parts of content within data streams enables sharing of content with many users where each can see what he is allowed to see in a document/data stream in accordance with his personal profile and the policy embedded into the metatags within the different content segments.

Users will be able to access the data according to their roles. For example a user with an intelligence role will be able to view the whole reconstructed content while a user with a logistics role will be able to view only a limited reconstructed version of the original content.

AAA.1.9.0 Collaboration Will Consist of:

User's presentation of his identification

Automatic matching of user's profile with Metatags of the different tagged segments of the document/data stream.

Wire speed reconstruction of a version of a document/data stream according to users profile.

AAA.1.10.0 Granular Tagging with Metadata

Label data (and other resource) at content and context level for sensitivity, compartment, information, categorization, and other arbitrary designations User and process clearances (inclusion and/or exclusionary) based on sensitivity, compartment, information, categorization, and other arbitrary designations Granular Digital Rights management:
Support revocation of rights in real time
Support downgrading in real time
Support upgrading in real time
Controlled release of granular data:
Enable controlled release of data at all user, process and application levels
Enable distribution of core services and rapid information deployment to the edge AAA.1.11.0 Coalition And Multinational Cross Domain Collaboration DigitalDoors enables secured cross domain sharing as urgently needed in coalition and multinational cross domain collaboration. Real time ad hoc interaction between different trusted and untrusted participants is enabled in the very difficult cross domain environment. A document/data stream is divided to parts, each part is tagged according to the security level of the content (TS, S, C, U), it can also be tagged for the roles of users that should be allowed to access it (TS a, TS b, and Sa).

AAA.1.12.0 Incorporation into a Trusted OS

Incorporated with a trusted OS (for example a certified Trusted Solaris and a TCS guard) DigitalDoors enables a user to divide a document into granular content segments, tagging and encrypting each of the newly parsed parts according to the classification level of its content (TS, S, C, U) and dispersing the tagged parts to different distributed (TS, S, C, U) storage locations throughout the enterprise. The different segments can also be tagged for users roles. (TS a, TS b, S a, etc.). Users will be able to access a document or data stream they request which will be reconstituted at wire speed according to their role and clearance level.

Cross domain collaboration is enabled with connectivity of DigitalDoors products to a certified guard.

Cross domain sharing in both directions High to Low, Low to High

Secured Cross Domain sharing for US, and coalition forces

Advanced metatags for security clearness and roles

Organizational and user defined filters

AAA.1.13.0 Survivable Infrastructure

DigitalDoors Creates a secured survivable information security services infrastructure that lowers costs and maximizes secure collaboration for real time situational awareness.

It Secures data at point of origination, in rest and in transit based on methods of content granularity.

Provides data confidentiality, availability, integrity, and non-repudiation to users with override functionality and lowest common denominator as failsafe Cross-platform, cross-network, and integrates with existing identification, authentication, and authorization systems Integrates with Cross Domain guards with EAL-4 or higher certifications Support platform, guard, network, workflow, gateway data, and metadata interoperability for allies, partners, coalition forces AAA.1.14.0 Net Centric Capabilities DigitalDoors suite of net centric products and services delivers the following sought solutions to critical challenges of net centric organizations:

1. Security
  2. Survivability
  3. Constant data availability
  3. Secured collaboration/coalition cross domain sharing
  4. Automatic posting and alerting
  5. Specialized discovery/data mining The DigitalDoors evolutionary services can enable users to get the right information, at the right time, in the right format, as needed to meet operational tactical and support missions.

AAA.1.15.0 DigitalDoors Services Overview

DigitalDoors is a net centric core technology which delivers among others, the following services:

1. Secured Collaboration Services

"The existing Collaboration capabilities are technically outdated, expensive, have serious security flaws and do not scale well. There is the need to continually look at collaboration technology trends and potential redesigns and/or enhancements"

Global Information Grid Core Enterprise Services Strategy-Draft version 1.1a Jul. 9, 2003

Office of the Assistant Secretary of defense for Networks and information integration The DigitalDoors product addresses each of the above limitations taking secure collaboration from an "elusive goal" to an achievable goal.

DigitalDoors products deliver an evolutionary technology, which enables secured seamless collaboration. It provides comprehensive access to information from anywhere, at any time on any device and application.

AAA.1.16.0 DigitalDoors Implementation Options:

It is an add on collaboration capability which can be overlaid and integrated into existing shared workspaces, whiteboards and applications etc.

Or it can function as a stand alone collaboration service.

AAA.1.17.0 Defenses Against Outsiders and Insiders

DigitalDoors defends against possible killer collaboration traps, security killer gaps as described in the IA/Security services segment. Possible collaboration killer gaps can be:

War operations on collaboration sessions including substitution of misinformation in sessions by outsiders or insiders Destruction of storage and backup storage Unavailability of data due to denial of services attacks DigitalDoors contributes breakthrough security added value to the following AAA.1.18.0 Collaboration Elements:

Session management

Text Collaboration

Audio and Video over IP Network

White boarding and annotation

Application Sharing

Application Broadcasting

Virtual spaces

DigitalDoors contributes to the security of collaboration by implementation of granular data control.

AAA.1.19.0 DigitalDoors Cornerstones

The DigitalDoors solutions are based on the following cornerstones:

Net centricity creates major benefits but also creates dangerous risks.

The key to manage those risks is through granular control of the critical elements within the networks.

The critical element within the networks is data, which needs to be controlled granularly at the granular data level.

Therefore documents/data streams need to be parsed manually or automatically into smaller granular content parts, in order to enable granular control These granular content parts need to be tagged and classified per security level and role.

Users will have access to those granular tagged parts according to the rights they were assigned in their user profile.

In essence there is a need in net centric environments for recreation of various digital versions, on the fly which are reconstructed according to different users rights and roles. Creations of on the fly versions save costs both in bandwidth storage and speed. There is no need to keep in storage many different versions and there is no need to send full documents multiple times across networks.

To counter the major security risks of net centricity the granular content parts should be tagged, encrypted, extracted, and dispersed to distributed storage locations.

Providing perpetual data availability and data survivability by replication of the different granular parts and storing the replicated copies on many servers.

Replication on many servers is enabled without security risk because the replicated items are very granular and even if they are compromised they are out of any context and do not compromise the bigger document or data stream.

AAA.1.20.0 Granular Content Control

DigitalDoors creates Granular Digital Rights management for collaboration:

The core enabler of the DigitalDoors collaboration product is the creation and control of granular data segments within a documents and/or datastream. The parsing of granular content segments in a documents and/or datastream, can be done manually, automatically or a combination of both. Metatags are assigned manually/automatically to the newly created granular data segments. These metatags include also which user roles are allowed to access each segment. When a user requests data through the discovery services, an automatic matching process will take place, matching user's profile with the metatags. The control of granular parts of content within data streams enables sharing of content with many users where each can see what he is allowed to see in a document/data stream in accordance with his personal profile and the policy embedded into the Metatags of the different content segments.

Users will be able to access the data according to their roles. For example a user with an intelligence role will be able to view the whole reconstructed content while a user with a logistics role will be able to view only a limited reconstructed version of the original content. Collaboration will consist of:
 1. User's presentation of his identification
 2. Automatic matching of user's profile with Metatags of the different tagged segments of the document/data stream.
 3. Wire speed reconstruction of a version of a document/data stream according to users profile.

Granular tagging with metadata:
 1. Label data (and other resource) at content and context level for sensitivity, compartment, information, categorization, and other arbitrary designations
 2. Assign users and processes clearances (inclusion and/or exclusionary) based on sensitivity, compartment, information, categorization, and other arbitrary designations Granular Digital Rights management:
 1. Support revocation of rights in real time
 2. Support downgrading in real time
 3. Support upgrading in real time Controlled release of granular data:
 1. Enable controlled release of data at all user, process and application levels
 2. Enable distribution of core services and rapid information deployment to the edge DigitalDoors enables secured cross domain sharing as urgently needed in coalition/multinational cross domain collaboration. Real time ad hoc interaction between different trusted and untrusted participants is enabled in the very difficult cross domain environment. A document or data stream is divided to parts, each part is tagged according to the security level of the content (TS, S, C, U), it can also be tagged for the roles of users that should be allowed to access it (TS a, TS b, Sa). Incorporated with a certified OS (like A DIA certified Trusted Solaris and a TCS guard) DigitalDoors enables a user to divide a document into granular content segments, tagging and encrypting each of the newly parsed parts according to the classification level of its content (TS, S, C, U) and dispersing the tagged parts to different distributed (TS, S, C, U) storage locations throughout the enterprise. The different segments can also be tagged for users roles. (TS a, TS b, S a etc.). Users will be able to access a document or data stream they request which will be reconstituted at wire speed according to their role and clearance level.

AAA.1.20.1 Cross Domain
 Cross domain collaboration is enabled with connectivity of DigitalDoors products to a certified guard.
 Cross domain sharing in both directions High to Low, Low to High
 Secured Cross Domain sharing for US, and coalition forces
 Advanced Meta tagging for security clearness and roles
 Organizational and user defined filters AAA.1.21.0 Security Services
 DigitalDoors provides Defense in Depth capabilities which are far beyond the current state of the art. Those defenses in depth ensure:
 The integrity and continuity of the information environment and the information it stores, processes, maintains, uses, shares, disseminates, disposes, displays, or transmits.

AAA.1.22.0 Solutions to Vulnerabilities:
 DigitalDoors presents solutions to the following vulnerabilities in networks, computing infrastructure, core services and discreet systems:
 1. Creation of many single points of failure in a net centric environment
 2. Survivability and lack of constant data availability
 2. Lack of resiliency against attacks including denial of service attacks
 2. Unsecured collaboration and cross domain data exchange leakage
 3. Protection against insider attacks,
 4. Defense against malicious traffic
 5. Defense against war operations including spy ware AAA.1.23.0 Replication for Perpetual Data Availability
 DigitalDoors delivers basic security Access Management capabilities, however it goes far beyond that and delivers the capability for perpetual data availability:
 Perpetual data availability enables access to data even when different storage servers are attacked or compromised.
 Single points of failure, are eliminated by dispersing the data into different storage servers.
 To eliminate the risk in replication of the data the documents/data streams are split into granular data segments (both data and Meta data).
 Compromise of an encrypted granular data segment on a compromised server can't compromise the entire document or data stream.

AAA.1.24.0 Solving Net Centric Needs
 DigitalDoors products are based on breakthrough patented technologies, which deliver comprehensive solutions to critical net centric needs. The products deliver maximum security, survivability and collaboration capabilities through the introduction of security at the granular data level within documents and data streams.
 Firewalls and intrusion detection appliances are not successful in detouring major malicious attacks. There are different systems analyzing packets headers and payloads for malicious data blocking. DigitalDoors takes a different approach. DigitalDoors sees those data blocking efforts as passive defenses. Passive defenses proved to be much less useful then active defenses and counterattacks. In active defenses the defender takes advantage of the terrain and other elements.
 DigitalDoors was designed to operate as an active defense and as counterattack. It assumes that even the best of breed systems will not be able to block thoroughly the growing number and sophistication of malicious traffic.
 The basic assumption is that the attacker will always be a step ahead of the defender. DigitalDoors therefore creates the ultimate last line of defense by having the critical elements of content extracted to dispersed secure storage locations.
 In essence DigitalDoors creates air gaps. Malicious attacks might hurt the non-critical remainder content but the critical content is kept away in highly secure distributed storage locations unknown to the attackers.
 Controlled release of critical content from storage locations will take place only after extensive scans for malicious attacks.

AAA.1.25.0 Secured Discovery and Publishing Services

Provide edge users with the ability to search, mine, and pull data based on Meta data created automatically and or manually Providing content and context security while maintaining catalog, search, and mining services regardless of sensitivity levels Designed to support common delivery and posting of data in real-time The challenges:

Enable users, down to the last tactical mile, with the capability to pull whatever they want, from wherever they want, from wherever they are.

There is a need to publish content as well as post Meta data which will enable to locate the published material.

DigitalDoors discovery services enable different users across the GIG to locate relevant Files, data bases, services, directories, web pages, data streams, by using Meta data descriptions stored in various directories, registries, catalogs, repositories.

DigitalDoors is a security based Discovery service. Discovery services can create major vulnerabilities to the GIG; an attacker who accesses successfully a Discovery service must not be permitted to access sensitive data.

The following service are available for Discovery and Publishing services:

AAA.1.26.0 Publishing;

DigitalDoors enables publishing and posting data to common storage spaces as early as possible.

The system posts sanitized versions of the documents and/or data streams (full documents if needed.)

Documents are sanitized manually or automatically and then posted automatically.

The posting can be done automatically as part of an organizational policy. The advantage of posting sanitized versions of a document is that the user maintains control of the document's critical granular content.

The viewers who are interested in a published, posted sanitized document can request from the owner or a mediating authority the missing content. The full document can be released for consideration including exchange of sought information or payment etc.

The sanitized platform document can be automatically posted within the community of interest or other places so other users can locate it easily. The posting is done automatically or manually.

AAA.1.27.0 Meta Data Posting

Meta data posted in directories, registries catalogs etc. should only enable a user access to a sanitized version of the document/data stream.

Users who are interested to see the full version of a document/data stream will need to present identification.

The presentation of an ID will transform the sanitized, declassified documents and/or data streams back into a fuller version, at wire speed, based on their clearance levels and roles. Different versions of the original document/data stream will be reconstructed according to the rights of each different user Meta data is created automatically/manually and may be posted in Meta data directories in Communities of interest or other locations.

Edge users pull capabilities at last mile.

In addition to labeling and tagging content segments, DigitalDoors scans and categorizes all content in a document/data stream. A user can search for information based on Meta data in tags and also by key word searching and category searching. The search results will be in delivery of a sanitized results. With presentation of identification a tailor made version will be created for each user based on his profile.

AAA.1.28.0 Secured Mediation Services for Information Sharing

In order to enable any substantial aggregation, fusion, translation and integration of data for delivery of situational awareness support, there is a need to motivate different people in the network to share their data.

How can data owners be motivated to share with others?

DigitalDoors enables users negotiate the exchange of data, services or products in a net centric environment.

DigitalDoors Mediation services creates a framework for negotiations between parties that might not have any former relationship or trust.

The basis of all negotiations and brokering is giving users a motivation to share their data.

The consideration for data can be information, services, money etc.

A true market place, for arms length negotiations is enabled by the ability to release granular content in a controlled way following receiving of agreed upon consideration.

Data can be released in parts and in stages based on the response of the other parties. Such mediation is automated or can be done also manually.

AAA.1.29.0 Other Services

Other Mediation services provided by DigitalDoors Are:

Full auditing is enabled.

Auctioning is enabled, highest bidder will get all or parts of released of data

Discovery Metadata dictionaries

Taxonomies and Ontologies.

AAA.1.30.0 Secured Perpetual Storage Services

A net centric environment demands secure perpetual data availability. There is a need to create a survivable storage net centric environment, avoiding single points of failure.

Replication of data on distributed servers defeats single points of failure, but it creates security risks based on over exposure data. DigitalDoors overcomes the replication risks be overcome and delivers a perpetual data availability service.

DigitalDoors delivers basic security Access Management capabilities, however it goes far beyond that and delivers the capability for perpetual data availability. Perpetual data availability enables access to data even when different storage servers are attacked or compromised. Single points of failure, are eliminated by dispersing the data into different storage servers. To eliminate the risk in replication of the data the documents/data streams are split into granular data segments (both data and Meta data). Compromise of an encrypted granular data segment on a compromised server can't compromise the entire document or data stream.

AAA.1.30.1 Meta Data Posting

DigitalDoors enables posting data to common storage spaces as early as possible.

The system posts:

Meta data in directories, registries and

Posts/publishes sanitized documents (full documents if needed.) in public spaces in the Communities of interest.

Documents are sanitized manually or automatically and then posted automatically. The advantage of publishing sanitized versions of a document is that the user maintains control of the document's critical granular content. The viewers who are interested in a published sanitized document can request from the owner or a mediating authority the missing content. The full document can be released for consideration including exchange of sought information or payment etc.

DigitalDoors enables real time updates to each extracted content segment in storage. As events evolve content can be changed, updated, erased etc.

AAA.1.31.0 Secured Enterprise Management Services

DigitalDoors delivers highly granular Digital Rights Management across the enterprise. Delivering paradigm-changing technology that solves critical long-term challenges in security and sharing Security by screening, capture extraction tagging and reconstitution of critical granular content.

Creation of content real time awareness throughout the networks

Data is audited, replicated, and transported to distributed storage

An enterprise wide management service can control highly compartmentalized access to Communities of Interest, and to compartments within the Communities of interest.

All data will be sanitized. Users within a community will have access to Meta data and sanitized versions of the documents, e mail or other data streams they are seeking. Upon providing an additional identification the sanitized documents will be reconstituted according to the user's role and clearance level at wire speed. The service will support Public key as well as biometric appliances.

AAA.1.32.0 Access Enforcement:

DigitalDoors has the capability to enable access on a very granular basis uncommon today.

DigitalDoors delivers a technical proprietary capability for granular Digital Rights management which will fundamentally change the way sensitive and private information is managed. DigitalDoors has developed its own access management basic capabilities: Identity management, Authentication, Authorization and Access enforcement. DigitalDoors was designed to integrate within large organizations and therefore it can incorporate or integrate with other such capabilities.

AAA.1.33.0 Real Time Granular Audit of all Critical Content in Network

DigitalDoors delivers unprecedented logging and audit capabilities. Enabling detecting of attacks by usage patterns.

The granular classification of data and the granular control of access to that data enables real time granular audit of each user in the network. The auditing entity can zoom into the documents and the parts of the document a user has accessed. This granular capability is a forceful tool in locating insider attacks. An automated analysis of the logs alerts to threatening usage patterns. The system can locate anomalies in times of access and usage, in location, and anomalies in the type of content accessed within documents or data streams.

Time stamping and notarization with digital certificates will be offered.

AAA.1.33.0 Secured Messaging Services

The Granular content control introduced by DigitalDoors is an enabler for a wide range of messaging services supporting delivery of information and changes in real time with alerting. DigitalDoors off the shelf Outlook e mail is an example of integrating the DigitalDoors technology within messaging services.

AAA.1.34.0 Applications for Operating an Assured Environment Services

According to DISA Establishing a "cloud" a "network" of enterprise computing service providers, delivering operational hosting environments consisting of common hardware platforms, operating systems and core applications is efficient and cost effective. However this construct creates tempting challenges for attackers. Reverse engineering or penetration of one system can lead to a mass effort to penetrate the other similar systems.

The proposed centralized manage network will possibly create single points of failure, which are also identical technologically, standards wise and operationally.

DigitalDoors delivers a security solution that enables the said planned centralization yet avoids single point of failure by decentralizing critical granular data within the network.

DigitalDoors delivers perpetual data availability and survivability capabilities Best defense against denial of service attack Resiliency via granular replication with minimal security risk Highly secure content storage and delivery within survivable distributed networks Encryption and decryption of data streams including granular segments DigitalDoors delivers perpetually available and secured data, by a process which divides and parses data streams (documents, e mails, etc).

The encrypted content pieces are spread in different storage servers. Because of their granularity, there is no security risk in replicating those pieces in many servers. The replication and storage of those pieces on different storage servers delivers resiliency against attacks including denial of service attacks. Attack or compromise on a few storage servers will not cause harm to the integrity of the whole document or data stream.

AAA.1.35.0 Processing

Maximize data throughput, minimize data overheads

Support core legacy operations

Support above the OSI Application Layer in terms of data, metadata, and usage biases for contextual security Support for any interpretable data stream (ASCII, signal, image, etc.)

The network-centric benefits:
1. Provides users down to the last tactical mile, with pull capabilities whatever they want, whenever they want from wherever they are.
2. Enable data posting to COIs and other common storage spaces instantly
3. Deliver cross domain interoperability among allies, coalition and multinational partners
4. Deliver real time information and information changes to the battlefield and edge users.
5. Deliver highest level information assurance/security DigitalDoors supports multiple heterogeneous sources of data and Multiple data formats. (It conforms to many of DISA's requirements: Multiple platforms. Any type of data file or stream. Multiple languages. ASCII, EBCDIC, UNICODE. Supports high-transaction-rate databases, legacy host mainframe applications, inventory, payroll, and financial applications, MAN/MAN, resource planning, Internet storage, Web-based dissemination with push and pull, and other COTS software and activities. Support and augment COTS desktop applications such as Exchange, Outlook, and Office (such as Word, Excel, PowerPoint, Project, Explorer.)

AAA.1.36.0 Providing Scalability, Reliability, Resilience, Fault Tolerance, Speed DigitalDoors is designed to deliver perpetual data availability. It is a distributed granular information system that will provide availability reliability resiliency and fault tolerance. Data is split into small tagged segments, encrypted, replicated and dispersed.

The reliability resiliency and survivability of data is enabled by eliminating single points of failure. Sensitive data is split and cryptographically distributed across various servers. Compromise of one server or a few servers will cause no damage or a minimal damage.

Data bases, encryption keys and other core capabilities are also dispersed to avoid single points of failure. The risk management capabilities of the system enable users and administrators to gage and control the level of risk by setting the level of granularity. The design for all process, all inputs, all outputs, and storage is granular. This addresses the core issues of scalability, reliability, resilience, survivability, fault tolerance, speed, mobility, reconfiguration, and flexibility.

Implementation and infrastructure is designed with the assumption that systems, servers, network, user devices, and channels will be disabled by natural disasters, management and user accidents, willful intent, sabotage, and direct and asymmetric warfare. As a result, DigitalDoors can be partitioned in as many granular components and backups as desired, not only for scalability but also for resiliency and survivability.

Most DigitalDoors processes are neither processor-bound, disk-bound, or limited by network performance even on low-end PCs. Therefore, CPU performance is rarely an issue. However, when vast legacy archives of documents need to be assessed, downgraded, and distributed, this processing can be distributed since each thread is independent. This means that the DigitalDoors process is inherently scalable subject to the linear nature of standard textual documents. The legacy conversion process would be best distributed on a per document basis in order to process content and metadata within context.

DigitalDoors is designed as highly scalable system, that enables publish & subscribe communications.

DigitalDoors enables different methods of publication. Automatic and or manual publication of files, and/or sanitized files. Meta data publication and/or publication of sanitized of Meta data (including Meta data directories, catalogues)

Subscription communications are enabled with unique granular capabilities.

AAA.1.37.0 Enabling Generic and Standardized Data Distribution Services

DigitalDoors enables generic and standardized data distribution services. The system delivers major advantages by implementing granularity into its distribution services. Granular distribution enables sharing information based on a match between the labels and the security profile of a user. Granularity is supported to the sensitivity/security, compartment, information, and category levels. Generally, DigitalDoors supports incoming and outgoing data flows for ID, authorization, and integrity checks and configure selection, extraction, and dispersion to support each data and format type, and any metadata or catalog security issues.

Relates to architectural initiatives (e.g., shared software services, Web, XML, etc. Inherent to the open and granular design. DigitalDoors has demonstrated applications with HTML, XML, SOAP, and various COTS applications.

Operates in a network-centric architecture

DigitalDoors design for data granularity and process resiliency and fail over presumes functionality with generic user interfaces, black-box processing, web interfaces, integration with COTS products, and integration with legacy processes. DigitalDoors coexists within an extended network, with mixed platforms, and various architectures, from appliances through mainframes.

Supports event modes

DigitalDoors has built-in triggers to initiate data protection or terminate data access based on day or week, time of day, load levels, thresholds, alerts, events, security breaches, and user-defined situations. Access to information is proscribed to a lowest common denominator, or multiple levels simultaneously. This could preclude access—except to a template, some minimal partial display, or full display, with anything configurable in between. Upgrading of information is granted by network-centric or local ID, authorization, and other superior officer/manager overrides. This is granular control at each of the sensitivity, the compartment, the information label or tag, and categorization levels.

DigitalDoors has added support from its initial plain-text to include encryption, HTML, XML, metadata, dispersion, multi-level display, biometrics, and data mining. R&D drives technical enhancements, but user requirements and understanding how to implement user needs drives design changes and innovation.

Future DigitalDoors applications will be supplemented by tested cutting edge technologies, which are highly important for collaboration and security. Such technologies may include categorization technologies, semiotic inferences, list processing etc.

AAA.1.38.0 Storage

Storage overhead is minimal for DigitalDoors. The storage requirements are limited at the upper end by the distribution of the core application library. The upper bound is probably a standard CD. However, the databases for inclusionary and exclusionary categorization technologies is driven by the number of languages, image types, audio samples, and complexity of inferences needed for the user environment. For example, American English requires roughly 60 MB.

The recovery information and downgraded document is generally stored just once for all levels, compartments, labels, and categories. Sensitivity levels, compartments, information labels (tags), and categorization is very efficient, thus yielding a raw storage requirement of about 106% of the original legacy data stores. Encryption and compression can alter this substantially downward, to an average of 30 to 50% depending on the compressibility of the raw data.

On the other hand, storage is a direct factor of the number of sensitivity levels, compartments, and labels when multi-level storage is maintained. Backups, dispersion, and redundancy is a direct factor as well. The granularity is critical to issues of failover, local performance, resiliency, survivability, and fault tolerance.

AAA.1.39.0 Metrics

The DigitalDoors process is analogous to string processing. Performance is comparable to opening a text file, manually editing a text file, and saving that file to a remote secure storage. This is typical and traditional mainframe, server, and desktop overhead, When advanced techniques are applied for inclusionary and exclusionary categorization of data, metadata, and complex hierarchical data structures, more CPU, disk, and network overhead is required. However, when the task becomes bound, it can be pipelines, partitioned, run in parallel, or accelerated by hardware.

COTS Benchmarks of the DigitalDoors process shows performance that ranges from 34,000 to 360,000 instructions per recognizable element in the data stream. This ranges from 56 to 783 ?sec on IBM Thinkpad laptop yielding a Winstone value of 23. This would correspond to sub-millisecond response times on a IBM 3700 and like hardware.

When security is established by dispersion, distribution, and replication over a wide-area network as proposed by the GIG-BE, the single most significant component in response time will be signal response time. Signal response time in an Internet-like grid infrastructure is purely a factor of signal propagation time, gateway/router hops delays, firewall lags, and multiple server processing queu(e)ing waits. Satellite response times of 1.5 seconds, and router hops with 10 or more reroutes at 0.300 ?sec drives the GIOG metrics of multi-second response times. DigitalDoors application performance times are presumably immaterial in contrast.

AAA.1.40.0 Technical Specifications, Operating Parameters, and Network Design Specifications DigitalDoors is a series of differential process step that can occur on any platform, ranging from a mainframe to a low-end laptop. It enables content-level security in any type of data stream on any type of platform. It is inherently scalable from single to unlimited users. Content-level security can be effected at any layer of the ISO OSI model, from the bottom physical layer (level 1) to the top application layer (level 7). In addition, DigitalDoors uniquely functions within an application layer data stream to analysis content, concept, and context for security sensitivity to protect again brute force inference with statistical methods and data mining, assemblage of information, and human intelligence methods. In other words, DigitalDoors is processing any type of data stream for potential security lapses.

Most deployments are likely to require enterprise operation support with mixed client/server architecture. Automated OPSEC and COMSEC processing can occur as background processes on virtually any computing, Web/Internet, and networked platform. The DigitalDoors architecture was designed with run anywhere mentality, including hardware chipsets. However, in most cases, manual tagging presupposes a graphic user interface for selecting and identifying data stream content. As such, the core technologies require only visual element outlining, automated content identification, list lookup and matching, and basic data processing. Processing can be offloaded to the client or performed on the server. Dispersion is a function of a secure networking infrastructure. Most operations occur at network wire speed, this being the primary performance limitation.

DigitalDoors has installed and demonstrated its effectiveness on currently deployed COTS environments. This includes a wireless laptop network with a wireless SAN, a 10BaseT Intel client-server architecture, a 100BaseT and Gigabit Intel client-server architecture (Win95 through Win2003 AS and W2K EAL-4), several MS Terminal Server environments, and integrated with Solaris v8 and v9 and Trusted Solaris v8 servers and clients. We have tried the technology on Palm IV; we assume that DigitalDoors is portable to PDAs, handheld devices, cellular phones, and other hardware devices subject to their memory, connectivity, and CPU prerequisites. For point of reference, we have integrated and demonstrated DigitalDoors with MS Windows, as add-ins for MS Outlook and MS Exchange, and presume simple functional integration for any MS Office, database, data workflow, signal transmission, or COTS products. We have demonstrated DigitalDoors with ASCII files, MS Word documents, HTML, and XML metadata.

The client requires only a basic GUI interface (at a minimum) with NetBEUI, NetBIOS, or IP networking over any network transmission medium. The server components require no GUI and can run as a background process with NetBEUI, NetBios, or EP networking over any inter-compatible network transmission media. Interprocess communications is enabled through client/server channels, OS messaging, and RPC. Support over LAN, WAN, Internet, VPN, NAS, SAN, with remote commercial storage services has been tested. DigitalDoors has also been successfully tested with encrypting network hardware (Intel) and native P2P encrypting protocols.

TABLE

| The Data Declassification process is defined by these steps: |
|---|
| Authorization of security levels |
| Sensitivity |
| Compartment |
| Information |
| Categorization |
| Authorization of security roles |
| Sensitivity |
| Compartment |
| Information |
| Categorization |
| Identification of a data stream |
| Identification of the format for the data stream |
| Configuration of intended security levels |
| Sensitivity |
| Compartment |
| Information |
| Categorization |
| Categorization of data within the stream (e.g., tagging) |
| Selection of data within the stream for extraction |
| Extraction of data within the stream |
| Downgrading of data stream |
| Creation of upgrading recovery data files |
| Data backup |
| Data replication |
| Data dispersion |
| The Data Reclassification process is defined by these steps: |
| Authorization of security levels |
| Sensitivity |
| Compartment |
| Information |
| Categorization |
| Authorization of security roles |
| Sensitivity |
| Compartment |
| Information |
| Categorization |
| Access to downgraded data stream |
| Upgrading of data stream |

Access security is established through a network ID and authorization process, such as Kerberos and enhanced with the compartmentalized trusted operating systems, such TSOL. Access security can be enabled for most networked devices.

Downgrading the data stream is manual or automatic, or assisted. Automatic OPSEC and COMSEC rules can be enforced prior or post manual selection (tagging of the sensitivity levels, etc.) The processes are asymmetric by design. Downgrading can require substantial time, but upgrading is limited only by the network and the time lags to deliver a signal cross-country through multi-hop switches and routers that are part of the commercial public infrastructure. Realize that firewall, guard, filter, and router hops frequently entail 300 ?sec unidirectional delays; this being the primary performance delays. DigitalDoors has designed to the architecture and the process flows such that steps are optimized to each side of the firewall, guard, filter, router, and storage server mesh, including even optimization at the client for the extensive high-level content, concept, and context identification and dispersion. Manual tagging can be performed on any computer that supports a GUI interface. Processing is bound to disk or network performance limitations. Tagging information can be processed locally or delivered to a server for service-side processing. The user's ability to locate and highlight sensitive material is the functional performance limitation.

The data stream can be any of type of data. This includes signals, files, data streams, interprocess messaging in a workflow or high-volume transaction processing environment, email, instant messaging, logical information, and COTS data files. Data streams can be free form or structured, such as a COBOL data set, a RDBMS database, an MS Word document, or metadata, such as SGML, HTML, or XML. The DigitalDoors philosophy is to enhance security while maintaining traditional process workflows. Note that encrypted files and data streams require discrete and complete decryption before they can enter the transactional processing. Failure to decrypt such files abends systems and workflow because the format and content is unexpected. In addition, while encrypted XML and metadata is secure within that form, once decrypted is usually carries far more security-sensitive content than realized.

Manual processing requires trivial overhead. CPU requirements are minimal for the client and server components. However, OPSEC, COMSEC, and enhanced automatic and assisted data selection requires additional CPU resources and approximately 400 MB of storage. Even laptops are suitable. Automatically or assisted tagging information can be processed locally or delivered to a server for secure processing. Processing is bound to roundtrip network performance limitations, and database lookup seeks times. As the complexity is increased to automatically search data, metadata, content, context, and concept for sensitivity within the data stream, performs slows. Performance is affected by disk seek times and the depth of the searching and DigitalDoors categorizing process. Performance ranges from 34,000 to 360,000 instructions per recognizable element in the data stream. This ranges from 56 to 783 ?sec on IBM Thinkpad laptop yielding a Winstone value of 23. DigitalDoors processes a document of 140 words in 70 seconds on that laptop, but within 19 seconds on Dual Intel CPU Server with SCSI drives (Winstone value of 89). A production SQL database server provides several orders of magnitude better lookup performance than a client database on a laptop; it also scales better. Experience with *Sequoia* or comparable scalable and fault-tolerant architectures indicate single digit ?sec response times.

Dispersion performance is a function of network channel responsiveness and network storage performance characteristics. Wireless Ethernet 11 Mbits/s down to 2.2 Mbits/s is sufficiently faster than database seek times and storage, but nonetheless effective in demonstrations.

ReClassification performance occurs at wire speed subject to the performance limitations of network infrastructure and remote network storage performance. We have recovered 2 MB documents within 3201 ?sec using a multiple-hop router network and 10 Mbits/s Ethernet hubs to Intel desktops. This is equivalent to raw file display on the same networks and systems.

The footprint is purposefully small. Storage requirements include application storage, databases, temporary cache, and secure and dispersed network storage. Distribution is typically provided on a standard CD (640 MB) or business-card CD (120 MB). User storage per user is as little as 15 KB for a configuration profile. Application storage is approximately 30 MB for clients, although this can be shared as a single store on a server or terminal server. Database storage requires approximately 231 MB. This includes all language dictionaries, categorization elements, synonyms, and semiotic and grammatical inferences. Transactional processing, rollbacks, and security logs are optional, but on the same order of magnitude. All storage can use SSD, USB, PCMCIA, or flash RAM or networked devices. Performance is enhanced about 45 times with SSD. Flash RAM is marginally faster than mechanical hard drives due to lack of device driver optimization.

Data storage for user documents, data sets, data streams, metadata, and the like will be comparable to the size of the existing data store. Note that a design criteria is that all extra-security information, recovery files, auditing, and logs are stored in separate channels both for security reasons and format preservation. Expect additional overheads of only 6% for dispersion of recovery files. However, realize that minimum block sizes could increase that. Optimization for recovery files, which tend to be small, is possible by setting block sizes to 1 KB or smaller on a special recovery file storage site.

When sources are dispersed and replicated for multiple location storage, or creation for individual TS, S, and C archives with support for compartments, information labels, and categorization, then each replication obviously increases the storage requirements by about 100%. Proxy caching is effective when documents are often requested; however, for security purposes, caching of recovery files is insecure. It its also ineffective unless the recovery files are bound to the same sensitivity/compartment/category user because the storage server generates and only delivers at the level dominated by the user clearance.

DigitalDoors assumes that the native OS encryption will be applied or that a certified encryption system is available within the network infrastructure. DigitalDoors will integrate with that facility. Encryption overheads are comparable to what exists now. When unclassified or downgraded documents and the recovery files are stored black and delivered black, the encryption overhead will be approximately 106% of what is now. In spite of that low overhead, this provides infinitely granular data storage and infinitely granular upgrading.

Interprocess communication and messaging for client/server is optimized to minimize traffic loads and point-to-point encryption overheads. This limited performance overhead is most evident when a terminal server environment is taxed by many users, who nonetheless see performance equivalent to that performed on the client desktop. User or process identification and authorization is interspersed throughout the DigitalDoors process—it is not a one time when the user logs in—so there is some ongoing validation chatter. This rate is granular and configurable by the security administrator on a range from seconds to hours.

There are true performance and storage benefits when downgraded documents are shortened and mechanically compressed. However, for functional reasons, a core design of DigitalDoors is that the data stream format is typically preserved intact (less extractions or substitutions) to allow for workflow processing without abends, interrupts, or crashes. Even HTML, XML, and other metadata are typically preserved to retain the original format so that DigitalDoors is providing security without compromising functionality.

AAA.1.41.0 DigitalDoors Operating Parameters:

Any CPU platform with a development platform and as little as 64 KB of RAM. Any platform with support for either C, Java, or VB is suitable. DigitalDoors can run as a hardware process, an applet, an add-in, process filter, a dynamic link library, as an NT or RPC service, as a standalone client, as an in-process or out-of-process server, and as an enhancement to a firewall, IDS, IPS, guard, or operating system. DigitalDoors interacts with Kerberos, Active Directory, smart cards, biometrics, encrypting file systems, trusted operating systems, and many NAS, SAN, and other remote filing systems.

AA.11.42.0 DigitalDoors Network Design Specifications:

Because the core concept of DigitalDoors is to support collaboration, information sharing, dissemination, Internet and Web services, data mining, and data dispersion to remote storage, the client/server infrastructure requires only a core network. Integration preference is for a COTS network environment, such as Internet, Intranet, LAN, MAN, WAN, NetWare, NFS, or Microsoft networking, Network protocols can include NetBEUI, NetBIOS, and IP on a physical channel of 1 Mbits/s wireless (Zenith), infrared, Bluetooth, 802.11a or 802.11b, or 802.11g, Ethernet, FDDI, iSCSI, frame relay, ISDN, DSL, T1, T3, OC3, and SONET AAA.1.42.0 Configuration Options Available for Each Product/s DigitalDoors enables a wide variety of configurations according to the needs of different networks. Since the system introduces granular marking and labeling and securing of granular data segments the spectrum of configurations options is big. Those configurations can be set per organization policy at set up minimizing future administration work.

Following are some possible stand alone configurations:

Table of Configurations:

Digital content rights management - granular content control
Downgrading documents through manual, manual and automatic corrections, and automatic modes for sharing, coalition interoperability etc.
Cross Domain sharing high to low, low to high when connected to DTW certified guard
Real time total content analysis and categorization (headers and payloads) all OSI layers
Data activities: Processes, creates, extracts, encrypts, disperses, reconstitutes, inserts, duplicates, erases and audits
User created filters
Search for any characters
Manual marking, labeling and securing
Manual marking and labeling with automatic COMSEC override
Automatic marking labeling and securing
Manual posting and broadcasting
Automating posting and broadcasting
Encryption of content segments
Multi Encryption of content segments (different types of encryption within a document)
Information operations - misinformation
Passive auditing
Data replication
Data rerouting
Data compression
COMSEC
OPSEC
With add-ons-Intrusion detection
With add-ons firewall Many other different granular defenses-in-depth configurations are available. Those include granular segments replication and their dispersal to many servers to defend against denial of service attacks.

AA.1.0.0 Background: Formlessness for Security

AA.1.1.0 Introduction

Formlessness is the old, new, and renewed paradigm for security. Formlessness is part of ancient military strategy. Of old, it provided invisibility, fear, stealth, cunning, capability, and power. Of new, formlessness defeats ID theft, espionage, diversion of data streams, and the unfettered distribution of sensitive data now overwhelming every aspect of society. Security is badly-served by existing systems and methods, in particular, by monolithic perimeter barriers or by accretion of point solutions. Formlessness is the instrumentation to renew security and also competitiveness. Formlessness enables the architecture for dispersion, which provides for arbitrary levels of semantic and granular content control.

There is little substantive in literature about formlessness. There is even less about its relevance to security. The few western citations on formlessness include Sun Tzu, Robert Greene, and references by others to Herodotus of Halicarnassus and the generals Xenophon, Julius Caesar, Vegetius, and Von Clausewitz. Mao Zedong wrote on the board game of weiqi (aka Go) and its relevance to military strategy. Miyamoto Musashi wrote A Book of Five Rings (Go Rin No Sho) in the 1600s. This is a Japanese extrapolation on the Chinese The Art of War (Sun Tzu) to Samurai and the different culture of business from the view of a person experienced in the cultural and military upheavals of the time. See: References to weiqi as an < > to contemplate formlessness are referenced by:

Himly 1896: Karl Himly, "Die Abteilung der Spiele im 'Spiegel der Mandschu-Sprache'" [The section on games in the 'Encyclopaedia of the Manchu language'], T'oung Pao, Series II, Vol. 7, pp. 135-146 (E. J. Brill, Leiden, 1896).

Karlgren 1951: Bernhard Karlgren, "Excursions in Chinese Grammar", Bulletin of the Museum of Far Eastern Antiquities, No. 23, pp. 107-133 (Stockholm, 1951).

Koizumi 1991: Koizumi Shingo, "Chugoku Kodai no Yugi Ryupo ni tsuite" [On the game liubo in ancient China], Yugi-shi Kenkyu No. 3, October 1991 (Osaka).

Kotaka 1943: Kotaka Yoshisaburo, "Nihon no Yugi" [Games of Japan] (Hata Shoten, Tokyo, 1943).

Lau 1965: D. C. Lau, "Some Notes on the Sun-tzu", Bulletin of the School of Oriental and African Studies Vol. 28, pp. 317-335 (London, 1965).

Li 1980a: Li Songfu, "Han-Wei de Weiqi" [Go in the Han and Wei periods], Wei Qi No. 99 pp. 27-29, No. 100 pp. 27-29, No. 101 pp. 18-19 (Shanghai, January-March 1980).

Li 1980b: Li Songfu, "Sun-Lü Yipu de Zhenwei" [Is the Sun-Lü game genuine?], Wei Qi No. 103, pp. 51-53 (Shanghai, May 1980).

Liu 1985: Liu Shancheng, ed. "Zhongguo Weiqi" [Go in China], 2 vols. (Shu Rong Qiyi Chubanshe, Chengdu 1985).

Masukawa 1983: Masukawa Koichi, "Tobaku III" [Gambling, Vol. III] (Hosei Daigaku Shuppankyoku, Tokyo, 1983).

Masukawa 1987: Masukawa Koichi, "Go" [Go] (Hosei Daigaku Shuppankyoku, Tokyo, 1987).

Murray 1952: H. J. R. Murray, "A History of Board-Games other than Chess" (Clarendon Press, Oxford, 1952).

Needham 1962: Joseph Needham, "Science and Civilisation in China", Vol. 4 Part I, pp. 314-334 (Cambridge University Press, 1962).

Ogawa 1932 and 1933: Ogawa Takuji, "Shina ni okeru Iki no Kigen to Hattatsu" [Origin and development of go in China], Shinagaku, Vol. VI, No. III (July, 1932) pp. 57-76, and Vol. VII, No. I (May 1933) pp. 79-90 (Kobundo Shobo, Kyoto).

Potter 1985-86: Donald L. Potter, "Go in the Classics (ii): the Tso-chuan", Go World, No. 42, Winter 1985-86, pp. 19-21 (Ishi Press, Tokyo).

Shen [undated]: Shen Zicheng, "Weiqi" [Go] (Guoguang Shuju, Hong Kong, undated).

Sawyer 1993: Ralph D. Sawyer, "The Seven Military Classics of Ancient China", (Westview Press, Oxford, 1993).

Shirakawa 1993: Shirakawa Masayoshi, "Igo no Genryu wo Tazunete" [Seeking the origins of go], Igo Kurabu, No. 10 (October 1993), 136-138 (Nihon Kiin, Tokyo).

More is accessible to scholars in original languages. Nevertheless, there is a western reference to Kant's Esthetic Theory, in relationship to Air Force pilot John Boyd when describing his OODA loop, or academic discussion of $4^{th}$ and $5^{th}$ generation warfare (4GW and 5GW) strategies. In this country, some of these oriental techniques are applied to modern risks. LAX airport has implemented security that applies the theories of formlessness through the randomized distribution and rounds of security guards, although this thesis refers more specifically to the Bayesian-Stackelberg Theory instead of forecasting randomness or asserting randomness to confuse and mask. For the most part, formlessness is a concept that gets rare mention but represents a paradigm shift necessary to implement security, privacy, confidentiality, and survivability within our information ecosystem, the competitive economic marketplace, and warfare.

AA.1.2.0 Definition

The common definition of formlessness is the state of being amorphous, without shape, or having an indefinite shape. Think of liquid within a container as characterizing formlessness, assuming whatever shape the container compels it to be. Formlessness is usually a philosophical or religious term linked to the ultimate, infinity, indescribability, and transcendence. That also is without a real relevance to warfare, security, or business competitiveness unless formlessness is given utility.

The definition, of relevance here, is that formlessness is the condition of a resource (and more specifically, information as a resource) without context or utility. Consider formlessness as stealth, ambiguity, and surprise when applied to functional security. Formlessness is not chaos. Formlessness is not randomness. Formlessness is not emptiness or nothingness. Formlessness is not a vacuum. Formlessness is not order or the sum of everything. Formlessness embodies all those elements. Yet, it is not that; it none of those things, but all of those things. Emptiness and nothingness are based on a context, such that a room with emptiness and nothingness could have alternative value. It might not even be empty, merely have appearance of that.

Formlessness suggests form, or the expectation of form. Formlessness does not have meaning without the contradiction of form, structure, expectation, utility, usage, value, or purpose. Perhaps the real state of formlessness is the reversibility from order and complexity into chaos and simplicity, thus given rise to a two-way production model that converts raw materials into wealth and the deconstruction of wealth back into raw materials, primary of which, is energy. Albert Einstein has shown us that energy and matter are interchangeable. As such, formlessness could reflect the degree of available contextual information embodied by either energy or matter. Without form there is limited recognition of formlessness. Degree of formlessness might best be described as the amount of potential in contrast to the level of complexity.

Formlessness is a contradiction. It is nothing, yet it is everything. Formlessness is content without definitive context or concept. The content alone can have value, but not necessarily. The content requires context in meaning, a concept of purpose or utility to define process or attribute intention. Formlessness is a definition without a meaning, a broken tool, or a power leak. Formlessness is a coherent concept with a very long history of practical value. In more practical terms, formlessness is management of dispersed resources, power, assets, people, information, and elements of data streams so that the elements lack value without context.

The very existence of formlessness is predicated on the context or the concept, or the lack thereof. When semantic or semiotic clues are lacking, the situation takes on a chaotic aspect. When patterns can be perceived within this cloud, the formlessness resolves into a purpose, a process, a resource, a workflow. Areas within the cloud might still be perceived as chaotic, might not be important to the recognized patterns, or might still be unresolved. With the right control, these too will resolve, or remain formless as a protective barrier to market entry or a buffer zone against adversaries. Formlessness is a utilitarian tool for both defensive and offensive tactics, and a source to instill confusion when its patterns are lost or used against us. Such a tool has most value when efficiently used and applied correctly. That requires recognition for its applicability and experience for its proper (and evolving) usage.

This concept is antithetical to western philosophy. It just does not represent a useful concept for most people. It is even scary for some people. Others, just shrug it off, and ignore the idea for lack of getting the concept. This concept, however, is important, practical, and very much hard to grasp. It is very much a part of nature. It is the motion of fish in schools. It is the internal rhythm within herds on the African plains. It is the creation of chemical molecules that self-organize as DNA molecules or RNA processes. It is the construction of a beautiful picture from pieces of ugly fractal squiggles. A clash of cultures and embarrassment in verbalizing formlessness inhibits the understanding of formlessness. As soon as the concept registers, it sticks with a person. Everyone gets it. If you feel lost, you will get it too.

Formlessness is the separation of meaning into chaos. Formlessness is the correlation of seemingly random parts into a coherent whole. Formlessness is the time before the Big Bang and formlessness is the time after the big bang, which is the state of the universe in which we currently live. While there was a form and order to the universe before the big bang, there is a different form and order now. The contexts are merely different, creating different opportunities and existences, and with a relationship between them. Formlessness is a perception of context, of other contexts, and the application of the confusion of a context.

Formlessness unravels the value of information or resource to a lower level, an application of the $4^{th}$ law of the Theory of Thermodynamics, in that everything runs down, has no heat, and lacks differentiation. Formlessness is useless unless it can be reversed. Think of it as reversible entropy, or as some call it, reversible redaction when applied to information. If it can be reversed, then it can be used for security, privacy, confidentiality, and survivability. Reversal is reconstruction with integrity, reliability, survivability, security, authentication, authorization, trust, and polling against the efforts to undermine the dispersion of formlessness. The value of a resource is degraded by:

disassembling its whole into parts that have no value except with the other parts distributing those parts to prevent reassembly Intermingling parts with other parts lack of content, context, and concept This embodies that lack of differentiation in thermodynamics ($2^{nd}$ law). When parts are interchangeable, security is only achieved by protecting the parts in lockdown. Information is usually not interchangeable; it is usually specific to a context. If information is interchangeable, lockdown of the whole or the parts through encryption works and is the simplest solution to date. When process complexities require matrix-level access controls or uncontrollable downstream distribution, DigitalDoors' granular content control is simpler and more flexible. It resolves the inherent conflict between security and functionality.

Under the concepts of Claude E. Shannon, information theory regards information as only those symbols that are certain to the receiver.

A unifying theory known as information theory was developed and became the subject of intensive research. Claude E. Shannon, whose initial ideas appeared in the article "The Mathematical Theory of Communication" in the Bell System Technical Journal (1948) defined information to include the messages occurring in any of the standard communications media, such as telegraphy, radio, or television, and the signals involved in electronic computers, servomechanism systems, and other data-processing devices. The theory is even applied to the signals appearing in the nerve networks of humans and other animals. The signals or messages do not have to be meaningful in any ordinary sense.

The chief concern of information theory is to discover mathematical laws governing systems designed to communicate or manipulate information. It sets up quantitative measures of information and of the capacity of various systems to transmit, store, and otherwise process information. Some of the problems treated are related to finding the best methods of using various available communication systems and the best methods for separating the wanted information, or signal, from the extraneous information, or noise. Another problem is the setting of upper bounds on what it is possible to achieve with a given information-carrying medium (often called an information channel). While the central results are chiefly of interest to communication engineers, some of the concepts have been adopted and found useful in such fields as psychology and linguistics. The boundaries of information theory are quite vague. The theory overlaps heavily with communication theory but is more oriented toward the fundamental limitations on the processing and communication of information and less oriented toward the detailed operation of the devices employed.

The Shannon information theory descries information as symbols within a stream and self-obvious to the receiver. No external information is presupposed or allowed, other than—and Shannon does make assumptions—a format, a coding method, and a meaning structure, just not a knowledge system. He excludes the inference of information, relationships to other information and symbolic expansion, or an extended philosophy with pragmatic, functional, intellectual, cultural, developmental, or conflicting bases. However, this is not enough on which to base information measurement. This is specifically relevant within this discussion of formlessness. Just because the symbols are uncertain to the receiver does not mean that sender is in any way uncertain about the information, or that there is another intended receiver different from the actual receiver for whom this message is actually directed. This disparity opens up sending covert messages in the clear, meaning hidden in plan sight, or information with greater value than obvious. Security that does not consider this broader extension of meaning is security with leaks. This specifically is relevant to issues of aggregation, inference, and interaction, how the receivers interpret the context of formlessness, and also in the assessment of structured data and unstructured data because structure is context as well.

Although the concept of formlessness might be uncommon within western literature, real world examples abound. Any business with mobile service vehicles, like HVAC or plumbing repairs, exemplifies master control over swarming technical people. Both server and storage virtualization is the reorganization and management of formlessness. The logistics of shipping, fulfilled by FedEx and UPS for example, detail a pragmatic result with an obvious level of transitional process confusion; this too is a practical application of formlessness. Additionally, current agile software development techniques stress aspects of formlessness, including the flexibility of code/design development cycles, distributed work efforts, and reuse of code.

AA.1.3.0 Formlessness

Only formlessness that obscures content, context, and concept is sufficient to provide effective security. This is a direct contradiction to security by obscurity; obscurity is a subset of formlessness that does not inherently provide effective, long-term, and pragmatic security. Obscurity by knowledge restriction is weak because knowledge has a way of leaking out. Ignorance is not a quality we would realistically associate with a competitor. Security by obscurity is based on ignorance, and that is not a viable assumption.

Dispersing information to a masked, contracted, truncated, or hidden location is a form of security by obscurity. It is a case of concealing information to prevent its use or reuse. Of course, it works to a point, but once the location is reverse-mapped, the camouflage is no longer effective. Often methods are invented to defeat this camouflage, or things that seem to work become institutionalized, like IR film or putting color-blind spotters in airplanes. It is only a matter of time, real time and not non-linear exponential overhead, posed by encryption and/or access control systems Furthermore, the obscured file frequently is matched to attributes for ownership, date, and usage and these expose any basic attempts to mask its value, intent, purpose, and security risk. Additionally, the obscured file, whether structured or unstructured, typically contains within various forms of metadata that expose intent, purpose, and ownership, thereby disclosing the very information supposedly obscured. Obscurity is a subset of formlessness, but not an inclusive one. The file obscured still retains integrity, context, utility, and reversible attributes that allow for reconstruction of the obscured location and the intended utility without special tools. Not only is the supposedly-obscured file in plain view, but its key to recovering the obscured location is also in plain view. The content and form is intact, and contains enough sensitive information and context to reestablish is rightful location and utility.

Unfortunately, most operating systems contain kernel-level tools or are enhanced with all manner of search utilities that map the file system. These tools are designed to restore file losses and restore order. These range from more esoteric system administration lost block and segment tools, defragmentation, to disk repair tools. User-level tools walk the directory hierarchy, finding all files, the path to all files, disk space utilization, quota management, to reporting tools that map usage by location, creation user, user of last date, date of creation, name, type, and so forth. The bottom line is that such tools expose any obscurity or intent to affect security by obscurity.

Dispersing intact information or a file across multiple systems, attached storage systems, remote storage, Internet storage, and information fabrics although complicating the level of obscurity in reality does not alter the basic problem. The hiding of information in plain site or mixed up with other like files does not obscure the basic attributes stored by the file system. It can make it difficult for the owner (likeliest user) to recover a file, but it will not in any deter a motivated system administrator or hacker from remapping and classifying the type and value of information contained on one system or a network of such systems.

However, if information within a file is categorized, selected for PII or security sensitivity, and extracted as elements for dispersion, thereafter those elements lack context and recovery without a detailed map. Since this breaks the basic or extended attributes of most file systems, dispersion works if and only if access to a map is controlled, access to dispersed information is controlled, and the dispersion is sufficiently random to preclude forced re-identification of parts with the source or parts with parts. Granular access control predicates effective dispersion security; it is not knowledge-driven or security by obscurity.

In conclusion, obscurity is a subset of formlessness that does not inherently provide effective, long-term, and pragmatic security. Obscurity by knowledge restriction is weak because that knowledge itself has a way of leaking out. Only formlessness that obscures content, context, and concept is sufficient to provide effective and pragmatic security.

AA.1.3.1 How DigitalDoors Applies Formlessness

DigitalDoors enables information formlessness with reversibility, extraction of critical elements with reconstitution (or reconstruction) to the original value. This provides formlessness without any utility. Reduced utility is a practical matter in controlling the degree of formlessness at any value less than total; that value being a measure of control over granularity. True formlessness requires the complete separation of form from function, the reduction of meaning from context and purpose with what DigitalDoors calls dispersion, and the complete erasure of conceptual meaning that is less than arbitrary or indiscriminate. Utility of formlessness requires that even such arbitrary parts retain some designation, such designation remaining arbitrary and indiscriminate, to affect what DigitalDoors calls reconstitution, and others such terms as reassembly, recomposition, reconstruction, inline translation, or reversible redaction.

Dispersion increases the scarcity of information by creating formlessness, thus increasing its security and its relative value through scarcity. The information no longer exists, although it is known to exist or once existed, and this formlessness is reversible. Scarcity is also another important factor both in security and in the economics of wealth production models, and scarcity is manipulated effectively through dispersion.

The other application of formlessness is the recognition that dependencies apply to destabilize the survivability and security of the wealth production methods and the efforts to decouple these relationships. The relationships exist as contexts and concepts. When they are decoupled, we reduce the inherent fragility of the overall ecosystem. Specifically, DigitalDoors applications do not require specific platforms or a defined network infrastructure. Appliances that provide processing and appliances in the cloud for storage are sufficient. Most production processes are complex enough as it is, so the recoupling of rigorous and specific infrastructure requirements from process and information (through dispersion) increases overall reliability, survivability, and security.

When formlessness creates parts that do not contain within themselves the context for reassembly, the parts can be stored together. When formlessness contains assembly clues or instructions, the parts must be scattered or individually protected. When structure is removed from information, the interpretation of the information is uncertain or unlikely, thereby imparting formlessness. When formlessness is combined with randomness and a loss of differentiation through large number of like parts, parts can be stored together if there remains a way to differentiate individual parts uniquely. As such, the nature of the parts determines the level of individual granularity, and whether parts must distributed uniquely or can be saved together in the same storage.

If the purpose, strength, and intent is hidden in the multitudes of options within formlessness, the defense and the offense is masked until the actual attack. Consider the text from Punctuation—Context alters Concept stripped of its structure, format, capitalization, and punctuation.

Other formats, like the grid or a database, show different geometric contexts. Could this text have a vertical or diagonal message too? Could other forms preclude some words over a pattern or filtered window that hides some words like red letters masked through a red filter? Could the message be read through an algorithmic pattern, skip one word, next word, two words, next word, skip three words, next word, and so forth? Formlessness enables dispersion, sets a pattern for breaking contexts and assigning new ones, and allows dispersion to secure meaning.

The hallmark of formlessness is the uncertainty or ambiguity within a data stream processed by DigitalDoors Whether an extraction is masked without the use of a placeholder or a placeholder marks by the location of the redaction, ambiguity is key. When an extraction creates a disjointed flow, structure, or semantics then it is obvious something is missing. This can be just as indicative as when a placeholder substitution replaces the extraction. It is important that any placeholder convey as little additional information as possible, and if at all possible, any choice for that placeholder provide a statistically insignificant clue. This parallels the utility of the Security by the One-Time Pad and why the one-time pad still remains one of the most secure encryption key methods.

Formlessness can be applied to text, documents, images, audio, video, structured data, hierarchical data formats, and anything else represented by computer files of which we are aware. This includes specialized metadata formats and hierarchical document object models too. All forms of data, such as audio, image, video, database, compiled software applications, even CPU machine code are data streams that are generic until a purpose or utility is applied to them as imbedded metadata or external directives.

For example, an audio file displayed in MS Paintbrush is unlikely to have a semantic value nor will a database streamed as a video. When a correct guess is made, even when only a partial placement of audio is shown as a video, contextual clues establish a semantic neighborhood that can be explored until an exacting match is found. Hiding the purpose, file extension, or assignment of the appropriate application is an example of security by obscurity that does not withstand much attack. It is a matter of time until patterns within the data stream or specific markers establish the link. Random trials can also define the type and context for the data stream. Note that a spreadsheet, a database, or a recovery map are all just specific instances of a generic data stream, as detailed in AA.1.4.0 Formlessness as Security for Maps.

AA.1.4.1 History and Concept

Formlessness is an oriental (primarily Buddhist) concept underscoring philosophy and warfare for thousands of years. It is so prevalent and ingrained within the basic culture that it transcends definition. Because formlessness defined part of the social fabric, it didn't really need substantiation and direct reference within the related literature. It even has its own Chinese symbols. Formlessness is a cumulative concept based on other perceptions. Similarly, many western concepts like freedom, democracy, and independence are cumulative and require a foundation for utility as well. These are not standalone ideas and definitely not separable from the culture. They do not export well to other societies and cultures until the foundation is in place. This is as true for formlessness as it is for our essential western concepts, and thus an understanding of formlessness is as part of a social culture as an understanding of freedom is part of a western heritage and social and intellectual development.

Formlessness represents the highest level of enlightenment. It is foreign to western literature and philosophy because of the different focus in science, reality, legitimacy, and central material and corporeal value systems. Formlessness, in the guise of zero, infinity, and quantum bits that both exist and do not exist at the same time, and multiple universes postulated by string theory, are all certainly the new areas in science. These are new areas for exploration, statistics, randomness, transitions, and so forth. The occidental view of science is different in some ways, but it does exist and even predates most western civilizations. It is symbiotic with the complexities of formlessness. Writings on Tao and Zen often invoke formlessness. You might recognize formlessness in symbolic representation as yin and yang. Yin is formlessness; yang is form. Yin has no meaning without yang. Yang has no meaning without yin. The symbols have no independent meaning, value, or translation when they are apart. Together, yin and yang form the To a, a philosophy, a way of living, and a method for progress. The Tao is usually represented by this symbol, called the Tai Ji Tu, a social concept.

The circle contains the basic universal polarity of yin (dark area) and yang (light area) and shows the continual motion of change. As a side note, tractates also discuss the reversal of the color scheme and the interchangeability of meaning. Yin can also be can form and light and everything. Yang can be formlessness and dark. This self-contradictory and circular self-reference is a fundamental part of the oriental concept. Western biblical literature brings for the light and a form that is good from the darkness or nothingness. The science of formlessness is not well developed, if really at all, and these concepts represent a belief structure when even modern physics fails to provide a finished theory for everything.

The beginner's Taoist formula of creation is this: The Tao is also the Wu Ji, or ultimate nothingness/formlessness, symbolized by the empty circle: The Wu Ji contains within it the Tai Ji, or supreme ultimate: The Tai Ji, being the source of time and space is the source of the two universal forces, yin and yang. As the Tai Ji separates into yin and yang then all of creation is formed from their interaction. Another description of the formula is that the Tao produces the One, the One gives birth to the Two (yin and yang), the Two interact giving birth to the ten thousand things (all reality and phenomena).

The concept of yin and yang is about understanding polarity, dualism and complementarity. In western philosophy, as currently practiced, there is only a duality of good and evil, or more to the point, security versus functionality, or as we profess, security versus efficiency where functionality is replaced or measured in terms of efficiency. Ying and yang is absolute and well-known. The Chinese concept (and other eastern teachings) states that duality is only one aspect of the polarity of all life. While different cultures have legal and moral codes that stipulate good and bad, on a deeper universal level, the balance of duality is always in flux.

The principle of yin and yang is that everything is comprised of both aspects in varying proportions. Nothing is solely a yin or yang thing, it is always some relative combination. Every thing or activity has an opposite polarity, every yin has its yang. Yin and yang are opposites, but yin and yang are identical. The images form contrasting mirrors. Yin is Yang, although it is not. This manifest contradiction underscores the subtlety of occidental concepts and the depth in the meaning of formlessness.

Yin and yang eventually and always change into one another, just as life continually changes around us. This happens in the physical universe, the natural world, the social world, and inside our body (as noted and treated by Chinese Medicine). Instead of being defined states, the two forces are complementary and will always find legitimate expression. In physics, this is known (only in part) as: "each action has an equal and opposite reaction." The goal of life is to balance our inner selves, our way of daily life and relationship to the Tao by balancing the polar forces of yin and yang in all aspects of our being.

Through study, meditation, conscious movement (Tai Ji Chuan and Qi Gong) and experience with teachers, the inner world becomes simpler and the outer world more calm. The 10,000 thoughts and phenomena go back to their source as the Tao is found in daily awareness. Formlessness is not a tool that can be added to a toolbox or bolted on as an aftermarket solution. If anything, formlessness is an approach to applying existing tools.

This discussion previously asserted that without form there is limited recognition of formlessness. This is the essence of yin and yang. Logicians and mathematicians call this circular definition. It is not without some cultural tension that western logic meets oriental wisdom. Indeed, the very symbol of formlessness is the mirror image of a circular pattern. Formlessness is and it isn't. The essence of formlessness is form, and lack of form, and form itself presupposes formlessness from which to assemble form. Form and formlessness are production processes interrelated and interdependent on each other and from context.

Sun Tzu in the Art of War specifically connects successful techniques of war to formlessness as a concept, but assumed his occidental audience understood exactly what formlessness is. This concept was basic to the culture and metaphysics. However, as related above, this is an unfamiliar concept to western civilization, and part of the reason that it is appears so infrequently and only in reference to military strategy and Su Tzu. The concepts are being meticulously implemented by terrorists, such as al-Qaeda, to enable asymmetric warfare. But formless asymmetric conflict requires a higher degree of management and control than typically applied in western-style organizations and is frequently underestimated by western-style organizations. So in many ways, formlessness is not less, inferior, or subservient to organized warfare.

In fact, western military thinkers classify basic conflict with available endemic items as weapons as $1^{st}$ generation warfare (1GW), massed armies squared off against each other as $2^{nd}$ generation warfare, modern war with mass destruction and genocide as $3^{rd}$ generation warfare, $4^{th}$ generation warfare as that wage by mobility, whereas $5^{th}$ generation seems destined to be about asymmetry and disruption, perhaps a war without kinetic weapons at all, waged only with the value of information at once formless and patterned.

This is described later in greater detail for those interested in the connections between economics, warfare, strategy, information, and asymmetry. These ideas derive from seminal strategic thinkers, like Su Tzu. Sun Tzu's observations specifically on formlessness include:

"Be extremely subtle, even to the point of formlessness. Be extremely mysterious, even to the point of soundlessness. Thereby you can be the director of the opponent's fate."

"Victorious warriors win first and then go to war, while defeated warriors go to war first and then seek to win."

"Therefore when you induce others to construct a formation while you yourself are formless, then you are concentrated while the opponent is divided. Therefore the consummation of forming an army is to arrive at formlessness. When you have no form, undercover espionage cannot find out anything intelligent to form a strategy."

Although there are no direct connections in his writings between formlessness and deception, the context is obvious in occidental culture. Trotsky used these techniques, and referenced them in his journal, during the Russian Revolution to overcome the greater forces of the Tsar and monarchy. It is appropriate to security in that information retains its utility and value only within context as soon as information decays, is dispersed, and relationships to meaning and culture are lost, its value is lost too.

Another common aphorism, "Plan for peace but prepare for war" also cites the duality between these two and the need to create deception of intent (or concept). Resources applied for peace need to have value in war, and war materials need to be transformable into peace returns. Formlessness also applies to your own resources for you might not know how they can be better organized or even turned against you. Peace and war are opposites, yet sometimes they occur at the same time and within the same context. The world has experienced cold war and cold peace, neither peaces nor wars, but very clearly coexisting conditions of cooperation and disagreement. Formlessness in war and peace, are yin and yang, complementary but contradictory, and timeless as war becomes peace, and peace becomes war again.

Formlessness plays significantly in warfare. Conspiracy theories abound that the assassination of the Archduke Ferdinand was planned by the Russian Special Conference and the Russian Military General staff as early as 1913. There is some clear evidence they trained and funded the Black Hand and the actual Serbian co-conspirators. Recent publication of the Russian attaché's journal (2005) reinforces that claim. Yet nearly a hundred years later, we cannot tell whether this material is authentic. The Zimmerman Telegram accurately shows that control over information and maintaining secrecy through formlessness was the valuable instrument to drag America into the WWI on the side of the British. Cyber attacks on Estonia and Georgia during 2007 and 2008 were thought to be the work of Russian military intelligence to effect democratic destabilization and as a prelude to invasion, but the trail of evidence has been carefully protected to date. Attacks, defenses, and subversive activities without attribution tend to be more frightening and effective than complete knowledge. Formlessness takes many forms.

Formlessness in war and business competition is also about classification bias. Information can be applied to an intended activity but repurposed by an adversary to something else. The benefits of information could seem obvious, such as a deployment of forces or supply reinforcement. However, could work against that information to choose different battlefield that confuses that planned deployment or makes resupply impossible. Al-Qaeda 9/11 attacks demonstrated that airplanes seen only as transport vehicles and previous targets for opportunity of hijacking could become flying bombs. Effective usage of the classification bias includes the recognition of alternatives outside-the-box and the further protection of the assets to preclude repurposing. You do not want to presume tactical information has value only within your own contexts and a few obvious attack scenarios. Formlessness is enabled by thinking out-of-the-box. Security and functionality are also contradictory, often in direct inverse proportion to the other. This is typical with information sharing, where information needs to be shared, but the more information that is distributed in order to allow analysis of risks and assess potential for threats, the more information distribution actually occurs that has the tendency to leak secrets, expose secret plans, and undermine the very security sought. However, if security is amended as a Yin and Yang concept, security can be reinterpreted as part of functionality, as collaboration for functionality, rather than as a direct detraction to it. When security is perceived as the granular control of information and its distribution, functionality is not directly affected, but supported.

Yin and yang plays a crucial role as well. Just as it is necessary to centralize management in order to direct operations, it also concurrently necessary to decentralize the resources to establish security, power, survivability, continuity, prevention of repurposing resources by adversaries, and to enable rapid deployment. Catastrophes, natural or human, are the primary annihilation of single-point resources. It is as true with military shock forces as it is for information security. This is both the substance of guerilla combat, asymmetric warfare, and also information survivability. Command plans the strategy but implements with small and dispersed forces that are rapidly deployed to address a requirement. Sometimes that command is centralized, sometimes command is delegated to situational-awareness leadership, and other times, command and control ($C^3$) is self-sufficient and is self-evident within each force.

The value of formlessness is expressed in the oriental marshal arts of Jui Jitsu as Ju No Ri. Formlessness can be applied to attack and defense such that resources and energy can be deflected and so reapplied against the opponent. This is a method of converting the opponent's resources against them, a method of warfare first described by General Ulysses S. Grant in his Civil War march on Atlanta and now described as asymmetric and next generation warfare. See the white paper on Ju No Ri.

The success of attacks on small outlying resources is driving many to consolidate or outsource. Consolidation also concentrates resources that have no value apart, but assembly to create bulk, barriers, new knowledge, access to others, and the power to act. While many organizations are rediscovering fortress-like perimeter protection in order to consolidate the footprint and resources necessary to provide security and achieve economies-of-scale, they are also correspondingly seeing a rise in successful and focused attacks as a direct consequence of this unification.

Centralization is both a risk and a benefit. Decentralization makes the problem more complicated but provides the benefits in the distribution of this security risk. The combination of centralization of management but distribution of risk through decentralization of storage is the combination of yin and yang. This is the DigitalDoors implementation of formlessness, the centralization information, the dispersion of parts, and the reconstitution of the whole.

Protection technologies of firewalls, IDS, IPS, code verification, access controls, and other perimeters represent barrier-based protection. They do not work ipso facto because we are experiencing a security meltdown, but in conjunction these very barriers are creating isolation and disharmony as well. The existing "solutions" are so rigid they might be creating problems worse than those by our adversaries.

In conclusion, success is about security, power, and action with inaction. It is about the formats and formlessness. Formlessness enables the architecture for dispersion, which provides for arbitrary levels of granularity and semantic content control. It is about illusion, self-illusion, but self-knowledge. The application of formlessness in nature or by intelligence is to create opportunities and confusion. For one side it is Yin, the other Yang. Out of nothingness, comes everything, a pattern, an opportunity, or the confusion of the adversary.

AA.1.5.0 Security Through: Dispersion, Formlessness, Reversible Chaos

Dispersion as a security method is an implementation of formlessness. It only works when the structure, format, and content are disrupted sufficiently to preclude even an knowledge-based or statistically-driven forced reconstitution of the pieces. DigitalDoors granular content control presumes a level of statistical formlessness with independence between the resulting redaction and the maps, the resulting redaction and the extracts, and even independence and randomness among the storage locations and within the extracts themselves. Collections of related extracts paint an undesirable picture of purpose, utility, meaning, source, and risk.

Dispersion effected through even the random sequential partitioning of a data stream fails to statistically enhance security. There are more ways to do this poorly than correctly.

An example of poor dispersion is the separation of a data stream into seven or twenty three consecutive divisions. The failure of this concept is that these divisions are not independent of each other either at the context, context, or concept levels. Words likely fit together likes pieces of jigsaw puzzle.

Sentences or paragraphs might reference or flow into each other, or unique structures link together without intellectual doubt. Realize that a mosaic (or collage) reconstructed from subsets or overlapping sets does not have to have to replicate the original exactly as a forced facsimile erodes efforts to provide security, in particular when each piece retains a contextual standalone value. Fraud and counterfeits expose a like but different problem. Authentication and validation provide added-value to verisimilitude or facsimile, whatever is attained, and are critical to the information life-cycle management of dispersive-based security.

Multiple overlapping divisions provide even more meaning for unintentional reconstitution because of the clues in the parts that overlap. This overlap is common when a RAID-like feature is added to allow for complete reconstitution even when one of the divisions is permanently lost because the overlaps provides clues for aggregating the like pieces into a set and restituting them correctly back together. However, continuity and survivability with RAID-like duplication is fundamentally more secure when dispersions are duplicated, but these dispersions are independent of each other.

Dispersion when combined with encryption is still consistent mathematically with the same level of strength as the underlying encryption foundation. It really does not add anything to functionally enhance security by any orders of magnitude. In contrast, dispersion as a security method is predicated on the level of randomness achieved, where randomness is judged on the disruption of the content, context, and concept basis for the redaction and extractions. This includes data stream formats, encoding, symbolization, metadata, structure, and hierarchy, which are a part of context and concept. In other words, a database secured through redaction is likely to retain contextual clues about content, purpose, the intended workflow, and the processing application unless it is significantly desiccated.

Therefore, the effective of dispersion as a security method is a based on the implementation of formlessness as level of achieving a reversible chaos. Randomness and independence are key measures of dispersion security, just as they are in establishing the strength of encryption, PKI, and one-time pads, and similar statistical methods are pertinent for establishing the levels of security achieved. Randomness in content, context, and concept is a more difficult mathematical problem because semiotic and syntactical analysis is an open-ended universe driven at best by approximations, the current state of wisdom (and interpretation of meaning), and existing technology.

AA.1.6.0 Formlessness to Secure Maps

Reconstitution is the restoration of redacted content, context, or concept. This process uses a map to restore information exactly like (or similar to) the original source data stream before the DigitalDoors security redaction. DigitalDoors creates maps to reverse the formlessness securing the redacted source data stream and/or enabling granular control over information sharing and discovery.

The map is metadata—a higher-order representation of information—represented either as a set of instructions, blueprints, positions and sequences, or overlaps used to reassemble brushstrokes, pixels, bits, characters, rescaled or reformatted pieces recreating semblance to the original source data stream.

A map is no different from other raw data stream, source code, applications, workflow, or formatted and structured information. A map is information confined by a context and concept for its presumed utility. It is a specialized data stream with a purpose-driven format and specific context like any other. It is no different from data in any other file format or structure secured by DigitalDoors The map itself can be dispersed and/or encrypted just like the source data stream it represents, as another level of security formlessness. This formlessness of a map is its security as with any other data stream.

Integrity for the map is assured using the exact technology as with any other data stream. A map can be stored to encrypting file storage systems, or stored in the cloud hashed, encrypted, digitally signed, or dispersed, much like any other data element or stream. Versions, replications, and configurable dispersion options for the map assure survivability and security even within the most dysfunctional environments. Combinations of these tools are also supported where performance, configuration management, and overhead are the only practical limiting factors.

AA.1.7.0 Formlessness by Breaking Context—Hiding is not Enough

True security requires the splitting of content, context, and concept and then dispersion and hiding of those split pieces. This processing of the very asset that is in need of protection transforms the asset into a formless asset that has no value and no reuse value. However, formlessness when reversible, reconstitutes that value as needed, for as long as needed, without providing porosity or reuse value to the adversary. Dispersion of the data, dispersion of the metadata, and the disruptions of these references effects absolute sustainable security.

Hiding by itself is not enough. Hiding is not perimeter-based security. That's a good thing because security at boundaries and the edge is at best a solution that is not absolute. Every functional perimeter is ultimately porous, ambiguous, and diminishing as a protection method. Perimeter-based security is also an infrastructure that does not protect assets directly. Hiding alters attributes of assets to mask content, context, and concept.

A security method that is different promises a security solution. However, it is an unfulfilled promise. Hiding alone does not work. It is ultimately unsustainable. Hiding is a security method based on the assumption that you are smart while your adversaries are not. It works to a point, and then diminishes just like a perimeter. You are creating 'something' to protect the assets but not protecting the assets directly. That 'something' is just a misrepresentation of the assets. Adversaries find the assets nonetheless. Adversaries are intelligent.

You cloak a fighter plane as an empty field, a battle tank as a spoil pile, an aircraft carrier as a tug boat, a vault as a picture on a wall, a significant data asset as something not material or even as waste, or displace the position or availability of a special operations group. That is hiding, obfuscation, obscurity, masking, deception, or camouflage. Hiding is synonymous with displacement, reformation, transformation, mistagging, disinformation, and misinformation of assets. This does not secure the assets, but misrepresents the value, position, accessibility, and/or purpose of the assets. This hides references to assets.

Secrets are hard to keep. Operations tend to expose value, position, accessibility, and purpose of the assets over time. Adversaries understand that something is being hidden to disadvantage them. Secrets tend to have a context and a similarity that leak through aggregation, inference, and interaction. It works to a practical and functional degree, but is not absolute. The failure of this method is the false expectation that because it works sometimes, it works all the time and everywhere. It is only a porous solution, just like perimeter-based security. It is a false security.

Adversaries are smart, focused, flexible, determined, and motivated to find weaknesses across a broader asymmetric attack universe than possible for defense. DigitalDoors refers frequently to the security risks from aggregation, inference, and interaction because traditional security fails within these venues. Information compilations and similarities expose secrets. Inference is useful to make intelligent guesses or mathematical assessments of them. Workflow, sharing, and information distribution creates more points for leakage, and statistically over time one or more fail. Hiding is a doorway with porosity, no different that a perimeter, but it does not really exist even though it is positioned as though it exists. Hiding is a falsified perimeter, one that does not even exist. The danger is that many security methods are forms of this.

Security is limited by obfuscation. Security is limited by obscurity. Security is limited by hiding. Security is limited by masking. Security is limited by deception. Security is limited by camouflage. These are all one and the same. It is a security that does not even exist, except as a deception. Security by splitting and dispersion of content, context disruption, and concept randomization is different. It represents formlessness. Hiding by itself is not strictly formlessness; it is about hiding the information about the assets but not really protecting the assets directly. Hiding is an aspect of formlessness only in regard alone to the dispersion of the attributes about the asset, which is dispersion of the metadata.

AA.1.8.0 Differentiation Between Obscurity and Formlessness

It is useful to explore examples of obscurity and formlessness using Where's Waldo as a metaphor. A presentation of images shows traditional and non-traditional efforts to hide, obscure, or redact and disperse the pictorial character of Waldo. Obscurity is not as effective as formlessness.

AA.1.8.1 Obscurity

Obscurity is the state of being inconspicuous, garbled, camouflaged, or indecisive. Hiding things in plain sight, distributing valuables around, and dispersing resources are classic examples of obscurity.

Obscurity is the example of hiding Waldo within a mesh of similar resources. It is still in plain site, at least the average site, but it is obscured through limitations of normal visual acuity. Waldo will be discovered, whether quickly or eventually, depending on the quality of the tools employed. Some people are better at pattern matching than others because they can see exact colors or outlines embedded within camouflage. There will be someone with above-average skills to see through the fog or others who create specialized tools to circumvent the expectations of the mean time required to break what is essential a cipher based on normal human limitations. It is not a question of if, but of when, and what new technologies can enhance solution. Waldo is still Waldo and cannot be anything contextually or conceptually different. The presumption and limitation of obscurity is that the fundamental context and concept of Waldo must remain intact as a definitive iconic entity with a known presentation and semantic value. Waldo is always Waldo.

AA.1.8.2 Formlessness without Context

Formlessness is the state of information or resource without context or concept. Obscurity is an inferior subset of formlessness. Formlessness is the example of disassociating the image of Waldo into separate brush strokes or pixels, rescaling the pieces, altering the color, blending the pieces into other frameworks such as other games, works of art, or advertisements. Formlessness robs information of its inherent semantic value. The context of the Where's Waldo game no longer exists and the concept of Waldo as the focus of interest is buried within many other processes and requirements. Waldo is no longer an identity but a series of information elements equally likely to represent a number, an image of almost anything, a letter in a word, a recipe for food, or a workflow formula. The presumed utility is deconstructed into formlessness. Waldo is a binary data stream, a collection of alternative representations in a new basis, a conversion into a new encoding, or a disassociation of parts from the whole. Waldo is something else.

AA.1.8.3 Proverbial Versus Actual Context Change

Obscurity is the proverbial needle-in-a-haystack. A small element is lost within a large amorphous blob. The needle is still and always a needle within pile of fresh or dried grass. Solutions include the manual effort to extract this value from the chaff, or better methods to enhance the effort. A magnet is more effective because it lowers the precision and time requirements. A huge electro-magnetic renders the problem instantly moot. The issues of obscurity can be rendered instantly moot with technical solutions. Formlessness is an abstraction of the needle into something else within another abstraction of the background chaff. That abstraction is conversion of information into other formats, disassociated forms, or representations and transformations without contextual or conceptual overlap with the original situation. Proverbial obscurity constrains the problem to a contextual basis, whereas formlessness is requires a contextual set change.

AA.1.8.4 Obscurity and Formless Differentiation

The differentiation between obscurity and formlessness is not altered by the format, structure, intended utility, metadata, accessibility, or ownership of the information. Obscurity is still a subset of formlessness. Obscurity is camouflage but not the semantic disassociation enabled by formlessness. Information as data, process, or maps—and any other conceivable form—is bound within the same ecosystem. Differences between information types are arbitrary at best. Database structure, metadata, hierarchical document object modeling (DOM), and maps are consistent with any other data format.

Generally, each is transformable into any other format. Information is one and the same, as are all subsequent expressions of these basic forms. As such, the logic of obscurity and formlessness applies equally to raw data streams, organization documents, SQL databases, macro code, computer applications, maps to information elements, and complex human workflows. The greatest difficulty might be in the concise organization of these and in creating methods to convert bloated and verbose formats into a minimalist form.

AA.1.8.5 Recovering from Obscurity and Formlessness

Breaking through obscurity is an 'aha' moment when the camouflage becomes invisible. The information was there, always there, just not discernable without that recognition or help from advanced tools. Formlessness is a contextual transformation and dispersion of information that is not reversible without a precise process to restore the information elements back into a form and structure consistent with the intent of the original message. The iconic representation is not necessarily reconstituted exactly but at least contextually similarly. There is enormous flexibility in range of what is functional and acceptable, thereby allowing a downstream utility not constrained by the traditional dichotomy between efficiency and security.

Reconstitution is the partial or complete restoration of the content, context, or concept through a process defined and described as a map creates maps to reverse the formlessness imparted to dispersed information. A map is metadata, a higher-order representation of information, either as a set of instructions, blueprints, positions and sequences, or overlaps used to reassemble brushstrokes, pixels, bits, characters, rescaled or reformatted pieces to recreate a semblance of the original source data stream. A map is no different from raw data stream, source code, applications, workflow, or formatted and structured information because it is still information confined by a context and concept for its presumed utility. Formlessness is superior to obscurity in disassociating the utility, potential, or purpose of information to apply security to a cloud ecosystem and enable granular content control.

AA.1.8.6 Formlessness Through Microperimeterization

Microperimeterization is the creation of a closed set within an open set for the purpose of advancing security. This is the process sandbox. Microperimeterizing does not create more security than perimeterization, only complications because creating open subsets does not create closed sets. They are still open. If additional security were imposed through access controls on some or all of those open sets, they would have limited access and exist as controlled closed sets.

When DigitalDoors implements microperimeterization through selection, extraction, and dispersion, it is also creating open sets with limited access control. However, DigitalDoors goes a step further by breaking the context and concept within the content so as to add formlessness into this security mix. The open sets contain information with limited intent, purpose, and utility. It is statistically no different from randomly created chaff. These resulting open sets have none or negligible value and are indistinguishable from random sets.

The DigitalDoors recovery files exhibit both microperimeterization and formlessness, which together impart a flexible improvement to security. Dispersion of content break the context; these dispersions impart classification bias that establishes the essence of formlessness because the is no clear meaning for the dispersed content, no applicable consolidating context, and the context for the dispersions is lacking so meaning is randomized. Meaning is not completely random, as the examples with the definition of "ball" detail, but the meaning has such a wide range as to preclude useful analysis. Microperimeterizing with granular content control goes a long way to overcome the clear and present security limitations. Formlessness creates a venue for assets without known value and risk basis.

AA.1.8.7 Formlessness the Difference Between Dispersion and Hiding

Security is enabled by various means, such as perimeter protection, encryption, hiding, and dispersion. Perimeter security is the predominant method for infrastructure, while encryption has defined data security during the recent communications and information revolutions.

Perimeter security is under constant attack and is failing to reflect the virtualization of the zone or the cloud that require protection. Encryption is the obfuscation process to transform data using a mechanical, mathematical, or other statistical process rendering it unrecognizable and useless to all but intended parties. Encryption disrupts operations and increases complexity to the breaking point. Dispersion and hiding, like encryption, are forms of data obfuscation.

Hiding is the process of obscuring the location, utility, or purpose of data—but not the data itself which is left intact and fully-functional—thus rendering it difficult to use or find to all but intended parties. Hiding is obfuscation of location without content or control alteration. Hiding is a camouflage that presumes the inability to find, catalog, interpret, or utilize the data.

Hiding alone is not sufficient because it presumes that the hiding places will not be (ever or soon) discovered. Hidden data retains integrity and can be explored, mined, searched, and inventoried to retrieve definitive meaning. Many common tools reveal hidden information. Hiding presumes more difficulty in reverse-engineering location than is really the true situation. Sophisticated tools and workflows provide an enormous range of emergent reverse engineering capability to unravel hiding as a security method. The protection is based on the obscurity of the actual hiding places or access control to the hiding places. Computer operations, human intelligence, and the weaknesses in access-based security make breaking hiding relatively trivial.

One of the primary problems of hiding is that the location is often forgotten. The hiding locations are forgotten over time, with changes of personnel, attrition, end of tours of duty, and advancements. We are still finding caches of ammunition from all recent wars as far back as the French Revolution (1989-1993). Archeologists find other types of weapons dating back many millennia. People are like squirrels that forget where they hide their nuts.

Masking is also a type of hiding, implemented as redaction, extraction, reformatting, subset queries, and information partitioning. This is implemented as standard redaction with a black marker, as displaying a partial credit card or surrogate account number, or by information aggregation as practiced in medical journal reporting where PII is only shown in composite.

Dispersion is the data security obfuscation process to transform data by disrupting the utility, meaning (semantic and semiotic), and purpose of data and by rendering it unrecognizable and useless to all but intended parties. It recognizes the granular structure of data and provides security based on meaning. This transcends implied or expected usage with definable crypto analytical difficulty. Dispersion can be controlled from none, some (partial), or all, with unlimited granularity. Dispersion increases the scarcity of information by creating formlessness. The information no longer exists to provide the intended message, although it is known to exist or once existed, so this formlessness is reversible.

There is a functional difference between dispersion and hiding. Dispersion is content annihilation. Dispersion utilizes the distribution of resources without regard to utility, practicality, or basis and the complexity to interpret the results. Dispersion does not require hiding. Data extractions and dispersal results can be placed into plain sight because security is provided by the break in content, context, and concept. Dispersed information lacks meaningful content integrity.

Perhaps, statistical assemblage could be used to separate and coordinate dispersed information, but the density and complexity makes this unlikely. The continued and ongoing incremental usage of dispersion increases the factorial complexity to separate and coordinate extractions.

Several companies (RSA, Cleversafe, RevStor) are providing dispersion based on block-level data stream division. In other words, the file is divided into 9 or eleven pieces, which are encrypted and replicated to multiple storage locations. This type of security is predicated on the inability to overcome the encryption infrastructure and stitch the separate pieces back together. As the number of replications and opportunities for aggregating and aligning the pieces increase, statistical security decreases. Since the edges of these arbitrary divisions are often syntactically unique enough, alignment is often trivial because it is computationally linear and solution symmetry simplifies the problem as each puzzle is reversed. Dispersion requires an additional complexity because concept and context are also disrupted so that content is randomized for effective security in a non-linear space.

Dispersed information lacks the effective context needed for later usage. This is the same security enabled by the one-time pad encryption of a message. Each random reassemblage of the dispersed information is as equally likely as any other. Some might incorrectly suggest that inherent structure or syntax can help reassemblage of information, but if context and concept are extracted along with the content, purposeful aggregation, inference, and interaction is prevented.

In effect, there is uncertainty whether enough of the dispersed pieces are aggregated, that the correct dispersed pieces are included in each set, or that partial reassemblage is sufficient to provide non-trivial accuracy of the content, context, and concept. As an example, to understand the various meanings of "ball." The example sentence "The pitcher has thrown the ball, an inside curve ball, to number 27, Red Ball, and the umpire has called it a ball" shows how partial message recovery creates uncertainty and as many likely misinterpretations as the number of extractions and dispersions.

In other words, when a document stream is parsed, crown jewels are independently extracted and these crown jewels are individually dispersed, any validated connection between the redacted source document and the extractions and even among the extractions themselves is difficult to establish. Meaning is arbitrary without the clues provided by structure and order.

Furthermore, each dispersed crown jewel is also independent of others, thereby preventing aggregation or inference attacks. Mathematics provides added security in that as the size, distribution, and overall randomness of the extraction storage increases, forced connections cannot be correctly established. Overall randomness can be further enhanced by the generation of extraction and dispersion chaff. The density of the chaff could range from 0 to nearly 100%, clouding what value might exist.

Dispersion represents a puzzle with puzzle pieces that are independent from each other (e.g. no jigsaw clues with color, content, connection, or placement hints), an overwhelming selection of pieces to false and legitimate puzzles, duplicate pieces that could imply a content continuity or merely a red herring, any lack of structure or order for reassemblage, and missing (withheld) pieces through the granular content control process. By the way, the metaphor of a puzzle used here presumes a two-dimensional reassemblage space, but that is by means even certain. Many data structures are multi-dimensional or hierarchical, so reassemblage complexity is an unknown z-space. This establishes unlimited dimensions of uncertainty, thus cryptographic security.

There is also no certainty that all dispersed extracts are available from the same storage location. These independent pieces could be dispersed to different hidden storages, and while the pieces might be discovered in time and the hiding places exposed, the context among any of the storages and pieces within remains tenuous at best. Depending on the degree of granularity allowed in the redacted message, several different and equally meaningful sentences could be reconstructed, much like the equally-likely decryption of a one-time pad message with trial keys.

Additionally, it is a false presumption that the source and thus the reconstructed messages are syntactically correct, do not purposefully distort grammar, or merely provide symbols into another coded medium. The structure itself is important to provide context. The file format could also be a database, an email, or merely bits encoding in a different basis, and the lack of foreknowledge as to the utility disrupts any possible concept. Perfect secrecy is a strong notion of crypto analytical difficulty that is neither knowledge-based nor obscured in false presumption of sufficient complexity to prevent immediate and widespread disclosure.

AA.1.8.8 Dispersion as Asymmetric Warfare

Every protection measure instigates countermeasures to defeat it. Countermeasures are procedural or technical. This is the nature of an arms race. Better weapons beget better countermeasures. Better countermeasures beget better weapons. Arms races are counterproductive to progress and often reverse it.

Security has a history of measure versus countermeasure. Physical barriers and point solutions have proven ineffective, and aggregations of these methods also fail. Such efforts tend to divert attacks to softer targets, provoke new attack vectors, or instigate a bewildering array of new technological complexities to circumvent the security while achieving the desired attack goals.

Aggregation of physical barriers and point solutions often create new problems that reverse the benefits of security methods by undermining core process; this often describes the situation of security versus functionality.

Asymmetric warfare is one of the few methods to bypass this arms race. It is an indirect attack. Asymmetric warfare is applied against non-military and civilian targets, affected through misdirection, third parties, and covert activities. Although there are some direct countermeasures to asymmetric warfare, indirect methods generally are superior.

Often asymmetric warfare masked through third parties raises the cost of retaliation so high as to be politically reprehensible. This relies on the concept of plausible deniability and the use of the human shield. Few clear retaliation opportunities are available against the Russian cyber attack on Estonia in 2007 because it is unclear exactly how the attack was perpetrated, what resources where used, and who sponsored the attack. Hoaxes can also be as disruptive as real attacks, leaving fewer telltale markers and no actionable responsibility. Lashing out at shadowy enemies is at best inadvisable, could damage uninvolved pawns creating new enemies, creates more collateral damage, and is usually futile.

One of the reasons information security is so difficult is that attacks are asymmetric and covert. Hardening the infrastructure and securing the process with validated code is a countermeasure against only clear and present dangers, not against aggregation, inference, and interaction. In time, hard targets will give way to soft ones, and there are generally more soft targets and more avenues for access to these soft targets.

In $5^{th}$ Generation Warfare theory, countermeasures to asymmetric warfare are diplomacy and winning the hearts and minds supporting the insurgency. Withdrawal is effective but is often perceived as yielding to the demands and goals of a terrorist agenda that if successful emboldens other like asymmetric efforts. Dispersion often slows and weakens the control and speed at which countermeasures can be deployed, but it is one of the few methods successful to infiltrate an asymmetric enemy and retain a level playing field.

Dispersion of assets and soft targets is the method to thwart asymmetric warfare. It is particularly relevant to digital warfare because targets can be replicated endlessly, easily dispersed (even intertwined within enemy resources), and quickly reformed. Dispersion is an old and practiced example of formlessness. DigitalDoors demonstrates the technology of dispersion and utility of formlessness through granular content control and unlimited levels of reconstruction.

Reconstruction enables guerilla-like utility through the ad-hoc reversibility of dispersed data. This measure protects the raw data through dispersion and limits the extent of possible damage while retaining the effectiveness of the measures and the speed at which they can be deployed. Because these measures are asymmetric, countermeasures are at best inadvisable and self-destructive. In fact, systemic countermeasure attacks against dispersed infrastructure and dispersed data are likely to create significant collateral damage to the attacker's own infrastructure, leading to scenarios of mutually-assured destruction.

Dispersion relies on the creation of intertwined dependencies that become inadvisable targets. DigitalDoors has yet to discover a countermeasure to the dispersion measure that does not raise the costs and ramification of attack and retaliation beyond what is sustainable. Dispersion is the child of formlessness, a concept of warfare and strategy that has withstood the tests of time.

Intangible value hides below the surface. That intangible value escalates when its apparent scarcity is engineered, maintained, and protected. Nearly 95% of any corporation, even old-line agricultural and industrial ones, are represented by property assets not booked as balance sheet entries. Many assets are scattered around or perceived as corporate property or some sort of ambience without an immediate need for recognition, inventory efforts, formal monetary valuation, and trade secret protection.

AA.1.9.0 Overview of Formlessness:

AA.1.9.1 The DigitalDoors Formlessness Doctrine

The Information revolution has created extremely powerful technological tools, which can give superior competitive capabilities to organizations that leverage them. Using advanced information search and data mining capabilities combined with information inference tools can give an organization a major advantage over its competitors and in some instances may bring to the devastation of the competition.

The existence of such powerful tools and the easy access to them creates a new environment in which competitors and opponents may piece together the most important secrets of an organization, and thus try to undermine its mission, its market and possibly its reason for economic existence.

Combination of data mining tools, inference tools with cyber attack tools like Trojans, worms, etc creates a dangerous combination which can be lethal to the survivability of the target organization.

Such an environment is in essence an information battlefield and there is a need to adopt methodologies from the battlefield to guarantee minimum losses and organizational survivability.

The Formlessness Doctrine calls for adopting of different methods which will make the organization's information assets unknown. Only that information that needs to be released will be released in a controlled granular manner, the other information will be dispersed in secure distributed storage locations making the organization information assets be untouchables.

The Doctrine of formlessness calls for creation of intellectual property portfolios, which are dispersed assemblages of tools like patent portfolios, trade marks, copyrights trade secrets and which are not apparent and therefore not easy for attack.

AA.1.9.2 Establishing Formlessness:

The key to formlessness is organized order. Formlessness is in essence organized chaos. There is a need to establish at first order and organization of the information assets before creating the organized chaos.

All information assets of the organization must be located, and inventoried. Inventorying all assets calls for classification of all information assets and their tagging.

This requires inventorying structured data stored in databases, semi structured data like e-mails, and unstructured data.

After classification and tagging of the information assets dispersal process needs to take place, dispersing the assets to different distributed stores. All dispersal will be mapped in maps, which will be vaulted in safe locations.

When there is a need for information asset, it will be released in a controlled manner after fulfillment of release conditions. For example a release may require answers for the following questions; (the 5 Ws) what is been asked for, by whom, for what reason, at what time and where.

AA.1.9.3 Defending Intellectual Property and Trade Secrets:

Trade secrets are sensitive information of the organization that can not be protected by legal means like patents, trademarks and copyrights. Such Information assets may include customer's lists, scientific formulas, sensitive studies, PII personal information etc.

Such information is usually kept in databases throughout the organization. The Formlessness Doctrine calls for dispersal of such granular information assets to different distributed storage stores. As described above.

AA.1.9.4 Defending Information in Web Sites:

The Formlessness Doctrine calls for minimization of exposure of sensitive information on web sites. Sensitive information will be released from a web site based on identification of a viewer.

In essence web sites need to be transformed into Multi Level Security systems where different people will get different access to different parts of the content based on who they are and what are their roles.

The Formlessness doctrine calls also for release of information assets from such web sites for monitory consideration. As described below.

AA.1.9.5 Legal Defenses with Formlessness:

The state of formlessness needs to apply to all types of information assets including those that are highly sensitive and private and those information assets that are in the public domain like information in web sites. Furthermore securing information assets by applying formlessness must include securing ideas and concepts that are important to the organizations. Such ideas may be kept as trade secrets in secure vaults, but when the concepts are protected by legal means such as in the case of patents or trademarks and copyrights there is also a need to protect those legal instruments so they will not be undermined and voided by the usage of advanced data mining tools. For example a patent may be attacked by intensive data mining efforts to discover prior art that may make the patent protection be worthless.

AA.1.9.6 Measurement of the Information Inventory for Risk:

All information assets will be measured for their risk value. An information piece will be evaluated for the risk it may cause when released. The risk will be measured with different tests including advanced inference and aggregation tests.

AA.1.9.7 Monetizing the Information Inventory:

To achieve a serious priority for the information assets inventory there is a need to treat the information assets as economic assets with a specific monitory value. Each information piece will have its monitory value. People moving pieces of information will see those as monitory transactions having all the ramifications of dealing with economic assets. Ant waste of negligence in handling an information asset will be treated as negligent handling of money within the organization.

AA.1.9.8 The Global Information War

In the past few years major technological changes have taken place in the digital world that are creating fundamental changes in the way we interact and communicate. The extreme interconnectivity between networks and people in combination with the new powerful information searching capabilities create extremely powerful capabilities. In essence a new information paradigm can be used both for good and bad to our society.

The advanced technology capabilities enable organizations to search and find critical information about their competitors. Searches on the Internet, combined with advanced data inference tools can yield for organization highly valuable information on the competitors. The intelligence may include: research and development results, names of customer, new marketing plans etc.

Advanced searches may also yield prior art results that were hard to locate in the past, which may serve to attack and void the patents of competitors.

A planned focused intelligence gathering operation may lay the basis for eroding the base of the competitors.

To defend against such search and inference attacks an organization must control tightly all its information assets both the internal and external ones.

Information assets on the organizations web sites must be controlled allowing release of information to parties based on their identity. The public will view very general information while selected people will have access to more information based on their security clearance levels.

Information within the company must be inventoried, classified and tagged. Sensitive data, the crown jewels needs to be located and transferred to safe vaults. Release will take place in a controlled manner.

The acceptance of such precautions is a challenge to the culture of an organization.

Currently there are no technological solutions to stop the Tsunami of different cyber attacks. The different types of attacks are spreading like cancer. There is a need to fight spreading cancer with surgery, radiation and chemotherapy. Vitamins or aspirins are not the solution. The technological solutions currently are like vitamins and aspirins. If the technological solutions were good the cyber cancer would have been stopped.

There is a need for true strong leadership, at the highest level that will study and understand, and do something about it. There is a need for a national agenda that will relate not only to government, but to businesses and citizens. There is a need for a united front. This issue should be the top priority because the US. is losing its superiority as a superpower without even understanding that it is happening.

AA.1.10.0 There is a Need for a Technological Paradigm Change.

This is a real emergency which calls for new technological directions. And Allocation of monies to development of the right technologies like DigitalDoors software and patent portfolio, rather than doing more of the same technologies.

Because of our openness as a society other countries have access to our public information on the Internet they then attack our networks and get the needed sensitive information to complete the puzzle.

In essence the US is being robbed out of its biggest asset, the intellectual property of the American people. Trillions of dollars in Intellectual property are removed yearly out of the US yearly without our understanding of what is going on. People are failing to understand the criticality of the problem because it's very hard for anyone to comprehend the aggregation of risks and threats created by the information revolution.

AA.1.11.0 DigitalDoors Hierarchical Security Sanitization and Reconstitution

The sanitization and processing of a data stream into non-sensitive and sensitive items is unlimited in that the original data stream can be decomposed into an arbitrary and unlimited number of subordinated representational streams. DigitalDoors can create an unlimited number of transformations of the original data stream and also an unlimited number of aggregations of sensitive items. Security is created through the process and method of dispersing content and granularizing items that define context so as to preclude information knowledge, aggregation, and inference.

Maps and metadata for mapping, reconstitution, and (none-to-partial-to-complete) recovery of the original data stream can also be decomposed into an arbitrary and unlimited number of streams and dispersed to an arbitrary and unlimited number of local or remote storage locations. DigitalDoors can create an unlimited number of transformations of the original data stream. The purpose for the DigitalDoors data stream transformation is: to secure content; to secure context; to prevent data aggregation and inference; and to preclude data repurposing by insiders and attackers.

DigitalDoors can create an unlimited number of aggregations of sensitive items for knowledge management. Reconstitution, therefore, is controllable from none-to-partial-to-complete contingent upon a role-based multi-level security identification and authorization hierarchy. As a result, security is created by minimizing the access to the content in the data stream and thereafter enabling hierarchical reconstitution of granular pieces into the data stream in a controlled environment.

Vetting through identification and authorization enables (none-to-partial-to-complete) recovery of the original data stream or a step-wise defense-in-depth reconstitution in one, two, or simultaneous multiple levels of hierarchy. In other words, reconstitution with semblance to the source data stream can be recomposed in situ with the redacted sensitive items, misinformation, or other tags, tokens, and labels. Filters enable this multi-dimensional simultaneous hierarchical redaction and reconstitution into one, two, or many simultaneous data streams with controlled multi-level versions, or the exact reconstitution of the original data stream.

A 'sensitive' item is any type of bit pattern within any type of original data stream which is identified by the DigitalDoors processes and methods. A sensitive item can include characters, words, audio segments, image ranges, synchronization symbols, phrases, paragraphs, markers, structures, references, metadata, formats, indexes, tags, labels, tokens, URLs, embedded constructs, metadata, or pointers to external structures.

Where a sensitive item creates a dissonance in the functional flow or contextual meaning, the range for the sensitive item can be extended to include punctuation, markers, additional words, and linguistic or data processing formats to preclude inference to this sensitive item. A sensitive item is identified at any arbitrary level or simultaneous multiple levels of hierarchy, such as sensitivity level or levels, compartment or compartments, parts of speech, potential overlaps into various purposes, etc. Filters enable this multi-dimensional simultaneous hierarchical characterization of the item.

Substitution is used to replace the sensitive item in the original data stream.

The substitution is usually represented by a null set (that is, nothing) to preclude inference of the missing sensitive information. The substitution can also include a non-null set, represented by metadata tags, standard DOD labels, referential linkages, or placeholders sufficient to maintain functional computerized processing. Placeholders can include tokens, misinformation, or other hierarchical structures that are arbitrary or unlimited.

It is critically important to recognize that the fundamental 'replacement' for the sensitive item is out-of-band to the source data stream; in other words, the replacement is the null set but could be a hidden marker, visible marker, or tag presence. Such in-band replacement of the sensitive item with a 'token' is contingent only on conformance with needs to strictly maintain computerized or human activity workflow without disruption. Specifically, many operations necessitate a fixed-sized and precise field structure, column structure, or hierarchical organization and disruption with high-byte toggling, tokenized tagging, or alteration of the data stream with in-band substitutions will cause operations to crash.

The sensitive items are discarded, or dispersed in an unlimited number of local or remote storage locations. Items can be saved each within its own unitary streams (item-wise), or aggregated together. Aggregated streams o items can include all items of like sensitivity level or levels, compartment or compartments, parts of speech, or coordinated for a specific purpose or security requirement. In other words, a sensitive item might be stored as a single element, combined with others all conforming to a single sensitivity level, or combined into a hierarchy with a minimum and a maximum sensitivity level.

AA.1.12.0 Methodology Overview:

DigitalDoors is a methodology for creating and building intangible assets to create economic value. (Like trade secrets). In a global information war competitors try to find out what are your assets and your plans to build new assets. They are using all kinds of means: Trojans, aggregation of information, compromising insiders etc.

The multiple threats to information are so many and so overwhelming that the best option is to emulate the military strategy of tactical withdrawal when confronted by overwhelming forces. There is a need to protect the information in the information war and by using—scrubbing/redaction will deliver the military strategy of Tactical withdrawal/retreat.

When the environment is ready the retreating army regroups and counterattacks. The parallel in the information world is DD reconstruction of information extracts back into the documents/data streams. The ideal state is when all or most of the content in documents is withdrawn from the document, achieving a state of formlessness.

TABLE

Processing Stages at the Semantic Content Level - Paralleling Military Strategy:

1) Tactical withdrawal/organized retreat (scrubbing/redaction).
2) Dispersion - in different locations (storage stores)
3) Optional - Ambush - (Seeding disinformation)
4) Regrouping (reconstruction)
5) counterattack - (searching in storage locations and creating new information assets).

The retreat strategy has been discussed at length by Carl Von Clazowitz in his book on war. ("retreat to the inner part of the country").

It was practiced by the Mongols (Genghis Khan-Feigned retreat). All this is in granular content and must be operated automatically.

AA.1.13.0 A New IT Paradigm

The flood of different types of dangerous attacks on information call for a realization that there is a need for new world order in IT.

The first step which is needed is a realization that we are all overwhelmed by attacks, including Trojans, hackers, disgruntled employees, espionage etc.

We are pawns in a global information war and are attacked constantly and relentlessly. Every week that goes by we are suffering more drastic losses. We are losing peoples trust in our ability to hold their information securely and might be losing their business because of that.

Realizing that we are confronted by a war and that we are losing the battles we need to withdraw our important assets to a safe location regroup there and then continue our operations safely. Like in a battlefield we need to retreat to safe locations in order to regroup. By withdrawing our information assets we are preventing the attackers from seeing our assets and from damaging them. The sensitive information extracts need to be withdrawn to safe and hidden locations. The ideal method is to withdraw the extracts and transport them into a "cloud". The "cloud" consists of many servers and the sensitive extracts may be dispersed all over the cloud to achieve high level security.

The transport of sensitive granular extracts to the cloud allows operations of the organization continue and are not blocked and stopped as is the case with implementation of Data Leakage Prevention methods which block files with sensitive data from passing through the organizational firewall. Release of extracts from the cloud creates a "Data on Demand" reconstruction in which sensitive extracts will be reconstructed back into the data stream based on identity of the user and other possible criteria like his role, mission, location time etc. The more sensitive information is extracted and transferred to the cloud the more secure the file and the organization.

A healthy security state for an organization is the state in which its files are redacted/scrubbed and are in essence frames populated with skeleton content that allow continuation of operations.

The ideal security scenario for an organization is the state of formlessness where almost all of the information in a file is extracted and the result is a state of formless the form has evaporated. A withdrawal of sensitive extracts calls for a highly organized process. To achieve that every content element needs to be automatically or manually categorized, and inventoried. The categorization of all content elements in the file is the basic and beginning step. Following that extraction of sensitive elements takes place. The extraction can be done manually, automatically of a blend of both manual and automatic.

Automatic extraction is based on combination of different semantic filters.

AA.1.14.0 Taking Advantage of a Major Economic Imbalance

Society gives lip service to information being a valuable asset but in reality it is mostly considered valueless. As an example the Internet which contains many Billions of documents which are there for any taker for free. Another example is the current accounting methodologies do not value information as an asset on the balance sheet.

The lack of recognition of the value of information leads to:

1) Lack of inventorying of information assets in organizations (60%-85% of the data is unstructured)
2) The lack of information inventory precludes from using current information assets as economic assets as well as from building upon those information assets to create more assets. The current environment of valueless information assets precludes us from monetizing those assets. The bottom line is we are losing economically by not being able to inventory our existing assets, and not being able to monetize them.

The crucial imbalance in the basic recognition of information as valuable assets and thereafter an underutilization of such information assets is an economic flow and an unreasonable aberration. Understanding such an imbalance and taking advantage of it will lead to substantial economic gains.

Society for 20 years has focused on the perimeter on the tools storing and processing information and not on the substance it self: the information and the content. The focus on the computing and storage tools was spearheaded by vendors who have made hundreds of billions of dollars selling their products. Dealing with the content became the niche of only few small companies. The resulting situation is that 60%-to 85% of the information of organizations is unstructured, which means the information is un-inventoried and therefore mostly unusable.

In essence even with trillions of dollars of purchases of IT tools and capabilities over the past 2 decades most organizations can't access process and leverage between 60 to 85% of their information.

Organizations can't show Internal Rates of Return (IRR) on their information investments because they really never treated the information as an asset class on its own merit with an economic value. There was no inventory, therefore no value could have been attached to those assets and now there is nothing to show for.

AA.1.15.0 Monetizing the Organization's Information Assets:

To take full advantage of the major economic imbalance in information the following steps are proposed:

1) Inventorying the Information Assets

There is a need to establish an information inventorying process in the organization. The same way that retail stores or supermarkets inventory all their merchandise using barcodes, information assets throughout the organization must be inventoried. All information assets must be classified and tagged. This inventorying effort must cover, structured, unstructured and semi structured (e-mail) information.

2) Data Mining—Enlarging the Information Asset Base

After assets are accounted for in an inventory, organized efforts must be undertaken to enlarge the base of those assets that are important to the organization.

The subjects of importance will be inputted into a data-mining engine, which will search the Internet and other sources for relevant data assets.

3) Leveraging Automation and Legal Power—The Innovation Production Line

After relevant assets are located, they will be analyzed automatically and categorized into assets that are to be treated as trade secrets—(potential contacts, leads etc to be stored in data bases.) and ideas that are of important values and need to be secured by patent protection.

Innovative ideas will be processed automatically and inserted automatically into templates of Provisional patents. The provisional patents will be sent automatically by e-mail to the patent office with automated payment.

By inserting legal framework such as patents trademarks etc into the newly formed information products the value of the information product grows substantially. To maximize the value of the created information assets people should be involved in the process to twick the input the system receives for example inputting additional key words.

4) Leveraging Web Scalability—the Innovation Factory

To take full advantage of being early in the market to benefit from the big information imbalance, there is a need to leverage the scalability of the web. Specifically to leverage the new social graphs capabilities.

Combining an automatic information assets production line with interaction of many people across the web to fine tune the production process will create a powerful combination—bringing an automated information creation process with the innovative input of many people.

5) Monetization

As the organization creates information products, the organization can sell such products to partners as well as to the public over the web.

Proposed model is using DigitalDoors controlled release process to sell parts of the created assets over the Internet. For example releasing first part for free the other parts for payment.

AA.1.16.0 Information Disassembly and Reassembly

AA.1.16.1 Disassemblying Information

Anyone can easily encrypt, shred, delete, or destroy information so that it no longer retains utility. However, DigitalDoors takes information apart, specifically information represented by any arbitrary data stream, removing any utility, so that it can be reassembled for later use. Information is selected in various ways, selections containing a paragraph, sentence, line, word, or character, and are extracted from the data stream.

When information is taken apart, the message is changed, obscured, broken, and the entropy of the parts is increased. Entropy is the solution to government-sponsored terrorism, criminal-initiated attacks for financial gain, or preserving the economic stability of entire sectors or even nations. This creates a flexible, enduring, and inherently independent security method. This information disassembly is consistent with the need to implement privacy, confidentiality, resilience, continuity, and survivability in the ecosystem of previously inconsistent goals of mutual security, information sharing, and knowledge discovery.

Information reassembly ranges from zero to full reconstitution in minute rheostat degrees under granular control. In other words, you can get none, some little, some more, or all of the data stream back. Information is encoded with one or more systems of labels and tags or classifications DigitalDoors supports a system of arbitrary, unlimited, overlapping tags so that preplanned, far-ranging, or multipurpose utility is supported, and a utility that is not preconditioned on information source, intended usage, or the application of increasingly sophisticated knowledge management tools that can rework or expose information secured under existing systems.

Tagging is supported both as in-channel codes, a metadata, and out-of-channel markup. The out-of-channel is the preferred method because of its enhance security and lack of additional information for inference. Granular control means that arbitrary systems of user access control can be applied to the rheostat. Granular control includes sensitivity level, compartment, word or phrase categorization, role, group membership, syntactical element, mission, location, time of day, payment or trade, and other tags or labels.

Realize that tags condense and synopsize data streams, usually within a cultural context, and tags represent a denser risk than the initial content. Separation of content, randomization of context, and limited connection to tags are important security features.

Why disassemble information? DigitalDoors does this to enable security, privacy, confidentiality, functionality, survivability, and compliance, among other reasons.

AA.1.16.2 The Reasons for Disassembly

Security establishes a state of freedom from danger, harm, or risk of loss.

Privacy is instituted by a method, desire, or process to maintain personal, business, or corporate identity without releasing it to others.

Confidentiality is an expectation and workflow process that ensures that the content of a transmitted message cannot be determined except by the possessor of a key associated with the message, even if the transmitted bits are observed.

Survivability means that dispersed information can be regrouped to reconstitute the whole.

Compliance means that the technology fulfills the legal or organizational requirements to protect and retain confidentiality of data and process protection.

Information generally exists within a structure dictated by purpose or the software tool used to create, collate, organize, store, distribute, or share it. The structure can be a document format, a file format, a database table or many associated tables, a Microsoft Word document, or an explicit structure (such as a TIF image format).

More often than not the structure is a metadata hierarchy. All of these structures, whether defined internally or externally or by the application, are ultimately a purpose-specific implementation of metadata. Even where these structures are buried within a code library or specific instructions that shave off pieces of information from an application data file, every organization of any data stream can be converted and represented by a metadata definition, and, is ultimately a metadata hierarchy.

A metadata hierarchy is a security, privacy, and confidentiality risk combined with but also apart from the data stream. The problem is that metadata is an all-purpose file structure until itself that also defines data streams within, redefines purpose and usage of imbedded data streams, and supports the inclusion of functionality. Metadata is so flexible and generic that infinite layers of purported but obscured utility can mask, distort, or hide data within. Often, the metadata hides more information and risk than the expected data stream within. Metadata in any form, whether data, application, or mixed from both provides powerful clues that enable aggregation, inference, and interaction undermining traditional security methods.

DigitalDoors removes this metadata and creates raw data streams in primitive forms that can be secured. DigitalDoors can secure the data stream and reintroduce the metadata. However, reintroducing metadata restores the risk from the metadata, maybe not the same metadata, but enough that recreates measurable and significant security risk. However, disassembling the data stream specifically and reconstituting the information as needed enables a wide range of security, and depending on the substitution techniques applied, also maintains the consistency and functionality of the data for most information processing operations.

Note that some structured financial data can be secured in this manner—although the need to maintain posting, trial balances, and consistency between accounts and roll-ups complicates—but does not preclude—the process of creating secured but working data streams through selective data extraction and granular content control.

AA.1.16.3 Finding Value within Information

Value of information is found in the data stream and through its meaning, utility, and purpose. Value is tied to paragraphs, sentences, phrases, words, or characters. However, value is also greater than the sum of the parts, so that aggregation, inference, and interaction both internally and with additional external data sources represents an important security consideration. Value is modified by encoding method and can be covertly enhanced by the encoding method or metadata structure. Every computer file exists in storage in a linear representation of "0s" and "1's" that ultimately is organized or clumped into units of meaning.

The data stream is an information flow with a starting point and a length. It does not matter how it is encoded or how the data stream represents information. Text, text in any language, text defined by words or larger units of paragraphs, numbers, names, words, images, sound, video, signals, data sets, and so forth are all represented by a data stream. One of the key benefits of the DigitalDoors technology is the recognition of risk in units far less monolithic than an entire document or document package. Granularity is achievable at word, character, symbol, or image bit levels. As such, security can be effected so that the choice is not whether to distribute a document or not, but what parts of the document can be distributed to what sensitivity levels, to which users, and under what controls. Documents do not have to be rewritten, ghosted, or endlessly tear lined but can be automatically processed once and distributed in Secured form or granular reconstituted streams at any time now or in the future. Recallable granular content control overcomes the time element to existing security paradigms; so in effect you can "put the cat back into the bag."

DigitalDoors support uncontrolled secondary or tertiary distribution without fear of compromise in sources, methods, security, or repurposing.

DigitalDoors applies automatic methods, white lists, gray lists, black lists, complex Boolean and placement associations, symbol recognition, categorization to value selection and subsequent information extraction. These lists (actually database entries) need only be consistent with the type of data stream, the language, and the encoding methods. An organization can create multiple databases for different languages, for example, and apply one, some, or many. Database entries to match sound, images, or video overlay apply just the same way as text, although sub-message element selection is specific to channel, encoding, or fuzzy matches in terms of non-linear placement. This is pertinent to mixed media, as in sounds or images.

It is important to recognize that selection is multitasking, supporting manual, assisted, and automatic features, supporting any order of use or reuse, with manual editing and removal of any and all selections at any time with reapplication of any of the manual, assisted, or automatic methods again. Note, however, that COMSEC recognition finalizes selection that cannot be overridden, for obvious reasons of enforcement. However, new selection methods (not currently imagined) can added into DigitalDoors to augment or enhance the recognition of aggregation, inference, and interaction.

AA1.16.4 The Doctrine Behind DigitalDoors

As explained, finding information in a data stream is necessary and, independent from the DigitalDoors process. DigitalDoors applies automatic methods, white lists, gray lists, black lists, complex Boolean and placement associations, categorization, manual user selection, manual overrides, and can included other methods as they are developed and proven effective. However, after selection takes places, all of these selections must be reconciled for overlap and conflict. We do this by analyzing selections in a table.

All selections are defined by a starting offset and an ending offset. This technology is consistent for all types of data streams and encoding methods. Extracting the selections is not always simple or straightforward because excising the information is contingent on foolproof reconstitution and the application or MilSpec security techniques embodied by the Bell-Lapadula Model (BLM), Saltzer & Schroeder's Principles of Secure Design, and others.

It is a significant complication applicable to the architecture of security ecosystem design for the military or for business. DigitalDoors stores selections that are extracted in one, many, or distributed locations. Reconstitution can occur in steps (like defenses-in-depth), up to a predefined sensitivity level, or to full reconstitution. Because of this, starting and ending offsets as defined by the selection process, change as a function of selection priorities and positional precedence. Selections are not independent until DigitalDoors extracts them and creates a recovery file. Selection dispersion creates data independence by virtue of contextual dissociation; this can be further enhanced uniform data stores by creating random chaff. In other words, the position of all selections is a complex simultaneous choreography that depends on the selection and categorization of all prior selections.

For example, selection priorities and positional precedence becomes important when extracting selections to create directory, recovery, and secured files. This can be a complicate multi-path choreographed hierarchy for conformance to cross-domain MLS information sharing ecosystems. Specifically, certain security and versioning options requires a multithreaded pass first ordered by position (starting to ending) with each sensitivity level (starting to ending) for the recovery files to conform with BLM. Then certain security and versioning options requires a second multithreaded pass ordered only by position (high to low) to create the secured files since each subsequent selection is dependent on the (missing) positions of any and all prior selections.

For example, consider this well-known 35 letter pangram (e.g. holoalphabetic sentence uses every letter of the alphabet at least once).

TABLE

Hologralphabetic Sentence

| 1 | 5 | 11 | 17 | 20 | 27 | 32 | 35 | 40 |
|---|---|----|----|----|----|----|----|----|

The quick brown fox jumped over the lazy dog.
[S] quick
[C] brown
[TS] fox
[S] dog
and by default the unselected remainder is [U] The jumped over the lazy.

Sensitivity level: [U]<[C]<[S]<[TS] and defines the necessary order of reconstitution.

brown is removed first and coded at position 5 to reflect positional dependency on quick quick is removed next and coded at position 5 without any positional dependency.

dog is removed next and coded at position 37 to reflect positional dependency on fox.

fox is coded and removed last and coded at position 17 because it is conditionally independent of all three other extractions.

On reconstitution, "brown" is inserted into the 5th position to yield The brown jumped over the lazy.

On reconstitution, "quick" is inserted into the 5th position to yield The quick brown jumped over the lazy.

On reconstitution, "dog" is inserted into the 37th position to yield The quick brown jumped over the lazy dog.

Reconstruction is dependent too. The position of all selections is a complex simultaneous choreography that depends on the selection and categorization of all prior selections.

This explains the dispersion variants and various levels of available conformance to BLM. Full support for all possible failures and complications is just not possible as this is N! problem. As a result, some variants provide survivability with full recovery or only partial recovery with a full security breach. There costs, speeds, and overheads fully reflect the level of service provided.

On reconstitution, "fox" is inserted into the 17th position to yield The quick brown fox jumped over the lazy dog. Its placement is contingent on the positional dependency of the three lower sensitivity level selections, but its displacement is unchanged because all precedence conditions have been previously met.

Linguistic syntax and inference issues plays into the automated selection and extraction of information. Names, locations, compound terms, data formats, common cultural phrases, aphorisms, white space, punctuation, numbers, quotations, parentheses, modifiers to nouns and verbs, and other constructs need to be excised in most cases so as not to leave a telltale gap in the Secured file. For this reason, substitution without any form of placeholders is advisable and careful removal of indications of special data formats is also indicated. For example, the removal of numbers within "05/06/23" into the substitutions "/ /" or "//" is very obvious and informative. Removal of the entire syntactical expression is indicated.

For example, the removal from "former president William Jefferson Clinton" leaving only "former president William" provides useful re-identification clues in that there are only a limited number of former presidents, few have the first name "William", and fewer still fall within a recent time period warranting security by partial selection and extraction of information. Inference requires assessment of selection by the full phrase, an entire line, an entire sentence, an entire paragraph. It is a complicated assessment of additional information within the data stream that refers to the sensitive item and exactly how it and all references need to be excised. As previously stated, information value is not specifically internalized because other internal content, external data sources, a priore knowledge, context, and concepts are useful for establishing aggregation, inference, and data-to-data interaction. In addition, usage, intent of secret protection, distribution, and secondary information sharing policies all dictate the actual scope of selection, selection categorization and sensitivity level encoding, and the granular control allowed in reconstitution.

AA.1.16.5 Reconstituting Information

At this point, information meets with policy, security law, governance issues, and compliance rules. Other existing security technology can provide similar results by tear lining and encrypting the streams; however, information is locked up and generally accessible only through a primitive filter that offers only the choice of all or nothing. This is also true of indexes and catalogs, which like tags, represent a condensation and synopsis of the original content. Instead, DigitalDoors provides functional Secured files and additionally granular content control for getting more of that information out to people and processes. Reconstituting files with granular content control means data dispersal and information sharing is not an either/or scenario because specific reconstitution(s) of information can be delivered as needed to one or many different user, groups, parties, or processes.

Reconstitution is not a monolithic process, nor does it happen in exactly the same way for all dispersion locations and methods. Different dispersion methods utilize different storage locations and different reassembly protocols. Specifically, the DigitalDoors patents define several methods all utilized by the Secure/View DigitalDoors applications. Directory files (the map) details source information, recovery file locations, Secured file locations, and key file locations. The directory is optional and can be rolled up into recovery files. Note that various encryption options can be applied granularly to directory, recovery, secured, and key files, such that some or all are encrypted, encrypted with a one time pad for each file or each separate recovery selection line item, or encrypted through access to a public key infrastructure.

Security is herein rendered by reduction in metadata, format, encoding, and complexity. The information is dispersed, contexts are broken, and entropy is increased; this creates security. DigitalDoors does not affect security by methods presumed to be secure because they are proprietary, concealed, or obscured. The explanation for why this works can be found in the Third Law of Thermodynamics and the mathematics are completely consistent with statistical methods. Saltzer & Schroeder's Principles of Secure Design define an economy of design, failsafe defaults, complete mediation, open design, separation of privilege, and least privilege. The simplest mechanism to Secure and reconstitute the data streams, and simple enough so that everybody can understand the process. This explains the removal of metadata and formatting creating the simplest data stream that can be openly secures at all sensitivity levels and other dimensions of categorization.

Note that the reconstitution order proceeds from lowest sensitivity level to highest, from lowest compartment to highest, and so forth because access to higher levels is presumed to be progressively limited and the reconstitution of higher sensitivity level elements depend on the prior placement of the lower level elements. This is a functional necessity of the previously defined multithreaded extraction process. Also note implementation minimizes the amount of the recovery metadata necessary to reconstitute a Secured data stream. It is possible to define recovery information through indexing, hashing, and positional designations more complicated than positional offset but only through the creation of more metadata compromising basic security that is the fundamental goal of DigitalDoors technology, complexity and slow speed of process, and the creation of new avenues of inference, aggregation, and interaction.

Security is effected herein by the destruction of context, the rendering of inferential clues, and dispersion of essential selections thereby leaving a redacted data stream that can be delivered as is or reversibly reconstituted under progressive granular control until it fulfills processing, sharing, or knowledge exploration needs.

A document can be redacted to a secure state and the recovery image of the extractions is created in situ as a reconstitution overlay, sort of like a positive/negative photograph. Extractions can be defined for each sensitivity level, compartment, mission, group, et cetera, and aggregated together to form one or more recovery files for each or every mix of granular specification.

A document can be redacted to a secure state and the recovery image of the extractions are created separately as line items within a flat ASCII recovery files. Extractions can be defined for each sensitivity level, compartment mission, group, et cetera, and aggregated together to form one or more recovery files for each or every mix of granular specification. The recovery file details for each extraction, its category, its starting location, its ending location, its length, any replacement length for in situ substitutions (even if only one-for-one spaces), and the actual extraction. Note that variants on the format of the recovery file support overboard dispersion with separate encryption for each extraction applying unique keys for each. Details of the recovery variants are defined elsewhere. Recovery files can be stored locally or dispersed to MLS-compliant storage facilities.

A document can be redacted to different secured states (that is, versions) defined by each sensitivity level, compartment, mission, group, et cetera, with recovery data rolled up for recovery for each sensitivity level, compartment mission, group, et cetera. Rolled up recovery files contain line items up to and including sensitivity levels for each designated dispersed remote storage.

A document can be redacted to different secured states (that is, versions) defined by each sensitivity level, compartment, mission, group, et cetera, with recovery data dispersed to separate and unique storage for each line item. Note that the dispersion of line item extractions obstructs the basic intrinsic context to the Secured file while increasing the randomness (and quite literally the corresponding entropy within each package of directory, recovery, secured, and key file sets) and lack of context for each of the dispersed extractions.

The above outlined dispersion and recovery methods fulfill different functional and security requirements. The differing dispersion and recovery methods make tradeoffs in terms of reconstitution overhead, complexity, and processing with redundancy and accessibility to that offset the risks from aggregation, inference, and interaction. Although DigitalDoors enables security with functionality rather than as a linear tradeoff between the two, DigitalDoors dispersion methods engender a different tradeoff with reconstitution reliability. It is not a costless tradeoff, but it is a necessary one if you must enable a data stream security ecosystem within an open and functional network infrastructure lacking hardened perimeters.

AA.1.16.6 Directory Files

Directory files contain map information to recovery files and represent a physical and logical displacement to secured sensitive information in recovery files. This enables additional opportunities for granular security and privacy in conjunction with information sharing and knowledge discovery. The information is dispersed, contexts are broken, and entropy is increased; this creates security. You can envision this process like that of a railroad switching yard containing many uniform boxcars with different content. By dispersing content, the context and utility of the sensitive information is broken with respect to the source and the aggregation of randomized extractions adds to the implementation of security through the $4^{th}$ law of thermodynamics. When directory files do not exist for a given redacted data source, the View applet seeks recovery files directly in anticipation of rolled up recovery files in any of the supported optional formats, accessible dispersion locations, and encryption or key management controls.

AA.1.16.7 A Compound Data Stream that can be Stripped into Granular Items

It is all about data. Data is the content qualified by a context and concept. Everything else is just proxy. Existing solutions are complex workarounds in the face of a unifying data theory within security ecosystem. A number of conceptual problems disappear with the simplification of workflow and communications into the storage, manipulation, and delivery of data. With this emphasis shifted to a data-centric view, we can successfully search, secure, and share with categorization, and better exploit information processing and communication workflow. The consequence of a simplified view is a simplified security environment not based on point solutions but that actually works as an ecosystem.

The complexity of information processing and communications, infrastructure, security, and data structure evolution have driven wedges into information technology workflow. As a result, divergent insular solutions and the enforced separation of process and storage exacerbate the differences rather than lead to simplicity and integration. Insular solutions require additional effort not only to resolve the problems discretely for each area but also to create temporary bridges between areas, an effort disproportionate to the requirements. It is also counterproductive when false positives and negatives require frequent user override responses or when the point solutions preclude or corrupt workflow. This impasse is most evident with air-gapped legacy production facilities and the complex integration of distributed workflow. Additionally, insular solutions and bridges sow conflict, adding complexity to disrupt the workflow within each area or among them. Although vendors are integrating routers, guards, IDS, IPS, viral scanners into suites or unifying products, this approach addresses the proxy activity rather than the data itself, the fundamental basis for and result from activity.

Furthermore, virtualization and the distribution of storage, processing, and communications to the edge are showing that workflow and application processing are potentially independent but interrelated. Code is just a metadata package. In effect, job control code, macros, applets, and entire applications are structures that can be distributed and run almost anywhere. These structures are data, or metadata, and are delivered like any traditional data set. SOA and SaaS insinuate the viability of this theory. Any differences between a traditional notion of data and the application as data is summarized by the different methods used to collect, collate, distribute, and present them, but not at all in the data structure.

AA.1.16.8. Data Unification

Throughout this discussion, data is defined as any data stream regardless of internal format, purpose, intent, or structure. A data file is data. A document from Word is data (with imbedded metadata). An email message traversing a communications channel is data. An application stored on local disk or invoked from a web-interface is a file and is also data. Anything that can be represented within a metadata structure is data even if it is all application code or contains macros with event-driven code. This paper asserts that applications are nothing more than data asserted as a code invoked through a process (like a CPU). It is a delivery and processing workflow. Applications become nothing more that destinations; rather than delivering data to storage, the data is delivered to the workflow.

This last assertion disconcerts some people who want to think that an application is a special set of instructions but overlook that it has structure and also because it often includes imbedded data is thus different entirely from a data store. The difference is purely contextual or conceptual, but the content is nevertheless the content of some data stream. Data acquisition, production, parsing, formatting, presentation, interpretation, categorization, and purpose are different between a pure data set and an application code, but this is also true between different data sets. Consider the difference between an MS Word document and an MS Access data set, but both are considered unstructured data streams.

Distinctions are completely contextual and predicated on what acts on the data sets, parts of the data sets, or how they are transformed for new and different purposes.

Is there a difference between an application and the data set? Of course there is, but differences are arbitrary based on usage and purpose. The difference exists mostly due to the historical development paths apparent within information technology. Most people are not likely to distinguish a difference, although support developers and architects will. But even developers and architects are users too most of the time, and these arbitrary and imposed differences become less consequential. Consider: A difference between a zip file and a self-executing zip archive? A difference between a document file, an Acrobat file, and an Acrobat file with a built-in e-book reader? A difference between an application and a data set, a portable database application and the data set, and an application bound to the data set? Each can represent the same purpose, be repackaged in different ways, and be invoked in different ways—implicitly or explicitly, or by the file type assignments in the desktop—but desktop shortcuts mask such differences to the user.

All represent complex structures containing a traditional data core. Maps define execution entry points, module jump entry points, loaders and triggers for interspatial macros, and formats for parameter passing between functions. The map is (usually) a simple schema.

Consider that applications are specialized streams of data stored as a file. The structure includes a loader, the application, data space, buffer space, and increasingly the support for a digital signature validation of integrity. Malware insinuates itself inside the application file directly or as a jump vector to another file stored in memory or long-term storage. Although most data files preclude operative insertion of malware because it will force failure or be a visible attack, hierarchical and DOM data files can hide and execute malware through the built-in triggers. This malware lies dormant awaiting the specific activating trigger. Even when malware corruption is actually visible and obvious or violates the properties and attributes that are used to validate a data range, discovery is unlikely unless the actual data range is viewed or tested against acceptable properties and attributes.

Many workflows invoke the properties and attributes only at specific steps, for example, as a format immediately prior to presentation or after data is presented and altered by the user or process. Alternative steps can and do violate that intent, and this potential grows as data and applications are increasingly abstracted as hierarchical metadata and multi-purpose document object models (DOM).

Hierarchical and DOM data files frequently include links, references, macros, applets, helper tools, or even extensive applications. While it is equally correct to assert that data files are becoming applications as it is to assert that applications are specialized data files, this paper demonstrates that is more useful and unifying to view everything as a data structure. In one sense, an application turned inside out is a data set with the application inclusion. Although the usage emphasis is on the application functionality rather than data content, the application is really nothing more than, and usefully visualized as, a compound inclusion within a data structure. Data complexity ranges from the simplest form to the hierarchical tree with imbedded compound inclusions, each of which can itself be a hierarchical tree with imbedded compound inclusions.

The most complex data structure we know about is DNA that includes some 4 billion combinations of UCAG amino acid types. Although DNA is clearly a data stream, it is a convoluted tree with hierarchical structures, external references, and imbedded compound inclusions. These imbedded compound inclusions are expressed as RNA chemical factories which create more complex amino acids and other precursors to life or even life itself. Aggregations and combinations of different parts of the same DNA chain or even external DNA, prions, proteins, free fragments of DNA or RNA, and other molecules with chemically-receptive sites for bonding to the UCAG pairs or the RNA receptors create new data, new triggers and events, and even new life forms. Other DigitalDoors white papers expand on the issue of DNA and RNA, MS Office metadata files, and the various document object models. The point herein is that DNA is primarily a data structure that is parsed and activated to initiate macros, applets, and full-scale applications.

This section defines data structures from the simplest to the most complex. Data structures include the simplest representation of data, such a single item. An item is represented by a range of granularity and purpose; it can be a value, an add and, a subtract and, a multiplier, a base, a numerator, a denominator, a single fact, and a DigitalDoors granular content item. Containment of even that simplest of items is dependent on format, structure, purpose, infrastructure, and representation. The item could be the DNA UCAG or a compound UCAG-encoded molecule. More complex data formats include field-oriented data, such as a document with multiple position-oriented items. Padding, such as found in compound molecules, create the infrastructure to support these key items or bonding receptors. This document might be an e-mail message or a stripped announcement of a transaction, including a buyer, a seller, a product, a price, an extent; in other words, a line item transaction. The padding provides simple format or demarcation field control or more complex mixed-purpose usage for process functionality and also human readability. Field-oriented data formats support the transition to tagged data as seen with human-readable data files, application and system configuration files, or the MS Windows directory hive.

Tagged data transitions to row-oriented data transactions where the patterns among the records are repetitive with columns represent distinct fields.

These include sucrose, glucose, fructose and other energy sources for RNA process functionality. Although each sugar is different, the format is significantly similar. In the same way, row-oriented records provide the fodder for simple computerized processes.

Row-oriented data can include serialized or multiple complex indices (indexes).

Indices have multiple purposes both in terms of processing for assessment and interpretation for display. Indices are special items that provide context through association. When indexes become more complicated, they form the basis for locating information or establishing references between data within a structured database, either relational or object-oriented tables. The structure for the rows, the relationships between indexes and items, and other relationships are described by an implicit or explicit schema. The schema is an internal or a separate externalized skeleton that supports the data structure. The issue of internalized or externalized schema, that is the application of structure and categorization, is purely an efficiency, reuse, and packaging issue. This is an another arbitrary complexity that is not needed for a data-centric model and the ensuing unifying security ecosystem.

The schema also defines the format and representation of items in terms of encoding, presentation, interpretation, and structure. For example, data can be encoded as binary, bits, decimal, ASCII, encryption, compression, or have meaningful utility only when used correctly. Binary large object (BLOB) fields can retain application code (source or machine code), sound, images, large documents, or other arbitrary data. The meaning for all of these BLOB fields is dependent on purpose, usage, format, structure, and intent. Consider executing a sound file or trying to hear an image.

When the schema is externalized or internalized as embedded tags and metatags within the data stream, the complexity of the data stream can increase. Hierarchical structures defined by a root node and branches form the basis for the DOM used by most modern desktop applications, such as the MS Office family. Not only does it support rich text formation, graphic layout, it also allows for unlimited complexity. The branches support items of any type, inclusions of any type, tags that define content, context and concept, establish links and references, or support compound macros, applets, filters, and code.

When the schema is referenced to an external template file, as with HTML or XML, the context is defined externally. When such schemas are self-documenting with tags, metatags, metadata, and the fractal-like self-similarity of nodes, the context is internally defined. However, associations to new schemas, (imposition of a new style sheet, for example), combinations with data from other sources, can alter the interpretation of the content, how it is contextual applied, and support new concepts not obvious or overtly seen. This is the basis not only for data mining and search, but also for DigitalDoors-based security methods. Hierarchical files with both internal and external schemas pose new problems in terms of aggregation, inference, and data-to-data interaction, and this redraws the map of data content, context, and concept. Tags, metatags, metadata, comments, links, references, and imbedded code can be combined with intent improvised to disrupt, damage, or combine into new usage in conflict with anticipated point-security solutions.

Output from applications or complex SOA workflow are usually in the form of messages, code modules, reports, or human-usable triggers. These are also data streams in one format or another, but nevertheless still a data stream. Delivery of large hierarchical data is not different from the delivery of DNA. The execution of code within the data is not different from the expression of RNA. The paradigm shift is from viewing applications as a collection of methods and events to that of a compound data file with methods and events imbedded within.

When you accept this theory as to the predominance of data, you are well into your journey of the unifying data theory. Compound data is not useful until is parsed and applied per context correctly. For example, we previously asked what would happen if a sound file were executed or an audio stream viewed as a graphic. This is a process failure or disease situation. Therefore, we need to filter and apply each item by type. The process is best described as separating content from context from concept and dissecting compound formats into items, content into items, all of which are addressable by granular content control.

AA.1.16.9 Conclusion

The complexity of information processing and communications, infrastructure, security, and data structure evolution have driven wedges into computerized workflow. As a result, divergent insular solutions and the enforce separation of process and storage exacerbate the differences rather than lead to simplicity and integration. Insular solutions require additional effort not only to resolve the problems discretely for each area but also to create temporary bridges between areas, an effort disproportionate to the requirements.

The primary benefit of unifying data is to see data as a compound stream that can be stripped into items. First, we can find information and apply it as intended or explore for new information. Second, we can assign tags to each item for security purposes. Third, we can determine what items to share and how to distribute the items in whole or in part, and within a generic data stream, application, document, or a structural context. The consequence of a simplified data view is a simplified security environment that is not based on point solutions but that actually works as an ecosystem. This supports a unified infrastructure based on categorization that enhances search, security, and sharing, but even more than that, it provides the same consistent, simplified, and functional basis for search, security, and sharing.

Why DigitalDoors security? What you are trying to protect. Is it the infrastructure, the communication channel, the application, the engine running the application, or the data? Today, we are trying to protect all of them at the same time with macro processes generally at the perimeter, with conflicting tools, and succeeding at very little. It is becoming increasingly expensive, time consuming, and disruptive within the current paradigm to impose security—frequently counterproductively in terms of cost and degraded results. Instead, we need to recognize the convergence of application code and data, recognize that context and concept are the points of separation, and that security must be applied at the smallest discernable units. This explains the suitability for DigitalDoors granular content control.

AA.1.17.0 A New Information Security Paradigm: Neutralize the Loss of Perimeter

The existing shortfall in information security is indication of the amount of playing catch up now required. Information technology has always been driven by results in terms of accuracy, features, functionality, return on investment, and enabling wholly new business opportunities; security has always been the laggard afterthought. The current security metaphor pits functionality (or efficiency) in conflict to security, thus security is set at some practical level so that losses in functionality are tolerated to support security goals.

The desired balance between functionality and security changes with the perception of security threat levels. It is a lousy Hobbesian choice; a bad metaphor based on a flawed view of perimeter-based or point solution security, which is an evolutionary dead end.

Security goals usually lack formal definition, whereas products and services are tangible. Output is definable, the process is blueprinted, but where is security as an input, as an output, or as some multiplier effect on a production model. Security needs definition, perhaps as the ability to protect the resources and process that generates economic wealth within a production model.

It is all a matter of the paradigm you see. Security should not be a balancing act but rather a fundamental design parameter in information technology data and process. If you see security as elemental control, you see functionality as the enabler of security rather than a conflict. If you see security as a perimeter control, you see security as a stumbling block for functionality. This later view is the prevailing paradigm. Security is a stepchild to information technology rather than an amalgamated component for advanced functionality. In fact, effective element-wise security enables information sharing, multi-level access control, redistribution, controlled released and recovery options that can create totally new products and entirely business markets and models. DigitalDoors is doing all that now. It is all a matter of the paradigm.

Recent high-profile failures in security, such as misuse of critical information, identity theft, and leakage of government secrets, the Sep. 11, 2001 terrorist attacks, and the addition of new privacy directives and patriotic legislation have put the need for information security forefront. It is not that information has been unimportant and suddenly now is important; rather, there are limited methods and technologies for implementing information technologies that actually work. They work to a point and do not seem to be extensible to new situations or work beyond the borders for which they were invented.

Ad hoc efforts, band-aid policies, and application of best practices that aren't very good at all frankly reflect the really bad state of the art. Security as a step-child to functionality is a complex problem for governments, banks, brokerages, insurance companies, and many other fundamental human organizations that need to be revisited with new metaphors and a better paradigm.

Existing security technologies fall into three categories. They comprise access controls, encryption, and data or process filters. Access controls are based on usernames and passwords, or biometrics to a lesser degree. Encryption rebundles data into an impenetrable box opened only with an ungainly key management system that creates more problems than it addresses. Filters include virus protection, firewalls, and intrusion detection systems that search for known attack patterns at the periphery or once beyond that perimeter. All these systems represent a perimeter fortress mentality encircling the systems and data. It is a primitive burglar alarm that does not preclude inside thefts, accidental or incidental damage, or prevent destruction once the perimeter has been breached.

Any little hole or minor access is sufficient to provide full exposure with sufficient time, effort, and ingenuity. For this reason, top secret government data and processes are segregated completely with air gaps from networks and external workflows. Of course, insiders like Hansen and Walker show the fallacy in the presumed effectiveness of such air-gap security methods. In fact, there is a common maxim that once the perimeter is breached, the soft underbelly is fully exposed, and the perimeter furthermore focuses the attack within to promote additional damage.

Sophisticated burglar alarms are augmented with internal sensors and content control. In fact, you see this with motion detectors, infrared heat sensors, glass-break detectors, and internal video and sound monitoring. Information security is developing ways to monitor internal processes and data access in a similar way. It actually makes sense, and is technological feasible to a point. However, cameras within the perimeter actually provide a venue for exploitation. Imagine have your built-in laptop camera showing the user, the user's location, other associates, and capturing the screen.

Advancing this burglar alarm concept further, museums understand the value of identifiable objects and alarm these objects to detect if they are moved or taken. Perimeter security has its place as a necessary first line of defense, but even for a museum, the perimeter is not invulnerable and not effective against an inside attack. Element-wise security a more sophisticated security system in that specific objects of value are designated as valuable and controlled individually. This is analogous for how data and process in information technology should advance. The information security paradigm requires the protection of individual data elements rather than a site-oriented perimeter access control.

There is unfortunately a great deal of difference between museum objects of value and data and process, and the corresponding methods of security. This paper details five major areas of logical discrimination. These are first, the logical similarity between data and process; second, the scale of data security dwarfs physical object security; third, data formats are becoming very complex; fourth, data elements combine to complicate security and privacy; and fifth, and information technology is perniciously imbedded and intrinsically networked and cross-linked within workflows.

First, recognize that there is no difference in information processing between data and process. The process is series of steps that have been codified and represented in a data format. Therefore, a process is data. Worldwide, there are legal protections for process in terms of patent, trade secret, and copyright laws, although the emphasis is given to protecting new ideas rather than implemented concepts. This represents a serious shortfall that eventually will have to be addressed by new laws. Data on the other hand has limited protections. It can be protected by trade secret or copyright, but courts have limited the protections for structured and organized data gathered and owned by a custodian. However, the European Union has led the way in protecting individuals from misuse of such custodial data. In spite of this forward legislation, we need many new laws to protect data held by custodians and preserve the rights of ownership for personal data. This is especially important when process is perceived as data.

Second, control over an object of value is very different from the control over data. Damage, theft, or the reproduction of an object of value is obvious and limited to a single instance. Damage, theft, reproduction, or redistribution of data is not so obvious, particularly when data is replicated in multiple instances or dispersed as part of workflows. In addition, data is damaged just by exposure of that data, not so art in a museum, which is displayed expressly to be exposed. Exposure of data represents a new security threat, one of which you are undoubtedly well aware. The problem is that barrier-based security does not protect data from exposure for the previously outlined reasons and internal monitoring of process does not preclude digital reproduction, replication, or redistribution.

Furthermore, although a museum might have thousands of valuable objects, it is a discrete and controllable collection. Data on the other hand represents millions, billions, trillions, or more discrete collection of elements. This data security problem is neither discrete nor controllable in any human scale. This is a complex problem for governments, banks, brokerages, insurance companies, and many other fundamental human organizations, and the bigger the organization and its processes, the greater the risk for exposure.

Third, data is changing from simple and primitive structures into compound hierarchical objects. You might have heard about metadata, and that is but only part of risk. If you haven't heard about object models, metadata, and hierarchical object structures, get with the program and learn about it quickly. The risk from objectified data structures is enormous and growing, albeit totally hidden from the security audit; it is solely at this point an architect and programmer issue. You already use object models if you use any application such as a database, a graphical editor, or any word processing program.

For example, a Microsoft Word document is 75% metadata. That means that each document contains 25% of what you have actually typed but mostly things you would not believe when you review security risks. Since the data storage structure is partially unreadable binary, metadata is hidden. Some metadata is displayed from the file property pages; this probably includes your name, your organization's name, but the stuff that is not visible is a security nightmare. The name of everyone internal to the organization that proofed that document, and anything and everything you think you deleted from the document is still there. Metadata is only a part of the problem.

Consider also the external links, the metadata processes that are part of every Word document, the document blueprints, and the potential for embedded sounds, graphics, spreadsheets, and other data from other sources. The security risk is no longer discrete and part of any human scale. This is only for a Word document. There are far more complicated objects models and complications from data linked through the Internet and complex network workflows. Every imbedded applet has the potential to be useful but also contain a Trojan Horse or destructive worm. Object models were developed for feature-rich applications and to enable accuracy, return on investment, and enabling wholly new business opportunities—remember that line?—but nonetheless are paradoxical to information security.

Fourth, we think of information security in terms of discrete units. For example, this might include a name, a social security number, or other elements that define an individual or overtly undermine security and personal privacy. We talked about the protection of discrete elements above and the failure of human scale in data protection. However, the problem is more egregious than the simple math of the number of discrete data elements. Realize that individual data elements are not only valuable individually but are even more valuable when combined with other such discrete elements. The sum of the whole is far greater than the sum of the discrete elements. For example, consider how a loan officer could correctly red-line your mortgage or make a business risk decision based on your blood type, your three-digit zip code zone, and your marital status without any other discrete personal information such as social security number, income level, or credit history.

There are at least three intersecting mathematical technologies you will hear more about in the future as part of any sophisticated consideration of data security and personal privacy. These are Set Theory, Polling, and Bayesian Inference. These mathematical technologies are not based on elementary sciences and thus seem like magic to most rational people. However, we take their results for granted everyday in election forecasting, weather predictions, that computer chips work, material management, and transportation logistics. Society would slow and stop without these statistical sciences. The bottom line is that these technologies undermine information security and exponentially drive any discrete security control from a human scale. For example, if you have just hundreds of discrete data elements, you likely have billions of points of security exposures when information is extrapolated from the initial data elements.

Fifth, information technology has advanced from a simple one-for-one matching of data sets with computer processes into a scenario of multiple data sets interacting with multiple processes. This makes perimeter security impossible. With just 3 data sets and 3 processes, you have 27 permutations. With 42 data sets and 63 processes with a just 30% overlap, the security perimeter is represented by $1 \times 10^{1943}$ permutations. That is a very big universe. Which perimeter—when there are so many? Data sets are frequently reused for many purposes or combined with other data sets. This is a principled result from Codd's database normalization concepts but also a fact of efficiency, necessity, integration, and advanced workflow development for accuracy, features, functions, return on investment, and enabling wholly new business opportunities.

Workflows intersect and overlap destroying any viable concept of a securable perimeter. Firewalls, intrusion detection, process monitoring for what? The perimeter is virtualized to the entire internal and external organization. It is a concept without reality. Of course, you could disassemble your networks, the Internet, distributed processing, and lock up each computer, although antithetical to what information process enables. You could add dongles for every piece of software to protect the data aspect of code and process. You could vet each and every user at each and every computer device. You could view functionality and security as mutually-conflicted goals and choice some balance between functionality and security. That is the metaphor in use today, it does not work, and will work less well as the security perimeter is virtualized beyond any securable perimeter.

The message is that security must be built from the inside. Data elements must be categorized individually for risk valuation. The exponential risk from many elements, data types, and processes combining together must be assessed. Because the scale is beyond human scale, risk valuation, analysis, and security implementation must be applied by the information technology itself. It is not a human activity and correspondingly must be automated. The security must be built into the framework to bypass tensions with functionality, rather security must augment functionality instead of detracting from it. The paradigm suggests that data elements must be parsed and evaluated individually and within the context of the whole. The implementation thus demands a structure for measuring absolute security, for assessing risks and the requirements of each and every process, and applying a granular multi-level access control to individual data elements and sets or subsets of elements, or granular content control. This is certainly feasible. In fact, it has been implemented by DigitalDoors, Inc. Measurement is statistically-based. Likewise, the resulting security is statistical. Access control is multi-level and security is provided by an NP complete data dispersion implementation.

AA.1.18.0 Why Security is Ignored

The level of security provided in business processes and the production environment is rationalized to the lowest level possible to maintain its legitimacy. Although security is a desired attribute, it rarely if ever represents a constraint; security is perceived at best as a necessary evil. It has no return on investment (ROI). Attempts to create a security ROI rapidly unravel. Attempts to show how security itself or protection of assets as contribution to EPS (earnings per share) is really poor.

Attempts to ascribe an internal rate of return (IRR) for security in assessing alternative projects degenerate into a conflict as the security undermines the implementation of the selected project. Security is overlooked as functionality becomes essential. When security becomes an active constraint, it is removed from the equation. Security is usually optional.

Security impedes functionality. Even when it is understood that security is essential to reputation, legal compliance, while avoiding fines and penalties, the risk that a breach is likely to occur is perceived to be so distant and so minimally invasive that business as usual trumps security. It is easy to recognize the lapses of security after the fact, but it is difficult to maintain the importance of security on an ongoing current basis.

Security is a fundamental building block for a sustainable competitive advantage. When security is couched in terms of its importance to creating a strategy, implementing that strategy, and maintaining an advantage within a competitive environment, or enabling cooperative sharing without revealing private and technical details, security still fails as an afterthought. People blame and then rationalize that it is security undermining success, lowering production efficiency, and contributing nothing immediately to ROI.

The subtle point is that there can be no ROI, no sustainable advantage, no multiplier effects in the production process, no development of patents, and protection for trade secrets without security. So while security has no current ROI, security is the integral foundation to those goals. It might be possible to perform an ROI-based functionality now with the additional costs of security versus the effects to future anticipated functionality with and without security. However, such long-term calculation of an annualized loss expectancy based on so many unknowns is tantamount to clairvoyance resulting in professional suicide. It is extraordinarily difficult in to explain the future at risk the boardroom when so much is instead measured in terms of current values and this year's bonuses.

In other words, security is necessary to the production model but not sufficient. Therein lays the rationalization to ignore security. Security does not create wealth. It is not an input to the production process. It is not even a multiplier to the production process, although it preserves the longevity of that multiplier. Security can be, and often is, rationalized as complication without portfolio or return. However, security is the necessary and only ingredient that preserves the trade secret portfolio sustaining the competitive advantage provided by the wealth production model of the information revolution.

Without security, it is not possible to maintain the restricted knowledge that makes wealth generation from the information revolution possible. Without security, wealth generation reverts to the commodity of an industrial production model. In the end, security might be the only mechanism for protecting the innovation that is the driving engine of the information revolution. It is nothing but a mistake to rationalize security as a conflicting constraint with the immediate needs for functionality when security might well be the only thing sustaining a competitive advantage.

AA.1.19.0 Security Integration and the Lack of Attention to it

In real practice, security is an adjective to data or an adverb to process. It is not a noun because security is not a viable standalone product or service. It is not a deliverable. Security can be delivered, per se, but only as a component of a product or service, the production methods to create those, or as method to protect and retain production trade secrets. Security is not an object. It is not a goal. Its importance is undeserved as a production input or output. It is important, but only with reference to the maintenance of a sustainable competitive advantage. Security lacks return on investment (ROI) while even an internal rate of return (IRR) is a difficult and sketchy equation. If ROI is hard, contribution to EPS is a long shot. Anticipated loss expectation (ALE) is calculable, but only in terms of losses to other quantifiable deliverables or resource inputs into profitable production activities.

Security does not stand by itself. Given the fear and attention given to all things security, it would seem that security was some concrete product and service, but it is not. Security is an attribute or property of other things. Security is not a data flow, a process that exists by itself, or an expression of information. Security is not a discrete achievement and never apart from another discrete process. It cannot be divorced from other definitive deliverables. Security is not a building block or tangible foundation per se for other deliverables. Security is a state of control by management over access to superfluous, superficial, or fundamental information necessary to complete a task where a deliverable product or service is at stake.

Security is not a task by itself, of itself, for itself, or a reason for self-importance. The cover of security to protect a process is at best placebo. It seems that the integration of security for effectiveness is not something added as the event unfolds but rather somehow threaded within the structure itself. But it is not. Unfortunately, security is not a structure or a deliverable of any type, even as an outsourced service. Outsourced security services exist only as an attribute or property to a viable deliverable product or service. It is reckless and financially imprudent to outsource security without tie-ins to production. Security is only symbiotic with other resources and processes, never a resource or process unto itself. Security integrates into other activities, but it is not an activity creating product or service with standalone value.

Security is an economic entity. It is a marginal scalar without fixed asset value. Security does not alter production output value. Security is not a multiplier of product or service value. Security does not make a product or service worth more. Security has no basic asset or production value. Security does not make a better product or service. It only makes them sustainable. Security is not a production differentiator, but it is the sustainer of differentiation. Security protects the intellectual property value imbedded in the product or service or in the production methods used to produce them. Security protects an intellectual or economic monopoly as a multiplier to preserving this sustainable competitive advantage. Security is not a multiplier or marginal scalar of product or service value but a multiplier to retain long-term differential value.

Security does not have a worth unless tied into the risks, potentials, threats, or anticipatory costs associated with production results or losses. If security is applied as a scalar to a worthless production activity, the output is still a more-expensively worthless activity. When security is imposed as a necessary process divorced from a clear attribution, as is often the case with the traditional security infrastructure, it applies to nothing, scales a null value, and generates no value added. Security can only be economically integrated into a process that warrants its value as a positive and non-zero value-added enhancement. Security is a long-term performance multiplier, never a performance enhancement that is integrated into a productive workflow and expressed in the information revolution as the necessary and perhaps only element to sustain a long-term competitive advantage.

AA.1.20.0 Security as the Future Foundation for Information

Security is not a standalone entity. It is not a standalone activity. It is not a job or employment title separable from other tasks and workflows. Security is the basis for just about everything else. It is a foundation for all other activities. Security has no ROI, limited contribution to EPS, no real IRR, no real ALE, and no real payback. The value of security is continuity and having a future. Without security, there is no security at all. Security is a systemic requirement for success, for survivability and maintaining a sustainable competitive advantage. The problem with the future of security is that when we take it for granted we have none. When we think that security is an adjunct to our activities it fails and we have none.

Security is no longer something that is added to a process with the hope of any effectiveness. Security is not a chain and padlock that is separate from and attachable to raw materials, information, workflows, and production methods. Security is process that is unified with the production process. With anything less raw materials, information, and intellectual property can be separated from the production process with ensuing leakage. When security is separable, not only is the production process attacked the add-on security itself is also stolen for its own value.

Security is part of the blueprint, part of the just-in-time (JIT) processes for handling raw materials, a protection over critical and proprietary workflows, integrated into the outputs, and part of the resulting products and services. Security is the process that identifies resources of value and, at least in our explicitly and unique view, disperses those resources beyond intrinsic value, immediate utility, and contextual recognition with a reversible process to recover that value when and as needed under ownership or custodial assess controls. That is a very important future of security, one that transcends merely physical assets and includes the increasingly more valuable ones of knowledge and intellectual property.

AA.2.0.0Design and Implementation

AA.2.1.0 Implementation of Granular Data Control in Data Streams

Security with operational functionality and information sharing is possible by designating all network flows as data streams and controlling those streams. Applications and data of any kind are uniformly identified as data streams, since both are informational equivalents. Assessing an application, even a virtualized web-based one, as somehow representing a higher risk than data, overlooks the similarity in content and function of both, the higher-order representation of both as metadata, and their risk equivalence.

Security is possible through a process based on 1. identifying risk (with knowledge exploration) within the contained granular content of any data stream, 2. extracting the granular content at many defined sensitivity levels from the very matrix of any data stream, 3. providing access to a redacted form of the data stream in its most primitive state and format, and 4. reconstituting that data stream on-the-fly as needed up to the sensitivity levels required to match the information, functional, and operational requirements.

This is the essence of granular content control. It enables the continuity missing from traditional paradigms based on the trade-off in security versus functionality. Because DigitalDoors allows granular control over arbitrary data streams, applications, and web-enabled applications, operation continue unabated. However, they may lack specific access to the crown jewels.

The crown jewels are defined specifically in relevance to each user, environment, and/or ecosystem, whether as sensitive information, risky applications, or metadata combinations of both. Redaction with substitution and recognition of required formatting enables continued operation even with gapped data streams, applications, or web applications. Functionality continues, not hobbled by the trade-off with security, but rather subject to realistic identifiable security constraints.

The Internet and the private but parallel GIG (Global Information Grid) represent the expansion of the localized network to everywhere at anytime. Any conduit, even guarded, represents a two-way transmission channel for the proliferation of sensitive information that traverses any edge, any perimeter, any geopolitical authority, or any functional demarcation. The idea that edge protection and perimeter protection can be effective within such an ecosystem without definitive boundaries is unsustainable. The idea that an arbitrary boundary for a community of interest (COI) can be defined within this ecosystem (the Internet, the GIG, or any attached subnetwork) to affect a perimeter security is also unsustainable.

While is certainly possible to define network edges and define a sharp boundary, this is possible only with complete isolation of distributed operations and the indiscriminate cessation of information sharing, as indeed experienced under many existing security implementations today. Thus, any reliance on some sort of interspatial DMZ is just good intention without good security. DMZs include virtualized web applications, social networking sites, Wikis, remote management agents, and all Internet or GIG access, but DMZs are not a sustainable security technology.

Data streams and applications represent the top two inter-network traffic. These are necessary to sustain operations and information sharing regardless of the security barriers in place. SAAS, SOA, Web 2.0, Email, remote terminal services, virtualization, and remote services are examples of data streams with or without additional applications and with or without additional embedded data content. Unfortunately, data streams and applications are both forms of metadata with unlimited scope for covert channels. Traditional security implementations can only allow or deny access; it is a binary decision with no leeway for intermediate allowances. Therefore, traditional security either allows a security gap while enabling operational functionality or totally denies any throughput with the attendant non-operational effect.

Instead, DigitalDoors allows a redacted data stream with reconstruction. The allowable throughput can be set at any intermediate level (between none, some and all) with optional reconstruction up to any level (including some or all). Risk is adjustable, and risk can be measured and risk can be asserted. This specific aspect of DigitalDoors granular content control provides the missing functionality to enable compliant cross-domain security. In addition, automation of the selection of risk with the data stream allows for the unlimited assessment sensitivity levels and combinations of inference to make it possible to minimize risk with cross-domain information sharing and subsequent "uncontrollable" resharing with downstream partners. Cybercrime has shifted to attacking the plans, programs, designs of industry and national security.

DigitalDoors inventories the business practices, assess the need for business information, the risks from external threats and internal threats, the need for information in terms of the costs for acquisition, its retention, its reuse, and its potential for leakage and misuse both externally and internally. The resulting report details best production, contextual data value, information technology, and likely risk reduction practices. Security becomes a byproduct of better operations instead of a specific strategic goal or a forced mandate. Consider options deemed economically viable with competitive opportunities with a foundation of risk mitigation and control.

AA.2.2.0 Brief Functional Overview

DigitalDoors locates and selects critical information within a data flow, categorizes these selected elements, extracts them at any level of granularity, and disperses that critical information to different remote storage locations. The selected elements can be located manually (mouse selection), by dirty word lookup, or with sophisticated automatic tools to select content, meaning, and compounded risk factors. The downgraded data flow is stored in the lowest common risk factor and can be upgraded at wire speed to any authenticated MLS level. A trusted infrastructure with identification, authorization, and granular access control to granular storage represents a leap in security past traditional perimeter and containment methods.

AA.2.2.1 Brief Structural Overview

DigitalDoors was designed for networked and hosted infrastructures. The applications were designed and prototyped on MS Windows with IP networking, and widely demonstrated on that platform. We have shown automated content selection and categorization with AES encryption functioning on low-end laptops over an 11 Mbps wireless network with wireless SAN for remote storage and wireless Internet storage. RAID is supported in hardware. Because the user interface, the downgrading engine, the upgrading engine, and other functions were modularized, DigitalDoors is able to function on standalone systems, networked systems, client/server architectures, and under remote terminal services. This has been demonstrated under Solaris v8 and Solaris v9 and TSOL v8. CMW labeling at the granular element level extends file, device, and process-oriented CMW labeling provided by Trusted Solaris. As the infrastructure migrates to Sun Microsystems, trusted applications running on trusted SunRays and trusted servers with dispersed trusted storage will enable multilevel side-by-side sessions.

AA.2.2.2 Remote Storage Overview

DigitalDoors downgrades data streams to any granular level as configured. This corresponds to the CMW definition of sensitivity level, compartment level, and information level. DigitalDoors also identifies data stream elements by content categorization, source, destination, and compound risk factors. The data streams are split in various configurable ways, with each stream or even each granular element stored to a different location. Backups can be automatically archived.

Elements can be replicated and stored remotely. The different remote storage locations are mapped as logical shares. This is fully compliant with MS Windows, and Solaris and TSOL with Samba, CIFS, and/or NFS. As the migration of the DigitalDoors infrastructure migrates to Sun Microsystems, NAS, SAN, iSCSI, FibreChannel, SNIA, and/or other storage methodologies, other data access methods will be supported in the same way. Currently, DigitalDoors supports at least 30 distinct storage locations for a single organization, with an unlimited parallel number for backup and replication.

The storage overhead for DigitalDoors adds only about 6% to the storage needs over baseline. However, organizational preference for archives, multilevel downgrades, separate sensitivity level storage, web-based or DOD distribution systems with catalogs each doubles the storage requirements. Also, the need for failsafe operations, caching, proxy services, and redundancy is a separate and traditional storage provisioning issue. Five (99.999%) and six nines (99.9999%) statistical operational performance demand an infrastructure with many storage server farms and multi-homed networking access. The primary requirement for DigitalDoors is consistent and compatible storage facilities that are uniquely addressable. The secondary requirement is that this storage be granularized such that data stream access can be controlled by identification and authorization by user, process, sensitivity level, compartment level, and information level.

DigitalDoors is a series of differential process step that can occur on any platform, ranging from a mainframe to a low-end laptop. It enables content-level security in any type of data stream on any type of platform. It is inherently scalable from single to unlimited users. Content-level security can be affected at any layer of the ISO OSI model, from the bottom physical layer (level 1) to the top application layer (level 7). In addition, DigitalDoors uniquely functions within an application layer data stream to analysis content, concept, and context for security sensitivity to protect again brute force inference with statistical methods and data mining, assemblage of information, and human intelligence methods. In other words, DigitalDoors is processing any type of data stream for potential security lapses.

Most deployments are likely to require enterprise operation support with mixed client/server architecture. Automated OPSEC and COMSEC processing can occur as background processes on virtually any computing, Web/Internet, and networked platform. The DigitalDoors architecture was designed with run anywhere mentality, including hardware chipsets. However, in most cases, manual tagging presupposes a graphic user interface for selecting and identifying data stream content. As such, the core technologies require only visual element outlining, automated content identification, list lookup and matching, and basic data processing. Processing can be offloaded to the client or performed on the server. Dispersion is a function of a secure networking infrastructure. Most operations occur at network wire speed, this being the primary performance limitation.

We have installed and demonstrated its effectiveness on currently deployed COTS environments. This includes a wireless laptop network with a wireless SAN, a 10BaseT Intel client-server architecture, a 100BaseT and Gigabit Intel client-server architecture (Win95 through Win 2003 AS and W2K EAL-4), several MS Terminal Server environments, and integrated with Solaris v8 and v9 and Trusted Solaris v8 servers and clients. We have tried the technology on Palm IV; we assume that DigitalDoors is portable to PDAs, handheld devices, cellular phones, and other hardware devices subject to their memory, connectivity, and CPU prerequisites.

For point of reference, we have integrated and demonstrated DigitalDoors with MS Windows, as add-ins for MS Outlook and MS Exchange, and presume simple functional integration for any MS Office, database, data workflow, signal transmission, or COTS products. We have demonstrated DigitalDoors with ASCII files, MS Word documents, HTML, and XML metadata.

The client requires only a basic GUI interface (at a minimum) with NetBEUI, NetBIOS, or IP networking over any network transmission medium. The server components require no GUI and can run as a background process with NetBEUI, NetBios, or IP networking over any inter-compatible network transmission media. Interprocess communications is enabled through client/server channels, OS messaging, and RPC. Support over LAN, WAN, Internet, VPN, NAS, SAN, with remote commercial storage services has been tested. DigitalDoors has also been successfully tested with encrypting network hardware (Intel) and native P2P encrypting protocols.

TABLE

The Data Declassification process

The Data Declassification process is defined by these steps:

Authorization of security levels:
Sensitivity
Compartment
Information
Categorization
Authorization of security roles:
Sensitivity
Compartment
Information
Categorization:
Identification of a data stream
Identification of the format for the data stream
Configuration of intended security levels
Sensitivity
Compartment
Information
Categorization
Categorization of data within the stream (e.g., tagging)
Selection of data within the stream for extraction
Extraction of data within the stream
Downgrading of data stream
Creation of upgrading recovery data files
Data backup
Data replication
Data dispersion
The Data Reclassification process is defined by these steps:

Authorization of security levels:
Sensitivity
Compartment
Information
Categorization
Authorization of security roles:
Sensitivity
Compartment
Information
Categorization
Access to downgraded data stream
Upgrading of data stream Access security is established through a network ID and authorization process, such as Kerberos and enhanced with the compartmentalized trusted operating systems, such as TSOL. Access security can be enabled for most networked devices.

Downgrading the data stream is manual or automatic, or assisted. Automatic OPSEC and COMSEC rules can be enforced prior or post manual selection (tagging of the sensitivity levels, etc.) The processes are asymmetric by design. Downgrading can require substantial time, but upgrading is limited only by the network and the time lags to deliver a signal cross-country through multi-hop switches and routers that are part of the commercial public infrastructure. Realize that firewall, guard, filter, and router hops frequently entail 300 μsec unidirectional delays; this being the primary performance delays.

DigitalDoors has designed to the architecture and the process flows such that steps are optimized to each side of the firewall, guard, filter, router, and storage server mesh, including even optimization at the client for the extensive high-level content, concept, and context identification and dispersion. Manual tagging can be performed on any computer that supports a GUI interface. Processing is bound to disk or network performance limitations. Tagging information can be processed locally or delivered to a server for service-side processing. The user's ability to locate and highlight sensitive material is the functional performance limitation.

The data stream can be any of type of data. This includes signals, files, data streams, interprocess messaging in a workflow or high-volume transaction processing environment, email, instant messaging, logical information, and COTS data files. Data streams can be free form or structured, such as a COBOL data set, a RDBMS database, an MS Word document, or metadata, such as SGML, HTML, or XML. The DigitalDoors philosophy is to enhance security while maintaining traditional process workflows. Note that encrypted files and data streams require discrete and complete decryption before they can enter the transactional processing. Failure to decrypt such files abends systems and workflow because the format and content is unexpected. In addition, while encrypted XML and metadata is secure within that form, once decrypted is usually carries far more security-sensitive content than realized. Manual processing requires trivial overhead. CPU requirements are minimal for the client and server components.

However, OPSEC, COMSEC, and enhanced automatic and assisted data selection requires additional CPU resources and approximately 400 MB of storage. Even laptops are suitable. Automatically or assisted tagging information can be processed locally or delivered to a server for secure processing. Processing is bound to roundtrip network performance limitations, and database lookup seeks times. As the complexity is increased to automatically search data, metadata, content, context, and concept for sensitivity within the data stream, performs slows. Performance is affected by disk seek times and the depth of the searching and DigitalDoors categorizing process. Performance ranges from 34,000 to 360,000 instructions per recognizable element in the data stream. This ranges from 56 to 783 μsec on IBM Thinkpad laptop yielding a Winstone value of 23. DigitalDoors processes a document of 140 words in 70 seconds on that laptop, but within 19 seconds on Dual Intel CPU Server with SCSI drives (Winstone value of 89). A production SQL database server provides several orders of magnitude better lookup performance than a client database on a laptop; it also scales better. Experience with *Sequoia* or comparable scalable and fault-tolerant architectures indicate single digit μsec response times.

Dispersion performance is a function of network channel responsiveness and network storage performance characteristics. Wireless Ethernet 11 Mbits/s down to 2.2 Mbits/s is sufficiently faster than database seek times and storage, but nonetheless effective in demonstrations.

ReClassification performance occurs at wire speed subject to the performance limitations of network infrastructure and remote network storage performance. We have recovered 2 MB documents within 3201 μsec using a multiple-hop router network and 10 Mbits/s Ethernet hubs to Intel desktops. This is equivalent to raw file display on the same networks and systems.

The footprint is purposefully small. Storage requirements include application storage, databases, temporary cache, and secure and dispersed network storage. Distribution is typically provided on a standard CD (640 MB) or business-card CD (120 MB). User storage per user is as little as 15 KB for a configuration profile. Application storage is approximately 30 MB for clients, although this can be shared as a single store on a server or terminal server. Database storage requires approximately 231 MB. This includes all language dictionaries, categorization elements, synonyms, and semiotic and grammatical inferences. Transactional processing, rollbacks, and security logs are optional, but on the same order of magnitude. All storage can use SSD, USB, PCMCIA, or flash RAM or networked devices. Performance is enhanced about 45 times with SSD. Flash RAM is marginally faster than mechanical hard drives due to lack of device driver optimization.

Data storage for user documents, data sets, data streams, metadata, and the like will be comparable to the size of the existing data store. Note that a design criteria is that all extra-security information, recovery files, auditing, and logs are stored in separate channels both for security reasons and format preservation. Expect additional overheads of only 6% for dispersion of recovery files. However, realize that minimum block sizes could increase that. Optimization for recovery files, which tend to be small, is possible by setting block sizes to 1 KB or smaller on a special recovery file storage site.

When sources are dispersed and replicated for multiple location storage, or creation for individual TS, S, and C archives with support for compartments, information labels, and categorization, then each replication obviously increases the storage requirements by about 100%. Proxy caching is effective when documents are often requested; however, for security purposes, caching of recovery files is insecure. It it's also ineffective unless the recovery files are bound to the same sensitivity/compartment/category user because the storage server generates and only delivers at the level dominated by the user clearance.

DigitalDoors assumes that the native OS encryption will be applied or that a certified encryption system is available within the network infrastructure. DigitalDoors will integrate with that facility. Encryption overheads are comparable to what exists now. When unclassified or downgraded documents and the recovery files are stored black and delivered black, the encryption overhead will be approximately 106% of what is now. In spite of that low overhead, this provides infinitely granular data storage and infinitely granular upgrading.

Interprocess communication and messaging for client/server is optimized to minimize traffic loads and point-to-point encryption overheads. This limited performance overhead is most evident when a terminal server environment is taxed by many users, who nonetheless see performance equivalent to that performed on the client desktop. User or process identification and authorization is interspersed throughout the DigitalDoors process—it is not a one time when the user logs in—so there is some ongoing validation chatter. This rate is granular and configurable by the security administrator on a range from seconds to hours.

There are true performance and storage benefits when downgraded documents are shortened and mechanically compressed. However, for functional reasons, a core design of DigitalDoors is that the data stream format is typically preserved intact (less extractions or substitutions) to allow for workflow processing without abends, interrupts, or crashes. Even HTML, XML, and other metadata are typically preserved to retain the original format so that DigitalDoors is providing security without compromising functionality.

AA.2.2.3 Operating Parameter

Any CPU platform with a development platform and as little as 64 KB of RAM. Any platform with support for either C, Java, or VB is suitable. DigitalDoors can run as a hardware process, an applet, an add-in, process filter, a dynamic link library, as an NT or RPC service, as a standalone client, as an in-process or out-of-process server, and as an enhancement to a firewall, IDS, IPS, guard, or operating system. DigitalDoors interacts with Kerberos, Active Directory, smart cards, biometrics, encrypting file systems, trusted operating systems, and many NAS, SAN, and other remote filing systems.

AA.2.2.4 Network Design Specifications

Because the core concept of DigitalDoors is to support collaboration, information sharing, dissemination, Internet and Web services, data mining, and data dispersion to remote storage, the client/server infrastructure requires only a core network. Integration preference is for a COTS network environment, such as Internet, Intranet, LAN, MAN, WAN, NetWare, NFS, or Microsoft networking, Network protocols can include NetBEUI, NetBIOS, and IP on a physical channel of 1 Mbits/s wireless (Zenith), infrared, Bluetooth, 802.11a or 802.11b, or 802.11g, Ethernet, FDDI, iSCSI, frame relay, ISDN, DSL, T1, T3, OC3, and SONET.

AA.2.2.5 Remote Storage Infrastructure

DigitalDoors locates and selects critical information within a data flow, categorizes these selected elements, extracts them at any level of granularity, and disperses that critical information to different remote storage locations. The selected elements can be located manually (mouse selection), by dirty word lookup, or with sophisticated automatic tools to select content, meaning, and compounded risk factors. The downgraded data flow is stored in the lowest common risk factor and can be upgraded at wire speed to any authenticated MLS level. A trusted infrastructure with identification, authorization, and granular access control to granular storage represents a leap in security past traditional perimeter and containment methods.

AA.2.2.6 Brief Structural Overview

DigitalDoors was designed for networked and hosted infrastructures. The applications were designed and prototyped on MS Windows with IP networking, and widely demonstrated on that platform. We have shown automated content selection and categorization with AES encryption functioning on low-end laptops over an 11 Mbps wireless network with wireless SAN for remote storage and wireless Internet storage. RAID is supported in hardware. Because the user interface, the downgrading engine, the upgrading engine, and other functions were modularized, DigitalDoors is able to function on standalone systems, networked systems, client/server architectures, and under remote terminal services.

This has been demonstrated under Solaris v8 and Solaris v9 and TSOL v8. CMW labeling at the granular element level extends file, device, and process-oriented CMW labeling provided by Trusted Solaris. As the infrastructure migrates to Sun Microsystems, trusted applications running on trusted SunRays and trusted servers with dispersed trusted storage will enable multilevel side-by-side sessions.

AA.2.2.7 Remote Storage Overview

DigitalDoors downgrades data streams to any granular level as configured. This corresponds to the CMW definition of sensitivity level, compartment level, and information level. DigitalDoors also identifies data stream elements by content categorization, source, destination, and compound risk factors. The data streams are split in various configurable ways, with each stream or even each granular element stored to a different location. Backups can be automatically archived. Elements can be replicated and stored remotely. The different remote storage locations are mapped as logical shares. This is fully compliant with MS Windows, and Solaris and TSOL with Samba, CIFS, and/or NFS. As the migration of the DigitalDoors infrastructure migrates to Sun Microsystems, NAS, SAN, iSCSI, FibreChannel, SNIA, and/or other storage methodologies, other data access methods will be supported in the same way. Currently, DigitalDoors supports at least 30 distinct storage locations for a single organization, with an unlimited parallel number for backup and replication.

The storage overhead for DigitalDoors adds only about 6% to the storage needs over baseline. However, organizational preference for archives, multilevel downgrades, separate sensitivity level storage, web-based or DoD distribution systems with catalogs each doubles the storage requirements. Also, the need for failsafe operations, caching, proxy services, and redundancy is a separate and traditional storage provisioning issue. Five (99.999%) and six nines (99.9999%) statistical operational performance demand an infrastructure with many storage server farms and multi-homed networking access. The primary requirement for DigitalDoors is consistent and compatible storage facilities that are uniquely addressable. The secondary requirement is that this storage be granularized such that data stream access can be controlled by identification and authorization by user, process, sensitivity level, compartment level, and information level.

AA.2.3.0 Upfront Processing

DigitalDoors front-loads document and data stream processing. This upfront processing is dense, comprehensive, and deliberate. Such overhead is necessary to explore multi-tier categorization and security requirements beyond a limited perspective, potential emergent properties, and classification bias. Reconstitution occurs at wire and disk access speeds with enhanced asymmetric performance.

There are five reasons for this design architecture listed in this document. One, the comprehensive parsing of the document or data stream and all associated metadata, links, attachments, inclusions, and structure provides a greater accuracy in the security assessment. Two, the comprehensive parsing balances content, context, and concept issues and provides a process milestone for assessing and balancing competing needs of security against sharing. Three, the front-loaded processing provides a focal point for word stemming, syntactical assessment, clustering, metasearching, index construction, data mining, data spanning, construction of topic maps, and a means to deal with the typical overabundance of information flow from a source (e.g. handling the fire hose concept of signal and data collection). Four, this architecture enables data, document, stream, process-, platform-, system-, network-, and grid-independence; the process is independent and allows anywhere, anytime, multi-platform access subject to access authentication and authorization procedures. Five, source documents tend to be processed once and thereafter distributed and read many times and this design optimizes for this.

TABLE

| Upfront processing delivers: |
| --- |
| Swarming intelligence to access aggregate value, risk, and granular value at the edge |
| MLS/MILS assessment |
| Determine what to protect and how much |

TABLE-continued

| Upfront processing delivers: |
| --- |
| Determine who should get indication of the information (directory or metadata) |
| Determine who should get information |
| Information aggregation and inference |
| Information prioritization as to what is needed now |
| Ability to redistribute multi-tier tagged materials without additional intervention |
| Support for inter-agency SBU tagging conflicts |

AA.2.4.0 Proxy Architecture

The DigitalDoors Identification and Authorization Server limits access to data and process by vetting users through an identification and authorization process, a traditional security by perimeter and process control.

The DigitalDoors Clearinghouse Server resolves site IDs, vets for identification and authorization, and establishes access level for global reconstitution. The server matches the site ID and provides the recovery map and reconstitution files from wherever they are stored. It returns only the reconstitution files as allowed by the lowest condition of {local, networked, or global security} status and the designated security clearance for the requesting user. The clearinghouse server can also compare security hashes or digital file signatures to validate the integrity of the request for reconstitution files to preclude attacks using random site IDs and message keys.

The proxy server caches and handles reconstitution requests by providing a narrow service window to preclude non-vetted browsing, data storage mining, and bulk access to maps and reconstitution files. Multiple servers can sustain any level of performance necessary with network wire speed the most relevant performance-limiting factor.

The DigitalDoors Dispersion Server is a vital security function because it creates a division between each DeClassified document, often a document or other information sources downgraded to the lowest common denominator for public dissemination, and the corresponding recovery map and reconstitution files. It delivers only what is authorized specifically and minimally for each user. Dispersion security is significantly enhanced by creating a separation between the recovery map and the referenced reconstitution files and by providing specific multi-level access to a delivery stream of these vetted reconstitution files. System-level control with unique one-time pad encryption keys provides effective protection from intuitive forced re-assembly.

Although primary security is affected through the information hiding, dispersion, and camouflage, the proxy architecture with the identification and authorization server, a generic proxy server, and the dispersion server precludes human intelligence operations, hacking for information value, and sophisticated inferential analysis applying set theory or Bayesian statistics against protected organizational data. In addition, this proxy architecture enables a distributed and replicated design such that network or Internet support is always available and available anywhere with complete multi-level security.

AA.2.5.0 Reclassification-Reconstitution

ReClassification of declassified materials, in effect reversible redaction, requires new paradigms because the process is not at all considered in the security or workflow literature. Because the DigitalDoors process declassifies documents using various pattern recognition, work and phrase lookup, and artificial intelligence, and then disperses the extractions to various locations, the reclassification (reconstitution) process is granular. Granularity is a function of location, user, time, threat modes, supervisory overrides, and other configurable limitations. This reclassification process protects the recovery map, recovery extracts, and other storage locations by a process of dispersion and granular storage access.

AA.2.5.1 ReClassification

On the receiving side, DeClassified e-mail, documents, or data are received as a standard e-mail message, documents, or data that required no special treatment, process, or interface. Size, shape, format, encoding, markup, and processing integrity are preserved. Data include formatted data sets, transactional data, or formatted XML and database tables, records, and queries, DeClassified e-mail, documents, or transactional data is the same as standard e-mail since there are no changes within the workflow as perceived by users, servers, or other intermediate delivery processes. The software for ReClassification is itself non-secured and contains no secrets. It is possible to key each ReClassification tool for unique access by specific user, location, document, timeframe, time expiration limitation, and other configuration, as a secondary security access issue. However, the ReClassification process requires a downloadable user interface in the form of an e-mail client reader add-in, the use of our separate e-mail reader, or an integrated document or data reader. Selection of a DeClassified e-mail message, document, or data transaction initiates a workflow process consisting of:

TABLE

| Workflow process |
|---|
| Identification and Authorization (either local or remote) |
| Lookup of recovery map information |
| Access control by time, location, threat mode, username, category, time of day, level hierarchy |
| Access to the recovery map (granular access controlled at all time) |
| Access control to dispersed storage locations |
| Recovery of dispersed classified critical and important information |
| Recovery of the encryption key per organization, per user, per document, and/or per extraction |
| Decryption of encrypted or MultiCrypted critical and important information (on the user side at the user machine through proprietary, standard, SSL, or other encryption add-ins) |
| Reconsitition (ReClassification of DeClassified e-mail message) |
| Display within standard user interface of ReClassified e-mail message (such as within e-mail client, PDA, etc.) |
| Display within separate e-mail reader/ReClassifier application |
| Display within separate reader/ReClassifier application |
| Display within separate user application (MS Word, database, PowerPoint, Quicken) |

Controlled release for ReClassification purposes can be limited such that different users will have leveled access to the extractions, for example, senior users can have access to the names and credit numbers on a granular basis, whereas junior users cannot.

Workflow and transactional messaging activities that require e-mail, POP3, SMTP, IP, or other similar message flow can also be enabled to employ the remote distributed DeClassification and ReClassification processes in similar ways. Pagers, wireless messaging, and other token delivery methods can be incorporated into access control, authentication, and differentiation for ReClassification levels. The DeClassification process and the display of the ReClassified e-mail, documents, or transaction data does not have to occur in any set or preset location. ReClassification can occur at network devices (in whole or in part) and be delivered to that same location or to other locations. Accumulation of recovery information need not occur at any one single location.

AA.2.5.2 Recovery Information

The recovery information is not a necessarily a single entity or file, or accumulated in one place or by a sequential single process at any single time. The recovery information is a starting point that describes the location of the recovery map. The recovery information for each declassified document is independent from all other declassified documents. Access to that information is either known or, not known but delivered after secured authentication. That location can be communicated in various methods, including system message, e-mail, by phone, encrypted as a message or semaphore, attachments, or other means. Access keys, encryption keys, and rights to that location are also communicated in various like methods.

The location might contain the entirety of the recovery map as a data record, table, XML document, or file in plain text, encrypted, or second order pointers to other locations. Support for other locations is arbitrarily infinite. The recovery map might optionally contain information about the classified source document and the declassification and extraction process. Key sharing for storage access, authentication, and recovery is enabled with {L:N of M} key-sharing schemes. Typically, the recovery map defines offsets to extracted information (offset from initial starting point of the document, content structure, or data stream, offset from last extract, or from arbitrary tags and markers), lengths of the extracted information, lengths of any replacement for the extraction, extraction type, and the extraction itself. The offset is functional in all known types of media formats including text, formatted text, XML, audio, image, video, multimedia, database, and object-oriented descriptions. The starting point from content structure could include the offset from a natural break in the data stream format, a format block, or change in content type or structure.

For example, an MS Word document contains a metadata structure within which the user content is embedded; the reference to the user content forms the natural offset starting point. This is analogous for other types of documents, such a spreadsheet, data query, or OLE document embedded with the MS Word document. Two-pass placeholders support reconstitution in the event a DeClassified document is altered (such as edited, attacked, or damaged) subsequent to the DeClassification. This enables ongoing data processing with secured data and protects DeClassified data even in the event of a concerted semantic attack.

All of this information can be in plain text, encrypted, or represented by pointers to other storage locations. Numbered tag or two-pass tags (such as barcodes or URLs) allow ongoing editing, as with MS Word, wherein placement and even the existence of extractions could be altered in processes subsequent to DigitalDoors DeClassification, thus allowing alteration and functional ReClassification of the DeClassified document at any future time.

Support for other locations is arbitrarily infinite. Each unitary recovery unit for each extraction can be dispersed to an arbitrary storage location. Each storage location can be managed as a closed storage community, with access authenticated at a granular level. Storage locations in whole or in part and individual extractions can be distributed to enable survivability. Failure or loss of any single recovery information or extracted element does not preclude partial ReClassification or failure of any other ReClassification for others documents. A sufficient dispersed survival scheme provides 100% recovery in the event of catastrophic failure.

The location of each secondary or subsequent storage location is independent from all other storage locations. Access to one a particular storage location, file path, file name, access key, encryption key, or other access control (such as biometric token) in no way provides information about or access to any other location. Access to each secondary or subsequent storage location is also granular and separated authenticated. As a result, access to any part of the initial recovery information, even in plain text, without access to storage locations and access authentication prevents full or even partial recovery of the classified document. Plain-text access to any and all storage locations alone precludes manual recovery of a declassified document using human intelligence, as the magnitude of the accurate placement and reference is astronomical (the problem is N!, non-polynomial, or NP complete). Access to a complete plain-text recovery map with plain-text access to any and all storage locations could compromise a single declassified in full or in part, but no other declassified documents.

Authentication is granularly revocable at any time now or in the future. Access to classified documents and the reclassified levels is controllable at any time in the future. Access to recovery information, recovery maps, individual extractions, locations, and access to storage is both granular and revocable.

AA.2.5.3 Processing with DeClassified Data

The starting point from content structure could include the offset from a natural break in the data stream format, a format block, or change in content type or structure. For example, an MS Word document contains a metadata structure within which the user content is embedded; the reference to the user content forms the natural offset starting point. This is analogous for other types of documents, such a spreadsheet, data query, or OLE document embedded with the MS Word document. Two-pass placeholders support reconstitution in the event a DeClassified document is altered (such as edited, attacked, or damaged) subsequent to the DeClassification. This enables ongoing data processing with secured data and protects DeClassified data even in the event of a concerted semantic attack.

AA.2.5.4 Content Filtering

Content filtering includes declassification downgrading but also more typical filtering, document retention, and e-mail attachment retention policies, as implemented by other e-mail products. The major difference between typical filtering technology and DigitalDoors, is the ability of the e-mail, document, or data recipient to potential review the e-mail message and all attachments reconstituted in full, not just as filtered and delivered. The core engine supports classification by word type. Forty categories are currently supported. We are adding politically correct, hate mongering, job resumes, pornography, drug culture, games and jokes, spam, and others as specified. DigitalDoors can filter outgoing and forwarded e-mail for .com, .exe, sys, .ovl, .dll, .ocx, .prg, scr, and script attachments and even search within these data streams for known file infection patterns. Message subject, content, and attachments are processed. In addition to standard content filtering, DigitalDoors also assesses target e-mail addresses including to, cc, and bcc. The workflow is basically one of reviewing inbound and outbound messages for content. When excessive amounts of e-mail messages, documents, or transactional data cannot be processed in real-time, they are parked for later processing in a temporary folder. Administrator (not user) configuration defines whether copies are made, saved, or deleted. Reports explain actions taken and the event logging databases provide analysis into the e-mail declassification and filtering process.

AA.2.5.5 Channel Transmission Protection

The transmission channel(s) for source data to the user's desktop, server, or transaction process, external generation of the recovery file, and external generation of a recovery map are all authenticated with multi-factor authentication, such as PKI certificates, tokens, or other methods, and encrypted with point-to-point encryption of the transmission channel with SSL or in hardware. This process can be controlled by DigitalDoors or be part of the core networking environment and independent from DigitalDoors functionality.

AA.2.6.0 The Recovery Map

DigitalDoors enables information security and privacy protection through the selection of critical elements, the granular extraction of those critical elements to dispersed storage, the distribution of the redacted (and encrypted) information while preserving functional work flow format. The system enables reconstruction of the original document and the multi-level reconstitution of the document to users with different clearance levels and different rolls based on their identification and access authorization. Selection of critical elements can be done: automatically, fully-manual, or assisted with automatic features and manual overrides. Reconstitution and multi-level reconstitution is driven by a "recovery map" that details the selections, replacements, and pointers to actual extractions that are restored with appropriate authorization.

AA.2.6.1 Map Structure Variants and Granularity

The DigitalDoors "recovery map" can be in different forms depending on application, configuration, encryption, signatures, and administrative options. The map in effect is a starting path to a file (database record, script-macro, or data stream) represented by an unqualified or fully-qualified path name and file name, resource reference, a URL, or an XML pointer. The path might not even be recorded, or it might be encrypted. This initial file might contain no references whatsoever to the source and/or redacted file, or even overt references to the collections of associated files and processes. Each file in the collections of associated files and processes might be encrypted in whole or in part, encrypted extraction-wise, element-wise, or distributed as additional collections of associated files and processes, dispersed to an arbitrary number of networked storage locations.

The "recovery map" is partitioned to improved reliability, replicability, survivability, integrity, validity, security, and preclude forced inferential reconstitution activities. The "recovery map" exists as a series of steps and separated pieces of information, with minimal top-down dependence and also stepwise and separated independence. Each step and dispersion further precludes reverse engineering the source and decreases the amount of contextual value to an extraction recovery file. There is no down-top dependence. Each step, each price of information, and each file is independent from all others with no or limited reference to the original source, redacted document, or extraction files. File names, file locations, file date and time stamps, file sizes, and file ownership ring rights might be altered to preclude source document group association, user relationships, process or procedural connections, event correlation, or indication or sources and methods.

Options for the redaction and how extractions are represented within the redacted document are important in achieving a high-level security while maintaining interoperability. As such, replacements for extractions can be null, randomized in both content, context, and size, or substituted with misleading information. Because the various recovery maps can also include efficient minimal or fully chaffed listings of all document elements, combinations of redacted documents with even plain-text recovery maps can severely hamper forced inferential reconstitution activities.

The DigitalDoors recovery map information in its simplest form contains the offsets to the extractions, length of extractions, length of redacted document replacements (which can range from 0 to thousands of characters). This file, database record, script-macro, or data stream might be encrypted in whole or in parts, encrypted extraction-wise, element-wise, or distributed whole and in parts. Encryption is through various algorithms including 3DES, Rijndael, or any third-party encryption product. Granularity with randomness, chaos in association, and dispersion might make the need for encryption necessary merely to meet legal requirements. The recovery map is not necessarily a single entity, but rather usually a collection of associated files and processes, dispersed to an arbitrary number of networked storage locations each accessible through hierarchical controls. The redacted file must have an association to at least one recovery map under any expectation of full or partial reconstitution. Existence of the recovery map alone does not provide any ability to access, decrypt, or apply the map for increased comprehension of the redacted document through forced inferential reconstitution activities. Access to the recovery map is controlled by identification and authorization, by 1-factor, 2-factor, 3-factor authentication or third-party products integrated or callable within the DigitalDoors process.

Metaphorically, you might think of the recovery map as a pirate treasure map or such a map broken in small pieces so that only a sufficient number of pieces have practical value. Furthermore, without ownership, map location reference (the starting point), a time relevancy element, a time frame in history, an understanding of the map relevance to a treasure, the age of the map, or the authenticity and integrity of the map, you have only an interesting artifact. Sometimes it is possible to infer one of those elements and thereby establish values for other elements and thus possible context to the map. Consider that you have thousands of such maps, you have only the context of enforced secrecy and no singular context for any one map, let alone many of these maps. A mapped mismatched with an anticipated treasure is not likely to provide the right results, even for pirate treasure. Given a correct context and a correct starting point for the map, you still need direction and scale for perspective. Now consider that the map provides location for a treasure, you will still need conveyance to the treasure (network access), ability to get the treasure itself (access control), and a means to break open the box containing the treasure (decryption key).

The availability of new information analysis techniques requires that security experts counter threats not only from the obvious but also the probable, possible, and unknown. Information analysis includes not only capture of native communication streams, but also human intelligence methods, assemblage, data mining, intuition, interception and alteration, hypothesis construction and validation, logical inference, Bayesian inference, polling, and set theory. These methods represent a dramatic advancement through the statistical quantification of threats and unknowns with decision-making based on game theory and risk management. As a result, information security methods must include protection against the obvious and also the probable and possible. New information security methods must be flexible enough to protect again the accidental, intentional with systems knowledge, unforeseen, and unknown as well. Concrete security methods do not anticipate probable, possible, and wholly unknown and unforeseen attacks.

The range of known to unknown, expected, probable, possible, promising, and the only-likely predicate the need for new security methods. As a result, DigitalDoors feels the best defense is based on statistical methods, chaos theory, Bayesian inference, and set theory. DigitalDoors is aware of these attacking technologies and inverts these same techniques to counter these actual and perceived threats in both defensive and offensive processes.

The DigitalDoors technology includes the recognition of information as content, context, and concept. Content is the obvious textual or streaming information. Context is the broader information gleaned from work flows, situational utility, how the content is gathered, created, processed, used, and distributed, and what other content establishes an informational basis for semiotic connotation and denotation. Concept is created through process structure, data structure, data tagging and encoding, metadata, and reference and inference to the textual information environment. The ultimate situation is a large number of independent extraction recovery files, generally inaccessible by users, further individually encrypted with one-time pads, which even in aggregate indicate only activity but not content, context, or concept. This explains the value for selection, extraction, granularity, and dispersion.

A relationship exists between the source document, the recovery map, reconstitution extraction files, process flows, encryption/decryption steps, integrity checksums, digital signatures, key generation, key distribution, and anonymity. Note that separate and independent channels can mask any relationship among the source, its recovery map(s), and its extraction file(s). Independence, randomness, dispersion, secure erasure (per MilSpec), optional date and time stamping erasure, initial creation of random files to preclude sequential dated backups analysis for creating grouped file associations.

DigitalDoors protects the redacted documents from the recovery maps, and these from the extraction files by implementation of chaos (such as, the law of large numbers), the independence of the files, file names, location of files, access to files, and the infinite granularity of individual recovery maps and extraction files. In other words, a recovery map can be processed through the DigitalDoors technology n-times to create n-levels of indirection. In the same way, extracted components can be dispersed n-times to create n-levels of access control and indirection.

DigitalDoors technology is implemented under MS Windows. Client, server, and remote components exist, support networking, dispersion, encryption, and add-in integration with other Windows-compliant applications. The technology is generally partitioned into user interface, processing, and storage modules, thereby foreseeing deployment as remote, host-based, server-based, and appliance-based code. For example, the aspects within MS word that create insecurity, links to external sites and other documents, imbedded digital content in formats not known to DigitalDoors, redlining, metadata, and hidden elements would be automatically excluded, the remainder would be redacted and published, and the source Word file itself could be purged from the system or stored within a secure footprint. Since some of the necessary processes compromise the nominal security of the desktop and the communication channels, different parts of this process would occur within different vetted environments; the only insecurity would include what is actually visible on the screen at any time and/or saved as PrntScrn, and the parts of the document buffered in RAM or disk swap space.

DigitalDoors technology can be deployed to secure environments within an open and insecure network infrastructure (IP over Ethernet and Cisco routers) on notoriously insecure components (laptops, PCs, handheld devices, and general-purpose appliances) using COTS applications (MS Word, MS Powerpoint, and new file sharing features embedded in Windows 2003). Application of digital signatures, key management with tokens, proxies, and special key servers provides the necessary infrastructure to vet the integrity of a process work flow.

AA.2.7.0 Concurrency in Granular Data Control

Because the code base for the DigitalDoors applications is based on object-oriented programming, many processes, functions, features, events, and user options are inherently concurrent. However, many processes, functions, and features include an active process status test to disable certain aspects of this concurrency.

This prevents process clashes (for example when two or classifications processes run at the same time on different multiprocessor threads) but primary enhances consistency and security to contain risk. Concurrency and parallelism represent new doorways through the perimeter, an obvious failure in any perimeter security model. Reduction and control over concurrency enables the new deperimeterized DigitalDoors security model by controlling what and how much goes through the doors. This is granular content control.

For example, it is possible to start the Secure process on a document and leave the computer; the process will complete, but no manual activity or options are allowed once the timed login has expired. Likewise queued documents will be processed safety in the background with an active user login, but the process is locked into whatever administrator and user options are in effect at the timed login expires.

Likewise, many categorization functions will preclude manual overrides until they are completed. This prevents clashes and security lapses should a user try to distort the tagging. Generally, the automatic recoding feature will code to the highest sensitivity level even when prior processes assert some tag lower than the highest level in the various databases. This helps achieve stability and consistency as well. Manual overrides against the document itself or the relined selections can always occur at any stage, but not during an automated process. However, note that COMSEC will preclude any manual overrides, as it is meant to do, so as to assert that demanded highest organizational sensitivity level.

AA.2.8.0 DeClassifying and ReClassifying E-Mail

Security for workflows, transactions, and E-mail requires new paradigms because it is only partially addressed by current encryption methods. The current technology fails to address workflow, convenience, and distribution issues. Specifically, before and after encryption, the security gap reveals a window of opportunity to attack the plain-text. DigitalDoors specifically addresses the security of workflow, transmission, and e-mail with methods to distribute and provide granular leveled access to information. The two control points for securing e-mail with DeClassification are represented by the generation and distribution of the e-mail and the receiving and ReClassification (reconstitution of the critical and important information) of the e-mail.

AA.2.8.1 Generation and Distribution

There are several issues when securing e-mail. First, is the issue of sourcing e-mail. Although this generally occurs at the e-mail server or the e-mail client, frequently other applications directly initiate the e-mail transmission from within the applications themselves. Internet enablement and interprocess messaging represent serious growth areas in application development, for which DigitalDoors is expressly useful. We implement DeClassification e-mail generation from within applications directly by initiating the DeClassification process with multiple secured outputs where the declassified e-mail is an output. Second, we intercept the generation of e-mail and DeClassify it on the fly by initiating the DeClassification process with multiple secured outputs where the declassified e-mail is an output. Attachments can be unpacked and examined, declassified, and reprocessed as attachments. Third, we intercept outboxes and outgoing e-mail caches in order to initiate the DeClassification process with multiple secured outputs where the declassified e-mail is an output. Classified information is encrypted, MultiCrypted, and dispersed to local and/or remote storage locations. Storage of critical and important information is configured and dispersed to different storage locations including Internet and hosted storage options. Dispersal is controlled by policy, configuration options, and threat mode based on users, recipients, situational needs, e-mail content, and critical and important information categorization. For example, an e-mail containing names and credit card numbers can be DeClassified with each of the two (and other categories) dispersed to separate storage locations.

Distribution represents no changes to standard e-mail process in any form as standard address book processes are used. We can match the address book, names, or e-mail addresses against known threats or alter processing subject to the target addresses. Remailing could initiate a further downgrading (or even upgrading) of content when compared against target addresses. Distribution is nominally assumed to exist within a decentralized, distributed, and non-secured environment. There is no special need, effort, or consideration for distributing DeClassified e-mail as there are no changes within the workflow as perceived by users, servers, or other intermediate delivery processes. ReClassification is a function that is controlled and limited by the standard identification and authorization process. This includes the use of agents, and leveled access through secret sharing, alerts, threats, location, timing, policy, access to remote storage, and dispersive storage.

AA.2.8.2 Receiving and ReClassification

On the receiving side, DeClassified e-mail is received as a standard e-mail message that required no special treatment, process, or interface. DeClassified e-mail is the same as standard e-mail as there are no changes within the workflow as perceived by users, servers, or other intermediate delivery processes. The software for ReClassification is itself non-secured and contains no secrets. It is possible to key each ReClassification tool for unique access by specific user, location, document, timeframe, time expiration limitation, and other configuration.

The ReClassification process requires a downloadable user interface in the form of a e-mail client reader add-in or the use of our separate e-mail reader. Selection of a DeClassified e-mail message initiates a workflow process.

TABLE

DeClassified e-mail message workflow process

Identification and Authorization (either local or remote)
Lookup of recovery map information
Access control by time, location, threat mode, username, category, time of day, level hierarchy
Access to the recovery map (granular access controlled at all time)
Access control to dispersed storage locations
Recovery of dispersed classified critical and important information
Decryption of encrypted or MultiCrypted critical and important information
Reconstitution (ReClassification of DeClassified e-mail message)
Display within standard user interface of ReClassified e-mail message (Such as within e-mail client, PDA, etc.)
Display within separate e-mail reader/ReClassifier application Controlled release for ReClassification purposes can be limited such that different e-mail users will have leveled access to the e-mail message, for example, senior users can have access to the names and credit numbers on a granular basis whereas junior users cannot.

Workflow and transactional messaging activities that require e-mail, POP3, SMTP, IP, or other similar message flow can also be enabled to employ the remote distributed DeClassification and ReClassification processes in similar ways.

AA.2.8.3 Forwarding and Redelivery of E-Mail

The standard ReClassification process protects access to DeClassified e-mail while it is ReClassified. This retains control over information flow. Redelivery, forwarding, or remailing of the e-mail message prevents general exposure to critical and important elements, as only the DeClassified message can be forwarded or remailed. All subsequent readers of the e-mail will see only this DeClassified version as a minimum in security. However, access to the partial leveled or fully ReClassified document will require the standard access identification and authorization process.

It is also possible to embed within the browser tools—assuming control over the e-mail reading environment within an organization—indicators to further DeClassify e-mail prior to forwarding or redelivery of previously downgraded e-mail messages.

AA.2.8.4 Content Filtering

Content filtering includes declassification downgrading but also more typical filtering, document retention, and e-mail attachment retention policies, as implemented by other e-mail products. The major difference between typical filtering technology and DigitalDoors, is the ability of the mail recipient to potential review the e-mail message and all attachments reconstituted in full, not just as filtered and delivered. The core engine supports classification by word type. Forty categories are currently supported. We are adding politically correct, hate mongering, job resumes, pornography, drug culture, games and jokes, spam, and others as specified. DigitalDoors can filter outgoing and forwarded e-mail for .com, .exe, sys, .ovl, .dll, .ocx, .prg, and script attachments and even search within these data streams for known file infection patterns. Message subject, content, and attachments are processed. In addition to standard content filtering, DigitalDoors also assesses target e-mail addresses including to, cc, and bcc. The workflow is basically one of reviewing inbound and outbound messages for content. When excessive amounts of messages cannot be processed in real-time, they are parked for later processing in a temporary folder. Administrator (not user) configuration defines whether copies are made, saved, or deleted. Reports explain actions taken and the event logging databases provide analysis into the e-mail declassification and filtering process.

AA.2.8.5 Processing E-Mail

DigitalDoors was envisioned as a solution for security in complex workflows as opposed to point solutions for files, records, or databases. As such, the modularized structure of the suite, the support data structures, and databases, and the flexibility for semaphores, interprocess communication, and command line arguments have allowed us to integrate the DigitalDoors suite into Microsoft Outlook, one of the most proprietary and awkward software development platforms imaginable. As a result of this integration effort, DigitalDoors for Outlook runs virtually transparently as part of the normal Outlook workflow. In fact, it is a structured as a standard .DLL add-in library.

New messages are DeClassified prior to outgoing delivery and received messages are automatically ReClassified for users according to security levels. Recovery information widely dispersed and distributed on VPNs or Internet-attached networks are easily mapped into the received e-mail for real-time display. Reconstitution times compare to wire speed and are several magnitudes faster than traditional encryption technologies. Revocation of access, revocation of messages sent in error, and location-specific security is enforced as with all DigitalDoors technologies.

As with most workflow integration efforts, maintenance of security and smoothness of operations dwarfed programming issues. System timing, order of process, access control, workability, and other reliability overshadowed code concerns. Interception of events inside the Outlook framework proved the most fearsome constraints; these problems have since been overcome. However, it is important to document the workflow for security reasons.

All DigitalDoors process within Outlook are transparent where possible, all standard outlook functions, features, and workflows are maintained intact, and we succeeded at not altering the user interface with the exception of several toolbar buttons for online help and specific DigitalDoors functions. The creation of a new or forwarded e-mail message occurs without change in the user interface. An additional DigitalDoors user logon is required for all DeClassification and ReClassification consistent with the DigitalDoors desktop Suite. Administrative and user controls are configured through the DigitalDoors Suite. Outlook username names, MS Exchange interfaces, e-mail addresses, passwords, and other Outlook-specific settings are maintained and function identically with or without the DigitalDoors for Outlook.DLL add-in.

While the external workflow is not altered from the user's perspective, several internal changes are important to document. First, e-mail messages are constructed through four primary mechanisms. First, they are created as new. Second, they are forwarded or responded to. Third, messages are constructed as drafts. Fourth messages are copied and pasted. Other workflows are possible with MS Exchange, other Microsoft workgroup messaging tools, and third-party .DLL add-ins. User-created or third-party .OPM or VB scripts should function normally with the DigitalDoors for Outlook.DLL installed, however, we frown on such tools as significant security holes and for the potential conflicts with other add-ins, overlapping scripts, and potential to create holes for viruses and opportunities for script kiddies. Our initial scripts were converted and compiled into the more-secure MS-preferred .DLL add-in formats. Note that VBA, VB scripts, and other tools can undermine Outlook security, the Outlook security patches that prevent scripts from running, and create many security concerns. We suggest you avoid that path. Nevertheless, the DigitalDoors process remains the same throughout whether other scripts are installed.

New message events are trapped. The outgoing Outbox message is moved into a cache folder for processing. DeClassification processing occurs per administrative configuration. The message is parsed completely by means of the MS Outlook message object structure. A temporary input file is constructed. This file is passed through a system shell function to the DeClassify application. The temporary file is processed by this application and a temporary output DeClassified file is created. The recovery map and files are also created and dispersed per administrative configuration. The DeClassify application deletes all traces of the temporary input file as per administrative configuration. This includes overwrites per SAS, Orange Book, and other security standards for file erasure. The DeClassify application completes. The temporary output DeClassified file replaces the contents of the original outlook message. The message is returned to the Outlook Outbox folder and delivered per standard Outlook configuration.

ReClassification occurs when a user selects an Inbox message. If the message has been DeClassify, the selection event is intercepted and the temporary input DeClassified file is created. This file is passed through a system shell function to the ReClassify application. The temporary file is processed by this application and a temporary ReClassified output is displayed. All user-specific DigitalDoors security measures are applied to the level of granular recovery, access controls, location, and other limitations. The DeClassify application deletes all traces of the temporary input file as per administrative configuration. This includes overwrites per SAS, Orange Book, and other security standards for file erasure. The ReClassify application completes.

AA.2.9.0 Declassifying and Reclassifying while Browsing the Web

Security for workflows, transactions, and information stores while browsing the Internet and Intranet webs require new paradigms because it is only partially addressed by current methods. The current technology fails to address workflow, convenience, and distribution issues for public and private information, the granularity of delivery for that information, or the centralized and decentralized access to that information. DigitalDoors specifically addresses the security of workflow, transmission, and browsing with methods to distribute and provide granular leveled access to information. The two control points for securing browsing with DeClassification are represented by the de facto delivery of declassified information with access to immediately reclassified information subject to secondary identification and authorization.

AA.2.9.1 Generation and Distribution:

There are several issues when securing browsing and access to data (web pages, tables, data sets, and linked files). First, is the issue of sourcing information and downgrading it for general presentation. DigitalDoors implements DeClassification for all data stored directly by initiating the DeClassification process with multiple secured outputs where the declassified data is an output. Second, access to the ReClassified material is generated on-the-fly subject to identification and authorization. This is accomplished by initiating the DeClassification process with multiple secured outputs where the declassified data is an input along with the critical and important extracts.

Classified information is encrypted, MultiCrypted, and dispersed to local and/or remote storage locations. Storage of critical and important information is configured and dispersed to different storage locations including Internet and hosted storage options. Dispersal is controlled by policy, configuration options, and threat mode based on users, recipients, situational needs, browsing content, and critical and important information categorization. For example, a static web page or even one generated dynamically from a database containing names and credit card numbers can be DeClassified with each of the two (and other categories) dispersed to separate storage locations.

Distribution represents no changes to standard browsing process in any form except for dynamically-generated pages require a dynamic recovery file. Distribution is nominally assumed to exist within a decentralized, distributed, and non-secured environment. There is no special need, effort, or consideration for distributing DeClassified browsing as there are no changes within the workflow as perceived by users, servers, or other intermediate delivery processes. Because all static pages are stored in the DeClassified format, access to all pages in a ReClassified format is on a per page basis.

ReClassification is a function that is controlled and limited by the standard identification and authorization process. This includes the use of agents, and leveled access through secret sharing, alerts, threats, location, timing, policy, access to remote storage, and dispersive storage.

AA.2.9.2 Receiving and ReClassification

On the receiving side, DeClassified browsing is received as a standard data that required no special treatment, process, or interface. DeClassified browsing is the same as standard browsing as there are no changes within the workflow as perceived by users, servers, or other intermediate delivery processes. The software for ReClassification is itself non-secured and contains no secrets. It is possible to key each ReClassification tool for unique access by specific user, location, document, timeframe, time expiration limitation, and other configuration.

A healthy security state for an organization is the state in which its files are redacted/scrubbed and are in essence frames populated with skeleton content that allow continuation of operations.

The ideal security scenario for an organization is the state of formlessness where almost all of the information in a file is extracted and the result is a state of formless the form has evaporated. A withdrawal of sensitive extracts calls for a highly organized process. To achieve that every content element needs to be automatically or manually categorized, and inventoried. The categorization of all content elements in the file is the basic and beginning step. Following that extraction of sensitive elements takes place. The extraction can be done manually, automatically of a blend of both manual and automatic.

Automatic extraction is based on combination of different semantic filters.

AA.1.14.0 Taking Advantage of a Major Economic Imbalance

Society gives lip service to information being a valuable asset but in reality it is mostly considered valueless. As an example the Internet which contains many Billions of documents which are there for any taker for free. Another example is the current accounting methodologies do not value information as an asset on the balance sheet.

The lack of recognition of the value of information leads to:

1) Lack of inventorying of information assets in organizations (60%-85% of the data is unstructured)

2) The lack of information inventory precludes from using current information assets as economic assets as well as from building upon those information assets to create more assets. The current environment of valueless information assets precludes us from monetizing those assets. The bottom line is we are losing economically by not being able to inventory our existing assets, and not being able to monetize them.

The crucial imbalance in the basic recognition of information as valuable assets and thereafter an underutilization of such information assets is an economic flow and an unreasonable aberration. Understanding such an imbalance and taking advantage of it will lead to substantial economic gains.

Society for 20 years has focused on the perimeter on the tools storing and processing information and not on the substance it self: the information and the content. The focus on the computing and storage tools was spearheaded by vendors who have made hundreds of billions of dollars selling their products. Dealing with the content became the niche of only few small companies. The resulting situation is that 60%-to 85% of the information of organizations is unstructured, which means the information is un-inventoried and therefore mostly unusable.

In essence even with trillions of dollars of purchases of IT tools and capabilities over the past 2 decades most organizations can't access process and leverage between 60 to 85% of their information.

Organizations can't show Internal Rates of Return (IRR) on their information investments because they really never treated the information as an asset class on its own merit with an economic value. There was no inventory, therefore no value could have been attached to those assets and now there is nothing to show for.

AA.1.15.0 Monetizing the Organization'S Information Assets:

To take full advantage of the major economic imbalance in information the following steps are proposed:

1) Inventorying the Information Assets

There is a need to establish an information inventorying process in the organization. The same way that retail stores or supermarkets inventory all their merchandise using barcodes, information assets throughout the organization must be inventoried. All information assets must be classified and tagged. This inventorying effort must cover, structured, unstructured and semi structured (e-mail) information.

2) Data Mining—Enlarging the Information Asset Base

After assets are accounted for in an inventory, organized efforts must be undertaken to enlarge the base of those assets that are important to the organization.

The subjects of importance will be inputted into a datamining engine, which will search the Internet and other sources for relevant data assets.

3) Leveraging Automation and Legal Power—The Innovation Production Line

After relevant assets are located, they will be analyzed automatically and categorized into assets that are to be treated as trade secrets—(potential contacts, leads etc to be stored in data bases.) and ideas that are of important values and need to be secured by patent protection.

Innovative ideas will be processed automatically and inserted automatically into templates of Provisional patents. The provisional patents will be sent automatically by e-mail to the patent office with automated payment.

By inserting legal framework such as patents trademarks etc into the newly formed information products the value of the information product grows substantially. To maximize the value of the created information assets people should be involved in the process to twick the input the system receives for example inputting additional key words.

4) Leveraging Web Scalability—The Innovation Factory

To take full advantage of being early in the market to benefit from the big information imbalance, there is a need to leverage the scalability of the web. Specifically to leverage the new social graphs capabilities.

Combining an automatic information assets production line with interaction of many people across the web to fine tune the production process will create a powerful combination—bringing an automated information creation process with the innovative input of many people.

5) Monetization

As the organization creates information products, the organization can sell such products to partners as well as to the public over the web.

Proposed model is using DigitalDoors controlled release process to sell parts of the created assets over the Internet. For example releasing first part for free the other parts for payment.

AA.1.16.0 Information Disassembly and Reassembly

AA.1.16.1 Disassemblying Information

Anyone can easily encrypt, shred, delete, or destroy information so that it no longer retains utility. However, DigitalDoors takes information apart, specifically information represented by any arbitrary data stream, removing any utility, so that it can be reassembled for later use. Information is selected in various ways, selections containing a paragraph, sentence, line, word, or character, and are extracted from the data stream.

When information is taken apart, the message is changed, obscured, broken, and the entropy of the parts is increased. Entropy is the solution to government-sponsored terrorism, criminal-initiated attacks for financial gain, or preserving the economic stability of entire sectors or even nations. This creates a flexible, enduring, and inherently independent security method. This information disassembly is consistent with the need to implement privacy, confidentiality, resilience, continuity, and survivability in the ecosystem of previously inconsistent goals of mutual security, information sharing, and knowledge discovery.

Information reassembly ranges from zero to full reconstitution in minute rheostat degrees under granular control. In other words, you can get none, some little, some more, or all of the data stream back. Information is encoded with one or more systems of labels and tags or classifications DigitalDoors supports a system of arbitrary, unlimited, overlapping tags so that preplanned, far-ranging, or multipurpose utility is supported, and a utility that is not preconditioned on information source, intended usage, or the application of increasingly sophisticated knowledge management tools that can rework or expose information secured under existing systems.

Tagging is supported both as in-channel codes, a metadata, and out-of-channel markup. The out-of-channel is the preferred method because of its enhance security and lack of additional information for inference. Granular control means that arbitrary systems of user access control can be applied to the rheostat. Granular control includes sensitivity level, compartment, word or phrase categorization, role, group membership, syntactical element, mission, location, time of day, payment or trade, and other tags or labels.

Realize that tags condense and synopsize data streams, usually within a cultural context, and tags represent a denser risk than the initial content. Separation of content, randomization of context, and limited connection to tags are important security features.

Why disassemble information? DigitalDoors does this to enable security, privacy, confidentiality, functionality, survivability, and compliance, among other reasons.

AA.1.16.2 The Reasons for Disassembly

Security establishes a state of freedom from danger, harm, or risk of loss.

Privacy is instituted by a method, desire, or process to maintain personal, business, or corporate identity without releasing it to others.

Confidentiality is an expectation and workflow process that ensures that the content of a transmitted message cannot be determined except by the possessor of a key associated with the message, even if the transmitted bits are observed.

Survivability means that dispersed information can be regrouped to reconstitute the whole.

Compliance means that the technology fulfills the legal or organizational requirements to protect and retain confidentiality of data and process protection.

Information generally exists within a structure dictated by purpose or the software tool used to create, collate, organize, store, distribute, or share it. The structure can be a document format, a file format, a database table or many associated tables, a Microsoft Word document, or an explicit structure (such as a TIF image format).

More often than not the structure is a metadata hierarchy. All of these structures, whether defined internally or externally or by the application, are ultimately a purpose-specific implementation of metadata. Even where these structures are buried within a code library or specific instructions that shave off pieces of information from an application data file, every organization of any data stream can be converted and represented by a metadata definition, and, is ultimately a metadata hierarchy.

A metadata hierarchy is a security, privacy, and confidentiality risk combined with but also apart from the data stream. The problem is that metadata is an all-purpose file structure until itself that also defines data streams within, redefines purpose and usage of imbedded data streams, and supports the inclusion of functionality. Metadata is so flexible and generic that infinite layers of purported but obscured utility can mask, distort, or hide data within. Often, the metadata hides more information and risk than the expected data stream within. Metadata in any form, whether data, application, or mixed from both provides powerful clues that enable aggregation, inference, and interaction undermining traditional security methods.

DigitalDoors removes this metadata and creates raw data streams in primitive forms that can be secured. DigitalDoors can secure the data stream and reintroduce the metadata. However, reintroducing metadata restores the risk from the metadata, maybe not the same metadata, but enough that recreates measurable and significant security risk. However, disassembling the data stream specifically and reconstituting the information as needed enables a wide range of security, and depending on the substitution techniques applied, also maintains the consistency and functionality of the data for most information processing operations.

Note that some structured financial data can be secured in this manner—although the need to maintain posting, trial balances, and consistency between accounts and roll-ups complicates—but does not preclude—the process of creating secured but working data streams through selective data extraction and granular content control.

AA.1.16.3 Finding Value within Information

Value of information is found in the data stream and through its meaning, utility, and purpose. Value is tied to paragraphs, sentences, phrases, words, or characters. However, value is also greater than the sum of the parts, so that aggregation, inference, and interaction both internally and with additional external data sources represents an important security consideration. Value is modified by encoding method and can be covertly enhanced by the encoding method or metadata structure. Every computer file exists in storage in a linear representation of "0s" and "1's" that ultimately is organized or clumped into units of meaning.

The data stream is an information flow with a starting point and a length. It does not matter how it is encoded or how the data stream represents information. Text, text in any language, text defined by words or larger units of paragraphs, numbers, names, words, images, sound, video, signals, data sets, and so forth are all represented by a data stream. One of the key benefits of the DigitalDoors technology is the recognition of risk in units far less monolithic than an entire document or document package. Granularity is achievable at word, character, symbol, or image bit levels. As such, security can be effected so that the choice is not whether to distribute a document or not, but what parts of the document can be distributed to what sensitivity levels, to which users, and under what controls. Documents do not have to be rewritten, ghosted, or endlessly tear lined but can be automatically processed once and distributed in Secured form or granular reconstituted streams at any time now or in the future. Recallable granular content control overcomes the time element to existing security paradigms; so in effect you can "put the cat back into the bag."

DigitalDoors support uncontrolled secondary or tertiary distribution without fear of compromise in sources, methods, security, or repurposing.

DigitalDoors applies automatic methods, white lists, gray lists, black lists, complex Boolean and placement associations, symbol recognition, categorization to value selection and subsequent information extraction. These lists (actually database entries) need only be consistent with the type of data stream, the language, and the encoding methods. An organization can create multiple databases for different languages, for example, and apply one, some, or many. Database entries to match sound, images, or video overlay apply just the same way as text, although sub-message element selection is specific to channel, encoding, or fuzzy matches in terms of non-linear placement. This is pertinent to mixed media, as in sounds or images.

It is important to recognize that selection is multitasking, supporting manual, assisted, and automatic features, supporting any order of use or reuse, with manual editing and removal of any and all selections at any time with reapplication of any of the manual, assisted, or automatic methods again. Note, however, that COMSEC recognition finalizes selection that cannot be overridden, for obvious reasons of enforcement. However, new selection methods (not currently imagined) can added into DigitalDoors to augment or enhance the recognition of aggregation, inference, and interaction.

AA1.16.4 The Doctrine Behind Digitaldoors

As explained, finding information in a data stream is necessary and, independent from the DigitalDoors process. DigitalDoors applies automatic methods, white lists, gray lists, black lists, complex Boolean and placement associations, categorization, manual user selection, manual overrides, and can included other methods as they are developed and proven effective. However, after selection takes places, all of these selections must be reconciled for overlap and conflict. We do this by analyzing selections in a table.

All selections are defined by a starting offset and an ending offset. This technology is consistent for all types of data streams and encoding methods. Extracting the selections is not always simple or straightforward because excising the information is contingent on foolproof reconstitution and the application or MilSpec security techniques embodied by the Bell-Lapadula Model (BLM), Saltzer & Schroeder's Principles of Secure Design, and others.

It is a significant complication applicable to the architecture of security ecosystem design for the military or for business. DigitalDoors stores selections that are extracted in one, many, or distributed locations. Reconstitution can occur in steps (like defenses-in-depth), up to a predefined sensitivity level, or to full reconstitution. Because of this, starting and ending offsets as defined by the selection process, change as a function of selection priorities and positional precedence. Selections are not independent until DigitalDoors extracts them and creates a recovery file. Selection dispersion creates data independence by virtue of contextual dissociation; this can be further enhanced uniform data stores by creating random chaff. In other words, the position of all selections is a complex simultaneous choreography that depends on the selection and categorization of all prior selections.

For example, selection priorities and positional precedence becomes important when extracting selections to create directory, recovery, and secured files. This can be a complicate multi-path choreographed hierarchy for conformance to cross-domain MLS information sharing ecosystems. Specifically, certain security and versioning options requires a multithreaded pass first ordered by position (starting to ending) with each sensitivity level (starting to ending) for the recovery files to conform with BLM. Then certain security and versioning options requires a second multithreaded pass ordered only by position (high to low) to create the secured files since each subsequent selection is dependent on the (missing) positions of any and all prior selections.

For example, consider this well-known 35 letter pangram (e.g. holoalphabetic sentence uses every letter of the alphabet at least once).

TABLE

Holoralphabetic Sentence

| 1 | 5 | 11 | 17 | 20 | 27 | 32 | 35 | 40 |
|---|---|----|----|----|----|----|----|----|

The quick brown fox jumped over the lazy dog.
[S] quick
[C] brown
[TS] fox
[S] dog
and by default the unselected remainder is [U] The jumped over the lazy.
Sensitivity level: [U]<[C]<[S]<[TS] and defines the necessary order of reconstitution.
brown is removed first and coded at position 5 to reflect positional dependency on quick.
quick is removed next and coded at position 5 without any positional dependency.
dog is removed next and coded at position 37 to reflect positional dependency on fox.
fox is coded and removed last and coded at position 17 because it is conditionally independent of all three other extractions.
On reconstitution, "brown" is inserted into the 5th position to yield
The brown jumped over the lazy.
On reconstitution, "quick" is inserted into the 5th position to yield The quick brown jumped over the lazy.
On reconstitution, "dog" is inserted into the 37th position to yield The quick brown jumped over the lazy dog.

Reconstruction is dependent too. The position of all selections is a complex simultaneous choreography that depends on the selection and categorization of all prior selections. This explains the dispersion variants and various levels of available conformance to BLM. Full support for all possible failures and complications is just not possible as this is N! problem. As a result, some variants provide survivability with full recovery or only partial recovery with a full security breach. There costs, speeds, and overheads fully reflect the level of service provided.

On reconstitution, "fox" is inserted into the 17th position to yield The quick brown fox jumped over the lazy dog. Its placement is contingent on the positional dependency of the three lower sensitivity level selections, but its displacement is unchanged because all precedence conditions have been previously met.

Linguistic syntax and inference issues plays into the automated selection and extraction of information. Names, locations, compound terms, data formats, common cultural phrases, aphorisms, white space, punctuation, numbers, quotations, parentheses, modifiers to nouns and verbs, and other constructs need to be excised in most cases so as not to leave a telltale gap in the Secured file. For this reason, substitution without any form of placeholders is advisable and careful removal of indications of special data formats is also indicated. For example, the removal of numbers within "05/06/23" into the substitutions "/ /" or "//" is very obvious and informative. Removal of the entire syntactical expression is indicated.

For example, the removal from "former president William Jefferson Clinton" leaving only "former president William" provides useful re-identification clues in that there are only a limited number of former presidents, few have the first name "William", and fewer still fall within a recent time period warranting security by partial selection and extraction of information. Inference requires assessment of selection by the full phrase, an entire line, an entire sentence, an entire paragraph. It is a complicated assessment of additional information within the data stream that refers to the sensitive item and exactly how it and all references need to be excised. As previously stated, information value is not specifically internalized because other internal content, external data sources, a priore knowledge, context, and concepts are useful for establishing aggregation, inference, and data-to-data interaction. In addition, usage, intent of secret protection, distribution, and secondary information sharing policies all dictate the actual scope of selection, selection categorization and sensitivity level encoding, and the granular control allowed in reconstitution.

AA.1.16.5 Reconstituting Information

At this point, information meets with policy, security law, governance issues, and compliance rules. Other existing security technology can provide similar results by tear lining and encrypting the streams; however, information is locked up and generally accessible only through a primitive filter that offers only the choice of all or nothing. This is also true of indexes and catalogs, which like tags, represent a condensation and synopsis of the original content. Instead, DigitalDoors provides functional Secured files and additionally granular content control for getting more of that information out to people and processes. Reconstituting files with granular content control means data dispersal and information sharing is not an either/or scenario because specific reconstitution(s) of information can be delivered as needed to one or many different user, groups, parties, or processes.

Reconstitution is not a monolithic process, nor does it happen in exactly the same way for all dispersion locations and methods. Different dispersion methods utilize different storage locations and different reassembly protocols. Specifically, the DigitalDoors patents define several methods all utilized by the Secure/View DigitalDoors applications. Directory files (the map) details source information, recovery file locations, Secured file locations, and key file locations. The directory is optional and can be rolled up into recovery files. Note that various encryption options can be applied granularly to directory, recovery, secured, and key files, such that some or all are encrypted, encrypted with a one time pad for each file or each separate recovery selection line item, or encrypted through access to a public key infrastructure.

Security is herein rendered by reduction in metadata, format, encoding, and complexity. The information is dispersed, contexts are broken, and entropy is increased; this creates security. DigitalDoors does not affect security by methods presumed to be secure because they are proprietary, concealed, or obscured. The explanation for why this works can be found in the Third Law of Thermodynamics and the mathematics are completely consistent with statistical methods. Saltzer & Schroeder's Principles of Secure Design define an economy of design, failsafe defaults, complete mediation, open design, separation of privilege, and least privilege. The simplest mechanism to Secure and reconstitute the data streams, and simple enough so that everybody can understand the process. This explains the removal of metadata and formatting creating the simplest data stream that can be openly secures at all sensitivity levels and other dimensions of categorization.

Note that the reconstitution order proceeds from lowest sensitivity level to highest, from lowest compartment to highest, and so forth because access to higher levels is presumed to be progressively limited and the reconstitution of higher sensitivity level elements depend on the prior placement of the lower level elements. This is a functional necessity of the previously defined multithreaded extraction process. Also note implementation minimizes the amount of the recovery metadata necessary to reconstitute a Secured data stream. It is possible to define recovery information through indexing, hashing, and positional designations more complicated than positional offset but only through the creation of more metadata compromising basic security that is the fundamental goal of DigitalDoors technology, complexity and slow speed of process, and the creation of new avenues of inference, aggregation, and interaction.

Security is effected herein by the destruction of context, the rendering of inferential clues, and dispersion of essential selections thereby leaving a redacted data stream that can be delivered as is or reversibly reconstituted under progressive granular control until it fulfills processing, sharing, or knowledge exploration needs.

A document can be redacted to a secure state and the recovery image of the extractions is created in situ as a reconstitution overlay, sort of like a positive/negative photograph. Extractions can be defined for each sensitivity level, compartment, mission, group, et cetera, and aggregated together to form one or more recovery files for each or every mix of granular specification.

A document can be redacted to a secure state and the recovery image of the extractions are created separately as line items within a flat ASCII recovery files. Extractions can be defined for each sensitivity level, compartment mission, group, et cetera, and aggregated together to form one or more recovery files for each or every mix of granular specification. The recovery file details for each extraction, its category, its starting location, its ending location, its length, any replacement length for in situ substitutions (even if only one-for-one spaces), and the actual extraction. Note that variants on the format of the recovery file support overboard dispersion with separate encryption for each extraction applying unique keys for each. Details of the recovery variants are defined elsewhere. Recovery files can be stored locally or dispersed to MLS-compliant storage facilities.

A document can be redacted to different secured states (that is, versions) defined by each sensitivity level, compartment, mission, group, et cetera, with recovery data rolled up for recovery for each sensitivity level, compartment mission, group, et cetera. Rolled up recovery files contain line items up to and including sensitivity levels for each designated dispersed remote storage.

A document can be redacted to different secured states (that is, versions) defined by each sensitivity level, compartment, mission, group, et cetera, with recovery data dispersed to separate and unique storage for each line item. Note that the dispersion of line item extractions obstructs the basic intrinsic context to the Secured file while increasing the randomness (and quite literally the corresponding entropy within each package of directory, recovery, secured, and key file sets) and lack of context for each of the dispersed extractions.

The above outlined dispersion and recovery methods fulfill different functional and security requirements. The differing dispersion and recovery methods make tradeoffs in terms of reconstitution overhead, complexity, and processing with redundancy and accessibility to that offset the risks from aggregation, inference, and interaction. Although DigitalDoors enables security with functionality rather than as a linear tradeoff between the two, DigitalDoors dispersion methods engender a different tradeoff with reconstitution reliability. It is not a costless tradeoff, but it is a necessary one if you must enable a data stream security ecosystem within an open and functional network infrastructure lacking hardened perimeters.

AA.1.16.6 Directory Files

Directory files contain map information to recovery files and represent a physical and logical displacement to secured sensitive information in recovery files. This enables additional opportunities for granular security and privacy in conjunction with information sharing and knowledge discovery. The information is dispersed, contexts are broken, and entropy is increased; this creates security. You can envision this process like that of a railroad switching yard containing many uniform boxcars with different content. By dispersing content, the context and utility of the sensitive information is broken with respect to the source and the aggregation of randomized extractions adds to the implementation of security through the $4^{th}$ law of thermodynamics. When directory files do not exist for a given redacted data source, the View applet seeks recovery files directly in anticipation of rolled up recovery files in any of the supported optional formats, accessible dispersion locations, and encryption or key management controls.

AA.1.16.7 A Compound Data Stream that can be Stripped into Granular Items

It is all about data. Data is the content qualified by a context and concept. Everything else is just proxy. Existing solutions are complex workarounds in the face of a unifying data theory within security ecosystem. A number of conceptual problems disappear with the simplification of workflow and communications into the storage, manipulation, and delivery of data. With this emphasis shifted to a data-centric view, we can successfully search, secure, and share with categorization, and better exploit information processing and communication workflow. The consequence of a simplified view is a simplified security environment not based on point solutions but that actually works as an ecosystem.

The complexity of information processing and communications, infrastructure, security, and data structure evolution have driven wedges into information technology workflow. As a result, divergent insular solutions and the enforced separation of process and storage exacerbate the differences rather than lead to simplicity and integration. Insular solutions require additional effort not only to resolve the problems discretely for each area but also to create temporary bridges between areas, an effort disproportionate to the requirements. It is also counterproductive when false positives and negatives require frequent user override responses or when the point solutions preclude or corrupt workflow. This impasse is most evident with air-gapped legacy production facilities and the complex integration of distributed workflow. Additionally, insular solutions and bridges sow conflict, adding complexity to disrupt the workflow within each area or among them. Although vendors are integrating routers, guards, IDS, IPS, viral scanners into suites or unifying products, this approach addresses the proxy activity rather than the data itself, the fundamental basis for and result from activity.

Furthermore, virtualization and the distribution of storage, processing, and communications to the edge are showing that workflow and application processing are potentially independent but interrelated. Code is just a metadata package. In effect, job control code, macros, applets, and entire applications are structures that can be distributed and run almost anywhere. These structures are data, or metadata, and are delivered like any traditional data set. SOA and SaaS insinuate the viability of this theory. Any differences between a traditional notion of data and the application as data is summarized by the different methods used to collect, collate, distribute, and present them, but not at all in the data structure.

AA.1.16.8. Data Unification

Throughout this discussion, data is defined as any data stream regardless of internal format, purpose, intent, or structure. A data file is data. A document from Word is data (with imbedded metadata). An email message traversing a communications channel is data. An application stored on local disk or invoked from a web-interface is a file and is also data. Anything that can be represented within a metadata structure is data even if it is all application code or contains macros with event-driven code. This paper asserts that applications are nothing more than data asserted as a code invoked through a process (like a CPU). It is a delivery and processing workflow. Applications become nothing more that destinations; rather than delivering data to storage, the data is delivered to the workflow This last assertion disconcerts some people who want to think that an application is a special set of instructions but overlook that it has structure and also because it often includes imbedded data is thus different entirely from a data store. The difference is purely contextual or conceptual, but the content is nevertheless the content of some data stream. Data acquisition, production, parsing, formatting, presentation, interpretation, categorization, and purpose are different between a pure data set and an application code, but this is also true between different data sets. Consider the difference between an MS Word document and an MS Access data set, but both are considered unstructured data streams.

Distinctions are completely contextual and predicated on what acts on the data sets, parts of the data sets, or how they are transformed for new and different purposes.

Is there a difference between an application and the data set? Of course there is, but differences are arbitrary based on usage and purpose. The difference exists mostly due to the historical development paths apparent within information technology. Most people are not likely to distinguish a difference, although support developers and architects will. But even developers and architects are users too most of the time, and these arbitrary and imposed differences become less consequential. Consider: A difference between a zip file and a self-executing zip archive? A difference between a document file, an Acrobat file, and an Acrobat file with a built-in e-book reader? A difference between an application and a data set, a portable database application and the data set, and an application bound to the data set? Each can represent the same purpose, be repackaged in different ways, and be invoked in different ways—implicitly or explicitly, or by the file type assignments in the desktop—but desktop shortcuts mask such differences to the user.

All represent complex structures containing a traditional data core. Maps define execution entry points, module jump entry points, loaders and triggers for interspatial macros, and formats for parameter passing between functions. The map is (usually) a simple schema.

Consider that applications are specialized streams of data stored as a file. The structure includes a loader, the application, data space, buffer space, and increasingly the support for a digital signature validation of integrity. Malware insinuates itself inside the application file directly or as a jump vector to another file stored in memory or long-term storage. Although most data files preclude operative insertion of malware because it will force failure or be a visible attack, hierarchical and DOM data files can hide and execute malware through the built-in triggers. This malware lies dormant awaiting the specific activating trigger. Even when malware corruption is actually visible and obvious or violates the properties and attributes that are used to validate a data range, discovery is unlikely unless the actual data range is viewed or tested against acceptable properties and attributes.

Many workflows invoke the properties and attributes only at specific steps, for example, as a format immediately prior to presentation or after data is presented and altered by the user or process. Alternative steps can and do violate that intent, and this potential grows as data and applications are increasingly abstracted as hierarchical metadata and multi-purpose document object models (DOM).

Hierarchical and DOM data files frequently include links, references, macros, applets, helper tools, or even extensive applications. While it is equally correct to assert that data files are becoming applications as it is to assert that applications are specialized data files, this paper demonstrates that is more useful and unifying to view everything as a data structure. In one sense, an application turned inside out is a data set with the application inclusion. Although the usage emphasis is on the application functionality rather than data content, the application is really nothing more than, and usefully visualized as, a compound inclusion within a data structure. Data complexity ranges from the simplest form to the hierarchical tree with imbedded compound inclusions, each of which can itself be a hierarchical tree with imbedded compound inclusions.

The most complex data structure we know about is DNA that includes some 4 billion combinations of UCAG amino acid types. Although DNA is clearly a data stream, it is a convoluted tree with hierarchical structures, external references, and imbedded compound inclusions. These imbedded compound inclusions are expressed as RNA chemical factories which create more complex amino acids and other precursors to life or even life itself. Aggregations and combinations of different parts of the same DNA chain or even external DNA, prions, proteins, free fragments of DNA or RNA, and other molecules with chemically-receptive sites for bonding to the UCAG pairs or the RNA receptors create new data, new triggers and events, and even new life forms. Other DigitalDoors white papers expand on the issue of DNA and RNA, MS Office metadata files, and the various document object models. The point herein is that DNA is primarily a data structure that is parsed and activated to initiate macros, applets, and full-scale applications.

This section defines data structures from the simplest to the most complex. Data structures include the simplest representation of data, such a single item. An item is represented by a range of granularity and purpose; it can be a value, an add and, a subtract and, a multiplier, a base, a numerator, a denominator, a single fact, and a DigitalDoors granular content item. Containment of even that simplest of items is dependent on format, structure, purpose, infrastructure, and representation. The item could be the DNA UCAG or a compound UCAG-encoded molecule. More complex data formats include field-oriented data, such as a document with multiple position-oriented items. Padding, such as found in compound molecules, create the infrastructure to support these key items or bonding receptors. This document might be an e-mail message or a stripped announcement of a transaction, including a buyer, a seller, a product, a price, an extent; in other words, a line item transaction. The padding provides simple format or demarcation field control or more complex mixed-purpose usage for process functionality and also human readability. Field-oriented data formats support the transition to tagged data as seen with human-readable data files, application and system configuration files, or the MS Windows directory hive.

Tagged data transitions to row-oriented data transactions where the patterns among the records are repetitive with columns represent distinct fields.

These include sucrose, glucose, fructose and other energy sources for RNA process functionality. Although each sugar is different, the format is significantly similar. In the same way, row-oriented records provide the fodder for simple computerized processes.

Row-oriented data can include serialized or multiple complex indices (indexes).

Indices have multiple purposes both in terms of processing for assessment and interpretation for display. Indices are special items that provide context through association. When indexes become more complicated, they form the basis for locating information or establishing references between data within a structured database, either relational or object-oriented tables. The structure for the rows, the relationships between indexes and items, and other relationships are described by an implicit or explicit schema. The schema is an internal or a separate externalized skeleton that supports the data structure. The issue of internalized or externalized schema, that is the application of structure and categorization, is purely an efficiency, reuse, and packaging issue. This is an another arbitrary complexity that is not needed for a data-centric model and the ensuing unifying security ecosystem.

The schema also defines the format and representation of items in terms of encoding, presentation, interpretation, and structure. For example, data can be encoded as binary, bits, decimal, ASCII, encryption, compression, or have meaningful utility only when used correctly. Binary large object (BLOB) fields can retain application code (source or machine code), sound, images, large documents, or other arbitrary data. The meaning for all of these BLOB fields is dependent on purpose, usage, format, structure, and intent. Consider executing a sound file or trying to hear an image.

When the schema is externalized or internalized as embedded tags and metatags within the data stream, the complexity of the data stream can increase. Hierarchical structures defined by a root node and branches form the basis for the DOM used by most modern desktop applications, such as the MS Office family. Not only does it support rich text formation, graphic layout, it also allows for unlimited complexity. The branches support items of any type, inclusions of any type, tags that define content, context and concept, establish links and references, or support compound macros, applets, filters, and code.

When the schema is referenced to an external template file, as with HTML or XML, the context is defined externally. When such schemas are self-documenting with tags, metatags, metadata, and the fractal-like self-similarity of nodes, the context is internally defined. However, associations to new schemas, (imposition of a new style sheet, for example), combinations with data from other sources, can alter the interpretation of the content, how it is contextual applied, and support new concepts not obvious or overtly seen. This is the basis not only for data mining and search, but also for DigitalDoors-based security methods. Hierarchical files with both internal and external schemas pose new problems in terms of aggregation, inference, and data-to-data interaction, and this redraws the map of data content, context, and concept. Tags, metatags, metadata, comments, links, references, and imbedded code can be combined with intent improvised to disrupt, damage, or combine into new usage in conflict with anticipated point-security solutions.

Output from applications or complex SOA workflow are usually in the form of messages, code modules, reports, or human-usable triggers. These are also data streams in one format or another, but nevertheless still a data stream. Delivery of large hierarchical data is not different from the delivery of DNA. The execution of code within the data is not different from the expression of RNA. The paradigm shift is from viewing applications as a collection of methods and events to that of a compound data file with methods and events imbedded within.

When you accept this theory as to the predominance of data, you are well into your journey of the unifying data theory. Compound data is not useful until is parsed and applied per context correctly. For example, we previously asked what would happen if a sound file were executed or an audio stream viewed as a graphic. This is a process failure or disease situation. Therefore, we need to filter and apply each item by type. The process is best described as separating content from context from concept and dissecting compound formats into items, content into items, all of which are addressable by granular content control.

AA.1.16.9 Conclusion

The complexity of information processing and communications, infrastructure, security, and data structure evolution have driven wedges into computerized workflow. As a result, divergent insular solutions and the enforce separation of process and storage exacerbate the differences rather than lead to simplicity and integration. Insular solutions require additional effort not only to resolve the problems discretely for each area but also to create temporary bridges between areas, an effort disproportionate to the requirements.

The primary benefit of unifying data is to see data as a compound stream that can be stripped into items. First, we can find information and apply it as intended or explore for new information. Second, we can assign tags to each item for security purposes. Third, we can determine what items to share and how to distribute the items in whole or in part, and within a generic data stream, application, document, or a structural context. The consequence of a simplified data view is a simplified security environment that is not based on point solutions but that actually works as an ecosystem. This supports a unified infrastructure based on categorization that enhances search, security, and sharing, but even more than that, it provides the same consistent, simplified, and functional basis for search, security, and sharing.

Why DigitalDoors security? What you are trying to protect. Is it the infrastructure, the communication channel, the application, the engine running the application, or the data? Today, we are trying to protect all of them at the same time with macro processes generally at the perimeter, with conflicting tools, and succeeding at very little. It is becoming increasingly expensive, time consuming, and disruptive within the current paradigm to impose security—frequently counterproductively in terms of cost and degraded results. Instead, we need to recognize the convergence of application code and data, recognize that context and concept are the points of separation, and that security must be applied at the smallest discernable units. This explains the suitability for DigitalDoors granular content control.

AA.1.17.0 A New Information Security Paradigm: Neutralize the Loss of Perimeter

The existing shortfall in information security is indication of the amount of playing catch up now required. Information technology has always been driven by results in terms of accuracy, features, functionality, return on investment, and enabling wholly new business opportunities; security has always been the laggard afterthought. The current security metaphor pits functionality (or efficiency) in conflict to security, thus security is set at some practical level so that losses in functionality are tolerated to support security goals.

The desired balance between functionality and security changes with the perception of security threat levels. It is a lousy Hobbesian choice; a bad metaphor based on a flawed view of perimeter-based or point solution security, which is an evolutionary dead end.

Security goals usually lack formal definition, whereas products and services are tangible. Output is definable, the process is blueprinted, but where is security as an input, as an output, or as some multiplier effect on a production model. Security needs definition, perhaps as the ability to protect the resources and process that generates economic wealth within a production model.

It is all a matter of the paradigm you see. Security should not be a balancing act but rather a fundamental design parameter in information technology data and process. If you see security as elemental control, you see functionality as the enabler of security rather than a conflict. If you see security as a perimeter control, you see security as a stumbling block for functionality. This later view is the prevailing paradigm. Security is a stepchild to information technology rather than an amalgamated component for advanced functionality. In fact, effective element-wise security enables information sharing, multi-level access control, redistribution, controlled released and recovery options that can create totally new products and entirely business markets and models. Digital-Doors is doing all that now. It is all a matter of the paradigm.

Recent high-profile failures in security, such as misuse of critical information, identity theft, and leakage of government secrets, the Sep. 11, 2001 terrorist attacks, and the addition of new privacy directives and patriotic legislation have put the need for information security forefront. It is not that information has been unimportant and suddenly now is important; rather, there are limited methods and technologies for implementing information technologies that actually work. They work to a point and do not seem to be extensible to new situations or work beyond the borders for which they were invented.

Ad hoc efforts, band-aid policies, and application of best practices that aren't very good at all frankly reflect the really bad state of the art. Security as a step-child to functionality is a complex problem for governments, banks, brokerages, insurance companies, and many other fundamental human organizations that need to be revisited with new metaphors and a better paradigm.

Existing security technologies fall into three categories. They comprise access controls, encryption, and data or process filters. Access controls are based on usernames and passwords, or biometrics to a lesser degree. Encryption rebundles data into an impenetrable box opened only with an ungainly key management system that creates more problems than it addresses. Filters include virus protection, firewalls, and intrusion detection systems that search for known attack patterns at the periphery or once beyond that perimeter. All these systems represent a perimeter fortress mentality encircling the systems and data. It is a primitive burglar alarm that does not preclude inside thefts, accidental or incidental damage, or prevent destruction once the perimeter has been breached.

Any little hole or minor access is sufficient to provide full exposure with sufficient time, effort, and ingenuity. For this reason, top secret government data and processes are segregated completely with air gaps from networks and external workflows. Of course, insiders like Hansen and Walker show the fallacy in the presumed effectiveness of such air-gap security methods. In fact, there is a common maxim that once the perimeter is breached, the soft underbelly is fully exposed, and the perimeter furthermore focuses the attack within to promote additional damage.

Sophisticated burglar alarms are augmented with internal sensors and content control. In fact, you see this with motion detectors, infrared heat sensors, glass-break detectors, and internal video and sound monitoring. Information security is developing ways to monitor internal processes and data access in a similar way. It actually makes sense, and is technological feasible to a point. However, cameras within the perimeter actually provide a venue for exploitation. Imagine have your built-in laptop camera showing the user, the user's location, other associates, and capturing the screen.

Advancing this burglar alarm concept further, museums understand the value of identifiable objects and alarm these objects to detect if they are moved or taken. Perimeter security has its place as a necessary first line of defense, but even for a museum, the perimeter is not invulnerable and not effective against an inside attack. Element-wise security a more sophisticated security system in that specific objects of value are designated as valuable and controlled individually. This is analogous for how data and process in information technology should advance. The information security paradigm requires the protection of individual data elements rather than a site-oriented perimeter access control.

There is unfortunately a great deal of difference between museum objects of value and data and process, and the corresponding methods of security. This paper details five major areas of logical discrimination. These are first, the logical similarity between data and process; second, the scale of data security dwarfs physical object security; third, data formats are becoming very complex; fourth, data elements combine to complicate security and privacy; and fifth, and information technology is perniciously imbedded and intrinsically networked and cross-linked within workflows.

First, recognize that there is no difference in information processing between data and process. The process is series of steps that have been codified and represented in a data format. Therefore, a process is data. Worldwide, there are legal protections for process in terms of patent, trade secret, and copyright laws, although the emphasis is given to protecting new ideas rather than implemented concepts. This represents a serious shortfall that eventually will have to be addressed by new laws. Data on the other hand has limited protections. It can be protected by trade secret or copyright, but courts have limited the protections for structured and organized data gathered and owned by a custodian. However, the European Union has led the way in protecting individuals from misuse of such custodial data. In spite of this forward legislation, we need many new laws to protect data held by custodians and preserve the rights of ownership for personal data. This is especially important when process is perceived as data.

Second, control over an object of value is very different from the control over data. Damage, theft, or the reproduction of an object of value is obvious and limited to a single instance. Damage, theft, reproduction, or redistribution of data is not so obvious, particularly when data is replicated in multiple instances or dispersed as part of workflows. In addition, data is damaged just by exposure of that data, not so art in a museum, which is displayed expressly to be exposed. Exposure of data represents a new security threat, one of which you are undoubtedly well aware. The problem is that barrier-based security does not protect data from exposure for the previously outlined reasons and internal monitoring of process does not preclude digital reproduction, replication, or redistribution.

Furthermore, although a museum might have thousands of valuable objects, it is a discrete and controllable collection. Data on the other hand represents millions, billions, trillions, or more discrete collection of elements. This data security problem is neither discrete nor controllable in any human scale. This is a complex problem for governments, banks, brokerages, insurance companies, and many other fundamental human organizations, and the bigger the organization and its processes, the greater the risk for exposure.

Third, data is changing from simple and primitive structures into compound hierarchical objects. You might have heard about metadata, and that is but only part of risk. If you haven't heard about object models, metadata, and hierarchical object structures, get with the program and learn about it quickly. The risk from objectified data structures is enormous and growing, albeit totally hidden from the security audit; it is solely at this point an architect and programmer issue. You already use object models if you use any application such a database, a graphical editor, or any word processing program.

For example, a Microsoft Word document is 75% metadata. That means that each document contains 25% of what you have actually typed but mostly things you would not believe when you review security risks. Since the data storage structure is partially unreadable binary, metadata is hidden. Some metadata is displayed from the file property pages; this probably includes your name, your organization's name, but the stuff that is not visible is a security nightmare. The name of everyone internal to the organization that proofed that document, and anything and everything you think you deleted from the document is still there. Metadata is only a part of the problem.

Consider also the external links, the metadata processes that are part of every Word document, the document blueprints, and the potential for embedded sounds, graphics, spreadsheets, and other data from other sources. The security risk is no longer discrete and part of any human scale. This is only for a Word document. There are far more complicated objects models and complications from data linked through the Internet and complex network workflows. Every imbedded applet has the potential to be useful but also contain a Trojan Horse or destructive worm. Object models were developed for feature-rich applications and to enable accuracy, return on investment, and enabling wholly new business opportunities—remember that line?—but nonetheless are paradoxical to information security.

Fourth, we think of information security in terms of discrete units. For example, this might include a name, a social security number, or other elements that define an individual or overtly undermine security and personal privacy. We talked about the protection of discrete elements above and the failure of human scale in data protection. However, the problem is more egregious than the simple math of the number of discrete data elements. Realize that individual data elements are not only valuable individually but are even more valuable when combined with other such discrete elements. The sum of the whole is far greater than the sum of the discrete elements. For example, consider how a loan officer could correctly red-line your mortgage or make a business risk decision based on your blood type, your three-digit zip code zone, and your marital status without any other discrete personal information such as social security number, income level, or credit history.

There are at least three intersecting mathematical technologies you will hear more about in the future as part of any sophisticated consideration of data security and personal privacy. These are Set Theory, Polling, and Bayesian Inference. These mathematical technologies are not based on elementary sciences and thus seem like magic to most rational people. However, we take their results for granted everyday in election forecasting, weather predictions, that computer chips work, material management, and transportation logistics. Society would slow and stop without these statistical sciences. The bottom line is that these technologies undermine information security and exponentially drive any discrete security control from a human scale. For example, if you have just hundreds of discrete data elements, you likely have billions of points of security exposures when information is extrapolated from the initial data elements.

Fifth, information technology has advanced from a simple one-for-one matching of data sets with computer processes into a scenario of multiple data sets interacting with multiple processes. This makes perimeter security impossible. With just 3 data sets and 3 processes, you have 27 permutations. With 42 data sets and 63 processes with a just 30% overlap, the security perimeter is represented by $1 \times 10^{1943}$ permutations. That is a very big universe. Which perimeter—when there are so many? Data sets are frequently reused for many purposes or combined with other data sets. This is a principled result from Codd's database normalization concepts but also a fact of efficiency, necessity, integration, and advanced workflow development for accuracy, features, functions, return on investment, and enabling wholly new business opportunities.

Workflows intersect and overlap destroying any viable concept of a securable perimeter. Firewalls, intrusion detection, process monitoring for what? The perimeter is virtualized to the entire internal and external organization. It is a concept without reality. Of course, you could disassemble your networks, the Internet, distributed processing, and lock up each computer, although antithetical to what information process enables. You could add dongles for every piece of software to protect the data aspect of code and process. You could vet each and every user at each and every computer device. You could view functionality and security as mutually-conflicted goals and choice some balance between functionality and security. That is the metaphor in use today, it does not work, and will work less well as the security perimeter is virtualized beyond any securable perimeter.

The message is that security must be built from the inside. Data elements must be categorized individually for risk valuation. The exponential risk from many elements, data types, and processes combining together must be assessed. Because the scale is beyond human scale, risk valuation, analysis, and security implementation must be applied by the information technology itself. It is not a human activity and correspondingly must be automated. The security must be built into the framework to bypass tensions with functionality, rather security must augment functionality instead of detracting from it. The paradigm suggests that data elements must be parsed and evaluated individually and within the context of the whole. The implementation thus demands a structure for measuring absolute security, for assessing risks and the requirements of each and every process, and applying a granular multi-level access control to individual data elements and sets or subsets of elements, or granular content control. This is certainly feasible. In fact, it has been implemented by DigitalDoors, Inc. Measurement is statistically-based. Likewise, the resulting security is statistical. Access control is multi-level and security is provided by an NP complete data dispersion implementation.

AA.1.18.0 Why Security is Ignored

The level of security provided in business processes and the production environment is rationalized to the lowest level possible to maintain its legitimacy. Although security is a desired attribute, it rarely if ever represents a constraint; security is perceived at best as a necessary evil. It has no return on investment (ROI). Attempts to create a security ROI rapidly unravel. Attempts to show how security itself or protection of assets as contribution to EPS (earnings per share) is really poor.

Attempts to ascribe an internal rate of return (IRR) for security in assessing alternative projects degenerate into a conflict as the security undermines the implementation of the selected project. Security is overlooked as functionality becomes essential. When security becomes an active constraint, it is removed from the equation. Security is usually optional.

Security impedes functionality. Even when it is understood that security is essential to reputation, legal compliance, while avoiding fines and penalties, the risk that a breach is likely to occur is perceived to be so distant and so minimally invasive that business as usual trumps security. It is easy to recognize the lapses of security after the fact, but it is difficult to maintain the importance of security on an ongoing current basis.

Security is a fundamental building block for a sustainable competitive advantage. When security is couched in terms of its importance to creating a strategy, implementing that strategy, and maintaining an advantage within a competitive environment, or enabling cooperative sharing without revealing private and technical details, security still fails as an afterthought. People blame and then rationalize that it is security undermining success, lowering production efficiency, and contributing nothing immediately to ROI.

The subtle point is that there can be no ROI, no sustainable advantage, no multiplier effects in the production process, no development of patents, and protection for trade secrets without security. So while security has no current ROI, security is the integral foundation to those goals. It might be possible to perform an ROI-based functionality now with the additional costs of security versus the effects to future anticipated functionality with and without security. However, such long-term calculation of an annualized loss expectancy based on so many unknowns is tantamount to clairvoyance resulting in professional suicide. It is extraordinarily difficult in to explain the future at risk the boardroom when so much is instead measured in terms of current values and this year's bonuses.

In other words, security is necessary to the production model but not sufficient. Therein lays the rationalization to ignore security. Security does not create wealth. It is not an input to the production process. It is not even a multiplier to the production process, although it preserves the longevity of that multiplier. Security can be, and often is, rationalized as complication without portfolio or return. However, security is the necessary and only ingredient that preserves the trade secret portfolio sustaining the competitive advantage provided by the wealth production model of the information revolution.

Without security, it is not possible to maintain the restricted knowledge that makes wealth generation from the information revolution possible. Without security, wealth generation reverts to the commodity of an industrial production model. In the end, security might be the only mechanism for protecting the innovation that is the driving engine of the information revolution. It is nothing but a mistake to rationalize security as a conflicting constraint with the immediate needs for functionality when security might well be the only thing sustaining a competitive advantage.

AA.1.19.0 Security Integration and the Lack of Attention to it

In real practice, security is an adjective to data or an adverb to process. It is not a noun because security is not a viable standalone product or service. It is not a deliverable. Security can be delivered, per se, but only as a component of a product or service, the production methods to create those, or as method to protect and retain production trade secrets. Security is not an object. It is not a goal. Its importance is undeserved as a production input or output. It is important, but only with reference to the maintenance of a sustainable competitive advantage. Security lacks return on investment (ROI) while even an internal rate of return (IRR) is a difficult and sketchy equation. If ROI is hard, contribution to EPS is a long shot. Anticipated loss expectation (ALE) is calculable, but only in terms of losses to other quantifiable deliverables or resource inputs into profitable production activities.

Security does not stand by itself. Given the fear and attention given to all things security, it would seem that security was some concrete product and service, but it is not. Security is an attribute or property of other things. Security is not a data flow, a process that exists by itself, or an expression of information. Security is not a discrete achievement and never apart from another discrete process. It cannot be divorced from other definitive deliverables. Security is not a building block or tangible foundation per se for other deliverables. Security is a state of control by management over access to superfluous, superficial, or fundamental information necessary to complete a task where a deliverable product or service is at stake.

Security is not a task by itself, of itself, for itself, or a reason for self-importance. The cover of security to protect a process is at best placebo. It seems that the integration of security for effectiveness is not something added as the event unfolds but rather somehow threaded within the structure itself. But it is not. Unfortunately, security is not a structure or a deliverable of any type, even as an outsourced service. Outsourced security services exist only as an attribute or property to a viable deliverable product or service. It is reckless and financially imprudent to outsource security without tie-ins to production. Security is only symbiotic with other resources and processes, never a resource or process unto itself. Security integrates into other activities, but it is not an activity creating product or service with standalone value.

Security is an economic entity. It is a marginal scalar without fixed asset value. Security does not alter production output value. Security is not a multiplier of product or service value. Security does not make a product or service worth more. Security has no basic asset or production value. Security does not make a better product or service. It only makes them sustainable. Security is not a production differentiator, but it is the sustainer of differentiation. Security protects the intellectual property value imbedded in the product or service or in the production methods used to produce them. Security protects an intellectual or economic monopoly as a multiplier to preserving this sustainable competitive advantage. Security is not a multiplier or marginal scalar of product or service value but a multiplier to retain long-term differential value.

Security does not have a worth unless tied into the risks, potentials, threats, or anticipatory costs associated with production results or losses. If security is applied as a scalar to a worthless production activity, the output is still a more-expensively worthless activity. When security is imposed as a necessary process divorced from a clear attribution, as is often the case with the traditional security infrastructure, it applies to nothing, scales a null value, and generates no value added. Security can only be economically integrated into a process that warrants its value as a positive and non-zero value-added enhancement. Security is a long-term performance multiplier, never a performance enhancement that is integrated into a productive workflow and expressed in the information revolution as the necessary and perhaps only element to sustain a long-term competitive advantage.

AA.1.20.0 Security as the Future Foundation for Information

Security is not a standalone entity. It is not a standalone activity. It is not a job or employment title separable from other tasks and workflows. Security is the basis for just about everything else. It is a foundation for all other activities. Security has no ROI, limited contribution to EPS, no real IRR, no real ALE, and no real payback. The value of security is continuity and having a future. Without security, there is no security at all. Security is a systemic requirement for success, for survivability and maintaining a sustainable competitive advantage. The problem with the future of security is that when we take it for granted we have none. When we think that security is an adjunct to our activities it fails and we have none.

Security is no longer something that is added to a process with the hope of any effectiveness. Security is not a chain and padlock that is separate from and attachable to raw materials, information, workflows, and production methods. Security is process that is unified with the production process. With anything less raw materials, information, and intellectual property can be separated from the production process with ensuing leakage. When security is separable, not only is the production process attacked the add-on security itself is also stolen for its own value.

Security is part of the blueprint, part of the just-in-time (JIT) processes for handling raw materials, a protection over critical and proprietary workflows, integrated into the outputs, and part of the resulting products and services. Security is the process that identifies resources of value and, at least in our explicitly and unique view, disperses those resources beyond intrinsic value, immediate utility, and contextual recognition with a reversible process to recover that value when and as needed under ownership or custodial assess controls. That is a very important future of security, one that transcends merely physical assets and includes the increasingly more valuable ones of knowledge and intellectual property.

AA.2.0.0 Design and Implementation

AA.2.1.0 Implementation of Granular Data Control in Data Streams

Security with operational functionality and information sharing is possible by designating all network flows as data streams and controlling those streams. Applications and data of any kind are uniformly identified as data streams, since both are informational equivalents. Assessing an application, even a virtualized web-based one, as somehow representing a higher risk than data, overlooks the similarity in content and function of both, the higher-order representation of both as metadata, and their risk equivalence.

Security is possible through a process based on 1. identifying risk (with knowledge exploration) within the contained granular content of any data stream, 2. extracting the granular content at many defined sensitivity levels from the very matrix of any data stream, 3. providing access to a redacted form of the data stream in its most primitive state and format, and 4. reconstituting that data stream on-the-fly as needed up to the sensitivity levels required to match the information, functional, and operational requirements.

This is the essence of granular content control. It enables the continuity missing from traditional paradigms based on the trade-off in security versus functionality. Because DigitalDoors allows granular control over arbitrary data streams, applications, and web-enabled applications, operation continue unabated. However, they may lack specific access to the crown jewels.

The crown jewels are defined specifically in relevance to each user, environment, and/or ecosystem, whether as sensitive information, risky applications, or metadata combinations of both. Redaction with substitution and recognition of required formatting enables continued operation even with gapped data streams, applications, or web applications. Functionality continues, not hobbled by the trade-off with security, but rather subject to realistic identifiable security constraints.

The Internet and the private but parallel GIG (Global Information Grid) represent the expansion of the localized network to everywhere at anytime. Any conduit, even guarded, represents a two-way transmission channel for the proliferation of sensitive information that traverses any edge, any perimeter, any geopolitical authority, or any functional demarcation. The idea that edge protection and perimeter protection can be effective within such an ecosystem without definitive boundaries is unsustainable. The idea that an arbitrary boundary for a community of interest (COI) can be defined within this ecosystem (the Internet, the GIG, or any attached subnetwork) to affect a perimeter security is also unsustainable.

While is certainly possible to define network edges and define a sharp boundary, this is possible only with complete isolation of distributed operations and the indiscriminate cessation of information sharing, as indeed experienced under many existing security implementations today. Thus, any reliance on some sort of interspatial DMZ is just good intention without good security. DMZs include virtualized web applications, social networking sites, Wikis, remote management agents, and all Internet or GIG access, but DMZs are not a sustainable security technology.

Data streams and applications represent the top two internetwork traffic. These are necessary to sustain operations and information sharing regardless of the security barriers in place. SAAS, SOA, Web 2.0, Email, remote terminal services, virtualization, and remote services are examples of data streams with or without additional applications and with or without additional embedded data content. Unfortunately, data streams and applications are both forms of metadata with unlimited scope for covert channels. Traditional security implementations can only allow or deny access; it is a binary decision with no leeway for intermediate allowances. Therefore, traditional security either allows a security gap while enabling operational functionality or totally denies any throughput with the attendant non-operational effect.

Instead, DigitalDoors allows a redacted data stream with reconstruction. The allowable throughput can be set at any intermediate level (between none, some and all) with optional reconstruction up to any level (including some or all). Risk is adjustable, and risk can be measured and risk can be asserted. This specific aspect of DigitalDoors granular content control provides the missing functionality to enable compliant cross-domain security. In addition, automation of the selection of risk with the data stream allows for the unlimited assessment sensitivity levels and combinations of inference to make it possible to minimize risk with cross-domain information sharing and subsequent "uncontrollable" resharing with downstream partners. Cybercrime has shifted to attacking the plans, programs, designs of industry and national security.

DigitalDoors inventories the business practices, assess the need for business information, the risks from external threats and internal threats, the need for information in terms of the costs for acquisition, its retention, its reuse, and its potential for leakage and misuse both externally and internally. The resulting report details best production, contextual data value, information technology, and likely risk reduction practices. Security becomes a byproduct of better operations instead of a specific strategic goal or a forced mandate. Consider options deemed economically viable with competitive opportunities with a foundation of risk mitigation and control.

AA.2.2.0 Brief Functional Overview

DigitalDoors locates and selects critical information within a data flow, categorizes these selected elements, extracts them at any level of granularity, and disperses that critical information to different remote storage locations. The selected elements can be located manually (mouse selection), by dirty word lookup, or with sophisticated automatic tools to select content, meaning, and compounded risk factors. The downgraded data flow is stored in the lowest common risk factor and can be upgraded at wire speed to any authenticated MLS level. A trusted infrastructure with identification, authorization, and granular access control to granular storage represents a leap in security past traditional perimeter and containment methods.

AA.2.2.1 Brief Structural Overview

DigitalDoors was designed for networked and hosted infrastructures. The applications were designed and prototyped on MS Windows with IP networking, and widely demonstrated on that platform. We have shown automated content selection and categorization with AES encryption functioning on low-end laptops over an 11 Mbps wireless network with wireless SAN for remote storage and wireless Internet storage. RAID is supported in hardware. Because the user interface, the downgrading engine, the upgrading engine, and other functions were modularized, DigitalDoors is able to function on standalone systems, networked systems, client/server architectures, and under remote terminal services. This has been demonstrated under Solaris v8 and Solaris v9 and TSOL v8. CMW labeling at the granular element level extends file, device, and process-oriented CMW labeling provided by Trusted Solaris. As the infrastructure migrates to Sun Microsystems, trusted applications running on trusted SunRays and trusted servers with dispersed trusted storage will enable multilevel side-by-side sessions.

AA.2.2.2 Remote Storage Overview

DigitalDoors downgrades data streams to any granular level as configured. This corresponds to the CMW definition of sensitivity level, compartment level, and information level. DigitalDoors also identifies data stream elements by content categorization, source, destination, and compound risk factors. The data streams are split in various configurable ways, with each stream or even each granular element stored to a different location. Backups can be automatically archived.

Elements can be replicated and stored remotely. The different remote storage locations are mapped as logical shares. This is fully compliant with MS Windows, and Solaris and TSOL with Samba, CIFS, and/or NFS. As the migration of the DigitalDoors infrastructure migrates to Sun Microsystems, NAS, SAN, iSCSI, FibreChannel, SNIA, and/or other storage methodologies, other data access methods will be supported in the same way. Currently, DigitalDoors supports at least 30 distinct storage locations for a single organization, with an unlimited parallel number for backup and replication.

The storage overhead for DigitalDoors adds only about 6% to the storage needs over baseline. However, organizational preference for archives, multilevel downgrades, separate sensitivity level storage, web-based or DOD distribution systems with catalogs each doubles the storage requirements. Also, the need for failsafe operations, caching, proxy services, and redundancy is a separate and traditional storage provisioning issue. Five (99.999%) and six nines (99.9999%) statistical operational performance demand an infrastructure with many storage server farms and multi-homed networking access. The primary requirement for DigitalDoors is consistent and compatible storage facilities that are uniquely addressable. The secondary requirement is that this storage be granularized such that data stream access can be controlled by identification and authorization by user, process, sensitivity level, compartment level, and information level.

DigitalDoors is a series of differential process step that can occur on any platform, ranging from a mainframe to a low-end laptop. It enables content-level security in any type of data stream on any type of platform. It is inherently scalable from single to unlimited users. Content-level security can be affected at any layer of the ISO OSI model, from the bottom physical layer (level 1) to the top application layer (level 7). In addition, DigitalDoors uniquely functions within an application layer data stream to analysis content, concept, and context for security sensitivity to protect again brute force inference with statistical methods and data mining, assemblage of information, and human intelligence methods. In other words, DigitalDoors is processing any type of data stream for potential security lapses.

Most deployments are likely to require enterprise operation support with mixed client/server architecture. Automated OPSEC and COMSEC processing can occur as background processes on virtually any computing, Web/Internet, and networked platform. The DigitalDoors architecture was designed with run anywhere mentality, including hardware chipsets. However, in most cases, manual tagging presupposes a graphic user interface for selecting and identifying data stream content. As such, the core technologies require only visual element outlining, automated content identification, list lookup and matching, and basic data processing. Processing can be offloaded to the client or performed on the server. Dispersion is a function of a secure networking infrastructure. Most operations occur at network wire speed, this being the primary performance limitation.

We have installed and demonstrated its effectiveness on currently deployed COTS environments. This includes a wireless laptop network with a wireless SAN, a 10BaseT Intel client-server architecture, a 100BaseT and Gigabit Intel client-server architecture (Win95 through Win 2003 AS and W2K EAL-4), several MS Terminal Server environments, and integrated with Solaris v8 and v9 and Trusted Solaris v8 servers and clients. We have tried the technology on Palm IV; we assume that DigitalDoors is portable to PDAs, handheld devices, cellular phones, and other hardware devices subject to their memory, connectivity, and CPU prerequisites.

For point of reference, we have integrated and demonstrated DigitalDoors with MS Windows, as add-ins for MS Outlook and MS Exchange, and presume simple functional integration for any MS Office, database, data workflow, signal transmission, or COTS products. We have demonstrated DigitalDoors with ASCII files, MS Word documents, HTML, and XML metadata.

The client requires only a basic GUI interface (at a minimum) with NetBEUI, NetBIOS, or IP networking over any network transmission medium. The server components require no GUI and can run as a background process with NetBEUI, NetBios, or IP networking over any inter-compatible network transmission media. Interprocess communications is enabled through client/server channels, OS messaging, and RPC. Support over LAN, WAN, Internet, VPN, NAS, SAN, with remote commercial storage services has been tested. DigitalDoors has also been successfully tested with encrypting network hardware (Intel) and native P2P encrypting protocols.

TABLE

The Data Declassification process

The Data Declassification process is defined by these steps:

Authorization of security levels:
Sensitivity
Compartment
Information
Categorization
Authorization of security roles:
Sensitivity
Compartment
Information
Categorization:
Identification of a data stream
Identification of the format for the data stream
Configuration of intended security levels
Sensitivity
Compartment
Information
Categorization
Categorization of data within the stream (e.g., tagging)
Selection of data within the stream for extraction
Extraction of data within the stream
Downgrading of data stream
Creation of upgrading recovery data files
Data backup
Data replication
Data dispersion
The Data Reclassification process is defined by these steps:

Authorization of security levels:
Sensitivity
Compartment
Information
Categorization
Authorization of security roles:
Sensitivity
Compartment
Information
Categorization
Access to downgraded data stream
Upgrading of data stream Access security is established through a network ID and authorization process, such as Kerberos and enhanced with the compartmentalized trusted operating systems, such TSOL. Access security can be enabled for most networked devices.

Downgrading the data stream is manual or automatic, or assisted. Automatic OPSEC and COMSEC rules can be enforced prior or post manual selection (tagging of the sensitivity levels, etc.) The processes are asymmetric by design. Downgrading can require substantial time, but upgrading is limited only by the network and the time lags to deliver a signal cross-country through multi-hop switches and routers that are part of the commercial public infrastructure. Realize that firewall, guard, filter, and router hops frequently entail 300 μsec unidirectional delays; this being the primary performance delays.

DigitalDoors has designed to the architecture and the process flows such that steps are optimized to each side of the firewall, guard, filter, router, and storage server mesh, including even optimization at the client for the extensive high-level content, concept, and context identification and dispersion. Manual tagging can be performed on any computer that supports a GUI interface. Processing is bound to disk or network performance limitations. Tagging information can be processed locally or delivered to a server for service-side processing. The user's ability to locate and highlight sensitive material is the functional performance limitation.

The data stream can be any of type of data. This includes signals, files, data streams, interprocess messaging in a workflow or high-volume transaction processing environment, email, instant messaging, logical information, and COTS data files. Data streams can be free form or structured, such as a COBOL data set, a RDBMS database, an MS Word document, or metadata, such as SGML, HTML, or XML. The DigitalDoors philosophy is to enhance security while maintaining traditional process workflows. Note that encrypted files and data streams require discrete and complete decryption before they can enter the transactional processing. Failure to decrypt such files abends systems and workflow because the format and content is unexpected. In addition, while encrypted XML and metadata is secure within that form, once decrypted is usually carries far more security-sensitive content than realized. Manual processing requires trivial overhead. CPU requirements are minimal for the client and server components.

However, OPSEC, COMSEC, and enhanced automatic and assisted data selection requires additional CPU resources and approximately 400 MB of storage. Even laptops are suitable. Automatically or assisted tagging information can be processed locally or delivered to a server for secure processing. Processing is bound to roundtrip network performance limitations, and database lookup seeks times. As the complexity is increased to automatically search data, metadata, content, context, and concept for sensitivity within the data stream, performs slows. Performance is affected by disk seek times and the depth of the searching and DigitalDoors categorizing process. Performance ranges from 34,000 to 360,000 instructions per recognizable element in the data stream. This ranges from 56 to 783 μsec on IBM Thinkpad laptop yielding a Winstone value of 23. DigitalDoors processes a document of 140 words in 70 seconds on that laptop, but within 19 seconds on Dual Intel CPU Server with SCSI drives (Winstone value of 89). A production SQL database server provides several orders of magnitude better lookup performance than a client database on a laptop; it also scales better. Experience with *Sequoia* or comparable scalable and fault-tolerant architectures indicate single digit μsec response times.

Dispersion performance is a function of network channel responsiveness and network storage performance characteristics. Wireless Ethernet 11 Mbits/s down to 2.2 Mbits/s is sufficiently faster than database seek times and storage, but nonetheless effective in demonstrations.

ReClassification performance occurs at wire speed subject to the performance limitations of network infrastructure and remote network storage performance. We have recovered 2 MB documents within 3201 μsec using a multiple-hop router network and 10 Mbits/s Ethernet hubs to Intel desktops. This is equivalent to raw file display on the same networks and systems.

The footprint is purposefully small. Storage requirements include application storage, databases, temporary cache, and secure and dispersed network storage. Distribution is typically provided on a standard CD (640 MB) or business-card CD (120 MB). User storage per user is as little as 15 KB for a configuration profile. Application storage is approximately 30 MB for clients, although this can be shared as a single store on a server or terminal server. Database storage requires approximately 231 MB. This includes all language dictionaries, categorization elements, synonyms, and semiotic and grammatical inferences. Transactional processing, rollbacks, and security logs are optional, but on the same order of magnitude. All storage can use SSD, USB, PCMCIA, or flash RAM or networked devices. Performance is enhanced about 45 times with SSD. Flash RAM is marginally faster than mechanical hard drives due to lack of device driver optimization.

Data storage for user documents, data sets, data streams, metadata, and the like will be comparable to the size of the existing data store. Note that a design criteria is that all extra-security information, recovery files, auditing, and logs are stored in separate channels both for security reasons and format preservation. Expect additional overheads of only 6% for dispersion of recovery files. However, realize that minimum block sizes could increase that. Optimization for recovery files, which tend to be small, is possible by setting block sizes to 1 KB or smaller on a special recovery file storage site.

When sources are dispersed and replicated for multiple location storage, or creation for individual TS, S, and C archives with support for compartments, information labels, and categorization, then each replication obviously increases the storage requirements by about 100%. Proxy caching is effective when documents are often requested; however, for security purposes, caching of recovery files is insecure. It it's also ineffective unless the recovery files are bound to the same sensitivity/compartment/category user because the storage server generates and only delivers at the level dominated by the user clearance.

DigitalDoors assumes that the native OS encryption will be applied or that a certified encryption system is available within the network infrastructure. DigitalDoors will integrate with that facility. Encryption overheads are comparable to what exists now. When unclassified or downgraded documents and the recovery files are stored black and delivered black, the encryption overhead will be approximately 106% of what is now. In spite of that low overhead, this provides infinitely granular data storage and infinitely granular upgrading.

Interprocess communication and messaging for client/server is optimized to minimize traffic loads and point-to-point encryption overheads. This limited performance overhead is most evident when a terminal server environment is taxed by many users, who nonetheless see performance equivalent to that performed on the client desktop. User or process identification and authorization is interspersed throughout the DigitalDoors process—it is not a one time when the user logs in—so there is some ongoing validation chatter. This rate is granular and configurable by the security administrator on a range from seconds to hours.

There are true performance and storage benefits when downgraded documents are shortened and mechanically compressed. However, for functional reasons, a core design of DigitalDoors is that the data stream format is typically preserved intact (less extractions or substitutions) to allow for workflow processing without abends, interrupts, or crashes. Even HTML, XML, and other metadata are typically preserved to retain the original format so that DigitalDoors is providing security without compromising functionality.

AA.2.2.3 Operating Parameters

Any CPU platform with a development platform and as little as 64 KB of RAM. Any platform with support for either C, Java, or VB is suitable. DigitalDoors can run as a hardware process, an applet, an add-in, process filter, a dynamic link library, as an NT or RPC service, as a standalone client, as an in-process or out-of-process server, and as an enhancement to a firewall, IDS, IPS, guard, or operating system. DigitalDoors interacts with Kerberos, Active Directory, smart cards, biometrics, encrypting file systems, trusted operating systems, and many NAS, SAN, and other remote filing systems.

AA.2.2.4 Network Design Specifications

Because the core concept of DigitalDoors is to support collaboration, information sharing, dissemination, Internet and Web services, data mining, and data dispersion to remote storage, the client/server infrastructure requires only a core network. Integration preference is for a COTS network environment, such as Internet, Intranet, LAN, MAN, WAN, NetWare, NFS, or Microsoft networking. Network protocols can include NetBEUI, NetBIOS, and IP on a physical channel of 1 Mbits/s wireless (Zenith), infrared, Bluetooth, 802.11a or 802.11b, or 802.11g, Ethernet, FDDI, iSCSI, frame relay, ISDN, DSL, T1, T3, OC3, and SONET.

AA.2.2.5 Remote Storage Infrastructure

DigitalDoors locates and selects critical information within a data flow, categorizes these selected elements, extracts them at any level of granularity, and disperses that critical information to different remote storage locations. The selected elements can be located manually (mouse selection), by dirty word lookup, or with sophisticated automatic tools to select content, meaning, and compounded risk factors. The downgraded data flow is stored in the lowest common risk factor and can be upgraded at wire speed to any authenticated MLS level. A trusted infrastructure with identification, authorization, and granular access control to granular storage represents a leap in security past traditional perimeter and containment methods.

AA.2.2.6 Brief Structural Overview

DigitalDoors was designed for networked and hosted infrastructures. The applications were designed and prototyped on MS Windows with EP networking, and widely demonstrated on that platform. We have shown automated content selection and categorization with AES encryption functioning on low-end laptops over an 11 Mbps wireless network with wireless SAN for remote storage and wireless Internet storage. RAID is supported in hardware. Because the user interface, the downgrading engine, the upgrading engine, and other functions were modularized, DigitalDoors is able to function on standalone systems, networked systems, client/server architectures, and under remote terminal services.

This has been demonstrated under Solaris v8 and Solaris v9 and TSOL v8. CMW labeling at the granular element level extends file, device, and process-oriented CMW labeling provided by Trusted Solaris. As the infrastructure migrates to Sun Microsystems, trusted applications running on trusted SunRays and trusted servers with dispersed trusted storage will enable multilevel side-by-side sessions.

AA.2.2.7 Remote Storage Overview

DigitalDoors downgrades data streams to any granular level as configured. This corresponds to the CMW definition of sensitivity level, compartment level, and information level. DigitalDoors also identifies data stream elements by content categorization, source, destination, and compound risk factors. The data streams are split in various configurable ways, with each stream or even each granular element stored to a different location. Backups can be automatically archived. Elements can be replicated and stored remotely. The different remote storage locations are mapped as logical shares. This is fully compliant with MS Windows, and Solaris and TSOL with Samba, CIFS, and/or NFS. As the migration of the DigitalDoors infrastructure migrates to Sun Microsystems, NAS, SAN, iSCSI, FibreChannel, SNIA, and/or other storage methodologies, other data access methods will be supported in the same way. Currently, DigitalDoors supports at least 30 distinct storage locations for a single organization, with an unlimited parallel number for backup and replication.

The storage overhead for DigitalDoors adds only about 6% to the storage needs over baseline. However, organizational preference for archives, multilevel downgrades, separate sensitivity level storage, web-based or DoD distribution systems with catalogs each doubles the storage requirements. Also, the need for failsafe operations, caching, proxy services, and redundancy is a separate and traditional storage provisioning issue. Five (99.999%) and six nines (99.9999%) statistical operational performance demand an infrastructure with many storage server farms and multi-homed networking access. The primary requirement for DigitalDoors is consistent and compatible storage facilities that are uniquely addressable. The secondary requirement is that this storage be granularized such that data stream access can be controlled by identification and authorization by user, process, sensitivity level, compartment level, and information level.

AA.2.3.0 Upfront Processing

DigitalDoors front-loads document and data stream processing. This upfront processing is dense, comprehensive, and deliberate. Such overhead is necessary to explore multi-tier categorization and security requirements beyond a limited perspective, potential emergent properties, and classification bias. Reconstitution occurs at wire and disk access speeds with enhanced asymmetric performance.

There are five reasons for this design architecture listed in this document. One, the comprehensive parsing of the document or data stream and all associated metadata, links, attachments, inclusions, and structure provides a greater accuracy in the security assessment. Two, the comprehensive parsing balances content, context, and concept issues and provides a process milestone for assessing and balancing competing needs of security against sharing. Three, the front-loaded processing provides a focal point for word stemming, syntactical assessment, clustering, metasearching, index construction, data mining, data spanning, construction of topic maps, and a means to deal with the typical overabundance of information flow from a source (e.g. handling the fire hose concept of signal and data collection). Four, this architecture enables data, document, stream, process-, platform-, system-, network-, and grid-independence; the process is independent and allows anywhere, anytime, multi-platform access subject to access authentication and authorization procedures. Five, source documents tend to be processed once and thereafter distributed and read many times and this design optimizes for this.

TABLE

| Upfront processing delivers: |
| --- |
| Swarming intelligence to access aggregate value, risk, and granular value at the edge |
| MLS/MILS assessment |
| Determine what to protect and how much |
| Determine who should get indication of the information (directory or metadata) |
| Determine who should get information |
| Information aggregation and inference |
| Information prioritization as to what is needed now |
| Ability to redistribute multi-tier tagged materials without additional intervention |
| Support for inter-agency SBU tagging conflicts |

AA.2.4.0 Proxy Architecture

The DigitalDoors Identification and Authorization Server limits access to data and process by vetting users through an identification and authorization process, a traditional security by perimeter and process control.

The DigitalDoors Clearinghouse Server resolves site IDs, vets for identification and authorization, and establishes access level for global reconstitution. The server matches the site ID and provides the recovery map and reconstitution files from wherever they are stored. It returns only the reconstitution files as allowed by the lowest condition of {local, networked, or global security} status and the designated security clearance for the requesting user. The clearinghouse server can also compare security hashes or digital file signatures to validate the integrity of the request for reconstitution files to preclude attacks using random site IDs and message keys.

The proxy server caches and handles reconstitution requests by providing a narrow service window to preclude non-vetted browsing, data storage mining, and bulk access to maps and reconstitution files. Multiple servers can sustain any level of performance necessary with network wire speed the most relevant performance-limiting factor.

The DigitalDoors Dispersion Server is a vital security function because it creates a division between each DeClassified document, often a document or other information sources downgraded to the lowest common denominator for public dissemination, and the corresponding recovery map and reconstitution files. It delivers only what is authorized specifically and minimally for each user. Dispersion security is significantly enhanced by creating a separation between the recovery map and the referenced reconstitution files and by providing specific multi-level access to a delivery stream of these vetted reconstitution files. System-level control with unique one-time pad encryption keys provides effective protection from intuitive forced re-assembly.

Although primary security is affected through the information hiding, dispersion, and camouflage, the proxy architecture with the identification and authorization server, a generic proxy server, and the dispersion server precludes human intelligence operations, hacking for information value, and sophisticated inferential analysis applying set theory or Bayesian statistics against protected organizational data. In addition, this proxy architecture enables a distributed and replicated design such that network or Internet support is always available and available anywhere with complete multi-level security.

AA.2.5.0 Reclassification-Reconstitution

ReClassification of declassified materials, in effect reversible redaction, requires new paradigms because the process is not at all considered in the security or workflow literature. Because the DigitalDoors process declassifies documents using various pattern recognition, work and phrase lookup, and artificial intelligence, and then disperses the extractions to various locations, the reclassification (reconstitution) process is granular. Granularity is a function of location, user, time, threat modes, supervisory overrides, and other configurable limitations. This reclassification process protects the recovery map, recovery extracts, and other storage locations by a process of dispersion and granular storage access.

AA.2.5.1 ReClassification

On the receiving side, DeClassified e-mail, documents, or data are received as a standard e-mail message, documents, or data that required no special treatment, process, or interface. Size, shape, format, encoding, markup, and processing integrity are preserved. Data include formatted data sets, transactional data, or formatted XML and database tables, records, and queries, DeClassified e-mail, documents, or transactional data is the same as standard e-mail since there are no changes within the workflow as perceived by users, servers, or other intermediate delivery processes. The software for ReClassification is itself non-secured and contains no secrets. It is possible to key each ReClassification tool for unique access by specific user, location, document, timeframe, time expiration limitation, and other configuration, as a secondary security access issue. However, the ReClassification process requires a downloadable user interface in the form of an e-mail client reader add-in, the use of our separate e-mail reader, or an integrated document or data reader. Selection of a DeClassified e-mail message, document, or data transaction initiates a workflow process consisting of:

TABLE

Workflow process

Identification and Authorization (either local or remote)
Lookup of recovery map information
Access control by time, location, threat mode, username, category, time of day, level hierarchy
Access to the recovery map (granular access controlled at all time)
Access control to dispersed storage locations
Recovery of dispersed classified critical and important information
Recovery of the encryption key per organization, per user, per document, and/or per extraction
Decryption of encrypted or MultiCrypted critical and important information (on the user side at the user machine through proprietary, standard, SSL, or other encryption add-ins)
Reconsitition (ReClassification of DeClassified e-mail message)
Display within standard user interface of ReClassified e-mail message (such as within e-mail client, PDA, etc.)
Display within separate e-mail reader/ReClassifier application
Display within separate reader/ReClassifier application
Display within separate user application (MS Word, database, PowerPoint, Quicken)

Controlled release for ReClassification purposes can be limited such that different users will have leveled access to the extractions, for example, senior users can have access to the names and credit numbers on a granular basis, whereas junior users cannot.

Workflow and transactional messaging activities that require e-mail, POP3, SMTP, IP, or other similar message flow can also be enabled to employ the remote distributed DeClassification and ReClassification processes in similar ways. Pagers, wireless messaging, and other token delivery methods can be incorporated into access control, authentication, and differentiation for ReClassification levels. The DeClassification process and the display of the ReClassified e-mail, documents, or transaction data does not have to occur in any set or preset location. ReClassification can occur at network devices (in whole or in part) and be delivered to that same location or to other locations. Accumulation of recovery information need not occur at any one single location.

AA.2.5.2 Recovery Information

The recovery information is not a necessarily a single entity or file, or accumulated in one place or by a sequential single process at any single time. The recovery information is a starting point that describes the location of the recovery map. The recovery information for each declassified document is independent from all other declassified documents. Access to that information is either known or, not known but delivered after secured authentication. That location can be communicated in various methods, including system message, e-mail, by phone, encrypted as a message or semaphore, attachments, or other means. Access keys, encryption keys, and rights to that location are also communicated in various like methods.

The location might contain the entirety of the recovery map as a data record, table, XML document, or file in plain text, encrypted, or second order pointers to other locations. Support for other locations is arbitrarily infinite. The recovery map might optionally contain information about the classified source document and the declassification and extraction process. Key sharing for storage access, authentication, and recovery is enabled with {L:N of M} key-sharing schemes. Typically, the recovery map defines offsets to extracted information (offset from initial starting point of the document, content structure, or data stream, offset from last extract, or from arbitrary tags and markers), lengths of the extracted information, lengths of any replacement for the extraction, extraction type, and the extraction itself. The offset is functional in all known types of media formats including text, formatted text, XML, audio, image, video, multimedia, database, and object-oriented descriptions. The starting point from content structure could include the offset from a natural break in the data stream format, a format block, or change in content type or structure.

For example, an MS Word document contains a metadata structure within which the user content is embedded; the reference to the user content forms the natural offset starting point. This is analogous for other types of documents, such a spreadsheet, data query, or OLE document embedded with the MS Word document. Two-pass placeholders support reconstitution in the event a DeClassified document is altered (such as edited, attacked, or damaged) subsequent to the DeClassification. This enables ongoing data processing with secured data and protects DeClassified data even in the event of a concerted semantic attack.

All of this information can be in plain text, encrypted, or represented by pointers to other storage locations. Numbered tag or two-pass tags (such as barcodes or URLs) allow ongoing editing, as with MS Word, wherein placement and even the existence of extractions could be altered in processes subsequent to DigitalDoors DeClassification, thus allowing alteration and functional ReClassification of the DeClassified document at any future time.

Support for other locations is arbitrarily infinite. Each unitary recovery unit for each extraction can be dispersed to an arbitrary storage location. Each storage location can be managed as a closed storage community, with access authenticated at a granular level. Storage locations in whole or in part and individual extractions can be distributed to enable survivability. Failure or loss of any single recovery information or extracted element does not preclude partial ReClassification or failure of any other ReClassification for others documents. A sufficient dispersed survival scheme provides 100% recovery in the event of catastrophic failure.

The location of each secondary or subsequent storage location is independent from all other storage locations. Access to one a particular storage location, file path, file name, access key, encryption key, or other access control (such as biometric token) in no way provides information about or access to any other location. Access to each secondary or subsequent storage location is also granular and separated authenticated. As a result, access to any part of the initial recovery information, even in plain text, without access to storage locations and access authentication prevents full or even partial recovery of the classified document. Plain-text access to any and all storage locations alone precludes manual recovery of a declassified document using human intelligence, as the magnitude of the accurate placement and reference is astronomical (the problem is N!, non-polynomial, or NP complete). Access to a complete plain-text recovery map with plain-text access to any and all storage locations could compromise a single declassified in full or in part, but no other declassified documents.

Authentication is granularly revocable at any time now or in the future. Access to classified documents and the reclassified levels is controllable at any time in the future. Access to recovery information, recovery maps, individual extractions, locations, and access to storage is both granular and revocable.

AA.2.5.3 Processing with DeClassified Data

The starting point from content structure could include the offset from a natural break in the data stream format, a format block, or change in content type or structure. For example, an MS Word document contains a metadata structure within which the user content is embedded; the reference to the user content forms the natural offset starting point. This is analogous for other types of documents, such a spreadsheet, data query, or OLE document embedded with the MS Word document. Two-pass placeholders support reconstitution in the event a DeClassified document is altered (such as edited, attacked, or damaged) subsequent to the DeClassification. This enables ongoing data processing with secured data and protects DeClassified data even in the event of a concerted semantic attack.

AA.2.5.4 Content Filtering

Content filtering includes declassification downgrading but also more typical filtering, document retention, and e-mail attachment retention policies, as implemented by other e-mail products. The major difference between typical filtering technology and DigitalDoors, is the ability of the e-mail, document, or data recipient to potential review the e-mail message and all attachments reconstituted in full, not just as filtered and delivered. The core engine supports classification by word type. Forty categories are currently supported. We are adding politically correct, hate mongering, job resumes, pornography, drug culture, games and jokes, spam, and others as specified. DigitalDoors can filter outgoing and forwarded e-mail for .com, .exe, sys, .ovl, .dll, .ocx, .prg, scr, and script attachments and even search within these data streams for known file infection patterns. Message subject, content, and attachments are processed. In addition to standard content filtering, DigitalDoors also assesses target e-mail addresses including to, cc, and bcc. The workflow is basically one of reviewing inbound and outbound messages for content. When excessive amounts of e-mail messages, documents, or transactional data cannot be processed in real-time, they are parked for later processing in a temporary folder. Administrator (not user) configuration defines whether copies are made, saved, or deleted. Reports explain actions taken and the event logging databases provide analysis into the e-mail declassification and filtering process.

AA.2.5.5 Channel Transmission Protection

The transmission channel(s) for source data to the user's desktop, server, or transaction process, external generation of the recovery file, and external generation of a recovery map are all authenticated with multi-factor authentication, such as PKI certificates, tokens, or other methods, and encrypted with point-to-point encryption of the transmission channel with SSL or in hardware. This process can be controlled by DigitalDoors or be part of the core networking environment and independent from DigitalDoors functionality.

AA.2.6.0 The Recovery Map

DigitalDoors enables information security and privacy protection through the selection of critical elements, the granular extraction of those critical elements to dispersed storage, the distribution of the redacted (and encrypted) information while preserving functional work flow format. The system enables reconstruction of the original document and the multi-level reconstitution of the document to users with different clearance levels and different rolls based on their identification and access authorization. Selection of critical elements can be done: automatically, fully-manual, or assisted with automatic features and manual overrides. Reconstitution and multi-level reconstitution is driven by a "recovery map" that details the selections, replacements, and pointers to actual extractions that are restored with appropriate authorization.

AA.2.6.1 Map Structure Variants and Granularity

The DigitalDoors "recovery map" can be in different forms depending on application, configuration, encryption, signatures, and administrative options. The map in effect is a starting path to a file (database record, script-macro, or data stream) represented by an unqualified or fully-qualified path name and file name, resource reference, a URL, or an XML pointer. The path might not even be recorded, or it might be encrypted. This initial file might contain no references whatsoever to the source and/or redacted file, or even overt references to the collections of associated files and processes. Each file in the collections of associated files and processes might be encrypted in whole or in part, encrypted extraction-wise, element-wise, or distributed as additional collections of associated files and processes, dispersed to an arbitrary number of networked storage locations.

The "recovery map" is partitioned to improved reliability, replicability, survivability, integrity, validity, security, and preclude forced inferential reconstitution activities. The "recovery map" exists as a series of steps and separated pieces of information, with minimal top-down dependence and also stepwise and separated independence. Each step and dispersion further precludes reverse engineering the source and decreases the amount of contextual value to an extraction recovery file. There is no down-top dependence. Each step, each price of information, and each file is independent from all others with no or limited reference to the original source, redacted document, or extraction files. File names, file locations, file date and time stamps, file sizes, and file ownership ring rights might be altered to preclude source document group association, user relationships, process or procedural connections, event correlation, or indication or sources and methods.

Options for the redaction and how extractions are represented within the redacted document are important in achieving a high-level security while maintaining interoperability. As such, replacements for extractions can be null, randomized in both content, context, and size, or substituted with misleading information. Because the various recovery maps can also include efficient minimal or fully chaffed listings of all document elements, combinations of redacted documents with even plain-text recovery maps can severely hamper forced inferential reconstitution activities.

The DigitalDoors recovery map information in its simplest form contains the offsets to the extractions, length of extractions, length of redacted document replacements (which can range from 0 to thousands of characters). This file, database record, script-macro, or data stream might be encrypted in whole or in parts, encrypted extraction-wise, element-wise, or distributed whole and in parts. Encryption is through various algorithms including 3DES, Rijndael, or any third-party encryption product. Granularity with randomness, chaos in association, and dispersion might make the need for encryption necessary merely to meet legal requirements. The recovery map is not necessarily a single entity, but rather usually a collection of associated files and processes, dispersed to an arbitrary number of networked storage locations each accessible through hierarchical controls. The redacted file must have an association to at least one recovery map under any expectation of full or partial reconstitution. Existence of the recovery map alone does not provide any ability to access, decrypt, or apply the map for increased comprehension of the redacted document through forced inferential reconstitution activities. Access to the recovery map is controlled by identification and authorization, by 1-factor, 2-factor, 3-factor authentication or third-party products integrated or callable within the DigitalDoors process.

Metaphorically, you might think of the recovery map as a pirate treasure map or such a map broken in small pieces so that only a sufficient number of pieces have practical value. Furthermore, without ownership, map location reference (the starting point), a time relevancy element, a time frame in history, an understanding of the map relevance to a treasure, the age of the map, or the authenticity and integrity of the map, you have only an interesting artifact. Sometimes it is possible to infer one of those elements and thereby establish values for other elements and thus possible context to the map. Consider that you have thousands of such maps, you have only the context of enforced secrecy and no singular context for any one map, let alone many of these maps. A mapped mismatched with an anticipated treasure is not likely to provide the right results, even for pirate treasure. Given a correct context and a correct starting point for the map, you still need direction and scale for perspective. Now consider that the map provides location for a treasure, you will still need conveyance to the treasure (network access), ability to get the treasure itself (access control), and a means to break open the box containing the treasure (decryption key).

The availability of new information analysis techniques requires that security experts counter threats not only from the obvious but also the probable, possible, and unknown. Information analysis includes not only capture of native communication streams, but also human intelligence methods, assemblage, data mining, intuition, interception and alteration, hypothesis construction and validation, logical inference, Bayesian inference, polling, and set theory. These methods represent a dramatic advancement through the statistical quantification of threats and unknowns with decision-making based on game theory and risk management. As a result, information security methods must include protection against the obvious and also the probable and possible. New information security methods must be flexible enough to protect again the accidental, intentional with systems knowledge, unforeseen, and unknown as well. Concrete security methods do not anticipate probable, possible, and wholly unknown and unforeseen attacks.

The range of known to unknown, expected, probable, possible, promising, and the only-likely predicate the need for new security methods. As a result, DigitalDoors feels the best defense is based on statistical methods, chaos theory, Bayesian inference, and set theory. DigitalDoors is aware of these attacking technologies and inverts these same techniques to counter these actual and perceived threats in both defensive and offensive processes.

The DigitalDoors technology includes the recognition of information as content, context, and concept. Content is the obvious textual or streaming information. Context is the broader information gleaned from work flows, situational utility, how the content is gathered, created, processed, used, and distributed, and what other content establishes an informational basis for semiotic connotation and denotation. Concept is created through process structure, data structure, data tagging and encoding, metadata, and reference and inference to the textual information environment. The ultimate situation is a large number of independent extraction recovery files, generally inaccessible by users, further individually encrypted with one-time pads, which even in aggregate indicate only activity but not content, context, or concept. This explains the value for selection, extraction, granularity, and dispersion.

A relationship exists between the source document, the recovery map, reconstitution extraction files, process flows, encryption/decryption steps, integrity checksums, digital signatures, key generation, key distribution, and anonymity. Note that separate and independent channels can mask any relationship among the source, its recovery map(s), and its extraction file(s). Independence, randomness, dispersion, secure erasure (per MilSpec), optional date and time stamping erasure, initial creation of random files to preclude sequential dated backups analysis for creating grouped file associations.

DigitalDoors protects the redacted documents from the recovery maps, and these from the extraction files by implementation of chaos (such as, the law of large numbers), the independence of the files, file names, location of files, access to files, and the infinite granularity of individual recovery maps and extraction files. In other words, a recovery map can be processed through the DigitalDoors technology n-times to create n-levels of indirection. In the same way, extracted components can be dispersed n-times to create n-levels of access control and indirection.

DigitalDoors technology is implemented under MS Windows. Client, server, and remote components exist, support networking, dispersion, encryption, and add-in integration with other Windows-compliant applications. The technology is generally partitioned into user interface, processing, and storage modules, thereby foreseeing deployment as remote, host-based, server-based, and appliance-based code. For example, the aspects within MS word that create insecurity, links to external sites and other documents, imbedded digital content in formats not known to DigitalDoors, redlining, metadata, and hidden elements would be automatically excluded, the remainder would be redacted and published, and the source Word file itself could be purged from the system or stored within a secure footprint. Since some of the necessary processes compromise the nominal security of the desktop and the communication channels, different parts of this process would occur within different vetted environments; the only insecurity would include what is actually visible on the screen at any time and/or saved as PrntScrn, and the parts of the document buffered in RAM or disk swap space.

DigitalDoors technology can be deployed to secure environments within an open and insecure network infrastructure (IP over Ethernet and Cisco routers) on notoriously insecure components (laptops, PCs, handheld devices, and general-purpose appliances) using COTS applications (MS Word, MS Powerpoint, and new file sharing features embedded in Windows 2003). Application of digital signatures, key management with tokens, proxies, and special key servers provides the necessary infrastructure to vet the integrity of a process work flow.

AA.2.7.0 Concurrency in Granular Data Control

Because the code base for the DigitalDoors applications is based on object-oriented programming, many processes, functions, features, events, and user options are inherently concurrent. However, many processes, functions, and features include an active process status test to disable certain aspects of this concurrency.

This prevents process clashes (for example when two or classifications processes run at the same time on different multiprocessor threads) but primary enhances consistency and security to contain risk. Concurrency and parallelism represent new doorways through the perimeter, an obvious failure in any perimeter security model. Reduction and control over concurrency enables the new deperimeterized DigitalDoors security model by controlling what and how much goes through the doors. This is granular content control.

For example, it is possible to start the Secure process on a document and leave the computer; the process will complete, but no manual activity or options are allowed once the timed login has expired. Likewise queued documents will be processed safety in the background with an active user login, but the process is locked into whatever administrator and user options are in effect at the timed login expires.

Likewise, many categorization functions will preclude manual overrides until they are completed. This prevents clashes and security lapses should a user try to distort the tagging. Generally, the automatic recoding feature will code to the highest sensitivity level even when prior processes assert some tag lower than the highest level in the various databases. This helps achieve stability and consistency as well. Manual overrides against the document itself or the relined selections can always occur at any stage, but not during an automated process. However, note that COMSEC will preclude any manual overrides, as it is meant to do, so as to assert that demanded highest organizational sensitivity level.

AA.2.8.0 DeClassifying and ReClassifying E-Mail

Security for workflows, transactions, and E-mail requires new paradigms because it is only partially addressed by current encryption methods. The current technology fails to address workflow, convenience, and distribution issues. Specifically, before and after encryption, the security gap reveals a window of opportunity to attack the plain-text. DigitalDoors specifically addresses the security of workflow, transmission, and e-mail with methods to distribute and provide granular leveled access to information. The two control points for securing e-mail with DeClassification are represented by the generation and distribution of the e-mail and the receiving and ReClassification (reconstitution of the critical and important information) of the e-mail.

AA.2.8.1 Generation and Distribution

There are several issues when securing e-mail. First, is the issue of sourcing e-mail. Although this generally occurs at the e-mail server or the e-mail client, frequently other applications directly initiate the e-mail transmission from within the applications themselves. Internet enablement and interprocess messaging represent serious growth areas in application development, for which DigitalDoors is expressly useful. We implement DeClassification e-mail generation from within applications directly by initiating the DeClassification process with multiple secured outputs where the declassified e-mail is an output. Second, we intercept the generation of e-mail and DeClassify it on the the fly by initiating the DeClassification process with multiple secured outputs where the declassified e-mail is an output. Attachments can be unpacked and examined, declassified, and reprocessed as attachments. Third, we intercept outboxes and outgoing e-mail caches in order to initiate the DeClassification process with multiple secured outputs where the declassified e-mail is an output. Classified information is encrypted, MultiCrypted, and dispersed to local and/or remote storage locations. Storage of critical and important information is configured and dispersed to different storage locations including Internet and hosted storage options. Dispersal is controlled by policy, configuration options, and threat mode based on users, recipients, situational needs, e-mail content, and critical and important information categorization. For example, an e-mail containing names and credit card numbers can be DeClassified with each of the two (and other categories) dispersed to separate storage locations.

Distribution represents no changes to standard e-mail process in any form as standard address book processes are used. We can match the address book, names, or e-mail addresses against known threats or alter processing subject to the target addresses. Remailing could initiate a further downgrading (or even upgrading) of content when compared against target addresses. Distribution is nominally assumed to exist within a decentralized, distributed, and non-secured environment. There is no special need, effort, or consideration for distributing DeClassified e-mail as there are no changes within the workflow as perceived by users, servers, or other intermediate delivery processes.

ReClassification is a function that is controlled and limited by the standard identification and authorization process. This includes the use of agents, and leveled access through secret sharing, alerts, threats, location, timing, policy, access to remote storage, and dispersive storage.

AA.2.8.2 Receiving and ReClassification

On the receiving side, DeClassified e-mail is received as a standard e-mail message that required no special treatment, process, or interface. DeClassified e-mail is the same as standard e-mail as there are no changes within the workflow as perceived by users, servers, or other intermediate delivery processes. The software for ReClassification is itself non-secured and contains no secrets. It is possible to key each ReClassification tool for unique access by specific user, location, document, timeframe, time expiration limitation, and other configuration.

The ReClassification process requires a downloadable user interface in the form of a e-mail client reader add-in or the use of our separate e-mail reader. Selection of a DeClassified e-mail message initiates a workflow process.

TABLE

DeClassified e-mail message workflow process

Identification and Authorization (either local or remote)
Lookup of recovery map information
Access control by time, location, threat mode, username, category, time of day, level hierarchy
Access to the recovery map (granular access controlled at all time)
Access control to dispersed storage locations
Recovery of dispersed classified critical and important information
Decryption of encrypted or MultiCrypted critical and important information
Reconstitution (ReClassification of DeClassified e-mail message)
Display within standard user interface of ReClassified e-mail message (Such as within e-mail client, PDA, etc.)
Display within separate e-mail reader/ReClassifier application Controlled release for ReClassification purposes can be limited such that different e-mail users will have leveled access to the e-mail message, for example, senior users can have access to the names and credit numbers on a granular basis whereas junior users cannot.

Workflow and transactional messaging activities that require e-mail, POP3, SMTP, IP, or other similar message flow can also be enabled to employ the remote distributed DeClassification and ReClassification processes in similar ways.

AA.2.8.3 Forwarding and Redelivery of E-Mail

The standard ReClassification process protects access to DeClassified e-mail while it is ReClassified. This retains control over information flow. Redelivery, forwarding, or remailing of the e-mail message prevents general exposure to critical and important elements, as only the DeClassified message can be forwarded or remailed. All subsequent readers of the e-mail will see only this DeClassified version as a minimum in security. However, access to the partial leveled or fully ReClassified document will require the standard access identification and authorization process. It is also possible to embed within the browser tools—assuming control over the e-mail reading environment within an organization—indicators to further DeClassify e-mail prior to forwarding or redelivery of previously downgraded e-mail messages.

AA.2.8.4 Content Filtering

Content filtering includes declassification downgrading but also more typical filtering, document retention, and e-mail attachment retention policies, as implemented by other e-mail products. The major difference between typical filtering technology and DigitalDoors, is the ability of the mail recipient to potential review the e-mail message and all attachments reconstituted in full, not just as filtered and delivered. The core engine supports classification by word type. Forty categories are currently supported. We are adding politically correct, hate mongering, job resumes, pornography, drug culture, games and jokes, spam, and others as specified. DigitalDoors can filter outgoing and forwarded e-mail for .com, .exe, sys, ovl, .dll, .ocx, .prg, and script attachments and even search within these data streams for known file infection patterns. Message subject, content, and attachments are processed. In addition to standard content filtering, DigitalDoors also assesses target e-mail addresses including to, cc, and bcc. The workflow is basically one of reviewing inbound and outbound messages for content. When excessive amounts of messages cannot be processed in real-time, they are parked for later processing in a temporary folder. Administrator (not user) configuration defines whether copies are made, saved, or deleted. Reports explain actions taken and the event logging databases provide analysis into the e-mail declassification and filtering process.

AA.2.8.5 Processing E-Mail

DigitalDoors was envisioned as a solution for security in complex workflows as opposed to point solutions for files, records, or databases. As such, the modularized structure of the suite, the support data structures, and databases, and the flexibility for semaphores, interprocess communication, and command line arguments have allowed us to integrate the DigitalDoors suite into Microsoft Outlook, one of the most proprietary and awkward software development platforms imaginable. As a result of this integration effort, DigitalDoors for Outlook runs virtually transparently as part of the normal Outlook workflow. In fact, it is a structured as a standard .DLL add-in library.

New messages are DeClassified prior to outgoing delivery and received messages are automatically ReClassified for users according to security levels. Recovery information widely dispersed and distributed on VPNs or Internet-attached networks are easily mapped into the received e-mail for real-time display. Reconstitution times compare to wire speed and are several magnitudes faster than traditional encryption technologies. Revocation of access, revocation of messages sent in error, and location-specific security is enforced as with all DigitalDoors technologies.

As with most workflow integration efforts, maintenance of security and smoothness of operations dwarfed programming issues. System timing, order of process, access control, workability, and other reliability overshadowed code concerns. Interception of events inside the Outlook framework proved the most fearsome constraints; these problems have since been overcome. However, it is important to document the workflow for security reasons.

All DigitalDoors process within Outlook are transparent where possible, all standard outlook functions, features, and workflows are maintained intact, and we succeeded at not altering the user interface with the exception of several toolbar buttons for online help and specific DigitalDoors functions. The creation of a new or forwarded e-mail message occurs without change in the user interface. An additional DigitalDoors user logon is required for all DeClassification and ReClassification consistent with the DigitalDoors desktop Suite. Administrative and user controls are configured through the DigitalDoors Suite. Outlook username names, MS Exchange interfaces, e-mail addresses, passwords, and other Outlook-specific settings are maintained and function identically with or without the DigitalDoors for Outlook.DLL add-in.

While the external workflow is not altered from the user's perspective, several internal changes are important to document. First, e-mail messages are constructed through four primary mechanisms. First, they are created as new. Second, they are forwarded or responded to. Third, messages are constructed as drafts. Fourth messages are copied and pasted. Other workflows are possible with MS Exchange, other Microsoft workgroup messaging tools, and third-party .DLL add-ins. User-created or third-party .OPM or VB scripts should function normally with the DigitalDoors for Outlook.DLL installed, however, we frown on such tools as significant security holes and for the potential conflicts with other add-ins, overlapping scripts, and potential to create holes for viruses and opportunities for script kiddies. Our initial scripts were converted and compiled into the more-secure MS-preferred .DLL add-in formats. Note that VBA, VB scripts, and other tools can undermine Outlook security, the Outlook security patches that prevent scripts from running, and create many security concerns. We suggest you avoid that path. Nevertheless, the DigitalDoors process remains the same throughout whether other scripts are installed.

New message events are trapped. The outgoing Outbox message is moved into a cache folder for processing. DeClassification processing occurs per administrative configuration. The message is parsed completely by means of the MS Outlook message object structure. A temporary input file is constructed. This file is passed through a system shell function to the DeClassify application. The temporary file is processed by this application and a temporary output DeClassified file is created. The recovery map and files are also created and dispersed per administrative configuration. The DeClassify application deletes all traces of the temporary input file as per administrative configuration. This includes overwrites per SAS, Orange Book, and other security standards for file erasure. The DeClassify application completes. The temporary output DeClassified file replaces the contents of the original outlook message. The message is returned to the Outlook Outbox folder and delivered per standard Outlook configuration.

ReClassification occurs when a user selects an Inbox message. If the message has been DeClassify, the selection event is intercepted and the temporary input DeClassified file is created. This file is passed through a system shell function to the ReClassify application. The temporary file is processed by this application and a temporary ReClassified output is displayed. All user-specific DigitalDoors security measures are applied to the level of granular recovery, access controls, location, and other limitations. The DeClassify application deletes all traces of the temporary input file as per administrative configuration. This includes overwrites per SAS, Orange Book, and other security standards for file erasure. The ReClassify application completes.

AA.2.9.0 Declassifying and Reclassifying while Browsing the Web

Security for workflows, transactions, and information stores while browsing the Internet and Intranet webs require new paradigms because it is only partially addressed by current methods. The current technology fails to address workflow, convenience, and distribution issues for public and private information, the granularity of delivery for that information, or the centralized and decentralized access to that information. DigitalDoors specifically addresses the security of workflow, transmission, and browsing with methods to distribute and provide granular leveled access to information. The two control points for securing browsing with DeClassification are represented by the de facto delivery of declassified information with access to immediately reclassified information subject to secondary identification and authorization.

AA.2.9.1 Generation and Distribution:

There are several issues when securing browsing and access to data (web pages, tables, data sets, and linked files). First, is the issue of sourcing information and downgrading it for general presentation. DigitalDoors implements DeClassification for all data stored directly by initiating the DeClassification process with multiple secured outputs where the declassified data is an output. Second, access to the ReClassified material is generated on-the-fly subject to identification and authorization. This is accomplished by initiating the DeClassification process with multiple secured outputs where the declassified data is an input along with the critical and important extracts.

Classified information is encrypted, MultiCrypted, and dispersed to local and/or remote storage locations. Storage of critical and important information is configured and dispersed to different storage locations including Internet and hosted storage options. Dispersal is controlled by policy, configuration options, and threat mode based on users, recipients, situational needs, browsing content, and critical and important information categorization. For example, a static web page or even one generated dynamically from a database containing names and credit card numbers can be DeClassified with each of the two (and other categories) dispersed to separate storage locations.

Distribution represents no changes to standard browsing process in any form except for dynamically-generated pages require a dynamic recovery file. Distribution is nominally assumed to exist within a decentralized, distributed, and non-secured environment. There is no special need, effort, or consideration for distributing DeClassified browsing as there are no changes within the workflow as perceived by users, servers, or other intermediate delivery processes. Because all static pages are stored in the DeClassified format, access to all pages in a ReClassified format is on a per page basis.

ReClassification is a function that is controlled and limited by the standard identification and authorization process. This includes the use of agents, and leveled access through secret sharing, alerts, threats, location, timing, policy, access to remote storage, and dispersive storage.

AA.2.9.2 Receiving and ReClassification

On the receiving side, DeClassified browsing is received as a standard data that required no special treatment, process, or interface. DeClassified browsing is the same as standard browsing as there are no changes within the workflow as perceived by users, servers, or other intermediate delivery processes. The software for ReClassification is itself non-secured and contains no secrets. It is possible to key each ReClassification tool for unique access by specific user, location, document, timeframe, time expiration limitation, and other configuration.

The ReClassification process requires a downloadable user interface in the form of a browsing client reader add-in or the use of our separate browsing reader. Selection of a DeClassified data initiates a workflow process consisting of:
- Identification and Authorization (either local or remote)
- Lookup of recovery map information
- Access control by time, location, threat mode, username, category, time of day, level hierarchy
- Access to the recovery map (granular access controlled at all time)
- Access control to dispersed storage locations
- Recovery of dispersed, Classified critical and important information
- Decryption of encrypted or MultiCrypted critical and important information
- Reconstitution (ReClassification of DeClassified data)
- Display within standard user interface of ReClassified data (such as within browsing client, PDA, etc.)
- Display within separate browsing reader/ReClassifier application Controlled release for ReClassification purposes can be limited such that different browsing users will have leveled access to the data, for example, senior users can have access to the names and credit numbers on a granular basis whereas junior users cannot.

Workflow and transactional messaging activities that require dynamic browsing with ad hoc generated reports or other similar flow can also be enabled to employ the remote distributed DeClassification and ReClassification processes in similar ways, with generation of a temporary recovery file.

AA.2.10.0 Creating Multiple Levels of Categorization

DigitalDoors resolves conflicts in multitier overlapping hierarchical categorization to the highest, most risk adverse level, in order to create generic redaction. Granular content control with reconstitution provides future-proof "put the cat back-in-the-bag control" over repurposing while enabling preservation of ongoing critical missions.

Categorization is reflected by the end results of tagging (also known as labeling). You interpret the information and traditionally select one available category and attach the associated tag to the range over which the categorization applies. The problem is you attach one tag to a range, often a paragraph of many sentences. This one tag has to cover all possible needs because you cannot have two or more tags, and you cannot assign a separate tag to each sentence within the paragraph. In some instances, this categorization is limited to a sensitivity level, or at least what you perceive the sensitivity to be given your analysis of the circumstances, a priori knowledge, and anticipated usage and risk factors. Risk factors are often the result of technical issues of sources and methods.

Even were the information is unimportant, is reflected in the daily public news, or is general knowledge, the source or method from which this fragment of information was obtained in this specific instance, defines a specific sensitivity level. It results from organizational agenda, human limitations in processing a fire hose of information input, and legitimate perspectives. Consider the redaction of the Valerie Plame Wilson manuscript, "Fair Game," where the published addendum restored the missing information, both in terms of simple content and more complex context.

Such one-dimensional categorization defines the many problems of categorization. The entire knowledge environment is reduced to a lowest common denominator of utility or expectation. It is indicative of the most pressing needs or the most immediate interpretation. In effect, the tag is saying that the range so defined is intended for this purpose, contains this level of information, and overlooks any possible reuse, repurposing, or the potential for inference. When there is obvious potential for inference risk, the tag is assigned that reflects that immediate understanding of this potential increased risk, frequently pushing the information into a black hole where it never gets released. It also never gets reassessed because of workflow, work overloads, and the increasing information input.

Categorization is really about creating multiple levels. These include intended purpose, possible purposes, a time line of value, and assessment of potential inference. Categorization should allow overlapping because people write sentences that are disjoint and have different ideas, reflect competing ideas, match the well-known with new fact or allegation, and create a hodge-podge of conflict. In fact, categorization should support the arbitrary selection of words, phrases, parts of pictures, parts of an audio track, and individual symbols. Categorization should be granular. That categorization becomes hierarchical and tangled. One of the reasons such categorization is rare is that because it is messy, does not lend itself to simple solutions, and does not simplify. It adds complexity. It becomes metadata, an additional in-channel and out-of-channel risk to data streams, adds knew knowledge through aggregation, and opens the doors to inference.

However, hierarchical overlapping classification enables a number of information processing solutions that otherwise are too complex to consider. Specifically, we refer to the measurement of information, the security of information, the discovery of new knowledge, and the distribution of it all.

The time component to information is frequently ignored. Most people think about information decaying and becoming less important over time because we do not need it anymore or newer information supplants it and makes it useless. However, the information stores are frequently updated, augmented, and linked with other information to reflect a newer understanding. This might be newer information or just older information seen in a new light. The aggregation, inference, and interaction enable new opportunities, what we call the unanticipated repurposing of information. Single categorization is oblivious to the unanticipated repurposing of information, to the time value of information, to vagaries of semantic and semiotic meaning of words and phrases. It is not even sufficient for single known, preplanned purposes. It is certainly insufficient in a networked information-sharing ecosystem.

AA.2.11.0 Out-of-Channel Multitier Tagging

Tagging and metadata provides content meaning, context to the content, and a concept of utility, purpose, and applicability to data stream. It enables association of the data to a schema. It enables the transformation of data stored within one data structure into a different structure, into reports, into XML or even into hierarchical markup. Tagging technically refers to the assignment of a taxionomatic assignment to describe the topic or purpose of a unit of information, such as <Top Secret> to a tear line about the source and veracity of a terrorism threat, or <SSN> to a column of personally identifiable information (PII) like social security numbers.

Tagging has traditionally been applied to database columns as a schema definition. However, the growth in so-called unstructured documents is creating a predominance where tagging is generally applied such that the tags are in-channel with the data; in other words, the tags are interspersed within the data stream. Representations have evolved to break the tagged units into differentiable groupings with indentation often seen with HTML and XML. This has advanced such that the indentation is also viewable within a tree-displayed hierarchy. Tagging architectures have evolved to support meaning, structure, sensitivity-level marking, segmentation of data for legal compliance, and many user- or application-specific requirements.

Formally and mathematically, tagging is defined by how identification is used to repurpose resources in ways different from or incompatible to prior representations, thus requiring flexible and overlapping identification systems. Tags are not only about meaning, but about utility, purpose, ownership, source, methods, applicability, distribution, notes, security, sharing, information discovery, resource management, custodianship, and other workflow-specific requirements. The benefit of XML and metadata is the ability to create an out-of-channel description for known and as-yet-unknown requirements. Tagging is not static and must be flexible.

The Dublin Core Architecture is one attempt to standardize tagging styles with industry-wide uniformity. Although data standardization is essential for progress, obsolete tagging methods are not. In-channel tagging exacerbates security problems by increasing the content of data and its potential for risk. The DigitalDoors technology for creating security for content by granularization also extends to tags and metadata. Granularization is not just about the content, but also about the tags and metadata establishing context and concept. This drives the impetus for out-of-channel multitier tagging.

Data lives and changes and dies. It is a lifecycle. It is acquired through some collection methods, is typically stored, is processed for one or more purposes, is updated and augmented, is distributed to many other locations (in whole, in part, or transformed), underlies the basis for reports and outcomes, and eventually (or not) decays to uselessness. Data can retain value past its anticipated half-life if references are maintained for distribution as the data evolves. This data lifecycle determines the value of the data and its concurrent security risks as well. Tags and metadata improve the quality, utility, value, half-life, security, and sharing benefits by retaining context and concept.

There are three significant problems with conventional tagging methods. First, the addition of new tags generally means the exchange of existing tags, which changes meaning. Second, the tags can be stacked linearly but cannot be multi-dimensional or multi-tiered, which precludes multiple, derivative, or evolving meaning. Third, the tags add, change, or otherwise alter the semantic content, context, and concept of the preexisting or evolving information. This paper will address the ramifications of these three problems and why out-of-channel multitier tagging resolves them.

Exchange of tags accelerates data closer to its half-life and uselessness. When raw data is tagged, the tags assert a specific meaning and a context for usage. This is usually an improvement to the data because it adds organization, applies a uniform format for consistency and validation of integrity, and it implies or defines a purpose. When data already contains tags but is stripped of the existing tags with insertion of new tags, this also adds organization, applies a uniform format for consistency and validation of integrity, but it degrades prior information content and structure. This is similar to the effects of data normalization within a relational database format. Although some process encourages standardization, it is at the expense of source, method, purpose, context, and so forth. Reference to external tags and all tags as out-of-channel data—including the original tags—retains the original meaning in addition to any evolutionary meanings. Security is also enhanced because context and concept of the original and additional tags can be released with granular controlled as needed to establish usage, purpose, distribution, and meaning. This enhances semantic meaning, the application of security, and the control over information sharing.

Uni-dimensional tags are sufficiently flexible to replicate a database schema and all indexing, references, and relationships. This functionality comes at the cost of verbosity, security, and inflexibility. Although tags and metadata are part of the schemas for structured data like databases, they are rapidly becoming incorporated into the data content channel itself through XML and derivative hierarchical structures. DigitalDoors white papers have detailed the security risks of compound document formats like XPS and MS Office document formats elsewhere. This significantly degrades data security and the privacy of PII. Inflexibility prevents the reassessment of the actual content, how the context colors that content, and how concept can establish purpose and utility. As such, inline tags support only a single dimension of aggregation. It is hard to overlap them, assign tags in parallel, or establish conditional assessments. For example, a tag can describe the target content of the tag as top secret, in the French language, encoded in Unicode characters, and as important. It does not efficiently support situational meanings and purpose-driven taxonomies, for example, "wedding" as a normal noun and event in a conventional usage but also could reflect a keyword for an event of terrorism depending on context when the source is a known terrorist. Often such contextual evolutions require changes to templates, specific explanations of the intent of the tag additions and metadata solely for these extensions. This has additional ramifications in terms of how data and the tags on the data are upgraded or downgraded.

The assumption that data has a single or a few controllable purposes misunderstands the knowledge management changes brought by the Internet and the widespread integration and distribution of workflow. This undermines information evolution, data repurposing, and the verbosity tends to accelerate data towards its half-life of uselessness. This rigid structure also precludes access to the full value of convergence and divergence search technology, an assessment of security risk through aggregation, inference and interaction, and the appropriate ecosystem for inter-domain information sharing.

Tags add, change, or otherwise alter the semantic content, context, and concept of the preexisting and evolving information. While this extends the half-life of data because it enhances the value of the data in terms of its actual content, context, and concept, it also in conjunction extends the risk because of the enhancement to the value. The permanence of tagging systems and sensitivity-level labeling, like the Ball-LaPadula model (BLP or BLM), do not support the change in data or its risk and do not enable efficient upgrading and downgrading, sometimes precluding it entirely. BLM supports only the upgrading of data, but this exacerbates the so-called "black-hole" where data disappears in higher and higher sensitivity levels and locks down potential information sharing. Inline and single dimensional tags fail to enable data repurposing as previously stated, but they also preclude the evolution in the knowledge management and semantic understanding of the data. Old data, even data seemingly well past its useful half-life, might contain seeds of new discovery, divergence search potential, and transformation into new formats if the legacy of the old meaning is augment through new meaning as represented by new tags and new metadata.

Although realistically the difference between in-channel and out-of-channel tagging is a matter of packaging and delivery, separation, extraction, redaction, and dispersion is necessary to establish a security ecosystem supporting knowledge discovery, security, and sharing. In-channel tagging recalls the shortcomings in security based on perimeter methods and point solutions. Out-of-channel tagging disperses the risk and the possible attack vectors and reduces the value and hence risk of content through granularization. Granularization is not just about the content, but also about the tags and metadata that establish context and concept. The separation of the data content from context and concept, semantic assessment of content within the data, and a functional redaction enables BLM compliance with the association of data evolution and tag enhancement by reference rather than by massive file revision and reassessment. Granular content control on-the-fly enables the security ecosystem otherwise impossible.

This dynamic change comes with the risk to security and information sharing, so the risk too must be dynamic and its measurement dynamic as well. Only out-of-channel multitier tagging enables dynamic reassessment of data at the content, context, and concept level and a responsive data-level security by means of the DigitalDoors granular content control technology. Tagging architectures must further evolve to support meaning, structure, sensitivity-level marking, segmentation of data for legal compliance, and many user- or application-defined requirements through multitier tagging.

AA.2.12.0 Multitier Hierarchical Overlapping Tag Structure

Classification of information and the assignment of tags create as many problems as it solves. Generally, classing and tagging means asserting a single consolidating category with the highest or most meaningful tag that becomes part of the data stream. This alters the physical format of the information and only represents the information in the most general of ways.

Formally, this threat is defined by how identification is used to repurpose resources in ways different from or incompatible to prior representations, thus requiring flexible and overlapping identification systems. Although it is undesirable to impose what are in effect multiple overlapping coordinate systems, it is commonplace. They develop as a result of specific needs addressed by available technology and do not always become superseded by new ones. Examples include conflicting Japanese house numbering versus western style, route maps, utility layouts, geographic information systems, latitude and longitude grids, and GPS waypoints. These systems are different and sometimes incompatible, but all must be transformed from one in to the others as a practical matter.

The more robust and flexible solution is reliance on multiple out-of-channel tags, using the DigitalDoors technology of multitier hierarchical overlapping tag structure, to reflect unlimited perspectives of the information without exposing new security risks through the elaboration of tags that denote and dictate the actual content, context, and concept of it. This is essentially metadata in the form of metatags coupled to the information but not made part of it.

Another problem of tags, specifically simple tags and more specifically a single tag defining an information unit is that the tag does not have to be correct or useful and can in fact be misleading. A safe tag can mask the danger of malware lurking in information or misrepresent the security-sensitivity. A tag is not all things to all people or all processes, and reliance on a single catch-all representation is simple but also simple-minded and deficient.

The application of multiple and overlapping tags assigns sensitivity level, compartments, categories, purpose, usage, and other pragmatic meaning to granular content. It is multitier because many tags can be applied to the same content to describe different aspects of the content, and it is hierarchical because tags can overlap to define words within phrases within paragraphs within documents or other compound data streams. The basis for success with granular content control is to establish a comprehensive review of data content, context, and concept as a precursor to tagging and all subsequent filtering and assessment of purpose. Traditional DOD tags indicate a non-reflexive sensitivity level (and/or compartment) but do not in any way describe the potential for inter-domain information sharing except perhaps to preclude it, whereas multitier hierarchical tagging enables security compliance with granular information sharing to multiple domains. This specific implementation resolves issues that plague cross-domain semantic interoperability and the complexity if not impossibility for mapping a consistent dictionary and data model for communities of interest (COI) by reducing the problem of information tagging of the gross document to a granular one.

Multitier hierarchical overlapping tag structure undermines one single information classification, information sharing, and information distribution method by removing the dependencies from a single centralized process to a distributed and functionally-independent environment. Rather than assessing the limitations of acquisition and usage to the owner or a managing process, information can have multiple competing and tag uses where the distribution is controlled ad hoc subject to situation, evolving requirements or risks, and distribution workflow.

AA.2.13.0 Dictionary Encoding

DigitalDoors supports a large number of dictionary encoding options for semantic, semiotic, classification, categorization for utility, perspective, repurposing, and information sharing. These are configurable by the administrator and in parts modifiable by individual users.

Dictionary entries can be augmented and overridden by functional group administrators or individual users to compensate for the differing security requirements facing a user, the group containing that user, or the larger organization. Users could be members of multiple groups with sensitivity level settings inherited by the appropriate role, group, mission, or situation. As noted in other documentation, sensitivity level domination is the overriding principle to assure granular content control. In other words, it is easier to upcode and than downcode, and it is also automated so that higher sensitivity levels override lesser ones. However, downcoding through manual selection is fully supported to override all prior and automated selections.

Sensitivity levels, compartments, and other categorization assignments are fully configurable. Names, abbreviations, numerical coding, and color assignments can be changed. All dictionary entries must conform to these coding configurations, but are also fully configurable.

Dictionary entries include acronyms, words, and phrases to support natural language syntax. Acronyms generally are single word units all in upper case. Words are single word units and can represent all dictionary words, grammar/form variants, common words, proper names, etc. and capitalization is useful but not critical to recognition. Phrases are a string of unit words. Extension to content meaning is supported by supplemental dictionaries that map synonyms, keys into phrases, partial matches, soundex matches, and inter-language or multiple-language substitutions. User word lists and automatically-generated linear adjacent composites connect into My Group Lists, as do all the basic dictionary entries. This range is large, but by no means extensive or complete, but it can be extended as new content/context/concept interpretation can be implemented. Such flexibility is useful for multiple overlapping categorization or the manual selection or automation of a dictionary entry where multiple categorizations are available.

Matching also includes word form variants, antonyms, synonyms, and soundex encoded sound-alike words. The overhead required to match form variants and synonyms is substantial, both in upfront administrative time to establish these links (specific to each production environment) and the additional processing time to search for synonyms. Soundex is automatic, fast, but results are many. Soundex compresses every word into a non-unique 4-character representation.

The optional DigitalDoors symbol permutation engine can process these symbolic substitutions for letters into literal words and phrases. Changes include emphasis on letter substitution to convert strings into meaningful words or more complex phrases. Symbol substitution is not simple because the 2-character $\pi\pi$ (note Pi, $\pi$, and $\pi$ adjacent) becomes the 1-character M. The conversion is fast and usually results in a single dictionary match. Symbolic representations of misspelled words is somewhat more complicated because once the alphabetic substitutions are performed, resulting words must be matched by soundex or by a synonym substitution. In that indirect way, 'UR' becomes 'you're' or 'you are.'

DigitalDoors also enables monitoring and automated dictionary recode throughout the database to handle changes across all prior processing, recoding through recovery files, redaction files, etc. (not done but would be a good utility).

AA.2.14.0 Declassification and Scrubbing of Maps

The DigitalDoors DeClassification process occurs on the end user's desktop, any server, or transactional process. The source document or data stream (to be declassified) need not reside on the user's or server computer but could be anywhere attached through a network. The recovery file and associated recovery map can be created anywhere attached through a network.

The recovery map is not a file per se, but an computerized abstraction that associates the source file with the declassified file and to the recovery file. Actually, the source file can be safety deleted and all references can be purged to maintain top security. There are no forward or backward links between these files and the recovery map. Loss of the recovery map renders recovery mathematically unlikely. Granularized and dispersed copies of the recovery map guarantee reconstitution without compromising risk and security. Association between declassified material and the source, the recovery file, or the recovery map is one way only, in the recovery map. The recovery map is functionally embodied in one of many implementations, as configured by the administrator:

The map is referenced by a prefix and the initial source filename.

The map is a database record keyed by declassified file name with link to recovery file dispersed to one of many storage locations.

The map is a two-part number [organization reference] [document ID] contained as an e-mail header used to reference a database record dispersed to one of many storage locations.

The map is known only to a person(s), requiring specific selection by the person, persons, or persons using secret sharing schemes.

The association between source document or data stream, recovery file, and recovery map is broken by the DigitalDoors process. Filenames or data object references can be randomly generated with unlimited path names with 46-factor independence; this exceeds RSA 1024 bit security levels with only 3 character filenames, and MS Windows easily supports 278 byte file paths.

The first pass of the process targets potential extractions, performs the extractions, and inserts placeholders. The second optional pass of the process generates a two-step placeholder insertion, such as numbered tags, barcodes, URLs, or pay-for-view recoveries. Numbered tag or two-pass tags (such as barcodes or URLs) allow ongoing editing, as with MS Word, wherein placement and even the existence of extractions could be altered in processes subsequent to DigitalDoors DeClassification, thus allowing alteration and functional ReClassification of the DeClassified document at any future time. A recovery file is generated during the first step of the process. The extracts can reside within this recovery file in the format of plain text, encrypted, plain text links, or encrypted links.

The format is determined by administrator configuration. The recovery file contains offset to each extraction, the length of each extraction, the length of each placeholder, the category type of each extraction, and the extract in one of the configured formats. The recovery file contains no forward or backward information linking it to the source document, to a recovery map. The declassified document contains no forward or backward information linking it to the recovery file or to the recovery map. When extractions are contained with the recovery file as links, whether in plain text or encrypted, the secondary recovery files for each extraction contain no forward or backward linking information. These secondary, subordinate recovery files can be infinitely chained through one-level forward pointing links. Each such link can be plain-text or encrypted.

AA.2.14.1 Channel Transmission Protection:

The transmission channel(s) for source data to the user's desktop, server, or transaction process, external generation of the recovery file, and external generation of a recovery map are all authenticated with multi-factor authentication, such as PKI certificates, tokens, or other methods, and encrypted with point-to-point encryption of the transmission channel with SSL or in hardware. This process can be controlled by DigitalDoors or be part of the core networking environment and independent from DigitalDoors functionality.

AA.2.15.0 Distribution of MS Word

Distribution of MS Word or any other MS Office document is always potentially insecure. The .doc binary file security risks with MS Word are consistent across the MS Office tools in all releases of the software. When a MS Word document is saved in ASCII format to force the extraction of metadata, downgraded as an ASCII document, and then imported as an MS Word document, metadata will be reintroduced. It is possible to import the ASCII into the MS Word document on a standalone desktop computer with carefully masked user, organization, and other MS Office attributes. However, that raises the workflow issue of how you get the downgraded ASCII document onto that standalone desktop computer and how you get the downgraded MS Word document from the computer. Importation to MS Word also bloats the file size, generally on at a ratio of 80:1 with ASCII. Furthermore, all formatting markup from headings, to italics, footnotes, links, references, and other features that add value to the MS Office tools will be lost during the process and not regained without additional effort. This effort will tend to reintroduce the thirteen categories of dirty metadata—detailed in Microsoft security briefs—removed in the process of downgrading to an ASCII document in the first place. This is not a viable approach to MS Office security.

MS Office 2003 introduces a file storage format based on XML. Although the MS Office metadata is still saved to the file, at least this metadata is stored in ASCII format. The Word file binary format contains a mix of ASCII, binary data, bewildering proprietary data formats with a hierarchical tree structure. Although the XML format retains the same hierarchical structure, the dirty metadata is tagged and can be processed with DigitalDoors to retain functional MS Office operability and secured portability. Complexities abound—particularly with linked and embedded MS Office files—but a secured XML path represents the means to validate the security of a document where the .doc-to-ASCII-to-.doc process is not.

AA.2.16.0 Filters, Sieves and Capabilities

Filters and sieves provide data stream classification necessary for the information ecosystem. It embodies knowledge discovery, security, and information sharing. Some interesting principles include:

Up front classification reduces the security footprint for universal redaction. It is a matter of parsing the data stream for content and context of potential pertinence to establish a thorough and practical classification.

Comprehensive classification is important for long-term information management.

Precision classification is not sufficiently future proof since it details existing needs only.

Precision classification, while useful in some venues, is not specifically valuable as a thorough classification for risk assessment and security because your content of risk does not reflect a creative attacker with a different view of reuse and abuse.

Initial classification does not preclude improved reclassification in the future or the value of reclassification for granular content control, specifically reversible reconstitution.

Reuse, repurposing, time factors, plus aggregation, inference, and interaction tend to undermine initial classification.

The DigitalDoors classification metadata does not have to be included with the data stream; it can be linked to the redactions, recovery files, and processes or lost after use.

AA.2.16.1 The DigitalDoors Classification Metadata can be Transitory.

The DigitalDoors classification metadata does not really have to be retained at all, nor in some circumstances should it even be retained as it represents a synopsis of the data stream, a bloat to storage, a risk of equal or greater concern than the original data stream itself, and a drain on system and bandwidth management.

Classification can always be reproduced, and each pass, in particular with automated classification, is repeatable and consistent yielding identical results or better topical ones with greater reflection of risk.

The classification can improve over time as we learn more about the universe, the meaning of everything, and our place in that universe. Risk profile change. Some things could well decay in importance while others can become more sensitive, more important, in need of more privacy or greater protections. As such a new classification would reassess prior items, categories, policies, and reflect the current understanding of those issues and how we now comply with them. Note that the data stream, in particular the universal redaction and the recovery files, do not need to be repeated since they already exist in a form sufficient for any future scenario.

The meanings of the extracted items and the recovery items specifically can be reassessed in light of future utility, reuses, repurpose, risk, and process requirements without any additional parsing and data stream reclassification.

AA.2.16.2 Applicability of Sieves and Filters

DigitalDoors bypasses most artificial intelligence and other high-energy efforts to assess risk and assign classification. It is one of the primary breakthroughs of this paradigm shift. Absolute classification accuracy is not required. Recognition of false-positive and false negative categorization rates is not required. It is not about accuracy but coverage. The issue really is that all probable classification potentials are recognized up front in order to create the universal redaction. Universal redaction is about denying the value of the data stream until such time as it is precisely understood what coverage is required for functional reconstitution.

In fact, efforts to most accurately redact or control information flow up front are falsely predicated on presumptions, expectations, comforting but imperfect understandings of the potential value of the data stream. As a result, content recognition is more likely to go astray than provide effective risk management. Instead, this broader classification agenda, as advocated and implemented by DigitalDoors, assures broader coverage. It might be counterintuitive, but perhaps this very broad-spectrum approach is the reason more precise but intensive approaches have proven to be ineffective and exposed to an unending arms race.

AA.2.16.3 Manual, Assisted, an Automated Modes

DigitalDoors supports data stream content and context modes where users do it themselves, seek computer-assisted support, or are aided completely by automation. Manual is just that, a do-it-yourself process. Assisted is a computerized suggestion process that is surprisingly accurate but very configurable to include cultural and technical variety and the changes that occur in policy over time. Automated mode combines manual mode, assisted mode, and all organization additions and changes to replicate those modes in a computerized hands-free process. Note that manual selections can be incorporated into assisted or automated modes before or after automation. This improves accuracy and consistency, but streamlines the process.

You do not have to pick or settle for any single mode. These modes are interchangeable, can be intermixed, repeated endlessly in the style of a word processor with spelling and grammar checking tools. This analogy is appropriate, since a final required manual mode adheres to military two-man review mandates. Administrator configuration can allow overrides or enforce COMSEC policies where the conflict resolution rules are fully automated.

AA.2.16.4 Dictionaries

Dictionaries are databases of acronym, word, and phrase items packaged with access keys, partial keys (part of the whole), and multidimensional classifications. There are also dictionaries of semantic groupings too with groups, categories, and policies. Dictionaries include any mix of acronyms, words, phrases, and patterns that are bound by category, sensitivity level, user, and other attributes. Patterns include configurable regular expressions, bit patterns, multimedia, metadata, audio, and video. Multiple entries are allowed for the same item, although the attributes must vary in some way, either by categorization, definition, user, etc. These entries are differentiated by a 'coordinate' mapping system where each coordinate expresses a different classification, categorization, or other purpose. Multiple entries could carry different connotations, different categorization, different sensitivity levels, and different categories top reflect the evolving content and contextual value. DigitalDoors supports unlimited contexts.

The dominant context is not necessarily the accurate context. Neither entries nor definitions are static or being perceived as static. These values should be flexible and should evolve. Technically, each item within a set of multiple entries must have some significant attribute to create a sorting difference. In actual use, the dictionaries are accessed through multiple keys for different multiple purposes and applications. This enables multitier hierarchical overlapping classification. Although the dictionaries seem to be focused to classification of content they also address the context and concept issues too. It is multidimensional.

Entries can characterize differences through lower case, upper case, and mixed case, such that JON would generally be interpreted as an acronym, jon as a common word for a toilet, while Jon would be perceived as a name. Each variant and spelling or presentation variant has value in initial classification for determining complex context assessment and more value for compliance with reconstitution and sharing. Actual attribute differences determine categorization, and application is determined by a hierarchy of format, format lengths, priorities, and contexts. For example, XXX>(dominates) Xxx>(dominates) xxxx>(dominates) xxx. This is actually efficient since the hierarchy is generally consistent with traditional dictionary sort orders. Longer phrases and longer words have precedence over shorter ones, and inevitable classification conflicts are resolved where possible in advance; otherwise, the dominance policy is applied automatically, assisted, or manually if so chosen, to rationalize overlapping and competing classifications. A simple set of less than a dozen rules, detailed in another DigitalDoors white paper, seem to fully describe and implement a simple and efficient mechanism for classification dominance conflict resolution.

AA.2.16.5 My Word List

This is a user-created list of acronyms, words, and phrases of particular importance either in terms of recognition or security. User-created lists exist for each user and can be shared or distributed. Application of My Word List is by user choice. The list can include 0, 1, or any number of items. Profiles for each user or multiple profiles for a single user establish flexibility for different assignments.

AA.2.16.6 My Group List

This is a user created list of named importance or sensitivity targets represented by the inclusion of specifically-included acronyms, words, or phrases within a defined appearance range with a sensitivity level assignment that dominates all individually included entries. User-created lists exist for each user and can be shared or distributed. When the group is triggered, that range or a larger defined range is categorized. This feature is useful for assessing context where content is not sufficiently clear for word-level or even phrase-level classification. Group list is effective for locating risky contexts or downgrading really innocuous ranges that include one or more traditional triggers because it transcends the limitations of dictionary entry categorization.

Each group list can include 0, 1, or any number of items. Profiles for each user or multiple profiles for a single user establish flexibility for different assignments. This user created list is equally useful to white list complex contextual ideas as it is to black list them. However, realize that dominance and conflict resolution policy must be tuned and process sensitivity-order might need to include manual or sequenced aspects to preserve white listing assertions through to universal redaction. Dominance for lowering sensitivity level and classification is still fairly represented and enabled with the built-in conflict resolution tools, you just have to be sensitive to the anticipated and initially unanticipated effects of the Administrator taxonomy policy configuration.

AA.2.16.7 My Category List

This is a selection of the available categories and corresponding sensitivity levels with a sensitivity level that dominates all individually included dictionary entries. User-created lists exist for each user and can be shared or distributed. This list is applied to classify only those items in the data stream that are specifically represented by the included categories. For example, all names can be located and globally tagged as "Top Secret" or "GLBA-sensitive" depending on the classification, categorization, sensitivity level configurations. This user created list is equally useful to white list complex contextual ideas as it is to black list them. However, realize that dominance and conflict resolution policy must be tuned and process order might need to include manual or sequenced aspects to preserve white listing assertions through to universal redaction.

Note that the categories of error, unknown, and unidentified are special in that sensitivity level coding is always raised to the highest available level and included in categorization classification.

AA.2.16.8 My Policy List

This is a meta-selection of categories implementing safe harbor compliance rules with a sensitivity level assignment that dominates all individually included categories. User-created lists exist for each user and can be shared or distributed. A collection of categories is a very powerful classification tool that transcends dictionary entry categorization because the categorization is applied to encompassing sets rather than to entries within sets. This is very similar to the notion of attribute inheritance.

Consider for example, the HIPAA compliance regulation that is generally implemented so as to include 18 designated categories of information that cannot be released. This includes names, addresses, ages, social security numbers, and the policy would classify all such items in the data stream that are represented specifically by these categories as a HIPAA restriction. DigitalDoors is applying classifications to sets of items rather than to items individually. It is more accurate because classes of items receive similar treatment through the uniform application of inheritable attributes. While it is conceptually more efficient, processing overhead is comparable to entry or category assignment. However, defining and maintaining a policy requires less labor and ongoing effort than the maintenance for the relevant dictionary entries. A policy inherits all the configurations associated with existing categories and all existing dictionary entries in each category. You create a set single policy variant definition rather than creating dictionary entry variants that number in the tens or hundreds of thousands of entries.

User-created policy is equally useful to whitelisting complex contextual ideas as it is to blacklist them. However, realize that dominance and conflict resolution policy must be tuned and process order might need to include manual or sequenced aspects to preserve white listing assertions through to universal redaction.

Policies include categories, and for example, the HIPAA policy could warrant an Administrator configured category called HIPAA that could include specific dictionary items with specialized attributes like sensitivity level or compartment that will likely conflict with last name, name, or medical terminology and will automatically resolve through the conflict resolution dominance rules. As a result, special items specifically included into this hypothetical HIPAA category are subject to the same consistent rules as any other duplicate or multiple dictionary items. Upcoding or downcoding results are contingent on the Administrator-set taxonomy configurations or by user range override choice, if that is enabled.

However, before creating a HIPAA policy with an included HIPAA category, consider that the functionality of a meta-selection applies a different categorization standard through the subtle application of utility and purpose to classification rather than the black list/white list simplicity. Also consider exactly what dictionary entries you might include into such a HIPAA policy-category extension that would not be reflected by the HIPAA policy itself. Also consider the considerable management overhead for dictionary entries, and in particular complex and frequently duplicated entries. Some organizations will dump patient and staff databases for uploading, reformatting, and row-level categorization into the DigitalDoors dictionaries to populate the dictionary with HIPAA-specific category designations. This does work and enables savvy organizations to tailor DigitalDoors to specific and/or unusual functional requirements. While this makes some sense for optimizing functionality and processing, such wholesale information is really not inheritable meta-selection material but rather better served as specialized organizational categories and dictionary entries. But, there are better ways to implement, and this is part of requirement definition, installation, tuning, and optimizing for operational efficiencies and compliance.

Note that the categories of error, unknown, and unidentified are special in that sensitivity level coding is always raised to the highest available level and included in categorization classification and in every policy definition.

AA.2.16.9 AutoSEC

This represents application of minimum categorization of an entire data stream to baseline sensitivity level.

AA.2.16.10 OPSEC

An assisted application of dictionary-based white list patterns and black list patterns with gray list handling to preclude gaming against the system to assist classification. It is a classification assistance and suggestion process.

AA.2.16.11 COMSEC

An automated and enforced compliant application of dictionary-based white list patterns and black list patterns with gray list handling to preclude gaming against the system to assist classification. COMSEC is a mandatory enforcement that can be automatically applied to any and all data streams or applied as an automated final pass after manual and assisted modes. COMSEC is final and allows no additional manual editing and reclassification.

AA.2.16.12 Manual Selection

This is a simple and intuitive mouse- and key-directed process to select bits, characters, words, phrases, lines, sentences, paragraphs, or entire documents for classification.

AA.2.16.13 Manual Mouseover Selection

This is an assisted mouse- and key-directed process to select a semantic range of bits, characters, words, phrases, lines, sentences, paragraphs, or entire documents for classification. This is a rapid method to locate units of meaning for classification or establish tear line selections.

AA.2.16.14 Tearline Creation

DigitalDoors enables roundtrip recognition, removal, and creation of inline tagged tear lines. The process can be manual, assisted, or fully automated such that selected ranges are upcoded to the logical end sensitivity level and classification necessary for effective redaction and distribution. Dictionaries with OPSEC and COMSEC can drive a hands-free automated process that rivals extensive and time-consuming manual efforts.

AA.2.16.15 Other Configurations

A number of Administrator and user configurations enable or disable features that enhance the productivity of the classification process. This includes manual, assisted, interrogated, and automated process that add unknowns to dictionaries for future use or automation, that fine-tune the definition of selections with multiple classifications, that enhance risk assessment and management, or add to legal compliance.

AA.2.16.16 Accuracy and Granularity

A number of configurations are available in DigitalDoors to control classification accuracy and the level of granularity desired. These configurations also provide flexibility for different environments, different risk or security requirements, and varying types of data streams. These configurations seek to address any open-ended regulatory compliance or organizationally-mandated security requirements. They are part of the hierarchy or rheostats. Administrator configuration provides Dictionary Management for acronyms, words, and phrases.

Select a single element even when multiple appear, as with bin Laden. Multiples reflect different categories, sensitivity levels, definitions, or other differentiation. This activates the detail information for the selected dictionary entry. Note that you do have access to each of the multiples; just select the drop-down selection for the multiple number desired.

The checkboxes can include or exclude each dictionary entry, even one of multiples from different granular processes. Not checking the include box leaves the entry in the dictionary but precludes its general use. In this way, the entry exists and is documented, but does not apply for the organization. By specifying a username, you can limit the applicability for an entry to one or more users rather than a global default. The checkboxes include in small dictionary, include in large dictionary, OPSEC, and COMSEC include or exclude correspond to activation for each of the specific filters and sieves.

Compliance filters, specifically Category and Policy, can be turned on or off independently. When the My Category List filter is not enabled, classification is performed in the formal hierarchy defined previously. When My Category List filter is enabled, the entry category overrides the individual entry. For example, if bin Laden the family is unclassified, but bin Laden matches with the terrorist category, and the terrorist category is top secret, the category sensitivity level will control. The same hierarchy exists for My Policy List also, and it overrides all category classifications.

My Policy List is not enabled in the next image. This disables all policy-related classification.

AA.2.17.0 Automating Filters and Sieves

DigitalDoors provides classification in a number of discrete methods using filters and sieves. It also enables fully manual user selection and classification with automated methods that are then rationalized and resolved for conflicts. DigitalDoors enforces explicit categorizations by matching data stream content to dictionary items. Unknowns are also explicit categorizations to defeat plays against white lists, black lists, and Bayesian inference techniques. DigitalDoors locates content and context by aggregations, inference, and interactions. These resulting secondary semantic and semiotic associations often require dominance over simpler explicit categorization. These classifications are rationalized and resolved for conflicts at a complex level. Classification conflict is perceived as normal and expected rather than the exception. DigitalDoors handles conflict automatically. It is the foundation for hands-free information classification, a means to prevent against the system, and basis for many of the breakthroughs in DigitalDoors information technology.

AA.2.17.1 Classification Conflict Resolution

The basis for classification conflict resolution is coordinating the superset of all legitimate constraints to initially fulfill but maintaining the constraints individually for controlled reconstitution. This balancing act includes the initial creation of a universal redaction that represents a secured data stream footprint. This contrasts with the eventual mediated reconstitution of the data stream driven by utility, security, purpose, process, and legal compliance. In addition, all efforts for rationalization and conflict resolution are retained through to granular content control to minimize typical classification losses into the proverbial black hole.

Granularity tools allow for harmonizing competing constraints, so as to account for:
1. Sensitivity level overrides
2. Conflicts between security and operations
3. Organization, Group, User and COMSEC overrides
4. Intercession of Automated with Manual overrides DigitalDoors advances classification automation with sieves and filters. Automation enables greater speed, integrity, and efficiency. Automation bypasses problems of prejudice, personal preferences, judgment, failing attention-span, and human accuracy. It is all about data preparation as the ecosystem foundation for knowledge discovery, security, and information sharing. This technology is especially relevant to automated content analysis, risk assessment, compliance. It is a core DigitalDoors enabling technology because it generates a universal redaction and enforces compliance with future on-the-fly secondary distribution and reconstitution stipulations through granular content control.

It is noteworthy to recognize that many potential classification conflicts are resolved through Administrator maintenance and user configuration of special sieves and filters, such as My Word List, My Category List, My Group List, My Policy List, and the various dictionary entries. Dominance and associations are automatically checked for conflicts that can be prevented ahead of time to avert automation disruptions. Examples include a policy with a dependent category of higher sensitivity level or group conflicts with the inherited dictionary entries that force attribute interdependencies.

Dictionary entries form the basis for black lists and white lists. DigitalDoors classification is not based on mere binary allowance or disallowance. Classification is affected at category-level, in fact multiple and overlapping category levels, and at sensitivity level and compartment. Filters and sieves expose context sensitivities but also downcode meaningless ranges peppered with misleading use of key words and phrases. One of the traditional criticisms of existing classification policies and processes is the number of mutually-conflicting agency-centric tags and the emphasis to tag everything into a black hole where information becomes inaccessible. The counterbalance to this is the ability to right-code and even downcode where appropriate. This also allows future access to universally-redacted documents—even ones ostensibly lost into a black hole—with information sharing through granular reconstitution. Initial data stream classification sets the basis for universal redaction.

Recovery and future dictionary reassessment of items, categories, sensitivity levels, users, situations, and sharing requirements additionally determines the reconstitution on-the-fly subject to either the initial, later release configuration, or combinations of both. Initial selection, extraction and redaction creates a distributable basis for information sharing that does not abend the workflow but reconstitution really enables the flexible functionality that maintains the value of the work in the flow.

Classification (also called categorization) as realized in general usage today usually focuses on the creation of a single dimensional classification, or sometimes several related in detail or subordinated to the major one. However, such classification is driven by the presumption of a clear and precise purpose for that index. Single dimensional classification has no degrees of freedom for hidden or complex messages, information extraneous or ancillary to the core message and support for hidden agendas and sophisticated word drama. It creates one index of focused purpose only. It is a presumption of intended utility. For example, consider "Marketing Literature: Product A" rather than "Product A, marketing, sales, technical details, process features, utility, usage, overview." This example is focused to content, rather than the overarching meaning added with context and concept. Consider which one classification you would rather explore and which one would generate the more effective information management infrastructure for knowledge discovery, security, and sharing.

AA.2.18.0 Processing Sets

Counting in the computer world is through the set collection of {0, 1, many}. Zero and one are just regular items in this set, but are often are reflected by complex or convoluted programming logic. Zero is represented by an initialization without processing, and one is represented by the same setup but a single controlled process. Two and more are repeated instances.

Many includes 2 and more, but specifically is an unlimited repeated collection, but it also includes 0 and 1. The special cases of 0 and 1 really should not be handled as special cases, but sometimes are because computer programming code is not written flexibly enough to stop a process after no passes or only one pass, and often reflects 0 and 1 only as exceptions. That is not an inherent programming problem but merely an implementation defect that should be corrected.

Computer processing is good at repetition, so the repetition should handle processing of 0 or the empty set as a situation where nothing needs to be done. The processing of 1 really means that the process handles that instance and nevertheless at the conclusion still checks for the need to repeat the process again. Process of 2 or more is many and should never need special case handling. Relationships of 1-to-1 or 1-to-many sometimes create special cases only because the design is simply not robust enough to handle the situation where there is no match or only one match. It should not be handled as a special case, such that master-detail table relationships should resolve master records lacking detail records gracefully.

AA.2.18.1 Collections

A collection is any grouping of objects that can be seen, bundled, or put together. It is a container with any number of like objects or a container of containers, where the 0 or 1 count is really nothing special and just an instance of what is allowed.

AA.2.18.2 Sets

A set is a collection of objects called elements. This includes the empty set. In this scenario, a set is a collection of objects that really makes no distinction between 0 elements, 1 element, or many elements. Sets are used in computer processing but also bridge the gap between logical process and math theory.

Unless otherwise explicitly defined one should always presume that a reference is explicit and simple (a count of one or zero) rather than a collection of many.

AA.2.19.0 Failure of Best of Breed Security

The "Best Breed in security does not deliver the needed solutions. The best of breed chips away at the background noise but does little to protect against evolving attacks and intelligent adversaries. It is a rationalized effort based on inertia, customary roles, continuing practices, systemic reinforcement by internal supervisors and external vendors that assert it makes sense and that it has always been done that way.

The best we have stops the loss of the lowest hanging fruit. Best of breed does nothing to divert the motivated, incessant, and evolving threats. If an attack fails but the prize is worth winning, the attackers return with revised efforts. There is a known maxim, "if at first you don't succeed, try, try again." (Teacher's Manual (1840), Palmer, Thomas H. "Tis a lesson you should heed, Try, try again. If at first you don't succeed, Try, try again.")

There is no reward for security attack failure, but no punishment either. There is so much noise that even law enforcement is interested in their lowest hanging fruit. Most failed attempts go unnoticed. Even the successful breaches of security rarely garner reproach, arrest, or repercussion. Botnet attacks hide the source and shield the attackers from any and all repercussions, and perhaps even generate opportunities to make new enemies where none existed, diverting suspicion to innocent parties.

The traditional best of breed for security is an aggregation of perimeter-based security methods and point solutions designed against specific attack types. Perimeter security is sufficient when the perimeter is actually sacrosanct and not distended to incorporate workflow integration and the ambiguous pel-mel of incremental process evolution. Calling a weakness in the perimeter an 'endpoint' is merely another means to hide the insecurity of touch point(s). Point solutions are sufficient when the security mechanism matches the risk profile one-for-one and covers multiphasic and evolving risk. Unfortunately, both perimeter and point solution sufficiency is unlikely. Perimeters get distended, and point risks tend to have multiple attack vectors but generally only one designated security fix, not the many discovered over the long tails. The application of some or even all of these approaches does repel some attacks and maybe even the majority of attacks, but not all of the attacks and allows more of the PII and trade secrets to leak out. Attacks that get through are increasingly damaging. The lowest hanging fruit has either been protected or picked clean. The more valuable and more difficult fruit is under assault. Data fields and structured tables will give way to unstructured intangible property because the risk is dispersed and the monetary value is so much greater.

The best of efforts is forming panels to study security problems and pick the best of breed to avoid the mistake of doing something different. The best of breed is at best a faux security. Both effort and breed provide some rationalization that security does something; the incident logs prove that. It provides rationalization that incremental improvements will address new venues of attacks and patch existing gaps, so perhaps the environment will improve. Ultimately that is self-deception, a rationalization that somehow, something will change. But it has not and is unlikely to change within the traditional security venue. The best of breed is ultimately based on a broken security metaphor than cannot be patched, cannot be augmented, and can only be replaced by a new paradigm. Meanwhile, the best of breed is faux security.

Best of breed falls into two categories. The first is the application of tools that are acknowledged to be provide the best techniques understood and available providing really nothing but the protection of lowest hanging fruit. That is faux security. It just feels good. The second involves a dramatic shift to a new paradigm filled with changes, new methods, and changes to the ways business function and the shift to a production model based on the information revolution. Such change is difficult, requiring agents of change, and an openness to concepts of asymmetry, knowledge-based production, and formlessness that describe the future of both security and wealth creation.

AA.2.20.0 Integrated Single Files, Attachments, and Links

The technology enables security without disrupting the normal operational workflow as is typical with encrypted documents. DigitalDoors technology supplies readable and workflow-compatible single files and E-mail messages with recoverable attachments. The technology enables security, privacy, anonymity, survivability, and confidentiality integrating with document management, indexing, data mining, database computation, and transaction processing.

AA.2.20.1 Stream Outputs

The focus here is on the creation of a single production declassified file with integrated recovery information or recovery information as a file attachment typical with E-mail process. This adaptation is primarily a repackaging issue that streamlines workflow and simplifies management. One or more recovery files are encrypted or multicrypted and appended, merged, attached, or linked to the declassified source stream (transaction, file, or document). This forms an integrated distribution file, a single object, or a local connection to the recovery information, requiring no remote network connections as part of the authorization process for partial or full reclassification.

The single production declassified file is structured in two parts. The first part represents a typical declassified file with extractions, in situ encryption, or misinformation. The presentation options are a function of administrative and user configuration and also a function of workflow requirements. The second part of the file is encrypted or multicrypted recovery information. When the file is processed through the reclassification process, the second part is stripped from the declassified part of the file, decrypted, and processed according to standard granular access permissions. The reclassified output will appear just as any other partial or fully reconstituted data stream or file. This packaging enhancement precludes the need for corporate network, Internet, or VPN facilities to reach the recovery file.

The attachment feature is simple the recognition that an encrypted or multicrypted recovery file can be delivered as part of a standard POP-format e-mail message. The attachment (or a hierarchy of attachments) contains the message subject and text recovery information and also recovery information for any user-attached files, which might have been declassified as part of the message delivery workflow. This packaging enhancement precludes the need for corporate network, Internet, or VPN facilities to reach the recovery file. In the case of E-mail, the message could have been downloaded at a prior time and read in part of in full with a remote connection option.

Links (URL, x-pointer, and other formats) can be local or remote, or a hierarchy of local and remote, thereby supporting granular levels of access without remote access control.

Note that single file packaging, attachments, and imbedded or appended links alter the structure of the source data stream. This change in data structure may require minimal process changes for non-structured documents, a reconfiguration of processing for structured documents if only to ignore the integrated recovery information, and no workflow affects for database transactions. Database transactions potentially have field additions with file regeneration for the database administrators, but are unlikely to create any workflow alterations. However, the single packaging as a file or object structure simplifies and streamlines many aspects in continuous workflows with providing cleartext rather than unitary encryption.

AA.2.21.0 Hierarchical Security Sanitization and Reconstitution

The sanitization and processing of a data stream into non-sensitive and sensitive items is unlimited in that the original data stream can be decomposed into an arbitrary and unlimited number of subordinated representational streams. DigitalDoors can create an unlimited number of transformations of the original data stream and also an unlimited number of aggregations of sensitive items. Security is created through the process and method of dispersing content and granularizing items that define context so as to preclude information knowledge, aggregation, and inference.

Maps and metadata for mapping, reconstitution, and (none-to-partial-to-complete) recovery of the original data stream can also be decomposed into an arbitrary and unlimited number of streams and dispersed to an arbitrary and unlimited number of local or remote storage locations. DigitalDoors can create an unlimited number of transformations of the original data stream. The purpose for the DigitalDoors data stream transformation is: to secure content; to secure context; to prevent data aggregation and inference and to preclude data repurposing by insiders and attackers.

DigitalDoors can create an unlimited number of aggregations of sensitive items for knowledge management. Reconstitution, therefore, is controllable from none-to-partial-to-complete contingent upon a role-based multi-level security identification and authorization hierarchy. As a result, security is created by minimizing the access to the content in the data stream and thereafter enabling hierarchical reconstitution of granular pieces into the data stream in a controlled environment.

Vetting through identification and authorization enables (none-to-partial-to-complete) recovery of the original data stream or a step-wise defense-in-depth reconstitution in one, two, or simultaneous multiple levels of hierarchy. In other words, reconstitution with semblance to the source data stream can be recomposited in situ with the redacted sensitive items, misinformation, or other tags, tokens, and labels. Filters enable this multi-dimensional simultaneous hierarchical redaction and reconstitution into one, two, or many simultaneous data streams with controlled multi-level versions, or the exact reconstitution of the original data stream.

A 'sensitive' items is any type of bit pattern within any type of original data stream which is identified by the DigitalDoors processes and methods. A sensitive item can include characters, words, audio segments, image ranges, synchronization symbols, phrases, paragraphs, markers, structures, references, metadata, formats, indexes, tags, labels, tokens, URLs, embedded constructs, metadata, or pointers to external structures. Where a sensitive item creates a dissonance in the functional flow or contextual meaning, the range for the sensitive item can be extended to include punctuation, markers, additional words, and linguistic or data processing formats to preclude inference to this sensitive item. A sensitive item is identified at any arbitrary level or simultaneous multiple levels of hierarchy, such as sensitivity level or levels, compartment or compartments, parts of speech, potential overlaps into various purposes, etc. Filters enable this multi-dimensional simultaneous hierarchical characterization of the item.

Substitution is used to replace the sensitive item in the original data stream. The substitution is usually represented by a null set (that is, nothing) to preclude inference of the missing sensitive information. The substitution can also include a non-null set, represented by metadata tags, standard DoD labels, referential linkages, or placeholders sufficient to maintain functional computerized processing. Placeholders can include tokens, misinformation, or other hierarchical structures that are arbitrary or unlimited.

It is critically important to recognize that the fundamental 'replacement' for the sensitive item is out-of-band to the source data stream; in other words, the replacement is the null set but could be a hidden marker, visible marker, or tag presence. Such in-band replacement of the sensitive item with a 'token' is contingent only on conformance with needs to strictly maintain computerized or human activity workflow without disruption. Specifically, many operations necessitate a fixed-sized and precise field structure, column structure, or hierarchical organization and disruption with high-byte toggling, tokenized tagging, or alteration of the data stream with in-band substitutions will cause operations to crash.

The sensitive items are discarded, or dispersed in an unlimited number of local or remote storage locations. Items can be saved each within its own unitary streams (item-wise), or aggregated together. Aggregated streams o items can include all items of like sensitivity level or levels, compartment or compartments, parts of speech, or coordinated for a specific purpose or security requirement. In other words, a sensitive item might be stored as a single element, combined with others all conforming to a single sensitivity level, or combined into a hierarchy with a minimum and a maximum sensitivity level.

AA.2.22.0 Software Implementation

The purposefully-simple user interface hides sophisticated processes. DigitalDoors masks the process with an intentionally pristine single document window. Other subordinated windows are hidden to reinforce the simplicity and focus emphasis on results.

The application suite is a series of standalone and interelated modules that address security, information sharing, and discovery. Behind the windowed facade include integrated processes for encryption, key management, semantic analysis, classification, risk assessment and management, intangible asset monetization, partial reconstitution for sharing, and dispersion to the cloud. This DigitalDoors semantic granular content control is based on the unified premise of information inventory, classification, selection, and dispersion to the cloud. This implementation serves competing and contracting functions at the same time. There are many masters, many outcomes, many instances of formlessness that are necessarily important although rarely necessary for the user to see. These processes are based on deep technical analysis that usually goes unexplored.

Because the Windows user environment abstracts things to a simple view, DigitalDoors also abstract these to a simple user interface (UI). The goal is minimal user interaction with maximum results. Automation is available to further reduce user interaction and increase overall productivity. The enormous number of options behind the scenes address the complexity of semantic content. They can be tuned for explicit environments but are not necessary in the ordinary. The user interface hides these options in favor of generic defaults and workflow simplicity.

Loading and process time reflects on the user interface. It is a function of dictionary size. The more entries in either the small or large dictionary and the more additional specialized dictionaries used, the slower Secure and View run. This is a factor of white lists, black lists, gray lists, and semantic content information used to classify complex and overlapping selections with superior accuracy.

The options support a complex semantic analysis and production process. There are options for inputs, format and presentation alternatives, outputs, logs, and reports. The logs and reports categorize the ordinary, the exceptions, the default presumed from the many available choices, the errors, the unknowns, the white and black list elements, the classification decisions, and the dispersions. The user interface and the process is planned for low user investment in time and training and low administrative burden, but supports customization for more difficult classification and security situations. Rest assured, the breath and depth are available when needed, but simplicity of the user interface is a predominant concern.

AA.2.23.0 Software Operations: Sensitivity Level Hierarchy and Tear Line

Redaction and tear line operations are typically conducted such that the results are specific to the requirement and the intended distribution. In other words, if a document is released to [S] level, the document is redacted to remove all higher [TS] material. This creates a duplication of material that increases the leakage risk. It is also disruptive to process continuity and workflows, increases the overall storage requirements for multiple versions, and encourages the overcoding of material to retain power, security, control, and curtail leakage.

DigitalDoors provides redaction and tear line through the traditional versions but also by creating a master template and separating the crown jewels individually. This enables reconstitution of information for innumerable purposes and distribution as needed through granular content control. Reconstitution is driven by any one or number of contexts, from sensitivity level to role to mission to user or to group. Primarily, reconstruction is driving by sensitivity level. The sensitivity level hierarchy can be defined so as to include all granular content (raw data and metadata imbedded or extant) up to and including the defined target sensitivity level. Therefore [TS] would include [TS], [S], [C], and [U]. That is defined as inclusionary and is the typical delivery. However, information can be minimized and focused to delivery only [TS] for [TS] and exclude [S], [C], and [U]. That is defined as exclusionary and is the optional delivery.

This sensitivity level hierarchy is defined by the administrator as either inclusionary or exclusionary.

AA.2.23.1 Secure Editor Application

The DigitalDoors Secure Editor is a standalone application or a module to add into other applications for plain text and media creation, editing, and sensitivity level tagging. Other types of tagging, including categorization, taxonomy classification, privacy, security, compliance, and semiotic meaning are also available. This technology closes the loop for DigitalDoors such that the full range of document management can be supported into a unified infrastructure, from creation, editing, document markup, tagging, tag conversion, tag removal, context sensitivity level redaction, context reconstitution, and support for complex process workflows. The architecture assures separation of data from metadata so that no security lapses are introduced into the traditional word processing and document management cycle.

From the user standpoint, the DigitalDoors Secure Editor is not much different from vi, Word, Notepad, and other desktop tools. However, behind the scenes, this application separates the data stream from all markup and tagging for security purposes. The interlacing of user content with metadata creates significant process, storage, distribution, and workflow security failures that are not resolved with current technologies. Current technologies include encryption, firewalls, intrusion detection, perimeter guards, and locked distribution packages.

The DigitalDoors Secure Editor enables text and media creation. However, all additions, deletions, changes, insertions, and reorganizations and reordering are tracked as metadata that does not become part of the document. The document as seen and shown represents the deliverable format. Since formatting is metadata, it is not included in the representation. Formatting, such font sizing, colors, font selection, footnotes, headers, subscripts, superscripts, line numbering, indexing, and other features characteristic of standard document preparation can be supported but are represented only as metadata. Tagging, including sensitivity level, categorization, taxonomy classification, privacy, security, compliance, and semiotic meaning are also represented only as metadata. This separation of representation from meta-representation is critical for creating the infrastructure for secure information sharing, privacy, security, and compliance.

AA.2.23.2 DeClassifying and Reclassifying while Browsing the Web

Security for workflows, transactions, and information stores while browsing the Internet and Intranet webs require new paradigms because it is only partially addressed by current methods. The current technology fails to address workflow, convenience, and distribution issues for public and private information, the granularity of delivery for that information, or the centralized and decentralized access to that information. DigitalDoors specifically addresses the security of workflow, transmission, and browsing with methods to distribute and provide granular leveled access to information. The two control points for securing browsing with DeClassification are represented by the de facto delivery of declassified information with access to immediately reclassified information subject to secondary identification and authorization.

AA.2.23.3 Generation and Distribution:

There are several issues when securing browsing and access to data (web pages, tables, data sets, and linked files). First, is the issue of sourcing information and downgrading it for general presentation. DigitalDoors implements DeClassification for all data stored directly by initiating the DeClassification process with multiple secured outputs where the declassified data is an output. Second, access to the ReClassified material is generated on-the-fly subject to identification and authorization. This is accomplished by initiating the DeClassification process with multiple secured outputs where the declassified data is an input along with the critical and important extracts. Classified information is encrypted, MultiCrypted, and dispersed to local and/or remote storage locations. Storage of critical and important information is configured and dispersed to different storage locations including Internet and hosted storage options. Dispersal is controlled by policy, configuration options, and threat mode based on users, recipients, situational needs, browsing content, and critical and important information categorization. For example, a static web page or even one generated dynamically from a database containing names and credit card numbers can be DeClassified with each of the two (and other categories) dispersed to separate storage locations.

Distribution represents no changes to standard browsing process in any form except for dynamically-generated pages require a dynamic recovery file. Distribution is nominally assumed to exist within a decentralized, distributed, and non-secured environment. There is no special need, effort, or consideration for distributing DeClassified browsing as there are no changes within the workflow as perceived by users, servers, or other intermediate delivery processes. Because all static pages are stored in the DeClassified format, access to all pages in a ReClassified format is on a per page basis.

ReClassification is a function that is controlled and limited by the standard identification and authorization process. This includes the use of agents, and leveled access through secret sharing, alerts, threats, location, timing, policy, access to remote storage, and dispersive storage.

AA.2.23.4 Receiving and ReClassification

On the receiving side, DeClassified browsing is received as a standard data that required no special treatment, process, or interface. DeClassified browsing is the same as standard browsing as there are no changes within the workflow as perceived by users, servers, or other intermediate delivery processes. The software for ReClassification is itself non-secured and contains no secrets. It is possible to key each ReClassification tool for unique access by specific user, location, document, timeframe, time expiration limitation, and other configuration.

The ReClassification process requires a downloadable user interface in the form of a browsing client reader add-in or the use of our separate browsing reader. Selection of a DeClassified data initiates a workflow process consisting of:

TABLE

| Declassification Workflow process |
| --- |
| Identification and Authorization (either local or remote) |
| Lookup of recovery map information |
| Access control by time, location, threat mode, username, category, time of day, level hierarchy |
| Access to the recovery map (granular access controlled at all time) |
| Access control to dispersed storage locations |
| Recovery of dispersed, Classified critical and important information |
| Decryption of encrypted or MultiCrypted critical and important information |
| Reconsitition (ReClassification of DeClassified data) |
| Display within standard user interface of ReClassified data (such as within browsing client, PDA, etc.) |
| Display within separate browsing reader/ReClassifier application |

Controlled release for ReClassification purposes can be limited such that different browsing users will have leveled access to the data, for example, senior users can have access to the names and credit numbers on a granular basis whereas junior users cannot.

Workflow and transactional messaging activities that require dynamic browsing with ad hoc generated reports or other similar flow can also be enabled to employ the remote distributed DeClassification and ReClassification processes in similar ways, with generation of a temporary recovery file.

AA.2.24.0 DeClassification Mapping—Channels Mapping

The DigitalDoors DeClassification process occurs on the end user's desktop, any server, or transactional process. The source document or data stream (to be declassified) need not reside on the user's or server computer but could be anywhere attached through a network. The recovery file and associated recovery map can be created anywhere attached through a network.

The recovery map is not a file per se, but an computerized abstraction that associates the source file with the declassified file and to the recovery file. Actually, the source file can be safety deleted and all references can be purged to maintain top security. There are no forward or backward links between these files and the recovery map. Loss of the recovery map renders recovery mathematically unlikely. Granularized and dispersed copies of the recovery map guarantee reconstitution without compromising risk and security. Association between declassified material and the source, the recovery file, or the recovery map is one way only, in the recovery map. The recovery map is functionally embodied in one of many implementations, as configured by the administrator:

The map is referenced by a prefix and the initial source filename

The map is a database record keyed by declassified file name with link to recovery file dispersed to one of many storage locations The map is a two-part number [organization reference] [document ID] contained as an e-mail header used to reference a database record dispersed to one of many storage locations The map is known only to a person(s), requiring specific selection by the person, persons, or persons using secret sharing schemes The association between source document or data stream, recovery file, and recovery map is broken by the DigitalDoors process. Filenames or data object references can be randomly generated with unlimited path names with 46-factor independence; this exceeds RSA 1024 bit security levels with only 3 character filenames, and MS Windows easily supports 278 byte file paths.

The first pass of the process targets potential extractions, performs the extractions, and inserts placeholders. The second optional pass of the process generates a two-step placeholder insertion, such as numbered tags, barcodes, URLs, or pay-for-view recoveries. Numbered tag or two-pass tags (such as barcodes or URLs) allow ongoing editing, as with MS Word, wherein placement and even the existence of extractions could be altered in processes subsequent to DigitalDoors DeClassification, thus allowing alteration and functional ReClassification of the DeClassified document at any future time. A recovery file is generated during the first step of the process. The extracts can reside within this recovery file in the format of plain text, encrypted, plain text links, or encrypted links. The format is determined by administrator configuration. The recovery file contains offset to each extraction, the length of each extraction, the length of each placeholder, the category type of each extraction, and the extract in one of the configured formats. The recovery file contains no forward or backward information linking it to the source document, to a recovery map. The declassified document contains no forward or backward information linking it to the recovery file or to the recovery map. When extractions are contained with the recovery file as links, whether in plain text or encrypted, the secondary recovery files for each extraction contain no forward or backward linking information. These secondary, subordinate recovery files can be infinitely chained through one-level forward pointing links. Each such link can be plain-text or encrypted.

AA.2.24.1 Channel Transmission Protection:

The transmission channel(s) for source data to the user's desktop, server, or transaction process, external generation of the recovery file, and external generation of a recovery map are all authenticated with multi-factor authentication, such as PKI certificates, tokens, or other methods, and encrypted with point-to-point encryption of the transmission channel with SSL or in hardware. This process can be controlled by DigitalDoors or be part of the core networking environment and independent from DigitalDoors functionality.

AA.2.25.0 Security by Dispersion—The Cloud

The DigitalDoors selection, classification, and dispersion technology was designed primarily to address a distributed universe of processing and data storage. The cloud is a composite of data, process, and workflow where boundaries represent a distinction no longer viable. The cloud is a single integrated ecosystem that ignores firewalls, perimeters, guards, and security point solutions.

The first DigitalDoors illustrations defined a network within the traditional framework of a cloud, even multiple clouds reflecting multiple layers of security both isolated from each other and interacting together through DigitalDoors technology. Implementation was applied to enable and support traditional data processing operations within a structured, field-oriented, free-form, unstructured, and database-oriented architecture. Data structure (the lack thereof or complexity) was not perceived as a design constraint or limiting factor. Processing technology for this new paradigm, the generations of information processing equipment, and networking interconnections, were not constrained by available concepts. DigitalDoors anticipated information as the primary resource and the expression of both process and distribution within its own framework as an extension of an evolutionary information and production model.

Furthermore, the basic dispersion technologies were invented to address the security requirements of a distributed agency and military global information grid (GIG) supporting centralized and distributed processing resources, multihomed delivery channels, uncertain security at the edge, edges under constant attack, silos and stovepipes, uneven methods to interconnect high and low risk resources (MLS interconnectivity), and the realization that warfare had evolved to a point where attacks are amorphous, asymmetric, easily involving both friend and foe alike at the same time.

Of course, the concept of the 'cloud' that we know today is not the same cloud described by the mainframe and terminal architecture, the network of peer servers, clients and services, remote procedure calls, or a distributed LAN and WAN network architecture that comprises the Internet. It is possible to think of these subsets within the cloud as spaces delineated by perimeters, with the cloud comprising the superset of all possible sets and subsets. The cloud we recognize today is a ecosystem cloud comprising all possibilities, with seamless interconnection and integration, not the specialized VPN generally presumed. Although the cloud of today actually incorporates VPNs and specialized links for silos and stovepipes, any presumption of security microperimeterization is based on archaic views of trustworthiness.

The cloud today attempts to describe an uniform environment of process, storage, and utilization not defined by any where or any time, and not static in any terms familiar to us now. This definition is still evolving as information and process are mashed together in interrelated but dependent forms. This is the concept foreseen by the GIG and what DigitalDoors anticipated would provide security through dispersion as a fundamental paradigm shift. The cloud transcends perimeters and point solutions and any expectations of when and what order, so solutions that presume a defined location or definitive risk are inadequate for this cloud paradigm shift. The cloud becomes our functional universe where perimeters and microperimeters are archaic delineations lacking force of security or control.

DigitalDoors sees information as the primal resource, reflected in data, application definitions, workflows, and expressions of design blueprints that become programs, process, products, services, intangibles, and intellectual property. DigitalDoors sees most resources as a reflection of information, and the enablement of it cannot be based in place or in time. The DigitalDoors technology addresses this cloud as it is exists today, as it develops in new ways, as the distribution of information evolves into new forms, formats, structures, composite processes, and purposes where the primary production model inputs and outputs are data and the production model is an omnipresent cloud.

AA.2.26.0 Semantics Dictionaries

The DigitalDoors dictionaries contain some one million English language entries. Entries are distinguished by type as acronyms, words, and phrases but stored together. These entries are used for white listing, black listing, gray listing and also contextual classification and weighting. It is applied for automated selection, contextual or conceptual recognition, classification and tagging, and also monetary valuation for intangibles. The dictionary includes common entries borrowed from other languages. However, it is not exhaustive. The dictionary is extensible, but it is also supports word-format generation with prefixes and suffixes. In other words, "kind" can become "unkindest".

Prefixes and suffixes are applicable to words, but not processed for acronyms and phrases. This enhancement is effective for categorizing non-standard or rare forms of common words if the prefix and/or suffix is recognized as a valid modifier in the dictionaries. This functionality is particular relevant for Germanic languages as many words are conjoined.

Conjoined words Consider, the word "fremdenverkeresburo" which loosely translates as the "travelers information office". Consider conjoined words in other languages, such as Swedish, where "kommunalskolsflaggstångsknoppuppsättaringenjörslärare" translates quite literally as the "supervisor who teaches engineers working at communal schools to put the top cap piece on flagpoles." This serial conjoining is supported only if the prefix and/or suffix is recognized as a valid modifier in the dictionaries. Complex compound words like these two examples represent an exhaustive parsing process that is not practical at this time. However, common compounds can be added as prefixes and suffixes to enhance basic dictionary matching.

Root matches provide the classification inherited for all compounded word forms. The classifications includes sensitivity level, word type, user, group, mission, role, and becomes the key for all subsequent My Group List and contextual matches too. Note, however, that precedent assures that any compounded dictionary entry will take precedence over conjoined form variants. This is important and logical since many compound words have cultural meanings no longer rooted in the root word or even modified by the prefix or suffix.

For example, consider the root word "sight". The prefix and suffix lists allow for compounding and recognition of derivative words that include:

| Table of derivative words | |
|---|---|
| Insight | Insightful |
| Sightwise | Sights |
| Sighted | Sighting |
| Sightless | Sightfully |
| Sightlike | Metasight |
| Unsighty | Unsighted |

This dictionary enhancement facility is actually useful for mixed language environments because it lightens the load when looking up words and when trying to ascertain which language is most likely to pertain.

AA.3.0.0 Privacy and Security:

AA.3.1.0 Context: The Difference Between Security and Privacy

The difference between security and privacy is context with its material effects to specific involved parties. The difference might seem to be nothing, but it becomes something when perceived within appropriate contexts. The application of security is the same as the application of privacy but the effects of a breach in security is contextually different from a breach of privacy based on its effects to specific involved parties.

Consider PII (personally identifiable information) in the form of a report about a person, one of thousands stored to enable business operations for its custodian, generally a business-oriented institution. The PII includes name, address, telephone number, account number or purpose-specific-index, surrogate keyword, social security number, and account information. The destruction of that PII is a loss of institutional functionality. Whereas, the leakage or complete exposure of that information, how it is being used, and the results of its usage represents a security breach for its custodian, the institution. The leakage or complete exposure of that information, how it is being used, and the results of its usage represent a security breach for its owner or the reference to which it applies.

Owner and reference are the same in effect but different in terms of legality at this time. Both the security and privacy breach are one and the same events, but the ramifications are different depending on perspective. Context is the only difference between a security breach and a privacy breach. It is a security breach to those responsible for the integrity and storage of the information but a privacy breach when the information refers to someone personal. Piracy, the theft of information and/or services, is a breach of security and also privacy when the impact includes PII.

If you think of "security" and "privacy" as the actions to prevent a breach, there is no difference between these implementations. Both are one and the same events. Only the consequences are different, and those consequences are a factor of context and context alone. Any breach of PII will have components of a security loss and a privacy breach. The ramifications will depend on context, and any specific applicable laws or regulations violated.

More specifically, security is the protection of information about a person, related people, an organization, operations, talent, and processes for which you are responsible through custodianship or stewardship. In contrast, privacy is the protection of information about you, your related people, your organization, your operations, your talent, and your processes. That responsibility might indicate purely business requirements, moral, or even legal ones. The difference between security and privacy is only context.

AA.3.2.0 Security and Privacy: Protecting the Crown Jewels

Data security and privacy requires a controlled barrier to information. Security is the protection and continuity of the process and integrity of the information. Privacy is the control over ownership and use of information. Security and privacy are not antagonistic but rather complementary. Security is continuity and integrity. Confidentiality and privacy is the control of usage and distribution in both the aggregate and details.

Crown Jewels, as in the national treasure of the Royal House of the United Kingdom, are one-of-a-kind heirlooms assessed at a very high value. This collection denotes the regalia and vestments worn by the sovereign during ceremony and at various other state functions. These items are the most single valuable jewelry collection in the world. The jewels are protected by forts, moats, guards, alarms, and other perimeter defenses. Some of the Crown Jewels are even dispersed to vaults at other locations. Some of the Crown Jewels are shown in public with copies. The security of the Crown Jewels is based on maintaining the continuity and integrity of this unique resource. The physical copies are not valuable. The value of the original Crown Jewels and the copies together are equivalent to the value of the originals. The loss of continuity and integrity of a Crown Jewel, should it be fractured into pieces, will retain little original value.

The security of data processing operations have also been based on maintaining the continuity and integrity. Data diddling, mutating viruses, and other intrusions cross the line of control and allow undermining absolute continuity and integrity; this is not a small problem, but is proven to be a resolvable operational issue. The multiplier effects of manufacturing, distribution, and marketing created a world-wide increase in wealth; this has been driven by data processing. The process and collections of information making such growth possible are based on the "crown jewels" embodied by computers and databases. Data has become the commodity of business in this information age. Most data can be replicated by matching the original collection methods, so the value of data is perceived to be the discounted time value of replicating it.

However, a subtle but significant shift has transformed security into the age of privacy. Copies in data processing are every bit as valuable. The value of data is also through the covert misuse of it. Virtuality has made copies indistinguishable from these original "crown jewels." Thefts by way of copies are not always noticed because the original maintains its continuity and integrity despite the obvious or hidden intrusion. Furthermore, copies of data, subsets of data, reports of data, inferences of data, and aggregations of subsets of data are frequently distributed as part normal operations. Virtuality is not just about theft, cover misuse, but also about the unintended aggregation and inference of freely distributed data copies and subsets.

The original data retains its fill value. The copies, as many as they are, frequently have as much value as the original data or can complete devalue the original data. How is that again? The original with ten copies is worth eleven times the originals. The original with hundred copies is something less than a hundred and one times the originals. However, a million copies become worthless and debase the original too by forcing its cancellation and deniability. A glutinous distribution conceivably could undermine the entire economy by devaluing the data because this commodity glut results in the loss of its one-of-a-kindness. Many millions of copies can clog the system and curtail all data processing services and data access. In contrast to data over-replication and Crown Jewels, the fragmentation of the data crown data jewels is very valuable as reassembly in context and concept restores all of the original value and perhaps even more through aggregation, inference, and mining. Search engines like Google and Yahoo, establish heretofore unknown patterns in data. These patterns generate new data and hence the need for new types of security.

This is the mathematics of Virtuality, the loss of distinction between the original and the copy. Even physical commodity jewels suffer loss in value due to virtuality. DeBeers Diamonds understands that the true cost of a jewel pried from the ground is the sum of license fees, taxes, labor, manufacturing, and distribution costs. However, they maximize value through limited editions of this commodity by artificially depressing supply below demand with a controlled release. Is there a lesson here in privacy? Absolutely. Data has no value other than a necessary replacement commodity cost unless its distribution can be restricted. This is where of the Digital-Doors doctrine adds value through controlled release.

The true value of data is its context, purpose, and availability. Because data mining, aggregation, and inference provide an effective method to replicate the full productive value and perhaps additional value over the original data, granular control is essential for artificially limiting supply. Restricting access to parts of it retains its continuity and integrity, but controlled release retains the high value and privacy. In terms of data, the limited and artificial release of granular parts of the data maintains the uniqueness of the data virtuality rather than it commodity value.

AA.3.3.0 Surrogate Keywords as Unique Identifiers for Privacy and Security

Social security number (SSN) is a nine-digit key or index used to identify a resource, in this case a person. The social security number was invented to create a purpose-specific index. Uniqueness is not assured because of the methods of assignment because of key reuse and the lack of forethought into the difficulty of process conversion and data translation over the long term. The distribution of the SSN in usage has created a privacy and security problem. There are legally-driven efforts to replace the SSN with another globally unique identifier (GUID). This GUID is likely to have a bigger field size for uniqueness and to support a wider audience containing no partial intelligent values that can expose PII or an associated individual.

This effort to create an alternative surrogate keyword creates as many problems as exists with SSN plus new ones. In the end, any surrogate key does not address the fundamental issues of privacy and security. Any surrogate key or keyword is merely another purpose-specific index attached to the same or similar personally identifiable information (PII) and all the corresponding risks inherent in the storage of that PII.

The object for a GUID is to represent the intersection of name, address, phone number, weight, height, sex, and identity of a person (or other resource) with some sort of unique nomenclature. The aggregation of name, address, phone number, weight, height, sex, identity of a person, and other personally identifiable information (PII) does indeed create a unique nomenclature, but it is not necessarily a unique result. The set could contain 1 or more references. That is a failure. Confirmation of a GUID will require secondary confirmation by means of the PII or SSN. This creates the chicken or egg problem for any assignment of an universal identifier for a electronic health care record system. Composite keywords might seem like a good idea, especially when they are translated from PII, but the reality, like any hash, is that the composition can be recreated and often re-identified through forced methods, coercion, or statistics.

SSN originally started out with no meaning. Usage and reliance created meaning as the de facto GUID for each person. Meaning was not in the content but in the context and concept. The substitution of serialized GUIDs for insurance policies, account numbers, and transactional references recreates the SSN problem. Eventually, and that could be years or instantaneously, any GUID is referentially linked to PII so any surrogate keyword itself becomes a comparable risk factor because it references context and concept. It becomes yet another de facto ID. The distribution of these quasi-randomized GUIDs and the lack of any as-yet centralized lookup system is not security but only a level of obscurity with an added level of management and operational complexity. Obscurity is not security but merely a whiff of security.

As a result, the creation of a surrogate keyword only inserts a level of misdirection to the PII, but no protection for it. Use of biometric and N-factor identifiers as keys or ID are wracked with these same problems. Biometric information, albeit physical, is converted into digital representations that are equally liable to fraud, widespread dissemination, and overexposure (lack of scarcity), thus defeating its security. Even encrypted GUIDs are not immune to these problems. If the basic GUID is unique, the encrypted GUID will be unique. The mapping between them will be unique. One of the fundamental requirements of encryption is the lack of clashes. However, by virtue of the usage of even an encrypted GUID and the likely waterfall effects of distribution, even the encrypted GUID loses its uniqueness and security through usage.

Consider how banks used mother's maiden name as a key and validation of identity since that name usually has no connection to any account PII. Mother's maiden name was often linked to a Caller ID. Caller ID could be situationally unique, but the ease to fraudulently create whatever one is needed undermines its integrity and usefulness. Its uniqueness is not, and the widespread use of this ID or verifier has been compromised by its very success. However, mother's maiden name has morphed into the "verbal passcode" and this too is neither unique, secure, or free from inference or exposure. This example is typical and prescient of any attempts to create a long-lasting surrogate ID. In the end, any surrogate keyword does not address the fundamental issues of privacy and security.

AA.3.4.0 The Metrics of Privacy: Identification, De-Identification, and Permitted Versus Forced Re-Identification The following describes metrics to measure privacy and the necessary structures to monitor, alert, and secure privacy. This paper also specifies the corresponding methods for proving the social and personal losses of privacy through associative inference, data repurposing, and data mining with undisclosed identification. It outlines types of identifiers, categories for the same, and how association with public, private, personal (extra-systemic) knowledge, and a circle of association or inference can enable seemingly insignificant details to expose individuals; this yields a definition of what is critical and important to uniquely and sufficiently identify an individual. In addition, it defines de-identification and re-identification processes to set the bar for minimum implementation performance in order to forestall adverse legal encounters. Finally, this paper establishes the outline, design, and implementational requirements for conforming to data privacy laws in an efficient, necessary, sufficient, and comprehensive process.

AA.3.4.1 Privacy Overview

E-commerce initiatives, online financial services, customer demands, and worldwide privacy legislation drive the cultural response to and need for identity safety, privacy protection, and the defense of personal information. By far the most compelling impetus for implementing these privacy protections is the legal enforcement threat granted by recent laws. HIPAA (Health Information Portability and Accountability Act signed into law in 1996 but implementation delayed until March 2003) privacy rules are the most impressive of these with fines ranging upwards from $250,000 per instance. In most instances of abuse or violation, the laws remain unclear, as is any standing for a remedy unclear. I would suspect that local, regional, and innocuous tort liability law and prior court precedent will be extended so that individuals will be have standing and remedy. If past case law is any indication, privacy and security failures will be prosecuted under the concepts of contributory negligence. However, the potential costs for litigation, the inability for smaller parties to access the court system, and pressure for out-of-court settlements nonetheless cause sub-optimal stress and economic pressures. As a result, physicians, hospitals, pathology laboratories, insurance companies, financial institutions, and payment processors are scrambling to implement complex and vague privacy rules. The key issue is not so much about correctly identifying a specific individual per se but rather not being wrong about statistically placing an individual within an operative and functional grouping.

All these privacy laws inherently undermine the customary need for information sharing and disclosure. This endangers traditional mechanisms for data processing. Business practices inherently will shift to comply with these laws to enable ongoing business workflow while balancing these goals without creating new opportunities for justifiable claims of data suppression, insurance or financial frauds, legal malpractice, and misinformation.

The primary privacy technology is called de-identification, a process where identity and potentially identifying details are expunged from records, reports, and correspondence. Other synonyms include declassification, expunging identity, creating micro-data, data blanking, data blurring, and dis- information. Accordingly, re-identification is the reciprocal process applied to reconstruct the de-identified information and make it whole again. Access control, by way of passwords and biometrics, are anticipated to limit re-identification and/or multi-level access to the original undiminished data—should any be retained in violation of many privacy laws.

However, the methods proposed to achieve legal compliance raise significant technical uncertainties. These include component implementation and data suppression during medical diagnosis, insurance payment approval, banking activity, financial transfers, clinical activity, and traditional business workflow. Also, the implementation necessary to retain fundamental workflow consistency as a design and technical concern is in direct conflict with workflow. This holds true not only for medical care (directly addressed by HIPAA) but also for a wider range of commercial activities (under the EU Data Directives, Patriot's Act, Financial Modernization Act, Data Protection Act 1998, and many conflicting global and local ordinances). SEC Sarbanes-Oxley regulation and forthcoming congressional law extend the responsibilities of chief financial officers to monitor and report privacy violations and a wider range of indiscretions. This indicates an attorney full-employment boondoggle for years to come.

The concept of minimum essential identity information—in other words, de-identification of information to achieve a level of information release corresponding to a need-to-know basis—is inherently flawed. Other papers, academic research reports, and the Bayesian statistics herein demonstrate that a de-identified document is insufficient to preclude inferential and hence forced re-identification of individual(s). Other, additional technologies are needed to curtail this, technologies including leveled reconstitution (re-identification in whole or in part driven by a hierarchy of access protocols), information dispersion, and granular access control. This problem, as well as the previously stated workflow integration, can be easily solved with innovative products and services, such as DigitalDoors' eponymously-named software, based on traditional and logical security methods not yet widely implemented in automated data processing or Internet. (Note that development of the patented DigitalDoors software and privacy framework has driven the academic research and scientific results outlined in this paper.)

One serious dilemma with de-identification is that the Safe Harbor (specifically under HIPAA meanings) identifier categories and other entity-specific (e.g. "sensitive") information is commonly used as indexes for databases. Removing such information breaks database operations. The process of de-identification renders indexing useless, thereby undermining data collection, data integration, and merging operations. Note that indexing technology is unfortunately sufficient with inferential methods to re-identify people—unless the indexes are also de-identified, an unlikely scenario because it undermines traditional data processing. The typical methods used for government de-identification with tags and XML-like paragraph markup leave category tags in the resulting declassifications. This information is sufficient for human intelligent operations to infer or completely understand the contextual meaning; this is a vastly inferior method, as extrapolated from work by Bell and LaPadula. The generation of taxonomies through rules, phrase extraction, sample and training sets, or other topic-oriented subject categorization by means of intelligent systems with replacement of those taxonomies with labels or tags allows significant information within the context; this is not overcome unless the labels or tags themselves are completely removed and substituted placeholders are statistically random in designation and size.

Data entry errors, which typically start at 4% for names and addresses, increase to as high as 20% for long numerical strings. Long numerical strings include assigned ID numbers, social security numbers, and lab results. Other problems, such as name aliases, misspellings, and the lack of name entry consistency, such as Tim for Timothy or Bob, Bert, Rob, Bobby, Robbie, and Robby for Robert, create core data consistency errors even prior to any de-identification issues. One-time pads, encryption, and serialized numbers—the backbone of operation security—also break merging and indexing, data mining, and reporting operations too. These are either/or scenarios with limited partial controls.

The remainder of this paper defines the core objective and philosophical issues that underlie identity management and information privacy science. This includes the privacy workflow, mathematics for defining identity and privacy as a prelude to building a measurement and tracking system, informational theory for understanding identity, and one possible framework for successful automation of privacy within data processing. This corresponding sections comprise:

data ownership
    definition of identity
    uniqueness and sufficiency
    direct and indirect identification
    unique identification and subset identification
    indirect identity information sources
    definition of privacy
    implementing privacy policy
    privacy measurements
    measuring uniqueness of identification
    density of identification
    matrix of privacy information association The concept of privacy in the information age hampers implementation of privacy. We need an understanding of the etiology of critical and essential identifying information. We need a formal mathematical theory for identity and privacy. A number of recent legislative efforts, including the Privacy Protection Act, the EU Communications Data Privacy Directive and corresponding U.S. Safe Harbor provisions, Patriots' Act, DOT E.O. 12958, HIPAA, and GLB{A} (Gramm-Leach-Bliley Financial Modernization Act), either protect or encroach on privacy. Even legislation, such as the Family Rights and Privacy Act, better known as the Buckley Amendment, represent significant legal hazards. We need practical and constitutional limits to protect abuse. The authors of such legislation sought to address identity theft and breaches of privacy by imposing financial penalties for non-compliance. However, significant gaps in definition, logic, statistics, and implementation undermine this legislative activity. There is also lack of standing for the individual injured by an identity theft to seek damages from those who abetted that crime under current statutes and case law. The next few section outline the definitional, logical, and mathematical infrastructure for defining personal identity, and hence through inversion, the concept of privacy necessary to draft precise laws and realistic cultural and software implementations.

AA.3.4.2 Data Ownership

There is a serious legal uncertainty as to who owns data, identity data, and any information about a person. If you state categorically that the individual owns that personal information, soon afterward many individuals would assert rights to take it back with full data erasure. Clearly that is not true because it has not happened and probably would entail an interesting legal battle. Data ownership is not clearly defined by law, statute, or court opinion. Perhaps, more to the point, is the question of who owns the right to correct data and what are the rights of ownership over flawed data?

Rather, the true issue if one of custodianship, the functional control over the collection, storage, processing, and application of privacy data. Until ownership (of identity and personal information) is defined by law, statute, and/or legal opinion, data ownership remains a gray area with enormous ramifications. For example, GLB speaks about violations of privacy on "non-public" data; this creates a legal quagmire for data exploits because the burden of proving privacy falls to the individual infringed, whereas penalties are assessed only by the Department of Justice. Before ownership or more detailed rules for custodianship are refined, secondary issues such as data value, costs, utility, access to, reuse of, misuse of, identity, and privacy remain in limbo. These are important unanswered philosophical, legal, and commercial issues. Such philosophical, legal, and commercial issues are not the substance in this paper. We need to be able to measure privacy specifically and differentials driven by events. Identity differentials are defined as any change (loss or gain) in identity through any event. Privacy differentials are defined as any change (loss or gain) in privacy through any event. Differentials (with calculus inflection points and derivatives) are important in measuring identity and privacy in practice.

AA.3.4.3 Definition of Identity

Identity is the condition of being a specified person, not to be confused with another person, or the process used to define an individual from the set of all existing and possible others. The set of all existing and possible others logically includes living, deceased, future, literary, and fictitious persons. Limited sets create insurmountable problems because it introduces uncertainty of missing data and false matches. In functional terms, the condition of being a specified person also means the ability to identity a person, qualify the asserted identity of a person, and the ability to link all information of ownership, political, and freedoms to that particular identity and physical persona. In other words, identification requires the ability to assign or validate an identification against a physical persona, and subsequently link medical, legal, banking, property, ownership, descriptive, relationship, political, and financial records to the identity and also to the physical persona.

Note that identity is not limited to people. Identity can as easily defined and measured for any object or set of objects, ranging from chattel, to processes, to documents, to specific data elements. Certainly we can talk about the identity and authenticity of a collection King Louis $15^{th}$ antiques, a Picasso painting, or war orders by George Washington. Replicas, copies, forgeries, and other representations can be thus identified and measured for authenticity. For example, it becomes technically viable and commercial valuable to assess the identity of a counterfeit $100 bill as authentic or perhaps 52% authentic, just as it is to say that we are certain to 52% that the person before us is the credit card holder. Many current identity and authentication processes currently in effect are binary, providing either a truth or fraud, and not a partial statistical assessment that is useful as the technology of identity is expanded by new developments and assaulted by increased levels of frauds and possible thefts.

An identity is provided through entity-specific information, generally respecting to a format, purpose, or structure, which is called in this paper an identity category or just an identifier. The entity-specific information corresponds to a data field, columns within a database, or tags in a hierarchical and object-oriented data structure. While identity might well represent a single concept, the identifiers used to construct identity are many and often used in conjunction with other identifiers to construct a single identity. Names, assigned numbers (generated randomly, sequentially, or loosely), fingerprints, biometrics, and descriptions are only a few of many possible identifiers.

This paper illustrates that no single identifier is unique and sufficient. Uniqueness is a mathematical term describing the situation where one identifier is known from all others and uniquely maps one-to-one to a physical persona. Sufficiency is also a mathematical term describing the condition where identifier(s) uniquely define and describe that identifier(s) from the set of all possible others Unfortunately, unique identity is a Platonic concept, an ideal that can never be established in certainty because of limited sets and overloaded and complicated use of identifiers. We can approach identity but not obtain it. At some point, identity assignment is held by a trust holder or by a custodian. This trust holder or custodian must apply the very same types of identity assignment to provide access to and authentication of the initial identity assignment. In other words, some identity assignment and validation must be established for the trust holder or custodian that asserts the unique identity and its validity. It is a circular logic that unravels when any trust holder or custodian is attacked. The logic undermines this circular chain. For example, the Microsoft .NET Passport and Wallet or Sun Microsystems Java-based One Platform both create a trusted custodianship for identity and personal information for which the ultimate security is controlled by these organizations applying traditional security identification and authorization. How secure and accurate are their data entry, accuracy, and security systems? Reliance on a custodian merely moves the validity issue to that other party without actually resolving it.

Some might argue that gene typing will define identity with absolute certainty, although realize that technological implementations will always link bank accounts, property, and licenses with that gene typing. I assert that even explicit gene typing requires a trust relationship to assert linkage between the profile, the individual, and any associated logical relationships. A trusted proxy relationship is merely a practical solution to the ideal, which can never be achieved, since the gene type and the individual are indeed one and the same, but the functional representation of the gene type becomes a practical but inherently flawed identifier with trust limitations. Privacy too, is a Platonic concept achieved by association to identity. This has bearing in both legal and commercial endeavors; the definition accommodates social, religious, and superficial components. Thus, applicability becomes an issue of what is practical and what technology will work, trading on pragmatic elements of uniqueness and sufficiency.

AA.3.4.4 Uniqueness

Uniqueness defines the mathematical condition where an identifier delimits a one-to-one match with a specific individual persona. It is an abstraction that has not been achieved in any form nor with any technology yet. In point of fact, names, social security numbers, and even a representation of gene typing are not unique. In some instances, these identifiers are unique for a subset of individuals, but not sufficient to distinguish one from another within an accidental or purposely-constructed subset. An additional issue with uniqueness is non-repudiation, authentication, and confirmation, as identity theft becomes a significant economic crime (cf. "Vicomte de Bragalonne", Sommersby, and "Le Retour de Martin Guerre", and many less fictional people, such as those who were holding wills claiming inheritable rights to the intestate Howard Hughes.)

AA.3.4.5 Sufficiency

Sufficiency is the condition that several single but not necessarily unique entity-specific facts define an individual from all others through the process of minimizing the set of possible matches. This is the Venn Diagram approach to identification, a useful metaphor when I later explain the implications of Bayesian inference on forced re-identification. Sufficiency is also the condition whereby a selection of several aggregated but not necessarily unique identifiers are necessary to define an individual from all others. The first condition is necessary to modern economic and social activity. The second condition is an unfortunate fact of data mining and aggregation technology that undermines personal privacy in modern society; it is perhaps the underlying social concern driving new privacy legislation. Bayesian inferential statistics later in the paper show that forced re-identification asymptotically approaches 100%, even with some of the least significant and seemingly most innocuous personal identifiers. Most research efforts have stressed data mining and data aggregation driven by exact identifier matches. However, a few limited efforts explore inference, proximal-match accuracy, and a preponderance of circumstantial evidence insinuating that privacy might be unobtainable, as Latanya Sweeney suggests in "Privacy and Confidentiality" and her other related papers. Expect ongoing research to explore the possibilities of and effects from unanticipated forced re-identification, how possible it is to achieve, and its prevalence or desirability. This paper shows that re-identification is a statistical certainty.

The indirect implication is that a de-identified document could be statistically sufficient to uniquely re-identify or misidentify an individual. This has importance to decision-making based on re-identified documents, decision-making which could be incorrect. This also important in terms of damage caused by immediate or other tertiary parties applying or misapplying that information. Identification must be asserted and confirmed in life-threatening situations and many commercial settings, as there is certain to be legal tort, liability, and malpractice liabilities, as well as increased in the incidence of fraud.

AA.3.4.6 Direct and Indirect Identification

Direct identifiers represent a theoretic concept but not a reality. Even within modern societies names are not unique, functional identification numbers are not completely unique even though serialized, and competing and conflicting systems create failures in distribution, control, and enforcement of uniqueness. At best identification is at best a proxy for the ideal. Specifically, some people have duplicate social security numbers; many are recycled after the death of an initial holder, an important reason for assessing data entry errors and including deceased and fictitious persons in the set of identifiable persons. Even national identity papers or cards pose serious logistical and technical problems well known within the allied technologies of biometrics. As a result, direct identification defers to a composite process applying an acceptable level of overlapping partial identifications, in a Venn Diagram style of increasing the statistical level of identification accuracy. Fraud, forgery, theft, counterfeiting, errors, and other attacks on the identification systems potentially undermine direct and indirect identification systems and create a need for better economic and technical solutions.

As a result, direct identification is defined four necessary and sufficient processes. These are:
identification
authentication
authorization
confirmation Identification is the unique and accurate definition of an individual. The technology does not exist today. Within a technical environment, identification becomes a passive technology where the individual asserts his own designation, a designation, which might or might not be valid or validated. Authentication is the process of validating the asserted identification with variable levels of integrity and accuracy, often referring to a trusted third party or custodian to assert that (quasi-) validity. Authorization is a functional designation of what an individual is allowed to do after identity is asserted and trust established for any authentication. Confirmation is the process of validating that bound information matches the identity assertion.

Note that authentication and confirmation are the same processes practiced in different situations or as different sequential steps in a process. Authentication is about validating the assertion of the identity of an individual. This is a serious issue in electronic commerce, particular as a means to reduce credit card fraud. Confirmation has more to do with the de-identified or re-identified information and validating its accuracy, integrity, and relevance to the authenticated individual. For example, confirmation is very important to consumers vis-à-vis false, incorrect, or mismatched credit report line items. The most disquieting aspect of de-identification and re-identification is the situation where incomplete or specious information will cause a surgeon to operate on the wrong patient, an insurance company to deny coverage, or create a situation of data suppression with indeterminate assignment of responsibility. Confirmation has been not described nor is traditionally part of the biometric literature; however, confirmation is a critical and necessary step overlooked in commercial, medical, and legal workflows as more products and services contain significant informational content with data inaccuracies and base decisions on inaccurate data.

Confirmation establishes the accurate binding of de-identified and re-identified data to the individual in order to minimize errors through the integrity and relevance of the re-asserted information. Since de-identification and other technologies, such as information dispersion and granular access control, destroy the context and relationships of identifiers within a data set or record, confirmation becomes crucial under conformance to the new privacy legislation. Note that formal confirmation has not been part of the economic or online processes. Consumers typically react against errors only after the errors cause obvious harm, a situation that will change as information becomes more of a critical component within products and services. Generally a proxy serves instead, such as credit card possession with presentation of the credit card, or a hospital bracelet on patient's wrist. Most hospitals, banks, and financial institutions validate the identity of the individual but unfortunately make the false-logical assumption that their own internal data is correct and correctly established to that individual. Confirmation by proxy is often correct but is not logically indisputable, thereby showing the need for a more formal confirmation process.

The overwhelming social and technical problem with authorization, and hence unique and accurate direct identification, is that ultimately some authority must be trusted for that identification and/or delivery of that identification. All such systems have flaws because they are inherently circular in logic. The authority must be granted the identity information in the first place, a circular logic flaw. As a result, authentication becomes an issue of trust, a belief in a system with axiomatic flaws, or simply a practical solution with a degree of statistical failure. Although a gene type could well represent a unique personal identifier, some authority must vouch for the integrity and applicability of a gene type, thus undermining the realization of a platonic identifier, as previous stated. In security and access control, identity and authentication are subordinate to authorization, which becomes the functional issue. In effect, identity is meaningless as nothing more than a useful designation—only as secure as any other authentication based on the inherently-compromised trust-based system. The platonic ideal of identity is something we can not as yet achieve.

In effect, every identifier is indirect, in as much as each one identifies a subset of individuals. It is not exact, not precise, not infallible, but often becomes sufficient for social, medical, economic, and government applications. As previously stated, it is a proxy for the concept. Nonetheless, identity is a commercial and practical compromise, that we generally accept, and one for which we indeed have little alternative. Indirect identifiers include any definition, description, qualification, or physical subset of a unique individual. Statistically, no identifier is guaranteed to have 100% accuracy, but individual identifiers could statistically define a unique individual with 100% accuracy. Both the inverse and converse are not true. This does not mean that an individual identifier that statistically defines an individual with 100% accuracy is 100% accurate; this is an anomaly that cannot be mathematically or legally assumed. There is also a time component to identity, identifiers, and identity information. They tend to age and atrophy in accuracy, reliability, and utility, requiring constant maintenance to retain reasonable currency.

This logical distinction is crucial when planning and implementing de-identification systems compliance with both legislation imperatives and accommodate advances in identification and data processing technologies. Neither identification nor data processing technologies will be static, so compliance only with formal legislative laws will not achieve desired results within the legal, Fair Harbor, and "reasonable standards" even today. It is not reasonable, especially not legally responsible, to adhere to a minimum standard when this paper outlines available and effective technology to resolve many of the implementational limitations of GLBA, HIPAA, Data Privacy directives, Safe Harbor rules, and other statutory requirement.

AA.3.4.7 Unique Identification and Subset Identification

Identification is not an either/or proposition. It represents a range of additive, cumulative, and overlapping individual identity properties. I assert that no single identifier exists to uniquely define an individual and link that person to all associated property and information. I cannot prove this assertion, only disprove its likelihood. I point to a serious and significant problem that plagues our society, that of fraud, forgery, and theft of identity. These crimes would not and could not exist with unique and sufficient identification systems. Logically, one counter example is sufficient to disprove any purported axiom.

As a result, I also assert that all identifier categories represent information reflecting a subset of individuals. That subset could be a null or empty set, contain a single entry, or numerous entries. The null entry represents a critical failure in that an identifier with no corresponding identity can statistically exist, thus allowing the criminal creation of false, secondary, or replacement identities. The single entry is a special case, a statistical aberration or accident, without guarantee of accuracy or identity, as previously stated. In other words, be aware that an identity-to-individual match is not an economic, legal, medical, financial, or commercial authorization without a corresponding confirmation.

For example, the reference to "William Jefferson Clinton" may appear to be unique, but an Internet name search uncovered at least three distinct individuals, in addition to the former president. Hence, I could assign a pointless identity accuracy of 25% to that name, based on one correct match from a potential of four. "George Bush" returned too many current and time-dependent historical matches for analysis here. Even the identity subsets, "president" and "George Bush" specifies more than one individual, or multiple references in time to a particular individual. In fact, the identifier "president" or "President" is insufficient to distinguish between the presidency of the United States, the presidency of the Dallas baseball team, the presidency of a credit union, or the presidency of a rugby club (in his prep school). Results are evidently context-sensitive. I can improve the imperfect "Clinton" or "Bush" matches by additionally specifying birth date, educational history, legal status, medical history, and other categorical identifiers to create matches with smaller subset unions. Multiple identifiers create additional Venn subsets overlapping with smaller unions, yielding with smaller confidence intervals.

This discussion has both direct and indirect implications. The most direct implication is that a document ever after a most rigorous de-identification process must logically contain information statistically sufficient to allow forced re-identification of an individual. I can improve efficacy of de-identification by removing that document from within any contextual basis. It might appear impractical or technical infeasible to link de-identified documents from the individual, but it is possible; the risk persists unless the context is broken and access to information is controlled at an infinitely granular level rather than an aggregate level.

Granular control is a core feature of software tools, such as the previously cited DigitalDoors, that provide item-wise security rather than gross access control. Granular re-identification and granular access control supersedes existing computer security methods in several ways. First, access is not either/or as with a textual or biometric password. Second, access is controlled not merely at system, volume, disk, or file level but within the file level for each de-identified item. Each item can be controlled at category, user, group, process step, or role levels. Third, each item can be accessed or denied based on time of day, internal and external threat modes, or other arbitrary policies. Fourth, access to any particular identity information can be overridden; by owner, manager, or other need-to-know ad hoc allowance granted by a supervisor, or on a per-item payment basis or other consideration. Fifth, all granular access is logged to comply with current and foreseeable mandatory audit requirements. Sixth, de-identification also works on free form textual content without the need for a database-like or XML structure, where automatic de-identification is variously supported for missing, substituted, categorization, misinformation, blanking, blurring, and other obfuscating replacements.

AA.3.4.8 Indirect Identity Information Sources

Although oral, hearsay, non-professional, journalistic, other sources are specifically beyond the scope of minimum essential information, the reasonableness legal standard still applies. Such externally derived information is fair use to achieve forced re-identification. Some identity and privacy information is very likely to be public as a matter of practice, but linkage to a person with surety is the issue. How external information applies—or will apply—is certain to be subject to legal action in order to define the boundaries of responsibility. This includes the cumulative responsibility of parties owning external databases with information that both pre-dates and postdates the HIPAA implementation dates and deadlines for other privacy initiatives. List 2 defines external data sources that compromise de-identification and empower forced re-identification. Nevertheless, recognize that legal responsibility has not been defined or rigorously prosecuted for loss of privacy from legal use or misuse of commercial databases.

AA.3.4.9 Definition of Privacy

Before we can do anything substantive about privacy, we need a functional definition for privacy. We also need methods for measuring privacy in order to control it and measure the success for that control. The reality today is that privacy is an ephemeral assertion which we all seem to know about and know when we have it or lose it, but are unable to define, qualify, or quantify. It is unlikely we will be able to measure it, let alone control it, without a definition, some utilitarian measurement units, and a corresponding measuring process.

"Privacy, like an elephant, is more readily recognized than defined." John B. Young. Any definition of privacy depends on perspective; therefore, no complete meaning exists for all possible situations. William Prosser proposes the most encompassing legal explanation by suggesting that privacy consists of four concepts: intrusion, public disclosure, inaccurate reporting, and false identity. These are:

Intrusion refers to the invasion of an individual's solitude or private actions or thoughts. An example would be gathering information on an individual's daily schedule or reading the diary.

Public disclosure of embarrassing information that an individual wishes to remain private is another form of violation. Informing the public of a medication a person is taking that reveals an illness may be categorized under this element.

False representation is another facet of public disclosure where incorrect information falsely represents an individual. An illustration of false light is the erroneous reporting of legal action brought against an individual because of misidentification or the surgery performed on the wrong individual.

Appropriation of another individual's identity (theft of identity) is becoming a well-known problem as people seek to secure others' financial assets.

Prosser rationalizes this complex concept as being analogous to the difficulties that courts have defining and protecting privacy. Privacy can not be guaranteed because no common laws exist to protect privacy. Actually enabling privacy, subject to laws, is yet a secondary step once removed from the primary need. The idea itself is a compilation of different interests that when brought together are called privacy but otherwise lack commonality. Despite the subjectivity and vagueness of the concept, and the inability of society and the law to fully develop a functional definition, privacy might be considered a group of rights, which only prevail with infringement upon a more fundamental right.

A somewhat more practical and commercial definition for privacy is the right to be free of unnecessary public scrutiny, or the right to be let alone. Once an individual is a "public figure" or involved in newsworthy events, the right to privacy may evaporate. Hence, more than likely, I think of privacy more as the right to privacy, which is an operative issue. This right to privacy is the possible right to be let alone, in absence of some "reasonable" public interest in an individual's activities, like those of celebrities or participants in newsworthy events. Invasion of the right to privacy can be the basis for a lawsuit for damages against the individual or entity (such as a magazine or television show) violating the right. However, the right to privacy does not extend to prohibiting persons from taking another individual's picture on the street. An invasion of privacy is the corresponding legal loss of the right to privacy. This is intrusion into the personal life of another, without just cause, which can give the person whose privacy has been invaded a right to bring a lawsuit for damages against the entity that intruded. However, public personages are not protected in most situations, since they have placed themselves already within the public eye, and their activities (even personal and sometimes intimate) are considered newsworthy, that is of legitimate public interest. An otherwise non-public individual has a right to privacy from:

intrusion on the individual's solitude or into the individual's private affairs public disclosure of embarrassing private information publicity which puts the individual in a false light to the public appropriation of the individual's name or picture for personal or commercial advantage Lawsuits have arisen from magazine articles on obscure geniuses, use of a wife's name on a hospital insurance form to obtain insurance payment for delivery of a mistress's baby, unauthorized use of a personal photograph to advertise a photographer, and "tabloid" journalism treatment of people as freaks. There are numerous instances of governmental invasion of privacy such as the Federal Bureau of Investigation (FBI) compiling files on people considered political opponents, partially offset since the passage of the Freedom of Information Act in 1966 (FOIA).

Privacy is more the cultural issue than any right or concept that is clearly defined; different societies define inconsistent boundaries between private and public information. Attitudes to privacy are governed by social norms. A culture tells people how to behave, and defines standards for how individuals should interact, and by implication how groups should interact with individuals.

Thus, as a society evolves, attitudes towards privacy change. Perhaps the most fundamental evolution is that of data processing during the last 20 years, rendering privileged information readily available and easily cross-referenced to create inferences and analysis.

Privacy is often regulated legislatively. There are two broad classes of legal structures: freedom of information, and privacy protection, the former to insure public access to government process on behalf of individuals (although they may not know about it), the latter to provide enforceable rules for the collection and use of information. These two classes are synergistic but often in conflict.

Privacy concerns depend upon the parties involved, and on a trust relationship. An individual will decide to provide different information to different parties (and hence preserve different levels of privacy), depending on the trust between them and on the benefits to the individual from revealing information. Privacy is often fine-grained; individuals and organizations need to choose what information they release to each other, or to business. Trust relationships can depend on proof of identity of the parties. In complex interactions, it is important that each party be able to prove the identity of the party with whom they are communicating. Privacy must be ensured in communication, as well as storage. Privacy policies could ensure that archived information is safe, but must also ensure that communicated information is safe from interception. Furthermore, the communication mechanism must be able to prove the identity of all parties, to ensure secure custodianship. As a result, privacy policies must be well known. It is important to define (and state) clear policies regarding the use of the collected information from individuals (as patients or customers). This can be a complex problem when a web site, service provider, or business partner offers a variety of different services, when each service requires differing levels of disclosure to process the workflow.

Just as identity is a visionary notion, privacy is an illusive concept, implying different issues for different individuals. Privacy is concerned with the fundamental right of an individual to decide about the processing of personal data as well as the protection of the intimate sphere within four functional categories:

improper usage of identity information, including its deployment and its transfer to other parties other than that for which it was explicitly collected privacy invasion, including unwanted solicitation of personal data improper collection, retention, association, and storage of information.

There are two forms of privacy protection in the United States. The first is Constitutional. The second is protection afforded by the common, or tort, law. Although the U.S. Constitution does not expressly protect privacy, it has been inferred by many Supreme Court decisions. In addition, many States also include express provisions within their state constitutions guaranteeing an individual's right to privacy.

Common law, as manifested in the law of Torts on the other hand, deals more with invasion of privacy issues and the actionable components thereof. There are four distinct common law privacy protections that correspond to Prosser's legal privacy definitions:

appropriation (of another's likeness or identity for financial benefit)

intrusion (upon an individual's solitude)

publicizing details about an individual's private life (not of legitimate public concern)

false light, or placing the individual before the public eye in a manner that is damaging to reputation or inaccurate In the U.S., the challenge is about balancing the legitimate concerns of the public against the individual's legitimate right to be left alone. This leaves endless room for legislation, definitional bickering, and case law. I think a more practical definition of privacy is as the inverse of identification. In effect, identification and privacy are the two endpoints of the same range.

By taking this liberty and viewing identity and privacy as statistical constructs, privacy becomes a statistical definition rather than an absolute certainty, inheriting all the characteristics and flaws of identification technology. Also, as a result of this, it becomes easy and practical to measure identity and privacy in substantive terms, usable both as a manual or automatic computerized basis. Identity is inversely proportional to privacy, as shown:

$$\text{Privacy} = 1/\text{Identity} \quad \quad \text{Equation 1}$$

Or:

$$\text{Privacy (represented as a percentage)} = 100\% - \text{Identity (a percentage)} \quad \quad \text{Equation 2}$$

Also:

$$\text{Identity} = \text{Loss of Privacy or Loss of Privacy} = \text{Identity} \quad \quad \text{Equation 3}$$

While equation 1. and equation 2. are equivalent, each circumscribes differing functional and utilitarian characteristics. Equation 1. asserts inverse relationship, that privacy and identity are not only mutually exclusive (and granular), but also inversely proportional. Granularity is important in terms of practical implementation and could have legal bearing when determining responsibility and assessing punitive damages. Equation 2. asserts that any increase in identity decreases privacy, or that a decrease in identity increases privacy, refining the distinct reciprocity between identity and privacy. Equation 3. merely reflects the relationship between privacy and identity creating a utilitarian measurement for the loss of privacy, taken for granted by individuals, but certain to be valuable in assessing legal liability.

By the way, this identity and privacy measure has some historical and literary basis; to know the private name of an enemy—particularly with regard to dragons and wizards—is to sap that enemy's strength. Such name-based spells have a basis in Sumarian cuneiform. It is an old, certainly intriguing, if difficult, concept to defend, particularly in light of its chiefly fictional basis.

However, many fictional concepts are brought to reality through evolving technology. This one seems very relevant for modern society in light of the exponential surge in identity theft and financial fraud. Perhaps, this fictional concept of name bound to privacy holds some validity with regard to modern society as crime and war are waged both politically and economically. For example, governments limit international travel and freeze access to accounts when they have identity information.

One limitation to this mathematics is that data retained by a custodial (trusted agent or unwanted but necessary provider) database makes that data functional for commercial purposes but limits its effect on these equations because the identity is taken or granted for limited but not unrestricted applications. In effect, privately-held knowledge is supra-equational; it is non-planar. This opens doors for advanced research in areas as diverse as risk management, competitive theory, and risk-oriented actuarial mathematics. Privately-held knowledge represents uncertainties best defined within specific types of statistical mathematics, well understood and directly applicable to identity and privacy mathematics. This can be used to qualify and quantify accuracy, confidence intervals, rates for false positive and false-negative assertions, authentication, and confirmation.

Since we have to assert and prove or disprove identity, privacy represents the de facto and the standard default situation, from which we must actively assert a loss therein. In other words, the legal burden of proof is to prove identity and prove subsequent loss of privacy. This follows from both a basis in a priore knowledge, legal theory and case law, and this logical proof. The mathematics are applicable to legal, financial, and commercial applications, and thus simple to implement in information technology (IT) systems.

AA.3.4.10 Implementing Privacy Policy

HIPAA, GLB, EU Data Directives, Safe Harbor policy, and others are legal mandates for establishing privacy policies. Unfortunately, this legislation lacks sufficient definition for privacy, privacy measurements, and measurement methods. In fact, as explained in the introduction, unique identification is truly a statistical concept.

If you were hoping for ideal answers, there clearly are none beyond the practical implementation ideas suggested herein. Legislative directives represent minimum standards for operation. You might also note phraseology such as "reasonable" or "what is reasonably determined," or even "other identifiers as determined to be necessary" in the legislative directives. In effect, this phraseology creates a moving target of conformance, a standard that will be defined by actions, court orders, case law, judgments, settlements, additional legislative activity, and conformance costs. This paper shows clearly that the minimum standard to implement privacy security is woefully inadequate. The failure to implement more rigorous de-identification, access controls, and re-identification at this early stage in the HIPAA lifecycle even now foreshadows legal liability.

AA.3.4.11 Privacy Measurements

It is not possible to judge effectiveness of any identification, de-identification, or re-identification without a measure and a system to apply that measure. Identity is a statistical concept, and by inversion, so too is privacy. Since privacy is the access to, release of, and misuse of identity information, the measurement of privacy is the measurement of the access to, release of, or misuse of identity information. Measurement is both absolute and relative (albeit against a statistical basis that precludes absolute certainties). Specifically, this means we can measure the absolute identity or privacy of an individual against a complete measure of the individual, or the incremental or relative identity or privacy of the individual. I mention this aspect here because it portends massive legal and economic applicability for privacy non-compliance lawsuits. Specifically, consider the situation where a hospital publishes karposi carcinoma statistics with zip code information, which an insurance company subsequently cross-references with pre-HIPAA historical internal data and purchases hospital stay records against address listings in the phone book to redline specific applicants with AIDS from obtaining life insurance. Techniques of Bayesian inference make forced re-identification a statistical certainty.

While there is most certainly economic injury to these particular redlined individuals, assessing legal responsibility and financial damages against the particular hospital is complicated by asserting partial statistical blame to the hospital as opposed to the relevance of the preexisting cross-matched private and public information databases. Although the hospital could be seen as releasing the ultimate necessary and sufficient information to force re-identification of individuals, that information is not necessary and sufficient without the existing prior knowledge. At least three fundamental legal questions arise:

Is the hospital responsible for recognizing that its incremental release of knowledge damages individuals?

How much partial or full legal and economic responsibility is the hospital to bear?

How much responsibility are the other prior parties to bear for the damage to individuals?

Although the hospital was the ultimate trigger, all parties are in effect cumulative purveyors to the damage with a share in setting the threshold. As a result, the list of plaintiffs and defendants grows long very quickly with conflicting assessments for joint negligence and/or shared culpability.

Also, consider the possibility for substitution ciphers, dependent interaction of words or phrases, application of encoded words or word meanings (as in the Navajo code talkers of WWII), or the potential for context-specific linguistic meanings that surpass the ordinary uses of common language. This is a semiotic problem that surpasses the purpose or scope of this paper. It is important to recognize this as a method to defeat de-identification methods, but not these methods when combined with dispersion and granular access control, because context and access provide another layer of security.

AA.3.4.12. Measuring Privacy

It is not possible to measure privacy directly. However, I can measure identity and infer privacy using the previously defined mathematical relationships. This is sufficient and accurate, assuming accession to the identity and privacy definitions. As such, there are four levels of possible identity measurement. The Platonic ideal is an unobtainable concept. However, we can measure practical and technical instances of identity, internal aggregates of identity, comprehensive internal and external aggregates of identity, and differentials in identity and privacy.

An instance of identity represents the potential for a single document, patient chart, report, database record, file, or other single object to assert and confirm the identity of an individual. In other words, how much information within that single chart or note can compromise the identity of the person to whom it refers. The internal aggregates of identity represent the sum total of internal information to assert and confirm the identity of an individual. In other words, how much internal information from all possible available sources, this can include private information, public presentations at grand rounds, or other private conversations can compromise the identity of the person to whom it refers.

The comprehensive internal and external aggregates of identity represent the exposure of internal information when combined, cross-matched, data mined with external public, private, commercial, and governmental sources of information to assert and confirm the identity of an individual. In other words, can internal documents, no matter how carefully de-identified be used to compromise the identity of the person to whom it refers or even a subgroup of people to whom it refers? Statistical studies become very powerful to characterize subgroups with probabilities approaching 100% to identify specific individuals.

The differentials in identity and privacy complete the concept of a measurement system, allowing full application of curve fitting, calculus, area measurements, and comparisons. This will useful in financial and legal assessments, but also furthering development in identity and privacy mathematics.

These four distinct measurements are raised because it remains unclear where the legal responsibility will be assigned for a breach of conformance. Will courts assign blame to owners of preexisting databases because they should know nonetheless the potential for harm derived from the misuse of their information? Will courts assign blame for only the final and latest release of information most proximate to the breach of conformance? Not only are these issues unclear, it will be expensive for some parties to bear the defensive costs to define the legal responsibility parameters for the rest of us. As such, the best defense is clearly foreknowledge and anticipatory response in terms of operational responses that exceed minimum de-identification and access control standards.

A security meter becomes a relatively simple concept after discounting impractical Platonic ideals. Practical implementation is feasible. Level 2, 3, and 4 are respectively measured by processing the single document for identity identifiers, the internal database (all internal record sources, both manual and computerized), and measurement of internal database along with external data sources. Categorical identity identifiers, previously listed; would be applied. As new identifiers are discerned or developed through technology, these identifiers would be added to increase measurement accuracy and lower statistical confidence intervals. Previously measured documents, databases, and combined internal and external databases would need to be reevaluated both after new identifiers are available or when changes are made to documents, internal, or external databases. Measurement is by no means static, as demonstrated by the previously mentioned commercial DigitalDoors system.

Finally, note that the measurement is based on assertion and confirmation of identity. This is statistical in nature, reflecting both the rankings of each identification category to define an individual uniquely, and the probable inference in data mining and aggregation. We can calculate standard statistical confidence intervals within which the certainty of identification falls based on the aggregates of identification categories and risk methodologies outlined in game theory and competitive analysis.

AA.3.4.13 Measuring Uniqueness of Identification

Uniqueness represents a quality issue for authentication or confirmation. Its inverse also represents the measure of re-identification possible through internal channels alone. Identifiers that return multiple matches clearly fail at demonstrating uniqueness. However, a response in terms of a matrix, object, or set establishes a range of possible matches that can be narrowed by additional information or physical investigation. Response with a single identification does not logically demonstrate uniqueness, only the failing of the database(s) to have sufficient information or the range of information to assert a Bayesian inference. However, a useful statistic is a match inference, a compound statistic including an entry for each identifier category. It is important to note that unlike in prior unanticipated re-identification research, the emphasis herein is placed on inferential identification. Inferential identification does not guarantee exact identification per se, as you see below, but does demonstrate the statistical probability of re-identifying de-identified data sets using Safe Harbor de-identification categories and standard commercial data attributes for individuals.

In no cases do the unanticipated re-identification rates using associative inference and set theory fall below 95%, even for remotely indicative commercial data attributes, such as magazine subscriptions, credit reports, credit cards used, and blurred service location. By the way, associative inference and (Venn) set theory enable anyone trained in this technology to recover data broken into binary categories with or without missing categories.

Associative inference is primary implemented through Bayesian methods against large databases. Bayesian inference is a branch of statistics and predictive mathematics devised by the Reverend Thomas Bayes (1702-1761) to update a prior distribution of information and obtain a posterior distribution in order to generate an uncertain quantity or reformulate a decision tree. Bayes wanted to predict the order of a card deal given cards already dealt, and perhaps use this technique to prove the existence of God. He was a theologian after all. His philosophy categorized the physical world in terms of certainty, impossibility, and a functional and useful range in between defined by probabilities.

The Bayes Theorem provides the root for inference, simulation, and many other branches of statistical mathematics and probability research. The theorem leads to very practical methods to estimate, forecast, or model the world in ways that are more accurate than finite mathematical and physical science methods. In fact, some processes are statistical and not certain, leaving only statistical but accurate methods. These practical statistical methods are used in political forecasting, pharmacological research, finance, and atomic physics. It is presently implemented with computer technology using linear programming, regression analysis, simulation modeling, neural networks, and Monte Carlo methods with Markov Chains. Bayesian inference is most effective with sufficient information, and data collection and organization achieved the necessary critical mass during the 1990s to make it a statistical certainty that every individual within modern society can be identified with a small (3 to 4 categorical identifications) sample set.

For example, consider that a name used as an identifier returns 18 matches from a database with 67,679 entries. The simple probability of getting the matching record is a simple 1 out of 18, or 5.266%, somewhat simplistic statistics used by others studying the privacy, anonymity, and re-identification issue. In contrast, Bayesian analysis yields an inferential accuracy of only $(1-((67690-18)/67690))=0.00226$, that is the "knowing" that this is the correct record. Note the importance of applying the proper statistics. While the gross chance of identifying an individual from within the database is $18/67679$, which is nearly 0%, the statistical accuracy of knowing for certain that this is the correct individual is nearly 100%. Additional identifiers with date of birth return 356 entries and zip code return 8756 entries. The probability composite would be $(1-((67690-18)/67690))*(1-((67690-356)/67690))*(1-((67690-8756)/67690))=0.000000187$ certainty.

Notice that even the least significant or analytically-unrelated identifiers asymptotically drive the re-identification probability to 100%. While such identifiers as gender, blood type, aggregate 3-digit zipcode zone appear to be unrelated and insufficient to identity an individual, they are logically related within set theory with inference methods as describing groups of individuals. By applying internal and external data to forced re-identification, the cohesiveness of the information is made obvious by reducing the union of data overlaps until such time as the union set contains one or a small number of individuals. In point of fact, we can find a data needle in a haystack. By combining previously-unknown search phrases constructed from trace information with external Internet, commercial, and private or secret government and military agency information sources in conjunction with Bayesian inference, forced re-identification is virtually guaranteed. Not only that, but the supplemental information sources provide or restore context so that the identification can be linked to all real-world applications and information utility.

For example, we can expand the previously mentioned George Bush to easily construct a biographical history from grade school, through work, to political office. Commercial, private, and secret databases—depending on access to them—would allow generation of a medical, social security, driving, criminal, financial, friendships, associations, business dealings, and political profile. Accuracy is not a guarantee, given the data sources, but would be improved with cross-referencing, reduction, and some human intelligence. Certainly, the Bush profile would be useful in a wide range of commercial, financial, law enforcement, and political contexts. Although Bush is a public figure, this task would be as easily accomplished for any other person within a modern society.

Whereas most people think in terms of damage done through exact identification and the subsequent loss of privacy, the issue is not about being right with a specific match. Instead, the identification of an individual as part of a functional and operative group, and not being wrong about that assignment, is the actionable and legal issue. It is not about right, but not being wrong. This fundamental difference changes the legal onus on identification, security, and privacy issues in order to broaden the opportunity for legal liability. Since the measurement of identity is cumulative, any release of information that refines the overlapping circles of group identification thus becomes actionable.

Realize that re-identification with a set of 2, 5, or 20 potential individuals is as useful as a unique match; for redlining mortgages to cancer patients, life insurance to undiagnosed HIV carriers, or other economic poor risks. Many business decisions are not made on certainty but actuarial risk factors. While the issue of such information in such valuable applications is not against the law, the access to such information and particularly the release of such information is rapidly becoming illegal and actionable. The implication goes far beyond privacy into other practical application of commercial data mining.

Note that even with a relatively large number of matches from within a fair-size database, the de-identification process is not reasonable until wider range of identifiers than that specified by the Safe Harbor policy are actual removed or masked. Supplement information, aggregated but seemingly unrelated and minor identifiers are extremely effective to defeat de-identification. Specifically, the Bayesian inference of unanticipated re-identification of the individual masked within the subset of eighteen is 0.99774 or 99.774%, whereas when that individual is masked within three identifier categories, the statistical chance rises asymptotically to 100%. The probability actually increases because there are more categories to identify an individual uniquely, as it should be. Misapplication of the gross chance of identifying an individual from within the database with more categories actually decreases when applying the incorrect statistics. This should be a clue to concept flaw in simplistic statistics used by others studying the privacy, anonymity, and re-identification issue, but confirmation that I have applied the correct inferential statistics above. It confirms the relative lack of safety of de-identification by identifier categories, and the need for improved de-identification methods, contextual dispersion, and granular access control.

The most efficient method to measure the uniqueness of the identification in lieu of other tabular methods to authenticate or confirm the identity or the individual is to vary the identifier categories to test for stability of the identification. Calculating this stability is supported both in calculus derivatives and confidence intervals. This statistical method is similar to measuring experimental variance. This technology will most certainly be applied to assess contributory negligence and be applied to determine jury awards of compensatory damages. Realize that assignment of statistical values to categories and cross-category inferences is subjective at best. Perhaps there will be a mathematical means to assess this, rather than guess and empirically improve the values over time.

AA.3.4.14 Density of Identification

The uniqueness of an identifier for positive and efficient identification of an individual from all others suggests the need to rank identifiers as to their effectiveness. This density of information transcends customary assertions about whether to blindly remove names, social security numbers, and addresses as per the HIPAA guidelines and describes why the information must be removed and the potential with information overlaps and cross-matching to re-identify individuals. Density is clearly not linear as some identifiers aggregate together or with external information to create better re-identification results. Recognizing this yields the consequence that any attempt to define a "minimum necessary data set" or a reasonable best effort to achieve anonymity through legislated de-identification procedures will surely fail as legal risk management efforts, current or future. The complexity of de-identification is far greater than first obvious, and distinctly non-linear. This makes it much harder and more expensive to achieve.

While multiple identifiers create additional subsets with smaller confidence intervals, it is also possible to review the identifier categories included to resize the subsets so as to include more individuals. This becomes critical for de-identifying research data and aggregate results to minimize the potential for unwarranted re-identification of the initial individual.

Matrix of Privacy Information Association

There are some thesis and published papers asserting information density and forced re-identification based on purely practical and iterative mechanical methods. Such results speak only to the feasibility of forced re-identification but not to its likelihood within given circumstances. However, a number of studies on data mining and data aggregation suggest a methodology for starting such research. The non-linearity and power of aggregating identifiers with public, semi-private commercial, and private databases is suggested by the gray-scale combination in the cross-tabulated table or by Bayesian inference.

This falls into information theory, logic, linguistics, game theory, and associative mathematics. Bayesian inference, linear programming, regression analysis, and other statistical methods are being implemented with computers, overlapped with data mining, extraction, and other search techniques to push privacy to the brink of social extinction. For example, consider just how few identifiers and the minimum number of identifiers overlapping subsets could be and/or must be provided to uniquely identify an individual? This is akin to the problem of determining the number of unique colors needed to color a world map such that no two adjacent countries have identical colors. If nothing else, it seems I have suggested two new sciences, identity efficiency category ranking, and the determination of minimum identifier categories for efficient or exact identity assignment.

AA.3.4.13 Inference

Inferential methods are the tools of choice for breaking encryption, de-identification, and other security techniques. It is not a question of defeating them, but rather of making these techniques as inefficient and as difficult as possible while still retaining the practicality and usability of data within a collaborative environment or workflow-enabled processing environment. The point is that a one-size fits all methods to combat inference is ineffective; rather, a variety of extraction and dispersive techniques used in conjunction are necessary.

This paper has discussed Bayesian inference in terms of re-identification with partial personal and public data sources. Bayesian inference is a specific mathematical method for backtracking missing information. Inference corresponds to and raises the potential for other types of re-identification. Specifically, inferential re-identification does refer to:

Statistical inference
Opportunistic inference
Linguistic inference
Cultural inference
Context inference Statistical inference does include Bayesian methods, but it also includes other statistical polling and data aggregation and mining. It also includes the concrete experimental approaches although rudimentary data diving techniques as defined by Latanya Sweeney in her research. Linguistic inference is part of human intelligence methods (HUMINT) where researchers presume the types of missing information by stylistic, lingual, or comparisons against possible data matches. Cultural inference establishes situational and application link from data sources to generate context or application in order to establish potential missing information. Context inference is similar to linguistic inference because comparisons are made against similar data sources for possible matches of missing information, but context within the data source itself are used to infer the missing information. Contextual information also includes utility, application, data structures, location of data, purpose for data, time stamps, and other clues. Context also includes such clues as source and destination, the fact that the data just exists, was created, and was sent for some purpose, and can be linked to particular people, organizations, or time frames. Inference is a strong detective method for re-identifying information, whether encrypted, de-identified, limited through access, or secured by other means. Inferential methods are the tools that enable forced re-identification.

AA.3.4.15 Conclusion

This paper defined types of identifying information, categories for the same, and how association with public, private, personal knowledge, and a circle of association or inference can enable seemingly insignificant details to force re-identification of unique individuals. This yields a definition of what is critical and important for uniquely and sufficiently identifying an individual. The paper has presented the etiology of critical and essential identifying information and a mathematical theory for identity and privacy. It provides the philosophical concepts for identity and privacy. It provides the technology for implementing identity and privacy measurement systems. In addition, it defined the requirements for de-identification and forced re-identification processes and establishes the bar for minimum implementation performance to forestall adverse legal attacks. Finally, this paper has established the outline, design, and implementational requirements for conforming to data privacy laws in an efficient, necessary, and complete process.

AA.3.5.0 Personally Identifiable Information: Meta PII

Personally identifiable information (PII) is any attributes, characteristics, labels, or properties that uniquely indicate an individual person. PII is generically and sometimes legally defined (under fair harbor rules) as a set of categories for information types that uniquely identify an individual. See Categories of PII. PII usually represents a unique label that maps one-for-one to each individual. Social security numbers (SSN) are the dominate PII, but other keys are created to distinguish individuals. Telephone numbers map one-to-one but sometimes many-to-few, but it is a legally defined PII category.

MetaPII is anything external to that PII set, usually descriptive, that can create PII, or through other aggregate methods, uniquely identify an individual or approximate the identification of an individual. An approximation of an individual could include the categorization or all dyslexic 5'2" mathematicians (no names just the characterization) or the actual list of names for possible individuals represented by a set of characteristics.

MetaPII is also anything, usually descriptive, that can uniquely indicate a location, a property, a process, or any other tangible or intangible asset, as differentiated from a person. MetaPII is any information that can create aggregation, inferential, or interaction subsets that either physically or statistically confines an individual within an identifying scope or range. Consider metaPII as direct precursor to PII. MetaPII is inclusive all information lightly termed sensitive PII, non-sensitive PII, HIPAA "quasi-identifiers," public PII, and private PII.

While PII focuses on the real physical indication of a person living or dead, the information revolution has extended the legal status of the individual to organizations and corporations, while processing has expanded the model of the individual as owner and actor to process, web sites, and workflows. Individuality is embodied by many other things, including real property, systems and methods, digital resources, processes, distributed operations, virtualized operations, intangible information, and even assetized information. It is important to identify and differentiate these individuals (person, process, and property) from one another. This is only possible with formal and informal naming conventions. This maps many-to-many, many-to-many-to-one, and one-to-many. MetaPII is an intractable metacontent problem since multiple characterizations map into the same result sets and PII maps into metaPII.

In practice, metaPII can create PII, aggregate to uniquely identify an individual person, or identify exactly or approximate the identification of an individual (person, process, and property) through aggregation, inference, and interaction.

AA.3.6.0 Categories of Personally Identifiable Information (PII)

The legal definition of the Personally Identifiable Information (PII) is a function of law and regulation. The explicit categories of information considered as PII also vary by law and regulation. Note that the prohibitions and the criminal or legal consequences imposed for the release of PII remain unclear as to what that release, usage, or loss actually means. Specifically in contrast, usage and repurposing PII within the stewardship is usually valid. Usage of PII against the interests of the individuals is not prohibited. Prohibition only defines the unlawful public release of that PII. In other words, an organization with allowable access to PII can crunch that information endlessly and combine with other available sources deny claims, cancel insurance coverage, reject loans, or require stringent limitations for service, product, inclusion, or participation. Restriction on the release of PII is not the same as restriction on the usage of PII or the repurposing of PII. None of the current PII laws and regulations have recognized that aggregation, inference, or interaction create information that is fuzzy PII, which DigitalDoors calls metaPII, and is at least as revealing as any separate or combined category entry of PII.

PII is strictly defined as any an all categories of information useful to indicate or de-identify a specific individual. The definition applies to categories of information, like social security number, account numbers, or date of birth, under HIPAA Safe Harbor regulations and other legislation. PII is a strict definition that is not uniform, but rather varies by law, regulation, or proscribed operational requirements. PII is only that which is defined as PII. On the other hand, there are fuzzy definitions for PII that are misapplied and misused in discussions of privacy, security, and workflow implementation. HIPAA requires removal of eighteen direct and other "quasi-identifiers" before information is released, as listed below:

| Table of direct and other "quasi-identifiers" |
| --- |
| Name/Initials |
| Street address, city, county, precinct code and equivalent geocodes |
| All ages over 89 |
| Telephone Numbers |
| Fax Numbers |
| Electronic Mail Address |
| Social Security Number |
| Medical Record Number |
| Health Plan ID Number |
| Account Number |
| Certificate/License Number |
| Vehicle identifiers and serial numbers, including license plate numbers |
| Device Identifiers and serial numbers |
| Web addresses (URLs) |
| Internet IP Addresses |
| Biometric identifiers, including finger and voice prints |
| Full face photographic images and any comparable images |
| Any other unique identifying number, characteristic, or code (where a code is an identifier if the person holding the coded data can re-identify the individual) |
| Deployed genomic privacy technologies leave DNA susceptible to re-identification (Malin, JAMIA 2005) |

DNA re-identified by automated methods, such as:

1) Genotype—Phenotype Inference (Malin & Sweeney, 2000, 2002)

2) IdentiFamily:

software program that links de-identified pedigrees to named individuals

3) Uses publicly available information, such as death records, to build genealogies Fuzzy PII also includes physical characteristics, tattoos, histories, likely locations to find an individual or relatives of the individual, or even aggregated categorical information that can be used to expose an individual. PII includes any characteristics that can uniquely identify or force the reidentification of an individual, or statistically denote groups (open or closed sets of sets) likely to include individual(s) of interest. Realize that strict PII does not reflect or legally define the results of aggregation, inference, or interaction on lesser information pooled to identify the individual. That information separately is not PII but rather pooling information useful to establish open sets likely to include individual(s) of interest. That information combined is not PII either but pooling information useful to establish open sets likely to include individual(s) of interest. PII is only that which is defined as PII. The "any and all categories" is not clear enough for legal action until such time case law or new regulation specifically asserts the inclusion of fuzzy definitions for PII. There is more than the direct method to reidentify the individual without reliance on strict PII information with this ill-defined and misused application of fuzzy PII.

Strict versus fuzzy PII definition is actually recognized by HHS HIPAA documentation, but note the legal differentiation between PII and Safe Harbor requirements. Various research papers define forced reindentification in mathematical and statistical terms based on the aggregation, inference, or interaction of information. This includes k-Map (Sweeney, 2002), and where each shared record refers to at least k entities in the population under k-Anonymity (Sweeney, 2002), and where each shared record is equivalent to at least k–1 other records as defined by k-Unlinkability (Malin 2006) such that each shared record links to at least k identities via its trail which satisfies the k-Map protection model.

Strict and fuzzy definitions aside, there are also attempts to distinguishing between sensitive PII, non-sensitive PII, and HIPAA "quasi-identifiers." This linguistic nomenclature is rediculous? Is such a proxy a good firewall or even possible? Probably not. There is also literature on the Internet describing other fuzzy definitions that include public PII and private PII. Insurance companies and banks are issuing privacy notices under GLB informed consent requirements with a definition of nonpublic personal information as PII available internally but not available to the public. This distinguishes the value of intangible information as applied to information production and workflow where strict PII is not used or extended by fuzzy PII. In order to encapsulate the disparity between the strict definition(s) of PII and other information that can generate PII or fulfill the same function as PII to uniquely define an individual, DigitalDoors calls all this secondary information meta PII, which is what it is. Obviously, this can expose a tort liability not expressly actionable under existing PII law. Many categories of information not perceived as sensitive or legally defined as PII can be exposed through social networking, the vast networks of email users and YouTube videos, and the generic loss privacy within modern society. For an example of this PII and secondary metaPII risk, see Exploitation of Anything to Generate PII.

PII generally represent a one-for-one matchup between the surrogate PII value and the individual. Such items which are not always defined as PII but might be considered meta PII include:

TABLE

Possible Meta PII

National identification number
IP address (in some cases)
Vehicle registration plate number
Driver's license number
fingerprints, handwriting, or other biometric identifier
Credit card numbers
Digital identity (ID, handle, username, etc.)
Scanned image of signature
Recorded audio of name or other phrases
Bitmap image of person
Bitmap image of identifying marks, tattoos, or scars
Digital Signature
Private encryption key
voter registration
political party affiliation
URL
IP registration
Medical records
Rx records
Billing details (like Rx purchases)
Travel itineraries
Calendar entries
Alarm services It is important to recognize that the workflow available today and the readily-available editing tools makes it trivial to create fictitious documents or access tokens without the knowledge or permission for which this PIE refers. In other words, it is possible to grab a signature and face photo of a person from the Internet to create a corporate identity badge, or drop a signature into a lease document, or composite photographs either adding, changing, or deleting a person or place from the image. There are techniques to overcome these frauds, such technical analysis of image edges that would indicate drag and drop, or requiring a signature in pen in front of a witness who personally knows the signer with corroborating documents.

MetaPII generally represent a many-for-one matchup, one-for-many matchup, or a many-for-many matchup between the value and the individual. Information that is not generally considered personally identifiable because many people share the same trait include:

TABLE of Information that is not generally considered personally identifiable

First or last name, if common
Country, state, or city of residence
Age, especially if non-specific (anonymized by range or by omission of birthdate)
User name or handle (such as GoBoast@Facebook.com)
Gender or race
Name of the school attended
workplace
Grades, salary, or job position
Criminal record
Voter registration
Library card
Magazine subscriptions
Other subscriptions
Service billing information (phone, electric, cable, satellite, Internet)
Common service or product registration
Mailing inclusions (think Lists USA subject-matter lists)
Consumer click-stream data
Consumer email-open data TABLE-continued of Information that is not generally considered personally identifiable Cookies
Registry entry
File (cookie)
NAC settings
System settings
Screen saver settings
IP address or URL
Address lists (in Email) because they establish hierarchical, group, or role relationships
Social tags (establish non-regulated or uncontrolled contextual relationships)
Process logs
Timestamps
Phrases
Quotes
Common sayings
Unusual turn of words
Consumer click-stream data;
Consumer email-open data
Aggregate click-stream data Alternate representations in other fonts, transformations, formats, syntaxes, and punctuation include:

TABLE

Alternate representations

Zip + 4 or zip + 4 + 2 is exact designator of position
Zip as barcode is also a PII
DEA number
Medicare or Medicaid number
Military ID number
Participation number
Registration number A username or handle used as an ID at one web site can also be looked up at other websites, as the example detailed in Exploitation of Anything to Generate PII unfortunately demonstrates. Although these different web sites often protect user information robustly given the recent high-profile web site breaches, the aggregation of these like names and the related site information can also be used to paint a useful profile of an individual. Additionally, if access to ID profile information is publicly available, or you own a website and have access to ID profile information, you can link and match the PII details. So the use of the same ID and password on multiple sites might simplify the ID holder's life it creates an open security hole that might link into actual PII or cached credit card information. Granular content control and masking (particular is uniform among sites) adds protection to the ID.

Also, information from web videos or web sites can be used to reidentify an individual. While such information is not specifically covered by the formal umbrella of PII, it most certainly is PII in the truest sense of the definition since it can be used to explicitly match an individual, as previously detailed in Exploitation of Anything to Generate PII.

AA.3.6.1 Technical Identifiers

Personal information is a vestige of agricultural and industrial revolutions. The information revolution also distinguishes between the physical person and a logical persona as well as more virtual individuals performing actions and possessing assets. Persons are differentiable from persona or process. Specifically, software application and workflow are owned by persons and sometimes only by a persona in no way tied to a person but to some other logical identity, like a corporation, role, user id, a process id, or login entity. These personas and identities can own process, assets, information, and other intangibles. These technical identifiers can be used to link assets to individual persons and expose PII through a many-for-one matchup, one-for-many matchup, or a many-for-many matchup. Some identifiers include:

TABLE

| Technical identifiers |
|---|
| Vehicle ID |
| Real Estate Parcel ID |
| Check Routing Number |
| ABA routing number |
| Various service account numbers |
| Proxy Identifiers - pool size |

A more technical set of identifiers links computer hardware to a person or persona. This includes:

TABLE

| Identifiers linked to computers |
|---|
| the serial number of hard drive 2b |
| the bios version of motherboard |
| the bios manufacturer of motherboard 20 |
| the bios element id |
| the windows cd key stored in registry |
| the windows product id stored in registry 40 |
| the windows nt digital product id stored in registry |

Some of the relevant PII laws and regulations are listed below:

TABLE

| PII laws and regulations |
|---|
| California has privacy written into the state constitution Article 1, Section 1. |
| Online Privacy Protection Act (OPPA) of 2003 |
| Federal Laws: |
| Privacy Act of 2005 |
| Information Protection and Security Act |
| Identity Theft Prevention Act of 2005 |
| Online Privacy Protection Act of 2005 |
| Consumer Privacy Protection Act of 2005 |
| Anti-phishing Act of 2005 |
| Social Security Number Protection Act of 2005 |
| Wireless 411 Privacy Act |
| US 'Safe Harbor' Rules (EU Harmonisation) |
| Title 18 of the United States Code, section 1028d(7) |
| European Union (member states) |
| Article 8 of the European Convention on Human Rights |
| Directive 95/46/EC (Data Protection Directive) |
| Directive 2002/58/EC (the E-Privacy Directive) |
| Directive 2006/24/EC Article 5 (The Data Retention Directive) |
| Further examples can be found on the EU privacy website. |
| United Kingdom & Ireland |
| The UK Data Protection Act 1998 |
| The Irish Data Protection Acts 1998 and 2003 |
| Article 8 of the European Convention on Human Rights |
| The UK Regulation of Investigatory Powers Act 2000 |
| Relevant Case Law |
| Employers' Data Protection Code of Practice |
| Model Contracts for Data Exports |
| The necessary content of Privacy Policies |
| The Privacy and Electronic Communications (EC Directive) Regulations 2003 |
| The UK Interception of Communications (Lawful Business Practice) Regulations 2000 |
| The UK Anti-Terrorism, Crime & Security Act 2001 |
| The UK Privacy & Electronic Communications (EC Directive) Regulations 2003 |

AA.3.7.0 Toxic Spill of Personally Identifiable Information (PII)

When personally identifiable information (PII) spills, the problems are potentially magnitudes greater than simple PII loss. PII loss includes misplacement, damage, inability to access and use, destruction, or erasure. Spills include information leaked, reused against authorization, reused violating published acquisition parameters, duplicated, or stolen with loss. Legislation and compliance laws do little to prevent loss and spills but say a lot about assessing the ultimate toxicity of these events PII loss is an internal problem. PII spills are an external problem. Internal problems incur business expenses but external problems involve all that and more. Externals problems entail compliance, legal, remediation, and reparations. Data spills can be toxic and often are.

There is also the question of ownership or custodianship. When the information belongs solely to the organization, any damage through spill or loss goes against the organization. When the information represents other people, other organizations, others' trade secrets, or is PII, then the damage might go against your own organization and there is also likely to be a spillover of effects on these others that will likely come back as a responsibility to your own organization too. The legality of ownership of PII is not clear so the responsibility is often dropped.

The thought of a data spill—bits and characters all over the place—seems like a unreasonable joke at first. However, with the thought that all that data represents business methods, trade secrets, intangible property, and PII, that this data represents some 95% of the value of a typical organization, the joke ends. A data spill is not a joke. It is perhaps the most serious complication in business today, and it really is toxic.

The PII toxicity is a measure of demonstrable spillage and the actual damage or potential for damage. Other Digital-Doors whitepapers blur the line for exposure because aggregation, inference, and interaction expands the damage caused by all types and categories of PII and even other categories of information that do not specifically indentify or force reidentifiation directly. Statistical and inferential methods are very powerful. As such, PII should be presumed to be highly toxic. Also consider its half-life decay.

There is the issue of scope. How much data about a particular individual was spilled? How many individuals were compromised? How pertinent is the information? Was it social security numbers or only internal account numbers? How useful is this information for compromising the source of the PII or assets associated with PII? Could this PII be used in other unconnected activities to create fraudulent checks, credit card accounts, or house loans? Could this information be extended—like a stolen email list—to contact related people using the credentials from the exposed individuals?

Context adds much the concept of the information. It is not only about the amount or density of the information, the category of information, it is also about the where it came from and how it is used. Subtleties have profound impact. Consider a list of library loans. Consider now a list of videos borrowed or bought from the movie store. Consider next a list of videos bought from the adult movie store. Each source raises the credentials about the accuracy of the info and its specificity.

Instead, consider medical information from an Internet survey. Consider now medical information from an employer's files. Consider next medical information from a cancer specialist. Each source raises the credentials about the accuracy of the info and its specificity.

Data spills are specifically not about the loss of a business asset but rather about the contamination peripheral people and resources and organizations. Shareholder lawsuits against executives defocus business and chill people. The legal and criminal ramifications could dwarf the original economic benefits, much like the uses of asbestos, PCB, and radioactive enrichment have created toxic sites the world over.

AA.3.8.0 From Aggregation, Inference, Reidentification to Anonymity

Medical studies published in journals often contain aggregations of participating patient information. The unspoken presumption or even specific designation in the participant agreements is that compiled statistics protect the privacy of individual patients. While this is true generally, it is not true specifically. As a result, anonymity fails to provide privacy protection, both specifically to these medical studies, and generally to online Internet activity and integrated workflows. The implications are far darker because the reidentification of the participants is very likely. Although the information as published does not undermine the privacy of these patients, other available public or even private information within the insurance network, hospital systems, or physician practice can be used to statistically reindentify individuals and exploit personally identifiable information (PII). The reindentification process advances from this presumptive anonymity to specific reidentified patient names. The technology of inference, both human intelligence and statistical, are powerful tools used to expose the privacy of patients, in spite of the protections taken, the redaction of sensitive information, the security of patient records, other fair harbor efforts under HIPAA, and even more presumably stringent containment under the study procedures.

A journal article exposes a medical specialty, a medical practice, the umbrella organizations funding the activities, the physicians and other named facilitators to the study, and a specific range of medical cases. Also, this other information can be inferred specifically if not generally from the study details: the patient cachement area, the age range, the patient race and cultural backgrounds, and the outcomes. If the study includes drug trials, this useful information can be matched against chain-pharmacy databases. Pharmacy records are available for payment, incentive, and performance monitoring. Even body part photographs are identifiable through social networks, as in Exploitation of Anything to Generate PII.

Information can be bought, exposed, or inferred. Specifically, access to patient lists, hospital service lists by patient, any information matching patients to conditions, diagnoses, patients to service dates, patient admission information, patient prescriptions, patient demographics, and per patient PII is the fodder for reindentification. Many studies provide patients with services, freebees, and even payments. Accounting records for these activities represent PII when organized by patient, but when organized by study, by expense accounts, or other normally obtainable business aggregations are not perceived at risk. They are often exposed in audits, FCC filings, and other documentation that is published, subject to less stringent controls, or available through extreme measures. Aggregation of disparate sources compromises PII.

Population PII is available from many sources. Of course, this is a huge set, but techniques of inference winnow out the chaff to expose exacting or probable sets of participants. In many cases, as explained in other papers, the statistics of inclusion versus exclusion are merely a monetary issue. Percentage risk factors can be applied for business activities, such as redlining an individual as a medically bad loan risk unless the loan is more expensively collaterized by assets or loan insurance. This is one of the reasons why genetic databanks and medical expense profiling is a hot issue (see the Genetic Information Nondiscrimination Act of 2008) because it creates more risk pools to the detriment of many individuals.

The inferential information from the actual journal article, lists of patients, doctors, services, PII databanks, and other sources aggregates into a master PII list. Broad swaths of people are excluded by demographic non-matches. Each attribute is described and used to exclude more and more people. While a study is likely to represent tens to hundreds of patients, the set exclusions could be as large as thousands. That might be sufficient to expose study participants. Additional lists, pretext calls to providers, or even direct calls to participating patients are subtle ways to validate or deny study participation. Legality might not be an issue at all, as offshore service brokers shield liability or are not practical to prosecute. Furthermore, use of PII by an insurance company or other owner does not violate HIPAA and other compliance regulations which do not prohibit the reuse of this information, only the exposure of it to undermine privacy. Organizations seeking the participant PII, the unrelenting effort often pinpoint exactly the original patients to their own detriment and exposure. Aggregation is no shield for anonymity.

AA.39.0 Control Personally Identifiable Information (PII) Through Granular Data Control User identifiers—indexes or keys—get the bad rap of being personally identifiable information (PII) that exposes security and privacy risks. This is not precisely true. It is the legacy that creates this risk through a generation of mediocre security and the lack of understanding the ramifications of data capture, distribution, and sharing. There are ways to create indexes that are not PII, and perhaps even universal identifiers that are not PII if referential information and other PII are protected through granular protection.

User identifiers are common indexes or keys used to find a specific record or subset of records. Common identifiers include name, addresses, telephone number, social security number (SSN), account numbers, and other values. User identifiers are not personally identifiable information that breaches privacy per se because they often lack uniqueness, although an address or telephone number might represent an immediate security risk because of its specificity. External facilities to lookup or perform a reverse lookup to match these index or key values to PII enhances immediate risk because the measure of uniqueness is increased. Most identifiers are quasi-random numbers or non-unique values. Because these do not uniquely identify an individual, they do not create as much risk as more precise and unique ones, like SSN, which are normally a one-for-one match to a unique individual. Numbers map to metadata, and it is this metadata that exposes actual PII. However, names are statistically personally identifiable even for large sets of surnames, like Ng, Smith, or Wu, because there are ways to increase the measure of uniqueness even for large sets.

However, in and of itself, a SSN and other similar serialized or generated identifiers really contain no personally identifiable information. They are content and context neutral. The information that they reference or link into actually provides the security risk. This metadata creates the risk. The identifier itself is not the risk, only the linked data represents risks. Widespread use of SSN for unanticipated uses has created easily accessible references, and pragmatically exposes SSN as PII, but only because of history.

In order words, if SSN could not be used as a search entry point for personal information about a specific person, it would not be a risk factor. It is only when the referential information is readily available and not locked down that the identifier compromises security and privacy. If all the public databases lacked references to SSN and all the private databases were secured properly, SSN would not represent a risk. However, given its legacy and the widespread misuse, it is now and will likely remain a damaged index value. Account numbers for bank accounts, brokerage accounts, credit cards, debit cards, and gift cards at present do not represent a PII risk. That would change if readily-accessible references cross-match accounts and people.

If user identifiers are generated mathematically from damaged identifier values, like SSN, they can be regenerated easily from known SSNs, and these new identifiers are damaged at first use. The ASTM (formerly known as the American Society for Testing and Materials) UHID (universal healthcare ID) is just such an example of a flawed privacy identifier because it is a transformation of SSN. Indexes generated as hashes from names, masked SSN and zipcode, or other exacting values are likewise flawed. Any surrogate keys present complications as they represent a transformation from existing process and eventually these surrogates become the same PII compromise for which the surrogates were designed to avoid.

If user identifiers are generated from unique biometric factors, it should be assumed that the user identifier can be reversed to expose the PII. Even salted generation does not guarantee uniqueness or protection against reverse engineering the index. The value of generation from unique biometric factors is perceived as means to prevent repudiation because the person and index are uniquely bound together. However, such schemes saddle this identifier literally with a built-in PII limitation. DNA—when it becomes fast and cheap to map—presents most of the same problems of user identifiers and PII but is also subject to data diddling. DNA is flawed surrogate identifier.

The simplest way to create a PII-safe index is to generate a unique random key for assignment as a system-specific index and relate this to the system-specific PII. Serialized keys are not random. System-specific PII must be secured by encryption or other comparable security methods. Any association between the index and the related information must be rigorously protected. In other words, the index is only an index and cannot assume content or context value. It is best if it is not displayed. This is a significant limitation because it means that account numbers, user health identifiers, and the like can be used for lookup, quick reference, or substitution in whole or part of the other PII. Alternatively, if the other PII is controlled through granular content control, then the identifier can be used as a normal index because the linkage between the index and the data is protected.

AA.4.0.0 Classification and Categorization:
AA.4.1.0 Multiple Hierarchical Tagging and Data Extraction Data security has been traditionally based on the metaphor of perimeter-based defenses. This is a historical fact. Castle and moats, locked strong rooms, vanadium steel vaults, and mathematical encryption have protected money, assets, and information well until this age of networks, the Internet, and distributed processes. However, as identity theft, fraud, and other swindles have struck the bottom line such protection at the edge is no longer sufficient. The paradigm shift herein is that data security must be internal in order to travel with the data throughout all distributed processes even over networks to thwart data reuse, data repurposing, and replication, and reformation. DigitalDoors enables this dispersive subtractive technology in order to enable granularized content security.

One of the extraordinary data security risks is that data collected for a specific purpose today is distributed as a report and then recycled for new purposes tomorrow, purposes that are unanticipated and even contrary with the original data collection and edge security. Formally, this risk is defined by how identification is used to repurpose data resources in ways different from or incompatible to prior representations, thus requiring flexible and overlapping identification systems to reflect that unlimited risk.

Edge security, such as encryption, fails when this data is released in clear form or when the encrypted data is released with the keys as part of the distributed operation. Data is often decrypted, consolidated, and reported in transformational formats for distribution regardless of ownership, stewardship, or the long view security. Clear form is necessary for the purpose of reporting but is now exploitable by others; distribution of encrypted data (complete or even partial) for processing requires deliver of the keys, but the resulting decrypted clear form is also exploitable by others.

Specifically to combat such security realizations—it is really no longer a credible risk but rather an actualization or potentialization—DigitalDoors recognizes the content of items. DigitalDoors classifies those items in terms of absolute security risk directly or indirectly through aggregation and inference. DigitalDoors assigns multiple tiers of in-channel or out-of-channel tags describing the content and purpose of the classified items. DigitalDoors extracts those items too risky to travel within the data stream. Finally, DigitalDoors reconstitutes the data stream, in whole or in part, as necessary, to enable data processing subject to a defenses-in-depth identification and authorization.

So that we can explain why this subtractive internalized security works, we present you with a deceptively simple sample that has little content but packs a lot of context and concept into this two-sentence paragraph. The meaning and importance of this sample is contingent on external data aggregation, inference, or á prioré knowledge. In other words, this is a sample with aggregation or inference exploitation value through actualization, realization, and potentialization. What might appear superfluous is realistically exploitable by others. The sample:

Mr. Robert Jones went ballistic, launching the paper stapler as a missile for a direct hit, because Ms. Jane Doe planned to submarine his proposal. I did not involve myself since it's not this dog's fight This sample demonstrates the functional difficulty in proper tagging because it contains names with both clean and dirty words within 1) a defined content, but 2) a mixed context, 3) an ambiguous concept, and 4) an unknown applicability. Tagging, the assignment of contextual information tags to a defined information item, is applied to ascertain what information items should be extracted from the information stream in order to apply security or protect privacy. Tagging is neither obviously definitive nor linear. Recognition of items alone does not convey the necessity of redaction (extraction of information items) or assignment of a classification. A single tagging, such as the sensitivity level [confidential], is insufficient because it is lacks directives for its confidentiality with functional security reference as to what group of people and for what purpose, and for how long. Also, the very inclusion of the tag as an annotation alters the sensitivity of the sample itself because it adds more information. A tag or multitier tags are in fact metatags, a subset of metadata, and metadata is well-known for in-channel and out-of-channel security leakage. A sufficient sensitivity tagging contains the out-of-channel sensitivity level, compartment, category of item type; these are additionally extended by metatagging with user, usage, mission requirements, time-sensitivity, and other dimensions of information, as well as distributed in unlimited multiples to constrain the unwarranted inclusion of contextual annotations.

Clearly, "Robert Jones" and "Jane Doe" are categorically names and need to be tagged—but at what sensitivity level? Should they be unremarkable, [top secret], or [sensitive but unclassified]? It is not obvious to tag them with multiple levels of sensitivity, as DigitalDoors does, because the functions for discerning distribution and purpose are not in place for most user requirements and are alien to the existing computerized markup technology and presumption of the single assignment. The applicability of free-form documents with database field assignment and application of non-database hierarchical metatagging is neither obvious nor well-understood in the current state of the art. We are applying data analysis technology to a security containment operation, a new concept both for data and for security. You might ask what data analysis and semiotic meaning has in common with security; the answer is everything for subtractive internalized security where content, context, concept, and applicability define the actualization, realization, and potentialization for the data.

The sample contains contraction titles of "Mr." and "Ms." but could easily contain "Captain" or "General" alternately indicating a military context. "Mr." and "Ms." could establish a military content, but not necessarily or evidently so. The sample also contains "ballistic missile submarine" although dispersed throughout the single sample sentence in the correct and usual order of the words when describing [top secret] military equipment. However, the contextual usage is clearly different, as DigitalDoors discovers. The content is clear but ambiguous. The context is not about activity on the seas but conference room antics. The concept is not about military-sensitive equipment but rather boorish interpersonal behavior.

First, DigitalDoors tags the names categorically as names. Second, DigitalDoors assesses "Mr." and "Ms." categorically as titles with EEOC-contextual meaning, that is, specifically in this case a woman physically assaulted by a man. Third, DigitalDoors assesses those dirty words separately or the dirty word phrase "ballistic missile submarine" occurs within the sample document, but more specifically within a single sentence. Fourth, DigitalDoors assesses that these dirty words are non-contiguous and unrelated. The differentiation between document, paragraph, and sentence range, and the aspect of contiguity is important for tagging applicability. There is no obvious or overt military or agency context. In addition, the statistical analysis of "Mr." versus "Captain" or even case-specific "captain" within the contextual sample also is important for applicability. In some cases, the statistical preponderance of clean versus dirty words changes the sensitivity level (and other multiple hierarchy tagging instances).

The two sentences in the sample are disjoint. The content and context are at odds and seem unrelated. That should really be a distinct clue of exploitable external information aggregation and semiotic value. Language and dialect also pertain to the assignment of tags because specific words and phrases often convey context- or concept-specific meaning that alters the applicability of the information. Specifically, the included cliché "it's not this dog's fight" contains no dirty words but likely establishes a indirect reference to West Point Military Academy because the speaker was likely trained there or associated extensively with someone trained there. This is a common phrase in WPMA classroom case-study methods. This specific external reference is important for information aggregation and retagging, as discussed later in this paper. Nevertheless, the analytical reader can see the semiotic value and, as is said, connect the dots.

Sensitivity-level classification in neither simple nor linear. The limitations of current DoD specification presume the simplicity and linearity of tagging. As such, the stretch to non-linear tagging is not obvious since it breaks with cultural conventions and existing technical conventions. It is technically complex with no direct transition to implement because the implementation combines unconstrained information formats with technology that is most often constrained by single field assignments with the expanded requirement to apply an unlimited hierarchy. Support for unlimited tags and unlimited dimensions of tags is a shift from current data tagging concepts and application of most data processing technologies where assignment is traditionally one item from an available lookup list of items. Additionally, new legislation by way of executive orders and congressional bills have altered the landscape for information sharing and agency security by creating conflicting tension of what must be shared and what must not be divulged. Current specification defends the tagging like this:

<TS>Mr. Robert Jones went ballistic, launching the paper stapler as a missile for a direct hit, because Ms. Jane Doe planned to submarine his proposal. I did not involve myself since it's not this dog's fight.

However, new requirements drive the tagging in terms of sensitivity level and compartments to be something like this, a format not even obvious in current implementations:

<SBU NATO, TS PERSONNEL, U FBI, STONEGHOST ALL>Mr. Robert Jones went ballistic, launching the paper stapler as a missile for a direct hit, because Ms. Jane Doe planned to submarine his proposal. I did not involve myself since it's not this dog's fight.

This demonstrates two-dimensional tagging at best, although the two-dimensional-format tag is repeated in four instances. A fundamental paradigm shift is required to redress mixed context and applicability. First, DigitalDoors tags are multidimensional and hierarchical, potentially without limit. Second, distribution of the sample with tagging annotation is specific and unlimited. In other words, the sample could be tagged like this:

<SBU NATO until 2006 Mar. 22 relating to Project 13467 re: cancellation, TS PERSONNEL for all records relating to Robert Jones only, U FBI for criminal arrests reports, STONEGHOST ALL irrelevant>Mr. Robert Jones went ballistic, launching the paper stapler as a missile for a direct hit, because Ms. Jane Doe planned to submarine his proposal. I did not involve myself since it's not this dog's fight.

In addition, distribution of the tagging sample is potentially without limit, and the inclusion of the complete hierarchical tagging is inadvisable since it contains contextually unwarranted annotations. Therefore, DigitalDoors controls the distribution to dispersed storage with a controlled redaction and tagging annotation. Five examples from the unlimited tear-line possibilities include:

<SBU NATO until 2006 Mar. 22 relating to Project 13467 re: cancellation>Mr. Robert Jones went ballistic, launching the paper stapler as a missile for a direct hit, because Ms. Jane Doe planned to submarine his proposal. I did not involve myself since it's not this dog's fight.

<TS PERSONNEL for all records relating to Robert Jones only>Mr. Robert Jones went ballistic, launching the paper stapler as a missile for a direct hit, because Ms. Jane Doe planned to submarine his proposal. I did not involve myself since it's not this dog's fight.

<U FBI for criminal arrests reports, STONEGHOST ALL irrelevant>Mr. Robert Jones went ballistic, launching the paper stapler as a missile for a direct hit, because <removed> planned to submarine his proposal. I did not involve myself since it's not this dog's fight.

<STONEGHOST ALL irrelevant>I did not involve myself since it's not this dog's fight. [redacted name] went ballistic, launching the paper stapler as a missile for a direct hit, because [redacted name] planned to submarine his proposal. I did not involve myself since it's not this dog's fight.

Notice that the final example contains no imbedded tagging annotation to minimize source and method information. In addition, tagging and redaction does not address the issues of data mining, information aggregation, and inference when documents or single informational items are combined together from multiple sources. Combinations from within even single sensitivity levels can alter (increase) the resulting sensitivity level. A sustained multiple hierarchy of tags would allow for future reclassification when information is combined. The notional shift from fixed single sensitivity level tags or sensitivity level/compartment tags to on-the-fly reassessment and retagging is not obvious; it presumes interdisciplinary knowledge—of semiotics, of information theory of statistics and combinatorics, of Bayesian inference, of DoD policy. This notional shift also requires an action plan encompassing the willingness to break the existing cultural methods of information sharing, ingrained cultural attitudes toward intramural agency security, perimeter-based defenses for information security, and privacy enforced by third-party custody.

For example, even when two intramural documents are combined—herein when the first sentence in the original sample is combined with comment in the form of the West Point cliché—the context is no longer just any conference room but specifically a military one. You can correctly conclude that two [unclassified] items potentially infer a [sensitive but unclassified], [secret], or even higher combination. DigitalDoors retains the multiple hierarchical tagging for reassessment and reapplication of the tags creating new scenarios on-the-fly.

Finally, in addition, the assignment of tagging is constrained by applicability. Although it is conceivable to generate many or even all of the possible permutations of these multiple hierarchical tags, multiple redaction, and multiple storage dispersal, information overload and effective utilization encourage minimal distribution. In addition, this technology retains the ability to call-back information and put the cat back into the bag, so to speak, by applying DigitalDoors reconstitution to minimize the reuse, repurposing, and redistribution of data stores of security-sensitive or privacy-privileged personal data. Whereas, one tag in one dimension does not meet requirements even today nor with a full dump of tags within a multiple hierarchy either, DigitalDoors creates subsets on the fly as dictated by configuration and needs subject to content, contexts, concepts, and purpose. This tagging methodology is based on a multitier hierarchical overlapping tag structure. Formally, as described, this threat is defined by how identification is used to repurpose resources in ways different from or incompatible to prior representations, thus requiring flexible and overlapping identification systems. This shifts the traditional security from the broken perimeter metaphor to the subtractive internalized security paradigm.

AA 4.2.0 Commonality of Data: Categorization, a Multitier Hierarchical Overlapping Tag Structure.

The requirements within an ecosystem to search, categorize, security, and share data have different requirements to be sure, but all have a common base. The base is categorization, preferably implemented as a multitier hierarchical overlapping tag structure. The reason for this commonality is that search, security, sharing all require an assessment of the meaning of the data, best performed with a categorization of obvious, potential, and hidden value.

In terms of search, you want to establish a context for the information you want, and the context is usually ad hoc when Internet search engines are used. However, more effective search tools establish parameters of interest in the form of categories to isolate and focus the search. In some cases, you want to establish a search specifically for content that is new and does not match existing content to widen the knowledge base. In other situations, search overlaps existing content in order to strengthen the deep and detail of the information are assert integrity, accuracy, and veracity. Success with search to increase width or strength depth is driven by understanding of the taxonomy of relevant information.

Effective security is no longer possible unless the data is fully understood. This includes content, context, and concept so as to anticipate the potential to aggregate, infer, and interact with the data when security fails to contain it. It is not enough to identify sensitive selections and personally identifiable information (PII), segregate specifically that, and preclude access to the rest of the data columns, specific rows, or documents and data streams of apparently lesser value. This all or nothing security precludes operational workflow, the reason in the first place that the data was acquired, and to a fair degree the security is good but you cannot do anything. This all or nothing security misses the value of data with apparently lesser value when it is pooled with other like sources or public databases. It often is not so depersonalized. Separation of only safe-harbor categories of data does not prevent a statistical re-assemblage of the sensitive components or PII. Just because a designation of blood group, physician, and illness seems generic or aggregated beyond useful recognition does not preclude the likely inferential re-identification through other data sources. Interaction can expose sensitive components or PII even when it is carefully released into a secure data processing operation because reports are generated that can re-include what should be secured or be passed through waterfall of processes that leak results outside a contained environment. Another risk of interaction occurs with distributed processes, SaaS, and SOA because the new concept engenders a continuous processing cycle where data literally might never be at rest; the PII, even in small pieces at any instance, still aggregates with the potential for leakage over longer periods of exposure.

The DigitalDoors paradigm addresses all aspects of data categorization, search, security, and sharing within a commonality of granular data control. While these different functions have different requirements, they nonetheless share a common basis.

AA.4.3.0 Categorization Structure Tagging, Risk Measurement and Context

The measurement of risk begins with assessment of the value of information, both structured, unstructured, anything in between, and all explicitly or implicitly tagged data. That notion that structured data is implicitly tagged with the inherent schema and that tagged data is structured by the tagging is only partially true. Databases are structured by tables, rows (indexes), relationships, and fields but only "tagged" specifically for an express purpose. The applied data structure is but one possibility of many that imparts a concept and context to the data; it is easily transformed for reuse and repurpose. Although database design is often generic enough to make data mining possible, the veridical value of the database will not be realized until the aggregation, inference, and interaction is fully explored. Likewise, the veridical value of the unstructured document will not be realized without tagging to explore the obvious, hidden, and potential value within the information or transformation into a structured format or processing within any application that matches to unstated data structure.

Structure and tagging are not synonyms, functional equivalencies, nor analogs. Structure provides accessibility within the specific construct of a purpose or process. Tagging provides content-related and contextual meaning as well as the possibility for accessibility, as with XML. Structure does not replace tagging, nor does tagging replace structure. They coexist independently for different reasons. Structure is likely just the application of a single instance of categorization.

The dependencies and interdependencies, relationships (known and hidden), between data and the structure appear only within a context and concept. Meaning is contextual at all times, and although we try to categorize data in databases, mark content with XML, or create complex hierarchies with tags, each view is just that, a view among many possible. Consider for example the carton of eggs seen in Security for the Information Matrix wherein we showed that the information container characterizes the content even when separated. However, context and concept play a role as well.

As a result, there is a problem with the definitions of structured and unstructured documents. See Degrees of Structure for more information. Premise of structure in field or metadata tags define range of data elements and provide directed input in a defined process. Such a structure provides flexibility for redirecting the input into another compatible process. Clearly, structure is purpose-driven and defined vis-à-vis the process. There can be other purposes, those known by you, antithetical to you, and unknown to you.

Nevertheless, that does not mean that your structure is wrong, just incomplete in that other structures can augment the preexisting structure. Unstructured documents can also be augmented by structures. Structures can overlap or coexist without limit. Furthermore, software, style sheets, queries convert between structured and tagged and visa-versa with a mapping. Although a database structure is limiting and inherently vulnerable, it hints at aggregation, inference, and interaction. Structure and flexible tagging without limits drive the categorical imperative to explore the full meaning, potential, risk, and utility through information sharing.

AA.4.4.0 Data and Metadata Granularity for Decomposition to Break Context

Metadata contains more risk than plain text or simple content alone because the metadata adds attributes to the basic data and furthermore metadata can include all manner of things that are not pertinent to that basic data. Although it is generally true that data with imbedded or linked metadata represents a greater likelihood of security risk, it is also important to realize that no simple data item, data file, or even a flat data set is independent from implicit metadata.

Data about data—the definition of metadata—is inherent in every reality of data. Data does not exist in a vacuum. Each data item is intended for some purpose, and that purpose adds to the conceptual meaning of the data. A flat file has a binary encoding, a language designation, and perhaps even an application this is automatically invoked to open that file. That is metadata, whether incorporated into the file itself, vaguely understood to map to the file by convention or configuration, or whether explicit system settings and processes presume and apply that metadata as a fact of operations. Therefore, the absence of explicit metadata does not preclude the existence of implicit metadata. Implicit and explicit metadata both imparts security risk. It does not matter if you recognize the implicit metadata or not; it is still a risk and still a responsibility to recognize and mitigate this risk.

Metadata is not a file storage format, as most people think when they classify XML as metadata. XML is really a protocol expressed within a file format that most often contains metadata, but is not metadata specifically. Metadata is useful as a structure for the simplification of process, the codification of information relationships, and a mixed packaging system that combines content, context, and concept. A database is a metadata structure just like any MS Office document or XML package. Metadata does not per se include or reference a structural template, a style sheet, or a transformation, but the legitimate reality is that metadata is at risk because of that implicit or explicit linkage. Explicit references impart risk, but so implicit ones too, and the implicit are somewhat more dangerous because they are so often missed.

A template, a macro, or a transformation that acts on a metadata file adds risk because it binds metadata to data. Even the MS Word normal.dot contains toolbar buttons, add-in code, macros, and implicit formats that alter the concept of any seemingly innocuous document. Template changes with the application of an alternative .dot template file, an XML style sheet, or dynamic .css tools that reflow the presentation of the content do indeed alter meaning. As funny as Punctuation: Context alters Concept is, realize that presentation change can be manipulated by document templates and style sheets resulting in even subtle alterations that dramatically effect meaning. When metadata results in more profound workflow variations, the output and thus the risk of information alone as part of a process or product or service output is even greater. The transformation is not separate from the content, but it needs to be separated from it in any effort to secure content. This explains the risk factors from data format, structure, and other metadata.

Consider how grammar, spell-checking, syntax, and formatting can "correct" a document to change meaning. Any such inadvertent corrections can be explicitly exploited. Consider how a template can infect an innocuous document with new meaning, functions and features and even virus. DigitalDoors makes light of some situations where punctuation, capitalization, and word spacing altered meaning dramatically. While this is not the norm, the metadata infrastructure is part of the metadata universe, and both the metadata infrastructure and the metadata itself impart security risk.

The template need not be the only implicit risk. When metadata 'touches' other metadata, a macro virus or other embedded feature can spread infection. Such a touch can clone or insert templates, styles, interpretations, macro code, entire embedded baggage, even the file version information can assert source, ownership, methods for production, time frames, and distribute security risks. The issue is that not all macros include a virus or even bad, but the metadata infrastructure open venues for risk that cannot be secured because the context for the metadata is open ended and the social, cultural, and functional references of the metadata on the data content represent complex semiotic expansion, as described in Metadata in Pictures.

Metadata does not exist only as a secondary byproduct of process and purpose. In many cases, metadata is specifically created to enhance or enable complex data interactions. Databases are of course complex structures of metadata. The table, row, and columns are defined by metadata. Keys, indexes, and relationships, joins, and views are also metadata. Furthermore, SQL schemas, clustering, and partitioning are all forms of association-related info through contextual relationship metadata. These types of metadata are established before the fact to set the usage and purpose for complex data, but also are created as the performance optimization requirements or business intelligence mining distinguishes additional utility in the core data. It is important to recognize that this metadata creates both implicit and explicit risk that transcends the basic content of the tabular data. Metadata, particularly in database structures, defines the context of purpose, utility, and applicability that is not clear from the context alone.

Digital signatures on macros and documents do not vet the integrity of the metadata. A macro could have been previously infected or recently infected a document. A digital signature designates security on a narrow range and even that narrow range is subject to internal undermining. Furthermore, a digitally signed document is no guarantee of the quality of the digital signature or that it has not been compromised. The chain-of-custody is linear process that is reliant on prior events in the chain. There is limited guarantee of such security.

The only legitimate method to secure the metadata infrastructure, style sheets and templates that define the metadata, composite metadata files, and files with content but stripped of actual metadata but acted on by implicit or explicit metadata relationships is to break the context. Any implicit or explicit metadata should be decomposed into parts small enough to erase any evidence of relationship and utility. Redact the content (data) and corresponding metadata to break any connection between them. The parts can be stored in separate files and even widely dispersed. It is possible to create parts so small that they lose any integrity of meaning or purpose, but this is not always necessary. Although the parts might be small enough so that meaning and relationship to the whole is disruptive, be aware that the collection of whole provides context of its own, and therefore the impetus for the disruption and dispersion. This enables security through formlessness, and it is as effective for compound metadata as any other type of content.

Metadata must be decomposed into elemental data streams where format matches content, for format is singular and uniquely describes a single contextual purpose, and where content represents a singular context. In other words, when metadata describes the context for content, a structure specific enough to infer purpose and utility, and the descriptive metadata is still bound to the data, formlessness is not sufficient for security. The alternative—which is incomplete formlessness—is multiple renderings that still retain semantic meaning therefore useful for aggregation, inference, or interaction.

AA.4.5.0 In-Channel and Out-of-Channel Tags

The placement or visual inclusion of tags is purely a procedural issue. Although there are differences, these are immaterial with one exception defined below. Examples of tagging for the original content This is top secret include:

[TS] This is top secret.
<comment=TS>This is top secret.
Tag file: [TS]→This is top secret with actual separate data file: This is top secret.

Too many other styles exist to list including database and linked references. One style is easily transformed into any other. In effect, the format of tags is a metadata issue and the actual storage location is a procedural issue. Reformat and changing the presentation of a tag is a metadata transformation often performed with a style sheet. Albeit, there are content issues whether tags are in-channel or hidden in out-of-channel overlays, nevertheless, presentation controls can relay the same results regardless of the initial or transformed style.

Style 1 betrays more information that original because it includes an assessment in stream. Style 2 also betrays more information but it is accessible only under certain displays or with a source view. Style 3 makes a physical abstraction between the tagging and the content requiring an explicit effort to simultaneously show both pieces of information.

Controlled presentation with overlay or integration or filtered list display could still reveal the tagging or explicitly excluded from the display. It becomes a matter of control or deliver of raw data streams to processes or the users. Ultimately the issue can be reduced to how information is released under granular content control and how the control is varied for content, context, and concept.

The sole exception to in-channel and out-of-channel tagging is that out-of-channel supports a depth a range of tags including overlaps that is not easily represented in-channel. It is not flexible to show that 'This is top secret' is [TS] under certain scenarios but [U] under others, or that secret is word that in general should not be exposed for its connotations. Multitier tagging is easier to support out-of-channel where rules can be assessed and applied dynamically.

AA.4.6.0 Capitalization is Content-, Context-, and Concept-Driven

Capitalization classification accuracy has direct applicability for risk measurement, security application, knowledge management, discovery, and information sharing. Classification changes as the context and concepts changes, and the failure to accept and support this undermines risk management. Risk management (and subsequent security application) requires completeness and flexibility in classification, including classification driven by capitalization and the meaning variability driven by word and phrase case sensitivity. All capitalization, tagging, and classification is contingent on content, context, and concept. Results are neither static nor absolute, but color the implementation of classification and tagging.

Note that capitalization does not drive classification or provide any primary value; it merely augments clues to yield more accurate classification. Capitalization is necessary but not sufficient to drive classification. Capitalization is a modifier but does not provide a standalone meaning. Capitalization is neither a constant, a fixture, a given, nor even necessarily accurate within a data stream. Capitalization can be random, erroneous, incidental, applied for haphazard purposes, or used to game against the system. However, capitalization adds to the effectiveness when automating classification.

Capitalization is content-, context-, and concept-driven. It both reduces and increases classification ambiguity. Traditional classification methods do not reflect this complication because they are lookup-driven within a limited contextually-driven expectation. The differentiation that capitalization can add into classification is blurred by position, usage, and randomness. While often not obvious, it is very important to apply exact classification to acronyms, words, and phrases. While manual classification is generally very effective, it is not efficient and requires highly trained people with a special aptitude for conceptualization. On the other hand, automated classification is essential to create efficiency, to support classification required in high-volume data flows, and to reflect other requirements including validation, authentication, and reproducibility. Capitalization is one of the clues useful to enabling automation in classification.

The problem with automated classification is that it is not simple and generally not accurate. Accuracy is increased when classification transcends content list matching and includes semantic factors found within context and concept. In other words, intent and purpose drives classification too. Successful semantic capitalization classification is not driven by white list, black list, or gray list categorization. That fails miserably. Capitalization is often arbitrary, incorrect, or just applied for convenience. Letterhead, advertising material, documentation, and slides often arbitrarily apply capitalization. Sometimes, capitalization can be used to play against the system, for example to thwart spam and Bayesian filters. However, dictionary categorization when combined with semantic parsing rules and pattern matching significantly increases the accuracy and enables full automation. DigitalDoors implements fully automated semantic capitalization classification with a level of accuracy approaching 100%. DigitalDoors supports inline and post-production manual examination with overriding revision options and reporting.

Most languages, and in particular all European languages, apply capitalization as semantic clues to meaning. The statistically most common capitalization is driven by punctuation rules, specifically, the initial letter in a heading, title, new paragraph, new sentence, line, bullet point, caption, and footnote. This is a telltale of a contextual idea demarcation. The second most common application of capitalization is for distinction of proper nouns from common words. Proper nouns are represented by names, places, and specialized things. For example, Jon is a name, but jon is a common word. However, capitalization is not distinctive because semantic rules override capitalization and blur the answer.

Furthermore, even meaning is fuzzy, and this has direct implications on correct classification. When jon is a common word, it can be a functional place containing multiple toilets, a single toilet, a customer, or a boat. JON could be an acronym, just a capitalization error, or a functional convenience. The ambiguous initial placement and capitalization of what can be either a proper noun or common word as part of a heading, new paragraph, new sentence, line, bullet point, caption, and footnote is resolved only by context.

Dictionary matching of acronyms, words, and phrases provides an unclear range of classification matches. In many cases, as with SQL, matching is not configured as case-sensitive, or even case-aware. There can be and often are multiple matches. Elsewhere, in DigitalDoors whitepapers on filters and sieves, we have shown this ambiguity in matching even simple names. For example, reconsider bin Laden as a family name, a terrorist, an industrialist, a reference to any number of legitimate businesses, a clan, a number of different families, a particular person, an antecedent in a complex narrative, and a reference to specific history events. Capitalization does not differentiate the meaning or the classification, whereas only semantic context and concept do.

Frankly, DigitalDoors does not want to just minimize the range of potential matches. Sometimes a single best classification is necessary, other times, multiple possible, extended and expanded, overlapping, and potential classifications are necessary for the knowledge management ecosystem. DigitalDoors actually wants to expand this range to the extreme because it increases the accuracy in risk measurement by recognizing the potential for oversights due in large measure to classification bias. Multiple hierarchical overlapping categorization enables granular risk measurement and assessment for repurposed value beyond initial and obvious intent. This is important in the extreme for balancing risks of exposure and downstream information.

The failure to recognize and allow for the full potential in semantic meaning creates security risks within workflow and information sharing. If these additional potential meanings are not identified with initial accuracy, then information that should not be shared is not correctly controlled in secondary downstream sharing or in ownership chaining enabled through database workflow. Security is context-specific. Likewise, classification is context-specific. Context isn't always specific, and it can change, and often does. Situational change alters classification. Time generally causes information to decay, but new understanding can assert new meaning and value to old information too. Both security and classification change as the context changes, and the failure to accept this and support this means that risk management requires completeness and flexibility in classification, including classification driven by capitalization and the meaning variability driven by capitalization.

AA.4.6.1 Categorization Specialization

Categorization specialization usually occurs when there are multiple dictionary or regular expression matches with multiple possible or conflicting classifications. Capitalization is one automated method to minimize the number of potential categories and establish an unambiguous classification. There are five categories of capitalization categorization:

TABLE

| categories of capitalization |
| --- |
| Exact match |
| All L/C |
| All U/ |
| Regular case application |
| Mixed case |

These are implemented as part of all the DigitalDoors dictionaries, as acronyms, words, and phrases. It is also implemented as part of the inherited dictionaries, such as My Word List, My Group List, and categories and policies. The same rules of capitalization and modification of meaning that apply to words apply to more complex dictionary entries too.

Realize that the five categories of capitalization categorization do not provide a standalone meaning. Capitalization is necessary but not sufficient to drive classification.

```
Exact format example IBM, bin Laden, or BitLocker
Acronym
Trademark
Special form
All L/C format example xxxxxx or xxx xxxxxxx
common word
Accident/Error
Convenience
Processing and sorting stability
Special form
All U/C format example XXXXX or XXX XXXXXX
Acronym
Accident/Error
Convenience
Processing and sorting stability
Special form
Regularformat example Xxxxxx
Semantic punctuation capitalization
Proper noun
Intent
Accident/Error
Mixedformat example xXXXx
Acronym
Label
Special meaning
Special form
Accident/Error
```

AA.4.6.2 Semantic Parsing Rules

The first step is to ascertain the capitalization pattern. The second step is to ascertain the purpose within each capitalization category.

Capitalization specificity . . . important to recognize that most databases sort and match with capitalization specificity . . . need to validate and check for exact database capitalization match.

Statistical (frequency) assessment.
Organizational environment.
My Word List, My Group List, My Category List, My Policy List hierarchies.
Punctuation
Position.
Modifiers (Dr., Ms., Captain, etc.)
Data stream format.
Data stream structure (field-oriented, database row-column entries, metadata) change the meaning.
Manual Override always last resort (subject to COMSEC override rules)
Playing against the system
Preceding punctuation
Preceding markers or special characters like bullets AA.4.6.3 Process DigitalDoors processes capitalization first by structure, then by syntax. Because structures and syntax provide context to the potential meaning. Structure and syntax provides parallelism that defines the concepts in play. Specifically, structures in databases, XML, data sets with column-oriented fields or positional fields establish relationships that important to meaning and capitalization. It is not sufficient to view the data stream as unstructured when it is clearly structures. Additionally, so-called unstructured data, such as email and documents are not without useful organization, including linguistic syntax. Specifically, data streams are searched for:

preceding quotes
Punctuation
Line feeds or line breaks
Bullet or special characters These clues are used to statistically assert whether capitalization is a positional construct or is used to set apart words as different content.

AA.4.6.4 Conclusion

Capitalization classification accuracy has direct applicability for risk measurement, security application, knowledge management, discovery, and information sharing. Classification changes as the context and concepts changes, and the failure to accept this and support this means that risk management is inaccurate.

AA.4.7.0 Data Classification—The Leakage Threat

Classification is not a neutral activity. It is a powerful tool both for good and for bad. It can undermine security methods based on classification as the determining quality for access and usage. Classification is necessary to enable the security paradigm shift for granular content control and it shines from transparency. The more transparency, the better the classification results and the better the resulting security. However, there are limits to this transparency because of the fundamental nature of the structure of information.

Classification is a management technique to control the usage and distribution of information through the use of labels, tags, classes, metadata, or physical or logical placement. It relies on a taxonomy or ontology for an assignment, but for practical purposes, these assignments are too small, just right, or too big. Too small and too big are wrong. Any assumptions that most assignments will be just right is naïve. The reality is that most things are assigned into these categories rather than just right. It is a matter or power and control. Whoever controls this assignment controls access and utility of the information.

The manipulation of classification represents the future of security leakage. If information is a high-value or high-risk asset and is classified too small, it leaks past the guards to the benefit of whomever or whatever controlled that classification. When high-value assets are classified as too big, this over classification defeats information sharing. When low-value information is classified as too big, it distorts the perceived value of the information and overgrandizes the source, custodian, or processes involved to the detriment of more important business activities. Consider the naming of an executable virus as WinWord.EXE. That is the effect of misclassification of process, but it is analogous to the misclassification effects for information.

The classification itself adds context through the label, tag, placement, or metadata. Thus, while the classification can be transparent, this does not mean the information or the classification itself can be transparent. Sometimes the classification itself becomes classified. Content, context, and concept moderate the fundamental nature of the structure of information, so transparency itself must be part of any classification so that the classification itself does create unintentional leaks.

It is just as easy to buy a control over the classification process as it is to buy an insider. The effect will be similar, although any review of classification is far more useful than exposing spies and nefarious insiders. Classification is far more transparent than the hidden agendas and masked motives.

AA.4.8.0 Semantics Dictionaries

The DigitalDoors dictionaries contain some one million English language entries. Entries are distinguished by type as acronyms, words, and phrases but stored together. These entries are used for white listing, black listing, gray listing and also contextual classification and weighting. It is applied for automated selection, contextual or conceptual recognition, classification and tagging, and also monetary valuation for intangibles. The dictionary includes common entries borrowed from other languages. However, it is not exhaustive. The dictionary is extensible, but it is also supports word-format generation with prefixes and suffixes. In other words, "kind" can become "unkindest".

Prefixes and suffixes are applicable to words, but not processed for acronyms and phrases. This enhancement is effective for categorizing non-standard or rare forms of common words if the prefix and/or suffix is recognized as a valid modifier in the dictionaries. This functionality is particular relevant for Germanic languages as many words are conjoined.

Conjoined words Consider, the word "fremdenverkeresburo" which loosely translates as the "travelers information office". Consider conjoined words in other languages, such as Swedish, where "kommunalskolsflaggstångsknoppuppsättaringenjörslärare" translates quite literally as the "supervisor who teaches engineers working at communal schools to put the top cap piece on flagpoles." This serial conjoining is supported only if the prefix and/or suffix is recognized as a valid modifier in the dictionaries. Complex compound words like these two examples represent an exhaustive parsing process that is not practical at this time. However, common compounds can be added as prefixes and suffixes to enhance basic dictionary matching.

Root matches provide the classification inherited for all compounded word forms. The classifications includes sensitivity level, word type, user, group, mission, role, and becomes the key for all subsequent My Group List and contextual matches too. Note, however, that precedent assures that any compounded dictionary entry will take precedence over conjoined form variants. This is important and logical since many compound words have cultural meanings no longer rooted in the root word or even modified by the prefix or suffix.

For example, consider the root word "sight". The prefix and suffix lists allow for compounding and recognition of derivative words that include:

TABLE

| prefix and suffix lists | |
|---|---|
| Insight | insightful |
| Sightwise | sights |
| Sighted | sighting |
| Sightless | Sightfully |
| Sightlike | Metasight |
| Unsighty | Unsighted |

This dictionary enhancement facility is actually useful for mixed language environments because it lightens the load when looking up words and when trying to ascertain which language is most likely to pertain.

AA.4.9.0 Difference Between Content, Context, and Concept

Content is data, symbol, information, a data stream, or static fact. It is anything that fills a newspaper, magazine, data stream, signal, message, missive, document, video, audio, multimedia presentation, or web site. Content is synonymous with data, but content also includes material represented by labels, tags, structure, metadata, references, links, applets, processes, notations, and out-of-band controls.

A "ball" is content in that it is four characters or 32 bits of a basic signal. It represents any one of a hundred different things by definitions, nearly an unlimited number of symbolic possibilities disregarded by the Shannon Theory, and points to nearly a hundred different concepts. Among other things, a ball is a good time, a dance, an event without dancing, a toy, a person's name, a game, an activity, and a bullet.

Context is an abstraction of information to include discourse that surrounds a language unit and helps to determine its interpretation. It is an abstraction of circumstance that sets the facts that surround a situation or event. It is also the environment, purpose, usage, or application of information to a particular scenario or problem set. It is the non-entropic value of data within a signal, message, file, or other data structure. It is the linkage of relevance of information to a particular biological system, cultural understanding, or specialized workflow. This is frequently presumed, but any framework or perspective is not absolute.

The content "ball" takes on a more specific meaning when a context is specified, such as a baseball stadium. Nevertheless, a Darwinian context abstraction is still not specific enough to determine value. For example, if we hear the announcement that "The pitcher has thrown the ball, an inside curve ball, to number 27, Red Ball, and the umpire has called it a ball." Three references do not have substantive indication, but each instance in turn, defines a toy, a person, and a measurement. The two contexts, location, and distribution of the message, narrow content meaning, but is not definitive as to meaning.

This wiggle-room provides unlimited private communication within public venue as long as the private context is not exposed or decoded. Al Qaeda published messages as wedding announcements in metropolitan newspapers that disguised more menacing information. This was a low risk and consistent context. Note that posting a wedding announcement within a category of vehicles for sale could either represent a regular mistake or a specific intention to create a semaphore about the context of the message. Such semaphores are contextually dependent and represent a method to encode information in plain site.

Concept is an abstraction inferred from specific instances of information based on a cognitive knowledge of the context and content. This can include culture, predetermined interpretations, business rules, formats, constructs, structures, abstractions, attributes, properties, categories, labels and tags, notations, metadata, and/or the definition of a process or computer application to define usage and intent. A concept can also be a partially-formed idea that is still incomplete. Using the same sentence, "The pitcher has thrown the ball, an inside curve ball, to number 27, Red Ball, and the umpire has called it a ball," we have a concept given sufficient cultural acclimation that one player on the other team has thrown a ball at another player named Red Ball that is trying to hit or otherwise accumulate enough points to get to first base or beyond inside a large presentation venue.

The concept is a broader but narrowing constraint on the content. In normal situations, context and concept together establish cultural meaning, but as stated above, a secret context can override meaning for establishing a private communication within a broader public context. Concepts that can be masked, purposefully perverted, or those at odds with the general context distort meaning for normal literary expression, to joke, or to nefariously mask content.

The complicating thing about concept is that it is modified by the more definitive context, but can be used to establish a set range for meaning. For example, if the context where defined as a secret message passed in the clear at a particular time, then a special dictionary would provide lookup on actual meaning instead of the more obvious conceptual indication. The concept of "I had a ball." depends on a defining context, so that the concept is transcendent of both content and context.

AA.4.10.0 Classification as Proxy for Scarcity

Secrecy classification is based on the loose assignment of fuzzy-meaning definitions that often include words like 'top secret,' 'secret,' 'confidential,' and 'unclassified.' Other tags exist to fill the gaps of a complex taxonomy, such as 'sensitive but unclassified,' with many others based on utilitarian functions, features, ownership, stewardship, source, methods, power, or organizational control. In practice, this system is used to limit access to information, thereby creating artificial scarcity of information.

In other words, the higher the classification, the more limiting the distribution for that information. Intermediate tags and other compartments are applied to balance the functional needs of information access against the absolute needs for security. Since absolute security precludes workflow, security is relaxed in order to ease that functionality. These intermediate and confusing tags establish touch points for alternate accessibility while legally complying with the more defined and restrictive secrecy classification system. The intermediate tags blur the lines for strict assessment, without real compliance.

A simpler measurement schema is the scarcity of information. Whenever information is accessed and routed through a processing system, the information is exposed. The duration and frequency of that exposure detracts from that scarcity. Scarcity itself is not measurable, except as the absolute of unobtainability or logical uniqueness. On the other hand, the absence of scarcity is measurable. As such, we can measure the exposure of information, how it is shared, under what cloak of control (limiting secrecy), and how the information is redistributed downstream in alternate forms or formats. Therefore, a range of scarcity is reductive from absolute unobtainability. At some point, and this point is both flexible and difficult to define, the distribution of information is sufficiently widespread as to undermine that secrecy to make the information public knowledge or generally available.

Public knowledge has limited value. It is not scarce. It is not really useful. Therefore, security can be defined as the artificial control and enforcement of scarcity. Secrecy classification can thus be better defined in terms of numbers of access or rigorous limits for access. In this way, Top Secret is not just a tag with some judgmental meaning or defined in terms of people, roles, or missions, but rather in numerical terms of views seen versus view restrictions enforced. Intermediate tags assume more useful meanings because they reflect intermediate values. In fact, even top secret and secret and these fuzzy intermediate terms can be couched in terms of statistical or absolute numerical values for scarcity. All these terms become shorthand for a more rigorous definition of secrecy, and specifically of secrecy in terms of an exacting language of scarcity.

It matters little whether the scarcity is natural or artificial. Natural scarcity could be driven by the lack of available information, a bottleneck of resources, or delayed production. Artificial scarcity is monopolistic, generally driven by controls in order to create and maintain scarcity and hence demand-side value. When artificial scarcity is applied to information, that information becomes valuable particularly when the scarcity can be enforced and sustained. This is the ecosystem for creating valuable intangible property, and in particular, copyrights, patents, and trade secrets foremost, and it is based on the artificial creation and sustainable enforcement of scarcity.

AA.4.11.0Threats of Meta Data

Data lacks purpose, structure and exacting patterns, context, and relevance without external references. Metadata provides those references as internal aspects of the data construct. As such, data has been downgraded as an important facility in favor of the more precise, extensible, and useful metadata. Long live metadata.

The information processing and library science worlds define the concept of data. Whereas information processing perceived data as a structured source for applications, library sciences sees data as the answers to questions and problems. Although the Internet, Gopher, Archie, WAAS, the world wide web and browser search technology began as an information processing concept, these now the complement to library sciences. As these search technologies and taxonomies for setting purpose, context, and references have grown to organize data, all data has become contingent on meta-tagging or labeling.

Applications, data, configuration baggage, scripts, complex formatting, documents with other types of documents inserted or referenced and external links are all forms of metadata. Many documents contain scripts, applets, functional code that might be static but more often is dynamic. Viruses and worms are examples of unwanted dynamic modifications.

Applications often contain tables of data or reference externally linked modules with tables of data. This data can change, and with it the linked modules or even the application itself. Applications frequency update configurations and other variable data streams internal to itself. Some applications modify themselves and rewrite its internal code. Viruses and worms are examples of unwanted dynamic modifications. Applications often support persistence of data; this is the situation when user data, configurations, or metadata is stored within the storage space of the saved application. Data persistence provides several avenues for security lapses, modification of the data and the usage of the data storage space as a platform for a virus or worm. In addition, metadata provides all sorts of opportunities to hide polymorphic traps that can bypass signature scanners and even illegal process monitors. It is a rich game where the very extensible nature of metadata makes for a very extensible solution set but also a very perverse battleground. Every tool, even metadata, becomes a weapon AA.4.12.0 Degrees of Data Structure Structure, as in data structure or structured data, is a biased and imprecise definition to describe a single presentation of information. The definition conveys a certain amount of relevance to traditional data processing operations in terms of what classes of applications access and manipulate the information, but misfires when information is described within a new DigitalDoors ecosystem of meaning, security, and sharing.

Structure (also variously called a container, format, setting, scene, rendition, interpretation, translation, transformation, presentation, display, exhibit, report, or framework) is a single purpose-driven instance of the informational content space. The purpose driven instance is just one of unlimited possible structures, where structure adds context and concept to that content. Structure is just an attribute or property of content. To view structure as distinct from content misses the importance that context and concept imparts to content. Information is not constant, and in fact is transformed to meet different purposes and is altered by its structure. There is no single universal structure, as each structure is a single instance of the possible set of structures. Data normalization and denormalization are possible structures for the same information.

Traditionally, data either has structure, or it doesn't, or is somehow partially structured. This differentiation is commonly grouped into three categories. Structured data is found in databases, in a self-defining format such as XML, or in field-defined data sets with rigorous size/offset delineation. Unstructured data is generated by end-users as documents, images, audio, video, and composites. Semi-structured data is delineated by field definitions, for example by e-mail with delivery address structure but mostly freeform content. However, the strict demarcation between structured and unstructured fails with all-purpose reference to this hybrid semi-structured format with some structure but mostly freeform content. This failure points to the more serious problem within the infrastructure of data.

This definition of structure and its categories is important when working with data and choosing tools, but is not viable for an ecosystem of information in terms of its meaning, security, and sharing. If we cannot even define it precisely, then we cannot assess its meaning and value, cannot secure it accurately within the formally-defined Bell-LaPadula Model sensitivity-level categorization, or propose safe methods for cross-domain information sharing. In fact, DigitalDoors has explained the failures in information sharing inherent to the creation of a simple cross-domain tagging nomenclature. See The Failure of Tag Reflexivity for Information Sharing. Quite clearly, this definitional failure is explicit to the lack of a formalization of information.

A data structure is not to be confused with the concept of structured data. The words are similar and do not imply one therefore the other. Structured data neither requires nor necessitates a data structure and a data structure does not imply the reality of purposeful structured data. Whereas a data structure is a precise application of a formal schema or layout to information to delineate it and provide a clear purpose, structured data need not necessarily have a data structure applied to it. There are other ways to structure data. In fact, part of the confusion is that unstructured or semi-structured data could be parsed by a data structure and still fail to be configured in a meaningful way. The application of a data structure or tags, metatags, XML, or a data hierarchy is no guarantee of the meaning, security, risk, or purpose of the information. While a data structure is often an indication of structure, such contextual or conceptual clues could be as useless and false as they are purposeful and true.

What is useful is the simple understanding that structured data is one form of tagging represented in one way that can be transformed and tagged again in one or many overlapping ways. A database with a data structure or a schema is the imposition of a tagging system and presentation format that makes clear the grid-like nature of the rows and columns, and index relationships, if any. In other words, either a structured database or an unstructured document is both structured contingent upon a predetermined purpose. The structure can be transformed for other purposes with new meaning, new security requirements, and new information sharing value. The transformational risks cannot be addressed from the premise of any initial structure because the transformation alters context and concept with both the loss and the addition of content, context, and concept.

For example, a printed P&L statement shows a rolled up subset of income and expenses in a predefined GAAP format as of the date of the data transformation. The rollup does not detail line items, so there is a loss of information. The rollup does typically include a process date and does derive its source from the person generating the report, so there is the addition of information too through the explicit change in content. There is also the change in context through the format transformation from raw line item data to a categorized report. There is also a concept change because the purpose shows aggregated results instead of transactions and perhaps inference over a longer period of time through the presentation of estimates of future sales. The concept also changes because the date shows the date of the report production and the relevancy of the future forecast rather than a historically precise perspective. The concept changes again because the person(s) creating and presenting the report puts a mark of integrity on the information through this interaction, thus asserting both a new source and a new method.

Structure is range without precision. DigitalDoors asserts that all structures are defined by a hierarchical taxonomy that supports categories without limit and that supports overlapping structures. See Multitier Hierarchical Overlapping Tag Structure. As such, all databases, documents, and data streams have a degree of structure that unfortunately we can only classify vaguely as more or less, that such degrees of structure are really not useful, and to date we are unsure even how to measure degrees of structure or if it is relevant to anything. DigitalDoors can, however, measure the overlap of information when it is categorized into multiple categories and assess its risk potential when shared.

The reason for range without precision is that a database, which clearly has a formal structure represented by the schema of grids and indexing, can be restructured for different uses having more or less structure. A report might contain all of the original content but have no structure, be re-interpreted into a different grid and can contain free-form data, such as BLOBs, which might itself have or lack a formal structure. How does this really differ from the e-mail with its address structure containing unstructured messages? Furthermore, the so-called unstructured document from MS Word does indeed have an internal structure that uses tags to differentiate between titles, paragraphs, figures, links, footnotes, and deleted metadata. How can this really be called unstructured? A formal external schema definition does not differentiate a structured document from one structured with an internal inline self-defining tagged layout either.

In fact, a database can be converted into XML, XML into a database, and an MS Word document can be converted into either a formal database or XML without additional external information. In fact, MS Word supports both XML and ODF to defines its structure. This does not mean that conversion necessarily adds or removes structure, that it is measurable, or as even useful, as previously cited. Conversion does alter context and purpose. It does show the arbitrary use of the definition for "structured data" is meaningless. See The Transitional Relationship Between Structured and Unstructured Data.

Tagging (or labeling) of content and use of XML, sensitivity levels, context, and functional application also represents a structure. Indeed, XML-coded documents are included within the traditional definition of structured data. This raises a problem of conversion between structure and tagging and problems of meaning conveyed by structure and what is lost in the conversion. Tagging does indeed provide structure and can equal or exceed the amount of structure inherent in a formal database schema.

The transition from structured data to a tagged document is just a transformation. The transition from a tagged document to structured data is just another transformation. The association between the structured document and a tagged document is one mostly of context and concept but also of content. Consider each as a singular instance of the hierarchically-defined data set. Transformations can include more content or less content than the original, but often includes additional contextual and conceptual information by virtue of the transformation. Refer to the prior P&L example for how information is transformed by aggregation, inference, and interaction. This is a very important point for assessing search results, the meaning of the information, its security risk, and how and what parts of it can be shared.

A structure is a rendition of a context and a concept for a purpose. The transformation of a structure into another is precipitated by a change in context and/or concept. The transformation must include aggregation, inference, or interaction to occur. This is an important point because it recalls that information does not exist in a vacuum but as a meaning contingent upon a content, context, and concept. The transformation from the old format to the new one presumes an understanding of the defined purpose of the old, how it differs from new, and how the new format enhances the new purpose. Although we presuppose that a hash transformation is unique and non-reversible and thus non-recoverable, we cannot hold data and format transformations to such a high standard. That is why the culture loathes information sharing; they understand the risk implicitly, if not formally.

Information is not constant, is transformed to meet different purposes, and is altered by its structure. There is no single universal structure, as each structure is a single instance of the possible set of all structures. No one size fits all, and no single structure is necessary and sufficient for any or all requirements. As a result, we need to understand that potential for the Multitier Hierarchical Overlapping Tag Structure as focal point for analyzing meaning, security, and sharing. We need to understand that structure, and the degrees of structure, are only a window on the meaning, value, risk, and potential for information.

AA.5.0.0 Defining Information

AA.5.1.0 The Meaning of Information and Related Context Risk

Following is an analysis of the unanticipated risk from information and the security consequences arising from alternate semantic and arbitrary semiotic contexts. Because we often presume that information has a single interpretation, a designated a priori utility, and a definitive purpose, we underestimate its capacity to mean other things. We fail to anticipate that information can be useful in unintended, unintentional, and ambiguous circumstances. We expose a greater security threat because of these expanded meanings without any realization that it even exists or that our own information will be turned as a weapon against us. However, as the consequences become apparent with exponential growth in identity theft and security breaches, we are left wondering why. This is not only an economic problem, but also a social and intellectual one too. All have dire security and competitive consequences. These consequences are the direct effects from the explosion of information, expansion in information processing, and the convergence of both into the single deliverable format of metadata.

The focus here is on the expansion of knowledge through the application of external factors. It has its basis in a phenomenon first observed in genetic biology where exact DNA genome sequences express into different results through unknown or imputed external factors, general the process of genes turning on and the sequence of this expression process. Because the starting point of the DNA—that is the information basis is identical and the expression process is controlled—the ending point should be identical and anticipated in advance. However, variations and mutations often result. This is external to the genome, hence 'epigenetic' or external to the gene. Sometimes these variations occur over several generations masking not only the cause and effect, but also any possible information delivery channel. Clearly this out-of-channel conduit exists, but it is beyond our current knowledge and control.

Because analogous results occur within the context of information processing—some are accidental but some are intentional and manipulated—through out-of-channel conduits—the consequences are expressed in the form of epigenetic information that was not previously recognized or did not previously exist. Clearly out-of-channel information conduits exist, but it is beyond our current control. This is the existing conduit for delivery of computer virus, malware, information theft, identity theft, and the many mutations increasing security risk and actual observable security consequences.

This thesis can be simplified into the following nine assertions.

1. Information and information process can be represented within a single unified structure called 'metadata.'
2. Information is the formal representation of knowledge, codes, and facts.

Process is the expression of information into an observable event or action.

The meaning of information is dependent on context.

There are no known limit to contexts.

The aggregation of information creates new information and new contexts.

Interaction is the expression of information with secondary aggregation.

We know of no ways to describe information in a primitive format where meaning is explicit and unambiguous and replicable without variations and mutations.

External factors, in the form of information and information process, create expanded interpretation, utility, and purpose. The following paragraphs define these assertions.

These assertions are expanded in the following paragraphs.

The boldest assertion is that process and information are the same thing because a process is basically an expression of information. An application, whether website, an applet, a macro, a computer application, business rules, an assembly line, corporate routing process, chain-of-command, a virus, or a trigger is basically an information stream executed by a defined computational engine. This is no different from seeing RNA activity as an expression of DNA applied to a natural chemical or physical reaction engine. Correspondingly, process is an information source that requires security. This is obvious to people who view IP and organizational infrastructure as valuable assets but totally overlooked by organizations that do not document workflow and hierarchical controls. Even physical devices are manifestations of data streams. Because information is represented as a data stream with a starting point and ending point within a structure, format, encoding, and probable utility by its containment, that containment is definable as a metadata container. In other words, each and every data stream can be represented by a structure that is self-defining, self-replicating, extensible, and convertible into other structures, the very definition of metadata, or data about data. Additionally, physical representations can be logically converted into wholly information streams as the technology to turn information into physical form advances.

Information in any format, any data stream, or a metadata structure is the formal representation of knowledge, codes, facts, or the definition of the steps of a physical or even logical process. You can document a process, create blueprints, patents, express a process as a math or logic equation.

Information process is the expression of information into an observable event or action. Information, such as music can be a notation, a sound stream, a multi-channel stream, compressed notes and volumes, and be convertible from one representation to another or expressed through a synthesizer.

The meaning of information is dependent on context. Compressed encrypted data could seem to contain no pattern or known, and yet contain just about any secret, any process description or code, or any formal representation of knowledge. Extraction or expression of that information is conditional on unraveling the context, which depends on an encryption key, knowing the encryption method, knowing the compression method, and applying a reversing process in correct sequence. Conversely, any data stream can be perceived as applying to a specific utility and purpose but referring to one or more other contexts. Metadata, such example an MS Word document or a data table, are thus extensible to unanticipated purposes and coverts channels. Redaction to a limited data stream is the only way to minimize or limit the dependencies. Manual (human) review can be cached and automated to augment the manual process and expand the range and depth of inference detection. "Unstructured" data can be represented in a formalized structured form, thus the perceived differences between a discreet restricted data setting and freeform is moot. So-called unstructured streams must be intelligible by some process and they have some definitive structure. Context is a structure, and structure is a context. Efforts to unify data formats—for example by designing a master data format (MDF)—with standards represents the effort to establish consistent formats and do nothing to secure them or secure the information within. It is merely a way to assert a single fixed context where single contexts are at best a fiction.

There are no known finite contexts; there are always alternate contexts. This means that anything that is presumed to represent a formal perimeter can be redefined and circumvented, thereby explaining the fundamental failing in security methods based at a perimeter. This also applies to secure code efforts; alternative contexts or the alteration of the code with malware patching is no fiction and renders efforts moot to increase security through better techniques. Granularity goes a long way towards minimizing the number of alternate contexts, perhaps even creating a 1:1 possibility, thus initiating the underpinning for the DigitalDoors granular content control security ecosystem.

The aggregation of information creates new information and new contexts or recreates privileged or de-identified information. Information can be aggregated from within a single data stream, related data streams, or from a single or related data streams with other external sources. Aggregation enhances information, extends its context, and replicates facts presumed secure, private, or confidential. Aggregation exists as a process of simple data combination, data mining, knowledge discovery through inference, and the interaction of data and process.

Interaction is the expression of information with secondary aggregation. Since process is the physical expression of information, the intersection of these creates new processes and new information. The Storm (peacomm) malware is a prime example where reconstitution of sleeper agents recombine to create a pernicious, mutating, and hidden platform.

We know of no ways to describe information in a primitive format where meaning is explicit and unambiguous. Math is close to some measure of objectivity but many human situations, endeavors, and observations have no primitives that are context-insensitive or culturally unbiased. Results also depend on external factors, such as the aggregation of information, the people involved and the assessments made, so that the output contains inevitable variations and mutations.

External factors, in the form of information and information process, create expanded interpretation, utility, and purpose. Even music notation is interpreted by conductors and musicians, where the interpretation is unexpected representing a larger universe than ever anticipated. If you could anticipate the permutations, you would have a closed set, but a closed set is a special and nearly impossible situation. You always have to be aware of the potential for information perversion, repurposing, misuse, and turning that very information protection into a weapon against you.

AA.5.2.0 Content Concept and Context—Correcting the Security Gap for Data Object Models The security battle is accelerating between content, concept, and context. Traditional security has been applied only to content, which is strictly defined as the actual data contained within a document, file, or data flow. However, there has been a paradigm shift to complex data structure defined by an object model, dispersed, or aggregated as part of a large process or workflow without a corresponding paradigm shift in data security. Protection of the content alone is insufficient. The existence of the content and understanding of the attendant workflows provide conceptual and contextual information that is often more useful than the actual protected content. Content is a finite security risk, but concept and context represents an infinite risk. This is a paramount security issue as the data element migrates to complex data structures defined by object models. The security needs are exacerbated by structures containing metadata, data paths, links, references, so-called smart tags, and even workflows and applications, as shown in:

Encapsulating such documents, files, data flows, data structures defined by object models, or other entities with barrier-based security or breaking apart these into random chunks or unitary data elements is neither effective nor feasible. Barrier-based security breaks workflows, prevents information sharing, and fails regardless to protect the concept and context; it does protect some of the content, but at what cost? This security gap exists between content on the one hand, and concept and context on the other. Rather, such complex data must be protected at the individual granular level and within the context of what concepts can be discerned through inference.

Traditional data security has been implemented against operational sites and against specific data files. These represent barrier-based methods—for the site as an entity—or the individual data source of value. It is effective when the balance of power is unequal between strong defender and lesser attacker. It is effective when the elements attacked are finite and discrete. However, when assets are distributed or when small assets can be captured and repurposed for significant gain, barrier-based security fails. The power is with the attacker, and protection requires a disproportionate response to maintain any legitimate protection. Any type of siege, hit-and-run guerilla attack, or slow and covert undermining defeats this technology.

It is also important to cast these significant shortfalls in security to the historical basis of data processing. Initially, the technology itself and the scarce equipment held extreme value. Protection meant physical protection. When the operations become mission-critical, the process become very expensive and more valuable than the equipment itself; this infrastructure was protected. When computing became cheap, ubiquitous, and the value of shifted to the data, protection was positioned to maintain backups and protect cloistered continuity. Now, data has become ubiquitous with the risk in the theft of and misuse of that data. The processing has become significantly more complex but distributed through always available networks. Furthermore, the process itself has been incorporated into the data, merging the distinction rigorously between data, structure, and process. The requirements have changed from central protections to protection of distributions, long supply chains, and interconnected workflows. The co-mingling of data and process blurs the line between protecting intellectual property, trade secrets, and private data, this changes the battle from protection of content to protection of concepts and context. This is the security gap now visible with the transaction from data element concepts to object models.

There are six areas of security, of which the first two only have been protected by barrier-based security:

Data operation
Data element

The remaining four represent the results of processes embedded into the data and distribution, and the shift to data structures defined by object models:

Data object
Source
Event
Method

Traditionally, the data element defined the operation, one-for-one, and the operation required that data element. Each data operation and each data element had a known single purpose and mapped uniquely. For example, "this is the credit card operations and this elemental record set is today's transactions." Record sets are no longer so focused, and for example, the credit card transaction data is now typically applied for the primary activity of payment settlement but also used to accumulate cardholder benefits, for sales and marketing activities, and track card usage patterns. Tracking card usage patterns represent the front lines against credit card fraud and identity theft, but tracking is also extended for secondary supplemental marketing activities to both existing and potential vendors and cardholders. This repurposing of activities and data represents the cutting edge in return on investments in data processing, but also demonstrates why the theft of data and privacy information is so rampant. There is no longer a unique one-for-one match between operations and data sources.

A single security barrier is no longer conceivable as an effective countermeasure. As you see in this simple example but very common security gap, multiple operations are performed against the single record set and the single record set is probably processed multiple times and even converted into alternate formats for additional processing and reporting operations. Because of this repurposing, reformatting, and redistribution of source data, the application and thus the security of the data element is no longer clear cut. It is complex. There exists a mesh of operations and applications not protected for concept and context.

It is also important to recognize that a data element can also constitute a metadata item too, and hence represent a non-finite security risk. For example, the profile of an individual is a defined data element in its own right when perceived as a structured record set. It is also a profile that describes the individual that can be repurposed and combined with other data elements. This extension creates enormous security risks if the profile is seen only as collection of data elements including last name, first name, social security number, address, et cetera. Rather, the collection is a descriptive metadata item, describing the individual in terms not intended by the data processing group. Repurposing extends the value, risk, and security needs.

The shift from the data element that is compartmentalized and defined in terms of purpose to that of the data object is in terms of the expansion in complexity, purpose, and capabilities. The data object is basically a container of containers, each container with its own structure. The data object is defined by its own internal map or by an external schema. No only is the object likely to contain mixed data types, it is likely to support activities with multiple purposes. For example, the profile for an individual contains contact information, but it also used to validate the integrity and validity of the individual for transactional purposes.

Protecting the contact information without protecting the application of it for verification represents every much the same security breach; it just happens in a different way, a different place, and at a different time. Note, that access to the internal map or external schema also creates a security lapse. Knowing that a particular branch holds a current profile and that another branch holds an outdated profile and which information serves which function, opens another door to data theft and misuse. The outdated profile is very useful for identity theft because it can be validated as correct information but out-of-time context. The internal map or external schema also explains how to repurpose data.

The complexity of maintaining security does not end there, either. The data element no longer exists as a unique and single entity. The applicability of the data element is not finite, but infinite, or at least larger than the source organization will imagine. An attacker, attacker, or insider will perceive a novel use that will damage the organization or its customers. Through the application of object model storage structures, the purpose of the data element is unclear without the schema. The schema is a map detailing the name and purpose for each element, although the purpose often represents many different things depending upon context. For example, the date of creation might indicate when a Word document was first created by the author, or it might indicate to a defense attorney that material was created after-the-fact to justify or cover-up events.

This descriptive mapping represents metadata, data describing data and its purpose. This second order of information needs to be protected as well, as it often describes details about the data that are more sensitive than the data itself. For example, the metadata for the credit card transaction describes the vendor, the customer, and the purchase environment and this is more valuable that the account numbers or transfer of finds between accounts. Note that the schema is most likely to represent the obvious structure and purpose of the data, but not secondary or misapplications of that data or misapplications of the metadata itself.

Hence, effective security requires the understanding of the repurposing value of the data and the metadata within a context of mesh access. This data and metadata cannot be simply locked down precluding access. That stops processing. If the data is unlocked for processing, that either/or access security does not protect against the unanticipated data repurposing. Even if the processing infrastructure seemed to be contained and protected within the perimeter of physical and logical barrier-based security, that is within walls and firewalls, the nature of networking all but guarantees unanticipated access. DigitalDoors counters this type of mesh threat to data and metadata by categorizing each such element and then extracting or dispersing the elements individually; this is an infinitely-granular security approach. This approach enables review of repurposing and control a' priore and also posterior priore of the elements not possible with encryption and barrier-based security. Securing metadata is at least as critical for security as protecting individual data element content. The security gap is predicated by the ability to infer the sources, events, and methods represented by the object model and implemented within the corresponding data structure of an actual file.

"Source" has two meanings and two security implications with a single security imperative. A source in intelligence idiom is the person, group, operative, spy, satellite, or other channel from whence information is gathered. A source is derivation of the data element, the author, data collection point, editor, workgroup, manager, or other participants in a process or workflow. Although sources are not usually data elements, and thus not protected within traditional barrier-based security, they do represent metadata with a very high need for security.

The compromise of an intelligence source could jeopardize the life or utility of that source or render it ineffective in the future. Knowing the source, or that the source is a leak, could render prior information irrelevant as information is altered or plans are changed. However, knowing the source also describes the integrity, validation, and significance of the information. The need is to protect the source, not prevent all access to the source. The information is the data element, but the source is metadata. In the context of data processing and the object model structure, the source is not only leaf content, it is the paths and linkages to leaves, paths, and the inferable interspersed structure, it is also concept and context.

The concept is the idea projected by the mesh of leaves, titles, headlines, file names, storage locations, or analysis of workflows. The analysis of the workflows shows the source, both within the intelligence community and within the data processing community. Sometimes, concept is represented bywords, numbers, sometimes by audio and image. Sometimes, the concept is obvious with only the object model. The structure, shown by what is included or populated from the object model or missing and non populated, the paths to leaves, metadata, and embedded applications also defines the blueprint and thus the concept for the file. In the object model, concept is shown in terms of the blueprint itself, the structure, and the interpretation of the content. If you get the drift of this meaning, the data model itself, even if devoid of content, describes the purpose and concept of the file as a whole.

Concept is also defined by event and method. Embedded processes, triggers, workflow assignments, lists of sources, lists of processes, and other attached documents, links, applets, and metadata impart the abstraction and notion of the file as a whole. Protection is only feasible when elements and methods are categorized and protected at a granular level. This means that leaves, metadata, structures, links, and references must be categorized, extracted, and dispersed. It also means that analysis of the security risk cannot be affected element-wise only but reflected through the aggregate value of the object model when reviewed in mesh framework. The combination of seemingly insignificant leaves might easily convey the entire concept without the need for any of the content.

The context is the necessary circumstance described by the data elements, the object model, and all embedded processes and workflows. For example, the presence of the Echelon Communication Facility in the British Isles indicates collection of European voice and data traffic. You do not need to know the details at that traffic to understand what it is and how it can be applied. If communication capture facilities of Echelon where dispersed among all the McDonalds of Europe, the context would be hidden and its existence and purpose effectively masked. The data capture workflow could be hidden within orders of French fries and Cokes. As long as the secret is suspected but not open, the context can be obscured. Even if the context is exposed, the dispersion of the data collection and leaf content is only suspected but not known with certainty. In the same way, the presence of certain object models gives indication of purpose. Security within a data processing environment is dependent on masking the context by protecting metadata and data elements in the granular instead of the packaged whole.

An event represents any triggered process, such as a macro, add-in, or application. Potentially, it allows the data structure to be self-aware, so that it knows where it came from, who saw it, automatically updates components or data with a time element, and provides tamper protection. This risk is not external from attackers, but rather internal. Complexities, failures, normal events, and programming errors can compromise event security unless oversight is performed on the content of individual leaves, leaves in aggregate, the paths and model structures, and the developing mesh of workflows.

"Method" has two meanings and two security implications with a single security imperative. A method in intelligence parlance is the technique in which information is gathered or applied. A method within an object model is a process on how data is presented, stored, processed, or distributed. In fact, a method can be any triggered process limited only by imagination. Barrier-based security protects access to the data and prohibits access to the method. However, whenever the barrier is breached by password or unintentionally, the method initiates a life of its own apart from the object model and any associated elements. Protection is only feasible when elements and methods are categorized and protected at a granular level.

In conclusion, the security battle between content, concept, and context will be won not on a finite security of barriers but on the infinite and open analysis and protection of leaves, paths, and structures of the new data object models. Traditional security has been applied only to content, while the existence of the content and understanding of the attendant workflows provide conceptual and contextual information that is often more useful than the actual protected content. Content is a finite security risk, but concept and context represents an infinite risk. Such complex data must be protected at the individual granular level and within the context of what concepts can be discerned through inference using the paradigms of DigitalDoors technology to break apart the data with files defined by object models, review the complexities of the many leaves, and inference possible from the paths and embedded metadata sources, events, and methods.

AA.5.3.0 The Structure of Information

Although information has not really changed, we use more complicated formats and structures now. As a result, the paradigm for information security must adapt to reflect effective security with more complicated formats and structures. The centrality of content, context, and concept is critical to establishing security and enable information sharing. Unlike Cassandra, we cannot merely prophesize the forthcoming reign of information warfare and economic damage from information theft. Rather we must provide adaptive, effective, efficient, capable, and realistic security solutions in balance with the complex requirements of information sharing within all multilateral agencies.

Security adaptation must reflect compound data structures, complex data storage models, composite formats, hierarchical layouts, and various representations of data more complex than binary streams, delimited fields, metatags, metadata, links and references. Security adaptation must reflect the convergence of information with the application process as well. Security adaptation must reflect the singular risk from a defined unit of data to include risks compounded from searching, data mining, and workflow recycling. Security adaptation must reflect more than the internal aspects of information leakage to also defend against externalized aggregation, inference, and data-to-data interaction.

Information provides more meaning in the sum of the parts than in the parts alone; this is reflected by factors, including symbolic, syntactic, pragmatic, format, structural, order-centric, cultural, purposeful, semantic, and semiotic. The structure of information is an aggregation of the content, context, and concept, that is, the basis for the DigitalDoors granular content control paradigm. This basis for any complete security must start with a thorough understanding into the context and structural assembly of information.

AA.5.3.1 Information Structure

The processes for updating the formats of data, integrating many databases, adding the unrelenting stream of new data, and cleaning old data is one of the most vexing and costly of ongoing information technology (IT) tasks. Also consider the ramifications when data is transformed into XML, tagged, strewn with comments, and embeds functional code. Frequently, databases or field-oriented records (as in COBOL or ISM) are revised to keep pace with changing applications, stovepipe process migration, or the integration of technology silos into a coherent workflow for web-based processes or SOA modernization. Although cleaning and transforming data for use in new models is perceived as a show stopper for daily operations, realize that this disparity is also seen as a mother lode of data for attackers who can repurpose the data through aggregation, inference, and interaction.

Information is defined by content, context, and concept. This is also reflected as the fundamental data modified by syntax, structure, semiotics, and pragmatics. Content does not stand alone with a universal meaning. Punctuation—Context alters Concept is funny example of text meaning diametric opposites with some minor structural differences or minor perspective changes. Context is established by format, syntax, structure, purpose, and other factors that include order, assemblage, tagging, and metadata. Concept is determined by source, destination, purpose, usage, reference, and cultural factors. Even context, which some perceive as straightforward and self-documenting, is contextually biased by metaphor, metonymy, cultural idioms, relation of parts to a whole and whole to the parts. Context is also a product of process, workflow, source, method, integrity, and validity. Security without an understanding of the centrality of content is not security at all.

AA.5.3.2 DNA Versus RNA

DNA is the archetypal model for information structure. DNA creates RNA. RNA not only applies a process extracted from the data of DNA it also expresses itself to make copies or transformational variants. RNA is the application code, albeit a macro, an applet, client side script, server side script, helper script, an embedded function, a virus, a functional computer program, SaaS, SOA, remote process, or the complete workflow controller. RNA recreates DNA. The differentiation of RNA from DNA really has no context. Application packaging is such that often it contains segments of data or persistent configurations, or conversely, the compound information package contains segments of application code. Differentiation of information from application is purely a definition of context. This is directly consistent with the prior discussions of information in terms of granular elements and contexts of format, structure, purpose, and so forth. An application is mapped by its structure, usually a header, a loader, parameter input fields, blocks of code and blocks of data, and internal allocations for buffers, strings, and temporary storage. This application structure is the analog of the structure of information. DNA is agnostic to information, application, infrastructure, and ecosystem; in other words, the same DNA information structure defines proteins, prions, bacteria, viruses, deep-ocean volcanic vent flat worms, arctic birds, and humans.

DNA and RNA are really one and the same, and interchangeable. DNA creates RNA. RNA creates DNA. They are different formats for the same things. In the same way, text, data, application code, macros, working processes, XML, metadata, and the information helix are one and the same things. Application code is a subset of the greater data superset converted into an expression for a contextual purpose. Perimeters are expressions of data, applications are expressions of data, and MS Word documents or Microsoft XML-based XPS packages are messages. Security implemented as firewalls, security as deep packet inspection, security implemented as anti-malware filters, and security implemented as improved coding methods are expressions of data-level security. These are all subservient expressions of semantic content security. Perimeter security is an incomplete subset of semantic content security; it works for some of the threats, but it is not inclusive of content-level data risks, tagging and metatag risks, or covert repurposing of hidden structures and communication channels. The threat environment is now all-inclusive.

If the issue raised is: "information is the subject or the object of the application, and the application is the verb and the verb is triggered by an event or process." The appropriate and correct response is that this assertion is merely a matter of context, specifically whether you run an information file or run an application file is just a transformation of ideas. That is a very small semantic point where the perspective is based on whether the data is the focus or whether the process acting on the data is the focus. It is really immaterial.

Data can invoke applications with metadata triggers, so for example, clicking on the filename of Word document or an Excel spreadsheet expresses the data against the contextual association of the assigned "open with" designation. The traditional concept to run an application that processes data falls shorts on the complexities inherent in hierarchical data structures. See the white paper Metadata Security Risk Epidemic for a view of the transubstantiation of the Microsoft XPS format as a container both for applications and for data. Within human language, subjects, objects, and verbs are frequently identical words, such as "open," "work," "run," or "complete." This ambiguity is permanent.

Context in terms of usage and purpose defines the word usage. Likewise, both information and applications are collected, compiled, linked, cross-referenced, delivered, filed, and fundamentally directed and controlled by external workflow. A flow chart for each is much the same with moot differences. That it is just a matter of semantics. The critical concern is that computer code is an expression of information, and is nothing less and nothing more than information. The difference between DNA and RNA is matter of expression and context, just as the difference between information and an application is also a matter of expression and context.

This is not just an academic exercise or some theory. There are formidable security ramifications. There are real world examples for repurposing, aggregating, and expressing resources in unexpected ways, described later. Examples of repurposing, aggregating, and expressing resources in unexpected ways, include James Bond, the 9/11 attacks, and the unraveled Heathrow plans. The fictional Scaramonaga's golden gun was assembled from pen, lighter, and tobacco box in the James Bond thriller to assassinate people in public places. Even though port and vehicle security reacted to terrorist hijackings, the 9/11 attacks on the World Trade Centers and the Pentagon demonstrated the repurposing of vehicles into flying bombs. More topically, and quite a real threat with legal convictions, consider the recent British binary liquid explosive bomb threats at Heathrow Airport. The common and separately innocuous components of Tang®, hydrogen peroxide, sports water bottles, a small blasting tail, a disposable flash camera, and duct tape have been demonstrated that when assembled covertly in a plane's bathroom create a formidable bomb.

By ignoring false distinctions between information and applications, we establish a security structure that is consistent and applicable for both information and applications. The same tools that establish security with sharing for data content establish security with sharing for applications. The traditional perimeter-based security focuses on the applications and the transmission of information. The advanced content guard and inbound or outbound scanner focuses on the semantic and semiotic information content. Instead, granular content control is agnostic to information, application, infrastructure, and ecosystem, just like DNA. This creates a consistent implementation regardless of platform, language, format, structure, purpose, metadata, etc. This means the solution is cross-platform, storage and transmission independent, and non-specific to processor, operating system, and network function.

Obfuscation in information format and structure or complications from metadata hierarchies and compound or complex information structures is no defense. While silos and stovepipes clearly appear as an obstruction to daily functional operations, it is an ideal opportunity for information warfare and economic damage from information theft. What is an obstacle generally becomes overlooked as a security risk because people mistakenly assume it must be trouble for everyone else too. Of course, it might be inconvenient to repurpose, but inconvenience is not a defense against information warfare and economic damage from information theft. It is not a viable security protection method. Hiding application, structure, data, purpose, and infrastructure is not a security solution.

The context of applicability is so different that this risk is often discounted. Silos, stovepipes, and the apparent complexity of data separations do not create an effective perimeter defense, and in fact, a perimeter defense is not a realistic defense any more. Disparities in information storage, formats, file systems, structural storage techniques, dictionaries, data catalogs, metadata repositories, and so forth do not inhibit data repurposing or information warfare. The tools, widespread accessibility to data, human intelligence, with boundless human energy and virtually-free marginal computer time undermine obfuscation and data hiding.

AA.5.3.3 Granular Content

Information conveys simple data parts, thoughts, ideas, structures, formats, mechanisms, risks, and life itself as DNA. Only recently have we mapped the human genome and understand the gene as a chain of proteins which encode information and elaborate its anticipated application. See the white paper reference to DNA introns and exons with regard to inherent polymorphic risks of compound file structures and hierarchical metadata. This is reflected by a base coding of A and T vs. G and C, really a quarternary system in contrast to the binary, octal, or hexadecimal coding system used for information processing. The bases consist of proteins and molecules for chemical elements.

In effect, the data parts are the chemical elements, but the information is contained within various pooled layers of structure, format, aggregation, inference, and gene-to-gene interaction. Chemical reaction predispositions, pressures, temperatures, catalysts, and free radicals create the branching instructions for different results. Although these branch choices might seem random or esoteric, the situational states are as relevant as the conditional choices programmed into software. We might yet understand the complexity, but it is nevertheless present and instrumental. The same can be said of computer code with security flaws and buffer overflows triggered by circumstances unforeseen at design. One is a result of ignorance, the other also of ignorance and the lack of full situational awareness. Data is not always passive and good-natured. Data not only is acted on, it is also reactive to situational parameters often unperceived as risk.

We have yet to understand all the inputs to make eyes blue or brown. We are also learning that disease is not an organism issue but rather a gene issue and even a single protein issue. So while we are unraveling the interpretation of life through the human genome data structure, we are also constructing diverse yet equivalently complex information structures for information processing. The first line of security in life is about perimeter control and gross defenses. The second line is about granular content control at the information level in terms of the aggregation of nucleic bounds and receptors. The parallels to information technology and security are far ranging.

Life is a process, but life is reflected as information. Consider the assertion that all computer applications and workflow are completely reflected by information. (We might not as yet know how to initiate the process of life solely from its information map—the spark of life or the triggers to a wide range of processes that activate DNA into proteins, amino acids, and RNA—but we do know how to reflect information as process and process that information.) Therefore, the structure of security is represented by the storage, process, and structure of information, the last being what is missing from information security and the focus of this paper.

Data pooling, information from collections, assemblage, hybrids, data mining, aggregation, inference, and data-to-data interaction undermines perimeter security. Data mining portrays the risk from preexisting and structurally known sources. Master data integration, a new catchword for mining data warehousing resources also should risks the specter of new security and privacy risks. Assemblage is the process of combining information in clear-cut patterns to establish risks. Hybrids are the improvised explosive devices of the information sharing and security world; individual pieces are beyond recognition as a realistic threat until two, three, or more are combined. Examples include the previously described include James Bond and The Man with Golden Gun, the 9/11 attacks, and the Heathrow flight binary explosive bombing plans.

Reusing and repurposing information in a bewildering and unanticipated array of new contexts represents a formidable risk. It is irresponsibility to gripe that we cannot expect all the variations or that our current tools and training is adequate for known security risks but not for these unanticipated ones. That is the mistake detailed in the white paper Street Light Syndrome, a situation were we conveniently apply the easy solutions we know to a perceived problem that is not consistent with the actual problem.

Aggregation within an unanticipated context is a covert channel. The sum of the parts within context reflects more than the sum of the parts taken alone. In fact, the risk is hidden, unanticipated, disguised, and often unrealized. The parts get through the perimeter boundary and can be assembled into accidental, incidental or quintessential threat. Furthermore, parts are frequently disguised with encryption or repurposed into an innocuous and limited form factor that slips past the perimeter defense. The sum of the parts is contextual and conceptual risk. This is hard problem that must be address for risk assessment and to implement an appropriate new security paradigm.

Context and concept is reflected by purpose and format. Information is presented in varied formats, and these formats convey meaning in addition to the content within. Format includes the encoding method, the language used, the presentation attributes, and structures. Our language for defining format is sufficiently imprecise so as to be unable to differentiate the information encoding methods, the characters used to represent the information, and from the language layered on top. For example, information is often reflected by a two-dimensional or three-dimensional barcode. A barcode is a format. The information reflected by the barcode is generally encoded within a binary code mapping into either numerical symbols, a human language, audio, video, or enwrapped inside compound data structures. The ultimate mapped human language, for example Creole or French, is not likely to be obvious or even distinguishable from each other without derivation of the context.

The difference between Creole and French is not apparent but could be important. They are both rooted in European languages, but word or phrase meanings are different in each. Spanish and Portuguese are other European dialects overlapping both French and Creole, and can be mistaken for either. The differences within dialects are not always apparent. It is important in different markets. These differences go beyond spelling presentation and pronunciation and include idioms.

For example, cojer (to take or get) is offensive in most Latin Spanish dialects, and some listeners will not be forgiving of the speaker.

Punctuation—Context alters Concept shows even the exact same words and picture could result in diametric interpretations with different outcomes. The specific information could be a key, index, or actual information with a standalone value, a contextual meaning, and some inferential meaning. A key or index indicates the actual information must be looked up within a database or list. The standalone value could represent a compound key, such as an UPC code, which both has meaning within many databases and lists but also more practically within a direct or immediate context. An example is a lot number, source location, destination, product counts, manufacturing date, expiration date, shipper, receiver, warnings, etc.

The issue of representation by barcode becomes abstracted one more step with technologies such as RFID for encoding barcodes into invisible radio waves. The RFID could be visible on the surface or hidden inside packaging (much like the XPS metadata hierarchy), yet easily readable by contact or within a minimal distance with the correct energy frequency. The returned data could be binary or encrypted, or in extended form contain additional volumes of information in binary or encrypted forms.

Recognize that the information is nevertheless available although wrapped within many functional and semantic contexts, just like the DigitalDoors multitier hierarchical overlapping tag structure. The paradigm for information security must adapt to reflect effective security. The centrality of content, context, and concept is critical for establishing security and enable information sharing. Granular content control applies not only to the risk assessment and the protection of information content, but also to the structure of information too.

AA.5.34 Implementing of MS Office

Security flaws within Microsoft (MS) Office Suite result from ill-conceived data structures and because of the very integration that makes the Office so useful. Microsoft cannot repair these security flaws with bug fixes or security patches. Only a major overhaul by Microsoft of the suite and its constituent applications will eventually repair these flaws by altering the Office workflow and processes. However, practical and realistic solutions for risk-mitigation presented in this paper can be applied now. Neglect to address these flaws violates new privacy and security regulations and perhaps borders on malpractice.

These flaws are not the achievements of hackers and outsiders, although they can be exploited by hackers, competitors, adversaries, and data mining analysts. They result from fundamental design characteristic of all the MS Office Suites and each desktop productivity application separately. Every MS Office binary document contains confidential information. This ranges—from small amounts of information about authorship—to the editing history complete with deletions, reviewer comments, file attributes, and source and routing information—to extraneous baggage from documents previously edited during the same session. The unanticipated delivery of such sensitive information represents a serious and credible risk through the loss of confidentiality, repudiation of privacy, breach of secrecy, and exposure to organizational sources and methods.

This paper shows how to skirt these flaws. It defines the inherent application security risks and demonstrates offsetting security methods. The positive focus is on document security and controlled presentation. While encryption is a partially effective solution, it is just a point solution even when extended by public key encryption (PKI), Kerberos, or digital signatures. Encryption of MS Office documents hides integral risks until the documents are actually viewed, printed, edited, or emailed. Encryption breaks most workflows that are the stated business goals for the Microsoft collaborative environment. Because of these security lapses, creating and implementing MS Office security, as explained in this paper, must be implemented through a multi-faceted change in behavior. It is also implemented by altered workflow process tailored to specific needs of each organization and attention to presentation formats used for distribution. This paper shows methods to secure MS Office documents despite these fundamental security design flaws.

A multi-faceted security workflow process becomes an issue over control of distribution by document type, recognition and categorization of all user content defined by security exons, removal of non-coding or non-activating security introns, preparation and distribution by clearance levels, content certification and accreditation (C&A) subject to conversion to primitive and certifiable file formats, distribution in print-representative-like packages, with guarded ingress and egress of Office files. Finally, implementation of security through granularity of MS Office node elements by analysis for inclusion and exclusion is a far more effective method, permitting collaboration within a multiple-usage infrastructure.

AA.5.4.1 Microsoft Office Suite and Applications

The preeminence of MS Office in terms of functionality arrived with Office 95. That version was sufficiently functional to perform most desktop office processing and management tasks, and derail competitive sales of WordPerfect, WordStar, 1-2-3, SuperCalc, Ventura Publisher, XyWrite, AmiPro, MultiMate, and so many others. The innovative object-oriented hierarchical data model first deployed with Office 95 is now fundamental to all versions of Word and all MS Office applications. Yet, this data model itself creates fundamental security flaws. Feature and functional advances since Office 95 clearly have value, but are increasingly aimed on workflow efficiency and integration. Microsoft Corporation markets Office as a platform for delivery of new services within a collaborative environment. While security is a stated strategic objective for Microsoft in terms of is Trustworthy Computing Initiative, a lack of fundamental security design and ill-conceived workflow processes within Office undermines this objective. As such, MS Office represents a critical but widely-used commercial off-the-shelf (COTS) platform with significant inherent risk because of workflow and object data model design flaws.

AA.5.4.2 Repress Thoughts of Banishing MS Office

Achieving Microsoft Office application security is significantly more involved than obvious. MS Office applications represent vulnerability risks at the file, operating system, process, and workflow levels. No single approach for security is sufficient. Banning MS Office applications and MS Windows does not organizationally, politically, operationally, or even economically represent a viable security formula. The use of MS Office applications is so widespread that any outright ban does not preclude delivery and reliance on these file formats and processes with any number of overt, covert, accidental, or engineered risks. In fact, alternatives include "work-alike" macro-language functionality and file format support. The core security risks inherent with MS Office have been coded into other such products, as well as most other desktop productivity tools and COTS products. Work-alike competitors include Sun StarOffice, 602 Software Office Suite, WordPerfect, Lotus Notes with 1-2-3, and other OS-specific tools, such as MS WordPad delivered as an MS Windows applet.

Use of older technologies or a rollback to older technologies in order to improve security is professional sabotage and undermines the increased white-collar efficiencies observed with MS Office. It creates at best a false sense of security due to the pervasiveness of MS Office documents; you could avoid creating them, but you certainly will receive them and need to respond to them in kind. Furthermore, security solutions must also reflect the need for ongoing user support in products, usage, and processes. For example, Microsoft has specifically stated it will not issue an INCLUDETEXT patch for Word 97 because it is no longer a supported product. This reinforces the notion that addressing security flaws is a process with currently supported and evolving products rather than a collection of point fixes and patches for released products.

AA.5.4.3 Office Versions, Releases, and the Data Object Models

MS Office is a security risk because of the interaction among the MS Office applications and documents, the creation of metadata in binary document file formats, and the shift from one of results to that of a reentrant and ongoing process. Document data has expanded from simple linear files to complex object-oriented structures. MS documents are black holes. Basically, what goes into them at any point usually stays there. Additions, deletions, system information, redlining, reviewer comments, and routing become indelible parts of each document.

Many different versions of MS Windows, server extensions, and many releases of MS Office or its constituents complicate security. Application features, bug fixes, security patches, and $3^{rd}$ party add-ins complicate the nightmare when assessing and ascertaining the exact composition of the MS Office environment. Client-based applications, such as InfoPath, Outlook, Outlook Express, Internet Explorer, the various scripting languages, plus server-based applications including Exchange, SharePoint Server, Net Meeting and Live Meeting Whiteboard, Live Communications Server enhance the collaborative physical coverage of MS Office but also correspondingly increase security and privacy risks.

The MS Office document is forwards and backwards compatible across MS Office releases. This means that Office 95 can open and alter Office 2003 documents, and Office 95 can open and alter Office 2003 documents. However, "dead" internal structures are defined in obsolescence and new structures have been added to the newer versions. Cut and paste among the Office applications adds non-native structures too. Therefore, results from file conversion, raw data, metadata, links, macro code, and structural elements can be hidden accidentally or purposefully. It also possible for a sophisticated user to create new (see the sidebar on security introns) and undefined covert structures (see the sidebar on security exons) ignored by all extant MS Office versions and tools, visible or activated only by complex steps, since MS Office does not validate the integrity and applicability of internal structures within a document binary file.

Security that is part of MS Windows or MS Office, such as user passwords, file passwords, password-protected databases, file encryption, and range protections are not sufficiently effective. Even the Windows Encrypted File System (EFT) and Active Directory (AD) merely postpone inherent risk until files are distributed outside the perimeter of the encryption system. Other methods defeat overt security. A large number of tools recover passwords and unlock encrypted MS Office files, zipped files, adobe PDF distributions, or reverse engineer and open FAT, FAT32, and NTFS files. An Internet search with a browser or a file sharing program will uncover any number of freeware, shareware, trial, commercial, and pirated tools to do just this. Furthermore, collaborative sharing of an MS Office file requires that any such file passwords be divulged to open the files; this exposes all the hidden structures, metadata, and security risks inherent in the document or referenced resources.

It is important to recognize that there are many file types and document structures associated with MS Office, specifically defined by the formal MS Office documentation at msdn.microsoft.com but also those shared with other MS Windows applets and competing products. Each MS Office application, such as Word or Excel, create file binaries or binary files with different object structures but interchangeably read/write and import/export each other's file types, embed portions as formatted text or complete objects, or link through remote procedure calls to these other file types. These object model structures are generically called the Document Object Model (DOM). The DOM is another term for an object-oriented data storage package.

The purpose for the DOM with hierarchical storage of metadata is three-fold. First, it is useful for backwards and forwards version compatibility. Second, metadata extends the document creation session from one-time event into an ongoing revisional process. Third, metadata provides order and structure otherwise notoriously difficult for inherently free-form and flexible documents.

Metadata provides backwards and forwards version compatibility, a problem that plagued the software market of the 1980s as upgrades were frequent and disruptive. This is specifically missing with Access and its .MDB table space/workspace metaphor. Frequently, software upgrades included old data upgrade routines to convert old formats to new. This was both risky and prevented reversion to the older software version once the converted data was used in the newer application. Metadata provides the necessary blueprint, format, and structure retention so documents can be revised in future editing sessions. Try creating a complex document in Notepad, which is a plain-text editor, to understand the desirability of maintaining other channels with document information. It is just that these other channels with document information are packaged in the same file binaries for all Office applications. Consider how difficult it could be to reset type characteristics every time you reopen a document. This information is part of the Office metadata, although style sheets and schemas maintained in a different storage channel are valuable in HTML and XML and might aid the future transition to a secure MS Office.

It is incorrect to assume a static basis for any MS Office application document structure, as a monolithic MS DOS-based file, or as an in-memory object. For example, the Excel DOM can be embedded inside a Word DOM, which selectively can then be pasted as a formatted object into a PowerPoint presentation. Because of this workflow, simple tools and methods will not eliminate the security risk. It is not just a Word problem; law offices using mostly Word probably represent the simplest security exposure. That is the exception, of course. In general, you have to address the security through each DOM individually.

Each version of MS Office supports different object models, each application with the suite has a different base object model. In other words, while some features in Word 95 are still supported in Word 2003, other features in Word 95 might have atrophied and are no longer supported in the same way or even not at all. In addition, Word 2003 has wholly new features and corresponding extensions to the object model not recognized by Word 98. This demonstrates that metadata is version-specific and hidden when another version is upgraded with a newer one. Another concern that arises in almost every Office document is imports, pastes, and OLE imbedding of other Office documents and aspects of the object model corresponding to that application type. For example, a base Word document with a spreadsheet and Project waterfall chart now includes editable components referencing a different Office applications with data in a structure referenced by that corresponding application object model, in this case Word, Excel, and Project.

Not all the MS Office risk vectors can be explored with Notepad. Most of the metadata is not visible ASCII text but rather encoded binary data and complex structures. Locate a hexadecimal (binary) editor at www.sf-soft.com or another forensic tool web site. The utility of forensic tools is critical to security success because of the complexities of desktop and server workflow, and also because of the document structure itself. Binary pointers list the locations of document node elements and other pasted or embedded data structures. Although WinHex is useful to demonstrate several hidden security flaws in MS Word, the simple hex editor only reveals the content of a simple DOS file or Word file as a monolithic storage unit. In reality, that DOS file is backed up, replicated, written, rewritten, and stored in duplicated extents throughout machine RAM, system buffers, and disk blocks and sectors. MS Word "fast saves," versioning and plain backups create a melange of risk vectors that transcend this paper, but are nonetheless relevant to anyone assessing system, MS Windows desktop, networking, and network neighborhood access control and security issues. Security really is a metaphorical ice field, and what you do not see and are unaware of can be catastrophic.

Microsoft is aware of these flaws and has published these thirteen categories of dirty metadata:

| Table of dirty meta data |
|---|
| Name |
| Initials4 |
| Organization name |
| Name of originating computer (desktop) |
| Name of network server and/or hard drive |
| File properties and summary information |
| Non-visible embedded documents |
| Names of previous authors |
| Document revisions |
| Document versions |
| Template |
| Hidden text |
| Author comments |

Some of this metadata is accessible through the Office application menu interface through menus and dialog boxes. There are also the document file properties exposed by the Tools/Options pull down menu and the User Information tab, this does not mean that this dirty metadata can be removed through menus and dialog boxes. Some of the metadata persists indefinitely.

This is not the complete list of metadata. There are other categories of revealing metadata also known to create security risks but not fully disclosed by Microsoft. Consider reviewer comments and redlining workflow. This often includes embarrassing suggestions and the routing of the reviewed document. Other visible metadata with confidentiality risk include:

Footnotes
Cross-references
Table of Contents tags
Indexing tags
Hyperlinks
Smart tags Expect x-link and x-pointers plus style sheets and schemas within documents saved in the XML format. In addition, other undocumented structures are part of the extended and expanding Office document object models. Consider fields and mail-merge fields, which are markers for information automatically inserted by Office or by a user when opening, saving, printing, or emailing documents. These fields create a built-in facility for careless information disclosure or overt hacking. There are also the document file properties exposed by the File/Properties pull down menu. This includes:

File/properties
General
Summary
Statistics
Contents
Custom

Other security risks are not specific to MS Office. The techniques for information camouflage are equally valid in most any desktop application, and are most relevant to presentation output rather than binary file delivery. Information camouflage includes text set to small font sizes, such as 0 or 1, fonts set to type unlikely to be installed on the system which map to symbols or line drawing, PostScript or Unicode font sets with alternate encoding, and font color set to match the paper color or an applied background. White font on white paper hides text, black font on a black border or shading hides text too. Text can also be hidden with graphics when the graphics are anchored to a specific location congruent with the text. Color games with text and graphics also hides the text.

Macros, VBA codes, VBA add-ins, and applets also represent a security risk. Anything than anyone can imagine as an application can run from within MS Office, productive or destructive. Usually, these bits of code are stored as part of the document metadata. However, they also can be out-of-channel files. Either way, they can be compromised by a new code that overwrites the original. They also can be inserted through fields, formulae, or menu add-ins. Collaborative tools are the most obvious entrée, but Windows security flaws also provide some interesting opportunities for Office security exploits. Code flaws affecting MS Office are beyond the scope of this paper, but are explored in the book.

New features in Windows and other Microsoft digital rights management (DRM) applications, such as ORAPI, ADSI, and MS IRM provide for collaboration, resiliency, and complex versioning and backup far beyond the capabilities of MS Office. As such, many new security risks are exposed; implementation of MS Office security within a collaborative environment is beyond the scope of this paper.

AA.5.4.4 Content Security

The differentiation of content within an MS Office document based on initial owner and target distribution is important for information sharing with coalition or business partners. Some content will be strategic, some tactical, and other content can be downgraded by censorship of information such that only target parties in-the-know can understand the context. This is accomplished by downgrading the content with a publishing format change, element removal and exporting within a new provably-secure format. Downgrading is a process well-known to the military, anyone who prepares of documents for release under the Freedom of Information Act (FOIA), paralegals who are in the known and deliver case information to the courts, and anyone censoring privileged or trade secret information from distributed documents and email.

For example, faxing a Word document to a legal adversary is acceptable since the image is a controlled and published representation. However, delivery by WinFAX delivery of the editable binary file is unacceptable. WinFax integrates easily with MS Office and has that file delivery capability, which should be avoided for security reasons. As another example, if legal eFiling rules necessitate delivery of a document within a binary document format, the MS Office document can be created as a printed paper or file (Print to Text, Print to PCL, or Print to PS MS Windows driver options), output to a TIF image, print to an Adobe PDF file, or exported through a filtering sentinel as an ASCII test file. Note that the MS Rich Text Format (RTF) is not suitable because the RTF format also includes metadata. If font, table, and presentational format must be preserved—since ASCII does not support that—any image output is a good choice. However, be aware that postscript, Adobe Acrobat, and even images can be reconverted to a formatted binary document with conversion tools and optical character recognition; all metadata, edits, redlining, versioning, and workflow will be not be recovered, of course, which is the essence of locating MS Office security flaws and implementing security.

Content of MS Office documents transcends the actual presentation as a printed page, slide, spreadsheet, database report, email message, an index of documents, UML: or project waterfall, or organization chart. Microsoft Corporation is positioning Office as a platform for delivery of new services; it is not just about a PowerPoint presentation or a Word document printed to a facsimile. The DOM is a project plan, with a structure, with components that do things and are sensitive of their own.

Recognize that MS Office security is also a cross-platform issue. Inclusions could be aimed at Macintosh, Unix, Linux, or other operating systems and even other document applications. Delivery of any MS Office document can represent a security on egress by containing proprietary data and functions or by ingress as a carrier for a virus or Trojan virus. Even Outlook email with its potential for rich-text formatting, HTML or XML content, links, inserts, and file attachments carries the entire MS Office risk with it to wherever and on whatever platform it is received. For example, the MS Office document could include an attack on a Linux-based SendMail server or client. While metadata and redlining contain sensitive data, when integrated with webDAV interchange, InfoShare, Exchange, and other collaborative environments, they also contain workflow and traffic content which can be equally sensitive. For these reasons, it is important to explore the MS Office DOM risk factors:

Content classification
Tagging
Clearance level
Data mining
Traffic analysis
Inference
Encryption
Digital Signature
Document access linked to Fortezza, PC Crypto cards, smartcards, and n-factor authentication
Granularity
Strategic info
Tactical information
Common Criteria or NIST analysis
Covert channels
Bell-LaPadula model conformance Content classification occurs with tagging for formatting with bold, indexing, and paragraph marking, explicit element tagging for HTML and XML or database and spreadsheet table, field, ranges, row, and column designations, as well as authorship techniques, such as " . . . describes the formal issues of security introns in the next section . . . ." Formulae and macros define ranges with informational content, as well as indicate purpose and intent of the process as well as the target data. When content is tagged at the sideline, as in "eyes-only," or within-the text with any label name for clearance level, as in "<1>," this attests to a security level with an importance that exposes security lapses.

Although MS Office 95 reached the utilitarian level of adequate functionality, the new features of MS Office and the inclusion of photographic manipulation, pixel editing, vector graphics, charting, data sorting, Find and Replace, indexing, tagging, smart tags, links, and collaborative integration through such as OneNote, InfoShare, Outlook, and Exchange expose the MS Office documents file store individually and in aggregate to data mining techniques. For example, a subtotal of employee salaries within a pro form a business plan matched against a list of employee names compared to a bank check ledger gives away each employee's salary level; each document in isolation does not give away information until several are merged and analyzed together. Direct analysis through record relationships and sorting is one type of data mining, human intelligence through inference or statistical inference with set theory or Bayesian methods is yet another. For example, because you know that 6 employees are traveling to a conference in D.C. and two others are not in the office, you can approach a particular person who by inference is manning the station desk with a very specific social engineering attack.

OneNote, InfoShare, Net Meeting and/or Live Meeting, Outlook, and Exchange with MS Project also enable workflow routing, group editing, and acceptance signoff. This information becomes part of the document metadata so that traffic analysis shows where the document originated, what changes were made and by whom, how it was routed by username, network, and IP address, who has seen it and has access to it, and all process flow and comments. One of the secure prizes of organization information thus unintentionally published is the names of people within the organization and functional roles.

Encryption, digital certificates, digital signatures, biometrics, and USB or other hardware Fortezza access devices bind into workflows, access to applications, and access to specific files. For the most part this represents and all-or-nothing security. An encrypted file means you cannot access it until it is decrypted; since MS Office files are non-linear, partial decryption is more likely to prevent it from being opened by any MS Office application. Once the key is provided, the cat is out of the bag. If multiple users get the same key, it is likely that key will float around freely. Encrypting a document multiple times for each user intended to access it is a workflow nightmare. Furthermore, encryption packaging does nothing to provide egress or ingress security, or handle the granularity issue. Encryption is effective at a low level or when combined with the other methods described in this paper.

Security through granularity of MS Office node elements by analysis for inclusion and exclusion is a far more effective method. Multiple source documents create structure and semiotic meaning not in evidence with subsets. This process breaks the context to prevent useful data mining, routing inferences, and the more powerful semiotic information methods. It allows for the separation of strategic information from the tactical, so that access is granular by role, user, and other discriminators.

Many academic and implemented security models are in use today, both as a straw man and for certification processes. This includes the Common Criteria, NIST certification, and the Bell-LaPadula security conformance model. It is well that you know about them, but for the most part they do not explain or provide insight into how to protect MS Office documents. These models assert the need for air gaps between organizations with different security levels, but do not provide a means for information sharing as legislated by the 2001 Homeland Security Act or normal organizational collaboration or data processing workflows. While they do address the potential for covert channels (insertion of content in alternate formats or encoding) and how to protect against them, the methods are not effective except at a very superficial level. If you review the "covert channel information" you should understand the difficulty in maintaining security to thwart virus transmission. Instead, MS Office security must be implemented at an intron level, as described in the next section.

AA.5.4.5 Implementing Document Protection

Several steps are prudent to enable MS Office document protection. The first step is have a network guard that filters all incoming and outgoing traffic for MS Office document files and quarantines them. Spam and virus filtering is necessary to preclude system, resource, and file exploits. URL filtering, quarantine lists, black lists, white lists represent the minimum responsible approach. Ingress files can harbor viruses, etc. Outgress files can harbor privileged information at any and all levels of the DOM. With a means to filter and check every node for purpose, content, metadata, formats, structure, comments, links, and so on, there is no other way to vet the integrity of the file.

It is insufficient if not impossible to remove metadata. Removing metadata from the files binaries often irrevocably corrupts files—so that they will not print, save, or be in any way recoverable with the automatic corrupted file recovery tools. The only complete answer is to walk the object model and assess the purpose and content of each substructure, inclusion, or node element at a granularly content and functional review. By the way, this makes it possible to vet a document as provably secure. The document can then be published, exported, or recreated within a new context suitable to the organization workflow and security needs.

MS Office is not the only application to rely on a document object model. Most other modern desktop applications utilize the same backward and forward extensible structure, but characteristically create similar security risks. The installation object content for Adobe Acrobat, just the authoring tool becomes a visible part of every mastered Acrobat file even though it might not be any part of the source MS Office document exported as an Acrobat package.

A number of well-meaning efforts available to scrub MS Office documents represent partial solutions at best and a false sense of security at worst. Microsoft posts a Knowledge Base article on metadata (MSKB Q 237361), the help note, "Get rid of tracked changes and comments, once and for all" and a commercial product called Metadata Assistant automates these generic processes. The promise is not a full solution; it is partial at best. These solutions might get the metadata in the master document, but not find the hyperlinks, the subdocuments, or confidential information still in plain view. Since a typical document is compounded from more than just Word and Excel, and often is part of a process, as in Outlook e-mail with document attachments, scrubbing has to get each piece and walk the object model for content.

However, that said, this is the current collection of methods for offsetting MS Office security flaws.

Start with a Clean Template
   1. Write-protect templates
   2. Attached template(s) or styles for other MS Office documents
   3. Normal .DOT
   4. Clean up .DOT Edit Cleanly
   1. Disable Versioning
   2. Disable Change Tracking
   3. Periodically "Accept Changes" to purge change log and save or save as
   4. Disable Fast Save
   5. Patches for "Unwanted Data"
   6. Do use comments, not hidden text
   7. Do not use footnotes, end notes, table of contents, index, links, Remove References
   URL
   Hyperlinks
   Pointers
   References
   hidden text, headers, footers, footnotes, endnotes, tables of contents, index, links, can establish a context or cerate a semiotic inference to other documents or sources
   Paste . . . do not embed
   Publish . . . do not send a file
   Print
   Fax as image (not as binary document in WinFax or eFax, etc)

Start with a clean DOT template (Word) or whatever the new document type is for the specific application. The Normal.DOT or New Spreadsheet.XLS on the MS Office distribution CD is safe. In Visio, for example, start with a new chart. Older documents saved as templates tend to accumulate unanticipated metadata. If you must use a non-standard template, clean it up. View it as both a printed document, as a binary file, and as a document object. Write protect the templates, or better yet, store the templates as non-modifiable networked volume. If the templates are used throughout the organization, create a network store for them and configure each user's installation of MS Office to look there for the templates. Search the network for duplicate copies of these templates and eliminate them.

If you change from any version of MS Office to another version—this can be a regularly upgrade or a even a downgrade—create new documents and cut-and-paste parts of prior documents into new ones. Lose the older files and templates. If you receive or open an Office document in either an older or newer version, create new documents and cut-and-paste parts of prior documents into new ones consistent with the MS Office version that you use.

Edit cleanly. This is not a single step but rather a process, both one time and ongoing. Realize that the MS Office risk does not go away, so security remains a daily and ongoing battle. Disable versioning to prevent a buildup of past versions of the document. With versioning, prior sessions will be stored as document.doc 1, document.doc 2, and so on. These tend to get entwined with the latest version. If workflow with InfoPath, Outlook, or other collaborative workflow tools creates duplicate copies of the source document file for each user, then configure the system to store a single network copy instead. Preserve an audit trail and backup with a system backup rather than versioning. Disable change tracking to curtail the embarrassing buildup of additions, deletions, and changes that transcend the publishing intent of the document. If this redlining is necessary, establish guidelines—and stick to them—for periodically accepting changes to purge change log. Use the command to save the document without the change log with File/Save or File/Save As . . . Do not rely on fast saves, timed saves, or file recovery after a MS Office crash to purge the dirty metadata. After a crash, reopen the document, save the document under a new name. Close the Office application. Delete the old file precipitating the crash. Rename the new file under the old name. Reopen the Office application.

Make a conscious and active decision to install or ignore patches. There are a number of Office updates, usually called "service releases," that fix bugs and security flaws. However, patches will not repair the fundamental security flaws within MS Office. The last substantial security patch was for Word 98 for Macintosh called the "patch for "unwanted data" that fixed the situation where data and metadata from one document window got into other documents opened in other windows through a multiple document interface or sequentially during the same session.

Use comments instead of hidden text. It is documented as a feature so it can be found rather than accidentally uncovered. Hidden text with a font color change or font size change looks like an artifact that most users will ignore or delete. It can be discovered with Edit/Find or Edit/Find and Replace after pressing the More button. Specify font settings of 0, 1, or 2, or font colors of white, black, etc. in order to locate materials so hidden. It is not easy, but you could automate this process with a Word macro or VBA add-in.

Avoid the use of headers, footers, footnotes, endnotes, inserts for table of contents, index and the like. These appear only in the printed output unless specifically viewed from the View pulldown menu. Such links also create a lot of dirty metadata beyond what is visible even during editing that persists until changes are accepted.

Remove references. This is subtle, but very important when documents are specifically posted or even inadvertently listed on web sites. References include other files, documents, hyperlinks, and other possible embedded formatted materials. These references create the ability to infer quite a lot about the purpose of the document from other related documents in the same directory, by the same authors, and the types of other documents. For example, a spreadsheet stored with a report that is not overtly included in the report suggests that is source material that has not been reviewed with an eye towards privacy, security, or client privilege.

Paste images, cut text, formatted text, pie charts, record sets, slides, waterfalls, milestones, organizational charts as plain text or an image rather than formatted Office objects. When you embed or paste as an object, all the metadata baggage from the other Office application is now added to the metadata in the target document. Since that metadata baggage is not native to the target document application, it is inaccessible and truly hidden. Tools, such as Metadata Assistant will not find Excel metadata within a Word Document, Word metadata within an Excel spreadsheet, and none of them within an Outlook note or message.

Publish your presentation. Do not send a binary document. Although "Publish" is a new feature to Office 2003, the intent is more important. Publish your documents in every MS Office application whether Office 2003 or prior. The process for publishing is to create a new distribution and delivery format limited to the visual presentation elements containing none of the blueprint and none of the metadata. In simpler words, create a new output version of the document. Print it on paper. Print it to a file. Print it to an image. In some way, alter the format to preclude the DOM with the document blueprint and its metadata. You do not need the blueprint for a presentation; the presentation is the final product. If you need to send a presentation for revisions, regulation review, or continued workflow, change the binary document format. Printed documents can be captured formatted by optical character recognition, such as with OmniPage. That is fine. Text files can be read by Word. Spreadsheets as text files can be imported and formatted by Excel. But, do not send the original binary file. Do not convert Office documents into .RTF files as these still retain metadata. Create comma-delimited files, if you must. If you want formatting retained for revisions, flush all pending revisions, copy the document in pieces, paste into a new document, and save it as a new document. The proper concept is to recreate the MS Office document in a "format-neutral" file to remove blueprint and metadata.

Unfortunately, creating neutral formats is a very difficult task unless matched to the organizational workflow processes. Saving a Word document through File/Save As . . . as a text document is format-neutral, however, you will discover that the document has no fonts, headers, and style whatsoever. You will also discover line feed problems disrupt it and make reading it a chore. This is part of a content lifecycle issue for an organization. You would need to know how the documents are used and why and where; workflow could well dictate XML with a style sheet as a better format-neutral deliverable. It all depends on specific organizational needs.

Be aware that distributing your document, with such as WinFax or Efax, or using a remote control program, such as Laplink and Metaframe, to a user with the same application is likely to receive the file and not the presentation image. Be aware that document attachments in Outlook email or routing documents through InfoPath moves the binary document (or a complete copy of it) and not its presentation image. The use of Net Meeting or Live Meeting when sharing the desktop reveals Office metadata and has the functionality to transfer files among participants. Either way, publish presentation images in advance to prevent that security lapse and use the presentation materials only. If you must edit the sources, do so only after the collaboration is terminated.

Publishing Office documents to HTML, XML, PostScript, PCL, or Adobe Acrobat is not as safe as creating a presentation image. HTML retains DOM structure and metadata as markup tags and comments. XML retains DOM metadata as markup tags and comments, with formatting and structure as a resource definition file or style sheet. Security is dependent on the PostScript or PCL driver, although usually only elements that appear in printed output are converted to these files. However, font size 0 and font 1, black text on a black background, white text on plain paper, and hidden text are still rendered; this creates a security risk when the print file is viewed but remain unseen when printed or viewed. Acrobat uses its own DOM and creates presentation files with a combination of metadata from the source document and its own metadata from application installation. Although some output settings preclude printing, encrypt the output, and restrict ranges, be aware that many tools can recover Adobe passwords and restore Acrobat documents into editable MS Office binary documents.

Finally, content security through granularity of MS Office node elements by analysis for inclusion and exclusion is a far more effective method, permitting collaboration within a multiple usage infrastructure. This technology exceeds the scope of this paper, but is detailed with sample code and applications in the book. The process is to walk through each node of the object model, match the node to a Office DOM, match the node to a function or feature, and capture the contained information for granular processing. Unmatched nodes are introns, and are removed and quarantined. Matched nodes are exons; the purpose in terms of the presentation image must be established, or they too are removed and quarantined. Nodes that are empty, old, questionable, outdated, or irrelevant to the application and version are also removed and quarantined.

The information captured for granular processing is then viewed by black and white lists for inclusion in the presentation image. Although the security steps detailed in this paper are effective in maintaining security, confidentiality, privacy, and integrity with MS Office, the only method to counter Zero-Day exploits is granular control at the contact level, applying the attack methods as a level of analysis to locate security risks. Sensitive, private, privileged, confidential, or information with even an inferential basis is purged from the presentation image. This last step is a complex process given advances in data mining, set theory, statistical polling, Bayesian inference, and semiotic methods to expose meaning beyond the obvious, intended, or that possible when information is combined with other sources.

AA.5.4.6 Conclusion

This paper defined the inherent MS Office application security risks and demonstrated methods to implement security within the MS Office document structures. Creating and implementing MS Office security is therefore expressed as a process that controls distribution by document type, with removal of non-coding or non-activating security introns in the document, conversion to primitive and certifiable file formats, distribution in print-representative-like packages, with guarded ingress and egress of MS Office documents. Although the focus is on document security and controlled presentation, this is not the whole security issue for MS Office, but it is a substantial first step toward what is perhaps the most difficult issue in COTS security control.

A multi-faceted security workflow process becomes an issue over control of distribution by document type, recognition and categorization of all security exons, removal of non-coding or non-activating security introns, preparation and distribution by clearance levels, content classification and data mining, content certification and accreditation (C&A) subject to conversion to primitive and certifiable file formats, distribution in print-representative-like packages, with guarded ingress and egress of Office files. Finally, Implementation of security through granularity of MS Office node elements by analysis for inclusion and exclusion is a far more effective method, permitting collaboration within a multiple usage infrastructure.

AA.5.5.0 The Contextual Information Matrix

Sensitive content, and in particular, personally identifiable information (PII), does not exist in a vacuum. It exists within a container (e.g. framework or structure) defining its shape, size, format, purpose, relationship, ownership, integrity, acquisition technique, half-life, disposition, application, attributes, and properties. This container is both relative and subjective, as well as situational. This data container is sometimes explicit when rigorous definitions delineate the content, but sometimes only implicit when tied to context by application and purpose; it is determined by data structures, XML schemas, field formats, tags, memos, comments, or notations, or by the matching applications built to access the specific data. It is modified by a function, framework, network, service environment, and workflow. This container is an information matrix that needs security itself to protect security and integrity of sensitive and PII content.

The information matrix is evolving past simple prefabricated record structures, grids, database tables, and linear or tabular formats, and all other such simple formats into a hierarchical structure not unlike DNA. Extraction of sensitive data, and in particular PII, from the information matrix is only a partial security solution. Context must also be addressed, including the container and relationships. Consider the following:

Even if the container were empty, you would infer the missing content. It is not sufficient to extract the content without addressing context. The specificity of the container defines the likely fresh egg content. The container—alternately—could contain chocolate in egg shapes or bunny rabbits but only with intended inference to fresh eggs. The container could be recycled with nuts and bolts, but also only in reference as a recycled container of eggs. Situational placement is also relevant to context and content. A box in a grocery store or refrigerator implies eggs, a box in a candy store or coffee table implies candy, while a box in a workshop implies a sorter for loose parts. Any printed properties and attributes merely modify the quality of the content or adjust the perception of the content quality.

For example, farm source, brand name, size all convey integrity, quality, ownership, and intended application. For another example, a clear plastic matrix indicates some enhanced visual value supposedly obvious. Just as contextual packaging conveys meaning about the contents, packaging effects the knowledge of data content too.

The contextual information matrix conveys knowledge about the content—to a greater or lesser degree. The risk is to presume the lesser degree with a corresponding resulting failure to provide adequate security to sensitive data or privacy to PII. The failure to repackage the container itself or redact the context properties and attributes that define it compromises any and all security. Although perfect manual re-identification is unlikely, statistical methods yield functional results. Just as it is easy to look around and find the eggs or emptied shells to repopulate the container, forced re-identification with content into the information matrix by size, format, and index emphasizes the requirement to repackage the extracted content, context, concept, attributes and properties. Where security of sensitive data or privacy of PII is required, the information matrix represents a risk through aggregation, inference, and interaction that requires the same level of attention as the sensitive or PII content within. As a result, the content container is an information matrix that needs security itself to protect the security of the sensitive content and the integrity of PII content AA.5.5.1 Future Direction for Information Awareness The Pentagon's aborted Total Information Awareness program was aptly named, although its termination in no way safeguards anyone from the premise of data mining, aggregation, and inference. Other programs surely exist today and will exist tomorrow. Mistakes in data stewardship will be revealed, as they have in the past, showing that exploitation has given way to uncontrolled information irradiation. We are in a world approaching total information awareness in that fundamental data about people, organizations, processes, and information triggers is public knowledge or can be readily bought. Total information awareness is not so much about a government activity gone out of control—although government was the first to exploit the information glut—but a social, cultural, business, and control environment without inherent safeguards and sufficient signification paradigms.

The unique, limited, and single-purpose data stores of commerce and government of years past have become common, networked, and imitated just about everywhere. The danger is not from any single protected database but every single one of the public, private, commercial, and governmental resources which are out there. The data sources need not be electronic, and in some cases paper-based archives mask the availability and potentiality of the contents. Single-source paper archives are ripe for exploitation because authentication is physically impossible and its single focus precludes the force of authentication mass. Furthermore, total information awareness does not have a lock on fact or truth, but also can nourish distortion and complete fabrication. It is as easy to propagate lies as truth in order to obscure any difference between the two.

Small pieces of information, such as name, social security number, bank accounts, credit card accounts, address, phone number, genealogy, business relationships, fingerprints, biological data, and most of the facts used for knowledge-based identification (i.e. multifactor identification) are available from a multiplicity of sources. List brokers provide exact information. When exact information is not available, information can be inferred or statistically aggregated for precision. In many cases, accuracy is not even necessary because partial overlap of outdated information and prior addresses is sufficient for most vetting, identification, authentication, and authorization operations. Taken a step further, accuracy can be phony—built from a cut-and-paste montage of sound and video and data records. "Frankenbiting" is the process used to create a semblance of a story with true aspects. It is a reference to the creation of Frankenstein's monster from a collection of incoherence parts to create a seeming plausibility but out-of-control existence. The use of frankenbiting is often made in reference to the lack of reality in "Reality TV." It can be just as effective to lift a real identity, subvert the values of an identity, or invent a fake persona with elements of belief for acceptance. The canvas for fraud is not just art, jewelry, branded merchandise, but clearly now information itself. The message unit containing "He denied he said he was negligent" also contains "He said he was negligent" and "he was negligent."

Information necessary and sufficient for identity theft does not need to be available from a single source, but can be accumulated to create the necessary profile. This is true for personal, business, organizational, and government activities. Identity theft, per se, is not specifically the province of the individual personal identity; it can apply to any other physical or logical entity, such a owner of record of a building, the corporation, the ruling class, or a shadow controller. It is as conceivable to offload a ship—container, cargo, or oil tanker—at a misdirected port of call by electronically rerouting it and reasserting a fraudulent certificate of carriage and manifest in the big time without raising suspicions of captain and crew or port operations just as it is to steal a credit card, bank account, persona, or real property of buyers, sellers, bankers, brokers, lenders, and service organizations.

This discussion goes to the nature of information. Information is word with too many definitions to be comprehensive. Suffice it to say that information is data, a message unit, aggregation of message units, content, symbols, meaning, signification of meaning, knowledge, a denotation, a connotation, a designation, an indication, a presumption, etiology, or an interpretation. None of these definitions are correct or sufficient. We have a built-in bias that information is necessarily truthful, actual, correct, legitimate. That bias is logically false. In fact the presumption of legitimacy undermines much of the stock we place into knowledge and information processing.

Some of these "human" definitions for information are useful, but we require a more rigorous framework to proceed. We need to explicitly define terms and expand the framework of information from a collection of message units into a working system of information items with a mathematical basis that include a contextual relationship, a conceptual basis, a structure for functional transformation, and a delivery system. We talk about information contained in databases, but information is not confined, but rather temporary, transient, transitory, and in perpetual transit and transition.

AA.5.7.0 Unstructured Data

The issue of structure in data frequently arises when describing unstructured or structured database schemas. Structure is basically a taxonomy or ontology useful for ordering and describing the format, purpose, tools employed to access or process data, and process of data. Realistically, any simple or sensible definitions are relative because all data is structured, although that structure might not be evident. Lack of obvious structure is not proof for lack of structure. Structure can be in-channel or out-of-channel, just as information tagging can be in-channel or out-of-channel. The location of the tagging (or metadata) does not take from the tagging structure. It is really a context issue. Failure to address this undervalues information, the need for security, and the appropriate application of information for significant financial returns.

Structure is also amorphous and transitional. Consider z-ordered databases where slices are extracted or SQL is used to create records or transactional sets. The structure is a simple model of complexity, and utility is a simplification for practical application. The structure blueprint is itself a data set, in fact a metadata of the data itself. This metadata is an abstraction, itself subject to amorphous and transitional representations. Thus, while data is relative, its structure too is also relative. As these representations are transformed, the meaning, syntax, purpose, utility, and value of the data stream changes too.

In fact, the issue of structure perhaps oversimplifies how obvious the structure really is and how irrelevant to most issues the question of structure is in terms of assessing content, context, or concept. Unfortunately, that underlies the problems of information, security, and the value of information as an asset in the classical production model.

The real issue is about discovering that structure. This means discovering the utility of the information within different known, probable, and possible contexts and concepts. Some of these are likely to increase the perceived value of the information or provide repurposing opportunities with PII exposure. In effect, structure, per se, is a non-issue except as it relates to ease of workflow or assessing the risk inherent in information when implementing a security or privacy system.

AA.5.8.0 Information Measurement and Management

Information measurement is about assessing utility value and subsequent risk from misuse. Information has different value to different parties. Risk is the application of that value against intended utility. We can measure information by many dimensions. This includes:

TABLE

Dimensions for measuring information.

size
length
density
meaning
utility
ease of access
format
structure

TABLE-continued

Dimensions for measuring information.

- integrity
- authentication
- clarity
- precision
- distinctiveness
- comprehensibility
- risk
- loss
- cost to obtain
- cost to remake if lost
- cost to store
- availability elsewhere
- carrying costs
- auction value
- value to another party
- value to another party if and only if the other party retrieves it surreptitiously
- value if a close secret
- value if widely known
- value by general sale to anybody that chooses to acquire a copy Value is neither inclusive nor exclusive. It is certainly not definitive. Value changes with time, location, accessibility, context, and conceptual utility. Information has different value if it is a unique distribution, if it is a near copy, if is a facsimile copy, if it is an exact copy, if it is a digital copy, or a representative copy. We can measure the value of information to different parties in terms of the money lost, the lives it costs, or the disruption to normalcy it causes. We can measure its relative value based on who has it and who doesn't. Measuring information is relative, and always will be, but there are better ways to achieve it.

Information is both static and transcendent. Measuring information content is both about measuring signal to noise ratios, but also about the secondary value of information through aggregation, inference and interaction. Claude Shannon began the information revolution with his seminal thesis on information theory, but others, before and after, have recognized the complexity of expression, the many forms it takes, and question how it could ever be static. When we talk about formlessness, where formlessness is part of protection, security, and privacy, we talk about formlessness having a ying and yang, a benefit for you and risk when used against you. This is true with information, in the extreme as the economy depends more on intellectual input rather than material or labor. DigitalDoors recognizes this complexity of expression, the lack of stasis in information, and the complexities of transcendent meaning in information data streams.

Bits in a data stream represent a signal. Transmission and reception introduce noise to distort that analog signal. This is what Shannon measured. However, the signal is itself a representation for other things, such as symbols. Symbols in our world include characters, words in a sentence, blueprints, orders to build something, audio, or images. Audio and images are complex constructions rather specific symbols, and in turn provide a rich tapestry of meaning. Bits can mean other things too, limited only by our imagination or our technology to convert ideas into symbols, and symbols into concepts, and concepts into reality. Indeed, we are getting closer to technology than can fabricate things directly from ideas. If we can think it, we can make it. Story interpretation, literary analysis, symbolic explication are part of cultural experience and a rich part of our intellectual heritage. Simple meanings just do not exist. Simple information measurements do not exist, or at least they are not really part of the intellectual heritage.

There are currently 12468 three-letter symbolic entries in the DigitalDoors English language dictionary, from 'un, to <A>, to zuz and ZZZ. By comparison, there are 140608 unique possibilities with a set of 26 alphabetic characters with capitalization and 16777216 with a full 8-bit ASCII symbol set. The 12468 dictionary entries have at least one defined indication with a DigitalDoors context. That does not preclude the other 1674748 character permutations from having valid meaning and thus a measurable utility, permutations in other character sets, other languages, other encoding methods, or the 24 bits of numerical meaning too as numbers or index reference into any arbitrary database.

Note that 16777216 combinations represents only assignment within ASCII. The letter combination could play as a MIDI sound, a WAV sound, show as bitmap, convert to a long integer, or denote a real number with positive and negative values. It could also encrypt something else. Consider the number of possible encryption methods and possible encryption key combinations. The interpretations are literally endless. Meaning is more than a lookup, and more than a calculation. These large numbers provide some insight into the symbolic set space and the full range of meaning that must be considered when measuring the value of information. Furthermore, the contexts and concepts are conditional and fully relative to assessing value, correct, possible, probable, or misused.

Some of these DigitalDoors dictionary entries have a specific meaning, but most have multiple meanings. Most have multiple meanings that resolve only when viewed within a precise context. The key to meaning is like the Rosetta Stone, a stele that unlocks the mysteries of the symbolism based on a cultural context. Sometimes, we never have the explicit interpretation. Often, some of those meanings do not translate and do not resolve clearly; it is the subject of interpretation, literary analysis, and endless conflict. It is possible to measure the number of available contexts and create a statistical assessment of a possible meaning. That ratio can be subtracted from 1 (a common statistical technique for calculating useful probabilistic results), multiplied by sensitivity level assessment to create a risk measurement. This can be repeated for all the symbols in a data stream and aggregated into an overall risk summation. The same statistic is also generated for known contextual interpretations, ignoring the what ifs and the unlikely misinterpretations. This value divided by the first result yields a percentage, one possible indicator of information risk.

Value and risk are related, perhaps not by precise inversion or as a ratio of the complete value space, but both value and risk calculated this way provide useful assessment for DigitalDoors data protection through extraction and dispersion. This actually works and is functional. In fact, it underlies the DigitalDoors measurement technology that makes possible the implementation of the DigitalDoors security technology.

God, GOD, and G-d are three of the DigitalDoors dictionary entries. The meaning and the utilizing of this content is wholly driven by context and concept. It could plebian, blasphemous, religious, or ephemeral. Bad measurement is simplistic. Better measurement requires analysis of the likely meaning. Meaning transcends the three letters. Three letters is only three letters, just 12, 24, or 48 data bits, and technically cannot convey much value, risk, or signal information. However, the symbolism fills libraries, pits cultures against each other, underlies entire economic systems, and tends to have been a principle fomenter of warfare.

Under the concepts of Claude E. Shannon, information theory regards information as only those symbols that are certain to the receiver.

A unifying theory known as information theory was developed and became the subject of intensive research. Claude E. Shannon, whose initial ideas appeared in the article "The Mathematical Theory of Communication" in the Bell System Technical Journal (1948) defined information to include the messages occurring in any of the standard communications media, such as telegraphy, radio, or television, and the signals involved in electronic computers, servomechanism systems, and other data-processing devices. The theory is even applied to the signals appearing in the nerve networks of humans and other animals. The signals or messages do not have to be meaningful in any ordinary sense.

The chief concern of information theory is to discover mathematical laws governing systems designed to communicate or manipulate information. It sets up quantitative measures of information and of the capacity of various systems to transmit, store, and otherwise process information. Some of the problems treated are related to finding the best methods of using various available communication systems and the best methods for separating the wanted information, or signal, from the extraneous information, or noise. Another problem is the setting of upper bounds on what it is possible to achieve with a given information-carrying medium (often called an information channel). While the central results are chiefly of interest to communication engineers, some of the concepts have been adopted and found useful in such fields as psychology and linguistics. The boundaries of information theory are quite vague. The theory overlaps heavily with communication theory but is more oriented toward the fundamental limitations on the processing and communication of information and less oriented toward the detailed operation of the devices employed.

A Mathematical Theory of Communication, from us or locate it online at Bell Laboratories (Lucent Tech). The Shannon information theory excludes the inference of information, relationships to other information and symbolic expansion, or an extended philosophy with pragmatic, functional, intellectual, cultural, developmental, or conflicting bases. However, this is not enough on which to base information measurement. This is specifically why this is a problem. Just because the symbols are uncertain to the receiver does not mean that sender is in any way uncertain about the information, or that there is another intended receiver different from the actual receiver for whom this message is actually directed. This disparity opens up sending covert messages in the clear, meaning hidden in plan sight, or information with greater value than obvious. Risk measurement that does not consider the wider range of meaning is flawed. Security that does not consider this broader extension of meaning is security with leaks. This specifically is relevant to issues of aggregation, inference, and interaction, how the receivers interpret the context of formlessness, and also in the assessment of structured data and unstructured data because structure is context as well.

The character representation is merely the designation for a symbolic concept. The religious or ephemeral concept is also represented by many other symbols, images, sounds, and even material statues. The meaning is truly in the eye of the beholder, the cultural context, and everyone seems to have very different concepts; meaning changes by spatial location and time too. A marble of Pallas Athene on the Acropolis is probably about power, technology, and religion. Two thousand years ago, that message told about the demonstrated might of Athens as the superpower. Today, the message is much different, even though the information represented by the statue is still intact. It represents how even the mighty fall and how change is the only constant. That statue now in a French museum conveys the vision of beauty, humanity, and technology of an ancient civilization. It tells how the superpowers of today rewrite history and alter the very meaning of information itself. Information is not static content. Information decays, loses value as the culture or context changes, gets repurposed within new contexts, and is seen from within the perspective of new concepts. It is also dependent on other information for value. It is wholly contextual and conceptual.

One lamp or two lamps hung in the tower in the Old North Church in Boston of 1776 could be a mistake or an explicit symbol. Without the explicit context, the meaning is not interpreted, misinterpreted, or just meaningless. This was a semaphore code for local military response to the British Redcoat suppression of the continental American insurrection, one if by land, two if by sea. Furthermore, this code is only a code, with two possible values and an explicit built-in error-correction code of no lamps, the norm for the church tower. It does not imply, forecast, or indicate the plans based on such information, another concept once removed from the information signal itself. Information is full of such complexities, inferences, inherent cultural, linguistic, or explicit symbolism. Sometimes, symbolism becomes so commonplace that we fail to consider any other basis for an interpreted meaning. This underscores the power of a content-, context-, and concept-based information measurement and risk assessment because it is conducive to the changing basis of symbols and information in time and space or through cultural and intellectual definition.

If symbolism becomes an unknown, and unknowns represent huge risks, the symbolism needs to be interpreted as huge risks and not merely mistakes, noise, or irrelevant chatter. Lots of signals are purposefully hidden in noise or irrelevant chatter. This is hiding in plain site. Al Quaeda used wedding announcements in major newspapers, information hidden among chatter, to signal something based on a previously arraigned interpretation. Plain site must be parsed and evaluated against other contexts and concepts to expose hidden signals. Battles are fought not only with kinetic weapons but also with information. We need to measure information to assess its meaning and thus its risk.

Information is transcendent. Nevertheless, we categorize these contexts and concepts. Of course, they are not precise and do not fit cleanly into even one or multiple categories. We can however place symbolic information into multiple categories and count the possibilities or rate the likelihood of the possibilities. Multiple categorization is a little more complicated but computer automation makes it possible. Such a rating system can be tempered by experience, by the context and concepts of other information within the same or related data streams, or assume the wanted or needed purpose or utility of the process or organization. All of these increase the accuracy of classification (of acronyms, words, phrases, sentences, paragraphs, documents, representational data, sounds, images, and other multimedia) and likely address the intent of the symbolism. There are answers, they are not exact, but they are much more effective than none.

Transcendent meaning of data streams that comprise information is fact, and measurement requires a far more extensive and flexible assertion than the symbolic content alone. It must also include the potentials, defined, obvious, intended, or merely possible, as part of the measurement system. Meanings depend on the basis, and hence measurement on that basis. Time and location are part of that basis, both past, present, and future. Since we can only forecast the future, we must forecast the potential meaning of information into that future and the value it retains, aggregates, or has with decay as well.

In conclusion, we see measurement of information as a complex process that cannot be simple nor definitive. It is relative on many factors, both of time, location, ownership, and distribution. The more these factors can be included, the more effective and valuable the measurement process can be. It is transcendental above the content itself with a time, spatial, culture, purpose, and intent component that is modified by context and concept. Information measurement must include that potential for multiple alternative classifications, the potential for contextual changes, and the fact that value changes with time, the events that have transpired, and the human cultural condition. We recognize this complexity of expression, the lack of stasis in information, and the complexities of transcendent meaning in information data streams, and measure the value of information accordingly.

AA.5.9.0 MS Office Document Structure: Protection and Processing

The battle for data security has changed from protecting content to the battle for concept and context. Sequential text files are the exception rather than the norm. Flat, plain, and sequential files would have disappeared entirely from all but transitional processing steps except for the recent success of HTML web sites and the desire for storage of complex data into sequential XML formats. In spite of the apparent linearity of HTML and XML, in practice these flat files participate in a greater complex hierarchy of structured data mapped by object models. The object models blur the lines between content, concept, and context such that effective security requires a broader stroke than merely encapsulating content with encryption and limiting access with tokens or encrypted certificates.

Linkages to external files, style sheets, and embedded applications or scripts undermine the simplicity of HTML and XML flat formats and compromise point security. Even structured field or line and record-oriented file formats have given way to more complex data storage models. It is insufficient to view security of content and files in terms of encryption and encapsulation alone. Structured object models mix content with metadata and methods such that non-granular access—that is, either/or barrier-based access through encryption keys, dongles, and passwords—undermines any concept of effective security.

Furthermore, simplistic document management and access control overlook the multiple purposes for each compound data document and the adverse impact on organizational processes and workflows. Barrier-based security also fails from any Pacman-style attack, where the barrier, once breached not only provides full access to the once-protected interior also interferes with analysis of the attack and observation of how to prevent the ongoing attack. The Pacman attack and the DigitalDoors strategy to defend against it using viable and efficient methods is detailed by another white paper, The DigitalDoors Pacman Security Strategy Paradigm. Granular multi-level control of user data, metadata, data stored through the specifications of a hierarchical data object model, and methods underscores the new security paradigm. This transition is most pronounced in Microsoft Office documents, such as Word, Outlook, or Excel given the indiscreet distribution of source files. Office document publishing and Adobe PDF creation represents a minimal solution to the object model and metadata security risk.

All data sources important to data process workflow are non-linear, non-sequential, and not standalone in that the data sources are interconnected to or required by other data sources. This includes databases, structured documents, desktop application user files, hierarchies of data structures, and workflows. The most advanced data workflow and the focus of attention is the object-oriented models used in data processing today which comprise a cascade of events rather than a single point operation. This complicates security-related activities such as security, survivability, privacy, confidentiality, and anonymity, the trademark of DigitalDoors technology, and our contribution to improving the security of complex document object models and interdependent workflows.

There are only a handful of counterexamples to complex data structures, mostly monolithic file structures and simplistic processes. This includes text files, raw binary image files, and lists. These are typically inputs to older or uncomplicated computer activities; they do not reflect the complexity and interrelationships consistent with and necessary for most critical networked data processing activities. Examples of flat files are text files, binary images, and lists. Plain-text documents are used only as temporarily or as conversion paths for other activities.

Binary graphics are employed for their specific simplicity, speed of display, and small size. Note that they are usually stored in an inverted backward last-to-first sequence. BMP, GIF, and other formats represent the bulk of web images.

List files are rarely important and standalone files are often a temporary part of another process. One of the most ubiquitous of plain-text files, the HTML web page, is rarely a simple text file, but a circular connection to many other like files and one part of a more complex hierarchy. A relative of lists is the field-oriented record structure. This is usually a grid-like storage of linear data.

However, even this table grid, multi-dimensional indexing, SQL query concept is giving way to object-oriented post-relational database storage methods based on object models in order to augment functionality, speed of performance, cross-platform and application functionality, and compete with easier to use user and developer products. Even the image files are becoming increasingly complex. Hierarchical images formats with vector graphics compress motion and curves into small packages. Examples include Corel Draw, Macromedia Flash, Adobe Photoshop, and Microsoft Photo. These of course contain proprietary and unintentionally-distributed information. Increased reliance on reliable data storage infrastructure and networked storage technologies is enabling the transition to data storage based on object models. Notice the root, branch, and leaf paradigm of this principal data storage structure.

The object model refers to the layout or the map of how the data is potentially stored in what is definitely a linear file. The stored file is the document object structure containing the data whereas the model is the schema representation. The model is just a blueprint for an empty data structure. The data structure is stored as a binary file populated with data representing a subset of that blueprint. The data file is often referred to as the document binary file so as to make clear that it is not a plain-text file, not in user-friendly format, and generally readable by an ASCII reader only in discontinuous chunks. The model and the structure are not the same. The model does not represent a security threat in itself; it just represents how to find and define data stored within an actual data structure. It is the data structure in memory or stored as a file that is the security threat. Usually, the file containing the data structure gives enough clues to the purpose, methods, and sources . . . unless addressed by a multi-level security scheme attuned to the complexity of the object model. Although this "file" is stored as linear flat file, the extended structures is dependent on the hierarchical collection of potentially infinite branch and leaf references. Despite this complexity, there are clear reasons based on simplicity for this hierarchical structure, not the least of which is flexibility, self-documentation, and backwards/forwards compatibility.

The subtle differences between a plain-text file, a file containing lightly structured data, the schema, and a file containing data within an object structure becomes very important for security. When files are distributed and those files each contain data within object structures, workflow is complex and cannot be effectively protected with barrier-based security without complicating or disrupting operations. For these reasons, internalized security reflecting leaf content, structural paths, and the mesh of inter-relatedness among the paths, leaves, and external sources becomes the next paradigm for implementing effective content-level and application-level security. Consider the data structure defined by an object model as an organizing container. The contents within can be empty, or collections of containers, with more containers within. It is a security sieve with traditional encryption and the requisite inter-process workflows. The leafs and the security of the leaves does not secure a chain of evidence increasingly necessary in modern data processing activity.

Enhanced security must reflect this distributed requirement since the data sources are not single point sources, but complex relational, object-oriented, or hierarchical. In addition, data access and processing is approaching a worldwide distributed infrastructure, and completion transcends single places, times, and events. When the security problem is dispersed, the security solution cannot be monolithic either but must reflect the dispersed distribution and hierarchical complexity of the data and process. Location is not the problem, so metaphorical perimeter walls are not the answer. To treat security too as a monolithic, static, and walled solution when the security problem is granular and dispersed within a flexible timeframe misses its true need. Effective data security must reflect five informational attributes in a newer paradigm for security. These include:

TABLE

| new informational attributes |
| --- |
| Purpose |
| Sources and methods |
| Ownership |
| Date or timeliness |
| Content |

These five security attributes reflect not only the data content but also the point processes, embedded resources, and workflows. Traditional security methods fail at reflecting these attributes with a one-method-fits-all-mentality. A perimeter defense is an either/or proposition allowing or disallowing access in full, preventing any granular or multi-level security. Multiple perimeters or different entry points through a single wall also fail presuming a linear or retrograde progression of access through rather an overlap or mesh of access controls.

This metaphor fractures complex data processing workflows. Traditional security methods erect a monolithic perimeter around the process, files, delivery, or storage. Walls prevent sharing, access, and even processing. Walls are a barrier to entry for all those who do not have the permission to pass through that single door. It fails completely when that single entry point is permitted to be bypassed or any part of that barrier to entry is forced. It is monolithic security concept for data sources and processes that have not been monolithic for more than 20 years, Unfortunately, that outdated metaphor fails to reflect that not every access is through the same door and needs different controls. Data sources are not monolithic, and certainly data is not either. Distributed data, distributed processing, and widespread distribution defeats monolithic security schemes. Encrypting and packaging data files or their access methods represents a monolithic failure for complex and hierarchical data sources and processes. Access needs to be granular and multi-level, and represent the five informational attributes presented above.

AA.5.9.1 The MS Office Object Model

The MS Office document object model is based on a hierarchical data model best represented by a tree structure. The tree is flexible, extensible, forwards and backwards version-compatible, and non-linear. The root provides the starting point. The ending points, leaves or items, are many. The content leaves are sometimes linear and simple, such as plain text, but more often define object-oriented structures, mixes of plain text with rich media and descriptive attributes. The hierarchical model represents a breakthrough in flexibility in that it supports a diverse range of media types, linkages, and relationships awkward in flat file or record-oriented formats. Specifically, the data stored using object model efficiently compacts sparse-matrix information, representing only the elements which exist and none of those which are not included or have been deleted. The object model is also extensible. It can contain triggers and even self-executing code to make the document self-aware (if not a ready macro-virus host). It is forward and backward compatible with older and newer data structures so long as the documentation represents valid subsets. It is conceptually simple. It is self-documenting; no map exists or needs to exist of any document as the hierarchy creates the map and how to traverse the document when that is necessary.

Structural documentation or schema representation is necessary only for efficient development or internal analysis of the validity of object model security implementations. It is important to have a map of the potential document structure and the purposes of the hierarchical branches and terminating leaves. However, to the uninitiated, the office document structure is complex and perverse. Although an office document is stored as a linear disk file, it is off limits to any linear access and simplistic computation.

MS Office documents include Access, Excel, Graph, MapPoint, Outlook, FrontPage, Money, PhotoDraw, Project, Publisher, Powerpoint, SQL server, Visio, Word, WordPad, plus various media file formats. MS Office applications or suites are not the only relevant tools with which to access these document modules. Many Windows applets, communication protocols and applications, and client/server activities also use these hierarchical data structures, called the object model. Furthermore, it is important to realize that an office document may comprise multiple structures within one document through dynamic data encapsulation, object linking and embedding, references and linkages, smart tags, or other methods of inclusion. Specifically, charts, reports, and tables from Excel or Access can be linked into a Word document or hosted by a Powerpoint presentation shown through a NetMeeting whiteboard connection. The depths of this embedding are limited only by access time and virtual RAM.

This embedding means that user content analysis alone is not sufficient to protect the security of a document; the metadata or embedded data might reflect an unexpected or unanticipated content format. As such, consider the analysis of a Word document in anticipation of it being only a Word document misses the potential security compromise of an included Excel formula, an SQL raw data table, proprietary macros, ActiveX documents, and data or functionality from almost any other MS Windows-compatible product. The security risk does not end there. The data within a single Word document comprises data directly entered and controlled by the originating user. The office hierarchical data model also mixes actual user data with group and organizational data. Furthermore, information about the user data, that is metadata, is also stored within the office document structure. The valid and important reasons for this include simplicity, packaging, delivery, and functionality issues. However, the fusion of data with metadata adds to the security complexities. Specifically, the visible and obvious user data is likely to comprise 2 or 3 branches on the document structure whereas another 40 or fifty are populated with security-sensitive metadata. Consider that edits, redlining, Outlook and Exchange-enabled workflows, basic Office Suite configurations, and other metadata hide beyond even the user-accessible interface. Without intensive analysis of the root-branch-leaf structure and content, some metadata is not accessible except programmatically. That means some security-sensitive data is hidden from all but those who know exactly how to locate it and exploit it.

The object model is efficient for storing and retrieving sparse information because empty sets do not have to be written to disk, stored in files, or retrieved. However, the object model itself creates a security risk through the absence of that data. First, the objects defines what can exist. The lack of data defines what is not used and does not exist. That overlap begs the questions of what is missing and why? The absence of information—and the very clear indication that it does not exist within a file—is frequently very telling in intelligence operations. The absence of information when it is expected represent clues, possible avenues for inference, other channels for the delivery of missing information, and fertile area for obfuscation, information hiding, and diversion. Such gaps provide contextual and conceptual information that can be as important as the directly available information.

Likewise, the fusion of data with macros and embedded triggers and functionality adds to the security complexities. However, it is not the purpose of this paper to describe virus threats or our products to protect against embedded macros or hostile applets. Other vendors and tools, such as Symantec and Norton AntiVirus, are designed to search for and remove such embedded risks. Although the DigitalDoors technology will not perform virus scanning, it is a suitable platform and process flow carrier for initiating such scanning. Digital-Doors focuses on the threats inherent within data, protecting that data, and enabling safe sharing, not the threats to data processing infrastructure.

Finally, the structure of the data within a file as represented by an object model in no way support the viability, validity, verification, or integrity of the file. In other words, a file may be valid, but it contents for various reasons have been damaged or corrupted. At the current time, most products locate defects at only the gross level and fewer yet effect recovery or repairs.

Although many people are aware of the metadata security gap in Word when they open a word document in a plain-text editor such as NotePad or a hex editor, they only see a hodge-podge that is the tip of the security iceberg. The problem is not limited to Word. It includes the full product line of Microsoft products; lack of metadata security effects most products of most other software vendors too. It is not a Microsoft problem alone. Corel, AutoCAD, Adobe, Micromedia, Intuit, Oracle, Informix, Symantec, WordPerfect (Novell) need metadata and hide it. Metadata is a reflection of the complexity inherent in the integration of actual information content with sources, methods, process, ownership, and timeliness.

Office metadata includes author initials, name, organization, creation, editing data, printing data, old edits (including corrections and deletions), redlined material, mixed author ownership, and a host of presentation, formatting, cell formulae, transmission, system addresses, and delivery information. If you believe that this reflects only minor or innocuous leaks, consider that the file creation date could contradict assertions of event dates or that deleted references to people or places could be a smoking gun in a legal proceeding. The users are certainly unaware of the extent of the metadata, but be certain, as stated above, that some metadata is not accessible except programmatically allowing security-sensitive data hidden from all but those who know exactly how to locate it to actually exploit it against you in ways not yet tried or imagined. Metadata security lapses are not minor.

Although Microsoft is aware of this metadata security failure, it has only recently and incompletely reacted with the Office XP suite and the new publishing feature. The publishing feature provides the creation of a flat linear file without the metadata content for controlled distribution. Cognoscienti use the Adobe Acrobat Distiller and PDF print drivers to create controlled distribution for older Office suites and other proprietary documents. Acrobat resolves the metadata and macro virus risk but in no way protects against data risk or enables secure multi-level information sharing.

It is also important to realize that the Office document modules comprise the blueprints, process, external data sources and linkages, and materials for building the resulting presentation; the presentation content is usually the ultimate end product. The blueprints and process often are immaterial to the presentation and represent proprietary and confidential material. The delivery of a document is not the same as the publishing or delivery of the presentation content. The difference is a significant security gap.

While this object model flexibility represents programming genius and workflow innovations, this flexibility was not created within the context of security or the knowledge of the power of data theft and damage. This object model complexity and diverse accessibility creates a security nightmare. A simple wall barrier fails. It breaks the workflow, prevents sharing, control, and flexibility.

Effective Microsoft and metadata security, as with the DigitalDoors technology, requires adherence to the five informational attributes defined elsewhere. The object hierarchy structure is variously described as a binary tree, category structure, or hive. In any event, the entry point is the root or base, containing a potentially infinite number of subcategories, each with a potentially infinite number of leaf items. The structure can be pruned, deleted, or rearranged. The items represent object-oriented information, from entire subdocuments, to relational databases, layered graphics with vector elements, to simple plain-text, to a single binary numerical element. In actual practice and security implementation, the process required, to which DigitalDoors adheres, is to parse all branches to each and every leaf. This is not recursive, just extensive. Each path is examined for context, each leaf for content, all nodes for external references, and everything must be viewed within the context of sources and methods, not just obvious content. The obvious content is what the user created and sees, but as you now know, that is a minor portion of the data contained within the document object structure. This is a paradigm shift enabled by the DigitalDoors technology, as show in the hierarchy below:

For each document (the file and structure)
Access the root
For each limb
For each branch For each sub-branch
For each leaf (item)
Process each leaf Preservation of the path to each leaf is important as it defines the access to that data element. The existence and/or null value of the leaf represents a security control point. The model defines, with supplemental external knowledge of the object model, the possible security risks. The model and the content are not separate from external knowledge of sources and methods. The leaf is for all intent and purposes the significant security control point. Hiding, encrypting, or removing the leaf does not provide security any more than encrypting the document file does. It breaks the workflows to do so. However, it is possible to review and alter the contents of the leaf within the context of the purpose of the leaf to retain functional access with multi-level security.

Specifically, lets review the five information attributes of security in context to processing the leaf, purpose, sources and methods, ownership, date or timeliness, and content. Although most security methods seek to obscure content, the last and most insignificant item, effective security must review the four other elements as well. Consider the following.

How does the purpose of the leaf provide context, purpose, or informational reference to the document as a whole or the individual leaf? Does it provide source, destination, authorship, viability, validity, verification, or integrity to the document as a whole or the individual leaf? Consider the value of processes imbedded in the document as cell formulae, a help file, or other complex routing wizard. Does it show linkages or references to other documents? What is its status or position within the document? What is its element position, as a headline, footnote, or redlined status? These seemingly minor details transcend actual content but provide clues to the following attributes.

Intelligence agencies stress the confidentially of the sources and methods used to gather information. The information itself might or might not be important, but the ongoing care of the sources and methods is important for future information gathering activities and retention of any status quo until action is initiated. In addition, the viability, validity, verification, or integrity of the document is predicated by the viability, validity, verification, or integrity of the sources and methods used to create it. In terms of the Office document, this type of information is both contextual, leaf content, and metadata. To presume that security is only user content at the leaf misses the value of metadata and the inherent risks of the object-oriented document format. For example, authorship, source, source dates, editing dates, deletions, redlining, notes, footnotes, MS hidden text, links, and other structural elements describe when, how, where, and who created the document. This speaks to the viability, validity, verification, or integrity of the document as a whole, and can compromise past, ongoing, or future data collection efforts and operations.

Ownership is reflected both in leaf-level content—that is obvious when a document is presented or published—but also in the metadata. Ownership is also a characteristic of file storage properties, in ring rights, file storage position, linkages, SMB or network file access rights, and HTML references. Ownership, particular the number of links, the times access and edited, numbers of hits, and the level of churning, suggests the relative importance and merit in the document.

Date or timeliness reflects currency. The dates, in terms of edit times, access times, and frequencies suggest the relative importance and merit in the document. Touch and other file-level commands can only mask the overt date and timestamp of a file, not its purpose or content, true timeliness, or merit. This information is spread through the metadata and leaf content. In some hierarchical structures, this information is stored in tables or other structures apart from the immediate document root. When a document is a relational data structure, as in Access or SQL, hidden system fields and hidden security data define edit and deletion times. It is also important to recognize that in databases, records which are deleted by the user are only marked as deleted but persist until the database is purged, packed, cleaned, compressed, or otherwise processed in a maintenance mode. When relational technology with transactional logs and rollback facilities are enabled, data can be recreated or dated despite many types or natural of instigated disasters. This supplemental metadata defines date and timeliness too.

Security of content can be compared to erecting a barrier around that content. However, when content becomes a collection of simple data elements along with data objects, dispersed and distributed sources, effected by embedded events and triggered methods, barrier-based security completely fails with any breach and is not effective for the more complex object structures. Human intelligence can ascertain content from some parts of the declassified whole. Even distributed and dispersed content can provide a coherent view of the concept and context. In such cases, partial content defines the concept and the context. The details, which are extracted and hence missing from a particular reconstituted slice of the reclassified source. While amounts, times, places, and participants are missing or represented by placeholders and even misleading information, external sources of data will confirm and elucidate the missing contents. It becomes important to extract and disperse enough of the object model elements and metadata to obscure the concept and context as well. This process addresses the shortfalls of the single file encapsulation and encryption opening a functional avenue for multi-level access control of even the most perverse but prevalent of the MS Office document object models.

In conclusion, while content is king, it is the most obvious but curiously least valuable of the document security issues. In terms of protecting and processing an Office document, each leaf must be processed and assessed for its security needs. Note again that each leaf may be another object-oriented structure in its own right or a simple element. It will need to be processed and assessed accordingly. This means the leaf must be evaluated for content, then ignored, encrypted, extracted, or dispersed. DigitalDoors can also mask, replace, or seed new content at this leaf. Reconstitution is represented by a recovery map with leaf path reference, a multi-level scheme, and multi-level data protection. This enables full or partial reconstitution as directed.

The DigitalDoors technology defines object models schemas comparable to the MS Office models. However, the DigitalDoors schemas define the many versions of the object models in terms of purpose, risk, and security lapse potentials. Let us be clearer on that. For example, Microsoft Word is a set description for Word 97, Word 98, Word 2000, and Word XP. Each of these versions has different object models. Although they are similar, each model is a variation on the theme with some compatibility. DigitalDoors describes the purpose and potential risks for each leaf and for the paths to the leaves. The DigitalDoors schemas also include a statistical grid to describe the cross-risk among the different leafs and paths. In fact, legacy leafs from a document created within Word 97 but imported and saved as Word 2000 format but opened for editing within Word XP represent security risks with leaf and path information leftover from Word 97 and Word 2000 and potentially untouchable by Word 2000. Although users are certainly unaware of the extent of the multi-version metadata, some metadata is not accessible except programmatically allowing security-sensitive data hidden from all but those who know exactly how to locate it to actually exploit it against you in ways not yet tried or imagined.

AA.5.10.0 The Criticality of Right Context

On Sep. 7, 2008, an article about the 2002 United Airlines bankruptcy filing was posted on the South Florida Sun Sentinel business web page. This article triggered trades on UA stock, options, and other derivatives. On Sep. 8, 2008, the market price of the stock dropped from $12.76 at opening to as low as $3.15 creating market panic. The Tribune parent of the Sun Sentinel issued this statement.

Published: Sep. 9, 2008 10:00 PM ET

CHICAGO Updating the expired United Airlines bankruptcy story snafu, Tribune Co. late Tuesday that a dynamic link to the 2002 story that caused a stock market panic was briefly on the Web site of its South Florida Sun Sentinel.

"Our records show that due to traffic volume, sometime between 1:00:34 a.m. EDT, Sunday, September 7 . . . and 1:36:03 a.m. EDT, Sunday, September 7 . . . a link to the old article appeared in a dynamic portion of the Sun Sentinel's business section, grouped with other stories under a tab entitled 'Popular Stories Business: Most Viewed,' Tribune said in a statement.

"No new story was published and the old story was not re-published—a link to the old story was merely provided," it added.

Tribune said at 1:36:57 a.m. EDT on Sunday Google's Googlebot search agent crawled the story on the Sun Sentinel's site—as it had done as recently as last week without linking the story to Google News.

This time, Tribune said, the Googlebot linked the story, which was retrieved from Google News about three minutes later.

Income Securities Advisors Inc., a Miami Lakes, Fla., firm distributed the story to a site operated by Bloomberg News, according to multiple press reports Tuesday.

United on Monday blamed the Sun Sentinel for the report that dragged its stock price down 76% before trading was halted.

Sun Sentinel editors denied they had posted the story, and Monday night Tribune Co. issued this statement after what it called a "preliminary investigation": "To be clear, no story appeared today or over the weekend on the Sun Sentinel website or any Tribune website regarding United Airlines' filing for bankruptcy."

Tribune reiterated Tuesday that the story "contains information that would clearly lead a reader to the conclusion that it was related to events in 2002," and it noted that comments posted with the story were dated 2002.

"It appears that no one who passed this story along actually bothered to read the story itself," the Tribune statement said.

The facts show that truthful content was correctly posted to a trusted website as one of the "most viewed" financial stories. The integrity of the story is not in doubt. Sources and methods are beyond reproach. The downstream waterfall effects of distribution and search-engine categorization lead to the story being rapidly propagated to other trusted websites. The initial activity was the posting of a historical news item. The effect occurred when this item was reported on additional news sites. Bloomberg failed to establish appropriate context integrity and assess risk for this information. The content seems factually intact and correct. The contextual issue is that the link date was set as Sep. 7, 2008 to a 2002 story, in effect any subsequent conceptual analysis (if any) misrepresented historical information as current, thus triggering automatic trading. Subtleties have profound impact. As the stock tumbled downward, investors and automated systems responded to derivative loses by dumping stock until trading was manually halted.

Many systems and process exist today that have a fundamentally fragile tipping point. Information drives the financial markets and secondary derivatives leverage these markets creating more leverage against any such tipping point. As information assume more importance with the production process and as part of the production output itself, it asserts a greater multiplier effect on wealth creation. Information alone can trigger a tipping point. This is clearly in evidence with the United Airlines panic. Information is neither right nor wrong, beneficial nor detrimental, intentional nor unintentional, moral nor immoral, public or self-serving. Information just is. Information is about formlessness and intangibles.

Intangibles alone, in this case information with a subtle contextual defect, Information becomes the attack and the leverage used to trip the tipping points. Whether this panic was unintentional will certainly become a legal issue, but certainly future information attacks against such leverage tipping points will be intentional. Information will be reversed against an attacker and competitors for self-interested results.

This panic demonstrated the potential opportunity to exploit recycled or fraudulent market information and to game against the worldwide financial and automatic option trading systems. This event can be applied to other markets like banking, credit cards, energy and transportation, agency and military where individuals and syndicates can profit from financial, political, or military turmoil. It is clear that information can disrupt and destabilize the status quo and precipitate reactive stampede. Even if accidental, it clearly demonstrates the future criminal exploitation of context.

This event shows that few sectors are equipped to deal with the information revolution and the evolving processes for communication. This new environment requires the evolutionary methodology for granular content control with digital door checkpoints to ownership, stewardship, usage, content, context, and concept.

AA.6.0.0 Search and Data Mining

AA.6.1.0 Meta Data Hound Search—Adjacency with Permutations and Combinations

DigitalDoors Metadata Hound is a knowledge management exploration tool exploiting granular content control.

The purpose is to show how categorized words or unknowns adjacent to each other can be combined to form new and linear combination phrases. These combinations typically do not define PII, although they could when representing proper names or addresses in full. More likely, these combinations are best represented as metaPII to pierce the secrecy veil through aggregation, inference, and interaction. Content is conjoined with context and concept to expose intangible property including trade secrets. Protection against this complex risk requires more complex analysis than simple white lists and black lists.

Adjacency is a function of semantic seriation, in that meaning is conveyed by the proximity of word combinations. Digital doors terms these generated phrases, linear adjacent composites or sometimes linear adjacent permutations in recognition of the technical method whereby these terms are generated. These phrases typical augment the white and black lists. These conjoined permutations represent metaPII more complex than simple elements. In conjunction with linear adjacent composites, the DigitalDoors My Group List functionality enables complex Boolean permutations and combinations when the adjacency is not linear but could be dispersed over sentences, lines, paragraphs, or throughout an entire data stream.

Linear adjacent composites have significant applications both in knowledge discovery and defeating gaming attempts to bypass spam filters. For example: when "Khalid Sheikh Mohammed" is unknown, it will be categorized by the DigitalDoors secure engine as granular content in three distinct words. Given the default dictionary configuration, both Khalid and Mohammed are categorized as male names and Sheihk is categorized as unknown (although sheik is an honorific title). Alternatively, Sheihk can be designated as a possible alternative spelling for the respected Sheik title. However, DigitalDoors nevertheless realizes that three contiguous adjacent words are categorized and potentially assigned either to the black list or white list. The potential therefore exists for new permutations of those terms, specifically:

Khalid Sheikh
Khalid Sheikh Mohammed
Sheikh Mohammed

Although other possible permutations include the null set, Khalid Mohammed, Mohammed Khalid, Sheikh Khalid, Khalid Khalid Khalid, Sheikh Sheikh Sheikh, Mohammed Mohammed Mohammed, these linguistically or syntactically less useful combinations are ignored by DigitalDoors.

A user can be notified of these three permuted phrases for inclusion in My Word List or alternately added to the user, group, and/or organizational dictionaries. These phrases are automatically submitted to the DigitalDoors Metadata Hound[1] for divergent exploration because they represent potential search threads in knowledge discovery and legal e-discovery. While an experienced analyst would recognize this phrase entity as a terrorist, a novice might not. Certainly, before any such combination phrase is linked into a search vocabulary after-the-fact, it could become an element of interest at its initial appearance in any intelligence data stream by virtue of its novelty and proximity to other elements of interest.

[1]

Furthermore, automated recognition systems would recognize this as a terrorist if and only if its attention lists included such compounded phrases. Because the prime advantage in asymmetric warfare is novelty, recognition of novelty is critical to antiterrorism and other first-to-market advantages, specifically with regard to issues of sustainable competitive advantage or barriers to market entry. While attention lists can be manually updated to reflected novelty, this is tedious, error-prone, subject to the imaginations of the luckiest or brightest people, and unfortunately most likely to be recognizable only after the fact. DigitalDoors technology provides an automated advantage. Instead, the analysis of contextual relationships and the application of adjacency with permutations and combinations can be applied to automatic discovery and to augment attention lists.

Attention lists include exclusively black lists or white lists. Black lists include words of exception that raise a red flag or are rejected by spam filters. White lists include everything presumed to be safe. Although black lists and white lists categorize known words and phrases, the gray list of unknowns represents the bulk of the data stream. Additionally, this unknown data stream is a growing for unstructured documents. The content knowledge of these lists also tends to leak out, and be played by attackers, thus further reducing the instances or items on either the black or white lists and skewing the importance of such gray list taxonomy. The failure to categorize this gray list and reflects its currency, the material that is neither black nor white, significantly undermines information life cycle management, security, and information sharing activities because the filtering activities fail with this gray list. Techniques based on fuzzy logic, statistical Bayesian inference, and similarity rankings appear promising, but are neither widely implemented nor successfully demonstrated as enduring.

Specifically, while Bayesian inference is used extensively for e-mail spam categorization, spammers have demonstrated that they win the arms race by combining multiple common words into a nonsense phrase that defeats the Bayesian filters, splitting common words with in-between filler, or using alternative symbols in place or look-alike letters. The use of search as a supplement provides semantic and syntactical assessment of such combinations through the DigitalDoors Metadata Hound for convergent integrity validation. However, this increases the cost, delay, and complexity of filtering by taxonomy, and it might represent the only sufficient method to discover blended, polymorphic, mutating, evolutionary, and increasingly sophisticated malware attacks.

Since linear permutations current allow for adjacent phrases made with up to nine words (default value, but user configurable between 2 and 20), DigitalDoors supports automatic rejection of false positives or inclusion of false negatives and positive hits into My Word List. This facility is useful to minimize the computer overhead for creating the permutations and filtering out junk. The linear adjacent composite process is optional in manual mode but automatic with DataHound and all metasearch activities. The list of newly-generated composites and rejects is presented during this process so that positive hits can be classified for future use or bypassed as rejects. Rejects can also be reclassified and thus re-enabled, when syntax or conditions change.

Additionally, it is also possible and useful to explore the text surrounding a target for value. For example, consider the partial sentence:

" . . . planning to board a flight from Logan International Airport to Ronald Reagan International Airport at the end of the month . . . "

"Ronald" and "Reagan" are name entries, "Logan International Airport" is a phrase, but the phrase "Ronald Reagan" and "Ronald Reagan International Airport" are not name entries.

They are places, locations, targets of interest, and user-specific My Word List entries. Adjacency around the targets generates both phrases automatically, as well as "Ronald Reagan International" and "Reagan International Airport" because the defined dictionary stop words 'to' and 'at' stop the aggregations. That is why they are called stop words. The administer or individual users can select which, if any, should be added as entries, to My Word List, or to targets of interest ('always target' or 'always ignore' categories).

Future DigitalDoors enhancements might include combinations and permutations dispersed over sentences, lines, paragraphs, or throughout an entire data stream to automate augmentation of My Group List with automatically generated entries. The difference between what is currently available and this potential enhancement is merely a matter of range, scope, and depth. The technology is already developed and is identical to what is currently available. It is a functional question of signal-to-noise ratio. Specifically, the workflow downside is that the number of generated results will be very large indeed requiring manual review to remove mostly chaff and specify only utilitarian My Group List entries.

AA.6.2.0 Search Convergence and Search Divergence

DigitalDoors granular content metasearch results provides two distinct and fundamental guidances, search convergence and search divergence, both of which are critical to the process of connecting-the-dots. Search convergence is the process of validating, substantiating, and establishing the integrity of the fundamental search. Search divergence is the process of expanding the content, context, and concept beyond the strict scope of the fundamental search. Failure to consider both convergence and divergence leads to incomplete results.

Convergence is the usual web-like search engine or data mining operation. It is rigid. You start with known keywords and indexes—search terms—as the base search query and accept hits with the highest relevancy. This information is used aggregately to confirm or deny the integrity of the initial search. You get back what you expect with priority, relevance, or ranking focusing the hits to the content most consistent to your context. Outliers are naturally rejected and filtered out. Search convergence might entail a physical inventory, database report verification, an independent party confirmation, or a drone flyover to substantiate the information. The result is in direct response to the implicit question, that is the base search query. You position and substantiate the dots you already know. You start with old information, and you get old information. However, the benefit provides by DigitalDoors is that it contextualizes these convergent results for relevancy to your specific purposes with the metafilters of categorization and sensitivity level taxonomy and thus finds the most appropriate results for the user.

However, some people find outliers useful to expand the scope of their knowledge and infer new intelligence. Some intelligence operations require exploration without preconception. Herein, outliers with the least priority, relevance, or ranking frequently provide previously unknown references or interconnections that are purposefully hidden. This is a search divergence because the base search query primes the process but effectively we already know the highest ranking results and reject those results while iterating the search for lesser-ranking items only. Divergence is the expansion of the search query or data mining operation.

You start with known keywords and indexes, but accept only information that is new or different from the direct response to the implicit question, that is the base search query. Validation and integrity is not important to divergence. You are looking for all related metadata, references, links, and relationships without regard to accuracy. Exact matches are in effect ignored, but all new references are added into a secondary query yielding subsequent results. The subsequent results in turn yield yet more new references. This subsequent query yields subsequent results, which is repeated indefinitely. The iterative results create an asymptotic adjacency list model with a social networking relatedness. Social networking relatedness is often viewed as flow charts showing betweenness, closeness, and connectedness. The theory of six degrees of separation has some legitimacy, however there is a difference between accidental and active relatedness. This expansion of the base search query is the process by which you discover more dots. Connecting dots you already know are pointless does not expand your knowledge; you want to expand the set of dots and generate new content, new context, and new concepts. DigitalDoors starts with old and/or limited information, but generates new information.

Divergence is also critical to enabling DigitalDoors security by exploring the purpose and usage of information beyond the immediate and obvious preconceptions (i.e. foresee reflexivity) of semantic and pragmatic meaning. See beyond the immediate security perception for other possible cross-domain requirements and enable information sharing.

You are connecting known dots with new dots, the true concept of connecting the dots. The new dots lack integrity and substantiation. Do not ignore them or dismiss outliers because they can reveal the outlines of previously unknown, undiscovered, unforeseen, uninvestigated and unrevealed situations. The search process is really a metasearch applying techniques of data mining, textual and contextual search, aggregation, inference, and data-to-data interaction, and the integration is the establishment of relationships. However, some of your new dots will be false. At this point, a search convergence is useful to establish likelihood and risk for the new information in order to validate and establish the difference between accidental and realistic relatedness.

Although convergent search is different from divergent search, convergent search is useful after a divergent search to establish integrity. However, since the process is ongoing and automatic, interim results are available for manual pruning and grafting. This is useful for noise reduction and inserting feedback from human intelligence. At any time, new search terms can be inserted into the divergent search and dead ends removed from the process.

Divergent search based on only content search terms overlook the power or context and concept. DigitalDoors filters search results through the DigitalDoors multitier hierarchical overlapping tag structure. For example, only search results that are confidential or top secret and represent names and locations might be retained. The filters are a function of range and scope.

The convergent search terms are represented within a tree view, with new divergent search terms represented as subordinates branches and nodes. Nodes that match (exactly or proximally) can be linked and represented by a multi-dimensional relationship graph.

DigitalDoors metasearch performs two key functions. First, it selects new data elements of value and recognizes unknowns for automated iterative divergent search. Second, it categorizes all aggregated results to sensitivity level and enables distributions subject to MLS-compliance cross domain. While the DigitalDoors primarily focus on unstructured information, it can be integrated with structured data sources too because it is actually easier to extract context and concept from structured data.

AA.6.3.0 Convergent Search

Typical search and data mining tools presuppose you already know part of the answer. This presumes partial knowledge a priore just to phrase the question in order to get a proper answer. However, this imperfect solution for knowledge management does not begin to address the real issues needed when connecting the dots. We have termed this type of knowledge management and search technology as convergent because you start with a known entity and confirm or deny that basic entity or gather additional information in depth. The initial search terms are categorically narrowed necessarily to reach this focus. Note that DigitalDoors automates the convergent process until no additional information is found on the topic. Convergent search presupposes the reason for the search or the premise of the additional information.

Sometimes, there is no presumption, no partial knowledge. Sometimes, however, the questions are hidden without premise. Sometimes, categorical precision, preconceptions, and historical contexts expressively distort data mining, knowledge management, and search, security, and information sharing. Sometimes, the results require a complete disconnect and disengagement from reality, history, obsession, cultural imperatives, the norm, or the way things have always here been done.

Cultural bias can over-classify data stores, preclude granular access to items, or skew the distribution of information based on the preconceived notion of what someone needs to know. This propagates the scenario that need to know is contextual to a security architecture and very constricted world views. This fosters a view of the leaves—at most the trees—instead of the forest. The focus is preordained, and quite frankly, so are the subsequent results. This is indicative of the failure to establish the methods and security within a sharing infrastructure suited to connecting the dots. Security is contradictory to sharing, particularly when security is driven by limited sensitivity levels and compartments rather than by a granular content control and a multi-tier overlapping hierarchically tagged categorization.

AA.6.3.1 Divergent Search Paradigm

In contrast, DigitalDoors allows knowledge management as a divergent exploration. The basic starting point is any data stream (RSS, blog, documents, database, satellite ground station, a veritable fire hose of data) or multiple data streams, or a collection of search terms for an automated process. A single term defines a manual process with a primary search term. The automated process redacts the data stream(s) and looks for content and context of importance creating a list of primary search terms, metadata contextual filters, and noise reduction tools in order to expand the breath of knowledge with new links and references.

Because the search process encompasses the DigitalDoors selection and extraction engine, the underlying process is to categorize content, context, and concept as a precursor to this expanding divergent search. Categorization is consistent with preexisting categorical precision, preconceptions, and historical contexts but also anything outside that norm is also explicitly recognized to enhance the divergent search.

Search results are aggregated hits or the information referenced by the hits. Depth settings determine the number of hits processed and the preponderance of information accumulated for assessing accuracy, integrity, and confirmation. Scope defines how much of the actual information is explored for knowledge exploration and later convergence to necessarily obtain some focus. DigitalDoors does not neglect or disdain convergent search at all. In fact, convergence is the necessary resultant process to divergent search. Together, convergence and divergent represent contrasting but ultimately complementary processes that typically start as a divergent search, with concurrent hits funneled into convergent searches for authentication, accuracy assessment, relevancy, and encapsulation with a focus.

The cycle of convergence and divergence extends the linear adjacent recognition of categorized or unknown keys or phrases which can be permuted to harness new and previously unknown search terms or information (social networks, relationships, references, hidden connections, etc.).

Alternate spellings, misspellings, partial matches, duplicates, and other fuzzy technology is used to graft depth to a convergent search or prune a divergent search. The search architecture is open and conducive to add-ins, competing products, and supplemental tools to enhance accuracy, depth, breadth, speed, or quality. Likewise, Digital Metadata Hound can be integrated into SaaS, SOA, or other distributed workflows.

In the case of a divergent search, DigitalDoors is specifically exploring for secondary search terms and information not initiated by the primary search terms. Noise and duplicates are pruned. All hits and information located with URLs, X-links, or other pointers are retained to maintain chain-of-custody, reproducibility, and subsequent human intelligence analysis. Because consolidated results alone are insufficient for legal exploration, search warrants, or plans of action, or even spurious, suspect, and in context to anything, therefore the retention of the intermediate hits become critical to build a rationale for action and review the relationships, connections, and networks of people.

The search is extended with the primary search terms, that is the initial entity topic, the secondary search terms, and combinations and permutations thereof. Duplicates and non-duplicates are pruned per the selection of convergence or divergence. Tertiary search terms and information are aggregated in the same manner as the secondary search terms and secondary information. Quaternary search terms and information are aggregated in the same manner as the secondary search terms and secondary information.

This divergent process repeats unless manually interrupted, terminated by a timer, manually reviewed midstream and grafted or pruned, or terminated by repetition or the lack of newly-found information. When no new information is found—corresponding to an asymptotic plateau and the natural conclusion—both concurrent convergent and divergent searches are stopped. Convergent searches are stopped when the results only provide information not confirming preconceptions. Divergent searches are stopped when the results no longer represent new things.

This combination of both convergence and divergent search overcomes cultural bias, the excessively restrictive classification of data stores, precludes granular access to items, and skews the distribution of information based on the preconceived notion of what someone needs to know. DigitalDoors expands the scenario that need to know is open but consistent with rigorous and compliant security architecture. This fosters a view of the forest, the exploration of new content knowledge, new contexts, and new concepts. This encourages the search for new resources no longer bound by the restrictions of categorical precision, preconceptions, historical contexts, cultural imperatives, the norm, or the way things have always been done here that beyond air gaps and data perimeters of single agencies. This is indicative of a new paradigm establishing the methods and security with sharing infrastructure suited to connecting the dots.

AA.6.4.0 Data Mining and Inference Attacks

Every computer-related application, interaction, and workflow leaves behind indication of its passage. These terms are just some of many in the literature, but all point to gaps in garbage collection, process cleanup, software installation and removal, and oversight. Every process leaves trails that are relevant to data mining, aggregation, inference, and data-to-data interaction. These include:

TABLE

| trails for data mining |
| --- |
| Tokens |
| Assignment of privileges |
| User or process ID and information |
| Data fragments in application baggage |
| Data fragments in files |
| Data fragments in unallocated file storage |
| Data fragments in RAM, buffer, cache |
| Data fragments in CPU RAM, buffer, cache |
| PnP Device Instance ID |
| Installation resources never used (drivers, files, registry entries, etc) |
| Orphaned driver files |
| Obsolete driver files |
| Orphaned libraries |
| Obsolete libraries |
| Orphaned registry entries |
| Tags |
| Sidebars |
| Footnotes |
| Index markers |

TABLE-continued trails for data mining

Cross-references
Section markers
Links (internal, URL, X-Pointer, etc.)
References
Table of contents markers
Material marked for deletion
Metatags
Metadata (primary content, comments, markup, tags, metatags, second-order content elaboration, usage descriptions, links, references, embedded data, scripts, macros, slough [exons], interdependencies)
Misaligned dependencies
Style Sheets
Data Type Definitions (metadata, HTML, XML, and database)
Orphaned metadata
Unrecognized metadata
System driver assignment allocations
System driver port assignment allocations
System driver drive letter assignment allocations
System driver class assignment allocations
System driver network assignment allocations
Serial number identification of a device or instance
Administration references, assignments, resource allocations in configuration files
Administration references, assignments, resource allocations in registry
OS Logs (as in WMI data collection)
Event logs
Temporary files
Device drivers
Registry assignments for device drivers
Tampering
Unallocated storage
Unallocated files AA.6.5.0 Metasearch Data Mining Stovepipes and silos, independent efforts at information collection and intelligence analysis, and air gaps or security guards divide domains and prevent information sharing. Centralization and consolidation of data gives rise to data overload, a problem in part addressed by new web-like searching techniques, but also opens the door to security leakage. Data mining is explicitly content-based and rigidly contained with the data warehouse. Search is rigid because the starting point for each and every effort requires an index or explicit initializing terms. DigitalDoors technology, based on granular content control, enables security with information sharing including MLS-compliant search capabilities across domains. Data is explored not only by content but also context and concept.

Search should occur across domains, with information shared and delivered across domains and through the extraction and integration of both private and public data sources. When connecting the dots with information pooled from different agencies, it is essential that search be possible without preconceptions of utility, purpose, or cultural bias. Effective search, and what is termed metasearch throughout this paper, comprises more than web-like textual (and other formats such as audio or video, but also compound meta-formats) search technology. It includes data mining, textual and contextual search, aggregation, inference, and data-to-data interaction with granular content control subject to security compliance.

AA.6.5.1 Metasearch

Metasearch generally means the usage of multiple web-based search engines based on keywords with results combined into a single unified report; this is better described as a confederated search or federated search. Each web-based search engine is rigid in terms of its reliance on preexisting indexes (robots crawl through the Internet looking for changed, added, or moved data and the relevant categorization to apply to it. Federated search is usually fast but limited in terms of most likely usage bias. However, the combined results reinforce the preexisting answers based on the implicit search question.

In contrast, the DigitalDoors metasearch is designed to traverse domains, search for unknowns and expand the base of information. DigitalDoors metasearch results provides two distinct and fundamental directions, search convergence and search divergence, both of which are critical to the process of connecting-the-dots. Search convergence is the process of validating, substantiating, and establishing the integrity of the fundamental search. Search divergence is the process of expanding the content, context, and concept beyond the strict scope of the fundamental search. Failure to consider both convergence and divergence leads to incomplete results.

Convergence is the usual web-like search engine or data mining operation. It is rigid. You start with known keywords and indexes—search terms—as the base search query and accept hits with the highest relevancy. This information is used aggregately to confirm or deny the integrity of the initial search. You get back what you expect with priority, relevance, or ranking focusing the hits to the content most consistent to your context. Outliers are naturally rejected and filtered out. Search convergence might entail a physical inventory, database report verification, an independent party confirmation, or a drone flyover to substantiate the information. The result is in direct response to the implicit question, that is the base search query. You position and substantiate the dots you already know. You start with old information, and you get old information. However, the benefit provides by DigitalDoors is that it contextualizes these convergent results for relevancy to your specific purposes with the metafilters of categorization and sensitivity level taxonomy and thus finds the most appropriate results for the user.

However, some people find outliers useful to expand the scope of their knowledge and infer new intelligence. Some intelligence operations require exploration without preconception. Herein, outliers with the least priority, relevance, or ranking frequently provide previously unknown references or interconnections that are purposefully hidden. This is a search divergence because the base search query primes the process but effectively we already know the highest ranking results and reject those results while iterating the search for non-ranking items only. Divergence is the expansion of the search query or data mining operation.

You start with known keywords and indexes, but accept only information that is new or different from the direct response to the implicit question, that is the base search query. Validation and integrity is not important to divergence. You are looking for all related metadata, references, links, and relationships without regard to accuracy. Exact matches are in effect ignored, but all new references are added into a secondary query yielding subsequent results. The subsequent results in turn yield yet more new references. This subsequent query yields subsequent results, which is repeated indefinitely. The iterative results create an asymptotic adjacency list model with a social networking relatedness. Social networking relatedness is often viewed as flow charts showing betweenness, closeness, and connectedness. The theory of six degrees of separation has some legitimacy, however there is a difference between accidental and active relatedness. This expansion of the base search query is the process by which you discover more dots. Connecting dots you already know are pointless does not expand your knowledge; you want to expand the set of dots and generate new content, new context, and new concepts. DigitalDoors starts with old and/or limited information, but generates new information.

Divergence is also critical to enabling DigitalDoors security by exploring the purpose and usage of information beyond the immediate and obvious preconceptions (i.e. foresee reflexivity) of semantic and pragmatic meaning. See beyond the immediate security perception for other possible cross-domain requirements and enable information sharing.

You are connecting known dots with new dots, the true concept of connecting the dots. The new dots lack integrity and substantiation. Do not ignore them or dismiss outliers because they can reveal the outlines of previously unknown, undiscovered, unforeseen, uninvestigated and unrevealed situations. The search process is really a metasearch applying techniques of data mining, textual and contextual search, aggregation, inference, and data-to-data interaction, and the integration is the establishment of relationships. However, some of your new dots will be false. At this point, a search convergence is useful to establish likelihood and risk for the new information and integrity and substantiation of the difference between accidental and active relatedness.

DigitalDoors metasearch performs two key functions. First, it selects new data elements of value and recognizes unknowns for automated iterative divergent search. Second, it categorizes all aggregated results to sensitivity level and enables distribution subject to MLS-compliance cross domain. While the DigitalDoors primarily focus on unstructured information, it can be integrated with structured data sources too because it is actually easier to extract context and concept from structured data.

AA.6.5.2 Description of the DigitalDoors Metasearch Process

There are multiple starting points to the metasearch process. One or more candidate data streams, news feeds, or documents can be dragged from the desktop into a queue. These items are monitored for changes and then feed into the DigitalDoors Secure engine for granular content selection and metatag categorization with the output result that search terms are generated and metasearch terms are also generated. A document or data stream automatically sets the context and is explored for likely search terms. No index or bias is necessary to begin the process. The resulting search terms of interest are fed into one or more URLs for exploration.

Indexes and search terms do not define the implicit question or establish parameters for an effective answer because they represent a single dimension of information. Metafilters such, as phrases, My Group Lists, categories and sensitivity levels add both context and concepts to the initial search and all subsequent exploration.

AA.6.5.3 Combinations and Permutations

DigitalDoors recognizes complex content, such as the user-defined entries in My Phrases, My Word Lists, and the ranged limited My Group Lists. However, unknown content can slip through this sieve without explicit human intervention, therefore DigitalDoors automates this sieve by creating permutations of both categorized and unknown words and phrases. These permutations are used as new search terms. The likelihood of random combinations (included in the class of the NP! problem space) is so low, that emphasis is focused instead on linear adjacent selections. This results in is a small and focused problem space that can be solved on a typical personal computer and adds disproportionate value. For example, a Google search of "Mohammed Atta" returns "Khalid Sheikh Mohammed" as a disconnected string of categorized and unknown words out of the box; that means parts of the phrase "Khalid Sheikh Mohammed" are recognized without any special configuration, but not as a contextual phrase. Permutations of linear adjacent selections do however create the complete connected phrase and automatically submit the complete phrase for a divergent metasearch, thereby creating new and previously unrecognized relationships to connect the-dots.

Content is transformed by context and concept. Structure, format, purpose, usage, ownership, intent, validity alter content, as explained in other DigitalDoors papers. Specifically, the transformation of data creates weights, permutations in meaning, and the presentation affect overall meaning. A tearline does not include the entirety of the message or the initial intent of the meaning. This is a loss of content but a freedom to reevaluate content items without preconception. As such, it is an extension of search, but a critical necessity for security and sharing purposes, to entertain the potential meaning in the transformation and redaction of the data stream structure and the content into granular items.

AA.6.5.4 Automated Contextual Pruning

Many divergent mining and search efforts will expose unknown, deceitfully hidden, and statistically irrelevant relationships. For example, a Google search of "Mohammed Atta" also shows meetings at Aleppo. The relevant thread for Aleppo is that it is Syrian university town with social connections to Hamburg and the 9/11 hijackers associates. However, Aleppo is also a common Lebanese street name, and the original shoemaker character in the Pinocchio story by C. Collodi. The name was changed to Geppetto in the Disney childrens' movie. While it is tempting just to prune this track, it is also important to explore associative contexts, because the use of codes can mask more sinister meanings. The 9/11 hijackers communicated within the seemingly innocuous context of weddings, guest lists, and dates. So while contextual pruning is easier after the fact, it can be very important before the fact when the use of codes and false contexts are not so clear.

In conclusion, although stovepipes and silos, independent efforts at information collection and intelligence analysis, and air gaps or security guards among domains prevent information sharing, DigitalDoors metasearch enables security with information sharing including MLS-compliant search capabilities across domains. It overcomes security leaks inconsistent with the needs to both protect national security interests but also enable cross domain information sharing.

AA.6.6.0 Knowledge Discovery: Search Convergence and Divergence

The foundation of DigitalDoors technology for security and information sharing is based on measurement for risk within granular content (and metadata). It is applied to secure information while providing interdomain information sharing. Risk measurement is driven by information recognition, multitier overlapping hierarchical metatagging technology, and granularization. This same technology, as a standalone deliverable product or service-oriented architecture, is applicable to knowledge discovery, uncovering unknown or concealed relationships, and connecting the dots. This paper explores DigitalDoors DataHound, which is a serialized and repetitive process for knowledge discovery, usage of the DigitalDoors Secure engine, the application of granular content, or standalone for knowledge discovery.

Actual DigitalDoors security is implemented through dispersion. Information sharing is implemented either through the delivery of MLS-compliant versions, or through a base-redacted document with objective security compliance for universal distribution with reconstitution. Reconstitution is supported in whole or in part as MLS-compliant results, or as step-wise defenses-in-depth MLS-compliant results. Because the risk measurement is driven by content, context, and concept, it is essential that DigitalDoors recognize content not only in isolation to itself as a data stream or document but also its value when combined with other private and public sources through aggregation, inference and data-to-data interaction. DigitalDoors Metasearch is useful to augment standard Internet search engines because it enables both search divergence for knowledge discovery and search convergence for assessing information integrity. It completes the process necessary for discovering new knowledge to connect the dots.

AA.6.6.1 Initial Process

The automated DigitalDoors metasearch tool takes as source any data stream or document. The DigitalDoors Secure engine automatically parses the source for content recognition and assessment of granular content. This granular content is automatically metatagged for range, sensitivity level, compartmentalization, categories, relevancy, and other multitier overlapping hierarchical factors. The granularized data content becomes the search terms, while these metatags become metafilters for the DigitalDoors knowledge discovery. These search terms are submitted to any arbitrary number of extant tools and services for locating other relevant data streams, documents, databases, local, Intranet, Internet, and public or private data stores. Likely tools include Internet search engines, data mining tools, database query engines, and other knowledge management (KM) applications or services. Inductive and deductive tools are advantageous too. Most tools can be easily integrated with DigitalDoors linked through service-oriented architectures (SOA), or their results piped into the source data steam or document (through Web 2.0 mashups). DigitalDoors metasearch also works with standard, a priori-, search terms or keywords, like any desktop, web-enabled, or Internet search tool; this bypasses the automated DigitalDoors Secure assessment of a relevant or representative source data stream or document.

AA.6.6.2 DigitalDoors MetaSearch

The results from the extant tools are logged for auditing, dispersed to maintain a legal chain-of-custody, and aggregated into a single collated result. This collated result (the source, results, reports and links or references) is automatically submitted into the DigitalDoors Secure engine. Inputs include the configuration for either search convergence or search divergence. Search convergence conforms to the standard purpose for using Internet search engines like Google or Alta Vista because it defines, authenticates, and validates the search terms. Convergence does not provide new information but provides integrity for the initial information. Divergence is all about aggregation, inference, and data-to-data interaction because it specifically searches for links, references, relationships, outliers, and social networking associations to the search terms; it ignores anything overlapping the search terms. In other words, convergence increases the depth of knowledge where divergence increases the breadth of knowledge. It explores new, novel, unknown, and hidden connections. If you want to connect the dots, divergence dredges new but factually-uncertain information where convergence thereafter authenticates. A discrepancy search is also within the realm of divergent search. The metasearch inputs also include the metafilters created prior to the aggregated result. These metafilters narrow the scope of all subsequent and serial submissions to the extant tools and services. The filters include specification for sensitivity level of granular content (for example, find only [TS] content), limitations by category (find only locations or people), only content of a specific importance (for example, find only within My Group List), and other DigitalDoors features and compartmentalization. Metafilters for standard search terms, which bypass the initial DigitalDoors Secure review of a source, are optional.

DigitalDoors Secure is automatically run. The source (which is now the aggregated result from the extant tool processes) is automatically parsed by the DigitalDoors Secure engine with secondary recognition and assessment of granular content. This granular content is automatically metatagged for range, sensitivity level, compartmentalization, categories, relevancy, and other multitier hierarchical factors. The granularized content becomes the search terms and the metatags become the metafilters for the s knowledge search. The automated results of the Secure process is an augmentation of existing knowledge or a breakthrough to unknown or covert relationships. The convergence search vets the integrity of a priori search terms, while the divergence search generates new search terms and new references. The metasearch is repeated, as configured, for a fixed number of times, for a fixed period of time, until results reach an asymptote, or indefinitely.

AA.6.6.3 MLS-Compliant Search and Distributions

Because DigitalDoors s and all the extant knowledge management tools are run in a secure system high environment, results are likely to be system high too. Repetitions remain system high. However, the point of any search or knowledge exploration is to share information and distribute it to the users at the edge subject to optimal restrictions. This is the reward generated from the DigitalDoors paradigm shift. The new search terms, the aggregate result, and all intermediate reports and documents are processed for MLS-compliant security and information sharing.

Specifically, the list of new words, phrases, and other content is either automatically assessed or manually reviewed for addition to the DigitalDoors dictionaries. Ownership, sensitivity level, compartment, group, categories, mission, relevancy, and other multitier overlapping hierarchical metatags are applied to each discovery and distributed to users subject to MLS compliance. The aggregate result are secured with multiple MLS-compliant versions and distributed to the edge on a per sensitivity-level basis, or a base redacted document with objective security compliance for universal distribution and pushed to the edge with DigitalDoors sView reconstitution services. These two options are also applied to all intermediate results, reports, lists, linked or referenced sources. Of note, all links and references, even access to public data sources can be optionally restricted to minimize subsequent risks from aggregation, inference, and data-to-data interaction. An agency with specific intent and knowledge is able to use aggregation, inference, and data-to-data interaction on public sources to create classified results. For example, if unclassified search terms including "president assassination British visit" returned news clippings and RSS feeds of a forthcoming presidential visit to 10 Downing Street, these public results are still unclassified but the context is clear and should be classified.\

DigitalDoors Metasearch is a novel and useful standalone service to uncover unknown or concealed relationships, and connect the dots. Although metasearch is derived from the DigitalDoors technology for security and information sharing, it is useful to augment standard Internet search engines because it enables both search divergence for knowledge discovery and search convergence for assessing information integrity, the full process necessary for connecting the dots. Search divergence extends search with aggregation, inference and data-to-data interaction beyond simple content into the realm of context and concept.

AA.7.0.0 Security:

AA.7.1.0 DigitalDoors Security Keystone Overview

Digital Doors sanitizes sensitive documents, media, programs, and messages (specific examples of data streams) with the unique capability of automatically reconstructing those messages upon validation of security clearance. The DigitalDoors technology associates multiple receivers and their respective clearances with multiple variations of a document. This supports information exchange between trusted parties, parties that do not trust each other, and even parties unknown to each other. It is the basis for the currently functioning DigitalDoors security system applying the architecture and processes that:

select granular critical and important data within a data stream (document, data file, transaction, object, structured storage, record, field, document, etc.)

extract that same critical and important data substitute placeholders for that same critical and important data disperse that same critical and important data extracts to remote distributed storage locations release that same critical and important data extracts from storage through a controlled release process of granular access rights of each user through validation and authentication reconstitute that same critical and important data extracts in whole or in part to reconstruct the original data stream (such as a e-mail message, report, or legal document)

In effect, the DigitalDoors technology hides information leveraging the distributed capability of the private and public communication channels, such as the Internet. This avoids single points of failure to establish an in-depth defenses through creation of numerous granularly-controlled obstacles to attackers. This technology secures against insider as well as external attacks. DigitalDoors can measure the security before and after the process for detailed metrics on the process, data integrity, and data security. This technology enables secured sharing of information on a need-to-know basis. Shared information can be distributed uniquely or en masse to internal or external organizations, with each user individually receiving information automatically tailored to each user's security clearance. When circumstances change, and for whatever reason, and after the fact of distribution, the sender can still control the release of critical and important information from distributed storage locations. DigitalDoors operation is transparent and automatic. User access is through access controls already established by organizational security policy.

DigitalDoors is in the process of conforming to DOD and other relevant standards. This includes encryption limited to AES and Rijndael. Furthermore, all communication links will be protected by SSL, optional point-to-point hardware encryption, and other technology. The objective is to house the primary subsystems in an insulated environment protected from unauthorized access. We support and will integrate with public key cryptosystems. Design was primarily implemented in UML, with automatic code generation in MS Visual Basic. We expect the port to C, Java, and other languages to be fairly straightforward. User interface issues are imbedded in flexible calling interface parameters supporting regeneration to any widget-based GUI.

The DigitalDoors extraction and dispersion architecture was conceived within the explosion of Internet and web-related services as a commercial off-the-shelf (COTS) utility toolkit and application suite. DigitalDoors supports and extends SAN and NAS storage service and leverages the benefits of those storage technologies. It is equally useful working with or extending the functionality of storage virtualization. As such, DigitalDoors was conceived as an open, accessible, and robust omni-platform solution to survivability, identity, privacy, confidentiality, and anonymity. In contrast to existing restrictive security technologies that work by excluding access to data, surrounding it with concentric walls, and searching it repetitively for embedded viruses, the DigitalDoors system is envisioned to open data to wider access, enable information sharing, and effectively create a granular owner, organization, and supervisory multi-level access control over that data.

AA.7.1.1 Security

DigitalDoors security is predicated on the process of selecting critical and important information, extracting it, and dispersing that information to remote randomized locations. The context between the source, the declassified result, and the extractions is broken, thereby preventing efforts to understand the information. The more information processed in such a way, the greater the innate security. Generally, access to the process is by user authorization only to preclude destruction of valid source data.

When a password (Any reference to a password, user, administrator, process, file, database, recovery may, recovery file, and key (for encryption) is equally relevant to two or multiple objects.) is entered by a user or administrator, it is encrypted. All validation of passwords to the database of passwords is performed in that encrypted format. No clear text is delivered over any non-local connection. This same process is applied for all encrypted data, recovery data, location pointers, storage passwords, and extractions. Lost passwords cannot be recovered within DigitalDoors, but can be reset with the help of the administrator. We may include an automatic facility for password management in the future subject to security concerns.

All encryption keys created for an organization, group, user, or as one-time pads are encrypted by the encryption key and method configured by the administrator. This is stored in that form within all encrypted data records, databases, objects, and files. This precludes attacks against the network transmission links. Only direct access to these objects with both plain text keys and corresponding encryption would provide a means to break the administrator-configured key or user keys.

User access is established by the administrator at the time when an account with user name and password is created. Optional per-user encryption keys, methods, remote access, dispersion access, and storage passwords can be established. Administrator access is by name and password, and access can be shared in that two or more administrators must agree on access. Administrator access does not grant user level access or vice versa. Administrator access configuration also required the creation of a unique encryption key for all user level and data level passwords. It is the same password, but we can create layers at any time in the future. The limitation is that any change in the unique encryption key requires a hierarchical recovery of data and re-encryption to apply a changed key. This process would preclude ordinary access until the process completed. Different administrators will have different names and passwords, and shared key access can be enforced by biometric methods to prevent a single administrator masquerading as multiple fraudulent people.

While declassified information is useful as a byproduct of the process, DigitalDoors also provides a granular means to reconstitute the source in whole or in part. Reconstitution requires two critical items: a starting point linkage between the declassified data and the recovery map and the keystone recovery map itself. Access to this information is protected in various ways. Declassified file names are typically changed so as to protect the meaning, content, and context of the source information. The recovery map name has no relationship to the declassified file and the original source. Linkage is retained in an optional database (or distributed databases), or not at all. Loss of the linkage precludes reconstitution, except by human intelligence, if feasible at all. Generally, access to the database is by user authorization. Granularity means that access to any one source, and in fact any single extraction, does not provide insight into any other sources or extractions. Break-ins preclude access to other information as it is compartmentalized and widely dispersed with other security barriers.

The declassified data is the template for reconstitution. It is assumed to be a public file, but access to it and its existence can be limited and masked with standard network security and access control methods. When the declassified data is part of an email message, it is presumed to be public anyway. Access to the recovery map for an email message is the subject line of the message. A number defines the originating organization and a serialized number for that message. Access for reconstitution is granted per message, per user, and per extraction with multi-step Internet-enabled identification and authorization process. The email user must be setup to access a unique site for authentication. Each organization can maintain one or multiple sites, or subscribe to a public service. This validates the user, the user's allowance to that organization's email, and specific recovery information for that message. Reconstitution is enabled in whole or in part. Normally, the user would see the declassified message only. If the user had installed the DigitalDoors for Email add-in, the user would be prompted automatically to log in. After successful identification and authorization, the email message (and relevant) others could be automatically reconstituted in whole or in part as allowed by time of day, location, user, and other access rights.

The keystone is the recovery map. This data object (or passive and active file as in code) contains offset and length information for each extraction and information about the extraction itself. This object can exist as one or many sequential maps. The recovery information can be contained by this same file or distributed to other files. The offset and length information describes the position of the extraction, but also any substitution of equal, null, shorter, or longer length. Note that substitutions do not provide insight into the extraction or add to context unless a category tag is chosen as a substitution. Security levels do not provide insight into the extraction or add to context, unless a security level and categorization mapping is somehow made available. Object-level, field, or pointer encryption renders the recovery map difficult to use. Since the recovery map contains limited contextual information, and much of the information is not even ordered in any way, forced decryption is not necessarily of any value. Encrypted pointers can indicate an arbitrary number of other encrypted fields or pointers. The extraction can be dispersed to various remote storage locations, can be stored in multiple locations, be validated, can be encrypted through $3^{rd}$ party add-ins or use any of the DigitalDoors encryption and multi-cryption methods.

The recovery map points to dispersed recovery files. Access to recovery files is predicated on knowledge of the remote dispersed locations (network mappings), access passwords to those storage locations, and any DigitalDoors password restrictions to internal storage locations or granular storage at the extraction-level. Normally, this detail is cached for each user as part of the desktop configuration, cached by DigitalDoors for each user as different relative paths map to absolute storage locations, and contained within the recovery map and recovery files. Caching is protected by encryption. Although it could seem that the performance overhead for these layers is high, the CPU processing power available to the average desktop user is many powers of ten faster than even the fastest network connection. Network latency is the primary performance concern.

This single file or data unit, or dispersed data unit contains the extractions for the source, several extractions, one extraction, or part of a single extraction. This information is delivered sequentially to the user desktop, decrypted, validated, and recovered for the reconstitution. Disallowed extractions are not delivered to the user desktop, even in encrypted form except in the one case when the DigitalDoors security system is specifically configured for single object (one file option) that contains user-level access control, declassified source, recovery map, recovery data, and encryption.

In addition, certain failsafe options are designed to maintain security and protect reconstitution. The most obvious method to unravel encryption is to break the administrator-defined encryption key. However, this does provides limited access to administrator information only as other databases, maps, recovery files, and support files are widely dispersed.

Damage to the storage linkages and particular recovery files represents another approach to defeat what cannot be forced. Because DigitalDoors functions within standard file systems, backups provide the best integrity. Should that be destroyed, an automated recovery based on global network search would be necessary. This could not be performed without administrator access and oversight. The level of CPU overhead and network access would be very obvious. A scattershot approach below this threshold would not break the NP-complete problem of single-file recovery. This is a needle in many haystacks.

Damage to recovery files is assumed in the DigitalDoors security system. At worst, a user, even a high-level user, will see the reconstitution for the most part. At best, secondary storage will provide per extract recovery. Broken links, missing files, and other network or file failures do not preclude reconstitution. With standard backup and recovery process, recovery of damaged or missing files will allow full reconstitution.

AA.7.2.0 Malware Attack the Tentacles of Insecurity

Following is a description of how we understand a malware attack vector and how to mount appropriate responses.

It demonstrates why perimeters, application, workflow, and data are now longer protected by the methods derived from traditional security paradigms.

The number of open doors—whether they are called edges, touchpoints, browsers, SaaS processes, remote users—that provide a channel for attack are already overwhelming. They also increasing as hackers aggregate opportunities, make effective inferences about the value and vulnerability of targets, and interact with tools, applications, and systems accessible through e-mail, firewalls, or published services. Any open avenue, even legitimated ones, provides a doorway for breaches. Open doors create open sets that undermine perimeter-based security systems or stretch the perimeter out of shape and expose presumed closed sets to the ravages of Internet risk and errors and mistakes by insiders. Additionally, the efforts made to protect against malware before or after the fact require excessive expensively resources, are not always effective, and frequently add more difficulty that just the damage from the malware itself.

DigitalDoors laboratory's backup storage machine experienced a malware attack early in January 2008. This created a significant compromise and eventually a full meltdown with temporary loss of that resource. Restoration required a full system wipe, reinstallation from known source media, and reconfiguration of the backup environment. Although we burn backups by choice to read-only media like DVD/R and CD/R with single sessions that preclude additional sessions and prevent erasure or modification of backup sources, documents, demos, and support infrastructure, it is not sufficient. Metadata, SharePoint workflow, and complex Internet-enabled processes open doors for exploits to bypass process-oriented security. This incident revealed the failure of site, perimeter-based protection, and workflow or application security traditionally available today, and the corresponding need to rethink security hygiene. Security hygiene is a strategic business obligation from the top as a strategic continuity and competitive requirement but filters down and throughout the organization.

According to DigitalDoors any new doctrine must reflect total loss, immediate tear down of assets, and relocation of both process and data to immediately-available alternatives. Assets should be cheap, easily replaced, and generally as low in value to the attacker. That is an expression of formlessness. Recovery or marshalling of these assets needs to be simple, rapid, and easily positioned to respond to business requirements or situational threats. Computing has to enter the age of rapid deployment as a reactionary force. This certainly puts a new spin on the easily-interchangeable value of commercial-off-the-shelf (COTS) over specialized or proprietary solutions at every level of the infrastructure.

AA.7.3.0 Security is Broken

Fear, uncertainly and doubt (or doom), better known as FUD, is leveraged to maintain the security status quo. It is used to further entrench unsustainable methods. When the best and brightest experts propose variations of methods that are indefensible, or at best just delaying actions, the reaction is instinctual rather than intelligent and reactive. We are trapped in a cycle of resource depletion applied to the wrong war.

The current technology of security is ineffective. Efforts to support it, the variations of it, or the incremental improvements to it, are misplaced. Security is broken and no amount of bailing wire and toothpicks or duct tape will stem the leaks and thefts. The best efforts to date include bureaucratic creation of new titular posts for security as part of some blue ribbon commission. The commission rehashes old ideas with snappy new bullet-points, recommends new regulations, and suggests more interdepartmental cooperation.

In the end, if the blue ribbon commission is not soon disbanded, if the recommendations do not threaten the status quo, the commission creates a subsidiary panel to explore how the problems should be plugged. If it is government, the executive branch passes this hot potato to a legislative body. If it is the senate, they hand the reports and problems to the representatives; the representatives trade their notes with senators. They all create new committees that pair off in topical investigative teams to detail the latest security threat.

Doubtless, the security breaches and leaks still occur, perhaps with greater frequency and severity. Some unlikely leader or even the panel or blue ribbon commission get saddled with the blame and are shown the door. But more likely, these movers and shakers move on to better titles, get reelected, and even campaign for higher offices based on this very visible report with press coverage. This process is constrained by too many chiefs and not enough indians, and a narrow concept that limits security change to piecemeal incremental change lacking cross-cultural innovation with leaps of technical advancement. While security is collapsing and undermining the competitive strategic advantages of the economic ecosystem, the blue ribbon panel is merely enumerating the reasons for the coming precipitous collapse. This is rearrangement of desk chairs on the Titanic. We are not implementing the necessary fundamental shifts that can forestall this catastrophe. This fear, uncertainty, and doubt is not converted into promises that might take away that fear. Fear is pointless unless converted into action with change.

We are defending ourselves with each insignificant pyrrhic victory against an unsustainable war of attrition. Attempts to augment barrier security by analyzing incoming and outgoing flows do little to caulk the pinpoint leaks at these unsustainable perimeters. These leaks are singly insignificant but together aggregate into a profound threat. Point solutions represent an endless arms race against asymmetric threats brought by unseen foes. Attackers bear resources to target evolving weaknesses of concern only in aggregate. It is not the one or two, or a even few attacks that threaten our sustainability, but the myriad assaults, each alone of limited concern, but the aggregate that presage doom.

As we try to maintain our organizational business, we are like a herd of migrating caribou under the suffocating onslaught of a cloud of mosquitoes. Caribou are ill-equipped to fend off such nuisance-level attacks that nonetheless decimate the herd. The ecosystem has changed, and without adaptation, the system will collapse completely. Instead, we run faster, climb higher, expend more resources against a threat that has fundamentally different rather than addressing the necessary goal in different ways. We are just not equipped for this situation. It will be a shame if we succumb to a suffocating onslaught without seeking other ways to address fundamental ecosystem shifts.

AA.7.4.0 Meta Data Dangerous Double Hedge Sword

Data lacks purpose, structure and exacting patterns, context, and relevance without external references. Metadata provides those references as internal aspects of the data construct. As such, data has been downgraded as an important facility in favor of the more precise, extensible, and useful metadata. Long live metadata.

The information processing and library science worlds define the concept of data. Whereas information processing perceived data as a structured source for applications, library sciences sees data as the answers to questions and problems. Although the Internet, Gopher, Archie, WAAS, the world wide web and browser search technology began as an information processing concept, these now the complement to library sciences. As these search technologies and taxonomies for setting purpose, context, and references have grown to organize data, all data has become contingent on meta-tagging or labeling.

Applications, data, configuration baggage, scripts, complex formatting, documents with other types of documents inserted or referenced and external links are all forms of metadata. Many documents contain scripts, applets, functional code that might be static but more often is dynamic. Viruses and worms are examples of unwanted dynamic modifications.

Applications often contain tables of data or reference externally linked modules with tables of data. This data can change, and with it the linked modules or even the application itself. Applications frequency update configurations and other variable data streams internal to itself. Some applications modify themselves and rewrite its internal code. Viruses and worms are examples of unwanted dynamic modifications. Applications often support persistence of data; this is the situation when user data, configurations, or metadata is stored within the storage space of the saved application. Data persistence provides several avenues for security lapses, modification of the data and the usage of the data storage space as a platform for a virus or worm. In addition, metadata provides all sorts of opportunities to hide polymorphic traps that can bypass signature scanners and even illegal process monitors. It is a rich game where the very extensible nature of metadata makes for a very extensible solution set but also a very perverse battleground. Every tool, even metadata, becomes a weapon.

AA.7.5.0 The Transition Content Security Via Data Leakage Prevention

Security has evolved from physical access control, computer rooms, and perimeter restrictions on hardware to include logical controls of networks and resources. Now security is evolving from perimeters protection for infrastructure, processes, and websites that process data to include the protection of data itself as well. The relative value of infrastructure and workflow supersedes the value of hardware, and now the value of information and the costs of reparations after information loss or ID theft supersedes the value of the infrastructure and workflow. The pressure to protect data has created new efforts and classes of products. Access control, encryption, multi-factor authentication, packet routing controls, in/outbound firewalls, deep packet inspection, and data loss prevention represent the bleeding edge of information security.

While new efforts address specific shortfalls in data security, each one of them represents a specific point solution, the repackaging of existing substandard solutions, and/or the aggregation of many other products into an integrated suite. These efforts parallel mathematically-proven but functionally-futile multiple level security (MLS) now being reinvented for commercial applications. MLS is expensive to implement, and after huge investments of, precludes knowledge discovery or information sharing, and disrupts operations to a point where functionality is preferred over any security.

For example, the newest security effort is data loss prevention (DLP), which provides perimeter control of data. It is not so different from any physical barrier, process-control firewall, or other perimeter control system. The difference is that the emphasis has shifted from hardware infrastructure to workflow and now to the data itself within the workflow. Perimeter security control for data will be as effective as any other perimeter has been. All the limitations and inherent flaws apply to this new focus.

Data loss prevention is hobbled by a number of functional impediments. Wholesale protection—the construction of data silos—have proven to recreate the functionality versus security conflict. Data must be classified to ascertain what subsets should be specially protected. Organizations implementating DLP have discovered that massive amounts of existing data and the magnitude of data storage growth precludes real-time categorization. Categorization is impeded by classification bias limitations. Furthermore, the creation of categorized information silos only shifts the flaws of perimeterization into a larger number of microperimeterizations, where resulting security is no better than with a single perimeterization.

DLP additionally presumes that categorization is universal. An entire document is all [TS] or all [U] with a binary restriction. It can be released or it cannot. A binary sharing decision is usually too restrictive in practice. However, restrictions are functionally granular, because users, situations, roles, and other complex conditions modify the release. Categorization is also granular because some parts of document might be [TS] where others are [S] but the overall utilitarian view of the document is that it is [U]. MLS and MLS-like systems upcode that tagging to the highest level and preclude release. This creates a black hole accumulating most of the data ultimately lost in this silo. This recreates the conflicts inherent between functionality and security, where functionality typically wins.

Categorization for DLP suffers the typical tagging problems elsewhere described as reflexivity, classification bias, and the lack of a multitier hierarchical overlapping tag structure that establishes tagging for the presumptive process requirements but also other conceivable needs and likely later data repurposing. DigitalDoors enhances DLP and overcomes many of its inherent limitations through granular content control. Automated and assisted manual classification resolves the primary functional complaint of DLP implementation by tagging everything and coping with the data storage explosion. Bias and reflexivity issues are established by the supported multitier hierarchical overlapping tag structure. These compound and combination tags (out-of-channel) enable tuned release of sensitive materials based on the balance of facilitating production functionality while yet maintaining any arbitrary level of security at the same time. While DLP is not the solution for security, microperimeterizing with granular content control goes a long way to overcome the clear and present limitations is this technology AA.7.6.0 The Failure of Best Breed Security The "Best Breed" in security does not deliver the needed solutions. The best of breed chips away at the background noise but does little to protect against evolving attacks and intelligent adversaries. It is a rationalized effort based on inertia, customary roles, continuing practices, systemic reinforcement by internal supervisors and external vendors that assert it makes sense and that it has always been done that way.

The best we have stops the loss of the lowest hanging fruit. Best of breed does nothing to divert the motivated, incessant, and evolving threats. If an attack fails but the prize is worth winning, the attackers return with revised efforts. There is a known the maxim, "if at first you don't succeed, try, try again." (Teacher's Manual (1840), Palmer, Thomas H. "There is a lesson you should heed, Try, try again. If at first you don't succeed, Try, try again."). There is no reward for security attack failure, but no punishment either. There is so much noise that even law enforcement is interested in their lowest hanging fruit. Most failed attempts go unnoticed. Even the successful breaches of security rarely garner reproach, arrest, or repercussion. Botnet attacks hide the source and shield the attackers from any and all repercussions, and perhaps even generate opportunities to make new enemies where none existed, diverting suspicion to innocent parties.

The traditional best of breed for security is an aggregation of perimeter-based security methods and point solutions designed against specific attack types. Perimeter security is sufficient when the perimeter is actually sacrosanct and not distended to incorporate workflow integration and the ambiguous pel-mel of incremental process evolution. Calling a weakness in the perimeter an 'endpoint' is merely another means to hide the insecurity of touch point(s). Point solutions are sufficient when the security mechanism matches the risk profile one-for-one and covers multiphasic and evolving risk. Unfortunately, both perimeter and point solution sufficiency is unlikely.\

Perimeters get distended, and point risks tend to have multiple attack vectors but generally only one designated security fix, not the many discovered over the long tails. The application of some or even all of these approaches does repel some attacks and maybe even the majority of attacks, but not all of the attacks and allows more of the PII and trade secrets to leak out. Attacks that get through are increasingly damaging. The lowest hanging fruit has either been protected or picked clean. The more valuable and more difficult fruit is under assault. Data fields and structured tables will give way to unstructured intangible property because the risk is dispersed and the monetary value is so much greater.

The best of efforts is forming panels to study security problems and pick the best of breed to avoid the mistake of doing something different. The best of breed is at best a faux security. Both effort and breed provide some rationalization that security does something; the incident logs prove that. It provides rationalization that incremental improvements will address new venues of attacks and patch existing gaps, so perhaps the environment will improve. Ultimately that is self-deception, a rationalization that somehow, something will change. But it has not and is unlikely to change within the traditional security venue. The best of breed is ultimately based on a broken security metaphor than cannot be patched, cannot be augmented, and can only be replaced by a new paradigm. Meanwhile, the best of breed is faux security.\

Best of breed falls into two categories. The first is the application of tools that are acknowledged to be provide the best techniques understood and available providing really nothing but the protection of lowest hanging fruit. That is faux security. It just feels good. The second involves a dramatic shift to a new paradigm filled with changes, new methods, and changes to the ways business function and the shift to a production model based on the information revolution. Such change is difficult, requiring agents of change, and an openness to concepts of asymmetry, knowledge-based production, and formlessness that describe the future of both security and wealth creation.

AA.7.7.0 Why Security of information

The reason for security is so we can anticipate the future. We want to known that what we have today we still have tomorrow. We want to know that the work we do generates benefits that accrue to us, and are not stolen by someone else. It is a basic requirement for society and civilization. It is a particularly important requirement in complex societies where property is increasingly less tangible and can be stolen in many new ways. Security of property is relevant to the protection of intellectual property, the ideas and collections of information that define the information revolution, and the development of more complex civilizations.

Security enables us to plan, forecast, implement, and anticipate. Without the physical and social tools, we are unwilling to invest in a future. Without security or with inferior security, we do not have a future. We become unwilling to invest in it. We lack trust of individuals, groups, and any systems that might enable us and our activities. We have chaos, an inability to plan for and prevent technical, man-made, and natural disasters, or to preserve the various survival and social systems that enable civilization. Without security, at best we have a social status quo but more likely a descent into barbarism.

Although there seem to many different types of security predicated on the things each type protects, ultimately there is an overarching one. It is the security of information that frames data, ideas, process expressions, all tangible products and services, and all intangible ideas. Physical security and logical security are not different, but just different process expressions and protections at different points in the wealth production process.

AA.7.8.0 Security as an Open Set

The overwhelming limitation to achieving security is that a security space is an open set. Think of a set as a space that defines the physical and functional space bounded by the security mechanism, which is generally a perimeter. It could also be a wall, a moat, a fortress exterior, a building, a vault, an area surrounded by a firewall. The interior—all of the interior—is at risk when the perimeter is breached. A closed set might indicate an air gap, a sandbox, a single device, or a single process. If that closed set can be appropriately defined and maintained as a closed set without a single path of entry, that closed set can be secured. The functional problem is that this security space can rarely be defined as a closed set. However, few sets can maintain that rigor and provide value. Most have a door for access. Even when that single door is controlled, that set is not longer closed. It is a limited closed set at best, and thus an open set.

This security problem explodes with process, functionality, access, and networking. Whether physical or virtual, most assets exist in this limited closed set. The limits are provided by access controls, routers, firewalls, guards, locked doors, user passwords, roles, and anti-malware. However, despite these limits, the limited closed set is exposed to unlimited access combinations. This is NP! in fact. The growth of risk is exponential. The more venues that are available, the more the limited closed set is opened, and the closed set really should be viewed instead as an open set. See also Security based on Closed Sets and Open Sets.

The issue of whether a limited closed set is an open set or not is pure semantics. Reality has demonstrated that lockdowns and access controls reflect anticipated security requirements. Reality falsely presumes that the paths of entry remain under control. It is also false to presume that any open set can be subdivided into closed sets with security. Closed sets preclude any access, thus functionality. Whereas, closed sets with limited access depend on the integrity of the access method, its resistance to direct attacks, indirect attacks, and social engineering. Closed sets with limited access might exist in the world of provably secured operating systems, but the reality of these systems is that at some point, assets get distributed to enable functionality (as with information sharing) and undermine the initial integrity of these closed sets.

Security based on the premise of an open set is more honest and has a better chance at productive success. Security based on the open set must presume formlessness. Formlessness masks the assets in terms of their values, utilities, and purposes. This formlessness creates a venue of assets without known value and risk assessment lacking basis, therefore, it yields a statistical environment far different from physical and virtual security systems.

AA.7.9.0 Dangers in Information Interactions, the Need for Granular Content Isolation Purpose and interaction are as important—or even more so—to the virtual world than in the real world. The difference is important, although the results seem much the same. Purpose and interaction become very important within the security ecosystem but critical to the data ecosystem.

There are lessons that need to be learned from the physical world and implements into the digital world to avoid damaged caused by interaction.

In September 2006, spinach across America was tainted with a potentially lethal strain of *Escherichia coli*. Two hundred and sixty five people were sickened enough to be admitted to hospitals, some requiring organ transplants, and one woman died. Raw spinach was recalled. The reputations of growers, processors, shippers, and supermarkets were stained. Customers suffered. The assumption was, and the legal hope was, that growers or processors somehow precipitated a new endogenous factor that spread lethal bacteria. Two months elapsed before the vector was determined to be feral pigs roaming through California's San Fernando Valley farmland, an exogenous factor. Growers and processors had done nothing wrong.

Purpose and interaction clashed. The fields were operated as a controlled environment for a food source. Unfortunately, the feral pigs used the field also as a food source, a living space, and a natural bathroom. The pigs literally "interacted" and "aggregated" with the spinach to cause the pandemic outbreak. The use of the fields for cultivation is sanctio. The freedom of feral pigs was sanctioned by hunting restrictions. Vociferous environmental groups exert political pressure to save the pigs. Surely, feral pigs will no longer be sanctioned given the conflict between health and environment. It is unlikely that farmers and politicians will consider effective preventive measures against the possibility of flying pigs. It is unclear how they will deal with wind-borne pollution or migrating international birds on a practical basis and also a legal one. The primary solutions are not viable.

This discussion is not belittling the problem, the cause of the problem, or the scope of the problem. In fact, if anything, this discussion is trying to show that the problem is really severe and the risk for similar scenarios will increase with the complexity and integration of the food distribution system. More complexity and the increased integration will lead to aggregation, inference, and interaction of minor problems into a pandemic outbreak.

Furthermore, this physical problem becomes even more perverse within a virtual cyber-environment. While the real world minimizes aggregation, inference, and interaction, this is represents opportunity for growth and increases in efficiency in the virtual world. The aggregation, inference, and interaction of data to data can replicate, clone, and transmorph risk factors far more readily than in the physical world because the time scales are counted in nanoseconds and process cycle speeds in Mhertz. However, herein the solutions are indeed viable.

The pigs interacted within a growing ecosystem. They might have been noticed. They might not. However, the risk vector was not considered until the damage was done. Next time, feral pigs will be considered a threat. It became a known cause and effect, thus foreseeable and preventable risk. If the vectors can be defined, what really can be done to isolate the vectors? You keep them physically apart in the real world with a fence because spinach and pigs reside in the same two-dimensional space. Flying pigs, pollution, or migrating birds represent a different problem because of the difficulty in controllable the another dimension.

In the virtual world of information, the time scales, the cycle speeds, and the ability to create separated unlimited dimensions enable granular content isolation. You can apply this technology to tag information into taxonomies for three-fold results; the search for new information, the measurement and assessment of risk with a concurrent security control, and the classification and delivery of versioned information to enable secured multilateral information sharing.

AA.7.10.0 Prevention of Leakage Through Context and Range Control

Access control and tagging (labeling and taxonomy) with subsequent redaction is the technology of choice to prevent information leakage by restricting access to information silos or the damage of information distributed as part of normal process, interagency sharing, or business partnerships. Access control and tagging with redaction creates an either/or scenario where security restriction gives way to getting work done. Granular content control enables more security and less leakage with fewer work restrictions. It is all about assessing context of content and its applicable range.

Context, the extra meaning that colors the inference, utility, purpose, and risk, extends beyond the apparent content in the data stream. DigitalDoors recognizes the relationship between context and risk to blend the measurement of content with the measurement of context and concept. The differentiation is the aggregation, inference, and interaction that extends the data stream through process, system, and infrastructure. Context extends beyond the evident, intended, and expected because content can be repurposed. The social security number was established for social insurance, but this identifier is unfortunately used as a unique customer key. You have open-ended risk without clear understanding of possible, likely, and probable extended meanings and usages. Knowledge discovery, risk measurement, security, and information sharing is constrained within a traditional notion of the choice of security versus operations. DigitalDoors is measuring beyond the evident, to expose what others might see and certainly what a determined attacker might exploit.

Tagging and redaction is critically dependent on the meaning of words, phrases, sentences, paragraphs. It is also dependent on the hidden interstitial connections that extend across the words, phrases, sentences, and paragraphs. Although it is easy and common to redact a document in full and prevent its release, such complete lockdowns cripple information sharing and workflow. This reinforces the traditional notion of the choice of security versus operations. DigitalDoors and its paradigm shift of granular content control masters this limitation. However, in doing so, DigitalDoors changes the basic view of a document from simply content to a more complex view of the document as content, context, and concept. This is reflected in the structures, encoding, format, and metadata that part of the document itself, or wrapped external around the document through style sheets, process controls, application tools, or more complex workflow.

Filtering words, black list, white list, and gray list of potential, the extra-lingual connections of words that transcend content alone and are tied together by context and concept. Partly is human selection, partly is replicating this human selection against future process in the form of automation, partly applying constructs of context abstraction on top of the linear content across a range of content.

Content can be appreciated for its obvious meaning and how it is used. Content alone does not uniquely define meaning, and thus tagging. Note that content is modified heavily by context and concepts that might contained with the same data stream as represented by encoding, formats, presentation styles, linkages, and metadata. Also note that content is modified heavily by context and concepts that might loosely coupled or externally referenced to encoding, formats, styles, purposes, workflow, other data streams, and well-understand situations. These internal and external effects in effect catalyze the meaning in ways not apparent within the content data stream.

For example, five years ago how many people would question a free promotional gift for signing up for a credit card inside an airline terminal? How many people today would question the very veracity of booth, the delivery of sensitive information, and privacy with which that information is protected on their behalf? The situation has been so altered that most people now weigh the risk of information disclosure against any freebies.

The combinations of words, phrases, words described by a specific context, the application, derivation, routing, purpose, ownership, imbedded or externally-referenced metadata, links, references, implicit or explicit aggregations of other data streams, inferences, data-to-data interactions represent a catalyst to the content and the meaning of the information as a whole.

AA.7.11.0 The Vulnerability of Perimeter Security and the Need for Granular Data Control A fire all is a solid construction intended to separate one area from another area with a high risk of heat, fire, or explosion. A firewall might preclude smoke infiltration, but usually other orifices allow for smoke penetration leading to site evacuation, smoke inhalation, minor injuries, and smoke damage. A firewall is outright protection against gross events but not leakage. The firewall limits the extent of the profound destruction but not secondary effects. A firewall is not a perimeter but only a point solution of a perimeter.

A firewall has been extended to mean any separation between areas requiring protection from those with potential or active attack vectors. The problem with firewall security is that the extension of meaning is an attractive metaphor but not a realistic implementation. Security by firewall provides protection from preconceived attack vectors but not attacks from other risk factors. A firewall protects one part of a building from intrusion of a fire from parked gas-filled vehicles; it does not protect from cat burglars, floods, storm-tossed debris, or an airplane falling from the sky. Within this tangible world, a firewall can protect against threats for which it was specifically designed, and maybe some additional ones, but not usually against unforeseen or specifically-engineered attacks.

Within an environment of information storage and processing a firewall can protect against preconceived, known, and anticipated threats but not against uncertain, novel, or engineered polymorphic ones. A firewall is outright protection against gross events but not data leakage and toxicity, or the intrusion, infiltration, and tainting of internally-stored data.

As the information revolution pushed the disproportionate value of intangibles over tangibles ever higher, secondary effects become more important. Downtime and smoke damage could undermine the credibility of a business, or prevent continuity and even survivability. An informational firewall might not be sufficient protection. Within an environment of information storage and processing a firewall can protect against preconceived, known, and anticipated threats but not against uncertain, novel, or engineered polymorphic ones. A firewall is outright protection against gross events but not data leakage.

Another reaction to effective but limited protection, like that of the firewall, is that failures that occur through neglect, other doorways, or because of the limitations are often misapplied to failures of that protection method and an institutional disdain for its worth. Whereas the firewall does work, reliance on it to perform a job beyond its design parameters often leads to rejecting it in its entirety. When the perimeter firewall is extended to a cloud, a grid, or other amorphous topologies, any visualization of a boundary is fiction, and protection is at best haphazard or incomplete. Virtualization presents similar problems because the portable package is both application and data, neither of which is vetted for integrity or authenticity. Also, a virtualized chain-of-custody is extremely fragile because all subsequent steps depend on prior ones.

Because of this, a firewall is a poor metaphor for total security and even a poor expression for physical or logical security. A firewall is a plan against typical and topical risks but not likely and possible risks. When the risk profile changes, changes to an informational or logical firewall do allow for incremental adjustments to the known threat profile but not against uncertain, novel, or engineered polymorphic ones. A firewall is only a synonym for limited perimeter security, both physically and logically, and a perimeter is no match for conceivable threats of today's and tomorrow's environment.

The only total security solution known to DigitalDoors addressing the unknown risks, the polymorphic advance of threats, that overcomes the traditional tensions between security and functionality is granular content control. A firewall is not a solution for peripheral security or even perimeter security, only a functional shield against a predefined risk or a simple static threat that is not polymorphic.

AA.7.12.0 Leakage from Data Combination

An emergent property is any newly realized attribute that arises from a combination of low-level entities, a change in ecosystem, a combination of previously unforeseen factors, or the increase of knowledge and wisdom that changes the perspective or repurposing of information. The primary concern for a emergent property is that the classification for information changes in any number of ways previously unforeseen or the perspective is radically altered leading to new security risks or actual leakage exposures. Although this is not per se a classification bias, the ramifications are the same.

AA.7.13.0 The Risks from XML

XML provides an unifying architecture that serves many masters, that of people, of applications, of process, of flexibility, of integration, of future-proofing workflows. The pertinent characteristics of this XML is that it is both human-readable but structured enough for computer operations. XML is a combined data presentation, format, and structure. Data from other types of presentations, formats, and structures are migrated or transformed to create the new XML package along with additional information needed to create that new package. In other words, XML is complex but supposedly transparent.

This transparency transformation comes with a price, a very serious price, in terms of the information revolution. It unintentionally leaks, delivers, and exports trade secrets and intangible property. It undermines security both actively by passing sources and methods to people and processes without the need to know, and it provides a covert channel for trojan horse attacks as a carrier for any and every type of data signal format. Its very flexibility is two-edged providing capabilities as intended and unintended.

What makes XML so flexible? XML rolls the data and formats and the structures into a single monolithic hierarchical package. Data now includes tags. Tags explain purpose, context, utility, sources, method, intent, and many other attributes at face content value. Tags link to other resources establishing complex and concise purpose, context, utility, sources, method, intent, and many other attributes at face content value. Tags link to other resources establishing more complex and more concise purpose, context, utility, sources, method, intent, and many other attributes at context value. Together, content and context defines concept. Format and structures add punctuation, arrangement, coordination, and meaning. Unauthorized people and processes can understand the XML package, even if you wouldn't want them to. That is too transparent. Code or process can be imbedded within for a self-replicating, self-forming, and self-processing entity. What content and context is not obviously a security compromise can be combined to activate a functioning attack that passed content and context risk filtration. That is not transparent enough.

This flexibility enables an unlimited ranges of process migrations and data transformations that undermine security. XSL style sheets and XML transformations can redact the XML package, but generally this is a one way trip. Changes to the redaction are difficult to reintegrate back into the original package. As result, the original monolithic hierarchical package is preserved for all intended and extended functions. XML carries too much baggage. XML can also carry hidden baggage with dead, unknown, or blank tags and references. This is a way to covertly insert any signal inside XML. This establishes both untenable active and passive risks for XML. Transparency is not the solution for security; control is.

Traditional perimeter security methods fail, not as inbound filters but also as outbound filters. Additionally, the increased complexity and interconnectivity of workflow pierces the perimeter in so many ways that checks at each potential door become astronomical. Note templates and style sheets impart metadata. Finally, combinations of content and context, even if inert alone or even together, combined through this perimeter with the detonator to activate an actualized attack. The content and context does become concept until all the data, formats, and structure are together in a single place, like the XML package.

The only known method to us to protect data, in general, and specifically XML within the public information sharing environment is through granular content control. This method would apply XSL style sheets and XML transformations to redact XML information in versions and sensitivity levels with white, black, and gray lists to minimal formats and content suitable for each task, breaking possible combinatorial concept trojans and preventing aggregation, inference, and interaction. However, reverse integration is absolutely required to synchronize changes to distributed data back into the original monolithic hierarchical package and maintain the functional integration of complex and interrelated workflows. This method both continues the flexibility inherent in XML while layering on a method to enable concurrent data discovery, information sharing, and sharing.

AA.7.14.0 The Risks of New Information Infrastructures

The GIG (Global Information Grid) is a military-sponsored replacement for the successful but security-deficient Internet. Access to the original ARPAnet was restricted and it was secure within that very small and trusted community. ARPAnet only became useful, effective, and wildly successful as the familiar and unrestricted Internet. The Internet succeeded because it provided a general-purpose data information distribution channel with a high level of operational security in terms of continuity and integrity. However, because that small and trusted community has grown to encompass nearly the population of the planet, the Internet fails to provide data security in terms of confidentiality and privacy. This type of data security is fundamentally absent from the Internet. If encryption, firewalls, guards, intrusion prevention, antiviral solutions, and other revisional or traditional technology were sufficient to reverse the absent Internet data security, there would be no security plague, and thus no rationale for a separate but parallel GIG.

So, the rationale for the GIG is the creation of a secured Internet-like infrastructure. The proposed GIG security mechanism is rooted in limited-access, special-purpose parallel infrastructure "extending perimeter security to-the-edge." However, four cultural disparities play against the success of this security model for the GIG. First, separate but parallel is not sustainable and controllable even were viable federated identity controls available because the granularity of access controls transcends traditional rank, role, and location to include aggregating and inferencing knowledge management risks; aggregating and inferencing knowledge management risks exists because contexts and concepts give new unforeseen value to disparate collections of data. Second, containment of data within a separate but parallel infrastructure defies the premise for the very universality mechanisms that made the ARPAnet into what we now know as the Internet. Third, security based on the premise of access restriction does not consider that a trusted GIG community is unlikely to be small. Fourth, data containment explicitly within the trusted GIG will be procedurally impossible because many other existing embedded applications and processes exist within the untrusted Internet requiring data transport between the two creating new avenues for at-the-edge perimeter breaches; a demarcation between GIG and Internet is a fiction and the introduced cancer that will eat away at GIG security. The separate but parallel GIG is neither a sustainable vision nor a security solution. The data security failure must be addressed specifically on its own terms and not through the false parochial perimeterization of a separate but parallel infrastructure.

As such, the assumption that the currently-envisioned security architecture for the GIG will resolve these flaws is woefully short-sighted. Even the Internet, the prototype for the GIG, is crying out for something specifically beyond traditional or revisional technology to provide the missing confidentiality and privacy. Yet market pressures have provided no effective solution. Perimeter security, bulk encryption, and controlled access fails. This does not address the decay of confidentiality and privacy because data replication, mining, aggregation and inference render control over data ineffective. Therefore, without the introduction of truly novel security paradigms—not just revisions or more of the same ideas repackaged to look novel—neither the prototype Internet nor the derivative GIG will achieve the necessary confidentiality and privacy to provide the missing systemic security.

Given that existing continuity and integrity security techniques have proven effective but not extensible to address security deficiencies in confidentiality and privacy, we need new paradigms. To merely assert that "privacy is dead and learn to live with it (Scott McNealy)" fails to address the forthcoming disruptions to infrastructure services, loss of productivity, and material intrusions to national security and interests. This will have profound economic consequences and military ramifications, if the minor samples already experienced are any indication. Instead, realize that data security is different and requires new paradigms to restore the security to confidentiality and privacy AA.7.15.0 Granular Content Dispersion as Security When an information data stream (that is, a document, file, message, audio, video, or compound metadata structure) is parsed into its separate components the context is broken. The value of information is contingent on structure, format, encoding, linguistic reference, and other factors. As a result, granularization and dispersion enables security by similar mechanism to the one-time encryption pad. Although the one-time pad presumes a random seed, DigitalDoors approaches a level of randomness for each granular content dispersion. Although there are some indications of context (location, language, storage facility, date, etc.), padding occurrence counts and chaff can generate any arbitrary level of statistical randomness. Basically, all interpretations of the granular content are equally likely, thereby providing no special or usual meaning.

AA.7.16.0 Security by the One-Time Pad

In cryptography, the one-time pad (OTP) is an encryption algorithm where the plaintext is combined with a random key that is as long as the plaintext and used only once. The key is called a "pad" because the encryption key was often pre-printed as a page in a bound pad of paper. A modular addition through XOR is used to combine the plaintext with the pad. It was invented in 1917 and patented a couple of years later. If the key is truly random, never reused, and kept secret, the one-time pad provides perfect secrecy.

It has been proven that any cipher with perfect secrecy must use keys with the same requirements as OTP keys. The key normally consists of a random stream of numbers, each of which indicates the number of places in the alphabet (or number stream, if the plaintext message is in numerical form) which the corresponding letter or number in the plaintext message should be shifted. Messages in the Latin alphabet, for example, apply a key consisting of a random string of numbers between 0 and 25, the 26 capitalization-independent letters of the standard alphabet. The key for binary messages consists of a string of 0s and 1s.

The top sheet of the "pad" could be easily torn off and destroyed after use. For easy concealment, the pad was sometimes reduced to such a small size seen only by a powerful magnifying glass. Captured KGB pads fit in the palm of the hand, or even within a walnut shell. To increase security, one-time-pads were printed onto flammable nitrocellulose (as in old-style photographic paper or film).

The one-time pad is derived from the Vernam cipher, named after Gilbert Vernam, one of its inventors. Vernam's system was a cipher that combined a message with a key read from a paper tape loop. In its original form, Vernam's system was not unbreakable because the key could be reused. One-time use came a little later when Joseph Mauborgne recognized that if the key tape was totally random, cryptanalytic difficulty would be increased.

There is some ambiguity due to the fact that some authors use the term "Vernam cipher" synonymously for the "one-time-pad," while others refer to any additive stream cipher as a "Vernam cipher," including those based on a cryptographically secure pseudo-random number generator (CSPRNG). This latter encryption workflow is not as secure as the one-time pad or true randomness because pseudo-random numbers can be recreated from the initial seed state and key reuse compromises security.

AA.7.16.1 Perfect Secrecy

The Vernam-Mauborgne one-time pad was recognized early on as difficult to break, but its special status was only established by Claude Shannon in 1947. (A unifying theory known as information theory was developed and became the subject of intensive research. Claude E. Shannon, whose initial ideas appeared in the article "The Mathematical Theory of Communication" in the Bell System Technical Journal (1948) defined information to include the messages occurring in any of the standard communications media, such as telegraphy, radio, or television, and the signals involved in electronic computers, servomechanism systems, and other data-processing devices. The theory is even applied to the signals appearing in the nerve networks of humans and other animals. The signals or messages do not have to be meaningful in any ordinary sense.)

He proved, using information theory considerations, that the one-time pad has a property he termed perfect secrecy.

The ciphertext C gives absolutely no additional information about the plaintext. Thus, the a priori probability of a plaintext message M is the same as the a posteriori probability of a plaintext message M given the corresponding ciphertext. Mathematically, this is expressed as $H(M)=H(M|C)$, where $H(M)$ is the entropy of the plaintext and $H(M|C)$ is the conditional entropy of the plaintext given the ciphertext C. Perfect secrecy is a strong notion of cryptanalytic difficulty.

Despite Shannon's proof of its security, the one-time pad has serious drawbacks in practice. It requires perfectly random one-time pads, the secure generation and exchange of the one-time pad material, which must be at least as long as the message, the careful treatment to make sure that it continues to remain secret from any adversary, and is disposed of correctly preventing any reuse in whole or part—hence "one time." Furthermore, delivery of the keys to receiving parties and protection of the message after decryption and secondary process or redistribution breaks the security workflow. Distribution of wholesale messages between a large number of people or automated processes today stresses the ability and practicality of one-time keys and hybrid encryption with PKI systems when unique keys are generated. There are also problems of message size and efficiencies even when hybrid encryption is applied such that the message is encrypted with random symmetrical key and that key is protected with a public/private key pair.

Because the pad must be passed and kept secure, and the pad has to be at least as long as the message, there is often no point in using one-time padding, as you can simply send the plain text instead of the pad (as both are the same size and have to be sent securely). However, once a very long pad has been securely sent, it can be used for numerous future messages, until the sum of their sizes equals the size of the pad. Implementation difficulties have led to one-time pad systems being broken, and are so serious that they have prevented the one-time pad from being adopted as a widespread tool in information security.

In particular, one-time use is absolutely necessary. If a one-time pad is used just twice for two plaintext messages, simple mathematical operations can reduce it to a running key cipher. When both plaintexts are in a natural language (e.g., English, Russian, or Chinese), even though both are secret, each stands a very high chance of being recovered by heuristic cryptanalysis, with few possibly ambiguities. Of course, the longer message can only be broken for the portion that overlaps the shorter message, plus, perhaps, a little more by completing a word or phrase. The most famous exploit of this vulnerability is the VENONA project. This is particular a concern in modern communications where information process, structure, source and destination, prior message contexts, aggregation of messages over time, and inference can be used to exploit patterns or individual words in the message.

The one-time pad does not provide a mechanism to ensure message integrity and, in theory, a man-in-the-middle attacker who knows the exact message being sent can straightforwardly replace all or part of that message with text of their choosing which is the same length. Standard techniques to prevent this, such as the use of a message authentication code, can be used along with a one-time pad system, but they lack the perfect security the OTP itself has. The one-time pad is effective for one-time security. Because the forced decryption creates equally likely outcomes, the one-time pad is a perfect example of implementing formlessness. Once the document is decrypted and revealed, security for that document is exposed and questionable. Decryption initiates a rapid security decay. Reliance even on the integrity of the still-encrypted form for later use is inadvisable because the key and the content has already been exposed creating a process vulnerability and a contextual weakness by means of the release of source, method, and content itself.

AA.7.17.0 Risk in Repurposing of Information

Information in storage, information in motion, and information in process is at risk for diversion and repurposing. Often primary protections of encryption, firewalls, and isolation are bypassed because of the ongoing workflow and the information is exposed directly to misuse or reuse in distribution. More frequently, the pressure to perform and generate results puts the security at risk as well as the data itself.

In the article, Virtuality becomes Reality, DigitalDoors demonstrates how virtuality becomes reality when the context of reality can be manipulated specifically to enable virtual crime. Although virtual crime and kidnappings has become reality in Mexico, Uruguay, and Brazil, the extent of information manipulation is far more extensive. As transportation, military events, commercial distribution, banking, and insurance rely increasingly on automation, all of these activities are at risk for diversion, fraud, and repurposing. While authorization, encryption, and validation are a basic necessity to assuring integrity in communications, the chain-of-custody for such communication channels is simply insufficient.

Control sensors can be manipulated to feed a deliberate data stream, capture control and reposition, or gather your own data stream. Deliver a false data stream from a prior session or an alternate realtime session. Misrepresent the location of the sensor or the device posing as a sensor. Denial of service attacks, static communication, or false feeds are all valid threats that can tip the competitive balance. It is also useful to statistically evaluate potential damage assessments and divert operations to less valuable targets or run a shell game ahead of operations to reposition valuable assets before these attacks. An example of such information repurposing is the actual disembarcation timing and location of the U.S. Pacific carrier fleet on Dec. 7, 1942. Its position, or the reason for its position outside of Pearl Harbor, has never been confirmed. The U.S. Navy states the Saratoga and Lexington were at Wake and Midway Islands, and the Enterprise was in San Diego for retrofit. Conspiracy theorists suggest these three ships and their escorts were actively and secretly dispatched to intercept the Japanese armada just after their bombers were launched but either the timing was wrong, or they could not locate them in the vast ocean. Alternatively, the U.S. carrier fleet was simply repositioned for passive protection with political gain.

As sensors and assets become virtualized, the risks for manipulation are real and increase. Take control of a Predator drone armed with a hellfire missile and redirect it against friendly forces, an alternate target, or return it to base and the control center to destroy that control site. The core Digital-Doors philosophy presumes dispersion of key resources. The return of the armed drone to the command center provides navigational and location information to a key facility, a venue for disruption or destruction of that critical control site, and potential to leverage destruction to other drones and support facilities at that site. The potential force multiplier is higher than direct enemy attack. Attacks through proxies muddy the origination of the attacks and retaliation is most likely to escalate the initial damage. Virtualized attacks allow for plausible deniability, distance from control or responsibility, and the inclusion of conspiracy theories as explanations.

The bombing of the Chinese Embassy in Seriabo remains a public mystery. It is always possible that intended target was indeed hit with the expected collateral damages and political consequences. However, it is not definite whether obsolete or out-of-date information lead to the mistaking targeting of the wrong building, whether the pilots were diverted by in-flight information, or whether an external party—either a known enemy or even a competitive party with secondary gains—manipulated the bombing run and redirected the target to a friendly site. We can speculative and invent all sorts of conspiracy theories. That does mean that conspiracy theories are not true, do not actually happen, or cannot be actualized in the future. Also, a true explanation of the events as they really happened and the intent behind these events reveals sources and methods are best kept secure. If history is any lesson, even the revelation of the Zimmermann Telegram 80 years after the fact exposes political secrets between friendly governments and still-valuable spy secrets.

AA.7.18.0 The Ineffectiveness of Perimeter Security

The effectiveness of perimeter security is a myth. Perimeter security has inherent weaknesses and flaws that preclude information sharing and distribution. The literature for defeating perimeter security includes flying under the radar, blockages, sieges, stealth mode, insiders, spies, and so forth. It has always been flawed because every perimeter must have its doorway, if even just one designed into the architecture. Containers with any openings have no viability. Perimeters often exhibit other access points in dimensions not considered or assumed low risk, such as befriending the guards, kidnapping relatives and blackmailing them, or crashing through a non-load-bearing wall or even a reinforced firewall.

A perimeter is the line (or complex and convoluted shape) that provides the demarcation between outside and inside, the same definition for the open and closed set. The geometric difficulty with circumscribing the multi-dimensional perimeter becomes more apparent when the process and data storage is extended to grids, clouds, or virtualization. Too many processes and distributed data storage schemes defy even arbitrary, fiat, or judgmental determinations of the boundary. The overlaps between yours and mine and theirs is so uncertain. What at one instant might be correct changes to something else; these battle lines are just not stable.

Perimeter security is trustworthy only so long as the defenses equal or outmatch the offenses of the attacker. Unfortunately, this does not work and really has never worked. As the perimeter becomes a virtualized concept, its very definition becomes harder to ascertain with methods less certain for any physical and logical defense.

Perimeter security is simple, however economically viable, but not absolute, and therefore subject to defeat. There are four ways to defeat the perimeter:

Overwhelming force
Flying under the radar
Stealth mode
Corruptive insider

Sieges throughout history defeated perimeters through overwhelming force or the action of wearing down the defenders and the industrial support for the war machine. Every immovable object can be confronted with an irresistible force. The actual results, while unclear, are certain, the failure of the perimeter. An overwhelming point of effort is applied at some point in a perimeter—generally where least expected—and no amount of response or reinforcement is effective or timely. Even castle gates, however narrow and byzantine, provide a point of access that must exist and can be overwhelmed. Often such doorways seem economically impregnable, so new doors are punched through the castle walls at a presumed weak point. Although the virtuality of information technology is not subject to attacks by force, denial of service and repurposing of resources are effective attack vectors on the weakest part of the perimeter. Furthermore, the physical infrastructure of the virtual world can be physically attacked and disabled. It is sometimes effective to attack the industrial capacity supporting the war machine or the physical computing infrastructure, including power, communications, cooling, or the people maintaining it.

"Flying under the radar" means quite literally bypassing the perimeter security system by exploiting weaknesses in the monitoring system. The fact that such a term exists at all speaks to the known failures in perimeter security systems and the inability to plug them. Less literally, "Flying under the radar" means forging an effective new technology that is not perceived as a competitive risk until barriers to entry are established and a sustainable competitive advantage is assured. It is the arms race. Aerial or subterranean efforts represent historical methods to fly under or over the radar. Ladders and siege machines, tunnels, ramparts and towers overcame the architectural integrity of the perimeter security.

This is no difference in the virtual world today, despite efforts at software quality assurance or secure coding techniques.

In stealth mode, aircraft and ships pass through the perimeter radar by directly defeating the ability of the system to see them or by appearing deceptively as something less threatening. Examples include warriors hidden inside a wooden horse (Trojan War) or in delivery wagons under the animal stock (Robin Hood). This is a problem of classification bias. Sometimes, appearances are masked so that dangers are cloaked in false purposes, pretenses, structures, normal traffic, convoluted and dispersed into pieces without perceived risk, or hidden so deep as sleepers as not to be recognized as a systemic risk. Stealth mode is literally the process of forging and deploying a radical new technology in secret, the craft expressed today as malware.

A corruptive insider represents a breach of trust. Insiders are spies, turncoats, or the repurposing of resources and processes against the security infrastructure and the industrial war machine. The insider is allowed through the access controls, passed through the single castle gate, or is a process with outside, inside, and perimeter components. An insider belongs and breaches his trust or exceeds his authority for his hidden agenda. Air gaps and guards preclude functionality, minimize bandwidth, disallow flexibility, but still provide for a crafty attack on all systems and methods. Even guarded access can be overcome with earned trust that is not warranted, however narrow or long required to establish that trust. Compromise of passwords, defeat of multifactor authentication, expansion of authorization beyond assignment is a form of insider corruption. Once within the perimeter of the castle, everything, every secret, every risk, every potential is within this soft underbelly. Perimeters within perimeters, also known as microperimeters or microperimeterization, merely represent defensive positions to regroup and do not really enhance security; they merely raise the cost to defeat the perimeters. It is merely a matter of time until this corrosion is exploited in its allowed format or expanded and extended for bigger and faster exploits.

Microperimeterization is also a method to imply the creation of information scarcity or dispersion, but it is really only the repackaging of one perimeter into many. In some cases, more perimeters does not mean more perimeters as difficult to breach as the original one; they could require less effort, less time, and even provide overall effective security. Microperimeterization does not create scarcity, just the implicit distribution of information that might seem like scarcity. Distributing something in a thin layer is not scarcity because reconsolidation dispels any reality of scarcity when it is all there again. Likewise, it is just distribution but not dispersion unless more than content is dispersed. Effective security dispersion requires that context and concept also be dispersed and stored independently from its content.

Other attacks are composite and polymorphic, a blend of these four basis perimeter attack styles. Layered security is undermined by the effort of layered attacks, each layer designed to penetrate or otherwise bypass each complication in turn. Polymorphic blends start as one type of attack, cloaked in a stealth mode or appearing as something else, then transforms progressively to bypass each layer of security. As perimeter security becomes more layered and more complicated, or microperimeterized, attacks will match these techniques step for step to unravel them. Taller siege weapons forced taller walls, gunpowder and cannons forced thicker walls and reactive armor, aerial warfare precipitated three-dimensional defenses, and ongoing technological developments promote this endless arms race.

Because the economic value of perimeter security is clear as a viable first line of defense, it persists as a security method, but it alone is insufficient due to its inherent weaknesses and is logically flawed in the face of security open sets. Mobility, asymmetric warfare, $n^{th}$ generation methods, and formlessness counteract this attack escalation by masking, dispersing, and even intermingling the target resources and providing a different venue for security. Intermingled dispersion raises the ante in that information from $3^{rd}$ parties, perhaps even the attacker, is at risk too. Security by this type of formlessness is about sacrifice, deflection, and transformation. It is subtle this formlessness with granularity that is the only viable response to the security arms race and the perfect adjunct to the weaknesses of perimeter security.

AA.7.19.0 Deficiencies in Perimeter Security and Encryption

Information security is onerous, perhaps even impossible because controlled closed sets are for all intents and purposes just exposed open sets with controlled touch points. Although touch points might seem under control, security reality is usually very different and these tend to be at risk. This situation is made more complicated because the information content of products and services increases daily. Intentionally hostile conditions expose opportunities for reuse of information to embezzle resources linked to or referenced by that information. Many legacy systems and applications were never designed for security in the first place.

Even evaluated systems (per Common Criteria assurance) are only defined to be protected from all but determined and well-funded attackers. Common Criteria was intended to describe a government effort, but the context has changed to include criminal organizations and even lone individuals. Most financially-motivated attacks are now well-funded, so even the most security-conscious and tested systems are not assured to resist what are now the typical threat profiles. Most financially-motivated attacks are funded better than the collective efforts for security against those attacks. The bar for collective security assurance is set at the same height for at least the last 20 years but the common attack profile is far above that level. This defines the current state for information security deficiencies.

Security used to be a mature but niche product until the paradigm of the information revolution significance lowered the relative importance of hardware and process infrastructure. Networking and Internet access created this new 'wild wild west.' The pain today is due to this disconnect between this changed security significant and a market which has not reflected these changes or adequately responded to the new security requirements. While analysts propose a comprehensive multifaceted layered approach to security, where are all the tools? The paradigms for providing security are inconsistent with the changed threat landscape.

Few organizations, even those with huge budgets, are achieving information security, privacy, and confidentiality. Most organizations are merely trying to maintain ongoing services by deprecating the full potential of the security threat. As a result, identity theft breaches are incurring huge costs and becoming an extensive legal obligation. Agency and military programs are being suspended due to the conflicts over benefits exceed the risks from fundamental first amendment rights and the unsubstantiated potential for abuse. Recent publicly-acknowledged security project suspensions include:

Total Information Awareness (TIA)
Talon
Sentinel
MUSIC
Truth Project

National Security Decision Directive No. 77

Rail Head

Conflicting goals undermined these long-term agency and Pentagon military projects. It is consistent with the complexities of security versus functionality, a controversy still unresolved to date, and the root of security inadequacies. No one else, other than DigitalDoors, has found balance between operational security and preservation of operations, or the means to adapt between these two contentious obligations.

The increasing information content in virtually all products and services increases the significance and the risk of this information. The global economy and the multinational sources of both products and services increase the complexity of production and distribution workflow, and correspondingly the reliance of information communications and content. It has raised the predicted risk and the actuality of these security lapses. Agencies and other major organizations have tried to address the risk for decades. The success of such efforts remains ambiguous, or for others very clear and very poor as number and success of attacks demonstrates. The complexity and overhead obligatory to confirm to some minimally-sanctioned basis of protection means that multiple solutions overlap and compete for resources with line-of-business operations. Some of these solutions might make these problems even worse.

This might explain why security journals are floating a trial balloon against any need for AV and perimeter protection. How could no security be better than at least some? Could the state of security be so bad that people and organizations would rather do nothing than something? Is the technology so poor that risk management, self-insurance, and remediation after-the-fact with its attendant legal and criminal consequence is more palatable than securing the crown jewels. It will get far worse before it gets any better.

Efforts to modify or enhance existing security tools or integrate point solutions together generate inadequate results. Point solutions defend against specific threats, and the bundling of point solutions suggests a broader protection net. However, point solutions only protect against specific threats and the bundling still leaves holes in the net and opens channels through which malware and other attacks slither through. Some of these retrograde integration efforts are opening new holes and avenues of attack, including the bundled tools themselves, and doing more harm than good. The reactionary cobbling together of existing marginal solutions to address a presumed market need does not in fact address the legitimate compliance and technical threats. More is not necessarily better. Furthermore, small pieces do not always add up to a whole requirement. Most of these tools are sited at what are perceived as organizational perimeters and rely on data stream filtration using black lists and white lists. Even though advanced artificial intelligence techniques or statistical tools like Bayesian filters augment the lists, it is an arms race being won by the attackers at these perimeters.

Cobbling together point solutions also retains the value of existing tools, knowledge, experience, and workflow. It retains its familiarity. It retains the value of the prior investments. It sometimes doesn't matter whether these tools work sufficiently or address the next generation of attack vectors so long as they provide some benefit. Change is disruptive, expensive, and provides no guarantee that it will be better. Change is a big hurdle to overcome in any system. It is an even bigger hurdle in the security sector where the future is a cipher and the where the future is prepared under a cloud of fear, uncertainty, and doubt.

Information security efforts to date are based on perimeter protections (inbound and increasingly outbound too), protection of proxy devices and processes rather than the specific protection of the information itself. Efforts include encryption of actual information and displacement and reduction in the size of perimeters. None of these efforts directly address the risk inherent in information itself or provide more than surrogate protection. In fact, that is exactly what proxy means, and the ramification of proxy protection methods.

Specifically, protection of the perimeter, the servers, the storage, the applications, the workflow, the filtering software itself in no way directly addresses the content of the information or addresses an explicit security need. Because these technologies protect the container and not the content, the content remains at risk. This is proxy protection. It is a surrogate—not the real thing. There are legitimate reasons for protecting the proxies, the infrastructure, and the ecosystem, but this is proxy infrastructure protection not explicit information content protection.

Although denial of service attacks against the proxies, disruption of operations, and defacement of web sites are costly attacks, data breaches are not specifically protected by the existing security technology. The risks exposed today, the actual breaches making headlines, the billion-dollar legal torts, and disclosure of functional military response lapses, specifically result from information theft. Information is slipping through this leaking perimeter and proxy-bound security technology.

A perimeter is a fuzzy concept at best, all the more porous when pierced by local networks, wide-area networks, storage networks, and the Internet. Perimeters can contain internal structures, a perimeter within a perimeter, a gated community within a policing zone. Security tools rarely explore the containers with perimeters within those perimeters. Data files transport other data files, metadata, tags, inclusions, attachments, XML, DICOM, binary objects, geospatial files, and all types of databases. Most of these themselves can contain all those file types and more inside themselves. Therefore, a good perimeter check does not really stop at the perimeter but explores other internal structures. Because the hierarchy of these layers within layers, like Russian Matrioska dolls, is endless, realistic perimeter protection is insufficient. This is true for inbound and outbound protection, and since context, and encryption being a possible context, usually stops exploration at a functional perimeter and does not explore the granular details inside.

Perimeters cease to have legitimate meaning with grids, clouds (SOA and SaaS), and virtualization. The interchange of application packages with data sets midstream from one system to another represents a security crisis. Certainly, VMware and other product lines are enhancing management tools with security, but how can we expect these to work when security for simpler flatter architectures has yet to be resolved? Virtualization is beginning to support the redelivery of applications, themselves supporting virtualization like SQL Server, creating another level of Matrioska dolls.

Encryption is the only widespread solution to protect mobile devices, Internet transactions, and backup tapes. While encryption, alone of all the legacy technologies discussed in this paper, does explicitly protect the content of information, it is undermined with major functional, application, and systemic flaws. Insufficient implementation and complex workflow also undermine the effectiveness of encryption.

Encryption performance is not a convincing flaw. While the complexity and overhead of encryption is a concern, it is not really a viable compliant since public key delivery, symmetric methods, and coprocessors can reduce overheads to acceptable ranges. It is not so much that encryption takes time and space, but that it gums up the existing operational workflow and tangles that workflow too.

Other encryption workflow problems are severe. Encryption imposes a security versus functionality penalty. Encryption key management and distribution might be too complex for widespread utility and the implementations to date collapse as the scope and number of included applications increase. Encryption key management and partial (as in granular) control creates NP!-complete management problems. Perhaps this complexity imposes a larger security and control problem than the initial problem itself.

Encryption is not a free ride. It is a weapon you might think you control, but you can lose it or find it used against you. It is a weapon that complicates the utility of the rest of your security arsenal. Encryption of metadata, covert channels, malware, and other risk factors impair perimeter protection and point solution technology. Consider how encryption can be used internally or externally against your own resources, as in encryption ransom, outbound leakage of IP within encrypted streams, and the application of encryption to mask covert channels in plain view. Because the data flow is encrypted it will seem safe, and it will be very difficult to expose the content and check it for its potential for self-damage. When encryption tools are available they are used as initially intended but eventually for nefarious uses.

Additionally, key escrow and inspection of encrypted content at perimeters creates a new perimeter exploit opportunity, since encrypted content needs decryption at this perimeter for deep inspection and imposition of the same or the new encryption to the next endpoint in the chain of distribution. Renewed or new encryption represents an attack point and violation of source-to-destination integrity promised with digital signatures. While encryption and digital signatures provide content security and authentication, they both create a security lapse at perimeters.

This is a simple risk that a simple example explains. The physical security countermeasures at airports and buildings force you to open packages and demonstrate that the contents are not contraband and if innocuous really work as expected. A complication of open packages includes those lost at these checkpoints. Another complication is that even if a demonstration with a piece of electronics works does not preclude other covert functions too for that same package. A working radio can also be a bomb; a working data set can also be a carrier for any malware, botnet, or trojan. Even encryption unwrapped does not preclude layers of covert attack channels with perimeters of encryption or containers with seemingly innocuous content.

Air gaps provide security through restriction of access and the total disruption of external network functionality and operational workflow. The use of air gaps undermines workflow, reinforces the inherent segregation of information silo storage, and increases paranoia without addressing internal security flaws. This is the ultimate clash of security versus functionality. The idea is well-meaning since it provides complete security against external risks. It also halts all external or inter-domain functionality. However, air gaps contribute nothing against internal threats.

The creation of sandboxes within perimeters or the reduction in the size of perimeters while correspondingly increasing the number of perimeters and thereby spreading risks in no way addresses the basic flaw of perimeter security. Although it seems like a rational solution, it is not a logical or provable solution. This will not withstand rigorous design and analysis. Perimeter replication and displacement just spreads the footprint of the risks without reducing it. In fact, the surface area of the replicated and displaced risks often exceeds that of an initial consolidated perimeter. Replication and displacement moves the perimeters somewhere else and creates more of them with different flaws. Replication and displacement creates flaws that can be compromised one-by-one rather than at some integrated aggregate perimeter. This de-aggregates integrated solutions into point solutions, which contribute to another path of attack as described previously. Displacement of perimeters, in addition to these other flaws, adds to the physical and logical complexity of management.

Secure coding methods, code analysis, and other techniques reducing the number of bugs and design flaws represent a respectable avenue to minimize security flaws. However, this technique is a variation on perimeter security. Basically, security is a test of the ingress and egress through the perimeter, where specifically the perimeter is an application workflow. This application workflow is both at the mercy of other security methods in place and part of the breach that exposes the perimeter to risk. Integration, applications referenced by the code, patches, counterfeit patches, access to the information through alternate insecure channels or other applications, code from prior versions, can compromise the target code itself and the information workflow. It is only as effective as the thoroughness of the analysis, and only as complete as the protection of the code deliverable. Code deliverables can be compromised by replacement of operating system elements, dynamic libraries, external libraries, failure in core components, or by diddling the deliverable package. Code deliverables are also easily repurposed in way unintended. Code deliverables with digital signatures suggest security through formal authentication, this security is but a small part of a larger exposed ecosystem. Hackers are attacking code structure vulnerabilities despite secure coding methods, encrypted application deliverables, and vetting with digital signatures by altering the executable in memory during runtime. At that point, the application is presumed to be secure and already adequately validated, so exploitation starts by locating it in the task list, mapping its memory footprint, and then altering key functional return routines and those values directly in memory. Storm, for example, has been observed to defeat well-known innoculating antivirus software in just this manner. This same parasitic technology can be used to compromise the BIOS, a trusted control module, an MILS micro-kernel, an MLS proven structure, an operating system, applications, and any configuration files, databases, data files, and inbound or outbound data streams.

Access control is seen as a security panacea. However, it is a proxy for functional access. Actually, access control is a perimeter restriction policy. It funnels access through the perimeter using a control point within the supposedly watchful control of administrators. The failure of access control is one of granularity, although vendors are trying to address this issue with role, timeframe, scope, and permission limitations. However, access can be compromised with stolen or counterfeit credentials, misused credentials, or migration to other areas or functions lacking such rigorous restrictions. Insiders can open a side door to bypass a front door, or an outsider once inside can create a trap door for future entrance, or a weak alternate entrance can be compromised. One way exits are often compromised as covert entrances.

Mandatory access control (MAC) and discretionary access control (DAC) is an enhancement over generic functional access control when applied to file systems. In this case, such security is indeed applied directly to information rather than the proxy infrastructure. In fact, most operation systems support one, the other, or both methods, such as Trusted Solaris. However, MAC and DAC recreate the conflict between security and functionality, with the predisposed result of either a severe functional lockdown or information leakage. So while this enables information security directly, it often imposes complications in provisioning access control to applications and workflow and the associated matrix of data streams.

MAC and DAC are great ideas and work . . . after a fashion, but organizations chafe under the complexity and limitations. Vendors have created tools to ease the burden and reduce the security lockdown to regain functionality. This still represents a direct tradeoff between security and functionality. The problem is that the processes and information under the controls of MAC or DAC is not granular enough. For example, even when application code is created to distinguish between a payroll clerk and a human resource manager to protect employee salary data, other applications often are able to bypass the controlled field. When database security is enforced by row- and/or column-level locks, user with database administrator access or programming and design privileges can apply brute or subtle methods to select, extract, dump, reformat, or link to expose employee salary data. Database security has been enhanced by limitations on what the administrator, root, super user can do, but there are interesting ways to bypass these new restrictions.

In many case, the means to compromise the salary application is to access the database with the core database application and use the native query tools. If that does not work and security precludes row or column access even after table export or dump, opening a Trusted Oracle database with Microsoft SQL, for example, could fully expose the complete table structure and row and column values. Consider opening a newer database file with older release or a non-trusted installation. Even if Oracle security is locked down with user IDs, passwords, and table restrictions, these are often bypassed through an alternative tool that predates the new security restrictions or fetches data sets with drivers bypassing the locks. Some vendors simplify conversions, upgrading, and transitions, especially with universal BI tools, and these yield a treasure trove of skeleton keys that make light of new database security restrictions.

Even with Trusted Oracle, multilevel security, and transparent encryption, exposing privileged database data often is as simple as rethinking the how you bypass the front door. Try a side door or a partially open window that is generally extant through classification bias. SELECT employee FROM table.employee WHERE rate >120000 and rate <121000 will expose a highly paid employee because the SQL request is not returning a locked field value but a result contingent on that protected field value. That is all part of normal operations.

Security restrictions are often badly implemented and do not deny functional access but prevent display access. When employee rows are locked by explicit rate constraints, an inner join on the employee list with rate ranges will conspicuously infer the desired answer by the absence of an employee response to a query. Even if an employee record is not even accessible because of record-level controls, inference with a relatively small number of queries will still expose the desired data. Lockouts and failures can be probed for answers just as well as the actual information itself. This is very traditional but scientific black box exploration. When the actual problem or data set cannot be observed directly, analysis by proxy, perturbations, or shadows infers results.

Security based on redaction for the creation of versions provides niche-specific security. This works so long as the context is consistent with the initial state and when results are returned within the boundaries of the design criteria. However, change the requirements, assumptions, design limitations, become creative with public data aggregation and secured internal data in order to penetrate security. Restore, re-identify, or expose the context of the supposedly secured information. Results might initially show an unusual level of ambiguity, but inference, aggregation, and interaction eventually will compromise distributed versions.

Versions increase flexibility and streamline management. However, the duplication—even with a mediated risk—still propagates the security risk with more avenues of attack. The risk increases because of the additional instances and potentially wider distribution. This effort is contrary to efforts at centralization described previously, however decentralization with information item-level control does change the risk profile when key items are asymmetrically extracted, as with DigitalDoors.

Centralized methods and resources falsely promise ease of implementation under the watchful control of a highly-skilled and efficient administration. However, protection of centralized methods and resources recreate the previously detailed perimeter security problem. Breach the perimeter and the risk is not just one information stream but all information streams. Break into the castle and pillage the soft underbelly of the site. Centralization increases the risk of cascading exposure. Application integration, workflow integration, source code errors, access control errors, and complexity remain an insoluble avenue for information security breaches. Disaggregation of the centralized resources does not resolve the inherent problems in displacing and dispersing perimeters, however, it does statistically spread the risk from actual information breach when information content is dispersed in a partial or granular form.

In this manner, and this manner only, decentralization and dispersion increases security. Dispersion of information into multiple replicated locations raises the point risk because there are more instances of the information to protect. Instead of making the risk smaller, this makes it bigger. However, the solution to this is to disperse some content of the information to replicated locations, breaking the context of the data stream and lowering the risk of information items. This more than compensates for the security replication risk. It is a significant paradigm shift.

Existing point solutions address risk and security problems strictly within the context for which they were designed; they are rarely if ever extensible. They fail to address the extension of risk permutations, perimeter intrusions, process and information repurposing. Reinvention and revisions of existing point solutions for newly perceived risk and security problems work as point solutions but also are not extensible. The aggregation of existing point solutions into a unified security marketable product addresses only the point risks in aggregate. It does not do more than that, and often creates conflicts between the integrated point solutions themselves. In addition, many of these integration results create adverse side effects equivalent to or exceeding the costs from the observable attacks themselves. That is bad medicine that is getting worse even as the disease itself gets worse. Aggregating point solutions just creates a new perimeter defense.

Notice the two traditional approaches to security today. Disaggregate the perimeter defenses which have been ineffective into point solutions that can be refitted as new point solutions, or aggregate the point solutions which have been ineffective into an aggregate solution that can be marketed as an new all-in-one integrated solution. Logically, each option is the inverse of the other. This converts a solution that is known not to work well into another solution that is known not to work well, and at the same time, converting the other solution known not to work into the former. It is churn. This is a shell game where every player loses.

Further, the incomplete concepts of point solutions, such as routers, NAC, firewalls, IDS, IDS, virus scanners, and so forth are being reintroduced as new point solutions to limit cross-site scripting, SQL injection, and site-wide database attacks. These new products are point solutions for newly identified channels of attack, extensions of modest technology into new reincarnations of modest technology that do not do any better than the original modest solutions. They address some security flaws by proxy protection rather than specific and directed information protection. Clearly, nothing has changed.

So why did it take DigitalDoors so long? The problem itself is complex and the existing technology is insufficient, the solutions are not evident in existing literature, academic research, government efforts, or commercial products. DigitalDoors is swimming upstream against the contradictory efforts either to disaggregate perimeter solutions or integrate point solutions into new bundled tools. Consider a layered and geographical-driven approach to information security directly than indirect infrastructure protection.

That perception represents a paradigm shift not easily acknowledged, a new technology not yet accredited or widely tested, conflicts with years of security inculcation and propagandizing, undermines the experience and even the successful efforts of known subject matter experts, and contradicts the efforts of huge and influential industry. Recognition of limitations and the need for change does not come easily but usually as the result of some massive and consequential defeat. Maybe it is time to throw in the towel, realize the security deficiencies plaguing us today, admit defeat, and explore alternative paradigms.

AA.7.20.0 The Breakdown of Perimeter Security and the Need for Dispersion

"Crunchy Outside, Chewy Inside" is a common security metaphor based on outdated concept of security as a physical barrier and only as a perimeter. The metaphor describes containment of valuable assets within a tough external barrier—the crunchy outside—that when breached allows total exploitation of the desirable and unprotected interior—the chewy inside. The chewy inside is also known as the soft underbelly. The outside is tough, but the inside is fully vulnerable when any part of the exterior catastrophically fails or even slowly leaks. One way leaks are only perceived as one-way; they are logically bidirectional and 'slow' is merely a velocity measure that is a function of bandwidth, time, and context.

The traditional military concept is shifting in response to asymmetric warfare, randomness, global interlocking relationships, and formlessness. There is a lack of clear demarcation between inside and outside, my assets and your assets, and unilateral damage when the infrastructure is most likely interrelated and collateralized between defender and attacker. My cloud is your cloud; it is an entangled resource.

The addition of single point solutions, aggregations of point solutions, and microperimeterization to partition the chewy inside makes practical sense but the reality provides little additional logical security. Stretched and ambiguous perimeters do little to help establish an integrity to a perimeter or define exactly where it exists. These techniques do not address difficult logical definitions of what is inside and what is outside, where outside and inside overlap, and where custodianship and interrelationships are entangled. Inside and outsite are also blurred with integration, communications networking, and the increased valuation of intangibles over tangible assets. Asymmetric warfare, randomness, and global interlocking relationships enable formlessness as the obvious offensive model but also with a corresponding defensive metaphor realignment. Formlessness is the new security paradigm.

Intangibles are increasingly represented as data that blurs any distinction between asset, copy of asset, loss of asset, partial destruction of asset, and the diddling violation of the asset. Furthermore, this duplication, replication, and accessibility to intangible assets blurs any fixed distinction between asset valuation to the defending steward, partners, and an attacking aggressor. Multiple values depend on context and repurpose concept. Point solutions, aggregations of point solutions, and micro-perimeterization adds complexity and compartmentalization with a corresponding loss in functionality and still without addressing the core security requirements. Security mega-suites do not address the changing environment adequately.

Security breaches, leaks, and collapses are not only the results of direct assault, siege, infiltration, but functional avenues as well. The types of attacks are no longer so overt, so physical, so tangible. Security failure is more complex with assets frequently not so clearly owned. Assets frequently overlap in custodianship, sharing, and applicability, and the information revolution is increasing the intangibility of these assets. The PCI/DSS documentation for security defines a touchpoint as any access point, system, conduit, or workflow that exposes an information item to exposure. It is an edge or an endpoint. A touch point is breach of perimeter security. Traditional perimeter security methods do not incorporate the risks of the touch point or the likelihood of many of them, or show how to wrap the security around these transient doorways. Consider the security failures when the touch point is perceived as transient, but to all intents and purposes, breaches the perimeter on a permanent basis.

The only method to address the chewy inside is to partition it and disperse it beyond functional value and reach. This formlessness of content, context, and concept when reversible, provides reconstituted value in intangible assets when and as needed, decreasing catastrophic failures and exploitation of even slow leaks. Partitioning (microperimeterizing) is not sufficient with dispersal to preclude the reuse and repurpose of these assets. Reversibility through reconstitution with granular content control maintains the requisite functional accessibility with out the traditional conflict between functionality and security.

AA.7.21.0 Asymmetric Security

Cyber-attacks are often initiated by a small organization with distributed stolen resources against a facility that is large, immovable, and target-rich. The attacker drives a wedge at a deficient or the weakest component thereby applying virtually unlimited and irresistible force. When components are interwoven, failure of the weakest component provides both systemic failure and entrée into the soft underbelly of the facility. Countermeasures are few. Retreat or redeployment is impossible. Retaliation is impractical because subterfuge by the attacker is likely. This represents the unequal application of power through covert, concealed, ghostly, and distributed subterfuge, the obvious evidence for (indication of) asymmetric warfare.

If the initial attack against the facility fails, subsequent ones can be tried with parameter changes, alternate attack vectors, or the application of additional stolen resources. If the initial attack fails, it can be tried against another similar target and still be reapplied to the initial target at a later time. Every cyber battlefield is not unique but a variation on a very common theme. This situation is most advantageous for the attacker using asymmetric warfare. Should the initial attack is detected and repulsed, it can be tried again. Although known attacks have economic impetus, some agency might be amassing the unknown ones for a first strike. Perhaps what is most scary is that the initial attack (or at least many of the multitude that take place) probably succeeded and remains undetected because the attacker refrains from profiting then and there; instead the attack vector is mothballed for a later-stage planned military conquest. Successful attacks might include more than denials of service and theft of data and services but also seemingly benign probes that pass for noise or unknown anomalies.

How to thrive in such an environment? no symmetric countermeasures but asymmetric ones . . . attacks, counterattacks, and certainly facilities that are not a large, target-rich, immovable sitting duck.

Facility can not be monolithic . . . failure of whole is failure without recourse Facility must be dispersed, moveable, mobile, flexible Facility must have backup and alternatives Components must be independent so that failure of one does not lead to failure of another Components must be independent so that failure of one does create unlimited internal access Components as in data must be dispersed so that that they cannot be turned to the benefit of the attacker or other third parties, or used to the detriment of the defender or other third parties . . . .

Dispersed components should be inert, inactive, or neutral, or useless

AA.7.21.0 Suspicious Packages as Covert Channels

Suspicious packages come in innocuous forms that ipso facto are not intrinsically suspicious. They are generally innocent, adjusted to look like formats from familiar and even trusted parties, or plainly Spartan. This is the bootstrap vector for computer attacks, data leakage, security lapses, and privacy compromises. Security requires that we exercise caution with all data streams. Botnet trojans, viruses, malware, and bootstrap slurpers that steal confidential data come in innocuous packages but these insidious traps are designed to get past perimeter firewalls and circumvent any natural suspicion of risk. Malware never says "hey, try me out, I'm malware"? Nevertheless, such ploys defy both rational discretionary and mandatory protection mechanisms.

Confidential data, intellectual property, and proprietary bits and bytes go out freely or skip past outbound leak detectors in innocuous packages too. Inside risks are hidden under cover of friendships, trust built up over years or decades, man-in-the-middle attacks, or a lack of time and attentiveness to root out these uncertainties. A lot of risks fall below a threshold of recognition or are overlooked because the problem is not squeeky enough to get the necessary attention. Sub-clinical attacks do not initiate a defensive posture and can linger unnoticed indefinitely, and still be ultimately incurable.

Covert channels are concealed in innocuous files, attachments, inclusions, whole file encryption, encrypted insertions, metadata, tags, formatting, strange errors in data streams, hiding under, on, even inside every proverbial rock. Management agents and monitors are designed to work for your best interests, but hackers readily repurpose these tools against you. Protocols, network packet structures, agents working on your behalf and also the delivery wrappers for these vetted tools can be infused with covert channels. There are millions of creative people out there with a motive to pick every lucrative pocket. Encryption might be a solution to one problem but it is also a wonderful tool to create new uncertainties and even hide them in plain site. Encryption can mask the malware under a wrapper of security and cloaked in the complexity and authentication by digital signatures. Every package, and even just its wrapper, is suspicious.

Digital signatures and other attribution tools can vet the source and destination of such packages until such time as we become inattentive about that too, but never the sanitation of those packages. Every data stream and every file is a package without attribution. Every tool we use to protect those packages and the sanitation of the content can be repurposed to create covert channels. So every data stream and every file package is inherently suspicious. The chain of custody, while vetted throughout its length, still has a starting point that is ultimately based on some unsubstantiated level of trust.

Be suspicious of innocuous packages, small files, data sets, common everyday messages that do not fulfill the mandates of processing, require operations, or belong. Why, because we can create programs to read a lunch menu, the Oxford OED, or . . . a trade secret formula. Just one bit at time, mind you, and tweak just one bit with that extra bit in some gray-flannel suit files within an arraigned or calculated position. We only have to pass just one bit per file. It is a leak, a leak so small and so slow nobody will mind it. The sub-clinical theft is only a matter of bandwidth, and bandwidth is almost unmanaged today. We can smuggle out that trade secret in a stream of traffic, over one hour, one day, one month, even over one year—past any guard. We need only extract those bits to reassembly them into an exact copy of your trade secret. If we think that the leak has any risk of detection, we can even spread chaff into the traffic and recycle a CD of old viruses as a ruse to busy detectors and keep the watchers self-satisfied that they are accomplishing a job while we are surreptitiously doing the job on them.

Information is a complex assemblage that includes raw data, structured data, other forms, metadata, intellectual capital and property, processes, communication infrastructures, and forms far more intangible. Issues of context, purpose, intent, and how the information can be aggregated for new purposes also become critical security consideration. Information includes structured, unstructured, semi-structured, Intellectual Capital and Intellectual Property. The definition of information is subject to much academic debate and competing theory. However, DigitalDoors whitepaper, What is Information?, provides overview on this topic in a review of the types of information, the format of information, the purpose of information, and the risk factors inherent in the aggregation, inference, and interaction of information.

We need to protect information by creating information security that is security that specifically protects the information rather than the infrastructure, the perimeters, the processes, and the workflow, as we do now. Information is not about protecting the proxy but protecting the information itself. We go naked. Not naked like in no firewalls, but naked as in reducing the complexity of information formats to the minimum required for the job. No metadata, no compound files, and complete understanding of the intent and context of the information. For additional information about how to implement a Security Hygiene as part of the DigitalDoors Doctrine, see these whitepapers for additional depth in these subject matters.

Then, how do we protect the information? We know encryption usually works, except when encryption is used against us, so that is problematic. Instead, we need to disperse the risk, but hide our secrets in the clear. DigitalDoors protects-information by extracting the crown jewels and creating a single generic and universal redaction. Multiple redactions, that is versions of redactions, are useful too, except when the versions get distributed out of control. The DigitalDoors universal redaction is controlled. The DigitalDoors universal redaction can be reversed with none, some, or all the extractions, with fine-grained reconstitution under a granular content control. The information itself is secured with control over contents, purposes, potential for reuse and abuse.

AA.7.22.0 Dispersal Security Versus Perimeter Security

The subdivision of a perimeter, whether by moat, castle wall, firewall, silos, containment, or physical protections, into microperimeters disperses the risk of complete security failure but does not disperse the content at risk or provide security through dispersion. Microperimeterization creates subsets of perimeters that might be better, equal, or no better than separate protections. Microperimeterization is compartmentalization or even subcompartmentation. Think of ice cube trays that minimize slosh but do not really provide isolation between adjacent compartments. It provides internal delays and battlements when an outer perimeter is breached but more confusion than security within the greater perimeter. However, when the microperimeterization uses the same basis as perimeterization, the level of security is the same although the number of instances is increased. Often microperimeterization provides delays and complications without any real increase in the magnitude of the security.

Dispersion is the structural disassembly of the content at risk, often into units with minimal value, and its distribution such that compromise of any single unit is equal to or less than the substantative value of the dispersion itself. Partial and incomplete compromise might preclude partial or full value of the content at risk. The process of granular information dispersion breaks the content, context, and concept of the information to preclude aggregation, inference, or interaction. The distribution of the fragments precludes intelligent aggregation or partial inference with certainty.

AA.7.23.0 Metadata Risks, the Need for a Lockdown

The following shows how metadata extends the value of data, introduces obvious and hidden risks, and how to lock down data security while enabling concurrent means to share data. Although many published articles outline the risks of hidden metadata in document distribution, these articles do not explain how metadata introduces these risks. It is of utmost importance to realize that semiotics, through the search for meaning in the greater environment, extends the risk for data starting from the definitive to the unforeseen and merely hypothetical. If metadata is after all just data, not so different from raw data streams, how does it create such risks? This paper explains why granular content is a solution for the data ecosystem.

The simple answer is that metadata is not inherently riskier than any other data. Metadata is just data that is allotted so that it is not always visible nor accessible. Furthermore, most data includes implicit or explicit metadata. The difference is format and whether styles and structural formats are internalized or externalized. XML tags, database table structures, and other internal demarcations are obviously metadata. A separate style sheet or transformational application that formats the fetched data for display is also two different forms of metadata. An externalized implicit format is still metadata even if it is not written anywhere; it might be hard-coded into an application that segments and parses the fields hidden in packed data or obvious to a human reader who makes assessments of the syntactical or grammatical structure. In fact, application code, macros, control functions, and most other aspects of information technology are reducible to just data, and should be construed as a data file. Compiled application code, while clearly a process workflow, is also a transformed data set. Also see Punctuation—Context alters Concept If you harbor any illusions that a raw data file is not metadata and no matter how simple and minimal does not include reference to metadata somewhere, reconsider the meaning of its existence, name, extent, properties, and location in any filing system. For example, because the raw data file exists, it implies work accomplished. The file name provides some designation of utility or purpose. Extent often is linked to the application or process that opens the file. Properties define ownership and user access controls, date of creation and last use, size, numbers of access; and in trusted systems logs of who, when, how often, and with what application accessed the file. The location of the file within a hierarchical file system also ascribes the functional purpose of the file. Consider that the file path components define ownership or stewardship and designations of utility when the path contains a directory with a file type name or purpose. Image-based file systems with a hierarchical tree view of files and thumbnails of content or unique icons also impart meaning.

Although it is possible to create a file system hierarchy with random paths and names, semiotic analysis of the metadata defining the environment surrounding that file still provide rich meaning to that file independent of its content. When data file includes metadata, the semiotic implications of the file increase. The risk of data containing metadata is not hypothetical; it is a statistical certainty.

The meaning, value, risk, security, and sharing of data is far more complex than white lists, black lists, and gray lists or firewalls, encryption, access controls, and perimeter protection. The semiotics (meaning and interpretive understanding) of data is complex but represents a first step in recognizing the value and consequential risk of data and how to secure it and share it.

DigitalDoors represents data with a triumvirate of content, context, and concept as a simple mnemonic to illustrate the complexity in meaning. Content, context, and concept is not the full spectrum of meaning; it is just a shorthand. The data stream, its encoding, format, structure, references, labels and tags, hidden text, comments, macro code, and internal structures such as tables of contents, indexes, and footnotes establish the content, context and concept. It also sets intent, purpose, utility, the decay rate and half-life for the data, and who or what should use it. These categorizations overlap in that content also sets context and concept. Likewise context and concept establish content too. Order, placement, tags and labels, a defined metadata hierarchy, and other data structures establish meaning.

AA.7.24.0 Competitive Analysis of Security Methods

AA.7.24.1 Security Technology

DigitalDoors security technology is represented by several techniques. This includes everything from:

TABLE

| DigitalDoors techniques |
| --- |
| Making the process complicated in some way |
| Encryption |
| Ciphering (non-character substitution) |
| Data compression and other encoding |
| Data hiding (or data masking) |
| Steganography (the process of hiding a messaging within the content of a more obvious one) |
| Winnowing (validating integrity and non-repudiation) |
| Access control |
| Biometric access control |
| Situational access control |
| Data Hiding |
| Data Sharing |
| Remote monitoring |
| User identification |
| Remote visual identification |
| Identification of friend or foe |

TABLE-continued

DigitalDoors techniques

User authorization
Cascade of authentication
Chaffing (injection of rubbish)
Winnowing (checksum compression)
Secure maintenance
Firewalls (or moats)
Data dispersion (storage and delivery)
Binary (ternary and et cetera) information delivery Digital Doors applies all of these techniques in one form or another, but primarily focuses on the two core techniques of data hiding, and binary storage with delivery. Note that process times are at least comparable to encryption—in fact, several magnitudes faster—plus provide some other functional and workflow benefits. Specifically, while security might be the primary focus for these technologies, DigitalDoors are enables survivability (risk mitigation), privacy, confidentiality, and anonymity under the same umbrella.

Table of other security techniques,

Virtual private networks (VPNs)
Intrusion Detection
Firewalls
Proxy servers
Encapsulation
Convolution encoding (taken to an extreme by Rinjdael)
Obfuscation
Statistical encoding
Forensic control
Strikeback DigitalDoors does not require as large an initial commitment to creating new infrastructure and it works with existing infrastructure. It is not dependent on a bet of cipher technology or the distribution of it.

AA.7.24.2 Encryption and Security History

The earliest recorded history of message encryption and message hiding (steganography) goes back at least to the failure of Persians to conquer Greece. The Persians had expected to surprise the Greeks, but the Greeks turned the tide and trapped the Persian fleet in a confined bay. Advanced warning delivered as a message on a wooden board obscured by a layer of wax from a Greek expatriate spurred the Greeks to build up their munitions and surprise the Persians instead.

So-called "unbreakable" encryption unraveled by code breakers lead to the loss of her head by Mary Queen of Scots, the German U-Boat fleet, the Japanese Navy Admiral Yamamoto, and many others. No encryption has proven secure in actual use. No method has been mathematically proven beyond doubt to be undecipherable. In fact, even the best of the modern algorithms rely on the difficulty of locating prime numbers, which are now under pressure from faster CPUs and new technology based on quantum mechanics. Some encryption methods require a trusted third party, which in the past has shown itself to be untrustworthy, susceptible to bribery, and even been the puppet (CryptoAG) for an unfriendly spy agency. The germinating philosophy is to address the damage and risk through mitigation rather than barrier-based security.

AA.7.24.3 Cipher Science

Lengthening the encryption key is a false effort to improve security because the distribution of prime numbers is asymptotically logarithmically decreasing rather than exponentially increasing. A 56-bit key creates a number that is 22 digits in length with 612489549322870 prime numbers. A 112 bit key is 46 digits in length with 4309606392583910000000000 prime numbers. In other words, while the key space is 72057594037927900 times larger, the prime number space is only 70362121237035500 times larger, by direct prime number generation and counted enumeration. Approximation methods other than enumeration (practical as the key gets larger) to count primes include the Gauss's empirical postulate, von Mangoldt value, Chebyshev's φ function, Perron's formula, Dirichlet series, and Reimann's Zeta function.

There are 2.4% fewer prime numbers between the 56-bit and 112-bit space, representing an 11% asymptotically logarithmic distribution of prime numbers. This slight reduction might seem inconsequential, but as the key size is doubled and doubled again, the loss is non-linear (2.7 and 3.4%). This undermines the potential for prime numbers as encryption keys and increases the effectiveness of brute force prime number factoring in decryption. Although the key sizes and the sizes of prime number sets are enormous (103 digits at 256 bits and 206 digits at 512 bits), Moore's Law wins on computational deciphering. A Swedish team cracked 512-bit DES in 14 hours in 1999. Besides, unwanted prime-number encryption has a non-linear 2 to 7% helper in the form of the asymptotic distribution. Note that the AES replacement for DES and Triple-DES is Rinjdael. Because it is a block dislocation cipher, it is at first glance immune to brute force factoring. However, Rinjdael (and any other encryption method) will succumb to modified cracking efforts. The government analysts for the AES group in charge of selecting from the five encryption process finalists in fact cite the following:

"The standard techniques of differential and linear cryptanalysis can be adapted to be used against Rijndael. Because of the way matrix multiplication works, and because in GF(2^8), all the coefficients of the Mix Column matrix (as indeed all numbers from 1 to 255) have reciprocals, a specific attack, originally developed for use against its predecessor Square, called the "Square attack", can be used as well . . . . This interesting property, although not trivial to exploit, can be used to impose certain conditions on the key when one additional round, before or after the two rounds involved, is present. The possibility of this attack was first noted by the developers of Square and Rijndael themselves, and was noted in the paper that initially described Square."

Encryption only provides protection point-to-point and so a long as all information is contained within the encrypted container. If the security needs require only point-to-point, virtual private networks are faster, more efficient, and less prone to complications. This conflicts with normal workflow by impeding the benefits of data sharing, networking, and Internet distribution. Encryption is also order-sensitive, such that any encryption applied to a previously encrypted container must be decrypted in the reverse order. DigitalDoors is not order-dependent, unlike encryption and other security algorithms. The many features and concepts of DigitalDoors bypasses the conflicts between information delivery and the business workflow needs of openness and information dispersion. Furthermore, it can always be applied, not only to protect against external attacks but also internal subversion. Encryption can be applied as delivery encapsulation, if so desired, but for practical reasons must be the last security step.

AA.7.24.4 Integrating Disciplines

DigitalDoors applied methods and technologies borrowed from other endeavors and solutions in information technology. The implementation is revolutionary, but the core is derived from the prior knowledge of other disciplines. As one example, the disassembly of information into small pieces and restoration of that information is based on theories of data packet communication. Ethernet chops data into 1512 byte segments, wraps this data into a packet, and sends these packets in arbitrary order, via paths that are arbitrarily defined by routers, into a temporary buffer where packets are received in arbitrary order, sometimes a few missing packets are requested to be redelivered, in order to recreate the original data at a new location. In a corresponding way, DigitalDoors creates controlled chaos within rigorously defined parameters, data redundancy, and a carefully orchestrated process to restore the original data in part or completely. DigitalDoors chops the data in more meaningful and contextual segments—by meaning and for many different application purposes—but nonetheless the technology is evolutionary.

AA.24.5. Unique Architecture

The current security paradigms include access control and encryption. Access control implemented through passwords, authentication, biometric authentication, and physical certification is recognizable as username and password pairs and firewalls. Usernames and passwords are breached through a number of workflow complications, active demon dialing (brute force), adventitious mistakes, failure to enforce basic procedures, and social engineering. Firewalls are breached by brute force, implementation errors, software bugs, design flaws, new combinations of multi-pronged attacks, as well as adventitious mistakes, failure to enforce basic procedures, and social engineering. It is also important to recognize that firewalls do not protect against internal attacks or external attacks aided by internal help.

Access control, while widely implemented, is seen as a necessary evil that complicates workflow. Few applications enforce or include random or spot security checks. The number of physical or logical bypasses limits the effectiveness of access control. In addition, the massive workflow shifts attributable to E-mail, shared application access, application sharing, data sharing, networks of business functionality shared with partners and even competitors, exchanges, data distribution, web hosting, and wireless enablement severely compromises the effectiveness of current access control methodologies. Specifically, access is no longer physically controlled or actual location(s) even known. It is often mobile too. Distributed information extends the time frame for its accessibility to an unlimited interval, through screen shots, ongoing access, or downloads.

Encryption, variously implemented through obfuscation, ciphering, table lookup substitutions, or mathematical processing, suffer from a number of flaws. The most obvious is its lack of mathematical integrity. No encryption method has been proven. All historical obfuscation, ciphering, and substitutions have been broken. The strength and protection from mathematical encryption, based on symmetric, public key, asymmetric, shared key, and others are subject to faster computers, parallel processing, new algorithms, and even new technology such as quantum mechanics. Despite the well-publicized flaws, failures, and breaches of encryption, the workflow and implementation problems with encryption are actually superincumbent.

The most undermining actuality of encryption is that the seeds of its own decryption are embedded within the data and encryption encapsulation. Statistical analysis is often applied to rapidly decipher the data contents and brute force is also a solution with sufficient time or improve algorithms. Brute force is not necessary exponential either. Content analysis of the decryption of partial results streamlines rejection of unlikely keys. In addition, since most modern encryption is based on paired prime numbers, prime number factoring also streamlines deciphering. Prime number lookup tables and prime number factor tables reduces the set space for decryption keys. Note that the distribution of prime numbers decreases by Reimann's Zeta function as the size of the key increases. When the key size is doubled (100%), the number of prime numbers only increases by about 2%. In other words, as keys get longer as they inevitably must, given Moore's Law and development of new technology and better algorithms, the keys become easier to guess . . . let alone factor.

Although the new US encryption standard will eventually use Rinjdael, RSA applies prime number generation. Consider also prime number searching using harmonic analysis described in the September 1988 German issue of the Scientific American, Spektrum der Wissenschaft. The article on number theory briefly mentions Stanislaw Ulam's Spiral, which is a way of mapping the set N of natural numbers onto the grid N×N. Marking all prime numbers black, Ulam saw patterns emerge providing useful technology for mapping and locating prime numbers based on Hough's Transform.

Specifically, encryption is slow, even with supplemental, external, or coprocessor technologies. The increases in key bit size from 56 bits to 256 bits imposed a 64-fold increase in processing overhead. As it has become clear that even 512-bit and 1024-bit keys can be defeated within hours by corporate hackers and minutes by government agencies, the orders of magnitude required to apply more complex and longer encryption will slow encryption to a crawl. Although computing capacity has doubled every 18 months (in harmony with the principles of Moore's Law), the pressure on key length has outstripped that pace. Furthermore, computing capacity has doubled on the desktop and server end; supercomputer capacity has not kept pace, even with the parallel and scalar designs.

Encryption sluggishness is a two-way street. Encryption time is symmetric with decryption time. This is fundamentally true with both asymmetric and symmetric methods, private and public key methods, and most escrow and third party methods. As data access shifts from screen display to shared processing metaphors, the process latency times and cumulative queuing delays will represent times in excess of routing and network delays, undermining effective real-time operations.

Of even more concern are the complications encryption imposed on workflow. Although encryption can be implemented at both ends of a process (or multiple steps in a process) technically as an inline piped procedure, there are fundamental security and distribution control problems with keys. Specifically, the two parties or multiple parties must agree on the symmetric or asymmetric encryption keys. The key, whether symmetric or two part must somehow be delivered to the recipient. Keys can be intercepted, copied, and redistributed. Distributions of a single source to multiple recipients increases the workflow complexity in that either multiple unique keys must be distributed or partially compromised by the single key. SSL and similar technology ships the key in the same time window as the delivery of the data thereby creating a very viable interception possibility. Interception has been demonstrated in the press.

Although the interception of encrypted information is supposedly protected by the encryption wrapper, encryption can fail with some social engineering. Specifically, a hacker or unintended recipient can participate in the distribution of keys by posing on the intended recipient, and thereby defeat all security whatsoever. Although encryption is in place, the hacker or unintended recipient has the key anyway.

Encryption keys have other social engineering problems. Alternatively, keys can be issued by key escrow agents or third party trusted vendors. As has been evidenced by many such similar episodes as the CryptoAG debacle, there is no guarantee that the encryption technology, the key issue, key escrow, or even implementation is free from trap doors, Trojan horses, and secret back entries. In addition, in spite of any trust assured or guaranteed through third party agents, there are no guarantees that keys will not be released by insiders, moles, paid informants, or under duress of court orders.

Encryption is also order-sensitive. If a data object is encrypted by one method and set of keys, then encrypted again by other methods or keys, recovery can only be effected by the reverse application of method and keys. As encryption proliferates inside of workflows, maintaining this order is not always feasible or possible, and decryption failures are becoming more frequent. When processing is combined with encrypting as part of workflow, the stepwise failure to decrypt and then process renders not only the encrypted message irrecoverable, but is also likely to abend the data processing operations with flawed "data." Note that knowing whether to use DES, Triple-DES, or how to handle multipart keys as part of an automated workflow is also important because the use of the wrong method will merely pipe gibberish into the step in the process.

Failure to recovery encrypted data often entails complete data set loss or a complex process beyond the capabilities of most organizations to recover or reconstruct the sources. Lost encryption keys, damaged encryption containers, and process order failures render encrypted data irrecoverable. This could require a process restart at best or require data regeneration from the start. DigitalDoors is designed to address and overcome the flaws in existing data security technologies. It resolves a number of problems in security, survivability, privacy, anonymity, and confidentiality. The DigitalDoors paradigm is based on compartmentalization, dispersion, and chaos theory. It describes a condition of security based on the absence or critical and important information, the diffusion of critical information and components, and the use of chaos theory to distort context and reference with information scattering and increase complexity or entropy within the data information system (as defined by Jeremy Campbell in the Grammatical Man, Simon & Schuster, 1982). This technology has been replicated from agency, military, historical, and theoretical work by such as Sun Tzu, Ron Rivest, George Patton, etc. . . .

AA.7.24.6 DigitalDoors Versus Other Technologies

Please see Analysis of Competing Securities for greater depth on this subject. Security, privacy, anonymity, confidentiality, and survivability are today's prerequisites to functional information technology. Existing methods fail to achieve these goals in toto, in part, or in aggregate. As a result, a new approach is necessary to address each of these goals separately and all of these goals together.

Existing security technologies are incomplete and fragile. The security technologies are designed for deadbolt-like exclusion rather than internal security, external security against internally-mounted attacks, defense against intrusion, and custody for outbound distributions. Furthermore, existing security technologies are not designed to provide privacy, anonymity, confidentiality, and survivability. Privacy is a problem addressed with ad hoc methods by merchants, customers, at both server- and client-side, with unimpressive results. For the most part, security is currently implemented with encryption and firewalls to thwart surveillance. These limit access to camouflaged assets. However, everyone of agency or hacking significance knows exactly where the assets are located, whatever the perimeter protection, and as such, can focus unlimited resources to defeat defenses and capture of those assets. This is an outdated mentality.

Anonymity and confidentiality are mandated by EU data directives, the Safe Harbors agreement, by the U.S. Medical Privacy Act of 1996 (to be effective by 2004), by other foreign and U.S. privacy directives that are in force now, will apply after statute dates, or are likely to be enacted in the future given the political climate. Frankly, implementation is manual and frighteningly archaic. Products, services, and computer technology seem aimed more at circumventing police surveillance than in proactive consumer and organizational protection.

Technologies for survivability, disaster recovery planning, and business continuity have been developing for quite a while. Backup, hot sites, and management planning is advanced and effective when properly implemented and maintained. Indeed, this industry is showing growth rates of 290% annually and representing about 40% of IT budgets. The Internet and remote backup technology in conjunction with high-speed links has made live, offsite backup and restoration feasible. This nexus of new technology makes DigitalDoors the next step in data continuity by parameterizing data, lowering storage costs, and creating new doorways for access authentication.

The short answer to "Why DigitalDoors?" is that this paradigm, technology, implementation, and application suite is designed to provide security, privacy, anonymity, confidentiality, and survivability as a complete, interrelated, and integrated solution. DigitalDoors represents a paradigm for safety based on data selection, data extraction, data dispersion, data hiding, and data delivery with layered-access reconstitution not previously discussed in the literature or implemented as host, server, appliance, or end-user applications. We have implemented this technology and it is available now.

The more technical answer for "Why DigitalDoors?" can be given as a comparison with competing technologies, such as encryption, steganography, and firewalls. For example, DigitalDoors does not need to establish key exchange with a $3^{rd}$ party who is using a different computer hardware or software; $3^{rd}$ parties do not need identical encryption and decryption programs, they only need a password or a biometric verifier. Strong encryption is strong relative only to the availability of computing power to break the keys. Moore's Law, or rather his prognostication, suggests that because the power of a microprocessor doubles every 18 months, new technology will have the power to sequentially break encryption keys. No encryption is mathematically proven unbreakable. Social engineering attacks are common to guess keys. Brute force attacks are common. DES encryption system, the existing standard for law enforcement, was cracked by a $200,000 computer of the Frontier Foundation and has been cracked within a period of days with keys as large as 512 bits. Third party key escrow is no guarantee of protection. Key recovery by law enforcement agencies creates a questionable back door. Should encryption regulations become prohibitive again, this system does not rely on encryption for its core functionality; therefore, DigitalDoors can avoid any current or future restrictions on encryption. By definition, breakable security measures include:

TABLE breakable security measures

Encryption
Firewalls (or moats)
Ciphering (non-character substitution)
Steganography (the process of hiding a messaging within another TABLE-continued breakable security measures obvious one)
Access control
Biometric access control
Situational access control
Remote visual identification
Identification of friend or foe
User authorization
Data dispersion (storage and delivery)
Binary (ternary and et cetera) information delivery Even chaffing and winnowing have serious functional limitations, as explained since Ron Rivest first suggested his alternative to strong encryption export limitations. Specifically, chaffing and winnowing have not been implemented to date. Although they demonstrate some potential (and indeed DigitalDoors applies some of the concepts), chaffing and winnowing have not been implemented alone or endorsed as a viable security software. Some research scientists have formerly criticized it as complicated, as using extraordinary amounts of bandwidth, and its mathematics as insecure. Steganography, a method of communicating secrets by hiding secret information within another piece of information in such a way that the adversary can not discern the presence or contents of the hidden message, also purports to be an open method to protect data while publicly sharing that data. Examples include:

Microdots
Watermarks
Data embedding
Secret sharing (dual key access)
Data hiding
Digital signatures
Covert channels
Spread spectrum communications However, steganography has serious limitations. Primary, the assumption is that the defender is smarter than the attacker, such that the attacker will not figure out the methods used to hide useful data within the structure of chaff. Ultimately, multiple contexts of chaff and the subverted information become apparent. Tools get developed to find edges where edges do not belong, where information somehow represents disjoint or clashing sets, or semantic confusion is at odds with the functional purpose of the information. Ultimately, the key data stands out from the chaff in how it functions, looks, reads, or formats.

Serious limitation includes that microdots are not practical in a digital environment and generally can be located very easily. Watermarks require bandwidth, can be removed, manipulated, or decrypted from the source. Watermarks are often obvious and do not protect information. Secret sharing is difficult to implement and usually requires the co-location of sharers. Data embedding and hiding suffer the same limitations of chaffing and winnowing, in terms if overhead and lack of mathematical certainty. Covert channels are effective only so long as they remain unknown. Spread spectrum is effective only so long as analog and digital spectrum analysis is not used to define the channels and the hops, unlikely even now with current technology. Spread spectrum efforts to protect cellular telephone NAM and PINs are broken within hours of each new technology release.

AA.7.25.0 Security by Dispersion to the Cloud

The DigitalDoors selection, classification, and dispersion technology was designed primarily to address a distributed universe of processing and data storage. The cloud is a composite of data, process, and workflow where boundaries represent a distinction no longer viable. The cloud is a single integrated ecosystem that ignores firewalls, perimeters, guards, and security point solutions.

The first DigitalDoors illustrations defined a network within the traditional framework of a cloud, even multiple clouds reflecting multiple layers of security both isolated from each other and interacting together through Digitaldoors technology. Implementation was applied to enable and support traditional data processing operations within a structured, field-oriented, free-form, unstructured, and database-oriented architecture. Data structure (the lack thereof or complexity) was not perceived as a design constraint or limiting factor. Processing technology for this new paradigm, the generations of information processing equipment, and networking interconnections, were not constrained by available concepts. DigitalDoors anticipated information as the primary resource and the expression of both process and distribution within its own framework as an extension of an evolutionary information and production model.

Furthermore, the basic dispersion technologies were invented to address the security requirements of a distributed agency and military global information grid (GIG) supporting centralized and distributed processing resources, multi-homed delivery channels, uncertain security at the edge, edges under constant attack, siloes and stovepipes, uneven methods to interconnect high and low risk resources (MLS interconnectivity), and the realization that warfare had evolved to a point where attacks are amorphous, asymmetric, easily involving both friend and foe alike at the same time.

Of course, the concept of the 'cloud' that we know today is not the same cloud described by the mainframe and terminal architecture, the network of peer servers, clients and services, remote procedure calls, or a distributed LAN and WAN network architecture that comprises the Internet. It is possible to think of these subsets within the cloud as spaces delineated by perimeters, with the cloud comprising the superset of all possible sets and subsets. The cloud we recognize today is a ecosystem cloud comprising all possibilities, with seamless interconnection and integration, not the specialized VPN generally presumed. Although the cloud of today actually incorporates VPNs and specialized links for silos and stovepipes, any presumption of security microperimeterization is based on archaic views of trustworthiness.

The cloud today attempts to describe an uniform environment of process, storage, and utilization not defined by any where or any time, and not static in any terms familiar to us now. This definition is still evolving as information and process are mashed together in interrelated but dependent forms. This is the concept foreseen by the GIG and what DigitalDoors anticipated would provide security through dispersion as a fundamental paradigm shift. The cloud transcends perimeters and point solutions and any expectations of when and what order, so solutions that presume a defined location or definitive risk are inadequate for this cloud paradigm shift. The cloud becomes our functional universe where perimeters and microperimeters are archaic delineations lacking force of security or control.

DigitalDoors sees information as the primal resource, reflected in data, application definitions, workflows, and expressions of design blueprints that become programs, process, products, services, intangibles, and intellectual property. DigitalDoors sees most resources as a reflection of information, and the enablement of it cannot be based in place or in time. The DigitalDoors technology addresses this cloud as it is exists today, as it develops in new ways, as the distribution of information evolves into new forms, formats, structures, composite processes, and purposes where the primary production model inputs and outputs are data and the production model is an omnipresent cloud.

AA.7.26.0 Defenses in Depth: Layered Security

Layered security or defense-in-depth is an historical and biological approach. Perimeter security is usually layered, in that the area surrounding a fortress is denuded of vegetation and hiding places. Concentric walls are often built in progressive heights with inside moats and battlements. Walls and moats define the final perimeter of the castle. Walls have evolved in terms of height, depth under the ground, angles, and thicknesses as siege weapons evolved. Entry into the fortress is usually tortuous so as to prevent the defenders from being suddenly overrun or defenders from facing a friendly party turned aggressive.

Biological security is typically layered. Individuals forms herds or pods to provide gross control against natural events, predators, and competitors. Some animals include aggressive and defensive fortifications, such as turtles, porcupines, snakes. Bone, nails, scales, fur or hair, provide site protection. Skin provides protection against some physical, microscopic intrusions, and leakage. The immune system deals with gross damage but also bacterial or viral attacks. Organisms replicate, evolve, and disperse to further the species, but the more important social and cultural information is taught intergenerationally.

This layered security metaphor extends to information technology. Most infrastructures have outer perimeter defenses that are physical and limit access. Firewalls and routers (plus all the evolving IDS, IPS, and other technologies) provide a perimeter defense. Biometric or password access control limits functionality and data access. Antiviral products provide some low-level protections. Distribution of assets and encryption of data complete this layered approach. Hot sites and backups provide integrity and survivability.

AA.7.26.1 Why Layered Security Works

This methodology works because the defense mechanisms overlap most of the attack vectors. It is simple. People understand it. It supports evolutionary changes that fulfill a view of incremental improvements. New point solutions can be created to parry new threats and attacks methods as they become known. Layered security is flexible and resilient, and its also supports polymorphic, evolving, and layered or multipronged attacks through defenses-in-depth.

AA.2.27.0 Perimeter Security, The Failure of the Sandbox

A sandbox is any security space compartmentalized within a larger environment. The metaphor is based on the concept of retaining the messy, abrasive, supposedly clean sand within a restricted children's play area. This is the application of perimeter security inverted so as to create a perimeter to keep valuable assets within and prevent cross-contamination rather than keep dangers out.

A sandbox is a technique of security isolation and functionality restriction within a designated internally controlled perimeter rather than an external separation beyond the perimeter. Simply put, a sandbox protects what is inside from damaging things on the outside. In contrast, a perimeter protects what is inside from being damaged by things on the outside. A perimeter also keeps the two apart.

The sandbox is the predominant security method applied for remote procedures, ill-behaving applications, cloud computing, and virtualization security. A sandbox is a perimeter protection method, keepings things separated rather than keeping things out.

A sandbox is a variation of a perimeter, just geometrically different. A sandbox is the simple difference between a belly button "iny" versus "outy." The geometric configuration is basically turned inside-out, so both are really the same. The context differs only by whether the observer is inside or outside the shape and whether the shape is used to keep something inside or keep something out. Inside and outside are relative contexts functionally equivalent in geometry. Imagine a balloon turned inside out, doing the same functional job, but contextually inside is now outside and outside is now inside, balloon surface printing notwithstanding. Therefore, while a sandbox and perimeter might seem different, logically the sandbox is just a geometric inversion of a perimeter.

The sandbox demarcation is still there, serves the same function—really nothing—and is no more or no less effective than any other perimeter-based security variation. The terminology is used to impart a difference between it and other failing perimeter security methods like firewalls, guards, intrusion detection, extrusion protection, deep packet inspection, and the like. It seems cleaner and more concrete than say a perimeter because a sandbox is defined in terms of space, resources, area, placement, containment, and access points. However, the logical structure is still a defined space that requires interactive doorways into the other spaces. The security is no different from any other perimeter-based method and suffers the same definitional problems of defining what is inside from what is outside.

The apparent difference between a sandbox and the perimeter is the false simplification that the sandbox is defined as the secured space protecting everything else rather than an amorphous space that must be protected from everything else. Stretched and ambiguous perimeters do little to help establish an integrity to a perimeter or define exactly where it exists.

When a sandbox is created within a workflow or process space, this an example of microperimeterization. It is also possible to create two, or an infinite number of sandboxes, which by virtue of the quantity is somehow more attack-resistant and secure than just one. It is also possible to create a temporary sandbox. Although this apparently minimizes the time window for an attack, a sandbox still needs the same doorways to interconnect inherently interactive communications processes. The timing of temporary sandboxes is not random since it corresponds to a process that can be predicted. Access during these temporary windows through the ever-present doorways represents the same channel for attack for the one, two, or infinite sandboxes. Timing is obscurity that an intelligent attacker will nevertheless learn to exploit. Process concurrency, virtualization, and any shared service or resource also enables security bleed-through.

Often the sandbox is 'enhanced' with additional security methods. This includes mandatory access control, roles, and expectation of the stability and integrity of the infrastructure. However, mandatory and role control presumes one-way directional and protected control over communications flow. This is not a proven methodology, and in fact piggybacking communications opens a two-way venue for malware and process reengineering. Hardening the infrastructure certainly improves its stability and integrity but does not address limitless avenues for complex breaches, polymorphic leaks, and attacks from 'trusted' parties.

Instead of creating an additional defensible citadel within the perimeter through microperimeterization, in effect the sandbox is creating a controlled internalized space with the logical functional position externalized beyond the perimeter. This is the illusion of containment and managerial control without any functional differentiation. This illusion also relocates the risk itself nearer to any potential targets rather than isolating the risk from the targets.

The additional risk includes that of an expanding sandbox blowing up within your perimeter. This creates additional adverse effects, such as buffer overruns, denial of services, and resource hogging. There really is no difference even for this internalized risk except for resource allocation issues. A sandbox is a perimeter guard rather than a perimeter firewall. The result is just so much verbal hair splitting without any substantative difference or any substantative security improvement.

Hybrids of various point security solutions and perimeters make the rounds as new opportunities. Unfortunately, they are not perceived as variations on the same incomplete schemes. Hybrids are variations of techniques that do not work separately, rarely work better together, and generally create more venues for exploits when combined. If we repeat the definition for sandbox and perimeter, perhaps there is a hybrid sandbox/perimeter waiting in the security future; it would seem to make sense, after all creating a double wall suggests a protection from the external risk separated from the internal risks. Recall that the sandbox protects what is inside from damaging things on the outside, whereas a perimeter protects what is inside from being damaged by things on the outside. Combined, wouldn't that be best of all security techniques? This is the hybrid of the firewall and guard together.

However, the logical failure of this hybrid stems from the opening of any doorway. This undermines valved one-way communications. One-way communications is not functionable. All applications and workflow effectively requires two-way communications in order to integrate business process silos. One-way communications would be secure, but the lack of confirmation creates the proverbial 'on a wing and a prayer.' Two-way communications exposes the doorway to a piggybacked exploit compromising both inside and outside even with such a double perimeter. See the white paper In & Out for explanation why two-way contamination is inevitable. As hybrid megasuite security products incorporate additional point solutions for each new exploit and composite solutions are engineered to identify polymorphic threats, the result is an escalating arms race without any asymptotic end of the rainbow.

The 'solutions' become more complex and unwieldy, less efficient, more difficult. They eventually undermine the core sustainable strategic advantage with adverse economic impact. This arms races revs the gridlock between functionality and security where any compromise always defers to functionality. It is a fast nickel versus the slow dime or versus even nothing at all. Functionality is measurable now but risk is the prognostication of some future that might not even happen. Fast nickel usually wins.

A sandbox works as well as any perimeter. A sandbox suffers the same functional, economic, and practical benefits and security limitations as any perimeter. A sandbox is just a different name for the same geometric construct, albeit turned inside out. A sandbox functions without measurable effectiveness. A sandbox is a perimeter, and sandbox security is just as dead too.

The sandbox fails as a security technique.

AA.2.28.0 The Critical Danger of Commercial Off the Shelf Software

Although commercial off-the-shelf (COTS) represents a cost-effective and functional alternative to specialized, certified, and formally secured technology, it also portends a coming catastrophe because it is an open set layered over another flawed security open set infrastructure. Workflow can be reengineered to conform within the limitation of COTS and augmented to achieve the existing or desired level of operative functionality. However, COTS represents a general-purpose solution this is both a subset and superset of the workflow requirements. The subset represents missing functionality and the superset represents functionality beyond the desired functionality. Although many specification and purchasing managers are likely to bulldoze through such COTS projects with allusion to all the extra functions and features beyond the core requirements that are "free," such extras come with real risks and consequential costs. The lack of subset functionality and overage of superset functionality includes critical avenues to attack security, privacy, confidentiality, survivability, continuity, integrity and information superiority. The deficiencies in existing perimeter-based security infrastructures, the lack of an obtainable security paradigm change, and this trend toward COTS forecast both the increase in the number and the severity of security catastrophes through subset deficiencies and superset abundance.

AA.2.29.0 COTS Implementation

COTS solutions represent software, hardware, operating system, network, and integration efforts of a known quality. Costs are defined, implementation is based on historical experience, functionality has a chronicle with public track record, and many cheerleaders press for its functionality versus risk benefits. COTS implementation is desirable because final outcomes tend to overtly match estimates, proposals, and approved requisitions. Projects get completed within budget, time, and resources with a utility corresponding to the initial functional objective. Furthermore, with many COTS solutions migrating toward published interfaces or even open source standards, essential functionality that is missing can be integrated either off-the-shelf, supplemented with third-party tools, or through customization. Because information technology and security costs are rising ahead of inflation, many corporations, government agencies, and the military are migrating to COTS to rebalance spending against other objectives.

However, frequently there is a disconnect between functional objectives and security for several reasons. First, traditionally, functionality is in conflict with security. Pick functions and features or security, but not both at the same time. Second, functionality is vetted against a perimeter infrastructure that is already entirely breached by networks, the Internet, cooperation, information sharing initiatives, permitted partners, insiders, and normal workflow. All aspects of information superiority, the global information grid, data mining and search, attempts to connect-the-dots, and legislated interagency information sharing trash any nominal or even exceptional existing perimeter-based security technology. Third, security is impossible to measure within the current infrastructure. It is generally assumed to be adequate until the repercussions of security lapses are observed and/or published; even at that point, security is layered on the perimeter as a Bandaid with limited reference to security measurements of any kind. Fourth, security at the COTS level or within the infrastructure is overlooked as a functional objective with clear and concise definitions. Functions have definitions, while security is existential. Fifth, COTS often represents a lowest common denominator that does not allow for competitive advantages or assumption of security issues subordinated to functional outcomes. So while COTS is a managerially-desirable implementation, it is integrated on a flawed operational and security infrastructure.

AA.7.29.2 Unfolding Catastrophe

The primary coming failure with COTS software is underscored by the reliance on perimeter security, systemic infrastructure designs, and chains of chains-of-custody. Metadata, extensible data sets, code triggers or tables of critical data that drives the software, or frequently configurable and represent a security openness. Security is operational-centric rather than data-centric. Rather, security requires information lockdown with granular content control.

In conclusion, COTS will increase in the number and the severity of security catastrophes until security becomes a functional requirement rooted within a universal measurement system

AA.7.30.0 DigitalDoors Access and Rights

The technology secures documents and enforces privacy through extraction of critical and important data from within documents. These extracts are transferred to remote storage locations for granular security. The resulting declassified documents are reconstituted subject to presentation and validation of the user identity.

AA.7.30.1 Authorization

The DigitalDoors proprietary authorization module is supplemented by a second channel, which utilizes best of breed security technology. The system uses the second channel for authorization of the different parties when sending and receiving E-mail. The second channel is a secured server, which can be an RSA ACE/Server using a two-factor authentication like the RSA secure ID which uses a PIN number with a number from a physical token, or NSA-approved biometric and other token-based systems. After access to the system, the user information is processed through one or many databases, which reside within the secured server or in other locations within or outside firewalls.

AA.7.30.2 Authentication Database

When a local user wants to access sensitive data, that user must provide identity information with a two-factor authentication. The user must provide a password and corresponding token. A preferred add-on system is the RSA Secure ID product integrated with the RSA ACE/Server. The local computer routes the user login data to the secured server. The server validates the two-factor authentication and enables the access to the databases to establish the user rights and access to extracted data.

AA.7.30.3 Registration/Rights Database

The Registration/Rights database defines access rights to which each user has to the extracted data. A ser with a high level clearance have access to all extracts enabling the view of the original document in full. A user with a lower clearance level will have access to fewer extracts enabling the view of a restricted but workable document with sensitive items secured

AA.7.30.4 Location Map Database(s)

Each authenticated user will transparently receive a map (or abstracted map) providing the address of the storage locations, as allowed by clearance level, containing the missing extracts. The map data might include URLs, pointers, encrypted links, or abstracted references to other databases. Access to maps, links to subordinate maps, access to remote storage, or subordinate storage locations are allowed by clearance level. Insufficient clearance levels preclude access to maps, storage locations, maps to storage locations, and operational access to or reconstitution with extracts.

AA.7.30.5 Architecture Overview

The core idea of the DigitalDoors architecture is securing critical data through a process that secures the important and critical data elements. It then disperses these important and critical data elements to different storage locations for secured storage. The architecture enables reconstitution of documents subject to validation of user identification. The declassified document can be reconstituted in different levels according to the different clearance levels of the users.

AA.7.30.6 Primary Benefits

The primary benefits are as follows:

The architecture enables timely leveled-sharing of information across an organization or organizations in a secured way. This enables many different users with varying clearance levels to view and collaborate on the same documents.

The architecture enables protection against insider attacks by creation of "digital doors" throughout the documents. Those security checkpoints enable release of critical content into a document subject to presentation of validated identifications.

The architecture enables instant searching for key words without compromising the security of the secret documents. The searching is done at the extract storage level and not at the document level, thereby avoiding potential security compromises.

The architecture enables automatic declassification and reclassification of documents saving substantial money and labor.

AA.7.31.0 Securing the Internet

The Internet succeeded because it provided a general-purpose data information distribution channel with a high level of operational security in terms of continuity and integrity. However, because the community has grown to encompass nearly the population of the planet, the Internet fails to provide data security in terms of confidentiality and privacy. This type of data security is fundamentally absent. If encryption, firewalls, guards, intrusion prevention, antiviral solutions, and other revisional or traditional technology were sufficient to reverse the absent Internet data security, there would be no security plague.

An Internet security mechanism rooted in limited-access "extending perimeter security to-the-edge" with increased use of bulk encryption and multiple factor authentication methods will not address data pollution from information propagation, aggregation, and inference. Specifically, three cultural disparities play against the success of this security model. First, containment of data defies the premise for the very universality mechanisms that made the Internet as successful as it is now. Second, security based on the premise of access restriction does not consider the lack of trust and control in a worldwide community with competing and conflicting agenda. Third, data containment will be procedurally impossible because many other existing embedded applications and processes exist that require data transport creating new avenues for at-the-edge perimeter breaches. The data security failure must be addressed specifically on its own terms and not through the false parochial perimeterization. The risks are with the data itself not within the transport infrastructure or creative mash of processes that increasingly add value to the economy.

The Internet is crying out for something specifically beyond traditional or revisional technology to provide this missing confidentiality and privacy. Yet market pressures have provided no effective solution. Perimeter security, bulk encryption, and controlled access fails. This does not address the decay of confidentiality and privacy because data replication, mining, aggregation and inference render control over data ineffective. Therefore, without the introduction of truly novel security paradigms—not just revisions or more of the same ideas repackaged to look novel—the Internet will not achieve the necessary confidentiality and privacy to provide the missing systemic security.

Given that existing continuity and integrity security techniques have proven effective but not extensible to address security deficiencies in confidentiality and privacy, we need new paradigms. To merely assert that "privacy is dead and learn to live with it" as stated by Scott McNealy fails to address the forthcoming disruptions to infrastructure services, loss of productivity, and material intrusions to national security and interests. This will have profound economic consequences and military ramifications, if the minor samples already experienced are any indication. Instead, realize that data security is different and requires new paradigms to restore the security to confidentiality and privacy. Such security paradigms must address the protection of the data itself in its most fundamental form rather than the Internet transport and processing infrastructure.

AA.7.32.0 Spread of Viruses within Meta Data

The speed at which disease spreads, how quickly it manifests symptoms, and how virulent it is determines the speed of response to quarantine the disease. This is true for both biological infestation as well as computer system disease. If a disease has a long dormancy, defies treatment, hides in places where it cannot be recognized, or appears to do little or no damage, the disease is largely ignored. A beneficial parasitic often enhances the well-being of its host and often masks a longer term nefarious objective. Just as many human diseases fall within this threshold, so to do information infections if they exhibit the long latency of information storage, the wide distribution of information, and the ease with which information is copied. In such circumstances, the theft of information often goes unrecognized because the long latency hides the discovery of the damage. Usually discovery is incidental to problems of PII exposure or competitors' exploitation of trade secrets with an unknown etiology. With longer latency, there is also the issue of chain-of-custody or the infection patterns that frequently include a carrier that is symptom-free.

The risk of computer disease that lacks obvious and immediate damage grows as positive functions and features masks a trickle of information leakage, although many of these ploys such as cookies, DoubleClick, Microsoft software registration with system configuration capture have been exposed for their deception. Increasingly, there is growing host of computer diseases, with no known primary enticement, no obvious contagion vector and no immediate potential to damage, primary signature markers that rapidly morph, and a long period of dormancy that defies recognition, such as Storm.

(Storm (a.k.a. the Peacomm Botnet) applies many of the techniques described by DigitalDoors for the selection, extraction, dispersion, and reconstruction of information to evade detection.) The continued existence and lack of Storm inoculation tools demonstrates the failure of tradition methods for virus detection, perimeter security, and protection by functional proxy and the need to syntactically analyze data streams for content, context, and concept in conformance to acceptable and expected utility.[2] Risk grows in direct correlation to the complexity of the application, platform, network, and infrastructure. Risk grows when multiple inert parts (that is, exons) combine to create a hydra. Risk grows when combinations of innocuous information undermine security, privacy, confidentiality, and trust. For additional reference to this topic, please see the DigitalDoors white papers The Structure of Information and Cookie Crumbs, Trails, Tracks, and Footsteps, or the article, Implementing MS Office Security, published in the CISSP Journal of September 2002 by the ICS[2] security certification organization.

[2]

This risk latency grows as computer disease becomes completely hosted within information or metadata rather than transported in the matrix of applications, platforms, networks, or infrastructure. The risk of computer disease that lacks obvious and immediate damage grows when only information is copied without immediate functional consequences or the recognition of this leakage. This risk becomes preeminent as information becomes the driving resource in human endeavor. The information economy is and has been dependent on the ongoing processing of information. Reassignment of process (theft by diversion) or denial of service (redirection of services or shutdown of a competitor) have been the most obvious infection vectors to date. However, information itself is becoming the preferred target. Theft of raw information, misappropriation of information, and the aggregation and reuse of published information represents a new threat to continuity and welfare of the information economy.

PII, privacy, confidential, IP, process sequences and controls, the chain of command and the informal managerial information channels, the relationships between vendor and client delineate the new risk venues. The theft of such information is most often not noticed and will become more difficult to trace back to its source if even noticed. Given the lengthy incubation period between infection and recognition of damage or leaks from the infection, the chain-of-custody for any etiology has often decayed beyond recovery. Masking techniques and dispersion of information theft to multiple independent parties can effectively disguise the source or delay any efforts to trace the breach and the exploit back to the source and perpetrators. These will be seen as leaks with no obvious sources. The resulting crisis will be demonstrated by the internal loss of trust, widespread wariness between partners, rampant apprehension between adversaries, breakdowns of political partnerships, and the erosion of primary intellectual property that enable capital, governmental, and military systems to function. This risk is not merely an academic exercise, but a historical fact with a distress signal to the future for potential information theft. Sometimes the fear of the infection and attempts to isolate its vector become self-destructive internal battles that pale in comparison to the real external risks, as exemplified by the McCarthy Red Scare and congressional hearings of the 1950s that ignored more sedate but legitimate threats from the USSR and China.

Fear actually undermined an U.S. agency that realized it had a mole after overseas field agents began disappearing. For a number of years internal agents were mistrusted, reassigned, removed from high-level assignments, or retired. This hidden disease from information theft creates panic and erodes trust between and within organizations. In fact, one famous agent cashiered from service joined another agency and used the new position to politically attack the integrity and effectiveness of his old agency. It took almost ten years to discover the real leak caused by Aldrich Ames. But in the meantime, fear, mistrust, distrust, suspicion, uncertainty, witch hunts, loss of effectiveness, and outright havoc plagued the agency, leading to various intelligence failures and breakdowns. The value of managerial organization is well-documented in literature, as is its decay and impairment too. Internal damage from the mistrust and the agency infighting might well have done more damage to reputation and outcomes than the actual Soviet mole himself.

Theft of information, damage of information, or disruption of process represent different types of theft. The theft of most things leaves an entry trail or an apparent absence, whereas the theft of information is usually silent until damage derived from the utility of the information theft is asserted and linked if at all possible to its original source. Because information can be copied with stealth and secrecy—with no person or system realizing that theft—the infection latency can be unlimited. Loss of information represents preeminent infection without time limits, physical boundaries, and any quarantine containment when loosed. It undermines trust in effective systems, such as perimeters and firewalls, but does not recognize the limitations of those security methods and instead ascribes the causes of the damage wrongly to those very organizational factors and systems that probably are working best of all.

As information becomes a greater component of the every human endeavor, the need for security of the information itself grows larger, more important, and harder to control. Several factors play into this exponential risk explosion. First, the nature of information storage and distribution makes the recall and deniability of information nearly impossible. Second, the veracity of information is almost impossible to confirm so that information and chaff become indistinguishable. Third, the proliferation of information sources and the quantity of information sources make it practicable to assemble similar units of information from many different sources so that control over the end information product becomes impossible. Fourth, since information is derivable from multiple sources, leak recognition and containment is complicated. Fifth, information is unitary but a complex conglomeration that can be assembled through aggregation, inference, and interaction providing a simultaneous existence for what otherwise would be considered private, confidential, trade secret, or proprietary information. Sixth, with unlimited infection latency and unconstrained recombination of information, information damage can be endless and ongoing.

Detection does not initiate sufficient treatment as there might be none of consequence. Even if the damage were noticed, the damage can be endless and ongoing, not only to the source organization but primary and subsequent parties to transactions and dependencies where information value is undermined. The stakes are very large because we lack solutions after the fact. A security breach even when repaired does address the ramifications for the loss of privacy. See the white paper, Context: Difference between Security and Privacy.

The ideal logical protection for information is control and containment before the fact. This speaks to the need to preempt the release and leakage of information. However, since information is the driving resource in this economy, its protection is critical to the continuity of the economy. The need to create trust is critical between and within cooperating organizations. Trust is the underpinning of human activities. It is not just the raw inputs to PII, privacy, confidential, IP, process sequences and controls, the chain of command and the informal managerial information channels, the relationships between vendor and client. The resulting crisis will be demonstrated by the internal loss of trust, widespread wariness between trading partners, disruption of joint military operations, rampant apprehension between adversaries, an erosion of primary intellectual property that enable capital, governmental, and military systems to function.

The only logical protection for information is demonstrated by the technologies of DigitalDoors, the preemptive measurement of informational value, the extraction and isolation of information from all data streams within a flexible and robust hierarchy of categorization, the delivery of data streams retaining operational functionality despite gaps in the information context, and the granular content control through reconstitution on an as needed basis to extend and support operational functionality with controllable and recallable information elements.

AA.7.33.0 Touchpoints and Gateways as Back Doors

The enigmatic security touchpoint is a operational doorway piercing a perimeter to distribute PII and other security-sensitive information. Its enables transaction processing and sharing. It is a necessity to the functionality and efficiency of a process-interconnected world. A touchpoint opens a security weakness that transits across otherwise presumably secured perimeters. In effect, a touchpoint is a designation of a potential, established, or recognized barrier transit condition. In effect, a touchpoint is a rationalization of a necessary risk generally acceptable to enable functional workflow processing. Somehow, a touchpoint sounds so much better with its potential for control than a designated security weakness.

Two logical problems are evident with a touchpoint. First, aggregations of perimeter and point solutions do not secure the infrastructure with its integrated processes and cross-domain data flows. Second, where there is one touchpoint there are likely to be more touchpoints if only because most workflows are not designed but evolve other time. Touchpoints are often seen for it single dimension or purpose, but not recognized for the many other possible simultaneous communication channels, alternate protocol delivery, or its flexibility to piggyback just about any process or information flow. Furthermore, when such gateways are consolidated, the absolute volume of traffic is not altered but focused within singular points of failure and services likely to overload and leak risks because the singular point is no longer convenient and optional but now process-critical. As the overall number of touchpoints increases, the security risk increases non-linearly; A reduction in touchpoints is not likely to reverse this effect. Fewer touchpoints as a solution to leakage is a reorganization too little too late.

Touchpoints incrementally address business complexity and new business requirements but stretch the perimeter beyond its effective security zone for new unnoticed touchpoints. Additionally, the downstream waterfall of integrated workflow and information distribution is likely to mask many other touchpoints where the distended (that is, 'rubber-banded') perimeter is again breached in many places to promote specific PII and security-sensitive intangible property repurposed for different contexts. Stretched and ambiguous perimeters do little to help establish an integrity to a perimeter or define what it protects.

In effect, a touchpoint is a well-known and inventoried potential for a security breach. Calling a weakness in the perimeter an 'endpoint' is merely another means to hide the insecurity of touchpoint(s). Designating a weakness with other verbiage does not raise awareness and does do anything to address the specific security weakness. A touchpoint is discussed no longer as a "hole in the perimeter" but some specific process improvement and security red flag. Unless there is a process for noticing red flags and responding to them, it is empty symbolism that intends well but does poorly.

Traditional security tools do not sufficiently address point weaknesses or their evolving multiphasic risks, aggregated weaknesses collectively, or even maintain an arms-race parity with polymorphic ones. See the white paper Security is Rationalized for an assessment of traditional security weaknesses. A touchpoint is at best an admission of weakness lacking a solution but establishing a (typically short-lived when watched since nothing goes wrong) focus to watch this point of weakness. Watchfulness decays as the organization reasserts primary production goals and also as people lose interest in all but active and disruptive security breaches. It is hard to maintain accountability with conflicting goals of functionality versus security.

In recognition of this bombastic rubber-banding of the perimeter with unfettered insertion of insecure touchpoints, DHS is reducing its edge exposure from more than 5000 agency sites through the OBM Trusted Internet Connection Program (TICP). The intent to reduce the number of gateways to less than 50 and eliminate all access through anonymous proxies is a reorganization too little too late. While a reduction in the number of perimeter gateways by 99% is commendable, the remaining 1% still represent a two-way piggy-backed exposure through an existing and well-trodden barrier. The numerical size of the problem has been reduced but the traffic load is forced through increasingly overloaded and circuitous doorways, focusing the extent of the problem but in no way providing solution. It might inadvertently be the wrong solution because it creates chokepoints subject to denials of service attacks and empty guarantees for service level agreements often required for mission-critical functions that are just not viable.

Most security experts and organizations incorrectly presume that a touchpoint can be specifically protected with one or more point solutions or an aggregation of technology specifically addressing this transit. Many touchpoints are exposed as the sensors, probes, IDSs, IPSs, appliances routers, firewalls, analysis software, and other monitoring tools that are added to the infrastructure with the expectation of making it more secure. Instead, each added point becomes a touchpoint which itself adds a weakness to the overall infrastructure, or even many of new weaknesses masked by new functionality. So-called endpoint security tools are just another name for point solutions to cloak a gap in the security perimeter with unwarranted respectability. Security appliances address perimeter or point solutions. Note that their very complexity has the additional potential to destabilize security. They are, after all, just more touchpoints.

Specific protection of information through granular content control represents a paradigm that goes with the data wherever it flows and despite the number of admissions of weakness and unknown ones. This represents a contextual content solution rather than a process workflow or perimeter barrier.

AA.8.1.0 Multi Level Security Information Sharing:
AA.8.1.1 Information Sharing Overview DigitalDoors technology is important to provide security against insiders and augment traditional perimeter-based methods. It represents a major step toward granular data security and leveled information sharing necessary for unified national security and democratically-acceptable defense against terrorism. Security is fully sustainable with protection for civil liberties and a more rigorous implementation of privacy. It introduces granular content security with support for taxonomies with security and privacy protection, while enabling data sharing without exposures of source, methods, and activities. Information is categorized at a content and contextual basis for both security and privacy issues. Data sharing can be safety encouraged with financial incentives.

DigitalDoors technology operates within the data to implement security, privacy, and information taxonomy. Because it is inherently platform-independent and process-independent, it is a single enterprise-wide solution for all types of platforms, network infrastructures, cross-platform distribution, extended information workflows, and traditional data processing operations. The DigitalDoors technology is fully flexible and compliant with existing and developing standards for databases, XML, and hierarchical metadata.

Given the practical implementation of data security at a granular data level and the modular, multi-platform initiative, the core taxonomic technology enables anonymous information sharing so that agencies can share information to connect the dots in a practical, sustainable, and effective process.

AA.8.2.0 Multi Level Security: New Concepts for Information Sharing

Current technology for MLS security presupposes multiple network domains and high equipment requirements. Encryption of deliverables precludes granular access to data required for cross-domain collaboration, white-boarding, and document or workflow routing, which are typical with modern composite reporting requirements. Guarded data downgrades, perimeter retention, and the human overhead for enabling collaboration sharing is untenable given the current work flows and technological implementation. The core problem is neither the tools, networks, infrastructure, nor the work flows but rather the inherent security risks of compound metadata documents.

DigitalDoors addresses this impasse with several novel technologies. First, all data is stripped into content components and metadata. Second, all such components are analyzed for taxonomic, sensitivity level, and content that could undermine source, method, and ongoing action security. Third, components are downgraded to a lowest generic acceptable security level (e.g. Unclassified or Sensitive But Unclassified) through the extraction of element, phrase or other differentiable unit, linear, sentence, paragraph, or sections that undermine security. Four, multiple (potentially unlimited) components are created for distribution at all required security levels (e.g. Top Secret, Secret, Confidential, TS SI TK, SBU, U, and/or TS NATO, etc.) Fifth, reconstitution of the original content components is available subject to user identity, security controls, network reach, and other ad hoc or controlled access limitations. Reconstitution is fully granular, supporting any level from partial to complete recovery of the source content.

Fundamental design, implementation, and work flows of existing collaboration tools and COTS products prevent any implementation of secure sharing and collaborative editing of sensitive documents. DigitalDoors' work with Microsoft, Macromedia, Adobe, and other like products contain inherent architectural limitations based on a unified hierarchical metadata file and in-memory control data. Trusted workstations, segregated security networks, and hosted terminal server sessions provide compartmentalized security of data and work flow; this will not secure collaborative work flows predicated on the flow of linked composite documents, partial access to sections or material accessible at or below user sensitivity level. The inherent limitation of composite documents bound by metadata in the form of EDI, HTML, XML, DoD tagging, proprietary vendor structures, imbedded macros, user history, redlining, process control, routing, indexes, footnotes, links, references, and other higher-order designs across different versions create a nightmare of unknown triggering and activating events that undermine any EAL certification. In simple words, every composite document represents a security risk; the COTS tools do not represent the risk, they create the risk in the form of the hierarchical metadata file or in-memory control data.

DigitalDoors circumvents these limitations to achieve what could be certified as a high-assurance collaboration scenario, tagged data control, assured data pedigrees, and appropriate delivery to peer or lower security domains. DigitalDoors bypasses these inherent architectural limitations by decomposing composite documents into introns and exons that can be individually validated or extracted. This is part of core proprietary technology from DigitalDoors. The decompositions can be taxonomically encoded, downgraded, shared, and then recombined into the original composite document or other security-responsible production formats.

AA.8.3.0 Information Sharing Through Granular Content Control

Security with stovepipes and silos requires granular content security and access control with reconstitution to protect sources and methods and enable information sharing. Stovepipes and silos generally enjoy a level of security through oddity, obscurity, general isolation, all of which is unraveled when these are interconnected by networking or integrated into organizational workflows. When mainframes, hosts, servers, and data warehouse silos are connected into internal networks, the Internet, and the GIG, these resources need security too. Because the integration is both manual and automated, security must be applied to the data within the workflow.

AA.8.3.1 Gaps in Controls

Cyberspace, The Global Grid, (GIG), and Internet security is focused on data in transit and data at rest along with the aggregation, inferencing, and interaction of search results. However, more than ninety percent of information technology (IT) today involves the technical relics of stovepipes and silos. Accounting, inventory, payroll, planning, production, and logistics or transportation constitutes the bulk of IT. Faxing, messaging, and other communications represent about seven percent. Although Internet search, Web 2.0, and virtualized services provide necessary and cutting edge results, they represent a novel component. Although many security failures and privacy crises seem related to the Internet and might well be perpetrated through the Internet, most in fact relate to the insufficient security and integration of stovepipes and silos. The lost 25 million veterans records derived from a database on a host mainframe. The stolen credit card account information was accessed in silos of vast data warehouses. The multiple breaches of personal accounts from information brokers were also stored in silos, although the distribution mechanism was in all cases facilitated by Internet access and mobile or distributed computing.

The proportion of commercial, military, and government workflow hosted by stovepipes and silos is very high. Dollars applied for security within an Internet-like venue represents less than three percent of the risk. While traditional security for stovepipes and silos is quite elaborate and robust—think data centers—the transition to complex workflow and Internet-enabled distribution creates the bulk of the new security risk. Security must be included within standard business operations.

Consider, for example, this typical IT request. A member of military general staff is planning for the obsolescence in 18 years and overall future lifecycle costs for the Trident missile program. This requires a complex inventory, manufacturing, maintenance, transportation, testing, and operations reporting system. This is not a cutting-edge search or Internet project. This is paper, data, and report aggregation project with host-database integration overseen by an IT manager, 8 programmers, 5 coders, 2 testers, an accountant, and two secretaries. Sites include 49 different IT locations and an unknown number of storage warehouses and deployment locations, such as missile cruisers and submarines. Security is not just a computer or Internet issue but a workflow problem.

The project requirements include estimates of available stocks, stocks that can be produced over a defined timeframe and future costs, maintenance parts inventoried, available and forecast numbers of trained personnel, logistical plans, actual field placements, future deployment plans, and hierarchy of all prime contractors and alternates. An eighteen-year plan will also entail vetting the integrity and ongoing availability of the contractors; after all, if GM owns Hughes, and Hughes owns the subsidiary that manufactures the missile guidance system, and GM sells Hughes and Hughes divests itself of the subsidiary, is the contractor still qualified? Is there a long-term contract in place and who in legal reviews those contracts yearly? Additionally, that missile guidance system is a 1960s relic, built from transistors on old-style fiberglass circuit boards with lead/tin solder. Will production facilities be subsidized and maintained? What would be miniaturization and certification costs for electronic upgrades? How will the legislative transitional requirements to use only tin solder cope with tin whisker reliability issues? There are many other questions and answers that cross over the security perimeters of many agencies. This project requires the automation and the allocation of human resources to compiled data from many different mainframes, databases, and paper files. Some paper files might be converted to images or keyed into new documents and databases.

The example IT operation is designed to interconnect and integrate data from a large number of different sources to facilitate intermediate or final reports. These reports are printed on paper or perhaps to Adobe Acrobat for real-time delivery over the Internet or GIG. These reports are security-sensitive. They contain routing information and metadata with significant data and workflow risk. Access to the many stovepipes and silos are security-sensitive. Intermediate record sets, intermediate reports, and other collateral are security-sensitive. Management reports, designs, maps, lists of data silos, programming plans, and flight arrangements to vet sites, inventory locations, and contractors are also likely to be security-sensitive. This project becomes a huge operation generating a lot of paperwork, both printed and stored. Distribution of printed formats is generally protected by traditional and well-understood security process. However, reliance on the stored data is new and represents leakage. Until all such intermediate and final reports are fed through Digital-Doors (subject to Internet style sheets, push, pull, RSS syndication, and blogging) to assess the sensitivity levels of items, sentences, paragraphs, metadata, tagging, inclusions, and references, security will not be granular and the workflow will be disrupted by the traditional lack of information sharing. Extraction of granular items and reconstitution with graduated versions, as defined by the 2004 Markle Report on Information Sharing, provides security with information sharing.

AA.8.3.2 Risks from Distributed Stovepipes and Silos

The dispersion of information, information subsets, the separation of content from context, and the otherwise partial replication of information create the apparent integrity of the information without reality. Sources and methods are often removed from versions of information and in particular removed from the views created by DigitalDoors. Although DigitalDoors views are centralized and recovery maps ultimately maintain integrity, distributions in silos are not by definition. As a result, the reliance on partial version information could undermine operations and analysis. It is important to retain correspondence between versions and initial sources and remember that DigitalDoors views are subsets of the initial sources.

There is another issue that warrants consideration. Applicability, functionality, and utility of IT stovepipes and silos decay over time and the data within becomes harder to retrieve, integrate, maintain, or migrate. Data is not independent from the applications that process or report it. Often migrations retain the data without the physical or logical means to access it within the available infrastructure as of hardware obsolescence and retirement. However, despite such decay in these legacy relics, security is still a problem for two reasons. First, other infrastructures usually exist that can retrieve that data. Second, the disruption of the infrastructure also erodes the security procedures so that future access to the data trumps security protections and concerns. However, the intermediate data within a workflow must nonetheless be protected through access control and data granularity.

Security with stovepipes and silos requires granular content security and access control with reconstitution to protect sources and methods and enable information sharing within the compliant security ecosystem. When mainframes, hosts, servers, and data warehouse silos are connected to internal networks, the Internet, and the GIG, these resources need security too. Security must be applied to the data within the workflow.

AA.8.4.0 The Failure of Tag Reflexivity for Information Sharing

Information tagging is deficient as the sufficient and necessary mechanism for information sharing. It misses the true requirement to establish data ownership, stewardship, and control over subsequent downstream serialized and hierarchical information sharing. Serialized information sharing is based on a continuous and linear chain-of-custody between the original information source and all subsequent uses. Hierarchical information sharing is based on information reuse, repurposing, transformation, aggregation, inferencing, and data-to-data interaction. Serialized and hierarchical information sharing are different, and this discrepancy is the fundamental explanation for information sharing denials and leakage.

Tagging is not sufficient and necessary to maintain security with serialized and hierarchical information sharing for three reasons. There is no strong method to bind the tag to the tagged information and have that security metadata persist throughout the life and downstream usage of the tagged information. Even inline in-channel tagging does not assure the integrity and resolve intention of hard-coded tags. There is a fundamental inability to institute tag reflexivity and multi-jurisdictional interagency reciprocity with a universal tag dictionary. There is no way to assert any persistent universal meaning to tagging. There is no way to resolve the lack of objective classification bias so dependent on intent and personal understanding of frameworks to tag information. Efforts to consolidate, rationalize, or federate tags are misplaced; the real issue is data stewardship and the specific control over subsequent information sharing.

AA.8.4.1 Tag Reflexivity

Reflexivity indicates a stable and persistent overlap of semiotic significance and utility. A label, markup, or tag is a linguistic designation for the sensitivity level of information with context perspective only to me; it has no perspective value to you except within the original context as it might relate to me. I care only about what information you get and what you do with it after you have it. You only care about whether the information you get has value to you and what you can do with it after you have it. Within the study of semiotics, this relates to the interpretation of meaning, whereas in other disciplines, this relates to the "precisiation" of meaning driven by objective. As a result, you and I have no reflexivity in terms of the tag significance or utility, and in fact we assert no tag reflexivity (that is, a meaning overlap) whatsoever.

Any tag reflexivity overlap is by chance, short-lived, and incidental. It is not possible to truthfully assert any more than that. Furthermore, that tag is liable to alteration during any subsequent information sharing. A tag is a non-normalized secondary-order metadata element that purports the value of the primary information but does not assert or guarantee the value or integrity of that information. Subsequently, the tag asserts no real sharing control and no persistent universal meaning whatsoever in that information sharing workflow. It is not possible to normalize a tag so that it has a universal, static, or definitive meaning. Tags are slippery, transitional, amorphous, and culturally dependent. Even when generic tags are applied such the meaning of the tag is externally defined, that external definition is still slippery, transitional, amorphous, and culturally dependent.

This is an intractable metacontent problem.

Efforts to create information sharing within a community of interest (COI) using a predefined dictionary of tags merely create a uniform vocabulary. That has tremendous value at least by creating a common basis but does not address the actual sharing issue. Any downstream information sharing presumes that the tagged content is uniform in terms of its potential leakage risk, relevancy, and inference. However, that is not the general case. The workflow needed for information sharing will require a guard between each pairing of interests in the community to filter out the risks before distribution. These pairings are NP! and therefore computationally intensive, and therefore intractable as stated previously. The solution is rationalization through granularization, tagging with multiple dimensions at an item level so that redaction or versions can support granular content control.

As a result, the tag is a metadata element lacking absolute basis in significance and utility. Therefore, the meaning of the sensitivity-level and information sharing tag, or any tag for that matter, depends on the eye of the beholder. Despite the desire for a universal tag dictionary, the application of a tag is limited within a single objective, perspective, purpose, or point of view. Application of a tag beyond interagency or inter-domain, in other words for the COI, lacks sufficient reflexivity.

For example, what is sensitive but unclassified [SBU] for internal operations to me could well reveal security risks, sources, and methods when released to you. I view the information as [SBU] for my internal use but would release it to you only with a top secret [TS] sensitivity. [SBU] does not map to [SBU] for you; it might map to [TS] even though you have other information that is [SBU]. [SBU] to me looks like the [SBU] you use, but the context is different both to me and to you. That [SBU] information might be unclassified [U] to me, [TS] to me, or even [SBU] to me too. The meaning of the [SBU] is sufficient and necessary within my context but is not universal to your context, or any other context for that matter. The establishment of a common and sweeping definition of [SBU] is misinformed because every agency participating directly or indirectly in information sharing will have an aggressive, competing, and potentially antagonistic context.

The failure is that [SBU] can be a syntactical certainly but not the contextual certainty. This confusion stems from the widespread use of [SBU] and all other tags. Even though these tags are the same at face value, the different assignment of these tags lack context in common. They have just a syntactical usage in common. But, the meaning is not the same. Tag usage is not reflexive between you and I. This creates a tower of linguistic Babel where the syntax and the vocabulary is identical but the meaning is reflexively diverse. Attempts to consolidate, rationalize, or federate this vocabulary are pointless because even if everyone were to understand the meaning of [SBU]—I contend that everyone already understands the meaning of [SBU] and other tags—consolidation fails to address the fundamental data stewardship problem that rapidly becomes aggressive, conflicting, and potentially antagonistic.

When I send you a redacted part of my [SBU] document and retag it as [TS] specifically for you, you might cite several pieces of my information (and its source to me). Because of your data transformation of my source information, you no longer see the subsequent report as anything but [C] and only need to distribute it as [C] for both legal and operational requirements. However, that wider release could undermine my [TS] security, as well as my [TS] and [SBU] sources and methods. Even when tidbits of information like that are aggregated or inferenced, others apart from you might infer content of the redacted [TS] or even the original [SBU]. Specifically, Judge T. S. Ellis III in the 2006 AIPAC case ruling asserts that "classification may not be sufficient to render information protected." The reason is that the tag fails to protect the content or the context of the information; this failure is really the byproduct from the wrong data sharing architecture.

Tags usually reflect a singular understanding of the data, either [TS], [S], [C], [U], or [SBU]. It is a consolidation of the most viable designation or the most restrictive requirement. Unfortunately, a single designation is not sufficient to represent complications of timing, roles, degradation, the change in cultural contexts, or the multiple applicability or aggregation of different types of purposes of information in the unit of information described by the tag. A binary sharing decision is usually too restrictive in practice. Compounded or combination tags with flexible tagging overcomes a bias classification of the data. Note, however, that many processes expect a single in-channel tag and lack facilities for resolving multiple and conflicting designations. Even XML or other metadata formats confuse the issue because few processes understand how to resolve competing values. When a multitier hierarchical overlapping tag structure is supported out-of-channel, a version of the data can be transformed specifically to match the required in-channel tag formats of each subsequent process and redacted to overcome the conflicts of functionality versus security enabling secured production or information sharing.

The issue is defined in terms of data stewardship—my context of my data stewardship—your context of your data stewardship. I collect the data, therefore I own the data, so that I alone determine how I use, decide how I distribute it, and ultimately judge how and what can be shared. I distribute it to you, I still want to control your use of that information, because I own it and it is mine. However, your likely attitude is that you received it, you now how downstream control of that information, that there is no rational and realistic copyright enforcement issue, and therefore that information is now yours and under your revised ownership with explicit rights for stewardship.

The issue of stewardship reduces to establishing reciprocity over security controls, an operational problem of reflexivity that fails in the same way or rights or ownership. Conflicting legal rules require agency information sharing but also reinforce the necessity for protection of state secrets. This is true for non-military, non-governmental, and non-agency workflow too in commercial and private business. It is not possible to legislate or negotiate away this conflict with a dictionary of predefined tags because of the inherent lack of universal reflexivity and the difference in opinion over the data stewardship and ownership issue. I cannot make the decision for you, and you cannot make the decision for me. I cannot say or even conceive of how you will reuse my information and when that information will become stale or obtain an even higher risk to me. It is a very complex issue that lacks a contextual and controllable temporal basis.

Consider this scenario. It is my data. I do not want you to have it for a number of reasons that include its potential to undermine internal security or jeopardize my sources and methods. Clearly, you want the data so that you do not have to duplicate the effort to collect the same data and you want to fill the gaps in your collection efforts. In order for me to redact the data for information sharing, I have to reassess the [SBU] label and the content in order to reveal what I choose to you. I also need to understand how you are going to use it for your own requirements and the potentials uses that are not in my interests. I also have to guess what potentials exist for aggregation, inference, and interaction with other data sources both known and unknown to me, and future data sources that do not know but will compromise my security interests. I also need to assess your access to private and public sources of data, prior relevant data releases, and contextual repurposing that might undermine my contextual security requirements. The data stewardship issue is that it is my contextual security requirements, but yours only indirectly.

I can tag that redaction with any tag I want, and you can reassign any new tag you choose since your think you now "own" it. The traditional information sharing environment provides no controls over your ability to effectively own it and reuse the information as your choose and assert what is effectively metadata to that information. The ability to append metadata and have flexibility to rework or repurpose information is powerful attribute of the information revolution. You do not have the same information in the same manner that I did. My new tag provides only value to me, but none to you; likewise your new tag provides only value to you and is frequently pointless to me. Nothing says these changes need to be collaborative. However, my data stewardship might wish to retain control over your subsequent serial or hierarchical redistribution of my redaction. Subsequent redaction and assigned of new tags is still pointless to me. Realistically, such control is lost with tagging controls unless control is retained over granular content.

Efforts to consolidate, rationalize, or federate tags are misplaced; the real issue is the data stewardship and the specific control over subsequent information sharing. I want to control the subsequent downstream redistribution of my granular information within whatever sensitivity context that I designate for subsequent usage. I might not assert [TS] but rather impose restrictions that the information is unavailable under all conditions. Solution is through the DigitalDoors architecture of data stewardship and digital rights management where information is dispersed through granular content control.

In conclusion information tagging is not the sufficient and necessary mechanism for information sharing. It misses the true requirement to establish data stewardship and control over subsequent downstream serialized and hierarchical information sharing. There is no strong method to bind the tag to the tagged information. There is fundamental lack of tag reflexivity between agencies and securable method for reciprocity. There is no way to assert any persistent universal meaning to that tag.

However, the DigitalDoors paradigm and granular content control makes it possible to assign multiple hierarchical contextual tags—and then map granular contexts to granular content items, which enables security for leak-proof and inference-limited downstream information sharing.

AA.8.5.0 Multi Level Security Needs to Adopt Granular Data Control to Achieve its Objective MLS or Multi Level Security has been used to try to share information between different levels of security within defined location and defined application spaces. Day-to-day tradeoffs included a mentality of security versus functionality. However, as these spaces multiplied and applications became more complex, the solution implementation became too expensive, too unwieldy, too complex, and frankly non-operational. People worked around it. This is prove of a breakdown.

The existing technologies, classified, private, or commercial, and available or foreseeable variations on them, simply cannot deliver secured information sharing between different security levels.

The solution space of location and application no longer fits the operating environment for security. There is an evolution in the ecosystem that must be reflected by a change in how we view the environment itself. If you cannot admit that there are widespread security problems that are not addressed by the currently available solutions, you have a larger security problem than you can even imagine. If you cannot admit that the scope of the current security problems are escalating and the frequency and complexity of the security problems are themselves escalating, you are ignoring the inherent environmental danger and forthcoming extinction of those that will fail to change and adapt. You will fight a pitched battle protection your location and application, while leaking information and preventing the necessary distribution needed to even win that battle. It is a fundamental strategic failure that adversaries continue to exploit. If you cannot admit to this environmental change, you are attacking an archaic security problem with obsolete tools. You might delay the inevitable extinction for some period of time, but it is still inevitable.

The security problem is no longer about location and application but rather information and distribution. Actually the security ecosystem must also include knowledge discovery, integrity, security, and sharing, not some single-dimensional notion of security. If you can accept some fundamental ecosystem shift is possible, conceivable, or literally upon us now, you have take the first step to perceiving a new paradigm to addressing the security ecosystem. This new paradigm repositions intractable security problems with very simplified views of information defined by a semantic structure supporting configurable distributions. This security is asserted through granular content control. Location and application remains intact and is really no longer part of the security problem. Even when location and application becomes more complicated as need be through such issues as SaaS, SOA, Web 2.0, distributed processing, and dynamic with continuous cyclical support operations, security is applied specifically to information and distribution. This bypasses the complications and complexities inherent in the obsolete tools. That is the fundamental archetypal shift and operative means to reassert security within this profound evolution. When the battle is fought specifically over information and distribution, old friends like MLS can be redeployed based on implementation of granular content control. It is proven and extensible into the new security ecosystem. However, you regain control over security by shifting the security problem ecosystem from location and application to the ecosystem of information and distribution.

AA.8.6.0 Accommodating the Bell LaPadula Model

This document describes how to configure Bell-LaPadula model (BLM) *-property compliance and options. Information sharing controls and BLM compliance are "baked into" DigitalDoors. The BLM and information sharing features emphasize adaptive risk and privilege management in an environment where there is the "need to share world". In simple words, DigitalDoors compartmentalizes the risk taken by one so that it is not assumed by all. DigitalDoors includes major three options for information security and compartmentalization in conjunction with collaborative information sharing. Information sharing is controlled on a highly granular basis not only for traditional documents, database queries, or data streams but also for metadata, directories, search results, and catalogs. These options balance strict BLM compliance, strict compliance to information sharing laws, or risk and privilege management with smart push/pull while facilitating a black core based on a platform- and process-independent operational stack.

DigitalDoors enables redaction of documents and the delivery of versions for each sensitivity level to different sites or guards at these different sensitivity levels to fulfill operational needs and enable information sharing. Delivery can either (Option 1) adhere strictly to the Bell-LaPadula *-property model, (Option 2) enable complete information sharing as obligated by the 2004 Information Sharing Act, or (Option 3) balance the BLM model with specifically-defined granular information collaboration pass-through. The object of functional range is provide tools to balance strict information compartmentalization and with information distribution and sharing. Specifically, these options avoid the usual overclassification of intelligence sources and to increase the distribution of functional information in order to connect the dots while rigorously protecting sources and methods.

The Bell-LaPadula model defines a formal state transition model of computer security policy based on a set of access control rules. In this model, the entities in a computer system are divided into abstract sets of subjects and objects. The notion of a secure state is defined and it is proven that each state transition preserves security by moving from secure state to secure state; thus, inductively proving that the system is secure. A system state is defined to be "secure" if and only if the permitted access modes of subjects to objects are in accordance with a specific security policy. The clearance of a subject is compared to the classification of the object and a determination is made as to whether the subject is authorized for the specific access mode in order to determine whether or not a specific access mode is allowed. For the purposes of this documentation, hierarchical sensitivity levels are described as the generic [U], [C], [S], and [TS] with a nod to TSOL [Admin High] and [Admin Low]. Sensitivity levels, however, are easily configured for other specialized entries like [SBU], [FOUO], [TS/NSA], [Rel/NATO], or [StoneGhost] for any other labeling requirement. Compartments (multiple assignment and non-hierarchical) are not described herein but correspond to TSOL compartment implementations and labeling.

Strict BLM compliance (and the inverse downward compliance) is enabled only by the administrator through the checkbox on the configuration tab of the Administration Configuration application. This is indicated by the next screen image.

When this checkbox is checked without any subsidiary options, strict BLM compliance is enabled (Option 1). Notice that the users are listed for inclusion in this strict enforcement. All options for information sharing are disabled (shown by the boxes in red); while BLM conformance is always enforced for all users, the subsidiary options for information sharing between sensitivity levels are not enabled.

Cross-domain distribution on-the-fly is enabled because multitier tagging is reassessed prior to upgrading, downgrading, or multiple sensitivity level distributions. The clearance/classification scheme is expressed in terms of a lattice with emphasis that information with a higher sensitivity level is not released to a lower sensitivity level. However, in addition to the normal implementation, DigitalDoors has expanded the BLM functionality to also restrict inverse information flow—from a lower sensitivity level to a higher sensitivity level—so as to preclude upward insertion of virus, spyware, malware, attachments, applets, and data dilution and the creep toward overclassification. Note that this upward containment is configurable separately from the classic BLM implementation for backward model compatibility.

When the checkbox is not checked, full compliance to the 2004 Information Sharing Act is enabled (Option 2); compliance with BLM is not enabled. Information sharing within strict BLM star security compliance or with extended DigitalDoors overrides is also not enabled. Notice that the users are not shown because the options for granular information sharing are already broadly enabled.

A balance between BLM compliance and information sharing is configurable to control the level of information passed through the star security model, from each user's defined sensitivity level to any and all sensitivity levels that are up or down from that level. Option 3 is enabled when the checkbox is checked and subsidiary options are also engaged. This section explains how.

These subsidiary information-sharing options must be enabled step-by-step. Each user has three selections. (1) To enable information sharing at that user's sensitivity level (only). (2) To enable sharing down to a lower sensitivity level (as per the classic BLM implementation). (3) To enable sharing up to a higher sensitivity level; this is additionally implemented by DigitalDoors to minimize the necessary intranet/network complications and the risk taken by one so that it is not assumed by all. Note that these settings are only accessible to the administrator for security reasons.

Information sharing with BLM compliance requires that DigitalDoors reconstitution, versions, dispersion, and replication output vary substantiality. Granular selection of content is paired with granular distribution to users, and also the granular packaging for wide scale networking. The limitations of selection and extraction by compartmentalization and the delivery of base sanitized documents with the recovery map and recovery data must reflect the sensitivity level at the source and also at each target level. In simple words, the output from the DigitalDoors process for a [S] document processed delivered to [TS] level must be self-contained and different from the results delivered to [C] or [U] level. Each such self-contained unit would—as that unit—comply with BLM. Separate units must be delivered to each sensitivity level without overlap to prevent security leakage and support the need for wide scale networking with propagating the risk assumed by one to the entire networked environment.

BLM compliance with optional overrides for information sharing. Sharing is enabled across all comparable sensitivity levels subject to the network infrastructure and arrangements for shared data access. In simple words, if the network is in place with MAC and DAC access controls, sharing between [U] and [U] will available or between [TS] and [TS]. Sharing up from [U] to [TS] or down from [TS] to [U] also is subject to the network infrastructure and arrangements for shared data access. Sharing with BLM compliance still requires a manual two-man guard, but DigitalDoors automates the creation of document versions applicable for up or down sharing without leakage of sensitive information. In other words, DigitalDoors automates the production and population of the networks with documents sanitized at each or all sensitivity levels so users can connect the dots; guarded access is not affected and remains the under the existing organizations and their policies. DigitalDoors does not violate BLM, information compartmentalization, need-to-know rules; it automatically produces the granularly sanitized documents in order to populate the GIG and all the agency and parallel networks that exist at each sensitivity level classification.

DigitalDoors enables granular distribution based on sensitivity level, compartments, category, and other supported taxonomies and ontologies. None of these features are lost with BLM compliance. However, strict BLM compliance precludes information sharing. Therefore, optionally, granular leakage can be controlled on a need-to-know basis in order to expedite interagency and information sharing operations so that the dots can be connected. Specifically, the subsidiary settings enable distribution of content at the user's sensitivity level for sharing upward. Specifically, the subsidiary settings enable distribution of content at either/or/both the user's or the recipient's sensitivity level for sharing upward. Specifically, the subsidiary settings enable distribution of content at the user's sensitivity level for sharing downward. Specifically, the subsidiary settings enable distribution of content at either/or/both the user's or the recipient's sensitivity level for sharing downward.

DigitalDoors can create a distribution targeted for a single sensitivity level, such as [S] from a [TS] base source. The DigitalDoors dispersion delivers the data streams either to a single structure on a local data storage device, or disperses the major pieces to remote storage devices. Furthermore, these data streams can be further granularized to disrupt any context and protect against insiders and sophisticated data aggregation and inferencing. One source sensitivity level to another sensitivity level is the simplest case. Versions represent this same process repeated once for each enabled sensitivity level. However, the selection and extraction process is optimized with a DigitalDoors metadata collection and generated once and only once; all tagging, taxonomy, and ontology are performed upfront. This depth of selection and extraction process is configurable for more or less aggressive categorization and performance improvements.

AA.8.6.1.0 Maps and Recovery Information

Another aspect of BLM that affects the DigitalDoors implementation is the format for the maps and recovery files. While this is addressed elsewhere in the document, it is also pertinent to recall that some formats are specifically non-compliant with BLM and others are implemented specifically to enabled information sharing capabilities with full BLM compliance. Maps and recovery information can be produced in four categories of formats. These are:

TABLE

| Map categories |
| --- |
| Consolidated |
| Inclusive |
| Exclusive |
| Granular itemization |

The consolidated format is an aggregated rollup of the maps and all extraction information. While it is usually encrypted, this format is non-compliant for BLM. Inclusive, exclusive, and granular itemization are BLM-compliant. Each format serves a different function. Inclusive provides a stack or rolled up map and recovery information for each sensitivity level. The exclusive format strictly supports need-to-know and provides map and recovery information specific to a defined sensitivity level. The granular itemization format disperses the maps and each extraction into separate contains so that reconstitution can be controlled at any combination or selection of sensitivity level, compartment, roles, missions, users, groups, and other categorical hierarchies. In addition, this granular lockout enables controlled indexing, searching, and mining opportunities without releasing the details of sensitive information Although the selection of maps and recovery information format is codependent on BLM compliance, the selection of the format is independent from the implementation of BLM compliance because these two functions have separate utilities. Neither compliance sets formats nor do formats set compliance, but some lockout "cams" ensure security, privacy, and full functionality with flexible administrator configuration.

AA.8.7.0 Challenges of Multi Level Security Information Sharing

Current technology for Multi Level security information sharing—MLS security presupposes multiple network domains and high equipment requirements. Encryption of deliverables precludes granular access to data required for cross-domain collaboration, white-boarding, and document or workflow routing, which are typical with modern composite reporting requirements. Guarded data downgrades, perimeter retention, and the human overhead for enabling collaboration sharing is untenable given the current work flows and technological implementation. The core problem is neither the tools, networks, infrastructure, nor the work flows but rather the inherent security risks of compound metadata documents.

DigitalDoors addresses this impasse with several novel technologies. First, all data is stripped into content components and metadata. Second, all such components are analyzed for taxonomic, sensitivity level, and content that could undermine source, method, and ongoing action security. Third, components are downgraded to a lowest generic acceptable security level (e.g. Unclassified or Sensitive But Unclassified) through the extraction of element, phrase or other differentiable unit, linear, sentence, paragraph, or sections that undermine security. Four, multiple (potentially unlimited) components are created for distribution at all required security levels (e.g. Top Secret, Secret, Confidential, TS SI TK, SBU, U, and/or TS NATO, etc.) Fifth, reconstitution of the original content components is available subject to user identity, security controls, network reach, and other ad hoc or controlled access limitations. Reconstitution is fully granular, supporting any level from partial to complete recovery of the source content.

Fundamental design, implementation, and work flows of existing collaboration tools and COTS products prevent any implementation of secure sharing and collaborative editing of sensitive documents. DigitalDoors' work with Microsoft, Macromedia, Adobe, and other like products contain inherent architectural limitations based on a unified hierarchical metadata file and in-memory control data. Trusted workstations, segregated security networks, and hosted terminal server sessions provide compartmentalized security of data and work flow; this will not secure collaborative work flows predicated on the flow of linked composite documents, partial access to sections or material accessible at or below user sensitivity level. The inherent limitation of composite documents bound by metadata in the form of EDI, HTML, XML, DoD tagging, proprietary vendor structures, imbedded macros, user history, redlining, process control, routing, indexes, footnotes, links, references, and other higher-order designs across different versions create a nightmare of unknown triggering and activating events that undermine any EAL certification. In simple words, every composite document represents a security risk; the COTS tools do not represent the risk, they create the risk in the form of the hierarchical metadata file or in-memory control data.

DigitalDoors circumvents these limitations to achieve what could be certified as a high-assurance collaboration scenario, tagged data control, assured data pedigrees, and appropriate delivery to peer or lower security domains. DigitalDoors bypasses these inherent architectural limitations by decomposing composite documents into introns and exons that can be individually validated or extracted. This is part of core proprietary technology from DigitalDoors. The decompositions can be taxonomically encoded, downgraded, shared, and then recombined into the original composite document or other security-responsible production formats.

AA.8.8.0 Implementing Cross-Domain MLS Information Flow

Cross-domain information flow is undermined for three reasons. Primarily, organizations are culturally unable and pathologically unwilling to share information. Information represents a point of power and control, security risk, and ongoing legal strife. Agency or agent will not share with any other; any act of sharing gives up power and reward, opens the door to the disastrous exposure of sources and methods, while national security laws preclude sharing with terrorist-combating-related laws mandating data sharing. Sharing data, when data is mostly noise, is not the same as sharing signal or sharing content, which are relevant subsets. In other words, data sharing could be mandated and actually implemented but the noise factor undermines functional result. Besides, human nature being what it is, real sharing requires a tit-for-tat accounting of chips at the very personal level, like "I gave you something useful, and you owe me something comparable in return." Both parties to an information transfer must agree to the value, extent of the information, and consent to bilateral transfers. Ultimately, morsels of information are owned by someone, and that someone will extract the most value and power from them.

Secondarily, existing computer and networking technology overvalues the workflow rather than information. The existing paradigm where workflows are fed with data must advance into an inverted recognition where information is the primary asset and is transformed by the workflows. This disconnect can be defined as the inability of work flows to technically define the content and value for its potential as information flows. Considerable effort is applied to the process of information transformation because we easily comprehend the order of events rather than the complex characteristics, comprehension, metadata assessment, and recognition of value within the information.

Tertiarily, multi-level security (MLS) and multiple independent levels of security (MILS) presuppose a compartmentalized processing network with a complete secured channel for each domain. Unfortunately, a disconnect in implementing protected but interconnected MLS and MILS domains have undermined this technology. Cross-domain guards have focused on partitioning process and data rather than on content, context, and concept—the fundamentals that enable granular content management. Therefore, cross-domain information flow will not transpire until we can overcome these cultural and technical barriers, align these to stated and unstated organizational missions, and implement granular content management environments. In summary, any cross-domain information sharing will remain ineffective and be actively sabotaged unless, the following conditions are met:
1) content value can be measured both objectively
2) content release can be limited and controlled granularly in a cross-domain matrix
3) realistic rewards can be assessed and awarded for successful information sharing Content is a complex evaluation not traditionally supported except for structured data such as transactions, databases, and other records defined in terms of purpose. This excludes non-structured data such as documents, XML, style sheet transformations, containers, zones, collections, messages, and most type of metadata. Content is retained by a stream, message, or file packaging. Such containers, XML tagging, and formats modify the content in context and concept in workflow but do effect this content in substance itself. XML, metadata tagging, and other taxonomies modify and become part of the information sharing environment as an infinite cycle. Effectively, all hierarchical data must necessarily have both internal and external metadata designations about utility, purpose, functional transformation (application code), inference, and aggregation. This is the point for objective measurement and consensual determination for content release. Here content release becomes multidimensional, both in terms of the strict content, the inferred context, and functional concepts. Because content is measured at creation (up front) rather than ad hoc or at a guarded translation, value is measured inherent to the content allowing real-time decision-making. The release rules must consider the source side and the target side security levels and the ramifications of the content with the metadata and subsequent measurements, which represent a new layer of metadata. Every sensitive network and each mission represents additional N-dimensional risks. As a result, simplistic matrix of source rows and target columns under-represent the other N-dimensional metadata risks.

DigitalDoors aligns with this cultural and technical barriers by providing:
1) means to and objectively measure content in terms of content, context, and concept
2) method to N-dimensionally tag content and create pre-defined or ad-hoc releases to each of source side, target side, and metadata dimensions for controlled information sharing
3) accounting system to measure information value, accumulate inter-aggregate transfers, and report net surplus or deficits for information sharing The DigitalDoors differentiation creates a core for granular information management for security, privacy, and connecting-the-dots independent of platform, environment, and networking. Any translation of the content retains the original content to continue the integrity of any applied value measure, a limitation of structured data, semi-structured data, even XML, MS Word documents, and other modern hierarchical data formats. Although DigitalDoors cannot create the actual organizational, managerial, or contributive incentives and rewards for effective information sharing, the measurement, method to release, and the accounting system represents a direct input to such a mandated legislation.

AA.8.9.0 Multi Level Security for the Internet

The Internet succeeds because it provides a general-purpose data information distribution channel with a high level of operational security in terms of continuity and integrity. However, because the community has grown to encompass nearly the population of the planet, the Internet fails to provide data security in terms of confidentiality and privacy. This type of data security is fundamentally absent. If encryption, firewalls, guards, intrusion prevention, antiviral solutions, and other revisionist or traditional technology were sufficient to maintain Internet data security, there would be no security plague. Yet the obvious loss of confidentiality and privacy shows the growing fundamental lapses in Internet security and other interconnected and distributed network infrastructures like Constellation and the GIG.

An Internet security mechanism rooted in limited-access "extending perimeter security to-the-edge" with increased use of bulk encryption and multiple factor authentication methods does not address data pollution from information propagation, explosive availability of answers through mining and search, and the threats from aggregation, inference, and data-to-data interaction. Specifically, three cultural disparities play against the success of a perimeter security access model. First, containment of data defies the premise for the very universality mechanisms that made the Internet as successful as it is now. Second, security based on the premise of access restriction does not consider the lack of trust and control in a worldwide community with competing and conflicting agenda. Third, data containment will be procedurally impossible because many other existing embedded applications and processes require data transport and create new avenues for at-the-edge perimeter breaches. The data security failure must be addressed specifically on its own terms and not through the false parochial perimeterization. The risk derives from propagation of the data itself and not from the transport infrastructure or creative mash of processes that increasingly add value to the economy.

The Internet is crying out for something specifically beyond traditional or revisionist technology to provide this missing confidentiality and privacy. Market pressures have provided no effective solutions, while group think has encouraged many vendors and users to acquire modernized versions of nonetheless obsolete technology. Perimeter security, bulk encryption, and controlled access fail. Perimeterization does not address the decay of confidentiality and privacy because data replication, mining, aggregation, inference, data-to-data interaction functionally render control over data ineffective. Therefore, without the introduction of truly novel security paradigms—not just illusionary revisions or more of the same ideas repackaged to look novel—the Internet and the GIG will not achieve the necessary confidentiality and privacy to provide the missing systemic security.

Given that existing continuity and integrity security techniques have proven effective but not extensible to address security deficiencies in confidentiality and privacy, we need new paradigms. To merely assert that "privacy is dead and learn to live with it" as stated by Scott McNealy, fails to address the forthcoming disruptions to infrastructure services, loss of productivity, and material intrusions to national security interests. This will have profound economic consequences and military ramifications, if the minor samples already experienced are any indication. Instead, realize that data security is different and requires new paradigms to restore the security to confidentiality and privacy. Such security paradigms must address the protection of the data itself in its most fundamental form rather than the Internet transport and processing infrastructure.

Recognize the discrepancy between governance and compliance with actual security. Governance and compliance are band-aids not cures. Conformance with rules and regulations is bound to be a responsible but prolonged reaction to risk. Although such conformance represents a baseline approach to security and risk management, the baseline defines only a starting point predicated by a trivial measurement system. Most organizations will be required to exceed baselines to maintain a legal, moral, or operational integrity, survivability, and continuity. There will always be the responsibility for compliance and, more importantly, proof of that compliance, but most organizations will ultimately be held to a higher standard that "you should have known that the state of the art has migrated to . . . " In such a situation, think security cure, not just band-aid.

AA.8.9.1 Cultural and Technical Constraints

For over forty years, security was predicated on the Multi-Level Security (MLS) model based on information compartmentalization. Although this model withstands the test of time, validation for integrity, and thusly remains the foundation for security modeling, unfortunately the cultural and technical constraints have undermined implementations. The MLS model is not invalid. The MLS implementation is not defective. The applicability was just too restrictive and it's underlying data model flawed. Cross-platform complexities, the lack of a simple model for semiotic meaning, and the lack of consistent executions have undermined effective, efficient, and widespread adoption. However, MLS has never been invalidated; it just never found its critical mass or its comprehensive applicability. MLS compartmentalization had been tied to security at the perimeter, and now the concept of defining and maintaining a perimeter is invalidated. Multiple Independent Levels of Security (MILS) is an illusionary attempt to implement MLS by creating parallel communication infrastructures with guarded interfaces; however, MILS does not address the fundamental security issues of the information structure which need to be addressed instead. As a result, MLS is being reinvented as a mainstream security technology as the Trusted Computing Module (TCM). TCM is consistent with trusted computing environments, like Sun Microsystems Trusted Solaris. TCM is neither new, nor different, just relabeled as a retailored marketing strategy for Unix, Linux, and WinTel platforms. MLS is alive and well as TCM.

Another transition undermines MLS and data security. Specifically, the migration of data formats from field-oriented, record-oriented, or database storage into so-called unstructured formats typically prevents clear and concise assignment of sensitivity levels to the data. Additionally, when the data is consolidated with mixed data types, wrapped with metadata, and infused with macros and application code, risk assessment errs heavily on the side of caution. As a result, data is typically over-classified and fundamentally restricted for reuse and distribution. The explosion of unstructured data and complex streams from signal sources will only increase the pressure to bypass security perimeterization.

The current fears over escaped data in the form of CDs that walk, USB finger storage devices or iPODs with the downloaded databases, or stolen laptops are not new problems. They are recurrences of past events or variations on old themes. However, it is now clear that we correctly value data over the value of the media or the pilfered computers. There are several current legislative attempts to limit data collection, alter data ownership, and force new restrictive retention rules. While the lofty goal is to minimize ID theft and newsworthy operational security lapses, such efforts will backfire and undermine data sharing initiatives by reverting to the cultural and technical limitations undermining traditional MLS. The concept should not be security versus information sharing, but rather both, in harmony. It need not be either/or when it can be both. Information is not some monolithic entity but rather an assemblage of granular elements with unlimited potential for meaning in a "disaggregated" format. Even unstructured data, compound signals, and complex metadata can be deconstructed into elements that can be tagged at appropriate sensitivity levels. This subtle but simple new model for information creates the paradigm shift that enables a different view of security compatible with all existing operational requirements for security and information sharing on current and foreseeable computing infrastructures and command, control, and communication platforms.

The era of glass-walled stovepipe computing has evolved into the Internet model for information distribution and virtualization. Security too has to reflect that evolution too. So, as computing becomes distributed and data is collected, aggregated, replicated, and dispersed, security must migrate with the data. It is not that the concepts for security based on compartmentalization and perimeters are flawed, it is simply that the demarcation is blurred and the ability to lock down the composite data entity is undermined. This risk becomes increasingly large as the data entity grows in complexity with tags and labels, hierarchical structures, metadata, and the imbedded engines of knowledge management and processing. This risk is also analogous to the priority given unstructured data as structured formats become more hierarchical, tagged, and marked with metadata. Therefore, the perimeter can no longer be asserted as a containment around the entire data entity since that precludes operational utility and dispersion to connect the dots. Rather, we want to perimeterize the dots and disaggregate the content, context, and concept.

AA.8.10.0 A Paradigm Shift

The technology in DigitalDoors makes MLS and TCM possible for widespread cross-platform adoption. It overcomes the technical and cultural hurdles of the past by viewing information as a stream that can be composed from data, metadata, hierarchical relationships, and compound data flows at any arbitrary complexity. The operative principle is that information can be separated into elements of content, context, and concept. These elements can be tagged with any level of sensitivity and compartmentalization or unlimited multiple competing levels of tag (label) assignment, and removed from the data stream to defeat aggregation, inference, and interaction. Therefore, DigitalDoors implements a granular MLS consistent with the new TCM hardware model that circumscribes a perimeter on granular elements with access controlled by sensitivity level, compartmentalization, and other assignments. Multiple tags for the same element drive computing with sensitivity-level-awareness. This technology piggybacks on MLS and TCM and can function as sophisticated filters as part of inbound and outbound guards. Sharing of the parts as parts or assembled in subsets as allowed lets users connect the dots and yet constrain information release to preclude leakage or process failures consistent with the older generation of MLS technology.

AA.8.11.0 Implementing Cross-Domain Information Flow—Multi Level Security

Cross-domain information flow is undermined for three reasons. Primarily, organizations are culturally unable and pathologically unwilling to share information. Information represents a point of power and control, security risk, and ongoing legal strife. Agency or agent will not share with any other; any act of sharing gives up power and reward, opens the door to the disastrous exposure of sources and methods, while national security laws preclude sharing with terrorist-combating-related laws mandating data sharing. Sharing data, when data is mostly noise, is not the same as sharing signal or sharing content, which are relevant subsets. In other words, data sharing could be mandated and actually implemented but the noise factor undermines functional result. Besides, human nature being what it is, real sharing requires a tit-for-tat accounting of chips at the very personal level, like "I gave you something useful, and you owe me something comparable in return." Both parties to an information transfer must agree to the value, extent of the information, and consent to bilateral transfers. Ultimately, morsels of information are owned by someone, and that someone will extract the most value and power from them.

Secondarily, existing computer and networking technology overvalues the workflow rather than information. The existing paradigm where workflows are fed with data must advance into an inverted recognition where information is the primary asset and is transformed by the workflows. This disconnect can be defined as the inability of work flows to technically define the content and value for its potential as information flows. Considerable effort is applied to the process of information transformation because we easily comprehend the order of events rather than the complex characteristics, comprehension, metadata assessment, and recognition of value within the information.

Tertiarily, multi-level security (MLS) and multiple independent levels of security (MILS) presuppose a compartmentalized processing network with a complete secured channel for each domain. Unfortunately, a disconnect in implementing protected but interconnected MLS and MILS domains have undermined this technology. Cross-domain guards have focused on partitioning process and data rather than on content, context, and concept—the fundamentals that enable granular content management. Therefore, cross-domain information flow will not transpire until we can overcome these cultural and technical barriers, align these to stated and unstated organizational missions, and implement granular content management environments. In summary, any cross-domain information sharing will remain ineffective and be actively sabotaged unless, the following conditions are met:
1) content value can be measured both objectively
2) content release can be limited and controlled granularly in a cross-domain matrix
3) realistic rewards can be assessed and awarded for successful information sharing Content is a complex evaluation not traditionally supported except for structured data such as transactions, databases, and other records defined in terms of purpose. This excludes non-structured data such as documents, XML, style sheet transformations, containers, zones, collections, messages, and most type of metadata. Content is retained by a stream, message, or file packaging. Such containers, XML tagging, and formats modify the content in context and concept in workflow but do effect this content in substance itself. XML, metadata tagging, and other taxonomies modify and become part of the information sharing environment as an infinite cycle. Effectively, all hierarchical data must necessarily have both internal and external metadata designations about utility, purpose, functional transformation (application code), inference, and aggregation. This is the point for objective measurement and consensual determination for content release. Here content release becomes multidimensional, both in terms of the strict content, the inferred context, and functional concepts. Because content is measured at creation (up front) rather than ad hoc or at a guarded translation, value is measured inherent to the content allowing real-time decision-making. The release rules must consider the source side and the target side security levels and the ramifications of the content with the metadata and subsequent measurements, which represent a new layer of metadata. Every sensitive network and each mission represents additional N-dimensional risks. As a result, simplistic matrix of source rows and target columns under-represent the other N-dimensional metadata risks.

DigitalDoors aligns with this cultural and technical barriers by providing:
1) means to and objectively measure content in terms of content, context, and concept
2) method to N-dimensionally tag content and create pre-defined or ad-hoc releases to each of source side, target side, and metadata dimensions for controlled information sharing
3) accounting system to measure information value, accumulate inter-aggregate transfers, and report net surplus or deficits for information sharing The DigitalDoors differentiation creates a core for granular information management for security, privacy, and connecting-the-dots independent of platform, environment, and networking. Any translation of the content retains the original content to continue the integrity of any applied value measure, a limitation of structured data, semi-structured data, even XML, MS Word documents, and other modern hierarchical data formats. Although DigitalDoors cannot create the actual organizational, managerial, or contributive incentives and rewards for effective information sharing, the measurement, method to release, and the accounting system represents a direct input to such a mandated legislation.

AA.8.12.0 Negotiated Multi Level Information Sharing

DigitalDoors introduces a method and system for maximizing the sharing of information intelligence among different parties. The system delivers a process for securing and secured sharing of information through extraction of critical data from a document and a mechanism for reconstitution. The reconstitution is done through a controlled-release process affecting partial reconstitution from none to full based on sophisticated access controls. The process also enables reconstitution of extracted data for a "consideration" or if needed a "negotiated consideration". The consideration may be a monitory consideration, a service or release of requested information.

Sharing a document whose critical data was extracted i.e. a declassified document creates an interest and an appetite for seeing the missing critical extracts. This creates the willingness to give something in consideration in order to be able to access the missing critical elements of the document. DigitalDoors technology, in essence, enables various sharing transactions. For example, it enables an e-commerce negotiated transactions, intelligence sharing processes, etc, The critical vulnerability before and since after Sep. 11, 2001 attack is the sharing of intelligence. There is a lot of lip service to sharing intelligence after Sep. 11, 2001 but nothing of substance is filtering down to the local [ ], firefighters, police people and health care responders, the first responders who see themselves as canaries in the coal mine.

The process of controlled release of critical extracts into a document, a declassified document/file or data stream for a "consideration" enables a successful sharing of intelligence and information. DigitalDoors enables overcoming the obstacles sharing of sensitive data and granular data between parties with a controlled release mechanism for release of data in conformance to benchmarks that can include the giving of consideration, submitting of other information, et cetera. A major benefit of the DigitalDoors is the ability of parties to exchange their information for other party's information, in a controlled method that enables implementation of security protection on the sensitive data.

DigitalDoors solves major cultural and bureaucratic barriers, which impede sharing of information between government officials and state and local officials. For example local responders may decide to release to another organization (local or federal) information they have gathered on an anthrax attack only if they get in exchange information they need.

In order to view the critical extracts, the receiving party will need to reciprocate and present a consideration which may be releasing some of its organization's secret information. (for example: a local respondent will release information on specific types of symptoms if the other party will release information and studies on those symptoms and fatalities following such symptoms in other localities).

Although intelligence sharing is mandated by a number of laws new since Sep. 11, 2001, the reality of intelligence sharing is cloudy for four major reasons. First, other laws mandate the absolute protection of information. Second, ingrained methods for doing business will preclude effective liberal information sharing. Third, most national, state, and local agencies are unwilling to compromise sources and methods, which is understandable given the potential for the careless release of information and the potential for the release of information to undermine the very intent of its collection and protection. Fourth, the process for sharing of information has no prior history and no defined functional workflows.

DigitalDoors technology resolves these issues in controllable, automated, and effective methods. In addition, it creates the workflow infrastructure and reason d etat to encourage information sharing.

First, DigitalDoors incorporates the legal and business rules for protecting information by predefined categories, word and phrase dictionaries, language translations, and special overrides.

Second, automation removes the risk for errant distribution of classified information and simplifies the process and workflow.

Third, the DigitalDoors technology for targeting, categorization, extraction, encryption, and dispersion makes is possible and simple to remove all reference to sources and methods which could undermine the data gathering organization and its very intent.

Fourth, the automation of targeting, categorization, extraction, encryption, and dispersion makes it simple control, distribute, monitor, and fine-tune leveled-access. In addition, control of extractions, indexes, links, and innate categorization of security, privacy, and risk enables internal or external control over a table of contents or the control over the hierarchical response to requests for information specific to needs or problems. Furthermore, this creates an infrastructure that engenders the sharing of information since DigitalDoors can establish leveled-access based on any number of access controls including username, actual location, time of day, security threat mode, permission, or level of participation in providing information for sharing in the mutual pool.

AA.8.13.0 Security Through Information Distribution

Multi Level Security—MLS is the provable solution for security within defined location and defined application spaces. It worked. Day-to-day tradeoffs included a mentality of security versus functionality. However, as these spaces multiplied and applications became more complex, the MLS solution implementation became too expensive, too unwieldy, too complex, and non-operational. People worked around it.

However, as a result of MLS complications and workarounds, new views of CTW, EAL, and TCW were implemented to enable operational functionality. Do such implementation meet the requirements for security? Does it allow functional information sharing? Is this a functional solution with guaranteed security? Whether or not CTW, EAL, and TCW are provable to provide security is no longer a useful question. Consider whether it is deployed widely and if it is even preventing the current security attacks with the massive information leakage and denial of services. The concept of the GIG is creating an infinity of at-the-edge locations and an explosion of sensitivity level tagging dictionaries with too many entries to allow rationalization. CTW, EAL, and TCW do not seem poised to present a coherent and effective security foundation for the GIG, transformation, and the complex new world of distributed applications.

The security problem is no longer about location and application but information and distribution. Actually the evolving security ecosystem must include knowledge discovery, integrity, security, and sharing, rather than some single-dimensional notion of security. If you can accept that a fundamental security ecosystem shift is possible, conceivable, or literally upon us now, you have take the first step to perceiving a new paradigm. This new paradigm repositions intractable security problems with very simplified views of information defined by a semantic structure supporting configurable distributions.

This implementation is asserted through granular content control (cross-platform, platform-agnostic, interagency, code and language independent). Location and application remain intact but is no longer part of the new security problem. Even when location and application becomes more complicated through such issues as complex computer applications, SAAS, SOA, Web 2.0, distributed processing, and dynamic with continuous cyclical support operations, security is applied specifically to information and distribution. Such is the fundamental archetypal shift and operative means to reassert security within this profound evolution. When the battle is fought specifically over information and distribution, old friends like MLS can be recycled because it is proven and extensible into the new security ecosystem. However, you regain control over security by shifting the security problem ecosystem from location and application to the ecosystem of information and distribution in order to win this war.

AA.8.14.0 Implementation of Information Sharing with Rigorous Protections

Information sharing occurs on a daily basis across all organizations—both with and without permission or control. These examples constitute both the planned sharing and the inadvertent distribution of information, like:

TABLE

| example information sharing methods |
| --- |
| The distribution of a report to a defined list or readers |
| the push or pull of information is based on user authentication |
| the removal of a desktop computer for upgrade and recycling |
| the theft of a laptop; the loss of USB thumb drives |
| backup media lost out the tail gate of a courier |
| output sent to a group printer or FedEx Kinkos |
| messages pushed and pulled through a GIG infrastructure |
| messages expanded with additional human insight and intelligence |
| reports distributed, cited, copied in whole or in part, and referenced in new reports |
| insiders copying database tables for new projects bypassing original access rights |

The issue is not so much that information sharing occurs or that new laws aim to encourage additional inter-agency information sharing, but rather that information sharing is ad hoc, inadvertent, and undermined by advances in data mining, aggregation, inference, and data-to-data interaction. When information sharing lacks formal usage controls, it undermines BLM security, compartmentalization, and privacy and confidentiality, and rules for data stewardship fail.

AA.8.14.1 General Concept

You can protect resources, like information, in just two ways; with perimeters; or with dispersion. For the first option, a wall around resources in the whole defends that multi-dimensional perimeter. For the second option, dispersed resources are no longer useful in parts, replicate the parts for survivability and mobile delivery, and enable reassembly of parts into the original functional whole or reconstruction with repurposing for other results.

The first option is the long-standing traditional way, effective and efficient but not completely protective. It works so long as the perimeter is intact, so long as the resources are not compromised from the inside, and so long as these resources are not repurposed and redistributed. Perimeters are created with firewalls, guards, access controls, encryption, and need-to-know hierarchies. This is effective for materials but not information since information can be replicated, reformatted, distributed and redistributed by secondary recipients, dispersed, inferenced, aggregated, and repurposed in new forms—all the while the original information seems intact, seems never to have been compromised, and even seems never to have been touched. Each digital copy is exactly bit-for-bit the original but does not increment access counters or indicate attribution or distribution. There is no control over any full or partial copies and copies of copies.

The second option is extraordinarily effective for information. You can pull the structure and the content from the immediate storage or from any available replicated remote storage at wire speed and respond instantly with reassembly at wire speed. In contrast, dispersion is not effective for materials. For example, if you disassemble your weapons with parts sorted into bins, secure the ammunition in lockers, and put trigger guards on the guns, you would be slow to respond in an emergency with weapon ready and loaded. In contrast, reassembled information can be pushed and pulled to thousands of users simultaneously anywhere at wire speed; not so with bins of gun parts in the armory and users at the front lines or in impromptu defensive positions. Wire speed data replication and the semblance of parts interchangeability plays into the strengths of dispersion for security because reassembly with almost the correct items is indistinguishable from the exact items. When perimeter security is combined with DigitalDoors dispersion and reassembly methods you can protect granular items at will, anywhere and anytime, at rest and in transit, from outside attackers, "trusted" insiders, and from data inferencing, aggregation, data-to-data interaction, and repurposing. Backups on tape, replicated computers, or at remote sites remain safe because of the dispersed granularity.

AA.8.18.2 Implementation Map:

The DigitalDoors' paradigm illuminates information security in new light. This paradigm shift is not just an academic theory; it is a matter of fact and available demonstration. The software actually runs on servers, desktops, laptops, tablets, diskless trusted clients, NAS devices, web servers, local area networks, wide area networks, and email infrastructures. The paradigm shift as implemented is a series of procedures. Specifically, the procedures includes steps defining:

TABLE

DigitalDoors Procedures

How to identify information on a minimum granular basis
How to granulate the whole to any arbitrary level of parts
(i.e. "items" or "granules")
How to assign items to a multi-tiered taxonomy
How to split items from metadata, cultural, semantic, or semiotic context
How to separate content from context and from concept
How to disperse items to different (remote and replicated) storage
How to assign item-level security based on taxonomy
How to create a redacted whole
How to create an architectural map for mining, inference, aggregation, connecting the dots, and reconstitution and protect against ad hoc data-to-data interaction
How to reconstitute the items into the whole
How to partially reconstitute the parts subject to security dominance (or any other taxonomy)

The multi-tiered taxonomy is a critical aspect to implement effective and efficient inter-agency information control and sharing. Items, tear lines, references, and reports fulfill multiple purposes within a single agency or organization and potentially many more for multiple agencies. As a result, tagging information with a single SBU or TS tag constrains information sharing with additional levels of perimeter guard revaluation. The introduction of metadata tagging for purpose, content control, and additional security assessment only increases the complexity of perimeter guard revaluation and the potential for inadvertent out-of-channel security lapses. This is one of the complexities of defined cross-domain tags that frequently preclude freely flowing information sharing. This is also one of the complexities of metadata. Instead, out-of-band multi-tier tagging enables assessment of information sharing based on the potential for information leakage and loss of privacy through aggregation, inference, and data-to-data interaction.

An "item" is any part of the whole from as little as . . . a bit, a pixel, punctuation, a bullet point or footnote, a field marker, a character, a word, a phrase, a line of a document, a sentence, a paragraph, a sound bite, an arbitrary area of an image, a link, an encapsulated object, a metadata definition, or the metadata for the item, to as much as . . . a document inclusion or the entire whole data stream. The "granule" is an alternate designation for "item" as described in the academic literature of "Granular Computing".

AA.8.18.3 Technical Implementation

DigitalDoors information selection, extraction, dispersion, and reassembly technology worked immediately from the initial experimental program. The concept and the basic implementation has been stable, reliable, flexible, and fault tolerant. Information can derive from almost any format; a database, a structured field-oriented flow, freeform text, to arbitrary data streams of text, signal, audio, video, or hierarchical metadata. DigitalDoors can interface with your data and your stovepipe infrastructures, SOA web integration, on-demand applications, or software-as-a-service, and COTS workflow. Certain complexities inherent in purpose, dispersion security, and achieving multi-process integration have dictated optional dispersion formats so that many goals can be achieved at the same time, specifically security and sharing, privacy and confidentiality, continuity and survivability, as well as information utility.

The DigitalDoors machinery is the black box, like a turbine engine. You can use it almost anywhere. However, this facility that must be engineered to the platform, size, location, system requirements, user needs, and the existing cultural processes that must be supported. DigitalDoors has created shrink-wrapped applications for Windows, MS Office (Word, Outlook, PowerPoint), and interconnected with trusted workstations, SMB and Samba, FTP, web servers, virtualized server environments, and Sun Trusted Solaris. This demonstrates our ability to integrate with other complex platforms, external devices and processes, and coexist with COTS software, service-oriented architectures (SOA), and proprietary components. DigitalDoors supports granular content extraction with placeholder substitution with 30 or more options, including misinformation. DigitalDoors includes an infrastructure with supporting tools and toolkits for access control, encryption, hashing, and random number generator, strong password creation, complex security and sharing policy administration, selected disclosure, anti-inferencing, information taxonomy, data mining, and sophisticated content, pattern, and context recognition, all running easily on COTS laptops or terminal-services or web-enabled infrastructures.

The demonstration implementations are simple in order to show ease of use and applicability for an inexperienced workforce. Other implementations and demonstrations are complex because of the veritable buffet of options readied to support one user or thousands of users. Our goal is an invisible user interface so that Word, Outlook, and MANMAN with DigitalDoors in play look no different from these COTS products. We can integrate with CAC access cards and the operating system for seamless access control and user sensitivity level and security compartmentalization.

We strive to simplify the user experience, and therefore many functions and features are hidden to provide a one-button user interface or less through automatic integration.

We cannot show you all the bells and whistles in one sitting. In fact, you might not even want these bells and whistles because every added option increases training and administration overhead. However, we present this complex infrastructure as a gauge of the existing available architecture, depth, flexibility, extensibility, and capacity for integration.

AA.8.18.4 A Tool in a Toolbox

DigitalDoors is just a tool—just like MS Word, MS PowerPoint, PhotoShop, a hammer, a wrench, a turbine engine, or a carbine. DigitalDoors is not a solution any more than a hammer is a solution. Just as a hammer can pound a nail, pull out a bent one, or open a glass soda bottle, DigitalDoors is a solution for granular security within a network of open or secured networks over a range of configurations and applicability. We do not insist or emphasize the best way to use this tool; we only provide it you as part of a larger toolbox and work with your system engineering teams to effect integration, workflow, or create new solution sets. We can help you with issues of applicability or define the problem set in order to craft solutions, no button or one button functionality, and seamless integration into operational workflow and stovepipe applications. We strive, as stated in the prior section, for simplicity with obvious utility.

AA.8.18.5 Maturity of the Paradigm Shift

Dispersion of information—to enable security, privacy, survivability within the complex and counterproductive environment needed to support knowledge management, data stewardship, security, confidentiality, continuity, survivability information sharing, and dispersion—is a paradigm shift. It is diametrically transposed to the traditional policies of security isolations, compartmentalization, air gaps, and need to know hierarchies. Perimeter defenses thwarts effective information sharing, networking, and push/pull data analysis. If you want to connect the dots, you need to disperse the information but without revealing sources and methods. Too much information or unlimited access allows opponents the opportunity to infer and repurpose that information. Control of granular items on a contextual basis maintains an operational balance between security and usage while retaining information control.

DigitalDoors is a turbine engine with functions and features ranging from manual to automatic content selection to complex support for network dispersion and replication of information. There are implementations of declassification redaction so that output is automatically directed to unlimited sensitivity levels and compartments. Information can be versioned and delivered to enable users in different groups, organizations, and external partnerships to connect the dots without violating sources and methods. An administrative facility enables taxonomy rules to be added, deleted, or changed to support individuals, groups, or entire organizations. Security can be suggested, overridden, or fiercely enforced through OPSEC and COMSEC oversight. Taxonomy tools classify granular information units subject to sensitivity levels, multiple compartments, groups, categories, and targeted analysis tracks. Cross-domain distribution on-the-fly is enabled because multitier tagging is reassessed prior to upgrading, downgrading, or multiple sensitivity level distributions. Automatic conversion of documents from the raw to the partially coded can be turned into tear lines. Reporting, defenses in depth, and numerous other features extend the basic to the extreme.

Just as many other security technologies were introduced as applets and add-ins but later became so indispensably as to be incorporated directly into mainstream application and operating system kernels, many DigitalDoors features could track the same path to maturity. The sample applications, integration with an SOA web site, and Office and Outlook add-ins are just beginnings for the implementation of our paradigm shift. Define your requirements and engineer this DigitalDoors turbine to your needs and desired platform.

AA.9.0.0 Intangibles:

AA.9.1.0 Creation and Production of Intangibles

DigitalDoors makes the assertion that everything tangible and intangible can be represented as information and in its reduction is information. Plants and animals are based on a DNA blueprint. Rocks and air are created from an atomic structure represented by information. Buildings and cars are built per design from other tangible inputs (themselves the manifestations of information). Everything else, that is data, is information. Energy delivery to enable the production process is directed by information through relays, communication channels, and meters. The fundamental difference between the intangible information and its physical counterpart is the manufacturing process that turns the information into a physical representation. The physical reality of tangible information is the conversion of matter and energy into other matter and energy. Information is represented as arrangements of matter and energy, whether as letters in a book, magnetic fields on a disk drive, or power differentials within storage vessels. These are physical (and tangible) expressions of logical (and intangible) information.

An expression is a mode, means, or use of significant representation or symbolism. It is the manifestation of the intangible design. RNA, the functional building materials of life, is the expression (or one of many possible expressions) of the DNA blueprint. Industrial manufacturing is the expression of inputs and process to create an output product. These are things we do not normally think of as physical manifestations of information. Generally, we cannot convert electrons, protons, and neutrons into atoms or atoms into molecules. However, our technology is getting to the stage where we can replicate some of the fundamental physics to create these microscopic manifestations through information-driven factories. Even light and energy is something we manipulate and convert from other physical forms and sources to carry information and enable the manufacturing engines of the industrial age. This same technology has transformed into the engines of the information revolution where the inputs and outputs are sometimes completely intangible.

The physical manufacturing process is not that much different from a computerized application. Directions realign information into new forms, and these become products and services. The manufacturing process is represented by a cookbook, a blueprint, or a design method expressed as an informational description. A computer application, a workflow, a macro, and computer code is merely a series of directions patterned as information and expressed to create the logical or physical output. Computer chips and circuits are physical manifestations of computer code and instructions. These are all reducible in their lowest forms to information. Some outputs are pure information, some are manifestations in physical form of information and the information that drives the manufacturing engines. However, in reduction, everything is information or the expression of information.

It is also essential to realize that process is a modifier of data in ways unanticipated. As such, process is an expression of data or the blueprint that is always based on a raw data format. Consider this example of the MS Word document routed through an interoffice document management system. Each user in turn reviews the document presumed to be a work-in-progress. However, as the document is distributed downstream, individual user-level macro settings for the spelling and grammar check could either highlight suspected problems or automatically address them to actually change the document content. Words change if unknowns and convoluted syntax is chopped up into shorter phrases. These alterations often substitute the wrong common words and break the meaning. [Need a visual sample here].

Because individual users can change/add/delete dictionary and syntax entries, the ultimate distribution of the original document could bear little resemblance to its initial concept and frequently makes little sense. This is not an exercise in possibility, but a reality of MS Word with common SharePoint or Exchange workflow systems. Although this might seem a minimal risk, this type of macro process as is poses a covert communications channel. Enhanced, it poses even more of a sophisticated attack. Substitution of altered dictionaries and grammar rules easily pervert a low value plain-text into a sophisticated substitution cipher at the contextual and conceptual levels. This should be viewed as a risk where raw content is perverted by expressions of metadata and contextual changes not inherent within the raw content alone.

In some cases, we have data describing information as tags, classification, attributes, and properties. Some of this data describes how the data should be applied or formatted, or it describes the processes for manufacturing something else from it. This so-called metadata is just the expression of the data and the methods to turn data alone into building blocks. It is still information, albeit more complex information, and is still the expression of information.

If there is something that cannot be represented as information, DigitalDoors would like to know. There are many things that can be represented as information but cannot yet be created de novo from information alone. That is a limitation of our available production methods, not the theory that everything can be represented by information, created from information, and springs from information and its expression into another form. However, we can stick our heads in the sand rejecting the potential for a security risk because it seems too far out in some future fiction.

What once was unknown became fiction and then became reality. The information revolution has transformed our world exposing heretofore unconsidered risks. Information is content, context, and concept. These are all forms of the expression of information, and all are at risk. Forms of security that block some forms of this information, for example, perimeters, firewalls, guards, deep packet inspections, safe coding methods, are not sufficient security methods. They are efficient security methods for the current expression of that information but not sufficient to reflect possible transformations of the expression. Expression must be recognized for its asset value and protected.

AA.9.2.0 Intangible Data Assetization

The assetization of both intangible and tangible assets requires a level of granularity in order to reflect the complex nuances of finance, legal, and operational workflow. This creates the algebra for measuring raw, aggregated, and processed information for both risk exposure and asset value. This includes initial collection through customer distribution and inclusion of information and other intangibles as a production input to a finished product.

AA.9.2.1 Assetization for Asset Monetization

In the case of intangibles, specifically information, it can be transformed by content, format, aggregation, inference, interaction, structure, presentation, and other attributes that alter its valuation. Granularity is represented in terms of describing the raw material or finished goods with variations on the same, and in terms of redaction, distribution, and utilization. Granularity is the semantic, contentual, cultural, or semiotic representation of elements within a data stream. For this reason explicitly, any intangible assetization process should reflect the granularity of information and generate monetary valuation reflecting specific attribute expression and its value (decay or growth) over time. Monetary valuation need not be fixed or static based on internal content or attributes, external cultural or contextual frameworks, or the passage of time.

For example, consider an initial MS Word document. It contains both obvious content, context, and concept in plain sight. It also contains a tremendous amount of contextual and covert channel information. This is normal hidden metadata or even that which is expressively secreted into metadata and only accessible through secondary encryption keys and other add-in applications within MS Word or a workalike application. It is easy to hide metadata inserted with earlier versions of Word from later releases because the document structure has changed between versions; similarly, MS Word metadata can be hidden from the web-based Google desktop tools or WordPerfect. The same is true for any other semi-structured or structured data source, including databases, SQL, spreadsheets, email, audio, images, video, and application configuration files. Images overlayed on MS Word text can be used to fully mask the existence of content. DigitalDoors exports that insecure format into plaintext for any subsequent processing; it can also optionally create a monetary valuation on the raw conversion from the MS Word file before that conversion in order to capture the differential value of that visible and hidden metadata.

AA.9.2.2 Differential Valuation

DigitalDoors Secure parses and classifies that plaintext document and optionally creates a monetary valuation for the baseline information. Selection and extraction of crown jewels creates a redacted version and optionally creates another monetary valuation. The differences between a monetary valuation of the information at any point in this workflow expresses differing risk and valuation. It is not static. It is however, reproducible. It is also dynamic in that as dictionary valuation, organizational missions, and policy evolves, the monetization of any particular information set will represent that current state. Differentials over time will represent fundamental decay in information or the generation of new organizational knowledge and wisdom. This is relevant to reflect the development over of time of a trade secret and the resulting increase in asset value of the trade secret.

The value of information is inversely related to its distribution. The more widespread and well-known information is, the less unique it is and the less valuable it is. When information is controlled naturally or artificially, it becomes scarce and hence more valuable. Copyrights, patents, and trade secrets enforce the scarcity of the information or control the utilization of the information. These are both forms of scarcity, trade secret being natural and copyrights and patents providing an artificial usage limitation. Whatever the methods used to create this scarcity, monetization is increases with scarcity. Granularity of information breaks the context of the information and artificially creates formlessness and this scarcity, also increasing the value of the information. The security of information is proportional to the scarcity of it.

DigitalDoors reflects the value of information based on many defined attributes, including sensitivity level, user, group, organization, role, mission, location, purpose, scarcity (in particular through the measurement of monetary valuation), and also other soft properties. In addition, DigitalDoors creates a baseline redaction and versions which can be reconstituted not all, some, or in full. This reconstitution, as described in other papers, fully supports granular content control such that the reconstitution can be driven by the specific authorized user, the group, the category, by sensitivity; level and compartments, or as fine-grained as per item-level extraction. This reconstitution contains different information than another reconstitution with different item reinsertion, and therefore, should represent a different information risk and demonstrate a different monetary valuation. Digital-Doors fully supports differential monetary valuation to whatever level of granularity is supported in the baseline or version redaction and the corresponding reconstitutions.

AA.9.2.3 Conclusion

In summary, DigitalDoors generates monetary valuations for raw, redacted, versioned, and partial or full reconstitutions. The differentials between an information set in any two different states represents both the monetary value from exposure or leakage and the difference between the two states in terms of the extraction item-level extraction and contextual structure. Therefore, not only is the original information evaluated, a redaction is also evaluated, full reconstitution or reconstitution of the format-transformed information, as are other specific and intermediate expressions between the original, the restoration of the original, and anything in between. Assetization requires a level of granularity for robustness and utility.

AA.9.3.0 The Intangible Assets Production Model

Security is the necessary to sustain the competitive advantage provided by the wealth production model of the information revolution. Without protection of the elements enhancing the basic production model, this information revolution production model reverts to either an agricultural model or industrial model for production of commodities. There is nothing wrong with the production of commodities, but it is not sustainable and does not yield the range of returns available to complex, information-based monopolistic services.

The differences between the information revolution model with its post-industrial enhancements is the input of intangibles, the output of intangibles, and the multiplier effect from the intangibles on the actual efficiency or specialization of the manufacturing process. The multiplier effect enables higher margins, lower production costs, or monopolistic production presumptive on the enforcement of patent or the protections of trade secrets. The intangibles are most often data or restricted knowledge or the special case of a patent. The post-industrial production model reverts to commoditization with the expiration of patents. It also reverts with the exposure of data and trade secrets.

A sustainable competitive advantage enables product or service pricing margins that exceed those of commodities or provides a means to produce commodities at prices below the competition. It is an enviable position that enables better profits, growth potential, and a future.

The only sustainable advantages for agricultural or industrial models are based in government-granted monopolies of land, resources, markets, or regulation. Few markets are available today with such opportunities, so most institutions make these opportunities themselves. The opportunities in the information revolution are based solely on data and knowledge (a form of restricted data), and these are used to create a competitive advantage. The opportunity to create such an advantage is available only so long as the data and knowledge is unique and restricted, so every should be made to retain this advantage.

However, some knowledge becomes obvious, such as methods, so a monopolistic protection is granted with a time-limited patent. Often a patent is too little and too short, so institutions hope or effect data and knowledge limitation through security. The only venue for maintaining that restricted knowledge is security. It is only sustainable for the duration and effectiveness of that security. So while security does not augment wealth creation, provide inputs or outputs to the production model or generate ROI or contribute to EPS, it is essential and necessary for the continued sustainability of a competitive advantage.

AA.9.4.0 Monetary Information Valuation

Monetary information valuation is an important strategic, legal, financial, operational, and managerial concern especially when 95% of organizational value is reflected within intangible assets. It is essential to assign monetary value to information so that it can be integrated within the strategic and traditional roles for managerial control to bridge this divide. It is also essential to realize the inverse valuation of information based on scarcity. The more information is controlled for its uniqueness, the more valuable that information. Distribution and downstream information sharing, while essential for workflows, erodes value.

Information is intangible by definition, and managing and accounting for intangible is exempted from most functional activities. Information is also hard to define, hard to discover, hard to classify, and nearly impossible to relate to purpose and value. DigitalDoors systems and methods overcome these limitations with flexible, robust and automatic ways to discover information, classify it, assess ownership and potential, and assign an asset valuation that can be integrated in the traditional and conservative control methods. DigitalDoors values information statically and creates dynamic differentials subject to attribute perspectives and reflection of internal or external systemic changes with time.

The fundamental difference between tangibles and intangibles is that intangibles tend to be unique rather than commoditized. While there are many ways to assign monetary value to information, the DigitalDoors assetization and monetary valuation methodology strives to make this functionally simple, and in particular, automatic. Automation is required to support the volumes of information seen today and the obvious industry-wide exponential growth experienced by information warehouses. This valuation method is primarily automatic, driven by the DigitalDoors Secure application, but flexible enough to support most organizational requirements and allow for manual overrides and revisions. Value is also adjusted automatically as the information within the warehouses changes due to mission revision or just because things change over time, and because production purpose adjusts to reflect the competitive environment.

The takeaway from this paper should be that random information is unlikely to assert a meaningful or functionally-relevant message. Therefore, primitive content analysis (with white lists and black lists) must be augmented with context and concept analyses to measure such other factors as authentication, integrity, source, method, chain-of-custody, utility, purpose, perspective, functionality, relevancy, and connection. This specific DigitalDoors measurement system and method supports the proxy recognition of ownership, utility, purpose, frequency, source, method, and other significant organizational behaviors and requirements. In addition, this method recognizes static assignment, information lifecycle management, and the dynamic revaluation of information as it relates within information warehouses and the larger strategic organizational workflow as legal, financial, and operational agendas advance to reflect new challenges.

AA.9.4.1 Monetary Valuation Methodology

Note that significant cultural and semantic limitations complicate the monetary valuation of intangible property, in particular information, and more specifically, patents and trade secrets. A number of basic assumptions should be met.

These assumptions reflect information as data streams consisting of content, context, and concept, a lexicon referenced frequently by DigitalDoors. Specifically:
1. the whole of an information set should have more value than the sum of its separate parts
2. the assemblage or information production should create more value than the parts and its liquidation value
3. the parts should somehow relate to each other and reflect a progressive, significant, and culturally or functionally meaningful narrative These assumptions define that a data stream is not merely the random collection of high-value dictionary entities. These assumptions define that a data stream has a coherent purpose, utility, and/or imparted knowledge. The assumptions also represent that a structured data set or other arbitrary data streams contain a culturally-relevant message or that the message relate to a functional process in a meaningful way. Note that the code, format, structure, metadata, symbolism within a data stream might not be meaningful to every person or just any workflow, but if this stream has a matching recipient, it qualifies as a viable document. Under the concepts of Claude E. Shannon, information theory regards information as only those symbols that are certain to the receiver.

A unifying theory known as information theory was developed and became the subject of intensive research. Claude E. Shannon, whose initial ideas appeared in the article "The Mathematical Theory of Communication" in the Bell System Technical Journal (1948) defined information to include the messages occurring in any of the standard communications media, such as telegraphy, radio, or television, and the signals involved in electronic computers, servomechanism systems, and other data-processing devices. The theory is even applied to the signals appearing in the nerve networks of humans and other animals. The signals or messages do not have to be meaningful in any ordinary sense.

The chief concern of information theory is to discover mathematical laws governing systems designed to communicate or manipulate information. It sets up quantitative measures of information and of the capacity of various systems to transmit, store, and otherwise process information. Some of the problems treated are related to finding the best methods of using various available communication systems and the best methods for separating the wanted information, or signal, from the extraneous information, or noise. Another problem is the setting of upper bounds on what it is possible to achieve with a given information-carrying medium (often called an information channel). While the central results are chiefly of interest to communication engineers, some of the concepts have been adopted and found useful in such fields as psychology and linguistics. The boundaries of information theory are quite vague. The theory overlaps heavily with communication theory but is more oriented toward the fundamental limitations on the processing and communication of information and less oriented toward the detailed operation of the devices employed.).

Nothing in this theory precludes obfuscating the valid message (with hiding, dispersion, encryption, etc.) so as to mask the source, recipient, or potential value. This obfuscation just raises the possibility than a message is viable only from within a specific perspective context. Indeed, holograms can hide vast amounts of information only retrievable within a precise perspective illumination angle and light frequency. The frequency- and angle-encoded information will protect the hologram against attacks completely or partially unless the refraction angle is guessed and the radiation frequency is a whole number multiple of the recording frequency. It is a great security method but not common because of the technical complexity. Padded or hidden messages qualify, but separating value from the chaff in such obfuscated delivery can be an intellectual challenge for all but the recipient.

Any valuation system is liable to gaming against this system. For example, populating a nearly meaningless document with gratuitous inclusions or repetitions of high-value words. Analysis of a data stream for relative statistical balance of content, context, and concept is an effective and efficient method to vet the integrity, validity, and aggregation of parts into a coherent whole. See the whitepaper A Valuation Basis for additional and detailed assessment of the assumptions, restrictions, and practical methods for assessing information and ascribing relative contextual value to information. Hefty rewards encourage gaming against the system, such as incentives to share information among agencies, boost the search engine placement, increase the number of hits from search engines, pad the frequencies of reference or copies of a document, or valuate an intangible production method far above any reasonable economic value.

Two factors play into gaming the system. First, an information measurement system must be simple, understandable, extensible, and open. Second, the measurement system must be robust enough to rate all types of data streams in any format, structure, and encoding method with any amount of metadata (whether internal in-channel or external out-of-channel) and be robust enough to protect itself from schemes to skew the results. If the current state of security shows us anything, these two factors not only are conflicting, they provide the very venues for attack. Converting open systems to closed undermines scientific methods and also gives special dispensation to those that can expose the hidden methods. They will and do come to light, and the more at economic incentive, the sooner these are undermined. The system will be attacked for certain and it is managerially responsible to review automated measurements for abuse, even with huge data warehouses and the acceleration exponential growth in data storage. Intangible information is the overwhelming market value of an organization because of the changes from the information revolution.

Augmentation of simple measurement with context and concept analyses to measure such other factors as authentication, integrity, source, method, chain-of-custody, utility, purpose, perspective, functionality, relevancy, and connection protects the system from attacks and review of outliers and assessment of content relevancy to context and concept is always effective. Discontinuities, nonsense, grammatical errors, lack of meaning, randomness, statistical distribution, and excessive values are clues to attacks. In particular, randomness, statistical distribution, and excessive valuation are automated and require limited manual review. Violation of configurable weights and thresholds kick out the outliers as discrepancy reports.

The difference between measuring tangible and intangible assets is arguably complicated. Inventory count (or frequency) is not always a good, unassailable, or effective measurement statistic for intangible assets. Although ten units of data content exceeds one unit of data content, it often does not impart more value. One, some, or all ten units might have no value at all or relevance together, so aggregating it yield no value at all or even less value than one, some, or any of the ten units alone. It could be disconnected or repetitive, so valuation is fixed no matter the size, padding, or replication. Intangibles are typically unique, so aggregation of intangibles either yields no contextual value or a new (disconnected and far higher) value with limited relationship to the individual parts alone.

On the other hand, aggregation, inference, and interaction of data as a whole do represent more than the some of the parts. Weaving together key concepts for a practical message or functional purpose is the essence of knowledge creation and the leads to the monetization of the aggregation of intangibles as valuable assets. There is one last consideration. This assemblage of intangibles provides monetization value subject to a perspective. One group within an organization might have no interest or incentive to use this assemblage whereas another group sees this as an opportunity to increase the efficiency or lower the cost of a production process. Likewise, assemblage might well have no internal utility, but might represent a significant potential for sale as a product to others or a service for license. Measurement must transcend frequency count to include measurements of context and concept with additional relevancy to the core mission or other needs as discovered.

Consider that a bin filled with #12 size $^{10}/_{32}$ screws (quantity 14,000) is worth more than a single #12 size $^{10}/_{32}$ screw (worth $0.03). An inventory valuation is the part count times the unit value, in this case 14,000×0.03. However, repetitions of information do not reliably represent any or even a natural linear increase in value. For example, a database with one thousand entries for "bin Laden" should not be assessed with a value of 1000 times the value of the single "bin Laden" reference. Inclusions and repetitions might indicate higher value, although this is neither necessary nor sufficient. Although simple, frequency counts can be misleading. Sometimes it is contraindicative to value as exclusivity and maintaining exclusivity forces greater value. In some cases, the true information does not even indicate the content at all and presumes that the message recipient is intelligent enough and on the same conceptual wavelength to comprehend the missing context. In fact, the missing content and the omitted context specifically provides that authentication. Quality becomes integral to quantity. Quality is a function of content, context, and concept.

Search engine optimization (SEQ) techniques pervert classification and tagging techniques to promote an agenda different from the intended search engine mission; these same techniques and the corresponding techniques to detect this game playing and thwart it are relevant for monetary information valuation. It is important to assess whether the presented content reference is related to anything, is consistent with links to any utilitarian context, or conveys any concept. Discrepancies between content, context, and concept, the relative lack of anyone of them, or imbalances of relevance distinguish a breach in the previously listed assessment assumptions. Content without context has no value. Context not yielding a concept might have some small value but lacks any implied or explicit utility. This is indicative of flash but no substance. Intellectual property and other intangibles have little value without context and consistent concept.

Specifically, documents (inclusive or all files, messages, field-oriented data sets, structured and unstructured formats, metadata repositories, and textual, audio, or video streams) are processed for content, context, and concept. These results are aggregated and adjusted by user-configurable monetary values and functional descriptions. These are frequency counts, but mediated frequency counts. Although the monetary valuation of information is intended to support accounting activities and support the assetization of intangibles, be cautious with raw frequency counts. Bean counters like this type of information, but are always suspect. Repetitions of information, copies of information, suspect information, counterfeit or fraudulent information are easily constructed and skew frequencies. The chain of custody along with the sources and methods for data collection and production is very important.

AA.9.4.2 Weighting Content, Context, and Concept

Weights are applied to reflect the best or desired internal understanding of organizational requirements, recognition of internal trade secret archives, and reflection of the complex but evolving intangible property basis. The details are described as follows, and are also defined by the included Excel spreadsheet and report samples. Every white list, black list, and gray list dictionary entry and all entries in My Word List, My Group List, My Category List, and My Policy List are assigned a base monetary value. This value can be static, reflect occurrence frequency counts, or comprise an algebraic formula. For example, "bin Laden" can be assigned a fixed value of $200 if that entry appears once and many times with a document, $200 each for each and subsequent occurrences, or a formula of $100 squared for each occurrence reflecting an increasing focus in value as the occurrence counts increase.

The value is variable and is configurable through administration control. The formula is also variable and configurable, but generally uniform for content and context occurrences for simplicity of administration and maintenance. DigitalDoors does not support conditional and discontinuous functions at this time, but is working on implementing this extension specifically to address the shortcomings in straight frequency counts because it looks promising to improve weighting options. Game playing with SEO and gratuitous inclusion or repetition of keywords is muted by weights that assess the contextual basis for this content. Content without relevant context or content that does not represent or sustain a concept is gratuitous.

Because "bin Laden" is a name item by category, reflects a specific mission or role, additional values can replace or augment the basic dictionary value assignment. Weights ranging from 0 to 100% stress the context importance of content or applicability of that specific information. This value can be static, reflect occurrence frequency counts, or comprise a formula. For example, "bin Laden" can be assigned a fixed value of $110 if that name category appears, $200 each for the first each subsequent occurrence, or a formula of $125 and $100 squared for each additional category occurrence reflecting an increasing focus in value as the category occurrence counts increase. The value is variable and is configurable through administration control.

Recognition of "bin Laden" as a family name instead of as the known terrorist is part of the core DigitalDoors multitier hierarchical overlapping classification system, and a reflection of the need to account for and balance the relationships for context, context, and concept. The specific instance of relevant classification will determine the monetary valuation based on whether that name is recognized as a family name or a terrorist, and the monetary value or risk assessment will correspondingly vary based directly on that specific assessment and utility. Different dictionary entries set different monetary values and different classification assignments will drive different formulaic assetizations. Two different documents or even copies of the same document repurposed by different users might yield different values. This is both confusing but liberating because it enables the accurate reflection of content and context value based on intent, purpose, and specific production utilization. For example, one user might want to assess the ROI and thus clout of the Bin Laden Construction Corporation over the Saudi political structure, whereas a different user might want to trace all sightings and locations of the terrorist. User, role, mission as well as other classifications will rightly drive the monetization of the same documents to different values for these different uses.

DigitalDoors categorization on a conceptual level is robust and supports sensitivity level and the other multitier hierarchical overlapping classifications. These values are counted for all classifications and can be presented as raw values, tearline rollups, document rollup, and selection distribution throughout the user, group or entire organization information warehouses. The frequency counts are assigned a base monetary value. For example, 6 items are tagged as [TS] but rolled up to 4 [TS] tearlines and establishes the overall sensitivity level of the document as [TS]. A group definition (My Group List) could well recognize these [TS] items as lesser [S] or [C] or even [U] and downgrade the outcomes accordingly, and assign lower monetization values. It is a built-in method of weighting frequency counts and assessing semantic meaning.

Likewise, the other active sensitivity levels are also aggregated, although these values are subordinate to [TS] settings until such time as the redacted document is distributed as [S], [C], or [U] variants or delivered as a standard DigitalDoors base document and reconstructed through granular content control. Both sensitivity levels and monetary value for variable content and sensitivity level distributions are fully monetized at a level consistent with and reflective of none, some, or all granular content control.

Note that [U] classification is legally necessary to sustain a trade secret claim. This demonstrates that not all information is a trade secret, that some is merely operational in nature, and that there is a valid and functional distinction between what is secret from what is not. It is not specifically necessary to use these or other labels for tagging value. However, courts typically want to see functional distinctions and a working balance between operational information and trade secrets in order to support the claim for trade secrets. Claims that everything is a trade secret, or claims that that do not include recognition that some secrets are more valuable than others is often a reason that courts dismiss trade secret cases. It is also natural to perceive and gravitate toward a value chain with secret distinctions. Furthermore, differentiation and potential monetary distinction enhances efforts to assess competitive potential and create effective strategy.

In addition, specific keywords are compared throughout the current state of the warehouse for raw frequency, weighted and summarized for all occurrences of matching keywords. Note that keywords support the multitier hierarchical overlapping classifications, with the result that assessments will apply the specific and dynamic classification and classification valuation to each occurrence. This method recognizes static assessment, information lifecycle management, and the dynamic evolving revaluation of information as it relates within information warehouses and the larger strategic organization workflow as legal, financial, and operational agendas advance to reflect new challenges. As information within the warehouses or the strategic mission of the organization changes, reevaluation of information value is automatic and dynamic. This reevaluation can be limited to periodic review or represent an ongoing and dynamic automated activity approaching current information inventory asset value on a continuous basis.

These conceptual values can be static, reflect occurrence frequency counts, or comprise a formula. For example, [TS] can be assigned a fixed value of $20 if that entry appears one or more than once, $20 each for the first and each additional occurrence, or a formula of $20 and $100 squared for each additional occurrence reflecting an increasing focus in value as the occurrence counts increase. The value is variable and is configurable through administration control. Similar valuation is calculated for raw counts, tearline rollups, document rollup, and keyword occurrences for all active sensitivity levels. Weights (0 to 100%) are applied for all active sensitivity levels and for the different frequency counts. The weights determine the relative importance of this conceptual information and its monetary value. The different weights and the user-defined asset valuation functions reflect the best internal understanding of the legal, marketing, and finance groups, and can evolve over time.

It is important to note that this methodology provide relative monetary or risk measurement of trade secrets, redacted [TS], redacted [S], and fully redacted information released for patent filings, copyright filings, or marketing literature. This enables assessment of assetized intangible property, the changes over time to the intangible property including the addition of new information or information leaks that must be published to conform to SOX regulatory compliance.

It is more interesting to view [TS] and [S] in terms of statistical values of scarcity. See the white paper, Classification as Proxy for Scarcity for an analysis of how fuzzy tags can be represented by more exacting numerical values and not just discrete values. Specifically, when information is presented in terms of scarcity, the weighting becomes more useful and more flexible. Frequency counts, or inverse frequency counts in effect representing the scarcity of a particular term, one context from a universe of many possibilities, or an unique concept, become useful to plug into measurement formulae. It is important to note that scarcity is contextual based, and while information might in truth not be scarce, unknown, controlled, private, or secured, its relevance to a situation might be unknown and controlled, thus establishing a specific context for the scarcity and a reason to protect that scarcity.

This extends the discrete limitations of tagged sensitivity levels to a granular range with more flexible values, and certainly more reflective of issues that might be top secret for a specific organization and a current mission but irrelevant and public knowledge to a different one. This problem of reflexivity and security context is address in the white paper, The Failure of Tag Reflexivity for Information Sharing, is resolved by measurements of scarcity and the monetary valuation of information specific to context.

It is important to note additionally that the state of the warehouse changes, more documents are discovered, new documents are included in the warehouses, documents are purged to reflect operational requirements or shifts in competitive strategy. Secured, assetized, can be reevaluated for monetary value. The resulting document value is dynamic and can be automatically updated to reflect these fundamental changes. This conforms to accounting needs to reflect the fluctuating values of IP inventory and dynamic representation of core SOX-stipulated valuation of material organization assets.

The valuation process is simplified almost to the extreme. Only four formulae define the concept for a sensitivity level. This facility does not need to be active. Only a single relative weight defines a sensitivity level. Only four weights define the relative importance of the frequency counts and keyword distributions for that sensitivity level. There is only a single relative weight for each context classification, of which there are six recognized types in total. Weighting dictionary entries is simple, except for the density of acronyms, words, and phrases included in it. The English dictionary contains about one million entries.

However, the value of entries defaults naturally to zero dollars, but as an organization defines acronyms, words, and phrases of risk or monetary value and establishes an entries preeminence through My Group List, specific base values can be assigned. Content frequency value is simplified by a single formula, whether by occurrence or occurrence frequency formula.

In operation with the likely and traditional four sensitivity levels of [TS], [S], [C], and [U] (by default is nothing assigned because it is value-neutral), there are only 14 global weights in three sets that must equal 100%, 16 global sensitivity level formulae, 6 classification formulae, perhaps 10 relevant categories in need of a base monetary assignment, and a single dictionary formula. A typical organization is likely to define 10 to 40 values for dictionary entries and modify this as needed only over time. A person experienced with pro form a spreadsheets or forecasting would understand these formula and weights almost immediately and would understand the opportunity to generate monetary value from intangible information and establish the foundation for creating asset transactions that impact the financial balance sheets and any specific accounts in the chart of accounts. These formulae and weights approximate many of the natural and required virtues for information measurement and the monetary assetization of intangible property for balance sheets assets.

AA.9.4.3 Discovering and Monetizing the Intangibles

DigitalDoors asserts that many intangibles such as applications, data sets, workflows, cultural knowledge, ways of doing business, relationships, reputation, as well as the more accepted trade secrets, patents, brands, and copyrights are expressions of information. See the paper Commonality of Data for an explanation of this concept. The differences between these types of information are material only insofar as legal, financial, and functional distinctions can be made. These differences can be reflected by attributed and properties defined by or ascribed to the information and how the information is expressed as a process, distribution method, service, or product. This assertion is important for monetary information valuation because it functionally simplifies (standardizes) the representation of information. For example, format, structure, and encoding become attributes of risk, purpose, and value. Likewise, content, context, and concept become attributes of information. These attributes do not alter the information in any fundamental way, they just make it possible to evaluate it.

As a result of these circumstances, intangible information is dynamic. Traditional accounting has the tools to represent intangibles as assets but has been slow to adopt historical recording of intangible asset value. SEC unified reporting requirements, FAS regulations, GAAP rulings, international pressures to unify the rules, and the percentages of market valuation reflected by intangibles encourage consideration for assetizing intangibles. In addition, the worldwide pressures to unify intellectual property rights, create uniform and enforceable patent monopolies, and patent rule changes increase the need to recognize trade secrets and provide mechanisms for monetization.

AA.9.4.4 Static and Dynamic

Measurement of the monetary value of information must include both static and dynamic aspects. Measurement must be static for two reasons, reproducibility and integrity. Reprocessing of the same source document in the same time frame should yield reproducible static results. Results that become assetized as a historical functional transaction must have some stability in order to reverse or revise these transactions within GAAP. Financial accounting requires that integrity. However, traditional financial accounting has been unable to bridge the divide between tangible assets and intangible ones even though the predominant value of any organization is now hidden in these intangibles. As a result, financial accounting must advance and include these assets.

The complication is that intangibles do not have a static value. Tangibles do not really have a static value either, but in general that value does not fluctuate greatly. Financial accounting represents fluctuations for tangibles as inventory write-downs, adjustments, depreciation, depletions, and one-time charges. The expectation is that these fluctuations are represented as one-time events. The accounting profession is very conservative, to the point even now within this paradigmic information revolution of managing only 5% of the full value of the organization. Five percent is an interesting number. It is the usual and customary GAAP threshold under which accounting measurements and errors are not considered material. Is it possible, any way conceivable, to conclude that organizations are no longer in control over the true material reflection of the organization market valuation?

Intangibles are dynamic both in raw value and as monetary asset valuations. The fundamental aspect of intangibles is that they are unique. Market valuation with comparables is suboptimal. Valuation is not static because the relevancy and uniqueness is dynamic. A value production method could be enhanced with a new process and lose all existing value because it has been usurped by the newer method. Uniqueness can be undermined by fraud, counterfeiting, exposure, replication, distribution, or information decay. New information could override and invalidate old information, and often does. Mores, market desire, and the fundamental societal state of knowledge can invalidate existing information and render it worthless or be incorporated to enhance existing information or aggregate with that existing information to create new.

To meet the dynamic needs for intangible asset evaluation, DigitalDoors enables the monetary valuation to evolve. The dictionary entries, the organization policies, user assignments, and content, context, and concept weights and measures are variable. These are configurable to reflect any change, negative or positive or merely incidental. However, when these changes are stacked, the power of aggregation, inference, and interaction is clear. The results are automated and reflect the evolution of the information and its purpose or functionality; the user does not have to do anything or do any manual review or adjustments. As a result, reprocessing a document will yield different results over time. This differential can be applied for asset valuation adjustments, such as one-time charges for complete devaluation, periodic depletion, and assignment of transfer value when information is applied to production or production method enhancements.

Dynamic intangible valuations yield a more active importance. Differentials can be delivered as reports, encouraging the strategic direction of business or responses to the competitive climate change. Differentials, reflecting an assemblage of information into new forms or new conclusions represent the opportunity to capitalize on the creation of a sustainable competitive advantage with R&D, product line adjustments, or new organizational direction.

AA.9.4.5 Conclusion

This specific DigitalDoors measurement system and method supports the proxy recognition of ownership, utility, purpose, frequency, source, method, and other significant organizational behaviors and requirements. As such, DigitalDoors values information statically and creates dynamic differentials subject to attribute perspectives and reflection of internal or external systemic changes that occur over time. In addition, this method recognizes static assignment, information lifecycle management, and the dynamic revaluation of information as it relates within information warehouses and the larger strategic organizational workflow as legal, financial, and operational agendas advance to reflect new challenges. The resulting monetary value of intangibles and intangible information provides insight into the state and direction of business. Monetary information valuation is an important strategic, legal, financial, operational, and managerial concern especially when 95% of organizational value is reflected by intangible assets. Intangible valuation should not be overlooked as incompatible with conservate and traditional managerial accounting techniques. It becomes essential to assign monetary value to information so that it can be integrated within the strategic and traditional roles for managerial control to bridge this divide and reflect the fundamental changes brought by the information revolution.

AA.9.5.0 Assetitization of Intangible Content

Intangible assets must be discovered, recognized, measured, and expressed as a viable monetary value and accounting asset entry. When intangible assets become commoditized in this way, they can be managed and manipulated, and produced and delivered like any other tangible Assets. When 95% or more of our economy is hidden in intangible value or reflected as an estimate market valuation markup ratio over a book value, there seems to a significant failure in the representation itself and the functional accounting processes that create such semantic, economic, and functional disparity.

This disparity is clearly a business opportunity. It is, in fact, a strategic sustainable competitive advantage that should be exploited to create wealth, a means to stave off global commoditization, and new barriers to market entry. Many assets are presumed to be public, free, available to anyone able to take and utilize them, whereas in fact they are part of elusive capital markets and complex production processes. They are not free unless the default is to ignore them, their value, and their potential to create intellectual property.

Part of this complexity is establishing how an asset becomes definable and can be separated from innate built-in ownership so that it becomes transferable to others, to other parties, to be included in wealth production processes, or sold. When assets are captured and ownership is then asserted, they become property, critical data property, intellectual capital, systems and methods, proprietary and confidential, copyrights, and court-established trade secrets. This capture process is called the assetization of an intangible, whether that intangible be a characteric asset, intellectual capital, functional organizational procedures, or formal intangible information assets like copyrights, trademarks, patents, and trade secrets.

AA.9.5.1 Definitions

The capitalizations of asset (generic) and Asset (functionally specific) is purely to differentiate a generic from the more specific formal accounting definition only within this white paper.

An asset is any resource, facility, characteristic, or trait of value. Such an asset is an innate property that is difficult to transfer to another person or party. An asset is any useful or valuable quality, person, or thing. It is an advantage or resource. For example, "she proved herself an asset to the company." It is a valuable item that is owned. It is a spy working in his or her own country and controlled by the adversary that provides results of unknown quality, quantity, and duration before exposure. An asset clearly has an intangible jeune se qua lacking clarity and definition, a clearcut valuation or measurement basis. It is a value without value, a product or service without standardized categorization and evaluation. Such an asset is difficult to transfer or sell to another party.

An Asset is a resource controlled by the enterprise as a result of past events and from which future economic benefits are expected to flow to the enterprise, as defined by the IFRS. The probable future benefit (NPV or net present value) involves a capacity, singly or in combination with other assets, in the case of profit-oriented enterprises, to contribute directly or indirectly to future net cash flows, and, in the case of not-for-profit organizations, to provide services. An Asset is the entity that can control access to the benefit; and, the transaction or event giving rise to the entity's right to, or control of, the benefit has already occurred. Similarly, in economics an Asset is any form in which wealth can be held and transferred. It is any item of economic value, especially that which could be converted to cash.

Examples of formal Assets are cash, securities, accounts receivable, inventory, office equipment, real estate, a car, and other property. On a balance sheet, Assets are equal to the sum of liabilities, common stock, preferred stock, and retained earnings. From an accounting perspective, Assets are divided into the following categories: current assets (cash and other liquid items), long-term assets (real estate, plant, equipment), prepaid and deferred assets (expenditures for future). Equity is a special Asset denoting the residual the value of Assets after all outstanding demands are met that defines the monetary property left to shareholders or owners; it is the remaining book value.

Realistically, an asset is a resource lacking management while Asset is under management. The process to manage an asset is not much different than creating a categorization for such a resource. This enables choices, accumulation of like or related assets, consolidation of assets necessary to a project or production process, and a structure to measure the value of an asset or its contribution to productivity. When such an resource is assetized, this enables the asset to have monetary liquidity, handles for functional utility, and an entré into standard organizational practices.

AA.9.5.2 Conclusion

In conclusion the world must bring intangible assets into the same financial accounting management environment as more tangible items so that they can be developed, traded, and exploited for the greatest ROI or EPS and recognize that if security has any ROI, its immediate value is trivial and short but it has a very long tail that can amount to a lot of monetary valuation. More than that, the world also needs to discover and recognize potential assets to create long term value as capitalized financial assets. Capitalization of assets aside, distinction is essential in this competitive world, and the conversion from intangible asset to tangible balance sheet asset entry is a real business opportunity, with DigitalDoors assetization as a significant formal basis for conversion of intangible information into formalized property of great value.

AA.9.6.0 Attribution of Monetary Value to Information

The big question is the worth of information. There is no one answer, no static value, and no common etiology for this. Information valuation and monetization is mostly relative rather than absolute because it is contingent on a large number of important but reflexive factors. The academic literature asserts that this value is significant and increasingly important. In fact, government commerce reports establish the market value of organizations is overwhelmingly comprised with intangibles (60 to 95% of the market value not collateralized by recognized hard tangibles).

(US Commerce Department 2005 Market Report.)\

Similarly, studies show long term capital investment in intangibles is ten times greater than investment in tangibles as businesses shift from production methods that are completely industrial to ones with increasing informational content (US Department of State, Capital Expenditures and Investment 2007.)

There is also a serious but unresearched area of the time-value of information and its distribution of value. Specifically, information might have little current value but a long tail of value as time goes to infinity. This certainly would explain the limited return on investment (ROI) or contribution to EPS (earnings per share) for security or the general inability to forecast one. Traditional security protects infrastructure and equipment with a short half-life and little to address information risk. Perhaps the distribution of this information risk explains the current attention to perimeter barriers and point solutions.

However, the literature is curiously lacking in detailed methods for assetizing informational value. IAS and FASB accounting policy assert the predominance of intangibles for capital production but struggle to codify the assets and processes into a balance sheet monetization. This is probably because most factors are relative rather than absolute. Factors such as volatility, productive life span, and alternative market assessment adversely undermine these efforts. Furthermore, the application, workflow, granularity, ownership, stewardship, and security of information increase the perceived variability so that conservative finance experts are unwilling to embrace assetization of intangibles. There is a firm recognition for this philosophy but only a weak commitment to date.

AA.9.6.1 Monetization

The issue is not what, but when and how. DigitalDoors answers the when—now—and the how—through granular content analysis of content, context, and concept—as part of the DigitalDoors Secure process. It is also automated so that large data warehouses can be uniformly tagged, assessed for related value, and aggregated into portfolios. A viable automated process accelerates acceptance and commitment.

Many aspects of knowledge discovery, security, and information sharing, as well as intangible valuation is predicated by a uniform process. This process includes the steps for discovering the location, source, method, scope, depth, purpose, time, ownership and custodianship of information and creating a granular content taxonomy for granular content control. DigitalDoors expands unidimentional data tagging into a far more robust space. This etiology also provides the basis for assessing a functional value for information. It is equally true for all other types, formats, and structures of data. DigitalDoors is cognizant of the complexities to how information applies to workflow.

It is important to recognize that assessing a functional value for information is not simple nor straight-forward. Information value depends on access, usage, and opportunity. Multiple values can and do exist for the same things, all of which are contingent on perspective and applicable to different circumstances. For example, identity information is often valueless to its owner until there are problems that prevent normal financial activities, while in contrast, this information holds unlimited value to a criminal who can use it to create malicious trust scenarios. These alternative contexts create asymmetric values, zero to its true owner, unlimited to someone else leveraging it. DigitalDoors fully allows the recognition of these alternate asymmetric and competitive values, as well as their aggregation into a representative risk/benefit portfolio for an assessment of internal, external, market value, and leakage values.

Internal value is as likely as external value, as is value derived from market forces or net present value of anticipated cash flows. Static value, and even value based on a single utilization, is insufficient to establish any real data value that could include its acquisition cost, its contribution to gross profit, or its risk value when exposed to the wrong parties. For example, a trade secret defining a production process might contribute to the gross sales volume whereas the exposure of this secret could completely erode the value to the going organization. Thus, if the contributory value is 10% of gross sales with 50% profit margin in an instrustry that values business with 6 times multiple on income, this factors into an overall 30% market value of the business. However, the leakage value is 100% market value of the business. The trade secret example has two reflexive values, one a contribution value and one a risk value established through competitive leakage; they are not equivalent and differ greatly.

DigitalDoors clearly shows that information is not a closed set and therefore has value dependent on external factors such as perspective, reflexive value, time frame, relevance to other data sets and inferences. Furthermore, information can be roughly partitioned into elements of content alone, context, and concept, each of which establishes a basis for value alone but also additional value in conjunction with these other aspects. Clearly, there is no simple, linear, or independent function to assign value.

AA.9.6.2 Contextual Conflicts

The value of information is curiously cumulative. Ten instances of a word or phrase reinforces the context or concept or its relevance to a target of interest. Perhaps one is more value than ten, or perhaps only one indicates a random or non-causal connection that diminishes relevance. Sometimes, the real point is not even mentioned specifically aloud, but is nonetheless there is concept. In direct contrast, instances are not random and information is not gathered randomly and fairly. Therefore, cumulative instances are not always inferential and can also play against the system. This is obvious with techniques used for search engine optimization (SEO) when known words or phrases of value are inserted into titles, initial paragraphs, or hidden metadata (like comments) to taint results for a conflicting agenda. This is called key or keyword poisoning and it requires defense for all categorization and valuation operations.

The same holds true for all aspects of information valuation. This is also in evidence as incentives are used to encourage information sharing. People have a personal benefit to overstate the value of information under their control and so enhance its dissemination. This has the adverse and perverse effect of making the information less valuable. DigitalDoors has noted elsewhere that the basis for sustaining information value is through rarity, security, and granular content control.

AA.9.6.3 DigitalDoors Methodology

DigitalDoors recognizes this complexity for valuation and has defined information within semantic groupings. This includes dictionary entries (acronyms, words, and phrases), unknowns, and user-defined and situationally-dependent entries. DigitalDoors recognizes more complex semantic collections of entries that are combined into a group, a category, or a policy, akin to latent semantic content. However, this amorphous concept is definable in terms recognizable to the ordinary person as targets of interest through groups, categories, or policies. It is a practical and functional simplification that extends into a useful valuation system. It is also the basis for successful efforts to model physical observations with gaussian normal or logarithmic distribution functions.

DigitalDoors has therefore defined these simplified categories for valuation, and for each is represented by a fixed numerical value and an algebraic functional value. Both can be used simultaneously or a choice of one alone. It is a matter of setting active values. This means a numerical value must be non-zero and a functional value other than "not defined".

Blank entries are explicitly replaced as "not defined" automatically. The value designation could be USD, EUR, 'info monetary units', or any other basis.

Gaussian distributions reflect natural distributions in the real world. Although the concept is simple, the equation is a power of e and is a complex and unnatural construct. Simple equations do not always yield simple or correct results. If this seems complex—the process of modeling distributions, displacements, values, and rooting the results into some intangible value reality DigitalDoors will work with you to understand modeling and to craft sensible equations. Note that the process allows for notations explaining the equations that can be as functionality utilitarian. For example, one equation could be defined as the equation to reflect a high value for 8 to 12 instances and limited or no value for 1 to 7 instances or oversaturation above 12 to minimize the effects from keyword poisoning.

The current implementation of monetary value and monetary value functions is applicable to dictionary entries, such as My Group List, My Category List, My Policy List, and all sensitivity level tagging. The structure for assigning monetary value and monetary value functions is identical throughout DIGITALDOORS. It is the same structure and forms to assign value for dictionary entries, sensitivity levels, tearlines, groups, categories, and policies. It is also granular, so that values can be seen for each aspect and aggregated into valuations reflective of content, context, concept, single entries, tearlines, or complete documents.

Aggregation is supported for both raw and weighted and filtered sets, and additionally accessible for seven types of granular content control accessible by user selection of a selection bar.

For example, an internal manufacturing process would not register as a HIPAA or GLB value because it is not semantically relevant to those policies but it would register as a trade secret process and as a leakage risk. All semantic groupings are completely configurable for each organization through administrator access. Semantic titles are arbitrary with representation and context arbitrary and fully configurable to the needs of the organization. DigitalDoors does not impose weights or basis.

This granularity is applicable because a document with 10 instances of "bin Laden" valued 0 for each "bin Laden" does not preclude a more complex semantic assessment of value when "bin Laden" appears with named terrorism allies, certain location venues, and other linked high-value targets or material through any or all of My Group List, My Category List, or My Policy List semantic classifications. Value could be both a fixed monetary value and a function, or just one of these for each semantic classification. This filters simplify loading of a document with a more fine-tuned comprehension of its value. This facility is available for groups, categories, and policies, as noted previously.

AA.9.6.4 Weights

Any arbitrary data stream is not completely content, nor will it be completely concept either. Some, it also likely to reflect context. As such, all monetary values (except the raw composite values) are weighted to 100% with a split between content, context, and concept. The administrator establishes this distribution. Monetary value is aggregated through various semantic assessments, and this weighting is one more control against single factors skewing or user explicitly tainting the assetization process.

Both sets of weights are in force simultaneously so that it is difficult for anyone, or any process, or any source, or any method, to skew monetary values in any other but an unbiased and fair method.

The application of sensitivity-level weights and categorical weights is also useful for scaling results into the realm of reality. First attempts at valuing documents either generates a portfolio with a value this a fraction of any acceptable range or set values so high as to be laughable. This science requires some judicious application of values and weights to create ranges that are practical and realistic.

AA.9.6.5 Hierarcharchial Assignments and Enhancements

The large basis dictionary with nearly 1,000,000 entries is unwieldy to manage one word at time. Additionally, additions of new words, imports of foreign languages, and infusion with entries specific to an organization means an enormous amount of setup. Efforts are underway to respond to user requests to create enhancements for setting monetary values based on hierarchical relationships and sensitivity levels. This is likely to include the uniform setting of all entries reflected by a policy, category, or group, or the valuation of individual entries as a function of the multitier hierarchical overlapping tag structure.

AA.9.6.6 Conclusion

In conclusion DigitalDoors answers the when—now—and the how—for intellectual property monetization and intangible assetization through granular content analysis of content, context, and concept—as part of the Secure process. DigitalDoors provides methods to value the parts of the whole, the whole of the parts, subsets of parts, and the semantic value of relevant aggregations and inferences. There are many complex methods for measuring the value of information in both linear and more asymmetric methodologies, but the inclusive and exclusive configurable basis of a monetary value with a function offers enormous flexibility.

DigitalDoors continues to explore the finer aspects of meaning, both absolute and relative, contextually based, as a wealth generation process and also as a leakage risk assessment. Valuation is always specific to need and intent. A valuation system should be robust enough for any legitimate goal. As the need for simultaneity of both value and risk is better understood, DigitalDoors is likely to expand monetary calculations to include new outputs and reports beyond the nine currently available, perhaps including simultaneous multivariate evaluations of value for profit generation and contribution, competitive leakage, and privacy loss. DigitalDoors is also working to integrate the data feeds and data streams into portfolios of value that reflect the aggregation of patents into portfolios and accumulation of trade secrets into a coherent body of knowledge and sustainable competitive value. It is not a merely the matter of assessing the need for recognition of the functional and financial value of intellectual property and intangible assets but also the methods and automation of these methods to effect any viable change.

AA.9.7.0 Information Lifecycle Valuation

After an intangible information resource has been discovered, classified, connected with other like information, planning for its exploitation begins with expectations for its assetization and capital generation.

Important Questions Include:

TABLE

| Questions for valuation of capital generation |
| --- |
| What type of asset should it be or classified as? |
| What are its acquisition, development, and legal or organizational costs while bringing the information to market? |
| What are anticipated revenues? |
| How long with the asset be productive? |
| What can be done to increase its net present value? |
| How can the return be exploited sooner rather than later? |

TABLE-continued

Questions for valuation of capital generation

It the intangible security-sensitive and how can it be protected?
How long can it be protected?
Can its lifespan be increased?
Is it likely that competitors will develop a better trade secret or patent and when will it erode the market for this asset?
What happens economically if our trade secret is leaked or reverse engineered?
What happens economically if a patent is reexamined and current licensing payments are suspended?
What happens if generics do not violate a patent?
If the expected lifespan more condusive to a patent rather than a trade secret?
Can a trade secret format be maintained realistically for the expected lifespan?
Is the rate of return better as a patent, trade secret, or other intellectual property?
Is the intangible concept abstract enough to withstand attempts to infer its secrets or legitimately reverse-engineer it?
What development paths might generate spinoff patents or trademarks?
What is a reasonable assetization value?
What is the likelihood of portfolio creation?
When will the separate portfolio assets affect the value stream?
What is the valuation of a portfolio of such assets?
What is the asset NPV?
What is the asset ROI?
What is the asset contribution to EPS (earnings per share)?
What is the asset IRR?
What is the rollup of the asset value stream?
What inflection points, deviations, or cusps jeopardize the modeling?
How sensitive is the results to minor or sudden projection changes?
What happens when the accounting assumptions are restated?
How stable is the value stream or sensitive to risk shocks?

DigitalDoors has (built) an information lifecycle management valuation tool derived from its internal methodology, the ILM Evaluator, to automate this analysis and answer these questions. This tool performs economic simulations and ongoing monitoring of intellection capital and property.

1. ILM Evaluator integrates with the DigitalDoors ILM Asset Database (as generated from DataHound search tool) to define the management characteristics of the intangible asset. This includes name, type of asset, potential utility, etc. . . . (see S&M description of the ILM asset database). This basic template is saved.

2. A cash flow template is generated, either a generic projection or one more precisely defined by the asset database details or prior organizational experience. This projection shows initial sunk costs, current R&D costs, project R&D costs, legal expenses, plus a cash stream associated with either internal exploitation or external SPV licensing streams. See the SPV model for overhead and cost templates.

3. A time scale is created that establish a base time frame including birth date, current cycle date, decision points, lifespan. The granularity of the time scale is set (as days, weeks, months, or years.)

4. Overall range and scale values can be set to establish the overall shape, profitability, relative monetary valuations to the simulation.

5. The user now manipulates the model data control values. They include . . . . These are stored in a grid of financial values that is modifiable and dynamic. The grid is basically a spreadsheet of time/value financial data. Model attributes are defined separate by menus, lists, and settings. These include lifespan, time until income, type of asset, market disruptions and events, sensitivity of resize settings, valuation scale basis, change sensitivity level . . . . The user also can manipulate the grid values mechanically by a mouse, touchscreen, or similar input device by deflecting the cusp points or resizing the physical representations of the financial values in the grid. In order words, the user can change the value in the grid by elongating or shortening the time value bar graph associated with the particular grid entry with hand pointer. Recalculation is immediate (or can be disabled) for NPV, rolled up cash value, IRR, ROI, breakeven, etc. . . .

6. The user can insert events that represent cusps, inflection points, and unexpected market or legal deviations. This can include loss of asset, exposure of secrecy, patent reexamination, patent revocation, court decisions, adverse market events, depreciation or depletion of asset value, asset value revaluation, total asset loss, etc from a dropdown list of standard and user-defined events. Effects of changes to asset valuation are reflected by immediate recalculations. This values are reflected in the grid as well as the graphs and color-coding of the bar graphs and rolled up current asset valuation.

7. Data values are saved. Actual observation data can be added to the grid to contract forecast with actual experience, generate deviations from expectations, and forecast future values based on adjustments to the initial forecast.

8. Deviations can be generated to use as accounting adjustments to restate financial reports.

9. What if scenarios can be applied to base forecast, observational data, or forecast from observational data, to generate alternate outcomes. These results show deviation from base forecast, sensitivity of the model to shocks, or several different scenarios can be combined to compare against the base forecast to generate alpha and beta values for establishing a statistical integrity and overall risk of the simulation.

10. A risk profile of likelihood for each deviation scenario can be constructed and applied against the ROI, NPV, IRR, etc for scenario to establish a weighted mathematical forecast.

11. Actual accounting data, as generated, can be automatically matched to the appropriate model to generate actual deviations from forecast with reports showing the observed change from forecast. These reports can be routed as defined.

12. Preclude and indicate false assertions or workflow choices, such the attempts to assert a Trade secret after filing a patent.

13. Lockout assertion of trade secret where legal basis precludes secrecy (as with drug development and approvals)

14. Invoke DataHound or manual efforts to explore for prior art locally or externally (offline).

A. Multiple simulations can be overlapped and aggregated into a portfolio showing cumulative valuations, aggregated portfolio risks, long-term expenses and asset valuation.

AA.9.8.0 Security Gaps: Binding Infrastructure with Process with User with Data. The Need for a New Intangibles Production Model Traditional security utilizes firewalls, logins, role limitations, multifactor biometrics, digital signatures, and encryption. They are expression of perimeter control. If these technologies would work, security would be no problem. If variations on the themes of existing techniques and compilations of existing technology would work, security would not be an issue. You would not need this white paper.

Apparently, security is a problem. We are unable to respond to the exponential growth in security lapses and exploits. There are so many of them, so many more of them as we shift to an intangible economy, and an explosion of combinations as the complexity of infrastructure and process increases while the amount of users and data grows exponentially. A reactive response is too little too late while falling further behind the known persisting problems. Gaps pop up undermining newer business models and become known even as preexisting flaws are exploited. Gaps are everywhere, and because they are all seem individualized and unique with no threat of commonality, security implementation is specific rather than patterned on some fundamental overarching paradigm.

Infrastructure is exploited. Process is exploited. Users are exploited. The data is an input and derivative of the infrastructure, process, and users, and it gets exploited. We patch infrastructure and get a data leak, user exposure, or a process failure. Security is applied to each new problem separately with an every accelerating lack of effectiveness. There is no single model for security that currently binds together the infrastructure with the process and users with data. There are massive and growing gaps in our attempts to plug the perimeter, fix the flaws in the process, protect users from fraud of many types, and retain the data that is making the information revolution possible.

Here are some reasons why security is broken. You have probably heard that security is a process and not a technology. It is a rationalization why security fails and why more security effort is needed. This is not really a legitimate explanation but more of an excuse for our failure to recognize an overarching paradigm. Realistically, the classical (Marxist) production model that forms the basis for wealth creation has changed. The agricultural model has given way to the industrial one, and even that has changed into the information model. The inputs, production methods, and outputs that represent wealth have changed and become more concentrated and amorphous. Three points seem critical to this social revolution. First, the production model is different. Second, the inputs and outputs are different. Third, wealth and its format is different.

These differences alter the social structure and the methods for producing (and retaining) wealth. They also alter the infrastructure required to protect this wealth. Security is no longer about wealth on the hoof, in the ground, or in a warehouse. Rather, wealth is significantly different because it is represented by the intangible property of money (as a proxy for tangibles) and increasingly by information. Information is significantly different because this intangible property can be used without even using it up, exchanging the principle basis, or trading it.

The whole and sum of the parts of information are not the same, leading to opportunities for aggregation, inference, and interaction, creating derivatives in wealth likely greater than the whole or the sum of the parts. Information alters the multiplier effect of the production model, and security for infrastructure or the process does not reflect the absolute need for security for these parts. Information can be used, multiplied, or copied so long as the legal ownership, custodianship, and uniqueness is preserved. Like all things intangible, protection for the status, availability, reputation, and accessibility is everything. This is an expansion in information that requires an expansion in protective security, not addressable through traditional perimeter-based methods.

Previously, security was legitimate when the range, the livestock on the range, the produce in the fields, or the processed product in the warehouse were protected within that perimeter. Perimeter security worked with gaps addressed by brands and stamps for ownership. There were just a few gaps in the perimeter, and there were resolved by intuitive ad hoc one-for-one solutions. For example, stamps for items produced as commodities or in enough multiples are differentiated by serial numbers, and serial numbers provide controls when product is distributed through this perimeter. When the perimeter was not sufficient to prevent insertion of virus inside the perimeter, antivirus tools augmented the gap through the perimeter. However, these gaps are not few, and they are not staying at a few. These gaps overwhelm any stability of perimeter security or a rational expectation of reestablishing a viable security perimeter. Production no longer occurs within any semblance of a sustainable perimeter. Just-in-time production, complex products and services, subassembly through a distribution organization of keretsu, and outsourced raw materials create an infrastructure exposed to threats without rational expectation of an implementable perimeter.\

The production process itself has changed while inputs and outputs are changed. The production process is no longer monolithic, because the efficiency of the process is driven by multiplier effects and the inputs are catalysts which might not even be used up. These multiplier effects and catalysts are intangibles, generally information in the form of restricted knowledge. For example, the information necessary to create marquis-label car is not used on other cars and can be used again and again without substantial loss. Were this information or production process to be stolen and used by another manufacturer, this would constitute a breach in protection for the status, availability, reputation, and accessibility of this intangible information. This is called infringement or theft of trade secrets, where the marquis, trade secrets, knowledge, multiplier effects, catalysts, and data are all valuable forms of intangible information.

The production process includes such modern services as extended credit card credit transactions to make a purchase at a retail store or over the Internet at an intangible store. The purchase could be tangible, or increasingly the purchase could itself be a service to perform some result or simply be the delivery of a software application, necessary data, or a MP3 song. The delivery of intangibles from an intangible store, produced by intangible manufacturing processes, paid for with an intangible service payment creates the very difficult problem of securing an infrastructure with embedded processes with unseen merchants and buyers using data that is intangible. There is not even a good model to define this infrastructure or string of loosely-coupled processes, let alone provide a unified view to effectively espouse a security model. No wonder why there are gaps in the infrastructure, gaps in the process, and scurrilous breaches that leak data.

Because this production process in this new information revolution is not easily or even remotely confined within a perimeter, a process, to a defined set of vetted users, or even within a consistent set of data, the traditional security methods with perimeters, logins, role limitations, multifactor biometrics, digital signatures, and encryption simply do not work. There are just too many gaps and every variation is different enough to preclude a one-for-one event security solution. There is no location similarity, no repetitions, no exact processes that are consistent from event to event. Furthermore, compilations of events create unanticipated channels for losses of both tangible and intangible value. Not only are patches ineffective against the purported gaps, frequently these patches combine to create new risks and threats or undermine the functional integrity of the infrastructure and break processes.

However, these processes and the encompassing infrastructure have self-similarity. The patterns are necessary for automation and the expansion of the evolution in this information revolution. Without these patterns, there could be no self-service, no automation, no computerization. These patterns are becoming increasingly complication and interrelated—and the recognition of these complexities—also open unanticipated channels for both losses of both tangible and intangible value.

This is a situation with exponential growth in the volume of business, exponential growth in the complexity for manufacturing of the product or service, exponential growth in the delivery process, and exponential growth in the complexity of the intangible infrastructure.

The relevant patterns are bigger than retail versus manufacturing versus financial process versus service. The patterns are production processes reflected in the simplified classical production model. Retail is a production process. Manufacturing is a production process. Financial creation is a production process. Service is a production process, whether washing a car, delivering a package, or fixing a computer. Inputs of labor, capital, and knowledge drive a manufacturing process creating the outputs of products or services. Knowledge is a multiplier on the efficiency of the manufacturing process. Often this multiplier is a trade secret, a patent, or specialized knowledge that sustains a competitive advantage reflected in higher prices, lower input costs, lower production costs and efficiencies (including byproducts), or a monopolistic exclusivity on the outputs.

This production model can be reflected by a workflow, drafted as a blueprint, and reduced into a data set. The production model becomes the expression of the data set. Variations on this theme are variations in the expression of the same data set. Of course, we do not have a 'simple' production model; it is extended with information inputs as source, the outputs of information as product, service, or byproduct (and waste), and the efficiency of the production process is moderated by the multiplier effects of knowledge-driven enhancements. The tangible aspects of the 'simple' production model are almost mute, and soon irrelevant. Only data alone will represent a differentiating and critical component of the production process.

The fundamental pattern becomes the data. Effective security is applied against that data rather than the expressions of the production model. The infrastructure and process, the users and the incidental derivative data are reflections of the fundamental data pattern. Because there are so many variations, so many different expressions, we are reacting to an infinite expression of these security flaws. If we see the pattern as the data and apply security to that pattern rather than the infinite expressions of the data, we are changing the security paradigm and actually have a chance to plug the security gaps with a unified method. Infrastructure, process, users, and the data we process for the users, the process and within the infrastructure are incidental to the data patterns that are relevant to a paradigm security model.

Security can be designed to respond to these new patterns of complexity, the compilation of events, and the preexisting defects in the infrastructure and process. Reactive response is too little too late.

We are not producing commodities that are identical, delivered identically, for identical people, and made from identical inputs. We are producing within a bigger structure of patterns, and it is these patterns that provide a hope for defining and implementing security. For all the apparent differences, there are important self-similar patterns which enable a new model for security.

The self-similarity of the infrastructure, the process, the users, and the production inputs is the intangible data itself. The information revolution is about the information, the data, not the physical things that enable it or that are expressed from the data. If we want security for this revolution, we must protect its basis. That is information at every level. Infrastructure has a basis in data. Process has a basis in data. Users are represented by data. It is all data. While we sit at keyboard in front of a computer and display that connects to a network and the larger Internet with virtualized processes and storage, every tangible entity is an expression of the data path and geared to the creation, differentiation, and retention of that data.

Everything is represented by designs or data. Even the designs are expressions of data. Even a tangible product like Lexus is a reflection of a Toyota vehicle with a different marquis that is expressed from data. The production process is a controlled just-in-time workflow where data indicates the types of vehicles, its color, and its options. The Lexus and Toyota vehicles are different at an intangible level, one is high end and the other not. Yet they are the same and produced from differentiable patterns based on different data. They are self-similar and routed from the data-driven production of inputs of material and intangibles into parts that are controlled by data into larger subassemblies, assembled through information-driven process.

The transactional and delivery processes are self-similar too, even for products and services as diverse as vehicles and songs. Sales of a vehicle requires payment and/or credit transfer. Delivery of vehicle—and it matters not whether it is a Lexus or a Toyota—is based on a target delivery location. Effecting that delivery could well require a train, a ship, and a trailer truck. A communications channel arranges the separate physical steps. Sales of an MP3 song requires payment and/or credit transfer. Delivering that MP3 song also requires a target delivery location, although delivery is direct by a communications channel but it could entail creation of a personalized CD or DVD and delivery by FedEx. Scope, scale, and legalities separate these two transactional and delivery processes without breaking the self-similar model.

However, the point is that the intangible reduction of the transactional and delivery process is data. Payment and target delivery data is one type of data and it is self-similar to design data, production data, and all other types of data. Structured and unstructured data are the same. Attributes distinguish one from another, but the recognition that all is data, and all data is a reflection of data establishes a baseline for applying unified security proactively and universally. Dissimilarities in data structure, format, encoding, presentation, markup with tags and XML, or impression into a relational database are details of data not relevant to perceiving data as the fundamental building block for security. Is not that data is different—of course it is different—but data is the uniform target for applying new methods for security and at the data level itself rather than at any levels resulting from the expression of the data. It becomes infinitely harder to protect a blueprint as an expression of data rather than the data itself that becomes the blueprint. It becomes infinitely hard to protect a manufacturing process defined as a trade secret rather the data that expresses the trade secret that enables the manufacturing process.

In other words, security is not symmetric. We can protect the data. We can not protect the expression of the data once expressed in all its myriad forms. We can redact the expression into data and protect the data. All traditional security efforts have sought to protect the expression of the data, the infrastructure, the equipment, the computers, the communications, the workflows, the process, but the very variable and infinite variety effectively precludes security. Obviously perimeter security and point solutions provide protection one-for-one against designated threats. These solutions might even be simple, cost-effective, intuitive, practical, and desirable as a first-level defense. However, they do not scale to existing expression of risk and threats or the accelerating level of threats expression with integration, increased complexity, and the fundamental loss of a definitive perimeter. Security can be provided to the data but absolutely to the reflections of the data, not to expressions of the data, and not to the infinite variability of its process.

For all the apparent differences, there are important self-similar patterns. All these patterns are expressions of data. Security is failing at the tangible level of traditional security utilizes perimeters, logins, role limitations, multifactor biometrics, digital signatures, and encryption. The data is seen as the subject of actions rather than as the fundamental substrate. Data is not derivative. Data is fundamental. Data is where security starts. Data is where the new security model starts. Protect the data to protect the expression of data, but do not expect to protect the expression of the data once expressed from the data.

AA.9.9.0 Intangible Trade Secrets

Information security is usually abstract, a potential, or something that happens to other people. Information security is often a stepchild to the perceived reality of getting the job done. Potential is not reality, just the possibility that something can go wrong, an abstraction without existence until something goes wrong and it is too late because such losses are irretrievable. As a result, information security is not taken seriously, is not part of the budget, and is not perceived for the competitive advantage that it really provides.

There is a powerful example worth considering, the 120-year history of Coca Cola and its perpetual battle in information security to preserve a trade secret, the recipe for the syrup. Merchandise 7x is the purported "secret ingredient" in Coca-Cola and has apparently remained a secret since its formulation in 1886. Coca Cola is not an abstract potential; this company exists primarily because of the value of this intellectual property and the ongoing security of that recipe, and represents the growing value of content in modern products and services. The continuity of the Coca Cola is dependent on the security of the intellectual property, and in particular, the control over that information. It is a competitive advantage. This is an example of the value of information for continuity, and explains why we cannot be complacent over security, in particular the security of logical and digital information.

AA.9.9.1 Background

The Coca-Cola formula is The Coca-Cola Company's secret recipe for Coca-Cola. As a publicity marketing strategy started by David W. Woodruff, the company presents the formula as a closely held trade secret known only to a few employees.

Apparently, the secret defined the raw ingredients, the method of production, and the ratio of ingredients that define the characteristic flavor. Diet and other special products vary slightly in taste, as do copycats. Although reverse engineering and taste tests over the years have evolved, the uniqueness of Coca Cola is still perceived by the marketplace and customers worldwide.

Regardless of the truth, and professing that extent recipes are not the real thing, is sufficient to claim trade secret when other efforts are made to preserve the secrecy of that trade secret. The trade secret is part of the culture and represents a clear signal to other organizations that information and secret recipes or systems and methods not published or patented are clearly an integral component to most products and services and deserve the type of protection honed by Coca Cola.

Efforts to protect the legality as well as the actuality of the trade secret go back 120 years. Only two persons at a time know the formula. The written version is stored in a safety deposit vault at the Trust Co. Bank in Atlanta Ga.

Secret formula, trademarks, names, and market protection separate from competitors Pepsi and Royal Crown, as well as house-label cola knock-offs.

The formula is mixed into a syrup, a highly concentrated mixture of flavors, which is mixed only in five production facilities throughout the world. This is then distributed to local bottling companies to mix with carbonated water and other minor ingredients, to ensure that the secret is kept very tight.

AA.10.0.0 Introduction to DigitalDoors Dictionary

The definitions herein are used throughout DigitalDoors patents, white papers, marketing literature, and user manuals. The definitions describe DigitalDoors meaning, usage, and intent. These definitions differentiate the DigitalDoors s processes from any prior, similar, or developing art. Lower-case terms represent generic usage whereas capitalized ones denote formal glossary references to common expressions.

In many cases, the recognition of information as an asset and the processes to discover, classify, and control it requires an entirely new vocabulary with explicit definitions, including some new words. Other researchers are discovering the possibility of granular content control for security applications, although use similar words and phrases but with distinctly different meanings. Because generic definitions or even public ones, like Wikipedia, do not always convey operative and technical preciseness, these definitions are included for precision and relevance to knowledge management, data security, and information sharing. The Digital-Doors literature and our personnel deliberately use these terms with these meanings to establish a consistent lexicon. These meanings do change and they are updated as needed.

keywords: glossary, dictionary, lexicon, classification, categorization, taxonomy, ontology, definition, term, meaning, explanation, index, key, keyword, surrogate key, content, concept, context, semantic content, information control, granular content control.

Access—The process or event to get into a computer system, service, or network, by dialing a phone number, providing a password or token, logging on a network, such as the Internet, to retrieve data or use services.

AA.10.1.0 DigitalDoors Dictionary

Below each keywords of the dictionary appears the definition:

Access Control

A system or network function that determines whether the user of a particular resource or process is permitted to employ that resource or process.

Adjacency—List Model

A method for showing the expanded drill-down hierarchies in generally normalized data that consisted of a column for the primary reference key and another column for the secondary data in the relationship. It is a direct implementation in a table of the Adjacency List mode of a graph, but note that this structure is not normalized. This structure is relevant for establishing social networking relatedness. See also Betweenness, Closeness, and Connectedness.

Aggregation

The process of pooling information or data mining to construct a profile that can identify an individual, reveal hidden sources and methods, or otherwise breach the integrity of categorical security by discovering other inherent informational taxonomies, ontologies, or contextual associations.

Air Gap

A method for security enabled by lack of connectivity, lack of workflow integration, or the sequestration of sensitive information from normal business processes. It is the literal space created surrounding the perimeter of the resources of interest preventing functional access; this space is not bridged with communication channels and access is ad hoc but scrupulously controlled. See also silo.

Anchor

1. An indicator of an object so that its position relative to some other object remains the same during repagination. 2. The name of the HTML code used to specify a reference to another document.

Anonymity

A method, desire, or process to maintain personal, business, or organizational identity without releasing it to others.

Anonymized Data

1. Data stripped of all personally identifiable information (PII) by safe harbor categorization. 2. Clinical, provider, insurance, or operational data pooled, aggregated, or otherwise accumulated without personal information to render the data still useful but supposedly without sufficient designations to reidentify the individuals represented. This technology is often used to protect the identities of participants in medical studies or other research, but nevertheless this often fails to anticipate the power of statistical methods, aggregation, inference, and interaction to pierce the veil of individual privacy.

Annualized Loss Expectancy

An accounting and actuarial evaluation used to consider the forecast damage from adverse events like catastrophes, thefts, data breaches, PII exposure with fines and legal expenses, and mitigation or remediation required to stop the damage, compensate those effected, and restore production. Abbreviated as ALE.

Approximation Measurement

An evaluation used to consider possibilities. See also qualitative measurement and quantitative measurement.

Authenticity

The process of validating that a person, document, process, or other workflow is originated from whom and where it says it is from, that the content is valid, and that the content or person has not been fraudulently counterfeited.

Authorization

The ability of a user to access a feature of a software application, system, network, or other infrastructure.

Authentication

1. A security procedure that verifies that a user is he who identifies himself as, or that data or a digital signature is what it is it purports to be. 2. The process of validating that a user or process is who or what that user or process provides as a name and/or purpose.

Authorization

The process of allowing access to resources only to those permitted to use them or otherwise granted authority to them.

Authorization Escalation

The misuse of access controls, scope, range, mislabeling, and classification biases extend access permissions beyond intent and expectation.

Back Door

A means of gaining access to a program or system by bypassing its security controls. Programmers often build back doors into systems under development so that they can fix bugs. If the back door becomes known to anyone other than the programmer, or if it is not removed before the software is released, it becomes a security risk. Also called trap door.

Base Redacted Document

See Objective Security Compliance for Universal Distribution.

Bayesian Inference

The process of deducing new statistical facts from existing statistical facts without a priori knowledge.

Bell-LaPadula Model

An academic model for enforcing access control in government and military. The model is based around the idea of mandatory access control and is widely referenced and employed in the design and implementation of secured network access. Abbreviated as either BLP or BLM.

Bell-LaPadula Model Compliance

Strict adherence to the BLP or BLM for need-to-know, sensitivity levels, and compartmentalization.

Betweenness

The measure of centrality to the number of standard, direct formal, or informal lines of communication among a group of people, events, resources, or other arbitrary objects. This structure is relevant for establishing social networking relatedness. See also Closeness and Connectedness.

Binary Information Delivery

The process of delivery partial information on separate channels and/or by separate delivery methods to mitigate the risk of interception, security failure, or improper access.

Biometric Authentication

The process of confirming identity while using various techniques of voiceprint, fingerprint, retinal scan, or other physical test.

Biometric Identification

Validation of a person by a physical or behavioral characteristic (such as the way they sign their name, their fingerprint or the marks on the iris of their eye).

Black List

A register of entities that are not acceptable and are being denied a particular privilege, service, or being categorized for attention. A black list might also include entities of interest or entities requiring additional attention that are not necessary 'unsafe.' Contrast to Safe List and white list. See also gray list.

Cascade of Authentication

A multi-tier process of login, authentication, biometrics authentication, challenges, and identification as friend or foe on a timed, random, or periodic basis.

Category

The assessment and assignment of one semantic description for data item. See also Label and Tag.

Categorization

The process of assessment and assignment of (one or more) descriptions for (one or more) data item(s). The application of categorization with descriptive results is a synonym for applying a tag or a label to a data item, or otherwise establishing an entry for taxonomy or ontology. Synonym for classification.

Certificate

Any symbol or token providing proof of attendance, completion, experience, or performance and this is sometimes used as a method to authenticate integrity or authorize access. A certificate has limited attributes or properties unless some system is enabled to give credence to this symbol or token.

Certificate-Based Encryption

A system in which a certificate authority uses ID-based cryptography to produce a certificate. This system gives the users both implicit and explicit certification, the certificate can be used as a conventional certificate (for signatures, etc.), but also implicitly for the purpose of encryption, which is usually symmetric for performance reasons. Microsoft has built this functionality into SQL 2005.

Certification

The process of obtaining a certificate.

Checksum Compression

See Winnowing.

Chaffing
A process of inserting nonsense within data to obscure its meaning.

Chain of Custody
Generally a legal term defining a process that establishes each person having custody of the evidence, thereby establishing continuity of possession, and proof of integrity of the evidence collected (Osterburg & Ward, 1992). However, the security extrapolation of this terminology is that data has been under control and the control can be traced and audited. This refers to the chronological documentation, and/or paper trail, showing the seizure, custody, control, transfer, analysis, and disposition of evidence, physical or electronic. Because evidence can be used in court to convict persons of crimes, it must be handled in a scrupulously careful manner to avoid later allegations of tampering or misconduct which can compromise the case of the prosecution toward acquittal or to overturning a guilty verdict upon appeal. The idea behind recoding the chain of custody is to establish that the alleged evidence is in fact related to the alleged crime, rather than, for example, having been planted fraudulently to make someone appear guilty.

Chaos
A state of disorder, infinite space, or void. It is often misused to imply a situation of that is beyond human control, as from the Greek Χάοσ, rather than the true mathematical meaning of emptiness. Note that chaos and randomness are not synonyms but rather mathematically related.

Cipher
The result of any method of cloaking information by means of word, symbol, compaction, substitution, replacement, reordering, or mathematical encryption.

Ciphering
The processing of data under a secret key, using a slide rule, substitution, or word replacement to differentiate it from encryption, in such a way that the original data can only be determined by a recipient in possession of a secret key. The application of a specific algorithm to data so as to alter the appearance of the data and make it incomprehensible to those who might attempt to 'steal' the information.

Classification
The process of assessment and assignment of (one or more) descriptions for (one or more) data item(s). The application of categorization with descriptive results is a synonym for applying a tag or a label to a data item, or otherwise establishing an entry for taxonomy or ontology. Synonym for categorization.

Clearance
The categorization of information by sensitivity level, compartment, group, user, action, mission, and other descriptive or functional assignments.

Closeness
The measure of path length or frequency of communication given the number of standard, direct formal, or informal lines of communication among a group of people, events, resources, or other arbitrary objects. This structure is relevant for establishing social networking relatedness. See also betweenness and connectedness.

Command Execution
The command line, parameterization of commands or passed values in functions, or insertion of values into applications, process, and workflow creating an inevitable expression of the security risk.

Compartmentalization
The storage of data in isolated sets.

Compliance
The process applied to systems or departments at corporations and public agencies to ensure that personnel are aware of and take steps to comply with relevant laws and regulations. See also malicious compliance.

Concept
An abstraction or general idea inferred or derived from specific instances of information based on a cognitive knowledge of the context and content. This can include business rules, formats, constructs, structures, abstractions, attributes, properties, categories, labels and tags, notations, metadata, and/or the definition of a process or computer application to define information usage and intent. A concept can also be a partial-formed idea that is still incomplete.

Conditional Tagging
A theory and practice of tagging documents (not used by DigitalDoors) based on the sensitivity level content and the one-time upfront assessment of the risk of that document subject to the perceived intent and purpose. This does not consider hidden risks, covert channels, or the context and concept when such information is repurposed.

Conditional Information Sharing
DigitalDoors enables the delivery of a baseline document, a generic redaction or universal redaction, that contains no sensitive value and can reconstitute that document in fine-grained steps up to the original document.

Confederated Search
The usage of multiple web-based search engines based on keywords with results combined into a single unified report. Also federated search and metasearch.

Confidentiality
An expectation and workflow process that ensures that the content of a transmitted message cannot be determined except by the possessor of a key associated with the message, even if the transmitted bits are observed.

Connectedness
The number of standard, direct formal, or informal lines of communication among a group of people, events, resources, or other arbitrary objects. This structure is relevant for establishing social networking relatedness. See also betweenness and closeness Connect-the-Dots
The inspiration that cross-domain inter-agency information sharing (in contrast to endemic departmental isolation and retention of independently-acquired intelligence) might have allowed key personal assembling daily terrorism threat status reports to aggregate and inference the potential for 9/11 attacks before they occurred.

Content
Anything that fills a newspaper, magazine, data stream, document, video, audio, multimedia presentation, or web site. Content is synonymous with data, but content also includes material represented by labels, tags, structure, metadata, references, links, applets, notations, and out-of-band controls.

Content-Addressed Storage
The methods to locate information by content rather than by location or file name using alternative information addressing schemes.

Context
An abstraction of information to include discourse that surrounds a language unit and helps to determine its interpretation. It is an abstraction of circumstance that sets the facts or interpretations that surround a situation or event. It is also the environment, purpose, usage, or application of information to a particular scenario or problem set. The non-entropic value of data within a signal, message, file, or other data structure.

Contraction
    The process of removing positional markers, widths, punctuation, and other silent indications of DigitalDoors granular extraction. For example, when key information is extracted, the existence of the missing extractions and tear lines are hidden with a reformatting of the data stream to suppress this information.
Controlled Release
    The process of reconstituting granular content items based on rules in order to enable process continuity while conforming to security, risk management, and compliance.
Convergence
    The act, condition, quality, or fact of approaching a limit, such as a point or limit.
Counterfeiting
    The act of making and distributing an imitation that is made usually with the intent to deceptively represent its content or origins. The word counterfeit most frequently describes forged currency or documents, but can also describe clothing, software, pharmaceuticals, watches, or more recently, cars and motorcycles, especially when this results in patent infringement or trademark infringement. Any analog or digital materials, software, data, signatures, images, and data streams are candidates for such imitation.
Credential
    See certificate. The differences between certificate and credential are both contingent on some system given credence to these symbols or tokens.
Critical and Important {Data}
    Information defined by the system as data, which, when removed, 1.) render the digital document, digital data stream, or digital environment useless to users, processes, or workflow, 2.) create a substantial loss of economic, functional, or strategic value essential for continuing the vital missions. The crown Jewels. See data element.
Custodianship
    A person, organization, or process that has charge of something, generally without ownership or legal stewardship, and is tasked with is responsible use and maintenance of that resource. See also stewardship.
Cyberwar
    Also cyberwarfare. See information warfare.
Data
    Any stream or structured format of information that includes data files, documents, objects, records, record sets, databases, transactions, log histories, images, video, sound, data packets and network frames, E-mail streams, process streams, and other data structures. Although this Latin form is plural, datum is really a single item or element. Realistically, a single bit is data. The difference between data and information is generally defined by the Data, Information, Knowledge, and Wisdom (DIKW) Information Hierarchy that defines data as raw symbols lacking definitive context whereas information is data defined by a specific implied practical context.
    Data, Information, Knowledge, and Wisdom (DIKW) Information Hierarchy Russell Ackoff, a systems theorist and professor of organizational change, stated that the content of the human mind can be classified into five categories:
Data: Symbols
    Information: data that are processed to be useful; provides answers to "who", "what", "where", and "when" questions
    Knowledge: application of data and information; answers "how" questions Understanding: appreciation of "why"
    Wisdom: evaluated understanding. Professor Ackoff indicates that the first four categories relate to the past; they deal with what has been or what is known. Only the fifth category, wisdom, deals with the future because it incorporates vision, innovation, and design. People can create the future with wisdom rather than just grasp the present and past. Achieving wisdom isn't easy; people must advance successively through the prior categories.
Data-Centric
    A process or workflow structured to the value of the sustaining information. In the case of data-centric security, the focus of protection is specifically to the information within the process or workflow rather than to the infrastructure. Although infrastructure is prone to disruptive, surreptitious, and denial of service attacks, the data-centric security model minimize leaks and breaches of the data and emphasizes the protection of the crown jewels. Also called information-centric.
Data Concept
    See concept.
Data Content
    See content.
Data Context
    See context.
Data Element
    A selected subset of information that can be assigned a metatag. Usually, a data element will be the smallest piece of information that can be removed from context for establishing a granular content security.
    Data Mining
    A class of database applications that look for patterns in a group of data that can be used to predict future behavior from the nontrivial extraction of implicit, previously unknown, and potentially useful information. True data mining software doesn't just change the presentation, but actually discovers previously unknown relationships among the data.
Data-to-Data Interaction
    The formal or informal process of creating new information or formulating new hypotheses through the accumulation of unstructured and structured data often through the reorientation, transformation, or normalization of different types of data into unified formats usually in the presence of a specific trigger or catalyst. A good example from the movie "Oceans Twelve" is the overlaying of building blueprints with subway transit maps by a thief seeking to discover weaknesses in a bank vault. This is specifically different from data mining because the data is not derived from like databases. This is specifically different from aggregation because the superimposition or collection of such information does not influence the revelation. This is also specifically different from inference due to the unlikely overlap or linkage references between the data sources. This notion is analogous to gene-to-gene interaction in the presence of active proteins and complementary binding receptor sites that allow genes from the same, similar or even different biological strains to interact to cause sickness, infection defenses, or functional natural adaptation.
Data Encryption Standard
    An encryption/decryption algorithm defined in FIPS Publication 46. The standard cryptographic algorithm developed by the National Institute of Standards and Technology. Abbreviated as DES.
Data Dispersion
    A method for data storage and delivery where the constituents of the whole are contextually disassociated into elements and randomized and/or stored in separate locations requiring a directory or recovery script to restore into initial form. The scattered or diffused storage of critical and important information renders that information valueless without context, nearly impossible to match together correctly, and difficult to locate without a directory. In addition, the scattered or diffuse delivery (often by separate channels and types of delivery methods) of that same data for reconstitution protects the constituents of the whole from useful interception and contextual understanding.

Data Evolution

The normal atrophy of stored data and also the accumulated and aggregation of new data to alter the value or context of existing stored data.

Data Governance

A formal program conforming to legal requirements that includes a governing body or council, a defined set of procedures, and a plan to execute those procedures defining the owners or custodians of the data assets in the enterprise. A policy must be developed that specifies who is accountable for various portions or aspects of the data, including its accuracy, accessibility, consistency, completeness, and updating. Processes must be defined concerning how the data is to be stored, archived, backed up, and protected from mishaps, theft, or attack. A set of standards and procedures must be developed that defines how the data is to be used by authorized personnel. Finally, a set of controls and audit procedures must be put into place that ensures ongoing compliance with government regulations.

Data Hiding

Any process used to embed data, such as copyrights and messages, within other forms of data such as images, sounds, and video with an imperceptible amount of carrier signal degradation. Data hiding also has another meaning in that normally visible data is truncated, redacted, masked over, masked with substitution, or removed. See also steganography, data masking, data obscurity, data truncation, and redaction.

Data Masking

A type of information redaction in which the meaning, value, or utility of a data stream is altered by substituting some of the value with alternate characters. For example, a credit card number like 4256-3340-5687-1220 could be rendered as **---1220 or as 4256-3340-5687-**. Downsides to data masking is that the masked data becomes useful as a key or search basis for reidentifying the unmasked value in full. Also, if you notice, the statistical likelihood of reidentifying by brute testing is only enhance to a small solvable set requiring seconds of real computer time. Note that masking can effect a substitution for the original field or the overlay of a placeholders to hide and cover over the original field. See also De-identification.

Data Mining

See data-mining.

Data Obfuscation

A technique for securing information by encryption, removal, extraction, and dispersion of some or part of a data field or data stream.

Data Obscurity

A questionable technique for securing information by masking, truncating, or hiding some or part of a data field or data stream.

Data Partition

The separation of storage locations (local or remote) into a differentiable references, files, databases, file systems, or directories, hives, etc.

Data Spill

The accidental transmission or display of PII, intangible information, or trade secrets to a third-party.

Data Sharing

A security method based on the concept of the dual keys for the bank safety vault where data is distributed among various people or processes thereby precluding any one party or even most of the parties benefiting from the information without full cooperation of all parties. See also Information Sharing.

Data Stewardship

The non-legal functional formalization of the roles, accountability, and responsibilities for the management of data. This includes the overall management of the availability, usability, integrity, distribution, reuse, and security of the data employed within an agency. This is not to be confused with the legal responsibility afforded by a formal stewardship.

Data Stream

A generic way to describe a single or compound unit of information regardless of format, structure, delivery method, or storage medium. Our supposition is that everything can be described and defined by a data stream and is a logical representation of the physical. For example, DNA is a data stream that represents the RNA cell manufacturing process. Information, applications, and workflow of all types are delivered as a data stream, and essentially are just the expressions of a data stream.

Essentially, all machinery, whether cells or cell-driven processes, software, and even hardware are essentially manifestations (literally "expressions") of a data stream. This complicates security issues, but also provides a unitary vision for expressing security as the protection of a data stream and provides a new paradigm for its protection that transcends the fail view of process and perimeter security methods.

Data Structure

A specialized format for organizing and storing data. General data structure types include arrays, fields, files, records, hashes, tables, relational indexes, the hierarchical tree, the document object model, and so on. Any data structure is designed to organize data to suit a specific purpose so that it can be accessed and understood as to its expected field format, purpose, range valuation, source, validity, and access control.

Data Tainting

1. A bit within each character byte used to indicate whether the byte is valid, like a checksum. 2. The subversion of a data set, data table, or entire database with false, misleading, or misinformation in locations known to the owner to track misuse, copying, or distribution.

Data Truncation

A type of information redaction in which the meaning, value, or utility of a data stream is altered by dropping leading or trailing values. The choice of truncation of the most or least significant values is based on the utility and function of the original data stream. Truncation can also refer to initial redaction as well as redaction of trailing value. This can be very relevant for URLs, database integration with URLs, or SQL parameters where injection is a serious risk. For example, the URL http:\\www.google.com\search="security+identification+compliance" loses very little by dropping http:\\ or the detailed*.com site as the format of the search phrase is very well understood. Truncation is common to protect account numbers and other indexes. Removing the search terms or in the case of imbedded SQL removing the user-supplied parameters is more effective truncation.

Decentralized Label Model

A security model that annotates data to guarantee confidentiality using labels to support fine-granularity in information sharing. Abbreviated as DLM.

Declassification

The process of releasing formerly secret documents or information.

Decoding

The process in data security to restore the form of data through a replacement lookup table or decryption method.

Decoy
  Disinformation, misinformation, or concealment used to camouflage the accuracy, integrity, or existence of information.
Decrypting
  The process in data security to restore the form data using a mechanical, mathematical, or other statistical process.
Defense-in-Depth
  The siting of mutually supporting defense positions designed to absorb and progressively weaken attack, prevent initial observations of the whole position by the enemy, and to allow the usage of reserves. Also, the use of multiple techniques to help mitigate the risk of one component of the defenses being compromised or circumvented.
Degrading
  Not a common use. The process of creating a Secured DIGITALDOORS data stream. See also extraction.
DES
  Data encryption standard. An encryption/decryption algorithm defined in FIPS Publication 46. The standard cryptographic algorithm developed by the National Institute of Standards and Technology and under jurisdiction of AES.
Destination Data Stream
  Any data, data flow, or structured data delivered as a result of processing.
DigitalDoors
  This company and the self-named suite of software applications that provides security, survivability, privacy, confidentiality, and anonymity by finding, extracting, and dispersing critical and important information.
DigitalDoors Model of Controlled Release
  The unlimited control over the reconstitution of the extracted data into the redacted data stream subject to the rules and purpose driven by security purpose.
Digital Door
  A place where a data stream is marked by anchor, placeholder, or by the null set to indicate that critical and important information was extracted and where other things can be placed, such as a link, misinformation, disinformation, or advertisements. A specific item of information at risk at a process touchpoint.
Digital Tampering
  See counterfeiting. The processing of copying, faking, altering, and generating duplicates or facsimiles to bypass security, falsify credentials, or create a clone market.
Directory
  A container defining the location of recovery information for reconstituting the remainder into a data flow for access at any defined sensitivity level. A directory has several formats that include consolidated, inclusive, exclusive, and granular itemized.
Directory, Consolidated
  A directory format that includes all recovery information or the location to the consolidated recovery information. It is consolidated because all recovery for all granular items are referenced.
Directory, Exclusive
  A directory format that includes the location to recovery information for a single defined sensitivity level.
Directory, Granular Itemization
  A directory format that includes the location to recovery information for all granular items providing for reconstitution at any sensitivity level, compartment, category, user, group, mission or combination thereof.
Directory, Inclusive
  A directory format that includes the location to recovery information for a single defined sensitivity level for reconstituting the remainder to that sensitivity level where the remainder information includes all granular items up to and including the dominated sensitivity level.
Discovery
  See electronic discovery.
Dispersal
  The process of creating the remote primary storage of extracted information according to its clearance.
Dispersion
  1. The location(s) for the remote primary storage of extracted information according to its clearance. 2. The process of securing, distributing, protecting, and anonymizing data by the extraction of identifying components from the source for separate storage or delivery. 3. A method for data storage and delivery where the constituents of the whole are randomized and/or stored in separate locations requiring a directory or recovery script to restore into initial form. The scattered or diffused storage of critical and important information renders that information valueless without context, nearly impossible to match together correctly, and difficult to locate without a directory. In addition, the scattered or diffuse delivery (often by separate channels and types of delivery methods) of that same data for reconstitution protects the constituents of the whole from useful interception and contextual understanding. Microsoft calls this dissipation.
Dispersive Protection
  The process of securing, distributing, protecting, and anonymizing data by the extraction of identifying components from the source for separate storage or delivery. Also, Diasporagraphy.
Display
  The representation of a source data file in is entirety or without extractions, extractions alone, or a reconstitution of the Source Data Streams with extracted objects are represented by nothing, placeholders, substitutions, replacements, barcodes, or serialized tags.
Disinformation
  Purposely incorrect information used to divert attention to other areas in order to stall, buy time, or cause others to make incorrect assumptions.
Divergence
  The act, condition, quality, or fact of moving away in different direction from a common point or limit.
Domain
  The realm for which information and process is defined and under which data stewardship is maintained. This could be defined for the intelligence community, the community of interest, a single agency, a department with an agency, or a defined subset of the intelligence community.
Dominated Rollup
  Recovery information up to and including the referenced sensitivity level in a single package. See also recovery or inclusive.
Downgrading
  The process of modification of a secret document such that is becomes unclassified through the process. Also called Sanitizing.
EAI
  See Enterprise Application Integration.
Electronic Discovery
  Any process in which electronic data is sought, located, secured, and searched with the intent of classification or of using it as evidence in a civil or criminal legal case.
Encoding
  The process in data security to encrypt or change the form of data through a replacement table rendering it unrecognizable and useless to all but intended parties.

Encrypting
 The obfuscation process in data security to transform data using a mechanical, mathematical, or other statistical process rendering it unrecognizable and useless to all but intended parties.
Enigma
 1. A code. 2. An encoded character. 3. A zero. 4. A problem that cannot be solved; a cipher. 5. A security encryption machine used by the German military in WWII.
Enterprise Application Integration
 The use of software and architectural principles to bring together (integrate) a set of enterprise computer applications. It is an area of computer systems architecture that gained wide recognition from about 2004 onwards. EAI is related to middleware technologies such as message-oriented middleware (MOM) and data representation technologies such as XML. EAI enables data propagation and business process execution throughout the numerous distinct networked applications as if it would be a unique global application. It is a distributed transactional approach and its focus is to support operational business functions such as taking an order, generating an invoice, and shipping a product. The use of middleware to integrate the application programs, data bases and legacy systems involved in an organization's critical business processes. EAI applications are really an extension of legacy gateway applications, with provisions for tighter coupling with back-end applications than the legacy gateway solutions. See also Service-Oriented Architecture.
Entropy
 A measure of the disorder or unavailability of energy within a closed system. More entropy means less energy available for doing work.
Evaluative Measurement
 An evaluation that describes how the quantitative and qualitative results were attained. See also Qualitative Measurement and Quantitative Measurement.
Expression
 A technical cellular biology or biochemistry terminology that describes the functional manifestation of the DNA informational unit into the RNA process. In security, expression represents the risk inherent in any data stream when that information unit is manifested as a process or repurposed in any way. Essentially, the content of any informational unit is neutral in terms of risk and utility until a context is applied.
Extraction
 The process of removing characters, words, phrases, numbers, image and video segments, audio segments, and any other identifying patterns and objects from Source Data Streams creating destination data streams. The streams include streams without the extractions, streams with only the extraction objects, and streams for projecting a presentation or reconstituting the Source Data Streams (through methods of censoring, masking, tagging, logging, tracking . . . etc.).
Extraction Stream
 A destination data stream of objects removed from a Source Data Stream.
Faceted Classification
 Content classification system showing slices of information displayed along a single axis of concept (where there are and often are many axes).
Federated Search
 The usage of multiple web-based search engines based on keywords with results combined into a single unified report. Also Confederated Search and Metasearch.
Firewall
 1. A mechanism to protect network stations, subnetworks, and channels from complete failure caused by a single point. 2. A device, mechanism, bridge, router, or gateway, which prevents unauthorized access by hackers, crackers, vandals, and employees from private network services and data. 3. A moat between public data networks (i.e. CompuServe, Internet, and public data carrier networks) and the enterprise network.
Folksonomies
 A method for classification based on a social approach to collaborative taxonomy. Also known as social bookmarking, social indexing, or social classification. Although this method is flexible, it often becomes unmanageable due to classification bloat, unsupported classification subtleties, and differences in category applicability. The sensitivity levels of T, S, C, and U, for example, proliferated in just a way with SBU, EO, IU, and other ill-define and narrowly applied tags.
Formlessness
 The state of information or resource without context or concept. The presumptive utility is distorted to mask, hide, obscure, render uncertain without value or with so many values as to be overwhelming. Consider formlessness as stealth, ambiguity, and surprise when applied to functional security, and as the critical component within the DigitalDoors security paradigm shift.
Freedom of Information Act
 U.S. Congressional law (1996) providing for the release of government documents, even materials at one time deemed classified or top secret. Abbreviated as FOIA.
Functionally-Compliant Security
 The application of security that is not disruptive to ongoing processes and workflow, that coexists with sharing and knowledge discovery without detracting from the expectations and results. This is security that is not a Hobbesian choice with performance.
Generic Redaction
 The process of granular removal of all content within a data stream that conforms to all DigitalDoors filters and sieves leaving a remainder that unconditionally conforms to unclassified distribution policy. See also Selective Redaction and Universal Redaction.
Generic Remainder
 The data stream that is left after granular content is removed from within the data stream. The data stream can show placeholders for each redaction or nothing at all.
Ghost
 The resulting remainder form or template that is generated by extracting from a data stream all its sensitive data. See also Remainder.
Granular Content
 The smallest divisible atomic unit of data with information stripped from its format, representation, structure, purpose, context, usage, source, destination, and encoding. Granular content is unitary information (that could be multi-tiered and indeterminate) but it is also defined within its context and concept of the greater information unit.
Granular Content Control
 The DigitalDoors paradigm shift that includes the structure of information, the nature of meaning and semiotic content, context and concept, the format and structure of file and information storage, metatag and metadata, and the compound and hierarchical layering of knowledge. See also granular data control.
Granular Data
 The selected and extracted item(s) of information removed from content, context, and concept to enable security, privacy, continuity, survivability, and information sharing.

Granular Data Control

The DigitalDoors paradigm shift that includes the structure of information, the nature of meaning and semiotic content, context, and concept, the format and structure of file and information storage, metatag and metadata, and the compound and hierarchical layering of knowledge. See Granular Content Control.

Gray List

The bulk of a data stream that is not categorized and filtered by a black list or white list and specifically requires additional attention. This represents the unknowns that are neither not acceptable nor acceptable because these are not recognizable. The gray list represents an unqualified and unquantified risk that usually must be reduced with methods to assign the unknowns into either the black list or white list.

Gray List Taxonomy

1. The process of categorizing that part of a data stream that slips through the sieves of black lists and white lists. 2. The process of recognizing the potential for single items trapped by black lists or white lists to be aggregated, inferenced, or permutated to form new contextual items of interest. 3. The classification through proxy processes for data stream items that do not fit into a single category, are dependent on contextual assignment, or fall into multiple categories in general but will have an initial or presumptive classification. Also referred to as gray list analysis.

Green Book

DigitalDoors proposed structure and recommendation for information sharing and data management for security implementations to the Rainbow series of security documentation based on the granular control paradigm shift.

Hardening

A generic term applied to any efforts made to enhance security and survivability without validation of its effectiveness. This term is derived from the effort to reinforce concrete with salt and rebar creating a more resistant material.

Hashing

A method used in security to protect direct access to resources through a secondary chain of custody. It is an indexing technique in which the value of a key (record identifier) is numerically manipulated to directly calculate either the location of its associated record in a file or the starting of a search for the associated record.

Hybrid Encryption

A method of encryption that combines two or more encryption schemes and includes a combination of symmetric and asymmetric encryption to take advantage of the strengths of each encryption method, usually applied to centralize the resources needed for encryption, to reduce costs, or to handle the matrix information distribution requirements of PKI.

Identification (of) Friend or Foe

A military practice to create a call sign, password, or challenge password and countersign pair changing daily (or more frequently) to validate authenticity of another person thereby protecting against spies, intelligence extracted from captured soldiers, and familiarity with military protocols and language. Abbreviated as IFF.

Inference

The process of deducing new facts from other existing facts. It is operationally a transformation of data with other data by lookup, mining, deduction, or association. Inference also acts on data to create a useful, anticipated, or practical information.

Information

Synonymous with data. The difference between data and information is generally defined by the Data, Information, Knowledge, and Wisdom (DIKW) Information Hierarchy that defines data as raw symbols lacking definitive context whereas information is data defined by a specific implied practical context. Generally, within DigitalDoors, information will refer to a compound document or stream with an anticipated use that can be parsed into smaller and smaller subsets of structured groups or data elements.

Information-Centric

See data-centric.

Information Hierarchy

See the Data, Information, Knowledge, and Wisdom (DIKW) Information Hierarchy.

Information Concept

See concept.

Information Content

See content.

Information Context

See context.

Information Extraction

The four-step process to parse a database, or data stream to define and select granular content, classify that content in a multitier overlapping hierarchical structure with social and associative contextual and conceptual clustering.

Information Fabric

A term coined by Forrester Research to define virtualization layer of data storage into a centralized location for efficiency and simplified management, however, it creates a single point of failure.

Information Sharing

A strategic partnering relationship between data suppliers and data consumers is characterized by a willingness to be open, and to share data as well as the benefits resulting from the information sharing. Cultural unwilling, organizational barriers, and threats to power and control undermine traditional information sharing, so much so, that information sharing is ad hoc and represents a coin of the realm in power brokering.

Information Technology Infrastructure Library

A collection of best practices for information technology service management. The United Kingdom's Central Computer and Telecommunications Agency (CCTA) created the ITIL in response to growing dependence on information technology for meeting business needs and goals. The ITIL provides businesses with a customizable framework of best practices to achieve quality service and overcome difficulties associated with the growth of IT systems. The ITIL is organized into sets of texts which are defined by related functions: service support, service delivery, managerial, software support, computer operations, security management and environmental. In addition to texts, which can be purchased online, ITIL services and products include training, qualifications, software tools and user groups such as the IT Service Management Forum (itSMF). While owned by the CCTA since the mid-1980s, the ITIL is currently maintained and developed by The National Exam Institute for Informatics (EXIN), a non-proprietary and non-profit organization based in the Netherlands. Abbreviated and commonly references as ITIL.

Informational Unit

The generic terminology for the basic and smallest unit of data or any larger arbitrary unit of data. It is an item, an element, a field, a data stream, a file, a message, a signal, a process, or metadata.

Information Warfare

Those actions intended to protect, exploit, destroy, deny, corrupt information or information resources in order to achieve significant advantage objective, or victory over an adversary. Operations conducted during a time of crisis or conflict to achieve or promote specific adjectives where actions are taken to affect adversary information and information systems while defending one's own. Six factors in the value of an information resource:

Relevance to Concerns of Commitment of a Player
   capabilities of a player
Availability of Resources of a Player
   available of a resource to an adversary
Integrity of a Resource
   over time resource can increase or decrease in value
This is also called cyberwar or cyberwarfare.

Injection
   The surreptitious insertion of data, triggers, commands, macros, and metadata (all types of generic signal data) into a data stream in order to repurpose, redirect that stream, or attack process and resources. Insertion is often exploited as alteration of HTML headers in web sites, URL parameters, or as SQL injection with fraudulent or multiple stacked commands. Failure to qualify user input before command execution and limit command execution is a large risk within any process. However, the very ability to change and alter a data stream in any form with injection provides a doorway of risk for compromising the intent and purpose of just about every data stream. Alterations of injection or the alteration (as in patching, overwriting, manipulating) or the truncation of parameters. This is just a variation on the same theme of injection. It is a very significant threat because detection, verification, authentication, and prevention is all based somehow on data streams, which all in turn, are at risk for injection.

Intangible Asset
   An identifiable non-monetary asset without physical substance that can be recognized, identified, and transferred as a separable entity.

Intellectual Capital
   The dynamic effects of individuals' intellect applied as an input to a classical economic production model to create a multiplier effect to the other inputs of labor and capital. Intellectual capital includes all of the knowledge applied to production efforts, culture, history, practices, and goodwill, that knowledge embodied as part of the actual production output, the systems of command, control, and communications applied to organize the production process. See also intellectual property.

Intellectual Property
   That specified part of intellectual capital that is codified as property, generally as patents, brands, trademarks, trade secrets, defined proprietary business practices, and internal organizational workflow.

Intentional Security
   The fundamental security that is engineered into the operating system, the applications, the environment, and/or the workflows to address both known and as yet unknown flaws assuming the certainty of an eventual attack.

Interaction
   The formal or informal process of creating new information or formulating new hypotheses through the accumulation of unstructured and structured data often through the reorientation, transformation, or normalization of different types of data into unified formats usually in the presence of a specific trigger or catalyst. See also the more formal Data-to-Data Interaction.

Intrusion Detection
   Fancy word for security that provides a firewall, monitors traffic loads, prevents virus attacks, and also tracks sources for users.

Keyword
   Any acronym, word, number, or phrase that is used as a search term, data lookup, or index value and that has content- or context-value itself.

Keyword Poisoning
   The insertion, misuse, or overuse of information with content- or context-value to alter search or indexing results for a purpose that undermines the effectiveness of the primary utility of the search or indexing.

Knowledge Exploration
   Any process used to lookup, find, search, index, extract, or discover data within a data stream, document, database, data warehouse, or other storage infrastructure with emphasis on discovery of hidden, undisclosed, relationship-oriented, or contextually-based references.

Label
   An applied designation or categorization for a defined range of information. It can be in-channel, out-of-channel, or bracketing the range to specify the relevance of the application of the label. A label can be the [TS] marking within a tear line, the <start><\end> in HTML, SGML, or XML. Labels can also exist as a hierarchical or referential metadata in separate data streams, as typically handled within Digital-Doors. See also tag.

Labeling
   The process of applying a label or tag based on a formal taxonomy or classification process.

Linear Adjacent Composites
   The recognition and selection of unknown or uncategorized terms that are in proximity to a known dictionary item and the association and connection of these new terms to the previously recognized one. This is useful for automatically constructing new search or categorization targets based on related items, specifically categorized words or unknowns that are adjacent to each other can be combined to form new linear combination phrases. See also linear adjacent permutations. More detail is available in the white paper titled, "Adjacency with Permutations and Combinations."

Linear Adjacent Permutations
   The recognition and selection of unknown or uncategorized terms that are in proximity to a known dictionary item and the association and connection of these new terms to the previously recognized one. This is useful for automatically constructing new search or categorization targets based on related items, specifically categorized words or unknowns that are adjacent to each other can be combined to form new linear combination phrases. See also linear adjacent composites. More detail is available in the white paper titled, "Adjacency with Permutations and Combinations."

Link
   A connection to other resources using imbedded references, most commonly implemented as a universal resource locator (URL) in html sources. XML pointers and other hyperlink mechanisms fulfill the same purpose as a link but also create a reverse link for security, integrity, and expanded reference.

Malicious Compliance
   A concept of compliance to the letter of the law of one or more standards but not the spirit of the law with foreknowledge that efforts do not achieve overall goals and yield a negative impact on the organization.

Mark-to-Market
   An accounting methodology of assigning a value to a position held in a financial instrument based on the current market price for the instrument or similar instruments, and should equally apply to intangibles that are monetized through any number of viable valuation methods.

Marker

A device to indicate a position, relative position, or location that dependent on its purpose or context. Sometimes, the term marker is used to describe a label or tag. See also Label or Tag.

Markle Foundation

A private organization that works to realize the potential for emerging information and communication technologies to improve people's lives by accelerating the use of these technologies to address critical public needs, particularly in the areas of health and national security.

Markle Report

There are many Markle Reports created by different task forces. The ones of relevance to information security include "Creating a Trusted Network for Homeland Security" and "Protecting America's Freedom in the Information Age."

Markup

A confusion terminology usually referring to the eventual intent or manual indication that for inserting a marker. Sometimes, the term markup is the prior manual step to insert a marker, which is also used to describe a label or tag.

Masking

A process of distributing versions or subsets of data prepared by a redaction, filtering, or extraction process where the deliverable result is missing parts of the data or has placeholders for the data. One example of masked data presentation is XXXX-XXXX-XXXX-2807 for a MasterCard account number that complies with the PCI DSS requirements.

Master Data Management

A method of enabling an enterprise to link all of its critical data to one single file, called a master file, which provides a common point of reference. When properly done, MDM streamlines data sharing among personnel and departments. Furthermore, MDM can facilitate computing in multiple system architectures, platforms and applications. The benefits of the MDM paradigm increase as the number and diversity of organizational departments, worker roles and computing applications expand. For this reason, MDM is more likely to be of value to large or complex enterprises than to small, medium-sized or simple ones. When companies merge, the implementation of MDM can minimize confusion and optimize the efficiency of the new, larger organization. Abbreviated as MDM.

Metadata

Simply information about information or data. The term is usually use in context for providing descriptions about the data stored in a database or a compound hierarchical document (including XML or a MS Word file), such as structure, purpose, format, last updated, or intent. Metadata is usually stored interleaved with visible data or out-of-band to the user data thus creating a significant security risk. Metadata is likely to replicate the full content of the user data, define structure and content for the visible user data, and contain internal and external information references.

Metafilter

A search term categorization used to reduce the search results based on the compliance to selection categories or sensitivity levels or other contextual bases.

Metainformation

See Metatag.

Metalist

Not the rock band. A list of lists or a hierarchy of lists. It is often created as a collection of specific dictionary entries, categories, classifications, types of words and phrases that are combined in order to define a compliance target, such as HIPAA or GLBA. Note that entities prohibited by the HIPAA safe harbor provisions and by GLBA are likely to overlap, such as names, dates, costs, social security numbers, and contact information. The metalist creates a shortcut for the complexity of these entries and provide a means to resolve list overlaps. Metalists are implemented as "profiles" and the user selection of profiles for automated selection operations. It is also critical when reconstituting generic remainders with granular content control for unknown future data repurposing while preserving functional security.

MetaPII

Anything external to a generical or legal set of PII categories, usually descriptive, that can create PII or in other methods uniquely identify an individual (person, process, property) or approximate the identification of an individual. It is any information that can create aggregation, inferential, or interaction subsets that either physically or statistically confines an individual (person, process, property) within an identifying scope or range.

Metasearch

1. The process of search through multiple other search engines with a combined output from all search engines. See Confederated Search or Federated Search. 2. A DigitalDoors divergent search without preconceptions of range and reach to discover related information from a variety of local sources, databases, data stores, and external resources, both structured and unstructured, and Internet facilities and to apply objective security for cross-domain information sharing to uncover a plot during its incubation. Remote searches initiated by the metasearch that penetrate other domains are secured before results are passed back to the original metasearch and consolidated.

Metasecurity

The use of imbedded in-channel information, triggers, and macrocode to sign, validate, authenticate, send messages, protect, and inform on the unanticipated use or misuse of a data stream. Problem of such use of metadata is that it itself opens doors to risk so that the assessment becomes one of assessing not only the basis risk but also the metarisk of the added protection mechanisms.

Metatag

A special tag that provides information about the tagged, included, or referenced information. A metatag is a tag, but it conveys sensitivity level, purpose, source, usage, categorization, or other pragmatic value beyond content. HTML, XML, and DoD sensitivity level tags are metatags. DigitalDoors creates out-of-channel metatags, and specifically a multitier overlapping hierarchical structure of metatags.

Microperimeter

The demarcation of a presumed closed subset. The enclosure of a set of resources by a surrounding protection mechanism at the demarcation.

Microperimeterization

The attempt to create a closed set with a surrounding for the purpose of enabling security, like the process sandbox.

Mimic

Disinformation, misinformation, or concealment used to camouflage the accuracy, integrity, or existence of information.

Mimicry

Disinformation, misinformation, or concealment used to camouflage the accuracy, integrity, or existence of information.

Misinformation

Purposely false, misleading, or deceptive information used to divert attention to other areas in order to cause others to make incorrect decisions and initiate the incorrect actions.

Mislabeling

A method of purposefully classifying information incorrectly to decrease its perceived value in order to bypass security systems or raise its value for asset valuation fraud.

MultiCryption

A DigitalDoors trademark for mixed usage of encryption methods and mixed one-time keys with output interspersed (in whole or part) within original data stream. In other words, this process selects the elements within a document to encrypt, encrypts each with a random method using a random one-time key, and inserts the result back into the source document.

Multilateral Security

A concept for implementing security when security interferes or directly conflicts functional or operational interests. Specifically, the release of personally identifiable information is necessary to conduct a credit check or medical insurance review but contrary to its full protection.

Multiple Independent Levels of Security

An architectural approach to security that represents a layered approach to building the high assurance components required for cross-domain solutions. Abbreviated as MILS. See MLS as the forerunner to MILS.

Multiple Levels of Security

A DoD and intelligence agency security program that enables information systems to provide capabilities that augment its existing single-level data processing and data communications services over many different and separate sensitivity (security) levels. Data of multiple sensitivity levels are processed and transferred by the system, which also separates the different sensitivity levels and controls access to the data. Abbreviated as MLS. See MILS as the current embodiment of MLS implementation.

Multitier Hierarchical Tag Structure

The application of multiple and overlapping tags assigns sensitivity level, compartments, categories, purpose, usage, and other pragmatic meaning to granular content. It is multitier because many tags can be applied to the same content to describe different aspects of the content, and it is hierarchical because tags can overlap to define words within phrases within paragraphs within documents or other compound data streams. Traditional DoD tags indicate a non-reflexive sensitivity level (and/or compartment) but do not in any way describe the potential for inter-domain information sharing except perhaps to preclude it, whereas multitier hierarchical tagging enables security compliance with granular information sharing to multiple domains. See also Tag Cloud as a web-enabled ontology for the classification of single information streams for multiple uses.

Multitier Hierarchical Overlapping Tag Structure

The application of multiple and overlapping tags assigns sensitivity level, compartments, categories, purpose, usage, and other pragmatic meaning to granular content. It is multitier because many tags can be applied to the same content to describe different aspects of the content, and it is hierarchical because tags can overlap to define words within phrases within paragraphs within documents or other compound data streams. The basis for success with granular content control is to establish a comprehensive review of data content, context, and concept as a precursor to .tagging and all subsequent filtering and assessment of purpose. Traditional DoD tags indicate a non-reflexive sensitivity level (and/or compartment) but do not in any way describe the potential for inter-domain information sharing except perhaps to preclude it, whereas multitier hierarchical tagging enables security compliance with granular information sharing to multiple domains. This specific implementation resolves issues that plague cross-domain semantic interoperability and the complexity if not impossibility for mapping a consistent dictionary and data model for communities of interest (COI) by reducing the problem of information tagging of the gross document to a granular one. See also Tag Cloud as a web-enabled ontology for the classification of single streams for multiple uses.

Negligence

The failure to act and the legally-assigned responsibility for preventing an event of consequence.

Network

Any local network, wide-are network, intranet, or Internet that provides an information delivery mechanism and infrastructure for workflow. It provides a distribution channel with marginal cost of zero.

Objective

A method of dealing with logical and experiential evidence.

Objective Security

A concept for security based on external measurement and substantiation. This is a difficult ambition for a number of reasons because of a lack of clear and stable security models, the rare inclusion of formlessness into strategic designs, insufficient clarity whether to protect infrastructure or apply a data-centric model, and complexities in defining data and information that requires protection.

Objective Security Compliance for Universal Distribution

A redacted MLS or MILS document with sensitive items selected and extracted for a general distribution. Also a Base Redacted Document.

Ontology

1. The assignment of information into one, two, or more categorical distinctions. 2. The applied categorization through the use of label or tag. 3. XML semantics often described by XSL or DTD structures. 4. This philosophical term (from metaphysics) refers to assertions or assumptions about the nature of reality. 5. A classification structure based on a set of types, properties, and relationships. It is an aggregated faceted classification as a complete collection. This is very relevant for computer programming in that ontologies comprise collections of objects.

Open Source Information

Intelink-U, formerly known as Open Source Information System (OSIS) is a virtual private network for the exchange of unclassified intelligence information.

A concept for the sharing of information that inherently exposes secrets through aggregation, inference, and interaction.

Order-Sensitivity

Decryption fails if the order of the application of multiple encryption keys is not reversed. In other words, if the first key applied to data is "A1B34840D4848DF092833FC4B"h, the second encryption key applied is "045BE7435CFA345BB3B56EE00"h, the first decryption key is "045BE7435CFA345BB3B56EE00"h and the second is "A1B34840D4848DF092833FC4B"h. DigitalDoors is order insensitive, and can be Secured infinite times and restored in any order infinite times or delivered through the Defense-in Depth facilities.

Padding Placeholders

A device to mark a position, relative position, or location for out-of-sequence or partial reconstitution when the recovery information is inclusive, exclusion, granular itemized, or in the rare instance when replication or fault-tolerant failover cannot reconstitute the extracted information. The presentation of this placeholder can also be suppressed with contraction. Padding placeholders can be suppressed as null sets, fixed-length special characters, or random substitutions.

Placeholder

A device to mark a position, relative position, or location that is independent of its purpose, content, context, or concept. The placeholder can be displayed as special character(s) or images and the actual display can represent the exact size of the extraction, a randomly sized substitution, or a null set so as to suppress delivery of information through position, width, frequency analysis, context, Patchwork 1. Inferior effort to complete or resolve problem. 2. A method of Steganography where a block of data is imbedded as a visible part of an image that might not be so obvious, such as a Microdot.

Perimeter

The demarcation of a presumed closed set. The enclosure of resources by a surrounding protection mechanism at the demarcation.

Perimeterization

The attempt to create a closed set with a surrounding for the purpose of enabling security.

Personally Identifiable Information

Any an all categories of information that is useful to indicate or de-identify a specific individual. The definition applies to categories of information, like social security number, account numbers, or date of birth, under HIPPA Safe Harbor regulations and other legislation. PII is also physical characteristics, tattoos, histories, likely locations to find an individual or relatives of the individual, or even aggregated categorical information that can be used to expose an individual. PII includes any characteristics that can uniquely identify or force the reidentification of an individual, or statistically denote groups likely to include individuals of interest. PII does not reflect the results of aggregation, inference, or interaction on lesser information pooled to identify the individual. Abbreviated as PII.

Physical Separation
See Separation.
PII
Abbreviation for Personally Identifiable Information.
Pooled Data
See Aggregation.
Pooling
See Aggregation.

Plurality

The assumed precondition that DigitalDoors security software data-oriented access supports input and output to 0, 1, 2 or an infinite number of files, paths, or streams. Source and target definitions are collection-oriented; zero or a single path definition is really the special case and multiple path source or targets is the usual case. As such, BLM compliance with inclusivity or exclusivity, and granular itemized recovery streams presumes multiple hierarchical files for the active sensitivity levels and granular extractions. These multiple hierarchical files can exist on a single local storage path or dispersed to a virtually-infinite array of remote, networked, or linked UNC or X-linked locations.

Pragmatics

The practical use of signs by agents or communities of interpretation within particular circumstances and contexts.

Privacy

1. A method, desire, or process to maintain personal, business, or corporate identity without releasing it to others. 2. A method to encrypt and hide packet data from eavesdropping. 3. Privacy is a subset of security where access and usage control is function of stewardship.

Projection

The partial or full representation of a source data file; in toto without extractions; extractions alone; or a reconstitution of the Source Data Streams using the destination data streams (extraction streams and reconstitution streams) where extracted objects are partially or fully represented by nothing, placeholders, substitutions, replacements, barcodes, or serialized tags with a major distinction that the data streams require to reconstitute the Source Data Streams are integrated together from separate network, data, communication, optical, or wireless channels. The termination is the representation itself, with no further access or processing allowed.

Proxy Server

A device that implements the technique and the technique used to cache information on a Web server and acts as an intermediary between a Web client and that Web server. It basically holds the most commonly and recently used content from the World Wide Web for users in order to provide quicker access and to increase server security.

Pseudo-Anonymity

A method, desire, or process to maintain personal, business, or corporate identity by substitution false, counterfeit, or a lack of information.

Purpose

The intent, assumption, presumption, known rationale for controlled release of granular content (subject to rules and policy enforcement).

Qualitative Measurement

An evaluation that can be tracked by descriptions of thinking and behavior. See also Quantitative Measurement.

Quantitative Measurement

An evaluation that can be tracked with numbers (e.g., return on investment, revenue generated, costs, absentee days). See also Qualitative Measurement.

Random

1. A statistical term referring to a process with outcomes in a defined sample space—random does not mean chaotic, indiscriminate, or arbitrary. 2. A technical term referring to events with no formal interrelationship; events that occur with equal probability.

Randomness

The state of being random.

Reconstitution

The full representation of a Source Data Stream from extraction streams and recovery streams, in toto, as a display or restored as a data stream for secondary or subsequent processing. This is a verbatim recreation of the Source Data Stream or file. (Xerox calls this reverse redaction, while Microsoft calls this function inline translation in relation to the Digital Asset Store; added 02-28-08).

Recovery

A container with the extracted information, commands for the complete restoration of the original source, and optional information about the source. This information can be consolidated, inclusive for all dominated sensitivity levels, exclusive to a single sensitivity level, or granularized such that each item is a separate container for each tear line or extraction.

Recovery, Consolidated

A format that includes recovery information for all granular items.

Recovery, Exclusive

A format that includes recovery information for a defined sensitivity level.

Recovery, Granular Itemization

A format that includes recovery information for a single specific tear line or extraction item.

Recovery, Inclusive

A format that includes recovery information where the remainder information includes all granular items up to and including the dominated sensitivity level. See also Dominated Rollup.

Recovery, Stacked

A format that includes recovery information where the remainder information includes all granular items up to and including the dominated sensitivity level. See also Dominated Rollup.

Recovery Information

A file or stream containing the extracted information, commands for the complete restoration of the original source, and optional information about the source.

Recovery File

A file or stream containing the extracted information, commands for the complete restoration of the original source, and optional information about the source.

Recovery Script

See Recovery.

Recovery Stream

A destination data stream of objects removed from a Source Data Stream with sufficient information and direction to project a presentation or reconstitute the Source Data Stream. See topic recovery for standards on recovery stream metadata.

Reconstitution

The process used by DigitalDoors to blend the extracted data back into the source (Secured DigitalDoors) skeleton. The process spans the point where no extracted data is restored to the skeleton to where all is returned. This is controlled by user, authentication, and other controlling modes. Microsoft calls this process inline translation.

Redacted Document

See Objective Security Compliance for Universal Distribution.

Redaction

The process of creating a secured DigitalDoors data stream. See also extraction.

Reference

A connection, link, or similarity between two different resources.

Reference Monitor

See Security Reference Monitor.

Reflexivity

The condition that exists when a situation or meaning is self-identical to its antecedent, the premises is equal to the consequence, or where a tag, metatag, metadata, formatting, or other situational description adds information to the actual data stream content.

Release Risk

The inverse relationship between the reconstitution of more granular content and the level of risk. The more content that is released, the higher the resulting risk through aggregation, inference, and interaction.

Remainder

The resulting source after it is secured by DigitalDoors through selection, extraction, and redaction. The result is normally the lowest common denominator suitable for distribution to any party with any defined or unknown sensitivity level. A remainder without content is an universal redaction, Skeleton, or a Ghost.

Remainder Contraction

The resulting source after it is secured by DigitalDoors through selection, extraction, and redaction without placeholders, white space compression, and reformatting to mask extractions Remote Monitoring The process of tracking process, security, functionality, and other flows by means of remote data gathering.

Remote Visual Identification

A method to identify and authenticate a person based on remote video viewing.

Replication

The automated copying of base-level output in primary storage location(s) to multiple secondary, tertiary, off-line, and knowledge management sinks, and many other storage locations in order to provide security, survivability, and privacy.

Retrofit Security

Security that is added after the fact in order to address known, perceived, or anticipated flaws from recurring. Retrofit security is rarely proactive simply because it represents a patterned response derived from prior attacks. Retrofit security is binary, providing a single mode of protection, such as access or no access, and delivery of data through the firewall or denial of that delivery.

Risk Dynamics

This represents the forecast of what the risk needs might be under different contexts or future times. It is an estimation of data will decay or increase in risk due to the ever-changing ecosystem.

Risk Mitigation

A security based on the concept that barriers, firewalls, access control, and protection of the infrastructure is impossible and will fail but that other methods can potentially provide the continuous adequate performance of critical services and functions after a successful attack or natural disaster.

Role

A functional assignment with aggregated need-to-know security access control that is separate from sensitivity level and compartment stratification.

Role-Based Security

Access control based on a defined roles rather than on user authorization through sensitivity level and compartment dominance.

Rollup

The aggregation of recovery information dominated by the sensitivity level and/or compartment. In other words, recovery information for [S] would include [C] and [U].

Safe Harbor

A provision of a statute or regulation that reduces or eliminates a party's liability under the law, on the condition that the party performed its actions in good faith. Legislators include safe-harbor provisions to protect legitimate or excusable violations with due diligence.

Safe List

A register of entities that are acceptable and require no additional attention. This terminology is included here to contrast the difference between the safe list and a black list that has different connotations based on how it is used. Contrast to black list. Also known more generally as white list. See also gray list.

Sandbox

The establishment of a presumed closed set within a larger open or presumed closed set for security of process or data. See also microperimeter.

Sanitizing

The process of modification of a secret document such that is becomes unclassified through the process. Also Downgrading.

Scarcity
An economic principle describing the natural or artificial shortage of a resource. Scarcity tends to increase the value of that resource and when it provides unique utility, increase its demand as well. The scarcity of information is a foundation for security, where scarcity is both physical, natural, and artificially created by dispersing the information in pieces so that it no longer represents a functional risk.

Search
The process that looks through documents for specified keywords and returns a list of the documents where the keywords were found. Keywords are often called search terms.

Search Convergence
The metasearch process of validating, substantiating, and establishing the integrity of the fundamental search.

Search Divergence
The metasearch process of expanding the content, context, and concept beyond the strict scope of the fundamental search.

Search Terms
Single words or phases and, words combined with Boolean terms (such as, and, or, not) used as keys or indexes in unstructured text, structure data stores, or relational databases.

Secure
The process of creating a Secured DigitalDoors data stream. See also extraction.

Secure Maintenance
The process of setting user, process, system, or other configurations by means of a password-controlled and authenticated security system.

Secured DigitalDoors
Documents or information that were formerly secret.

Secured DigitalDoors Stream
A destination data stream that represents the Source Data Stream without the extracted objects; where the extracted objects are represented by nothing, placeholders, substitutions, replacements, barcodes, or serialized tags.

Security
The set of functions concerned with ensuring that only legitimate users of the network can use the network, and only in legitimate ways. Ensuring that private information remains private in an atmosphere where all other information is free. Security also means that viruses are prevented from infecting people's systems.

Sclassification
1. The process of determining and designating the specific degree of protection against release that the information requires. 2. The degree of protection so determined. Note: Examples of security classifications are: 'top secret,' 'secret,' and 'confidential' See also Security Label, Sensitivity Level, Compartment, Role, and Mission.

Security Dynamics
This represents the forecast of what the risk and the security needs might be under different contexts or future times. IT is an estimation of data will decay or increase in risk due to the ever-changing ecosystem.

Security Label
A tag representing the sensitivity level of a subject or object, such as its hierarchical classification ('top secret,' 'secret,' and 'confidential') together with any applicable nonhierarchical security categories (e.g., sensitive 'compartmented' information, critical nuclear weapon design information).

Security Level
The combination of a hierarchical security classification and security categories that represents the sensitivity level of an object or the security clearance of a subject.

Selective Redaction
The process of granular removal of all content within a data stream that conforms to all specified DigitalDoors filters and sieves and is applicable to the creation of DigitalDoors Versions. See also Generic Redaction.

Sensitivity Level
Orange book definition for hierarchical access control based on need-to-know where is information release is limited to a single defined upper bound or dominated by that upper bound. Examples include TS, S, or C for 'top secret,' 'secret,' and 'confidential' which are common notational examples for a wider range of tags that can include "Sensitive But Unclassified" or "release to NATO."

Provide Security.

Security by Obscurity
This is a controversial principle in security engineering, which attempts to use secrecy (of design, implementation, etc.) to provide security Also called security through obscurity.

Security Reference Monitor
Any edge security device or control that validates tamper proofing, always available, and has a smallest enough test set to exhaustively invoke. It often is implemented as an access control concept that refers to an abstract machine that mediates all accesses to objects by subjects. A reference monitor should be (a) complete (i.e., it mediates every access), (b) isolated (i.e., it cannot be modified by other system entities), and (c) verifiable (i.e., small enough to be subjected to analysis and tests to ensure that it is correct). This is the only effective tool known for system design and implementation and thus is the "heart of security" as embodied by the DigitalDoors process.

Selection
The DigitalDoors process in which electronic data is sought, located, secured, and searched for classification and identification of elements for security through extraction. See also electronic discovery.

Selected and Critical Information
Words, text, phrases, terms, sounds, and parts of images designated to be privileged, confidential, identifying of personal or organizational identity, and having distinguished economic worth, where designation occurs specifically by inclusion data sets, parts of speech, sound, or image context through other means of artificial intelligence. See Critical and important data.

Semantic
Pertaining to the meaning of a word, phrase, audio, video, or other content.

Semantics
The study of meaning that are expressed in a language, code, or other form of representation. Semantics is contrasted with two other aspects of meaningful expression, namely, syntax and pragmatics.

Semantic Trees
A method of data mining based searching for relevant hits, then creating a tiered ranking of found matches, indexing these matches, and then returning a limited number of the most semantically relevant results.

Semiotic
Pertaining to the study of signs and symbols.

Semiotics
The study of signs and symbols, both individually and grouped in systems. This science of meaning extends beyond the signs and symbols used to communicate to include the intended, unintended, and covert delivery of ideas. It includes the study of how meaning is made and understood in biological, human, and machine communications.

Sensitivity Level

A hierarchical structure of secrecy, security, or value for information usually represented as labels or tags such as top secret and applied as [TS], [S], [C], [SBU] and [U].

Sensitivity Level Hierarchy

A reconstitution option to include all dominated sensitivity levels with the target sensitivity level or alternately to exclude all superior and dominated sensitivity levels for a report that includes only the items exactly of the target sensitivity level. The options are either inclusionary or exclusionary.

Separation

Logical versus physical. Issue blurred. See Physical Separation.

Service-Oriented Architecture

A method for implementing an Enterprise Application Integration. The principal aspect of Service-Oriented Architecture (SOA) is the separation of the service interface from the implementation so that services can be integrated and consumed by clients without concern for how the functions and features are actually implemented. SOA can also be viewed as the exposure of a software process as an interface. The application programming extension in effect has been expanded from built-in language functions to DLL libraries of practical calls to larger SOA application assemblies. The disadvantages will be SOA-Hell where rampant versions will break the distributed infrastructure.

Silo

Any repository that is functionally disconnected from operations, organizational works, or other communities of interest. The lack of connectivity provides a measure of sanctuary that is not security. A silo often is formally protected by an air gap, MLS, or the lack of workflow integration. See also stovepipe.

Situational Access Control

Access control that is not merely driven by 1- or 2-authentication but also moderated by the current state of the system, network, or database. For example, access to payroll might not be granted Sunday access, whereas all access might be denied if the administrator has evidence of a break-in.

Skeleton

The resulting remainder form or template that is generated by securing a data stream of
all its critical and unimportant data.

SOA

See Service-Oriented Architecture.

Software as a Service

A model for software delivery where the vendor provides maintenance, daily technical operation, and support for the software provided to their client. SaaS is a model of software delivery rather than a market segment; software can be delivered using this method to any market segment including home consumers, small business, medium and large business. The key characteristics of SaaS software, include: network-based access to, and management of, commercially available (i.e., not custom) software activities that are managed from central locations rather than at each customer's site, enabling customers to access applications remotely via the Internet application delivery that typically is closer to a one-to-many model (single instance, multi-tenant architecture) than to a one-to-one model, including architecture, pricing, partnering, and management characteristics Source Any data, data flow, or structured (record-oriented, field-oriented, database, metadata, hierarchical, typed, or defined by usage) data delivered and captured for processing. The Source Data Stream may be wiped securely and/or deleted during processing, or saved, encrypted, and relocated. See also Source Data Stream.

Source Data Stream

Any data, data flow, or structured data delivered and captured for processing. The Source Data Stream can be destroyed or deleted during processing, or saved with optional relocation or encryption. See also Source.

Stacked

The aggregation of recovery information dominated by the sensitivity level and/or compartment. In other words, recovery information for [S] would include [C] and [U].

Steganography

The process of digital watermarking; that is the process of hidden information as background noise within another obvious analog image or sound file for security reasons. Usually, this technology hides small amounts of text, such as a watermark, ownership, or copyright, inside a very large image file and achieves very low rates of efficiency.

Stewardship

The responsible legal use (including conservation) of a resources in such a way that takes full and balanced account of the interests of owners, society, future generations, and other species, as well as of private needs, and accepts significant moral and even actionable legal liability to society. See also custodianship.

Stovepipe

Any antiquated process or repository or even a purpose-specific operation that is functionally disconnected from line-of-business operations, organizational works, or other communities of interest. Isolation, air gap, disinterest, lack of mainstream value provide some sanctuary but no real security. See also silo.

Strikeback

Security countermeasures initiated after breach or violated that employ methods to trace the source of the intruder and apply destructive means against the intruder platform. Note that strikeback often create more harm to the damaged, neutral, or comprised parties than to the attacker, terrorist, or enemy because violations are often hoaxes or routed through unaware third parties to create plausible deniability.

Strong Declassification

The process of separating or processing (Downgrading or Sanitizing) secret (e.g. top-secret, secret, and classified) documents into those which are definitely unclassified and definitely classified without any margin of error. See also Weak Declassification.

Structure

A schema, format, categorization, or other taxonomy applied to information to delineate a purpose or usage. A structure is but a single rendition of many possible that can add a context or concept to the information.

Structured Data

1. The application of a specific tagging system to information predicated upon a specific usage or purpose. 2. Any data stream that contains a formalized layout defining the arrays, fields, format, the hierarchical tree, and the purpose of the data within. 3. Any data stream that includes a taxonomy. Note that the structure can be defined either internally, externally, or combinations thereof by means of data table definitions, tags, metatags, metadata, style sheets, formal requirements, and specific program code that parses and extracts data items. Structured data includes databases, records, field-oriented data sets, HTML, XML, most MS Office documents saved and conforming to a document object model, and almost all packet-delivered messages such as e-mail. Because a data stream with an available data structure can be parsed and individual items can be classified within a formal taxonomy, definition 3 is usually a natural consequence of definition 2. Structured data is not to be confused with data structure, which defines the layout of the structured data. Structured data retains its structure only within context or concept, and in fact can also be perceived as unstructured when the context for a useful structure is not obvious. See also unstructured data.

Subjective

A method of dealing with perceptive and interpreted evidence.

Suppression

The process of masking the existence of granular extractions or complete tear lines through the contraction and reformatting of the data stream.

Surveillance

The process of filtering electronic communication in real-time for breaches of security or potential threats.

Survivability

The continuous adequate performance of critical services and functions after a successful attack or natural disaster.

Syntax

The construction of complex signs from simpler signs.

Tag

An applied designation or categorization for a defined range of information. It can be in-channel, out-of-channel, or bracketing the range to specify the relevance of the application of the tag. A tag can be the [TS] marking within a tear line, the <start><\end> in HTML, SGML, or XML. Tags can also exist as a hierarchical or referential metadata in separate data streams, as typically handled within DigitalDoors. See also label.

Tag Cloud

A collection tags often developed by different and arbitrary users for each's own personal benefit and presented so that visual or utilitarian emphasis corresponds to relative importance.

Tagging

The process of applying a label or tag based on a classification.

Target

And word, part of a transaction, data field, phrase, sound byte, part of an image, or segment of a multimedia stream (motion, audio, video, text overlays, etc.) for which the limits of that data are specifically fixed automatically or by offset with a larger data stream or document. For example, the targets within "George Bush ignored the press corps on immediate military response to Indonesian riots" are likely to be "George Bush" and "Indonesian".

Taxonomy

1. A subject-based classification system. 2. A system of applied categorization. 3. A definition of the relationship between categories or nodes of information. It is typically a hierarchical structure used to classify information within a knowledge base. 4. One application of an ontology within the set of possible.

Tear Line

Non-shareable information within a document below any designating point in the document. In other words, a document is segregated into paragraphs of decreasing (downward) sensitivity levels so that it can be distributed in a shortened length to recipients with lower sensitivity levels and greater length to those with higher sensitivity levels.

Topic Recovery

An SGML or XML document used for navigation—by people or by machine—within an information set. The DigitalDoors directory and recovery information falls within the concept of topic recovery. A single information set can include any number of types of source data: for example, HTML files, PDF files, and databases could all be part of one information set. A Topic Recovery(TM) can be either embedded within a document, or may be, itself, a separate document. A Topic Recovery provides a particular view of topics within the information set. There could be, potentially, an infinite number of different TMs for any information set: for example, an information set dealing with the plays of Shakespeare could have a TM for navigation within the perspective of Elizabethan culture, or the perspective of themes throughout the plays. Each TM explicitly declares topics and provides links to relevant information. Topic recoveries are an ISO standard for the representation and interchange of knowledge, with an emphasis on the 'findability' of information. The standard is formally known as ISO/IEC 13250:2003.

Touchpoint

Any access point, system, conduit, or workflow that exposes an information item to exposure. This is PCI definition, but recognizes the aggregation, inference, and interaction risk when even secured information is accessible within a workflow and brought through any perimeter barrier, however transient the duration, and creates additional unanticipated risks. A touchpoint is a transient or even permanent breach of perimeter security. A touchpoint is an admission and recognition of a process security weakness. See also digital door.

TPM

See trusted platform module.

Tranquility

A formal Bell-LaPadula Model (BLM) principle that data access control and documents once assigned to a sensitivity level cannot be reassessed. DigitalDoors both adheres strictly to this policy but also extends information sharing functionality through granular content control with dispersion variations that retain strict security and privacy while enabling cross-domain sharing.

Trap Door

A mathematical operational that is easy to complete whereas the inverse of that function is computational infeasible without extra information such as a key (encryption key). See also back door.

Triple-DES

A variant of DES that encrypts data or a message using 56-bit DES three consecutive times using a different key for each pass. It sometimes refers to a key size three time longer (168 bits) than the standard 56-bit DES.

Trojan Information

The inclusion of information that initiates a risk, leakage, or exposure when it is upgraded or downgraded through an MLS or any other information sharing system that is either intentional or unintentional.

Trojan Horse

A innocuous-looking software program that may not do anything obvious or visually noticeable but nonetheless designed to disable, bypass security or audit options, damage, or destroy computer hardware or read/write storage systems. Typically used by disgruntled employees to damage computer operations.

Trust Exploitation

This is a description of how an attack works when a dependable resource within a network (both social or technical) takes advantage of its special position. This can be combined with access control flaws to counterfeit the position of a dependable resource as well.

Trusted Granular Content Control™

The DigitalDoors paradigm shift that includes the structure of information, the nature of meaning and semiotic content, context, and concept, the format and structure of file and information storage, metatag and metadata, and the compound and hierarchical layering of knowledge. Because an individual item within the data stream, thus "granular" data, is assigned to a multitier hierarchical overlapping tag structure, an individual item can be distributed subject to sensitivity levels throughout a trusted network and to trusted platform modules or workstations. See also Granular Content Control.

Trusted Guard

An automated (software) application that performs reviews of security materials and authorizes release based on security policy.

Trusted Platform Module

A chip or infrastructure which stores digital keys, certificates and passwords that allow servers to "talk" to each other. The new specs include a new remote attestation feature that allows a third party to check to see if a box has been tampered with or compromised by a hacker attack or a virus. Another feature is key storage, in which encrypted keys help store data. Abbreviated as TPM.

Trusted Network Architecture

A functional design of a computer network infrastructure that provides end-to-end security over access, authentication, process, transmission, and data control. Abbreviated as TNA.

Trusted Network Infrastructure

See Trusted Network Architecture.

Unauthorized Disclosure

The release and exposure of data without the expressed policy of the security system.

Underground Economy

The network of people that trade in information.

Universal redaction

The process of granular removal of all content within a data stream that conforms to all Digital; Doors filters and sieves leaving a remainder that unconditionally conforms to unclassified distribution policy. See also generic redaction and selective redaction.

UnSecured Digitaldoors Stream

A destination data stream that represents the Source Data Stream with the extracted objects; where the extracted objects are represented by the original data objects in full or partially; if partially, by nothing, placeholders, substitutions, replacements, barcodes, or serialized tags.

Unstructured Data

1. Any data stream that that apparently lacks any formalized layout defining the arrays, fields, format, the hierarchical tree, and the purpose of the data within. 2. Any data stream that lacks a taxonomy. However, data streams that appear to be unstructured, such as documents, e-mail, IP voice, video, web documents, and reports, frequently contain tags and metadata and so actually conform to a document object model and therefore are really structured data by definition 1. For the purposes of data mining, search, knowledge management, connecting-the-dots, and library sciences such data streams frequently lack categorization or a formal metadata taxonomy, and therefore are unstructured data by definition 2. By right, all unstructured data might have a structure when the appropriate context or concept is supplied. See also structured data.

View

A reconstituted source data stream in full or in part.

Viewing

The process of reconstituting a source data stream in full or in part.

Version

A redacted MLS or MILS document with items (selected for extraction and dispersion) included up to the allowable level of the defined MLS or MILS sensitivity level.

Versioning

The automatic or manual redaction and (re)labeling of a document into one, two, or many outputs according to its clearance—in order to enable information sharing with parties holding different and varied clearances.

Versions

The results from automatic or manual redaction and (re) labeling of a document into one, two, or many outputs according to its clearance—in order to enable information sharing with parties holding different and varied clearances.

Watermark

1. A logo, image, or design embossed or added into the paper to indicate its source. 2. A proof attached or interleaved into an electronic file to indicate copyright, ownership, or original material.

Watermarking

The process of adding a watermark to a data stream (data, text, image, audio, or video, et cetera.)

Weak Declassification

The process of separating or processing (Downgrading or Sanitizing) secret (top-secret, secret, and classified) documents into those which are definitely unclassified, which a reasonable degree of accuracy. See also Strong Declassification.

White List

A register of entities that are acceptable and require no additional attention. Contrast to black list. See safe list. See also gray list.

Winnowing

1. A process of deleting important data from within data to obscure its message. 2. More traditionally, it means the application of a checksum to validate the integrity of the data.

A.1 Creating an Information Infrastructure

With respect to unstructured data (including semi-structured data) in information files, the prime considerations in creating an information infrastructure involve a recognition of different service levels, different retention-destruction periods for the files and different protective measures imposed by legal, security and compliance requirements. Confidential data may involve the enterprise, its employees, its customers and/or third parties. Further, the enterprise should gather, control disseminate and utilize its intellectual property (IP) rights in and to the data in unstructured data files. The current mind set relative to an open informational ecosystem, wherein employees of an enterprise, at many levels, openly communicate with enterprise partners, customers, vendors, contractors and other third parties, results in many communications paths wherein confidential data and IP data is subject to dispersal, misuse and theft. Concern over hackers accessing such sensitive data, rogue insiders taking and misusing the data and accidental loss of data by authorized users requires that the enterprise build an information infrastructure to identify, contain and classify the confidential data and IP data.

Information Rights Management (IR Mgt) can and is presently imposed on data files with the use of data file metadata, tags or labels. For example, the file property may be set at "Read Only" which limits revision rights. However, the content in information files is not subject to many controls. IR Mgt (a) controls the open, print and edit functions; (b) limits access, permissions, and distribution; (c) establishes and permits changes to permission levels; and, (d) provides and audit trail. Since the value of the information changes over the life cycle of the information file, oftentimes due to events and objects outside of the information file itself, it is the content that should be managed and subjected to an information infrastructure.

The present invention employs an extraction engine which identifies, selects and then extracts the security sensitive content (sec-con) or select content (SC), a classification engine that assists the user (the enterprise's CIO) to classify and organize the content, and a vibrant testing cycle to continually challenge the sec-con store, the sec-con security levels and the quality, breadth, depth and scope of the SC store. The classification engines can be used by the Chief Information Officer ("CIO") to establish information infrastructure policies and re-set the extraction engines to enforce the policies (data acquisition and handling rules) established thereby.

A.2 Sampling and Creation of a Simple Info Infrastructure

As discussed above, mission critical data is oftentimes captured in structured data compilations such as databases and spreadsheets. Herein, a "spreadsheet" is included in the definition of a database because a spreadsheet is a two dimensional database. Therefore, confidential data in unstructured information files which matches some or all of the data in structure files represents the initial starting point to define mission critical enterprise data. Some of this some of this mission critical enterprise data represents secret or confidential data of various parties (the enterprise, its partners, customers, vendors, contractors and other third parties) and IP data of various parties. Data from the structured files initially can be used as a content filter to extract the same confidential information from unstructured files and store the security sensitive sec-con data in extract stores as explained later herein. A simple classification system (hierarchical taxonomic system) can be established by reviewing the label descriptions on the structured data and then expanding class definitions with the use of the knowledge expander KE search engine described later in section C.2 and C.22, among others. The data and information returned from the KE engine can be used by the CIO (system administrator) to create increasingly broader or higher levels of data classifications. The hierarchical taxonomic system can be used to build contextual filters and taxonomic filters which can further protect sec-con data and expand the value and quantity of SC data. Once the CIO has established the classes of data, he or she can set policies for (a) storage and retention; (b) extraction—dispersal—access—release; and (c) levels of service and permission levels.

After removal and secure storage of known security sensitive data from unstructured data sources (using filters designed from structured data sources), a review of unknown data in unstructured files may be appropriate.

A.3 System Tools and Processing Methods for an Information Infrastructure

Figure 1B:
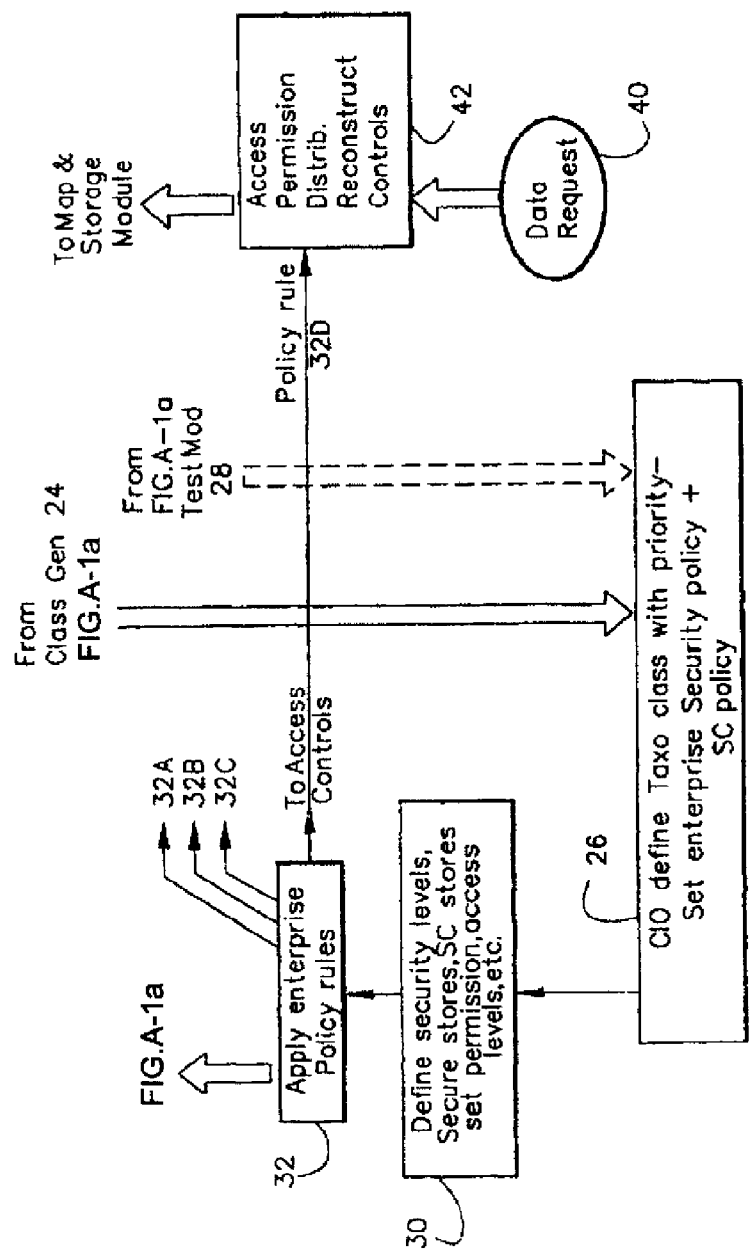

FIGS. 1a and 1b diagrammatically illustrate a basic system diagram, method and flow chart for an information infrastructure. The infrastructure is a dynamic process and hence the CIO or system administrator can enter the process at many points. Information (Info) infrastructure 10 includes a number of modules or process routines or functions which are described in detail in sections B.1-D.14. The prime operational modules or functions are set forth in FIGS. 1a, 1b (which is a composite of FIGS. 1a and 1b). The prime objective of the info infrastructure is to process data from source document or source information file 12. The source is first processed via an editor module 14 to deconstruct the source doc into its constituent parts. See sections C.14-C.22, and more critically, section D.1.

After deconstruction (which may be optional per the system operator's choice), the infrastructure processes data with extraction module 15. Extracted data and remainder data is processed by secure storage Sec-Con module 16 and, if appropriate to the CIO's designed task, the select content SC storage module 17. The extraction and secure store is discussed throughout the specification but is particularly discussed in sections B.1-B.6. The select content SC store module is discussed in sections C.1-C.13. C.20-C. 22. The use of an editor module in sections C.14-C.19 is used to process input data which, after such processing, is applied to the content filter modules, the context filter modules and the taxonomic filter modules. The system coordinates storage of data with map module 18.

Extraction module 15 handles input from content filter module 20, contextual filter module 21 and taxonomic filter module 22. The infrastructure system and process is adaptive therefore the extraction module also outputs data to filter modules 20, 21 and 22. Content filters are discussed in many places in the specification (see particularly sections B.4, and C.12). Since the extraction is employed with the (a) security system and (b) the knowledge expander KE system to generate select content SC data, this dual purpose both feeds data to the filters modules 20, 21 and 22 and accepts data therefrom to define the filters used to extract critical data from the data flow. A contextual filter module 21 is employed in an infrastructure security system in order to assure the CIO-system operator ("sys-admin") that (a) the source document (source doc) is properly scrubbed and (b) to add new words, terms or data objects to the list of security sensitive data objects of concern. See sections B.4, C.13, C.20. The new data objects become content filters for another processing cycle for a new source doc. When configured as a knowledge expander KE infrastructure for select content SC, contextual filters increase the SC data extracted form the source doc and increase the value and informational content of the SC store. The taxonomic filter ("tax-filter") permits the sys-admin to employ a higher conceptual layer on either the security extraction or the SC extraction and compilation. Tax-filters are discussed in sections C.1-C.22 and particularly in sections C.1, C.11, C.14, C.21 and C.22.

The sys-admin may use the info infrastructure with an existing classification system and information policy, ruled-based or may have no pre-existing classification system for his or her documents. The infrastructure process 10 includes a classification generator module 24 which employs an SC extractor, a KE search engine to generate additional supplemental documents (supple docs) which the sys-admin may use the create the hierarchical taxonomic classification system. otherwise, the sys-admin may purchase taxonomic classifications commercially from others. However, the sys-admin must ultimately prioritize the hierarchical taxonomic for the enterprise. The taxonomic system can be created by operation of the modules in sections C.1 through C.23. The KE expander module can be configured to list docs and data entries and this listing can be used by the sys-admin to (a) build the hierarchical taxonomic and (b) prioritize the classes. Once the hierarchical taxonomic classes are gathered, the sys-admin defines which tree, branch and leaf is critical in module 26, then defines (or redefines) security levels, sets secure stores, ids SC, sets SC stores and sets permission levels, service levels, access levels and other policies for the enterprise which policies are translated into a rules-based system for the processing of data. Module 32 applies the rules 32A, 32B, 32C, and 32D to filter modules 20, 21 and 22 and to the access-permission module or control function 42. Data requests 40 from others are input into access, permission, distribution, reconstruction control module 42. Features and functions for this module are discussed in sections B.7, B.8.

C.9-C.14, C.20-C.23 and in the applications D.2 through D.14. The request for data may be an alarm function or may be a data request form another. The info infrastructure then cycles back to source doc 12, editor module 14 and extractor module 15.

To test the security levels and system, the sys-admin may activate test module 28. Section C.0 discusses how the KE search engine is employed to test the security system.

Figure 2:
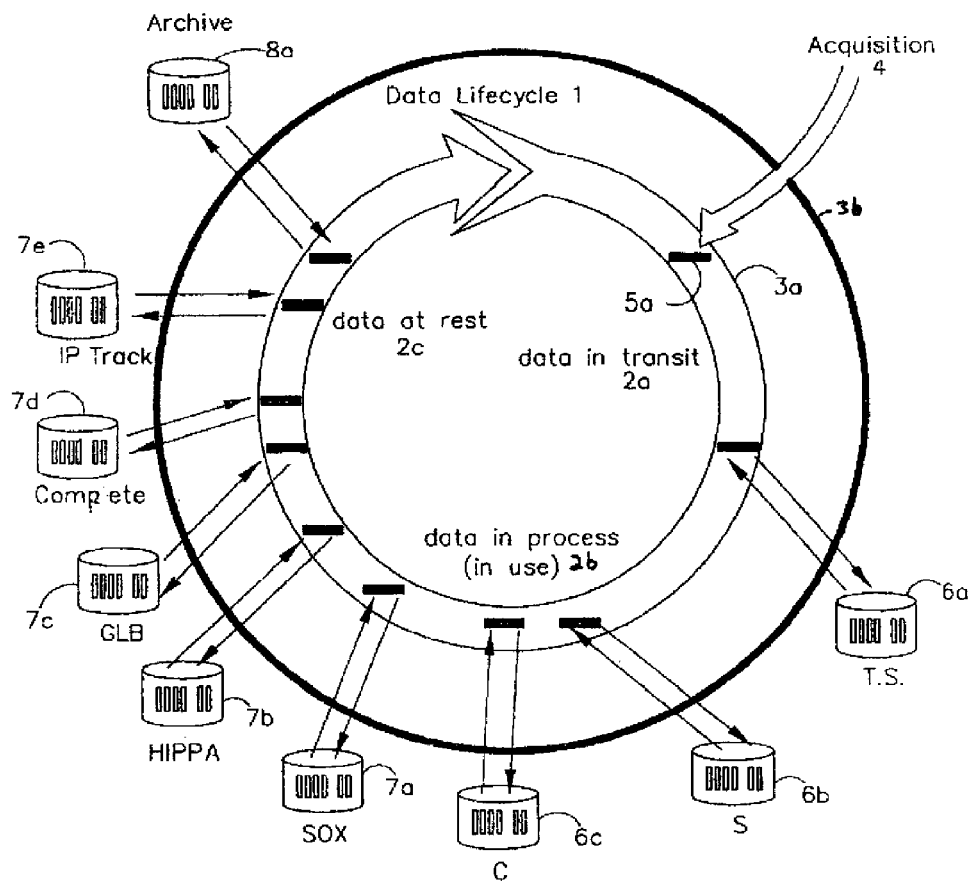
FIG. 2 diagrammatically illustrates a basic information life cycle process or system wherein secure content (sec-con) and select content (SC) is separately stored per categorical filters operable by the enterprise.

FIG. 2 diagrammatically illustrates a basic information life cycle process or system wherein secure content (sec-con) and select content (SC) is separately stored per categorical filters operable by the enterprise. Data lifecycle 1 in general begins with an acquisition 4 and process or storage 5*a* in the enterprise distributed computing system or environment represented by data lifecycle ring 3*a* and outer ring 3*b*. Storage memory units 6*a*-8*a* are part of the distributed computer system of the enterprise. However, the enterprise may contract out the storage facilities. In any event, the enterprise controls storage 6*a*-8*a*. Some storage units 7*a*-8*a* may be combined. However, archive storage 8*a* may be less expensive (slower process and access time) than the SC storage units 7*a*-7*e*. Further, the filter SC storage units 7*a*-7*e* may be in a single memory, and simply segmented by control parameters. In general, as explained in sections B.1-B.8 and others (see D.7-D.9), the memory units 6*a*, 6*b* and 6*c* are distinct and access to these sec-con stores is controlled with software or hardware guards (see section A.23 or D.6) or the extract stores are physically separate. Some data stores may be copy protected.

Data on the right side of inner enterprise ring 3*a* is in transit 2*a* due to acquisition 4 and other high frequency access, distribution and processing aspects (service levels). A high service level may be assigned to data in transit 2*a*. Data in process section 2*b* is undergoing manipulation and processing by the enterprise. This may include the use of sec-con filters and extraction to top secret TS store 6*a*, secret S store 6*b* and classified C store 6*c*. Remainder data is kept in the enterprise store in ring 3*a*.

Enterprise designated categorical filters are used to store select content SC relative to the category in certain SC stores. These categories cover a wide range of topics which may be of interest to the enterprise. For example, enterprise designated filters screen data in process 2*b* for various enterprise policies including, but not limited to level of service policies, customer privacy policies, supplier privacy and proprietary informational policies (business privacy issues), enterprise human resource privacy policies, financial data handling policies (see GLB or Gramm-Leach-Bliley Act of 1999), public company reporting policies (see SOX or Sarbanes Oxley Act or Public Company Accounting and Reform and Investor Protection Act of 2002), health care regulatory policies (see HIPPA or Health Insurance Portability and Accountability Act), technical innovation policies (intellectual property (IP) disclosures, patent disclosure systems, trade secret tracking systems), competitive reporting policies (a collection of all data on the enterprise's prime competitor) and document or data retention policies. The enterprise sets these policies and the CIO or sys-operator fashions filters which either continually or upon certain events or periodically sweep the enterprise data system, locate SC and store the SC in the relevant data bases. As a further example, technical information on a certain product may be important and, in light of the fact that 60-80% of all corporate data is in unstructured documents, the data lifecycle sweep may filter all processed data looking for that certain product. The technical filter content file is expanded to include additional contextual materials by looking at outside or extra-enterprise data, thereby creating aggregated SC data for the special technical data SC filter. With the application of a taxonomic classification system, the product specific tech filter is further expanded to cover higher classifications of product types and lower, more detailed products that relate to the target product. A cross-check operation with IP SC filter and database 7*e* also provides guidance. If the IP is very valuable, it may be stored in sec-con extract stores 6*a*-6*c*.

Figure 3:
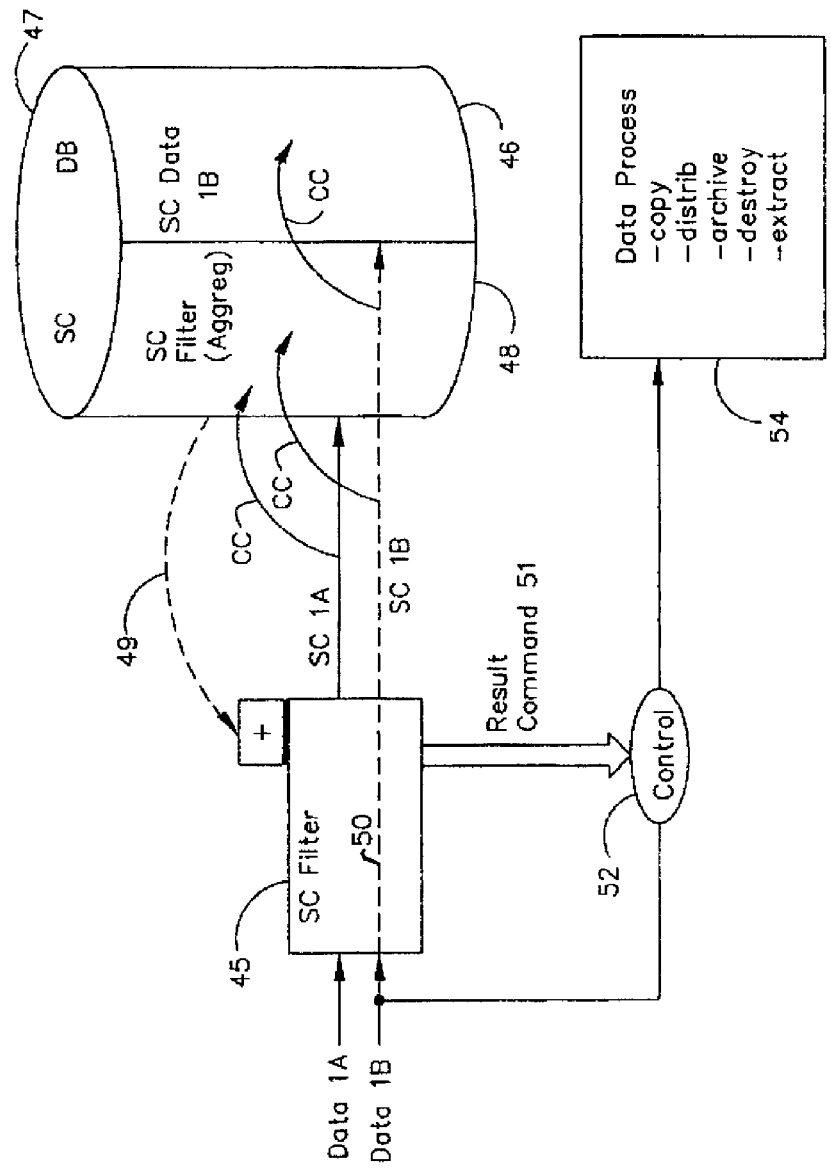
FIG. 3 diagrammatically illustrates a simplistic dynamic filter and select content (SC) storage coupled to a data processing event.

FIG. 3 diagrammatically illustrates a simplistic dynamic filter and select content (SC) storage coupled to a data processing event. SC filter 45 may be one or more of a content-based filter, contextual filter or a taxonomic classification filter. The SC filter 45 accepts, in a first instance, data input 1A and, in a second instance, further data input 1B. As explained below, data 1A may be the same as data 1B. As an example, a sequential operation is described. Input data 1A is fed to SC filter 45. The SC filter identifies SC content SC-IA and this content is sent to SC database 47. Any type of storage may be used rather than a database, however, some type of indexing is useful. The SC content copied from data input 1A is added "cc" to SC filter aggregated 48. The SC database uses the SC aggregated data to supplement the SC filter 45 with a summation+function via operational path 49.

The next process supplies further data input 1B to SC filter 45. The data 1B is processed by the filter 45 and select content SC-1B is copied "cc" to SC filter aggregation file 48 and also copied "cc" to the SC data file or structure 46. The SC aggregate is fed back to the SC filter via route 49. In this manner, the SC filter can be one or more content-based filters, contextual filters or taxonomic classification filters. This is the adaptive and dynamic filter for the categorical filtering discussed above. If data 1A is obtained outside of the enterprise, the SC filter expands. See KE expander system in sections C.2-C.22. Outside or external data is primarily to expand the filter. It is stored in the SC aggregate file. If the input data 1A is internal or intra-enterprise data, both the SC aggregate file is expanded and the sys-operator needs to know that the SC is an internal document and this internal SC-1B is stored in SC data file 46.

Data 1B is also applied to control 52. The SC filter 45 generates a result command 51 or an output control signal to indicate the presence or absence of certain SC data in data block 1B. Contextual relevance or taxonomic key words or terms may also trigger filter result output 51. This signal is applied to control 52 which activates data process 54. Some data processes are copy, extract, distribute, archive, or destroy. Further, as discussed below, SC filter 45 may be set as a screening filter which is then used to identify a certain categorical filter which then triggers the data process. Alternatively, the data input 1A or 1B may come with a data process request and the data must be filtered or scrubbed before the data process is carried out by the enterprise computer system.

Some key operations of the system and process follow. The invention organizes and processes data important to an enterprise operating the distributed computing system. The SC or select content is represented by one or more predetermined words, characters, images, data elements or data objects. The computing system has a plurality of select content data stores 7*a*-7*e* for respective ones of a plurality of enterprise designated categorical filters which include content-based filters, contextual filters and taxonomic classification filters, all operatively coupled over a communications network. An archive filter 8*a* operates with data at rest 2*c* at the top left of lifecycle 1. Aged content is subject to archiving policies or back-up policies. A data input 1A or 1B is processed through at least one activated categorical SC filter 45 to obtain select content, and contextually associated select content and taxonomically associated select content (SC-1a) as aggregated select content. The aggregated select content is stored in the corresponding select content data store 47 and, more specifically, filter aggregate file 48. A data process 54 from the group of data processes including a copy process, a data extract process, a data archive process, a data distribution process and a data destruction process is associated with the activated categorical SC filter 45 and the method and system applies the associated data process 54 to a further data input 1B based upon a result 51 of that further data 1B being processed by the activated categorical SC filter 45 utilizing the aggregated select content data per path 49.

In another embodiment, the method and system extracts security sensitive content TS or S or C (FIG. 2) from a data input to obtain extracted security sensitive data for a corresponding security level and remainder data. Remainder data can be considered left-over data which is extraneous to the sec-con or SC. It may be surplus or residue data. In this manner, the remainder data is complementary to the sec-con or SC data. This extracted security sensitive data is stored for the corresponding security level in a respective security sensitive extract store 6a, 6b or 6c. Remainder data is stored in the distributed computer system. Distribution of the data input 1A (FIG. 3) with respect to said distributed computing system is limited based upon throughput from at least one of the enterprise designated SC filter 45 (e.g., patient privacy or HIPPA filter linked to SC store 76). The controlled release of corresponding extracted security sensitive data from the respective extract TS or S or C stores 6a-6c with the associated security clearances for corresponding security levels is permitted by the system. In this manner, security sensitive content is separately stored apart from the select content, which is stored in select content data stores 7a-7e and 8a.

The sys-operator may activate ON a categorical filter or the system may be automatic. Prior to activating a designated categorical filter (see GLB SC content filter 7c), the data input 1B is processed through a screening taxonomical classification SC filter 45 which output 51 activates said at least one designated categorical filter for the sensed data input 1B. Several categorical filters may be activated, operating concurrently or sequentially, dependent upon processing speed and memory access, based upon the screening taxonomical classification filter output.

The further data input 1B may be the same as the initial data input 1A. In other words, an iterative process may be imposed on data 1A/1B. First, the SC filter 45 is used to expand the SC content, maybe to add contextual material, or to add a higher or lower classification SC data per the taxonomic filter. Thereafter, the data 1A/1B is processed again by SC filter 45 with the data process 54 associated therewith.

Regarding the initial data processing, the further data input 1B may be structured or unstructured data. If structured, the data input should be deconstructed and special attention should be paid to the structured items. In email, a partially structured data item, addressee and the addressor data and the regarding field often are key SC items for the enterprise. If unstructured data is filtered, a deconstruction process should be used. See sections C.14 and D.1, among others. The constituent data elements are then SC filtered by 45.

Activating the enterprise designated categorical SC filter 45 may be automatic or manual. An automatic activation can be is time-based (2:00 AM every day), distributed computer system condition-based (when data flow falls below x % or process speeds exceed y %), or event-based (see section D.3, D.11, and others which discuss event triggers). Activation of the categorical filter can be linked to a data process request from the group of data processes.

The data processes include a copy process, a data extract process, a data archive process, a data distribution process and a data destruction process, an inter-enterprise data distribution process, an intra-enterprise data distribution process, a data access request coupled with said data distribution process (a request to send data 1A to a newspaper via email (copy and distribute)), a data distribution denied process, and a limit data distribution process. The data process associated with a data block 1A/1B may trigger one or more SC filters or a discovery of SC in a data block 1B may cause a change in the data process from "full distribute" to limit distribution to key enterprise persons." In litigation, discussions of the lawsuit may be an SC filter topic. The groups of data processes may activate different categorical filters. The result 51 of the further data 1B processed by the activated categorical SC filter 45 indicates the presence or absence of select content or aggregated select content in the data 1B.

On the output side, the system may impose a classification taxonomy on the stored aggregated select content SC file 48. This enables the sys-op to see the scope of the filter (depth, detail, higher level classifications, orthogonal data fields, etc.). See, for example, section C.22. Preferably, the select content file 46 is stored separate from the aggregated select content 48 in the select content store 47. A separate storage permits the sys-op to see what SC data resides in his or her enterprise as compared with the scope of the filter. The system may impose a classification taxonomy onto the stored select content 46. See FIGS. 12b and 12d. Further, the stored SC 46 may be a copy of the obtained select content from data 1A/1B or may be a representation thereof in said select content data store. A representation may be a marker or pointer to an index of SC. This process avoids multiple copies of SC storage. Additionally, in order to track the origin of the data 1A/1B, the data input has a source indicator (like a URL or the path to the original document location) and the obtained select content SC-1A or SC-1B, when stored in the select content data store 46, includes a corresponding representative source indicator pointing to or linking to the source of the data. In this manner, the sys-op knows where the SC data came from. Additionally, the process may generate a tag or label responsive to the source indicator of data 1A, and the corresponding representative source indicator. The tag or label can be electronically attached to the source document to indicate SC content, importance of the SC content and category thereof.

A.4 Information Dispersal—Basic

The dispersal of information into the secure storage or the select storage, with maps to the original or source document, is one of several important aspects of the information infrastructure. The storage processes and modules provide an alternative to prior art information dispersal algorithms. A prior art information dispersal algorithm is discussed in U.S. Pat. No. 5,485,474 to Rabin and in an article entitled "Survivable Information Storage Systems" by J. Wylie M. Bigrigg, J. Strunk, G. Ganger, H. Kiliccote, and P. Khosla, published August, 2000 in COMPUTER, pp. 61-67. The present system of information dispersal can be additive to the prior art information dispersal algorithms. The present system and method can be automated to facilitate dispersal of information to remote storages upon detection of certain events. Lastly, the information dispersal techniques can provide for the dispersal of context of the whole data stream while maintaining access to the constituent parts of the content.

A.5 Alternative to Information Dispersal Algorithm

The invention provides a system and method for dispersal of plain text data and an alternative to usage of prior art information dispersal algorithms. The usage of prior art information dispersal algorithms does not permit the user or sys-admin to view or use data stored within a particular storage. The prior art algorithms permit one to view and have access to data only when data is retrieved from a few stores and then is combined together.

The present inventive process and system enables use of granular data which is which is stored in a known and accessible storage store (in defined storage locations (sec-con store or SC store). The security risk in the present system can be reduced by storing smaller and more granular pieces of data. Further, after splitting granular data from a source document or data stream, the granular pieces of data may be processed using the prior art information dispersal algorithms.

A.6 Adding Prior Art Information Dispersal Algorithms to Granular Data Dispersion The present invention provides a system and method for dispersal of granular data to distributed storage stores and the possibility to add the prior art Information Dispersal Algorithms ("IDA"). The invention provides a system and method for dispersal of data to distributed storage stores—in essence an inherent "built in" security feature. The Information Dispersal Algorithm or IDA delivers a relatively high level of security, however it does not permit nor allow access to data content for search and other Knowledge Management operations.

On the other hand, the present invention may (a) first granularly extract the data form the source, then (b) use the IDA for securing extracted granular pieces of data, one at a time. This combination brings flexibility to the system as a whole since granular pieces can be reconstituted, one at a time, and released from IDA for knowledge management operations without compromising the security of the whole document. By securing granular data pieces with the Information Dispersal Algorithm or IDA, the system's granular data parts once reconstituted by the IDA are available in system storage and are stand alone data structures—(encrypted or not). These stand alone data structures and the granular data therein can be read on their own without the need to bring together other data shares. Because extracts can be in plain text or decrypted- and stand in their own data structure, the sys-admin can authorize an advanced search and knowledge management operations through the granular data structure.

Splitting a data stream and dispersing the slices of the split data to distributed data stores creates a very high level of security. This emulates military tactics of splitting and hiding forces. In words of the great strategist, Sun Tzu, the present process and system creates "disorder from order" (the order being the source document, the disorder being the granular and dispersed data parts) and it creates a formless organization which makes it a very hard target for the attacker. The level of security may be further raised if, at the storage stores, there are strong access control mechanisms for authentication and validation of users. Dispersal of data to distributed storage stores achieves higher security as well as a lower overall security costs.

Distributed storage stores need less security then a centralized data repository for a number of reasons. First, the distributed storage stores hold only parts of the data and they are of lower interest to an attacker that will need to attack few dispersed stores to get the total content. Second, the stores are scattered and if hidden they call for less security. The need for less security means lower costs; more efficiency and less processing power. Thus dispersal of data to distributed storage stores is inherently "built in", "baked in" security. The split granular data pieces may be sent to distributed storage to be processed in an Information Dispersal Algorithm scheme. Each granular item will be split into n pieces, which will be sent to distributed storage. Reconstructed of a granular item will be enabled by access to M out of N pieces. A directory/map connects all granular pieces recreate a partial or original document. Using the Information Dispersal Algorithm (IDA) with the present invention may deliver a much higher degree of security. The data stores may be correlated to the sec-con or SC content or maybe otherwise designated.

A.7 Automatic Dispersal of Data to Remote Storage Locations

The present invention provides a system and method for the automatic dispersal of data to remote storage locations. Examples of these systems and methods are found in sections D.2 through D.14. Any document data stream created by a user may be automatically split and transported to distributed storage locations. This may take several forms. One form is, when a file is being closed, it will automatically be split and its pieces sent automatically to distributed local or remote storage locations.

A.8 Dispersal—Breaking Down the Context of Data Streams while Maintaining Access to the Content of its Parts The present invention provides a system and method for splitting a document or data stream into granular parts for security and privacy reasons which hides the data stream's context. By splitting a document or data stream into different granular pieces and dispersing the pieces into distributed storage, the context of the original document or data stream is broken. The more splits and slices imposed on the data, the harder it is to inference the content, concept and context of the source document or data stream. The uniqueness of this invention is that each distributed piece and its granular content can be independently accessed for different usage. This storage technique is very different than the Rabin Information Dispersal Algorithm (U.S. Pat. No. 5,485,474) in which slices of the original document are distributed in different storage locations but the content of each slice or piece of data is not accessible.

The present system and method permits the sys-admin to establish an info infrastructure for data mining a plurality of source documents or information files. See sections C.8, C.17, D.5 and D.13. The sys-admin can also employ the knowledge expander KE search engine to enhance the data mined form source docs. See sections C.2 through C.23.

A.9 Granular Tagging—Basic

The present method and system permits granular extraction and tagging of data. As a result, the system permits (a) automated granular data level manipulation; (b) a process for creation of automated granular tagging and labeling; (c) a process for creation of automated tagged tear lines; and (d) use and implementation of category tags as placeholders in databases.

A.10 Automated Granular Data Level Manipulation

The system and method provides for granular data manipulation. All input data is analyzed, optionally categorized and optionally presented in a matrix or other format (a data structure). The analysis involves deconstruction or decompilation of the source doc (see section C.14-C.16 and, more particularly, section D.1. Categorization is discussed in sections C.11 and C.21. Different tools enable selection of granular data items for different activities which may include, among other things, their use as: (1) key words to search engines; (2) headings for granular data elements, meta tags for such elements; (3) a base for build up of expansive content (supple docs); and (4) filling in missing information from documents (data mining third party sources.

Granular data control may be used for various information processing activities listed in the Action Table below. The Action Table, in one embodiment of the invention, is a pull-down menu which enables the user of the system to select the granular action associated with the activity.

Action Table (1) security
(2) privacy
(3) compliance
(4) archiving
(5) replication
(6) backup
(7) continuity
(8) survivability
(9) broadcasting
(10) alerting The granular actions are selected automatically (based upon the initial set-up of the system), manually or a combination of both. Granular items may be connected to other granular items in the matrix/format or connected to other data processing steps external to it. Different data matrixes or data structures in the sec-con store or SC store can be constructed for the granular output of the original, source input data. The original data ad constituent parts thereof may be replicated to form different matrixes based on different categorizations. The selected granular data items will usually have semantic meaning. However it is feasible to combine granular items in different ways which do not have an inherent semantic meaning. This might be done for search and content inference purposes. By categorizing and labeling every granular data element, the invention in essence differently weights different granular content items.

A.11 Process for Creation of Automated Granular Tagging and Labeling

The invention provides a system and method for automatic creation of tagging and labeling at the granular data level. See sections C.3, C.5, C.6, C.7 and D.1. There is a need for automation in tagging data and content in a document and data stream. the tagging and labeling can be used for security or for data mining or knowledge expansion. The need security tagging includes: Top Secret paragraph, Secret paragraph. Top Secret line, Secret line (tagging plus contextual filter set as a range (paragraph and line). There is a need for tagging at a more granular level such as Top secret word/character, or Secret word/character. The need for tagging at a very granular level also is impressed upon an enterprise by the requirements of recent laws for removal of sensitive names and sources from documents. There is a need for other types of categorization/labeling/tagging. For example, there is a need for a Private tag, Public tag, and a need for High Priority, Low Priority, Medium Priority tags. The enterprise policy discussed above, when applied with the use of the present method and system, implements this categorization/labeling/tagging operation. Each item, word, character, image in a data stream (also optionally at a bit and binary level) is monitored, analyzed, categorized and tagged. This is done by filtering, i.e., matching the granular data items against pre-set lists wherein a match yields the right classification tag for the granular data element. The element is marked by creation of a tag for the granular data element. For example "name," "location," and "social security number."

Following process outlines an automatic tagging system. (1) Within the input data stream, all the data and content element is monitored and categorized by a filter or filters. The filters may be content filters, like a "dirty word" list of others. (2) Every data element is categorized contextually (name location, phone etc). Every element may be also labeled, tagged, and categorized according to other categorizations like security classification, Top Secret. See, for example, the discussion of hierarchical taxonomic in section C.21. (3) Every tag may be checked contextual validity and may be checked and verified by an inference engine.

By categorizing and labeling every granular data element, the invention in essence different weights to the different granular content items.

A.12 Process for Creation of Automated Tagged Tear Lines

The invention provides a system and method for automatic creation of automated tear tagged lines or contextual ranges about identified content. There is a need for automation in classifying ranges of content within a document or data stream. The need may be for security ranges like Top Secret paragraph, Secret paragraph etc. as well as for other types of categorization/labeling/tagging. For example, there may be a need for Private tag, Public tag, High, Low or Medium priority tags. Based on automatic categorization of each item, word, character, image, in a data stream, a contextual defined range, such as a line a paragraph or a group of words, can be tagged by one of the tags in that grouping. For example, if a paragraph has 15 words with 15 tags, the paragraph may be tagged as a whole based on one or few of the tags. In situations where tags represent a hierarchy—("Top secret, Secret, . . . "), the paragraph can automatically be tagged by the highest level tag. Tagging of the paragraph sets a range or a tear line, which can be selected for different uses including a range for searching for key words for a search operation.

Following is a process for creating automatic tagging with automatic tear line tagger. (1) Select ranges of content (drop-down menu or pre-set range or manual highlight selection). (2) A range of content means a contiguous content stream, which may be a phrase, line, paragraph, page, chapter etc. (3) Within the defined range, every data element and content element is monitored and categorized by a filter or filters. The filters may be content filters like dirty word list of others. (4) Every data element is categorized contextually (name location, phone etc). (5) Every element may be also labeled tagged and categorized according to other categorizations like security classification. (6) After categorization of every element, a process may select a categorization labile to define the content range. (for example, a paragraph may have 10 words 5 labeled are as Top Secret, 3 labeled as Secret, and 2 words labeled as Confidential. (7) The range might be labeled, tagged as Top Secret. (8) Rules can be set so that when a combination of a few words appears the range, the range group is tagged at their level higher or lower. (9) Every tag's contextual validity maybe checked and verified by an inference engine. By categorizing and labeling every data element, the invention in essence assigns different weights to the different granular content items.

A.13 Category Tags as Placeholders in Databases

The invention provides for a system and method for substituting tags as placeholders for removed data thereby creating the info infrastructure for unstructured data. For security or privacy reasons, granular data elements are removed from a repository, database, document, or file, etc. Tags are inserted as placeholders to replace the data that was removed to other storage locations. Data mining searches locate the tags instead of data. The benefit of this operational system and process enables data mining that will not produce the removed secured data but it will let the user know that the data does exists and what type of data it is (name, location, social security number, etc). Data mining is possible based on tags organized by categories, not whole information in unstructured data files. As an example, a document may be processed to show: (a) Date birth xxxxxx; (b) Mothers name yyyyy; and (c) School zzzz. The data categories (birth, mother's name, school) is listed, but the granular data elements are in different locations—and the owner of data needs to trigger the release of different granular data elements.

Further, the tagging and sec-con and SC data extraction can be used to populate a taxonomic database (or non-taxonomic database). The tags or labels are the filed names in the database. The structured data in the database will be the extracted data. Therefore, the sys-admin creates the info infrastructure with the present process.

A.14 Controlled Release—Basic

The controlled release of information (see reconstruction aspects in sections B.7, B.8 and the applications in sections D.2-D.14) results in the following unique features and characteristics: Layered build up of data streams, layer upon layer; Granular data release from a third party repository; Creation of modular data components from granular data streams; "Rolling" exposure of granular data streams; Controlled release of extracts after verification; Multi purpose usage of filtering and extraction process; Filtering and copying "Selected data;" and, A combined process of extracting part of the "selected data" and copying parts of the "selected data."

A.15 Layered Build-Up of Data Streams, Layer Upon Layer

The present invention provides a system and method for the controlled release of granular data streams which release builds up, layer by layer, a reconstructed document or data stream. The controlled release of data or granular data streams—layer by layer—forms a new, whole or partial document. A granular data stream is defined as extracted, granular data elements and/or the remainder data filtered from an original data stream. The filter may process the original data stream by content filter or other filtering methods. Controlled release of granular data layers during reconstruction can be done in a document, data stream, and website, database or other format. Each layer is built upon the other one to enable a view of a full or partial document.

The invention provides a system and method for controlled release of data and granular data streams after verification and validation before the release of each layer.

One aspect of the present invention focuses on release from storage of granular data pieces. The security risk is reduced by storing smaller and more granular pieces. The attacker needs to access few stores to piece together all the content Layers of data of the original document data stream may be released at once or at different times. The granular data stream is released into a file with existing content (remainder, or sanitized file) or creating a new file. See section D.6 for a sanitized document reconstruction. For security reasons and to avoid covert channels, Trojans and other attacks, the granular data layers can be released onto different screens in the same computer or different screens on different computers. See sections B.7 and B.8. The build up can be done in a way that resembles build up of modular components. Different layers can be built up in different sequences.

A.16 Granular Data Release from Third Party Repository

The present invention provides a system and method for granular data control and release from a third party repository. Users control their own private data-release from $3^{rd}$ party or government repositories and databases. When a user wants to release information, he or she will release it in a controlled release fashion. A higher level of security and privacy is delivered in situations where the data is split into data streams and stored in different memories and or locations. When the information is dispersed, the chances for leakage are minimal. The user may release different data streams from the different storage locations.

To deliver a higher level of security the user may chose to route the dispersed data streams in different communication paths. For example: deliver critical information in parts over the phone line, cell line, email and fax.

A.17 Creation of Modular Data Components from Granular Data Streams

The system and method provides for the creation of modular data components from granular data streams. Splitting original document or data streams into granular data streams enables the user or sys-admin to build and maintain a component infrastructure for internal usage (within the enterprise) or for external usage (to others). A granular data stream is defined as the extract and/or remainder data filtered from an original data stream. The filter may process the original data stream by content filter or other filtering methods.

The trend of implementing Service Oriented Architecture—SOA, in web applications teaches the need for modular code, the benefits of code reuse and other added value. In the same vein, splitting original documents or data streams into granular pieces and creating a modular framework brings different added value and advantages which include: (1) parts of the data stream can be used by the originator, other parts by other users or machines to construct other data streams; (2) the granular data streams may be used as tags or metatags; and, (3) the granular data pieces may be used as elements to feed search engines. Modular data components may be granular data streams or pieces, granular data pieces with hooks, granular data pieces with tags etc. Hooks are metadata that relate one data element to another data element or file or data object. The modularity enables data pieces to be easily combined into a larger data structure where they may be reused.

A.18 "Rolling" Exposure of Granular Data Streams

The invention provides a system and method for flexible content access based on "rolling" granular data exposure with decryption for better workflow. In situations where information must be accessed on an ongoing basis in plain text like search operations, encryption may be a major hindrance. The need to decrypt the encrypted plain text and then to encrypt it again, and do the same loop many times, is a major obstacle to work flow and performance.

The invention introduces a solution based on creation of (1) granular pieces of data (2) a distributed storage framework as a way to deal with the need to encrypt yet not overwhelm the processing and other computing workflow. The system creates granular data pieces out of the original document/data stream. This is done through a process of content analysis, selection, extraction and dispersal to distributed storage.

The granular pieces may be encrypted. The added value of the granularity effect is that there is no need to decrypt the whole original document at once pieces of granular data can be decrypted separately at the different storage locations.

Operationally, the system may be pre-set to encrypt and/or granularly extract and store based upon (i) event, e.g., save doc, log OFF, or (ii) time function; or (iii) user activated switch for encrypt and/or granularly extract and store.

A.19 Controlled Release of Extracts after Verification

The invention provides a system and method for controlled release of extracts after verification and validation. See sections B.7 and B.8 and the applications in sections D.2-D.14. One aspect of the invention focuses on release from storage of granular data pieces. The security risk is reduced by storing smaller and more granular pieces. The attacker needs to access few stores to piece together all the content. It in noted that after their splitting from a document or data stream, granular pieces of data may be processed using the Information Dispersal Algorithm.

The invention provides a system and method for controlled release of extracts after verification and validation. Controlled release of extracts will take place at once or in stages only after verification and validation of different identifiers including any of the following or their combinations thereof: Identification code (PIN); Biometrics; Past history; Chain of title of data extracts; Past projects user was involved in; Current projects user is involved with; and People user is involved with.

A.20 Multi Purpose Usage of Filtering and Extraction Process

The present invention provides a system and method for multi purpose usage of the process of: filtering the elements in the data stream, the selected data is extracted, and dispersed to memories and reconstructing process—including an interface therefor. See, for example, section D.13 and the web-based process. The process of document or data stream filtering, extracting selected data, dispersing to memories and reconstructing process is created for different purposes. These purposes may be presented to the user in a pull down menu. The purposes include: (1) Archiving; (2) Compliance with policy and regulations; (3) Security; (4) Data searching/data mining; (5) Survivability; (6) Continuity of operations; (7) Replication/Copying; (8) Backup storage; and, (9) Information sharing. All potential applications or part of them can be presented to users in various interfaces including a drop down menu or in a different menu including a mouse menu. Presentation of a key or identity card including credit card etc. may be requested to enable access to manual or automatic processing of selected choices. In each case, the original document or original input data stream data is being analyzed at the content level.

The process includes: (a) the original data or data stream is split into different levels/pieces of data, created with the appropriate tagging and extracted to different memories. (b) split—the different data pieces are transferred to different memories, which will allow reconstruction or multi level reconstruction.

A.21 Filtering and Copying "Selected Data"

The present invention provides a system and method for of filtering the elements in the data stream, resulting in selected data, creating copies of the selected data and dispersing the copies to memories and reconstructing process—including a user selectable interface for activating such operation. The process of document or data stream filtering, extracting selected data, dispersing to memories and reconstructing process created for different purposes includes:
(a) in each case, the original document or original input data stream data is being analyzed at the content level; (b) the selected pieces of data are copied then (c) appropriately tagged then (d) the different pieces are extracted to different memory stores, which (e) will allow reconstruction or multi level reconstruction.

A.22 Combined Process of Extracting Part of the "Selected Data" and Copying Parts of the "Selected Data"

The invention includes a system and method for multi purpose usage of the process of: (a) filtering the data elements in the data stream, (b) resulting in selected data, (c) extracting and removing part of the selected data while (d) copying other parts of the selected data for further processing. Copying selected data, extracting data, dispersing to memories and reconstructing process—are all actuated by a user controlled interface—such as a pull down menu.

For each of the purposes specified below, the original document or original input data stream data is being analyzed at the content level. The selected pieces of data are either: (1) Copied then appropriately tagged then the different pieces are extracted to different memory stores, which will allow reconstruction or multi level reconstruction. Or (2) Split from the original document the content pieces may be appropriately tagged then the different pieces are extracted to different memory stores, which will allow reconstruction or multi level reconstruction. Presentation of a key or identity card (including credit card data) to enable automatic processing of selected choices.

A.23 Data Mining Search Results Basic—Distribution as Multi Level Security Versions The present invention can be configured as a data mining tool for search results which are distributed in multi level security versions, a search-creating automatically key words, a continuous data mining with query refinement; an automatic continuous search—with divergence and convergence, and with distributed data mining.

The present invention provides a system and method for search results distributed as multi level versions. The KE engine (section C.2-C.23) can be combined with the multi-level security system per sections D.4-D.9. There is a need to enable a user with a security clearance level and a specific role to search documents, data streams, data bases and data repositories that are at varying security levels which he is not allowed to access. The problem can be overcome by allowing a search to takes place in the different databases. This invention provides a system and method for multi level scrubbing and distribution of multi level search results Search takes place in all data bases—a multi level security guard is positioned at gateways scrubbing all results generated from the different sources/databases. User gets results scrubbed to his level of access. The system can be positioned as a guard at the gateway of the search process. The system scrubs the search results or scrubs a copy of the results in such a manner that every user gets a version of the resulting document according to his clearance level, or role. The results of the search are (1) sanitized and versions are created that correspond to the user security level and role or (2) a sanitized remainder document is prepared and granular data will be released into it from storage store or stores, local or remote.

Presented herein is a multi level filtering and dissemination system and method of search results and search hits. The searching takes place in different security level databases. In situations where the search is conducted by a search engine that delivers at first summaries or hits of documents, the following process will take place: (A) The result/hits pages are opened. (B) Each page is filtered; (C) Selected words are tagged and extracted; and (D) MLS—multi level security is enforced for distribution to the users. Each user sees only what his security clearance level permits him to see. The summary of the search hits may also filtered creating words that are tagged by different security clearances. Each user then will see words in the summary of hits that he is allowed to access at his clearance level A.24 Data Mining—A Search Creating Automatically Key Words The present invention provides a system and method for automated search engine with automated creation of key words. Reference is made to sections C.2-C.23, particularly C.9, C.10, and C.22, C.23. Documents are the core of the "knowledge economy." Finding documents in an organization or enterprise is a tough challenge because of the ocean of information. The challenge is even harder trying to find the needed information outside the organization, including searching open source information on the Internet. Since it is hard to locate relevant information studies show that more than 50% of data existing in the organizations is recreated. A filtering system is presented herein to remove and to locate relevant documents/data streams from daunting volume of documents in an organization as well as open source data.

The system and process can be pre-set to automatically trigger a keyword search in which the keyword/search items are not submitted by a person into the search engine, but submitted by an automatic machine process after a body of content, like a document/paragraph or other data stream, is fed into the machine. The machine analyzes the content of the data stream and, based on preset filtering processes, locates the key words and submits them to a search engine or multiple search engines. Different key words may be added to the search that are not included in the processed data stream. The triggering starting point: A search may be triggered by a user dragging a document/paragraph/line into the search engine, copying content into the search engine, or through an automatic feed of data into the search engine, for example an automatic feed of news articles. Selection of search key words: The system analyses every word character icon image and categorizes them. The system selects the ones, which match the predetermined rule set and routes them to a search engine for a search. Words, characters and icons images that are not recognized by the filtering and categorization process may be categorized as "unknowns" and sent as key words to the search engine. Reduction of relevant search results: Results of the search may be processed (by use of a filter or filters) to reduce noise and deliver most relevant results.

A.25 Data Mining—Continuous Data Mining with Query Refinement

The present invention provides a system and method for automated non-stop data mining cycles with query refinement. Data mining triggered by key word or document feeding into search engine. Search results are filtered again to find new keywords so another search will take place. As results are submitted they are automatically filtered by preset filters and new keywords are located and sent to search engine. Selection of key words: All key words may be sent to search engine. It is more practical to implement an n word automatic (possibly manual) selection of most relevant keywords for the search process. Different filters may be used. Categorization filters may be used—if data in originating document (or other process related documents) where granularly categorized—selection of specific categories may be enforced in the filter. For example: "select only names and locations"—This will reduce the number of key words only to those, which are names and locations. Other filters (sieves) may be used for example; "select only items with a high sensitivity level tagging" then only items such as Top Secret will be selected. Selection of range for key words: To focus on creating key words for search from specific content area within the data stream ranges of operation will be set. The range defines an area within a document; data stream within that area key words for search will be located, selected and fed to search engines. Ranges can be created automatically based on categorization of items within the data stream.

The inventive system and process may also be set for dispersal to storage of a federated data search/mining operation. Filtering options and combinations for sending keywords to search engine include: (1) Word list—a dirty list filter; (2) Group word list—a list of groups of words representing some context possibly a concept; (3) Categories—filter based on selection of specific pre-selected categories (like names, locations); (4) Security level—a filter based on selecting a specific security level (Top Secret tagged content or Secret tagged content); (5) Range—A meta filter determining what content area in a data stream would be the focus of the search. (tear line); (6) Scope-A filter selecting what extracted words in the selected range; and, (7) Other key words for a joint search may be presented.

A.26 Automatic Continuous Search—with Divergence and Convergence

The present invention provides a system and method for storage with an automatic data search/mining operations (convergence). Automatic data search and mining operations in a data store is triggered by data residing within the data store. Keywords are selected and sent to search engine or engines. Data search mining is triggered by key word or document fed into search engine. Search results are filtered again to find new keywords so another search will take place. Other inputs triggering an automatic search may be sent from other sources including other storage stores, thereby creating a federated search. The data search mining operation may continue on an ongoing basis. The user has the ability to set the system ON for a continuous, non-stop cycle of filtering keywords and feeding them to search engines. The user may set the system ON for a set number q of search cycles. (e.g., stop after 5 cycles). The user has an ability to control cycles by establishing a time (cycles stop after 30 minutes). All results are filtered to reduce noise and achieve a high level of relevancy. Results may be matched to words in the originating data stream to insure relevancy. Data search results or other input of the storage store may be sold, bartered exchanged with others.

Currently, data storage is cheap yet there is minimal usage of data in storage. When data in storage is used, the data has added value for the enterprise. The system data mines unstructured data and enables the enterprise to sell search results, or combine newly discovered data with enterprise data, for a synergistic resultant data of higher value. The sale or barter of data may be for a price.

A.27 Distributed Data Mining

The present invention provides a system and method for distributed data mining. Running search operations from dispersed locations both for security as well as better coverage and expansion of select content SC data. For security reasons, searches should take place from different dispersed locations, in order not to enable a compromise of the data. (for example a compromised insider at Google can know all the subjects that are searched by a person or organization).

A.28 Content Inference Engine—Basic

The present invention can be configured as a content inference engine with the following features: (a) an inference engine searching for the unknowns; (b) securing information sharing with an inference engine; (c) an automatic web data inference crawler robots; (d) changeable data classifications based on content inference threats; (e) search operations creating new continuously growing digital data streams; (f) distributed searches from different storage node; and, (g) storage of separated data pieces in one location A.29 An Inference Engine—Searching for the Unknowns The present invention provides a system and method for Data Inference Engine with Divergence data search focusing on "Unknown" data, that is, data which has not been identified by the initial set of filters used to process the source doc or information file. The objective is to locate hidden data and to infer data therefrom that is identifiable and relevant. The system locates documents, which the are related to the initial document, each other by context or concept. The search takes place in structured as well as unstructured documents. See the KE engine in sections C.2-C.13 and C.20-C.23. Data search mining is triggered by key word or document feeding into search engine. Search results are filtered again to find new keywords so another search will take place. Known key words are removed by the filters or given low priority-unknown keywords are sent to the search engine.

The user can set the system ON for continuous, non-stop cycle of filtering keywords and feeding them to search engines, set number of search cycles (e.g., stop after 5 cycles), and control cycles by establishing a time period. All results are filtered to reduce noise and achieve a high level of relevancy. Results may be matched to words in the originating data stream to insure relevancy.

A.30 Securing Information Sharing with an Inference Engine

The invention provides a system and method to establish an information sharing environment counter-balanced by inference searching. Information sharing environments may be open to security risks therefore it must be counter-balanced by content inference searching and testing operations that will enable the sys-admin to identify a threat so that the security threat can be reduced. Therefore, search engines/inference engines must work constantly in a plain text environment. Different information sharing projects have been shut down because the data acquisition systems where a threat to privacy. Data mining is a constant threat to privacy and leads to many instances of identity theft. This invention provides a system and method for protecting privacy and security in data mining and information sharing operations.

The invention protects privacy and security by controlling the access to sensitive content. The sensitive information is defined by the inference engine. Documents and data streams are filtered by the inference engine, granular data is selected, (and may be extracted to distributed stores). Granular pieces of data are released by a controlled mechanism to avoid security and privacy breaches.

A.31 Automatic Web Data Inference Crawler Robots

The present system is a method for automatic crawling robots-spiders locating data and locating threats to data and minimizing the threats including scrubbing web sites. Automatic agents, robots, mobile code analyze data in documents, databases and data streams. Using inference capabilities, which may include artificial intelligence, the system locates users' private data which may lead to a threat of compromising his other data his privacy etc.

The system can be configured to remove the threatening data. Removal of threatening data with the option of reconstructing it back upon presentation of proper identification and security clearance. Automatic robots, mobile code, may be used to crawl web sites, data centers, directories, and data streams on a continuous or part time basis. Consumer reports may be generated and sent confidentially to users. Thereafter, the user may demand that the web sites, data centers, directories, and data streams maintain user data in a confidential manner consistent with data privacy laws.

A.32 Changeable Data Classifications Based on Content Inference Threats

The present invention provides a system and method for flexible changeable classifications and security classifications, with optional inference penetration testing. A system and method enable the user to change security classifications on the fly. Security levels of a document or data stream are upgraded or down graded based on the results of inference tests.

Due to the overwhelming ocean of data in an organization and in open source data, data classifications, and especially security classification, should be changed on the fly as new data is being integrated discovered and fed from search results. What was "secret" in the past (and important and critical) may now be public information and the value of the data may be lost.

Data that was classified at a low priority may need to be upgraded as new information is analyzed. The system can be automated to change classification levels. Classification levels change and tags or labels change as well as security classifications based on results of content inferencing penetration testing. This present invention provides a system and method for on the fly change of classification including security classifications: (A) Data that is classified at a specific security level for example "Secret" may be used by an attacker an insider or outsider to search that classified data against open source search engines or other databases. The results of such an inference attack may lead to new information about the classified document that is more secretive than the security level assigned to it. For example, an inference search might yield names and locations that where extracted from the "Secret" document in such a case the base classified document should be classified at a higher security level than "Secret." The system presented will conduct inference penetration test based on the level of sensitivity of the located information the security clearance level will be upgraded.

Since data is constantly changing, real time analysis must take place on an ongoing 24 hours effort. The user requesting access to the data will receive data not based on the old security clearances of the document but based on the up to the minute update. The system and method may be automated based upon enterprise informational policies.

A.33 Search Operations Creating New Continuously Growing Digital Data Streams

The present invention provides a system and method for automatic data mining operations creating new intelligent digital data streams/entities. Automatic data search mining operations create a wealth of information. A wide net is cast and many documents data streams are located. A filtering process is used to deliver most relevant results. On going search operations create a digital data growth which can be described as a growing tree with branches that are constantly growing and branching out. In essence new intelligent digital data streams are created on the fly around a "content target." The term "content target" is defined as a "concept" which may grow in different directions based on results of the data search operations. The invention provides a system and method for automatic addition of relevant search results to the "content target." Automatic scanning of data within a computer, data base, or network nodes results in analysis of content. Identification of, among other things,: (1) what are the critical elements of the data and/or; (2) what elements of the data need more relevant data including updated data. Then, the system automatically searches for relevant data to update or to add to the targeted data. The addition of data can be in the form of an attachment, a URL, a meta tag or data in different formats or linked by different methodologies. The analysis process can be done in various ways including the use of content filters.

A.34 Distributed Searches from Different Storage Nodes

The present invention provides a system and method for distributed searches and establishes an interaction between distributed storage stores with data mining operations. Distributed storage stores each individually carrying data mining operations can yield a vast body of distributed data and knowledge. An infrastructure for interaction between stores is presented herein. The infrastructure enables sharing of data sharing of key words in order to enable better more comprehensive data search operations. For example, if one store stores data on a subject A and another store stores data on subject B, sharing of key words or data between the stores will enable better key word searches. In essence, searching in different stores (each one with its own subject matter) results in more robust search results.

A.35 Storage of Separated Data Pieces in One Location

The invention provides a system and method for storing different data extracts in one storage location. The system and method stores extracts of a data stream in different memories within one storage location. There is a major difference between splitting a document or a data stream and placing its parts in one storage location and this invention, which deals with placing extracts of a document or a data stream in one storage location. This invention deals in a situation that a whole data asset was already parsed—and split into a "remainder" and "extracts". What is transferred to one storage location is not all the pieces of a whole document or data assets but partial part of the whole the "extracts." The storage location can be one computer one storage node or other medium that is located in one physical location. To overcome security risks, the extracts in the different memories within the one storage location may contain protective elements which make it very hard to match the different extracted pieces together to create an original data stream. Those protective elements may include adding a substantial amount of additional data assets that will create chaos. It will be a major obstacle for an attacker to locate the original extracts and piece them together. Another protective measure is to encrypt each of the extracts in the different memories and store their encryption keys in a different storage location. An attacker who will penetrate the extract storage location will need the encryption keys in order to access the content. The encryption key or keys may be split in a secret splitting scheme. In essence, m out of n keys will be needed to access the content of the extracts in the different memories. The storage location can be also software storage without a physically defined location.

A.36 Storage of Granular Data Streams—Basic

The present system and method can provide for configuration of granular data streams and dispersal to distributed storage stores; shuttling of data and granular data streams between distributed storage stores; replication of granular data streams with minimal security risk; and, anonymizing classified and unclassified storage stores.

A.37 Configuration of Granular Data Streams Dispersal to Distributed Storage Stores The present invention provides a system and method for control of data extracts in dispersed storage environment. A granular data stream is defined as the extract and/or remainder data filtered from an original data stream. The filter may process the original data stream by content filter or other filtering methods. Granular data streams are filtered and the results or parts thereof form bigger data streams. The resulting granular data streams may be extracted or copied for further processing and storage. To achieve high levels of efficiency as well as security, a set of configurations is required to enable maximization of benefits in processing and storing granular data streams a distributed environment. Since granular data streams are part of a bigger data stream—the granular data stream location need to be entered into a map or directory of the full data stream to maintain context. Configurations—may include: how many storage locations are available, what would be transferred to each storage location, and when. The storage nodes may be simple storage nodes, or smart processing storage nodes. Enterprise policies set data processing rules for the info infrastructure based upon who, where, what, when, why, and how much-how little (quantity).

A.38 Granular Data Stream Transport

The configuration of granular data streams transport to storage may include a selection of what type of data streams will be sent to which storage. The selection may be done randomly, or according to the types and or categories of content, specific key words in the granular data strings are going to be shuttled. The data storage facility may be selected at random or via an algorithm to enhance security. Storage by data class is discussed later. The configuration will also include locations of storage on the network. Special configurations will need to handle searches combined from key words in the different extracts, which might be in the same storage node or on other nodes. The configurations will cover the different possible permutations of combinations of which key words in the extracts may be sent as a combination to search operations and in what order.

A.39 Shuttling Data and Granular Data Streams Between Distributed Storage Stores The present invention provides a system and method for data asset interaction in a distributed network. Shuttling of data, including granular data streams, between distributed storage locations for data mining purposes (and other purposes such as add on to other data streams) causes chaos which increases security. Creating network paths/"road infrastructure" between storage stores so data and granular streams can move (1) when requested, or (2) on a scheduled basis, or (3) upon certain events (see attack application in section D.3).

The method and system also processes data and granular data streams from different distributed stores. The combined processing of the data may include cleaning the data, extracting, and packaging it for data mining search operations and other purposes. Artificial intelligence may be used in this process. Creating a "chamber" or "compartment" for processing data and granular data streams from different distributed stores is possible with the system. The combined processing of the data may include cleaning the data, extracting, and packaging it for data mining search operations and other purposes. Artificial intelligence may be employed.

A.40 Replication of Granular Data Streams with Minimal Security Risk

The present invention provides a system and method for granular replication enabling the user access to many copies with minimal security risk. It is common practice that to achieve reliability there is a need to store a few copies of the data. The problem is that the bigger the number of copies made the bigger is the security risk. The invention splits a data stream into granular pieces replicates those pieces and disperses them to distributed storage. The security risk is minimized and can be controlling the size of the granular data pieces and their number.

The invention also proposes a new architecture for storage on the internet. The invention enables a user to make as many copies as he wants of a document or data stream with minimal amount of security risk If a storage node is attacked a small granular piece will not pose a serious threat. A small granular piece does not convey all the substance of the original document/data stream. If the replicated piece is small enough the attacker will find it useless because it is out of context. For example, a granular piece of data which is a name only can't create a serious threat because it is out of context. Other stores need to be attacked successfully to access their data to give context to the small granular data piece. The security risk of having many copies can be reduced by the user decreasing the size of the granular pieces and dispersing the different pieces to different distributed storage store.

A.41 Anonymizing Classified and Unclassified Storage Stores

The invention also provides a system and method for not labeled, non security classified security storage stores, in essence. incognito storage stores. The storage stores may hold highly sensitive secret data but are not labeled with a security label or identifiable risky tag to avoid attacks. The classification of the storage store may be recorded at a distant location, which can be a registry, an index or a map. Data or granular pieces of data (split from a data stream) are stored in dispersed storage locations including Internet URLs. The different storage locations are not labeled or not labeled in a way that will lead to a possible attack. Sensitive storage stores that are commonly tagged with security or hardened classification at their physical location, like Top Secret or Secret, will not be tagged, tagged in a way that maintains their anonymity. For example, the data is labeled or tagged with a number, in a way that its content will be unknown to potential attackers.

A.42 Controlled Release of Granular Data Streams—Granular Data Manipulation and Control The present invention provides a system and method for granular data control and manipulation. Granular data control is defined as: the ability to manage manipulate and control granular pieces of data within a data stream or information file in order to achieve certain results. The result of such a process is the creation of new granular data streams or structured data. A granular data stream is defined as the extract data and/or the remainder data filtered from an original data stream. The filter may process the original data stream by content filter or other filtering methods. The resulting data or data stream can now be used or manipulated for different purposes. The resulting data can be presented in different formats to enable maximum data manipulation. For example, in one format, the resulting filtered data can be put into a matrix as structured data. Assuming a content filter was employed, and the filter also included tagging or labeling for categories (taxonomic filter), one axis of the data matrix may represent source doc markers and placement markers, the other axis may represent category groups (names, locations, and social security numbers), and the data in the matrix shows the critical sec-con or SC data, that is the granular filtered data elements form the source doc.

The granular content elements in the matrix can be manipulated manually or automatically based on pre-set rules and or configurations. Granular data manipulation and control enables the user to achieve different tasks including: (a) Privacy; (b) Security; (c) Secured Information sharing—Multi level security/cross domain data sharing; (d) Compliance; (e) Survivability; (f) Continuity; (g) Secured backup; (h) Granular data replication; (i) High relevancy searches; and, (j) Creation of tags and meta tags.

The process for creating the info infrastructure described above in this Part A (A.1-A.3) establishes this granular data control and manipulation and use of the system tools to create the structured data and to implement the enterprise policies for tasks a-j with pre-set data processing rules.

A.43 Sanitization Process with Inference Filtering—Basic

The present method ad system can implement a sanitization process associated with inference filtering of the source doc of information file. This process includes (a) process for sanitizing data on the network for privacy security and survivability; (b) automated sanitization of important data; (c) sanitization of non-important data; (d) release of granular data streams in lieu of access identifiers; (e) release of granular data streams in lieu of consideration; and, (f) secured release of granular data streams to multiple display screens.

A.44 Process for Sanitizing Data on the Network for Privacy Security and Survivability The present invention provides a system and method for sanitizing data on the network for different purposes including: privacy security, compliance, information sharing and survivability. The sanitization process includes the following process modules: (1) First stage: filtering the input, original data stream, and locating important content items (sec-con or SC data) that needs to be masked or extracted. (2) Second stage: implementing an inference process to verify if anything can be inferenced from the sanitized data stream. (3) Optional third stage: masking or extracting more data items from the sanitized data stream based on the threat results (inference analysis) of the content inference process. The risk analysis can employ the risk modules from U.S. patent application Ser. No. 10/396,088 filed Mar. 25, 2003 which is incorporated herein by reference thereto. Alternatively, the first level output report in FIG. 12c and the tree or second level output report in FIG. 12d for the life cycle engine may be employed to assess risk by inference. See sections C.9-C. 13 and C.23.

The user's network and data storage facilities need to be sanitized to defend against different types of attacks. Granular data items are extracted from the network and stored at dispersed storage locations. See sections B.1-B.6; see also, sections D.3-D.6 and D.11. The objective is to make the network "formless" to achieve, from order, a creation of disorder, so the attacker does not know what and where to attack. "Formlessness"—is the answer against virus attacks, Trojans worms/inference attacks, covert channels and insider attacks. The theory is to erase the user's digital foot prints while finding and inferencing the competitor's footprints.

The extracted granular data streams may be dispersed to storage or to distributed storage stores. The dispersed granular data streams will be tapped or retrieved for (1) reconstruction of the document (full or partial reconstruction); and, (2) to allow more data search needs.

A.45 Automated Sanitization of Important Data

The present invention presents a method and system for automated sanitization of important content (sec-con or SC data). Data, content including data, and content over the network must be sanitized on ongoing basis to stop insiders attacks, Trojan and spyware, content inference attacks and other damage. Minimal information is exposed with the present system and methods. Optionally, upon presentation of identification by users, layers of data will be reconstructed. For higher security, information search operations need to take place in distributed storage stores/nodes, and users work mostly offline.

A.46 Sanitization of Non-Important Data

The invention provides a system and method for automatic removal of non-relevant and unneeded content from information files. Automatic scanning and analysis of data within a computer, database, or network nodes is processed. Identifying data that might be not be relevant or needed is located. Extracting that data and removing it to a storage location or assignment of destruction—deletion codes is part of the info infrastructure. Data that is not relevant or not needed may include: (a) out-dated data; (b) data not relevant to the core document or data stream; (c) data not relevant to the user's organizations task and mission; (d) data files having mistakes therein; (e) data that takes too much space; and (f) data that may confuse the users or others. The data removed to storage (extracted and remainder data) may be indexed for reconstruction at a later date.

A.47 Release of Granular Data Streams in with Increasing Levels of Access Identifiers The present invention provides a system and method for controlled release of layers of data for different access identifiers. A granular data stream is defined as extracted data and/or the remainder data filtered from an original data stream. The filter may process the original data stream by content filter or other filtering methods. Controlled release of layers of granular data streams filtered from an original data stream is permitted only after different access identifiers are presented. See sections B.7-B.8 and Part A herein above. As an example: release first granular layer like a paragraph after presentation of fingerprint, release of second paragraph after presentation of pin number, third paragraph released for retina scan, fourth paragraph released by secret sharing scheme need—other person to be online with his identification to enable a release.

A.48 Release of Granular Data Streams after Obtaining Consideration

The present invention provides a system and method controlled release of layers of granular data for different considerations received by the disclosing party or enterprise. A granular data stream is defined as the extract data and/or the remainder data filtered from an original data stream. The filter may process the original data stream by content filter or other filtering methods. Controlled release of granular data streams including data pieces and data extracts is provided layer by layer, after verification different criteria including: identity, past history, verification of chain of title of the granular data stream, past projects user was involved, current projects etc. Release layer by layer for consideration obtained by disclosing party. For example—release first paragraph if user inputs name and social security number. Release second paragraph if requester inputs phone number. Release third paragraph if user inputs name of friends or delivers what he is being asked to deliver. This invention provides also a system and method for controlled release of layers of data or granular data streams for different monetary considerations. See sections D.5 and D.6. Controlled release of layers of data for different monetary considerations. For example: Release of first granular layer like a paragraph after payment of $1.50, release of second paragraph after payment of $2.00, third paragraph released for payment of $25.00, and fourth paragraph released after payment of a negotiated price. This invention also provides a system and method Controlled release of granular data layers for a combination of different considerations. Controlled release of granular data layers for a combination of different considerations. Each granular layer may be released for a different type of consideration. For example: Release first paragraph for a payment, release second paragraph after biometrics identification, release third paragraph after—filling some information.

A.49 Secured Release of Granular Data Streams into Multiple Screens

The present invention provides a system and method release of granular data layers different computer screens. A granular data stream is defined as the extract data and/or remainder data filtered from an original data stream. The filter may process the original data stream by content filter or other filtering methods. To avoid Trojans, spy ware, and other attacks, granular data layers of original data stream are released into different screens in one or in separate computers. For example: Top Secret data layers will appear on a screen of one computer while rest of data layers (sanitized document) will appear on another computer screen. See sections B.7-B.8. This invention also presents an overlay of granular data streams stored in different memories which memories can be in one physical machine or archived to a higher level of security in different machines.

A.50 Ecosystem Based on "Granular Data Control"—Basic

The present method and system can be used to establish an ecosystem with the following features: (a) an ecosystem for information superiority and survivability-based on "granular data control;" (b) a system and method for minimizing data exposure; and (c) creating "digital doors" in a data stream limiting access the content of the stream or information file.

A.51 Eco System for Information Superiority and Survivability—Based on "Granular Data Control"

The present invention provides a system and method for an ecosystem for delivering information for superiority purposes and for data survivability purposes, based on "granular data control." In the digital paperless environment, the interconnectivity of networks and the Internet create new threats that can be compared to a battlefield. To achieve information superiority and data structure survivability, the present system integrates the following concepts into one ecosystem. The network or ecosystem must be able to protect itself and the data it holds. It must conduct its own surveillance and generate information in real time on threats, in essence, a command and control capability. The system needs to be able to defend itself and sustain itself throughout different types of attacks and disasters. The core, basic concept for information superiority and survivability is the need for constant data updating, gathering and its secured sharing. To maintain competitiveness and defenses, ongoing and continuous information searching, data mining and data inferencing and information sharing operations need to take place throughout the organization as well as outside the organization. A combination of some or all of the following processes and methods is the basis for information superiority and organizational survivability: (A) Creation of granular data streams. A granular data stream is defined as the extract data and/or the remainder data filtered from an original data stream. The filter may process the original data stream by content filter or other filtering methods. (B) Creation of content "Formlessness" by dispersing the granular data streams. (C) Dispersal and hiding of the granular data streams. (D) Compartmentalization of the different granular data streams. (E) Access check points at the storage stores/nodes. (F) Reconstruction of granular data streams into the original data stream or parts of it. (G) Multi level reconstruction of data. (H) Replication for continuity and survivability. (I) Constant search—for security and info superiority. (J) Content inference for penetration testing as well as locating relevant information. (K) Secured information sharing. (L) Automatic continuous growth of a data stream by addition of new search resulted data to it.

To achieve information superiority an organization's data/content assets to constantly grow and be updated in real time. Organizations and individuals data resources should be updated in real time. A comprehensive search and data acquisition and organization is key to the organization—like food and oxygen is key to humans and animals. There is a need for on going search throughout the organization. Every node on the in enterprise's network must be engaged in searching data—in essence supplying oxygen to the existing data assets. To deliver "competitive survivability," the search capability needs to constantly locate relevant information and update the existing data repositories. Presented herein is a system for continuous or part-time search all over the organization assets and outside data resources including the Internet, all with updates in real time. The system and method is an ecosystem for managing constant searches for (1) updating its data repositories in real time, (2) creation of competitive knowledge, and (3) to secure itself from content inference attacks and other attacks and disasters. The interconnectivity of networks and the Internet create a digital battlefield. The answer against virus attacks, Trojans worms/inference attacks, covert channels employs the present process and method. The present system breaks away from the model of perimeter security and adopts a model that has been used in the battlefield for many years. The invention delivers capabilities to transform order within the data content into disorder making it very hard for an enemy to attack.

The idea of "formlessness" is one of the core strategies of the battlefield as expressed by Sun Tzu. Formlessness calls for minimization of data, in essence, controlled release of data especially small granular pieces of data. In a formlessness environment, all extracts are dispersed all over in distributed nodes. The Ecosystem is in constant mode of searching to secure itself—against inference attacks—and to gain knowledge. Results of search are needed for security for (1) triggering more extractions, (2) more dispersal of data, and (3) gather more misinformation which confuses the enemy-within or without the enterprise.

A.52 System and Method for Minimizing Data Exposure

It is impossible to project and foresee all possible threats to a digital environment. It is impossible to do all permutations of possible inference attacks. Therefore, the invention presents a solution with the minimization of data. The invention provides a system and method for flexible content access based on rolling granular data exposure with decryption for added security. Granular pieces of the original document/data stream are dispersed to distributed storage nodes to enable a controlled secured environment for release of data. The granular data layers can be exposed one at a time decrypted instead of exposure of a total document.

A.53 Creating "Digital Doors" for Access and Controlled Release in a Data Stream The present invention presents a "digital door" system and method for creation of doors in a data stream to achieve data control and management via management of granular data. A system and method for controlling data and content within a computer, a network, server or web site by management and control of data and data flows at the granular data level. Content and data are monitored and controlled as they exit through access control points (see FIGS. 1a, 1b, and sections A.1-A.3) as well as when data enters the ecosystem, that is entry into the network, computer, servers, storage or web site. Content and data are monitored by the system as the data is held in storage. The system may remove data from storage through the access control points for security reasons or for other workflow and processing needs. Access controls or passwords and sec clearance protocols may be applied sequentially, of concurrently of subsequently with respect to the extraction of data and storage of data. Hierarchical access controls are oftentimes used. Controlling movement and storage of data by monitoring content, analyzing its granular parts when needed and masking or extracting granular data streams and when needed and tagging data for infrastructure purposes. Enforcing information rights management (IR Mgt) processes to control movement and storage of the granular data streams is a function of the present system.

The system and method provides for management of data in a digital paperless interconnected environment. Controlling data is achieved by focusing on the granular elements of data (character, word object, sentence paragraph etc.). When extraction is used, the system adds to "granular data control" the attributes of physical and logical separation of data. The security aspect may be further enhanced by transfer of the extracted granular data streams into distributed storage stores. Creation of access control points or monitors in a data stream means, among other things, extraction of data from a data stream with the intention to reconnect the data extracted in whole or in part. Extracted data can be put in a package storage with or without encryption. The package may be tagged so to allow better management (IR Mgt) of the extracted granular data streams enabling fast reconstruction.

The process may include: First stage: filtering of the inputted original data stream, locating important content items that need to be masked or extracted. Second stage: implementing an inference process to verify if any thing can be inferenced from the sanitized data stream. Third stage: masking or extracting more data items from the sanitized data stream based on the threat results of the content inference process.

A.54 General Aspects—Basic

In general, the present process and system has the following additional features and characteristics: (a) automatic creation of a user or object's identification profile; (b) copying of filtered granular data and dispersing; and (c) combining extraction and copying for filtering of filtered granular data.

A.55 Automatic Creation of a User or Object's Identification Profile

The invention provides a system and method for automatic creation of a user or data object's identification profile. The profile will enable automatic interactions that will locate relevant content for the profile including its update without a need for additional input. The profile may be used as a guard and as a filter to enable or disable various transactions or communications related to the profile. The automatic building of a profile is done in different ways including scanning of data assets within a computer, database, or network nodes. Analyzing the content including use of content filters and selecting patterns which define the profiled subject. The system analyses each data asset, categorized its content, and give weights to the data asset. See the KE engine C.2-C.23. The data profile includes the type of content, which parties interacted the data assets, at which time and location (audit or log data). Who sent what type of data to the data asset, for what reason? What is the security classification level of the data asset, how many people have accessed the data, was it a private document or a private one etc.

A.56 Copying Filtered Granular Data and Dispersing

The system and method includes filtering data and copying the granular data results and dispersing them to distributed storage. The process filters documents and data streams and cops resulting granular data items for dispersal to distributed storage locations. Dispersal may be done for different reasons for security, privacy, compliance, backup, continuity, survivability, backup or just close access or plain archiving. Dispersal of copied granular elements can be done to different locations applications search engines. Any resulting filtered granular data may be filtered again producing different levels or different sub groups. The granular results can categorized tagged and sent to different storage locations for possible retrieval, full reconstruction or partial reconstruction. The filtering process may result in creation of sub groups of granular items, in essence more then one group of granular items. Those groups may be dispersed to distributed storage.

A.57 Combining Extraction and Copying for Filtering of Filtered Granular Data

A system and method includes features for filtering data, resulting in parts of the granular data being extracted and the other parts being copied based on security threats, compliance requirements and operational needs. Dispersal may be done for different reasons for security, privacy, compliance, backup, continuity, survivability, backup or just close access or plain archiving. Dispersal of copied granular elements and extracted granular elements may be done to different locations applications search engines. Any resulting filtered granular data may be filtered again producing different levels or different sub groups. The granular results can categorized tagged and sent to different storage locations for possible retrieval, full reconstruction or partial reconstruction. The filtering process may result in creation of sub groups of granular items, in essence more then one group of granular items. Those groups may be dispersed to distributed storage.

B.1 Basic Operational Theory of Secure or Select Data Storage

Figure 4:
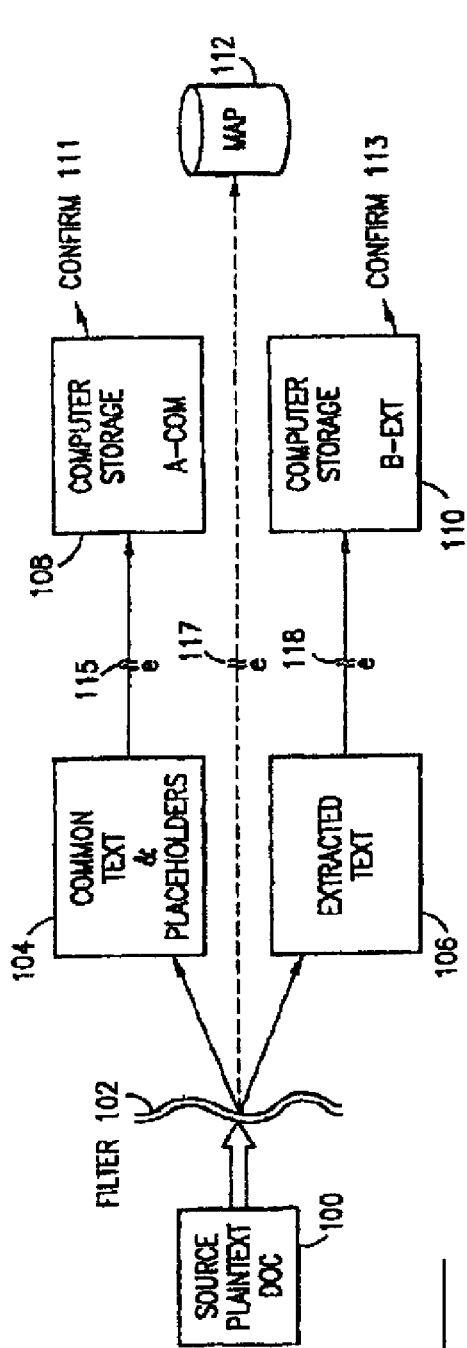
FIG. 4 diagrammatically illustrates a basic system diagram showing filtering and storing extracted data and remainder or common data and, in an enhanced embodiment, generating and storing a map.

FIG. 4 diagrammatically illustrates the basic processes for establishing a secure storage of information, generally identified herein as "data." The secure storage includes an extraction module and a secure storage module. "Data," as used herein, includes any data object, e.g., text, images, icons, data element, moving images, multiple images, data representing sound, video, electronic streams of information, etc. Sound bites and video images may also be extracted data. A source document 100 containing data, sometimes referred to as a "plaintext," is passed through a filter 102. Throughout this specification "source document" also refers to an information file containing data, particularly unstructured data. The module described herein operates on security sensitive content and operates on "select content," wherein select content is information which is deemed to be important to an enterprise. Select content may also be security sensitive content. In other words, select content has value, such as intellectual property IP value. Security sensitive content is deemed to be important in that its unauthorized release is some how detrimental to the enterprise. Although it is convenient to discuss and understand the invention herein in connection with a plaintext document, the document 100 is a data object. It is not limited to an electronic document representing words. The document 100 represents a data object that may be, e.g., text, images, icons, moving images, multiple images, data representing sound, video etc. The term "data object" as used in the claims is broadly defined as any item that can be represented in an electronic format such that the electronic format can be manipulated by a computer as described herein. The data object, or as discussed herein, the "plaintext" is sent to a filter. Filter 102, in a most basic sense, separates out common text or remainder data 104 from uncommon text, words, characters, icons or data objects. The security sensitive (or select content) words, characters, icons or data objects are separated from remainder or common text 104 as extracted text 106. It should be noted that although the word "text" is utilized with respect to remainder text 104 and extracted text 106, the text is a data object and includes words, phrases, paragraphs, single characters, portions of words, characters, whole or partial images, icons or data objects. In a basic implementation, filter 102 may utilize a dictionary such that words present in the dictionary (common words) are separated from the source plaintext document 100 and placed into remainder document or common data file 104. The uncommon words (extracted-security sensitive (or select content) words), not found in the dictionary, would be placed in an extracted text or extracted data file 106. For example, a business may wish to impose a security system on a contract document such that the names of the contracting parties (not found in the dictionary) and the street names (not found in the dictionary) would be stored in extracted data text file 106. The common text or remainder data would be stored in remainder data file 104. In the illustrated embodiment, remainder data file 104 also includes place holders which enables the extracted data to be easily inserted or set back into the remainder data file.

B.2 General Operation

Figure 9:
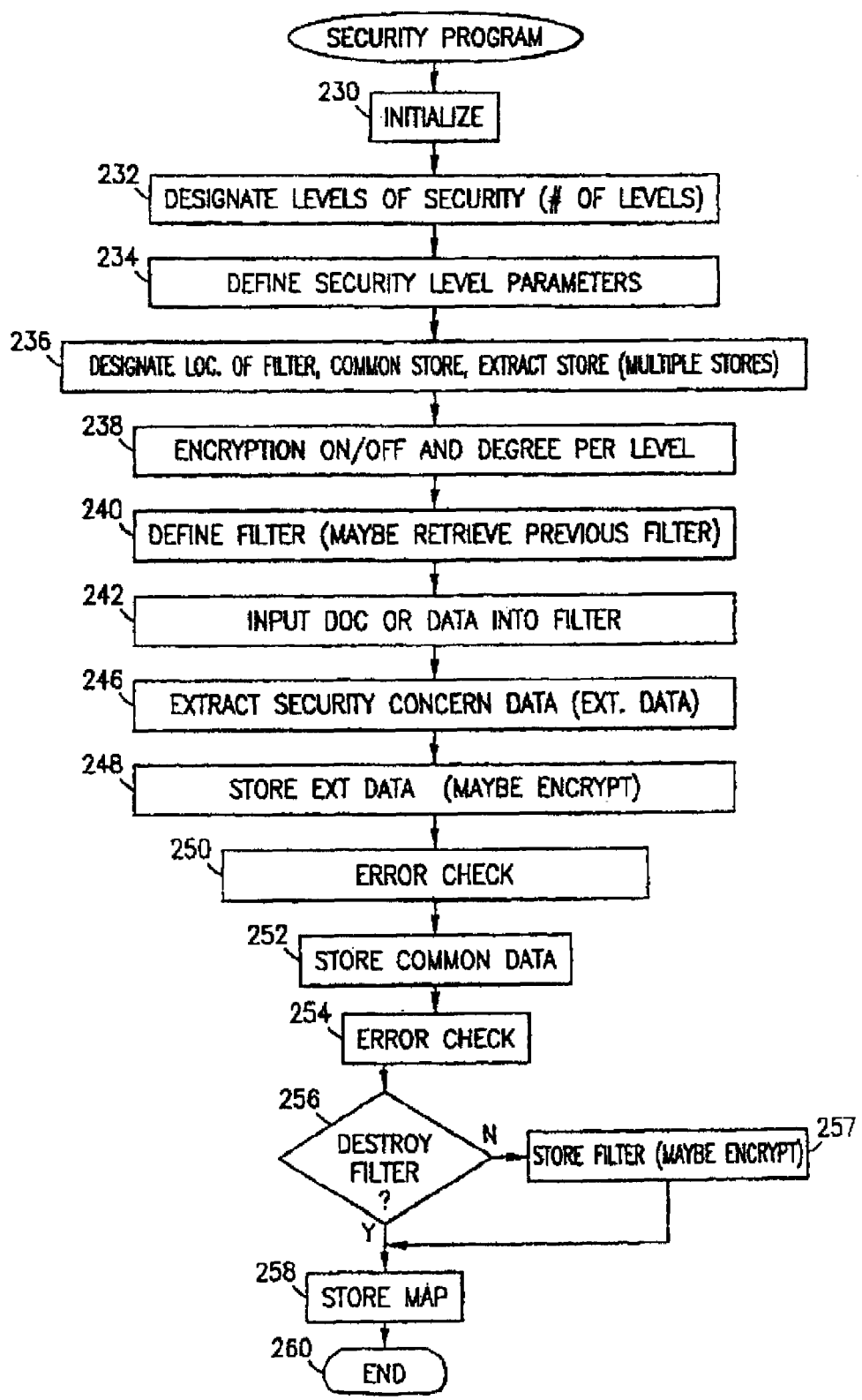
FIG. 9 diagrammatically illustrates a flowchart showing one embodiment of the principal portions of the data security program.

FIG. 9 diagrammatically illustrates the major components of a flowchart for the data security program and shows an extraction module, a content filter module and a secure storage module which can be modified to provide a select content SC module. Rather than operating a security system, the administrator (CIO) may operate a select content SC system to gather important or potentially important content in one location, with an audit trial to locate the source of the select content or "SC." It should be noted that this flowchart may be truncated to limit user selection of certain items. The system would be pre-set to contain these features. Step 230 initializes the system. Step 232 enables the user to designate various levels of security for the activity which he or she will soon engage. The system, in step 234, enables the user to define the levels of security parameters. The following Security Table gives some examples of the type of security that may be available to the user.

| Security Table |
| --- |
| to whom |
| to where |
| when (time of day, day of week, month, floating but predetermined time frame) |
| why (purpose, match purpose to other security parameters or to certain predetermined criteria) |
| how (through what medium (LAN, WAN, Internet, direct dial link), download to what site or destination) |
| how long (duration) the reconstruction process will be permitted per each security clearance level |
| how much (different security levels enable reconstitution of documents and data with different amounts of secure data therein) |
| timing systems may require synchronization for a standard clock (i.e., atomic clock) |

As an example of a truncated or pre-set program, a client-server system over the Internet may have URLs designating storage sites and an ASP 152 (FIG. 6) controlling storage. In this pre-set system, the user does not select the sites. The sites may be randomly selected by ASP 152. The ASP may use artificial intelligence AI to locate secure extract data storage sites. AI or inference machines can ascertain (a) traffic on communications channels, (b) storage limit issues, (c) transmission failures in the communications links, and (d) the degree of security necessitated by exterior events, i.e., terrorism alerts, virus alerts, war, data security warnings posted by trusted sources, MicroSoft, Norton, NASA, DoD, CDC, FBI, etc. Higher security alerts trigger the AI configured storage locator and facilitator to locate memory stores in higher secured places. These higher security facilities may be more costly, may be located in more stable countries or on more stable servers and may have greater degrees of encryption capabilities.

The user, in step 326 can designate the location of the filter, the common storage area for the remainder data, the extraction data storage and potentially multiple data storage areas or segments. The user may enable an AI filter design. Step 238 permits the user to engage or disengage encryption and, if engaged, establish the degree of encryption for the system. Step 240 enables the user to define the parameters of the filter. The user can retrieve a preexisting filter or may define a new filter for each data security session. These filters may consist of dictionaries or any type of compilation of words, characters, icon, data objects or pixel formation or any indication that can be perceived by the computer system. These are called content filters. Granular extraction of data elements (or SC) in a data object may be permitted. Step 242 recognizes that the user either inputs a preexisting plaintext document or types data into the system. In any event, the plaintext document is fed through the filter. Step 246 extracts the security data or SC data from the input document. Step 248 stores the extracted data. The extracted data may be encrypted prior to storage. Step 250 conducts an error check on the extracted data. This error check is helpful in discerning problems in the storage of the data prior to closing down the data security system. Step 252 stores the common data or the remainder data. Step 254 conducts an error check on the common or remainder data. The decision step 256 determines whether the user has selected a "destroy filter" command. If not, the filter is stored with or without encryption in step 257. If YES, the filter is destroyed with a deletion routine. Typically, deletion is complete erasure of all traces of the file including, in high security systems multiple write-overs or disc reformatting. Step 258 stores a map. The map may be stored locally or remotely as described earlier. This is the map module. The system ends in step 260. All traces of these data elements or objects may be swiped clean or removed from whatever computer system generated the data objects or processed them, other than the memory storage locations. Deletion of data also includes the concept of deletion of data transmission paths, URLs, storage site locations and all temporary memory stores. Deletion of file location in the root directory of hard drive 168 of computer 140 is preferable in high security systems.

Figure 10:
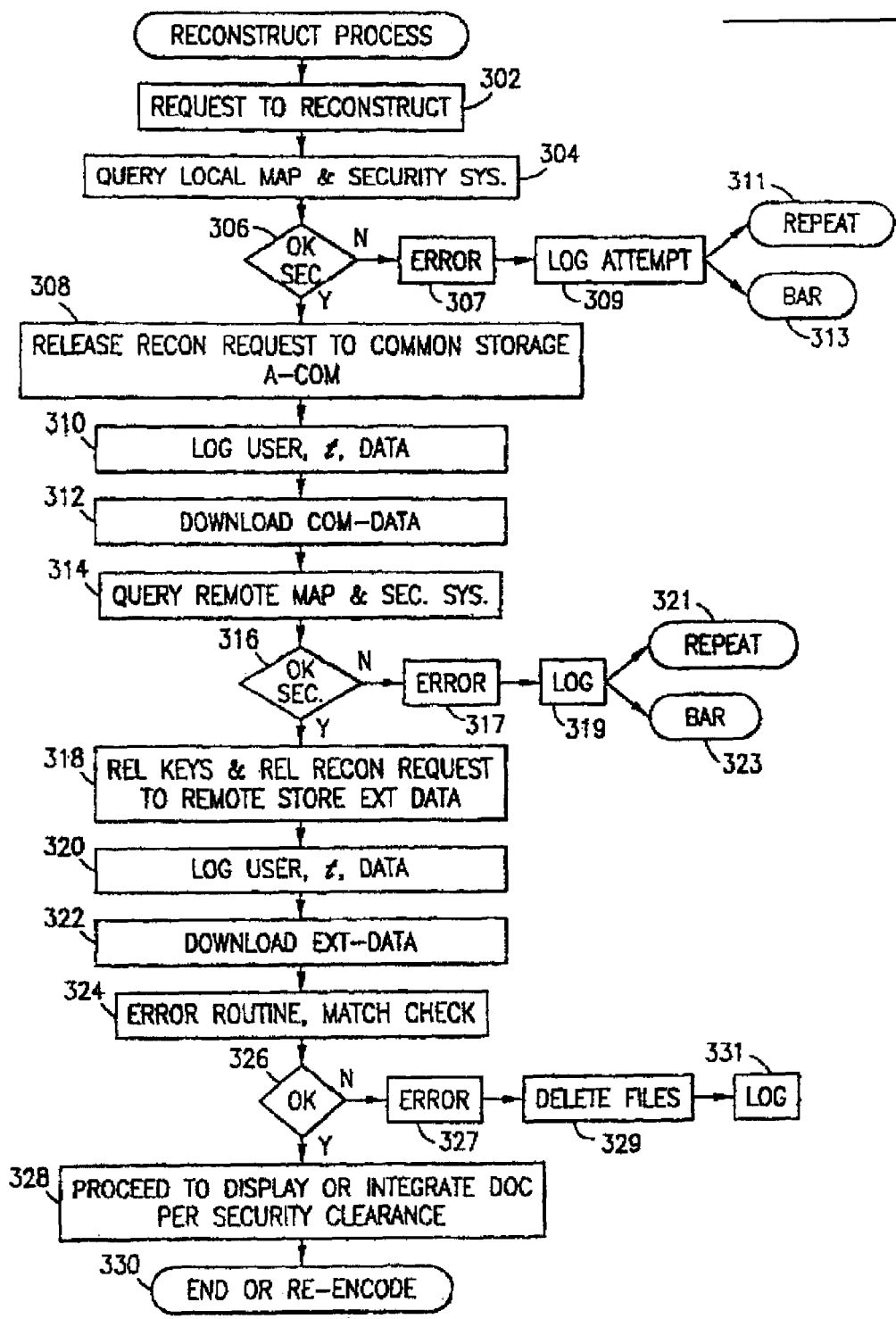
FIG. 10 diagrammatically illustrates a flowchart showing the basic elements of the reconstruction process for the data security program.

FIG. 10 diagrammatically illustrates basic flowchart features for the reconstruction process. The reconstruction process, although not shown in the flow chart for the info infrastructure, is a module that runs in conjunction with the access-permission-control module. Step 302 accepts a request to reconstruct the secured data. In a select content system, a search for the SC is initiated. Step 304 queries a local map and the security system or protocol. In a preferred embodiment the user would have to input several passwords, one of them being a local password on computer 140. A local map which may be accessed only through the password, may simply identify the URL of server 152. Decision step 306 determines whether the local password is acceptable. If not, and error step is indicated in step 307, the attempt to log on to the security system is noted in step 309 (an audit trail), and the system either branches to repeat step 311 or bars the user from further activity in step 313.

Figure 5:
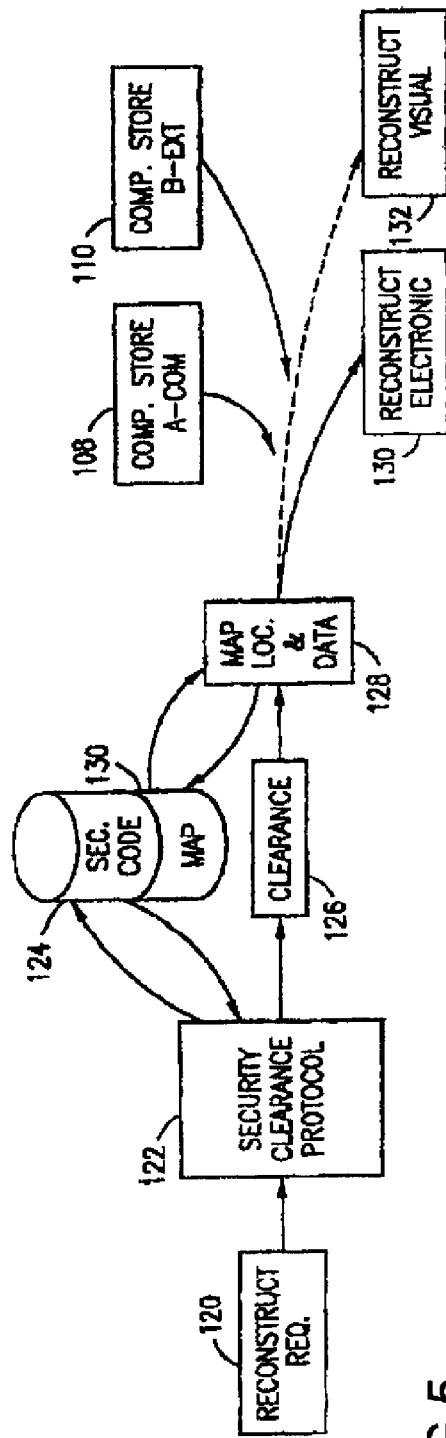
FIG. 5 diagrammatically illustrates a system diagram showing reconstruction of the data, various security clearances and both electronic reconstruction and visual reconstruction.
Figure 6:
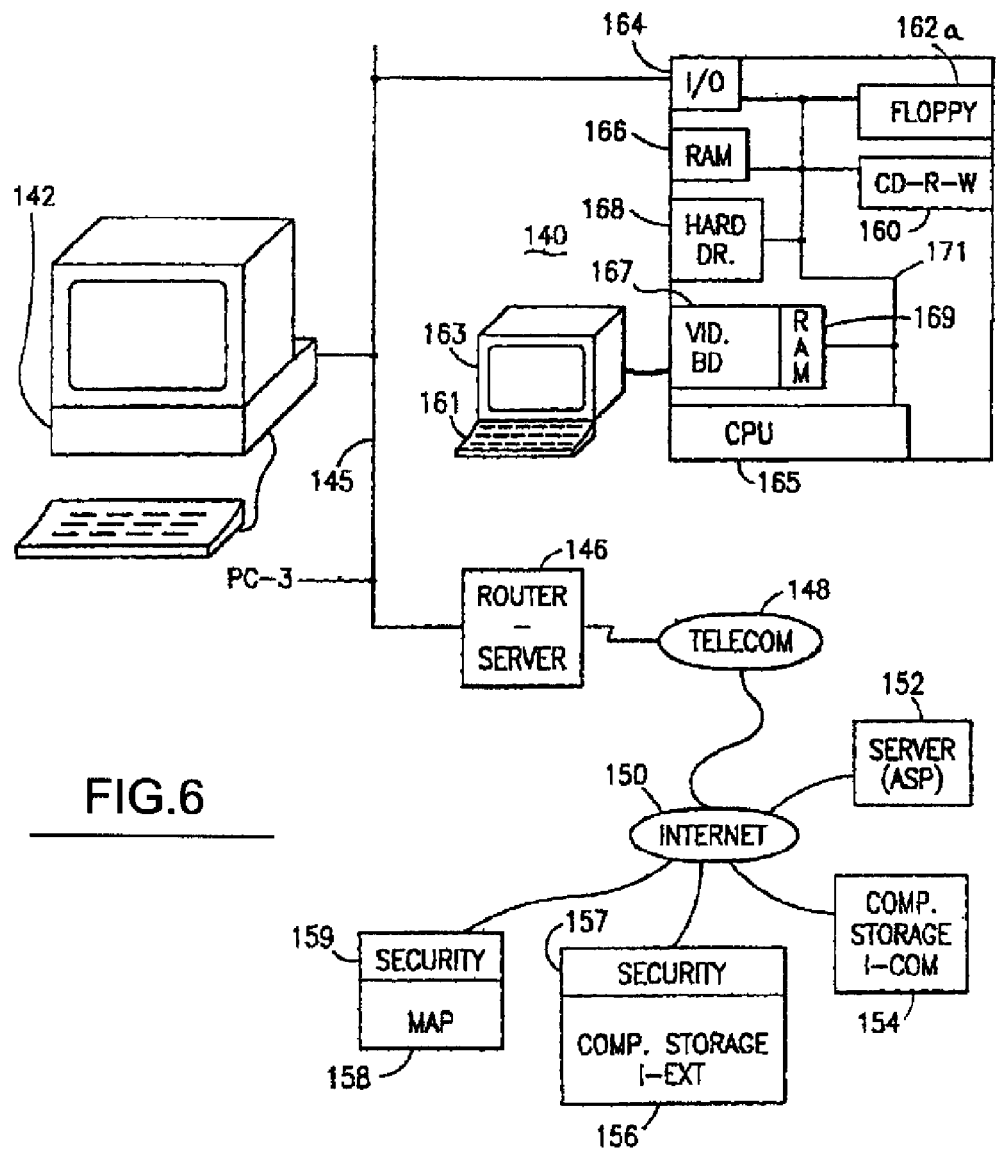
FIG. 6 diagrammatically illustrates a system showing major components of a single personal computer (PC) system, a networked system with several PCs (a LAN or WAN) and the network coupled to a telecommunications system and the Internet and shows the interconnection with a server and multiple, Internet-connected memory units.

Returning to decision step 306, if the password is locally acceptable, the YES branch is taken and the system executes step 308 which releases a reconstruction request to the common storage facility I-com 154 or A-com 108 (FIGS. 6 and 4 and 5). The system in step 310 logs the user in, as well as time and date and the data regarding the request. In step 312, a download from the common data storage is provided to RAM 166 or hard drive 168.

In step 314, a query is made to obtain the remote map from the remote security system. The decision step 316 indicates that the user again successfully inputs his or her security code. If not, error routine 317 is activated, the password failure is noted in step 319 (an audit trial), and the user is given an opportunity to repeat in step 321 or is barred or prohibited from further activity in step 323. In an SC mode, the requester may be required to pay money for the SC data. In the SC mode, a password may or may not be required. If the user has correctly input the security code, the system in step 318 releases the keys (to decrypt) and the map and releases the reconstruction request to the remote storage for the extracted data. This could be computer storage I-ext 156 or computer storage B-ext 110. In step 320, the user's access to the extracted data is logged in along with the time and day and type of data request (audit trail module). In step 322, the system downloads the extracted data into RAM 166 and/or hard drive 168 of computer 140. In step 324, an error routine is operated on the extracted data in order to insure that the extracted data properly matches the common or remainder previously stored. Decision step 326 determines whether the error routine properly generates the correct count or output. If not, the system in step 327 indicates an error, in step 329 the system deletes the common files and the extracted files and the system in step 331 logs in the failed attempt. If the error checking routine on the extracted data is acceptable, the YES branch is taken from decision step 326 and the system, in step 328, proceeds to display the plaintext document or to integrate the plaintext document pursuant to the security clearance initially input by the user. Step 330 ends this process. The end process may entail encrypting the data again and swiping clean all traces of data objects from the memory stores and computer handling units. Of course, every use of encryption requires decryption of the data prior to reconstruction.

The system may incorporate various types of security systems or routines.
- pass word
- pass phrase
- multiple choice questions and answers
- initial, intermediate and subsequent security clearance routines
- biometric security routines (voice, fingerprint, signature, eye or retina scan)

The reconstruction routines may be interrupted or the security system modules automatically activated or initiated upon the occurrence of externally generated triggers or upon certain predetermined conditions or conditional events. See sections D.12 and D.14, for example. Limited extraction, security clearance, release of data and reconstruction limits may be imposed. Artificial intelligence (AI) engines, inference engines or neural networks may be implemented to vary the permitted level of reconstruction via the security clearances. In other words, the AI system, as applied to reconstruction, may, relatively independent of the filter and storage processes, increase the necessary security levels permitted to access and generate full or partial plaintext recreation.

The display systems 220,222 in FIG. 7 include CRT monitors, LCD screens, projection screens and combinations of those systems.

The audit trail to monitor reconstruct and reconstruction attempts may include adding a time/date stamp to the remainder data and/or the extracted data prior to storage and a cross-check to the audit trail log during the reconstruction process.

Placeholders in the remainder document may be:
- blank spaces
- data symbols or elements "---" or "xxx"
- false data
- clearly erroneous data "ABC Company" or "Baker"
- chaff or hash marks
- messages
- bar code
- serialization data
- alerts
- links to other data objects
- null set indicators "[ ]"
- URL or website addresses It is believed that the present invention is faster, during reconstruction, than standard encryption techniques, on the order of 100 to 1,000 times faster.

B.3 System Configurations

FIG. 6 diagrammatically illustrates a personal computer or PC computer system 140, a second PC or computer 142, and a third PC-3. PCs 140, 142 and PC-3 are connected together via a network 145 (LAN or WAN) and are also connected to an input/output device 146 that may be generally described as a router or a server to an outside communications system. The input/output device 146 is connected to a telecommunications system 148 which leads to Internet 150. The Internet is a global computer network. Internet 150 is coupled to a plurality of servers, one of which is server 152. Server 152 may be designated as an application service processor ASP. Internet 150 also includes various computer memory storage devices such as computer storage I-com 154, computer storage I-ext 156 and computer storage map 158. Computer storage enabling the store of extracted data includes a security level clearance module 157. Similarly, map computer storage 158 includes security level clearance module 159.

As stated earlier, the present data security system can be implemented on a single personal computer 140. In this case, different memory segments or hard drive 168 may be used for A-corn and B-ext. Typically, PCs include a keyboard or data input device 161, a display 163, a central processing unit CPU 165, a video board 167 having video board memory 169, a fixed disc hard drive 168, a RAM 166, and input/output device 164, a removable memory media drive 162a (may be floppy disc) and a removable compact disk (CD) read-write (CD-RW) device or drive 160. Also, storage in EMP or electromagnetic pulse hardened data stores is possible. Print stores rather than digital stores provides another optional layer of security. The system may include other removable disk drives, tape drives, or flash memory units. Internal units CPU 165, video board 167, hard drive 168, RAM 166 input/output device 164, removable media (optionally floppy) drive 162a and CD-ROM device 160 are all coupled together via an internal bus 171. Bus 171 represents a plurality of buses as is known to persons of ordinary skill in the art.

One methodology of implementing the present invention utilizes distinct memory segments which may be designated in one or more of the following: hard drive 168, memory in a removable disk in drive 162a, memory in a removable CD disc in CD-RW device 160, and, to a very limited extend, RAM 166. In this manner, the user may select, generally at the outset of the process, that the extracted data memory storage B-ext 110 be stored on a floppy (removable memory) via drive 162a or a CD via CD-RW drive 160. The user can then simply remove the floppy or the CD and carry it with him or her. To reconstruct the data, the operative program, generally discussed above would have access to the floppy or the CD and particularly the memory location of the data on the floppy and the CD in order to reconstruct the entire plaintext document 100 (see FIG. 4). Alternatively, different portions of hard drive 168 may store A-com and B-ext. Of course, the computer system may utilize tape drives and memories or flash card, programmable memory.

In a local area network or wide area network implementation, PC 142 includes memory similar to memory units described in PC 140 and a memory segment may be set aside in PC 142 separate from the common data or remainder data storage typically placed on hard drive 168 in PC 140. As a further expansion of the present invention, the extracted data (that is, the high security data), may be stored on computer storage I-ext memory unit 156 via Internet 150, telecommunications system 148 and router/server 146. In this manner, the common data or remainder data is stored on hard drive 168 and the highly sensitive data is stored off site in a secured location. Access to that secured location may be limited via security layer 157. If the user implements an encryption system (see encryption e 118 in FIG. 4), the extracted data is further secured by the encryption during the transfer from computer 140 through network 145, router/server 146, telecommunication system 148, Internet 150 and ultimately to computer storage I-ext 156.

The present invention may also be embodied utilizing an Application Service Provider on server 152 and in a client-server network.

An implementation of the present invention over Internet 150 most likely includes the use of a uniform research locator or URL for map memory computer 158, computer storage I-ext 156, computer storage I-com 158 and ASP server 152. In a client-server environment, server 152 acts as a server generally commanding the operation of client computer 140. Of course, persons of ordinary skill in the art recognize that the server may be located on the local area network 145 rather than being interconnected with Internet 150 as shown in FIG. 6. The claims appended hereto are meant to cover the alternative embodiments.

As an example of a client-server or web-based implementation of the present invention, the user at computer 140 may define the filter 102 as described above, and input data (plaintext) via keyboard 161 or load plaintext data from drive 162a or CD-ROM drive 160 into RAM 166. In any event, whether the plaintext data is input via keyboard 161 or copied or accessed from removable media drive 162a or CD-RW drive 160, the plaintext data is filtered as discussed above in connection with FIG. 4 Prior to filtering, it would be appropriate for the user at computer 140 to identify where the remainder data or common data will be stored and where the extracted or high security data would be stored. A simple program may automatically select the secure store location. The system is sufficiently flexible to enable the user to select local storage on different memory segments of PC 140 (hard drive 168, removable (optionally floppy) drive 162a, CD-RW drive 160) or be flexible enough to enable user at computer 140 to designate off site storage of the high security data (extracted data) and/or the common or remainder data. An automatic store routine may only require the user to accept or reject to preferred first security level, second security level and higher security level stores. The off site data storage process may include activating server 152 and enabling the server to take over the process directly from user 140. In other words, the user at computer 140 could call up the URL of the server 152, the server could request certain user information (user name, password), and would request data from the client computer to establish the filter pursuant to input selected by the user. The client computer may (a) filter the plaintext thereat or (b) send the data to the server for filtering. The server could store data either locally on computer 140 or remotely at computer memories 154, 156. After storage of the data at any of these locations, the server 152 may establish a map and store the map in memory location 158. Of course, remainder data (cleansed, plaint-text data) and the map may be stored at ASP 152 or client computer 140. The map, if stored at map storage 158, may be downloaded to the user at computer 140. The filter may be stored at computer 140 or may be stored at a secured location on server 152. Alternatively, the map could be destroyed on user computer 140. The filter could also be destroyed on user computer 140. Of course, the filter could be stored in a fourth remote location (not shown), different from I-com 154, I-ext 156 and map computer memory 158. Storage of the map and decryption keys is a critical, high security task. Appropriate security measures should be utilized to protect those items. Local removable memory storage on disc in removable drive 162a or disc in CD-RW 160 may be reasonable. All traces of the map, the filter, the encryption key, the extracted data, and possibly the remainder data may be scrubbed or deleted from all computer memories (by write-over or disc reformat routines) other than the "com" and "ext" storage sites. Deletion of all URLs, links, x-pointers, etc. is also recommended for high security applications. Deletion systems are known to persons of ordinary skill in the art. For multiple security levels, multiple web site for storage of cleansed plaintext, first, second, third and higher security level extract text is preferable. Where the community of interest has access to the targeted and protected data via the Internet, multiple secured storage locations, multiple stores for filters, for encryption keys and for maps locating the secured stores is provided by multiple storage locations distributed throughout the Internet.

To reconstruct the document, the user at computer 140 would be required to call up the URL of server 152 and input the appropriate security code. The server 152 would then call up and download data from various memory locations whether they be memory locations on computer 140 or memory locations I-com 154, I-ext 156 and map memory 158. The system compiles the entirety of the plaintext document by gathering the dispersed components thereof or compiles partial reconstructions for different levels of security. By implementing different security levels, the system is dynamic enough such that server 152 can easily locate the various extracted data levels based upon various security codes representing different security levels, as those codes are input by the user at computer 140. Multiple security codes, at the inception and during the process, may be utilized. The user may be required to input security codes at multiple times during the reconstruction or compilation process. Regeneration of the source is possible with appropriate sec codes. Likewise, the source, via the processes herein, may be reorganized by using tags, labels and different named storage facilities. Maps tracking locations of sec or SC stores enable the user to reclaim data, reform the data previously stored and reorganize the same.

It should be noted that computer storage 154, 156 and 158 may be located on the same computer or may be located on different computers spread throughout the Internet. If the storage units are different computers spread throughout the Internet, computer storage 154, 156 and 158 would each have their own URL or Uniform Resource Locator. On a LAN, the computer storage 154, 156 and 158 would each have their own addresses for access thereon. In any event, during reconstruction, the server 152 gathers the information and downloads the information into RAM 166 of computer 140. This download may include a first download of the common or remainder data from I-com 154. At a separate time, which may or may not include a decryption routine, the extracted from I-ext 156 is downloaded. Preferably, other than inputting initial security codes and any required or desired intermediate security codes, the system operates automatically without further input from the operator at client computer 140. The download of both data sets may be simultaneous in that the download is not humanly perceivable. This is especially true if storage in different memory locations in PC 140 is utilized.

The role of server 152 may be expanded or reduced dependent upon the desires of the user and the degree of security necessary. For example, server 152 may only enable separate storage of extracted data in I-ext 156. In this limited role, server 152 would require the input of a proper security code and clearance prior to identifying and enabling the download of extracted data from I-ext 156.

In an expanded mode, server 152 may be involved in filtering the data, extracting the security sensitive (or select content) words, characters, icons or data objects to obtain extracted data and remainder data thereat, separately storing the extracted data from the remainder data (extracted data being placed in computer memory I-ext 156 and remainder data being stored in common remainder data memory I-com 154) and then permitting reconstruction via separate or combined downloads of the remainder data and the extracted data into computer 140.

The innovation is a system and method for automatically or manually controlled selection, extraction, storage, and release of selected and prioritized information. The system extracts selected information from data streams, in computers, computer networks communication devices, and networks, as well as electronic mail systems. The system and method can reside on a single computer, be distributed across multiple platforms, be distributed across multiple networks, or reside as a remote process (known as a hosted application service process in the state of the art).

B.4 Input or Initial Processing Considerations (Basic Filter Modules)

The security sensitive (or select content) words, characters, icons or data objects may be any word, phrase, letter, character, icon, data object (full or partial), image or whatever, as pre-defined or as established by the user. The user may specifically design the filter, begin with a dictionary (a content filter source) to define common terms, identify any additional security sensitive words, letters, images, icon, data objects, partial versions of the foregoing or any other granular aspect of the plaintext. After defining the filter and accepting the data input, the system filters the plaintext and separates extracted data (security sensitive (or select content) items) from the remainder data. The filter may also include elements of artificial intelligence (AI). For example, the user may select one word as a security word and the AI filter may automatically select all synonymous words. A contextual filter may be thereby designed. The AI filter may enable the user to define a filter in real time at the entry of data via a keyboard. For example, the user may select to secure (i.e., extract and store) some proper names and may instruct the filter to secure names such as Block, Smythe and Cherry. During input of the plaintext, the system may detect Smith and ask the user if he or she wants to secure (a) all proper names in a common name dictionary collection and/or (b) all names with spellings similar to the filter input data, Block, Smythe and Cherry. As is known in the art, AI typically uses inference engines to define one pathway or to outline a course of action. The filter or extraction engine discussed herein can be configured with AI, inference engines, neural network systems or other automatic systems to carry out the functionality described herein for the dynamic operation of the security system.

The system and methodology described herein also encompasses parsing the plain text document by bit count, word, word count, page count, line count, paragraph count and parsing based upon any identifiable document characteristic, capital letters, italics, underline, etc. Parsing is a contextual filter using a content as a marker and a range defines by certain file parameters. Algorithms may be implemented to parse the plain text document. The target of the parsing algorithm (a bit count, word, letter, etc.) is equivalent to the "security word, character or icon, data object" (or SC) discussed herein. The parsing occurs with the filtering of the plain text source document 100 and the subsequent storage of extracted data apart from remainder data.

B.5 Storage

In a basic configuration, the common text or the remainder data is stored in common storage memory 108. The secure storage is similar to the select content SC storage module. This common or remainder data store is identified as A-com generally referring to a segmented memory in a PC or a computer A in a network (LAN or WAN). It should be understood that reference to "remainder data" is simply a shorthand representation of data that is not extracted or filtered by the system. In some cases, remainder data may be nil and all content is removed. Accordingly, "remainder data" is simply that data which can be viewed, manipulated or further processed by the user inputting or initially processing the data. Remainder data storage 108 may include a confirm storage signal function 111 to send back a confirm storage signal to the data input device generating source plaintext document 100. The extracted data file 106 is stored in a different memory computer storage 110 (B-ext). In a preferred embodiment, memory segment 108 (A-com) is at a different location than computer storage memory segment 110 (B-ext). In a PC embodiment, memory A-com is a different memory segment than memory B-ext. In a networked embodiment, computer storage 108 may be on a different computer as compared with computer storage 110. In an Internet embodiment, common text or cleansed text storage is at one web site (which may be one computer) and the extracted, high security data is stored at another web site, buried web page or other Internet-accessible memory store location. In any event, the remainder text is stored in a memory A-com and the extracted data or high security words, characters, icons or data objects are stored in memory B-ext. After storage of the extracted data in memory 110, a confirmation indicator 113 may be generated to the client computer or the computer handling source plaintext input document 100 (the originating computer system). Data may be stored on any type of computer memory or medium and may include non-volatile memory, such as ROM, flash memory, floppy disk, disk drive memory, CD-ROM, and other permanent storage. Additionally, computer readable medium may include, for example, volatile storage such as RAM, buffers, cache memory, and network circuits.

As a simple example, the program configured in accordance with the present invention, could automatically detect entry of all credit card numbers types into a user's computer. The filter is set to detect the unique credit card sequence and data string. Assuming that the user's computer is operating a browser and the user is communicating with a server on the Internet, the user's computer would filter out the credit card number and send the number to a secure storage site. The secure storage site is owned, operated or leased by a trusted party. The extracted data, i.e., the credit card data, is stored at the trusted site. The URL or other identifying data is sent to the vendor from which the user wants to purchase goods and services over the Internet. When the vendor seeks to complete the transaction, the vendor sends a request code to the secure site, the trusted party at the secure extracted data storage site debits the user's credit card account (or otherwise debits the user's bank account) and sends an approval code to the vendor. In this manner, the vendor is never given the user's credit card—the card number is sent to a trusted party automatically by the filter in the security program described herein. The security program may be incorporated in a browser to automatically protect credit card data, personal data (as a method to become anonymous on the Internet), etc. from being deliberately broadcast to others on the Internet or to block others from snooping into the user's personal data while the user communicates over the Internet.

In a further enhancement of the present invention, the computer or data input device handling source plaintext document 100 may also record the location of A-com 108 and B-ext 110. The location data is called herein a "map." A memory mapping function or module is utilized. The map may be stored in a third memory location 112. Memory location map 112 may be a segment of the memory of the data input computer originating plaintext 100. The map may be encrypted for security reasons.

B.6 Extraction and Storage Enhancements

As a further enhancement of the present invention, the user, prior to initiating the security system, may be given a choice of filtering out all the uncommon words or words not found in the dictionary and adding certain security sensitive (or select content) words, characters, icons or data objects to filter 102. The added words or terms are filtered out with the uncommon words. Of course, the user may be required to manually input all security words or download the security word filter from the Internet or another system on the LAN. For security systems having multiple security levels, a plurality of filters would be created, each filter associated with a different security level. Further, multiple security levels would require, in addition to remainder text document or data 104, a plurality of extracted data documents 106. The common or remainder text document or data 104 would still be stored in remainder computer storage A-com 108. However, each extracted data document 106 would be stored in a respective, separate computer memory segment or computer B-ext 110. Separate storage of a plurality of extracted data at multiple, separate locations in B-ext is one of the many important features of the present invention.

The ability of the program to locate security sensitive (or select content) words or characters can be enhanced by using a telephone book, properly dissected, to identify a collection of last names. Cities and towns and street names can also be identified in this manner. The compilation of last names and cities, towns and streets can be used as a list of critical, security sensitive (or select content) words. The filter is represented by this compilation of words. Similar techniques may be used to create filters for scientific words, or words unique to a certain industry, or country.

In view of increasing levels of security relating to (a) the storage location A-com; (b) the transfer of remainder text document 104 to memory computer storage A-com 108; (c) the storage of map 112 (possibly encrypted); (d) the creation, storage or transfer of filter 102 (possibly encrypted); (e) the storage of extracted data at memory storage B-ext (whether singular or plural storage sites); and (f) the transfer of extracted data thereto, the system may include an encryption e feature. The encryption e function 115, 117 and 118 is diagrammatically illustrated in FIG. 4.

The program of the present invention can be set to extract critical data (a) when the plaintext or the source document (data object) is created; (b) when the source document or data object is saved; (c) on a periodic basis; (d) automatically; (e) per user command; (f) per ascertainable or programmable event; and (g) a combination of the foregoing. Timing for storage of the extracted data is based on these aspects. Reconstruction of the data object or plaintext may be (a) automatic and substantially transparent to the user; (b) based upon manual entry of security clearance data; (c) periodic; or (d) a combination of the foregoing dependent upon outside events and who is the author of the data object or other definable aspects of the data object, its environment of origination, current and anticipated security threats and its environment of proposed reconstruction. The timing for the extraction, storage and reconstruction is oftentimes dependent upon the level of security required by the user and/or his or her organization.

The system and method creates a high level of security by automatic selection and removal of critical and prioritized contents from a data objects stream, whether it be a digital document, digital file, database, sound bite, video clip, other structured, or streaming data formats. The system and method enables a controlled release of the extracted data objects, enabling instant display of the instantaneous returned contents, contingent on verification of user identity, access rights, time of operation, location of source and or user, destination of source and or user, and determine threat modes. The system and method delivers high security by removal of the selected prioritized content from memories. The copies and traces of the selected extracted contents are eradicated from the computer memory while the separated extract data stream is transferred to a safe removed storage memory media. The extract, extracts, and any part thereof, will be return transferred to user display as soon as identity and access rights are validated.

A replacement of the extract (sometimes called a placeholder) can also be substituted on-the-fly to provide updated results, misinformation, dis-information, messages, alerts, links (to reports, data mining, search engines, web sites, and hyperlinks understood in the current art), advertisements, and personalization and customization. The validation can be done instantly by password, challenge questions and answers, remote verification (phone, video, or personal contact with user), or by biometrics means.

The extraction of data objects within data streams includes words, structured data objects, characters, numbers, bullet points, footnotes, prices, images, sound segments, video segments, and selected digital data packets. The extraction is conducted by separating a source (original) data stream into two or more extracts data streams. The different data object extractions are separated into groups reflecting predefined contextual categories and restitution applications (such as to enable customization and personalization for the same or different users). The modified source (original) stream typically contains the majority of data objects of the source stream, whereas the extract streams contains a minority of the data objects which represent selected and categorized information and information deemed to be of prioritized importance.

The extracted categorized data objects are separated into one or more contiguous data streams. The extracted data stream or streams are scattered to one or more storage memory memories. The extracted data can be transported and shuttled between different storage or projection apparatus, as directed automatically by various constraints including: security risk criteria of threats and attacks, sources, targets, users, policies, time of day, and threat modes.

The extracted data, in some cases, is transported to an online removable storage and under extreme security threats to an off-line/off-network, digital or physical vaulted storage. Transport and shuttle is based on the level of security alert. The use and release of the vaulted extractions is controlled by a set of rules or organizational policy which includes the following options among others: (a) A vaulting of some, all, or specific data object extracts for long or short periods of time. (b) Release of extractions into a display, in which the extracted data objects will reconstitute with the modified original data stream, the original data objects stream or original document. (c) Release of extractions into a projection display in order to project with the modified data stream, the original document while maintaining complete separation of the modified source data stream (the source modified by the extraction of data objects and insertion of placeholders) and the extracted data object streams. (d) Release of extractions into a projection display in order to project a reconstitution of the original document, in other words to create altered versions of the original document, while maintaining complete separation of the modified data stream and the extracted streams. (e) In situations of high security threats, release of extractions into another projection display, PDA, floppy disk, paper document a wireless display, an overlay transparency while maintaining logical and physical separation of delivery streams. This will enable working with a representation of the initial source, but not the initial source itself, while understanding the prevalent, critical extracted information without comprising security to the initial source material by exposing sensitive, identifying, or critical information. (f) The distribution of sources, modified sources, or extracts to remote and distributed viewing devices. (g) Enable the ongoing operation of information delivery and display in defiance of known ongoing or unknown security flaws, breaches, or events compromising the general state of security. (h) The delivery of distinct and separate data streams, delivered on the same or different channels and media, each with minimal, limited, or even substantial usefulness in and by itself, that can be overlaid logically or physically to reconstitute the identifying data stream and display. Separate display devices can be used to create a composite image or they can be overlaid to physically separate display devices to reconstitute a useful composite display.

The objective is to create security for the single computer or extended network. When an intruder penetrates preexisting firewalls and other security systems, the data object and streams, digital documents, and digital files which will be valueless and prioritized data objects rendered unidentifiable, the penetration is valueless because the critical strategic information has been exported to a vaulted storage. Competitors or hackers, who learn that a computer or network is protected by the system and method, might decide to attack another target instead. This is comparable to a situation in which a bank robber, who finds out that the bank vault is empty, will most probably look for another bank.

The system and method has a menu of different options including the ability to extract: (a) All existing databases on the computer or network. (b) All newly loaded, mounted, or integrated data to the computer or network. (c) All plug-in memory devices (temporary or permanent) containing data. (d) All new and imported data to the computer or network. (e) All new work and output created by the computer or network. (f) All data being transported in/out of the computer or network including electronic mail. (g) All data being transmitted in/out of the computer or network including electronic mail.

The system and method releases the extracted data streams, subject to a controlled-release mechanism and process. The release mechanism is contingent on parameters including; rights to access specific contents, timing criteria, security restrictions, and preset policies. The release of the extracted data objects permits restitution of the source data stream in variations of the source that are full, partial, or modified representations of that source data stream. The release provides for various levels (through user configuration) of separation between the modified source data stream and the extracted data streams. The system enables the maximum grade of security by means of the option of a visual merged projection of said different data streams, while maintaining a strict physical and logical separation between the data streams.

B.7 Basic Reconstruction

FIG. 5 generally diagrammatically illustrates the major features of a reconstruction routine (module) or system. The user, typically at a computer terminal, inputs a reconstruction request 120. The system first executes a security clearance protocol routine 122 in order to determine whether the user has the proper security clearance. The security clearance may be thought of as a security clearance control. If multiple users are permitted access to the documents and those multiple users have different security clearances, the security clearance protocol determines the level of security clearance and, hence, the full or partial reconstruction of the plaintext. The security code input by the user is checked against a security code database or list 124. Clearance is provided in step 126. The location of the map and, hence, the location of the remainder data A-com 108 and extraction is provided to the user's computer in step 128. This may include obtaining a copy of the map 130 showing the location of memory segments in (a) the local computer; (b) the LAN or WAN; or (c) the Internet storage sites. The storage segments are A-com 108 and B-ext 110. The common or remainder data is downloaded or transferred or made available to the user's computer as shown at the output of map location and data step 128. Typically, the extracted or security sensitive (or select content) data from B-ext is downloaded. As described hereinafter, the data can be reconstructed as a complete electronic document in function 130 or may be reconstructed only as a visual reconstruction in step 132. Visual reconstruction is discussed later. Function 130 operates as a compiler to gather the extracted data and remainder data into a single plaintext document. If the data object represents sound or audio signals, reconstruction and play back may require a speaker output in function block 130. In a telecommunications implementation of the present invention, the input would include a microphone or audio detector (supplemental to the input device for document 100), an analog to digital converter (possibly with a voice to digital converter), the filter, extractor, storage facilities at least for the extracted data, and at the output of the system, a converter to audio and an audio announcer. The recipient of the secured data stream or message would be required to clear a security clearance and possibly obtain a decoding key prior to listening to the entire, decoded message. The key and the security data is separately downloaded to the recipient's device.

If remainder data in A-com memory 108 and extracted data in B-ext computer memory 110 is encrypted, the reconstruction process includes a decryption step. Encryptors and decryptors are relatively well known by persons of ordinary skill in the art. Further, the filter 102 (FIG. 4) may include some encryption routine operating on the data object (plaintext) during the filtering. A simple encryption may include substituting "dummy" text or images for the security words and keeping a pointer to an encryption key document mapping the security words with the dummy words. The filter may be stored or may be destroyed at the option of the user. Storage of the filter impacts the degree of security of the entire data system but storage of the same filter enables the user to reuse the filter at a later time. Encryption of the stored filter increases the security of the data. Creation and storage of map in memory 112 also impacts the degree of security of the system. However, if the filter 102 is destroyed and all copies of the map are destroyed on the user's computer originating plaintext document data 100, and the map is stored offsite in a third computer memory location 112, this offsite map storage may enhance the degree of security of the data. The originating computer processing plaintext 100 may be scrubbed to remove all reference and copies of the plaintext, remainder text, extracted data map storage data, etc., i.e., a deletion routine may be employed on the data input computer.

B.8 Reconstruction Techniques

FIG. 7 diagrammatically illustrates a system diagram for various reconstruction routines. A complete reconstruction is shown as security level path A. This involves an electronic integration of plaintext in step 202 resulting from the complete electronic reconstruction of document 100. For example, a merge may occur between the extracted data and the remainder data or common text data. The document is completely compiled in this process. Placeholders in the remainder document are utilized to locate and insert the extracted data. Most likely, there will be no process controls imposed on the integrated document as shown in step 204. In other words, if the user at computer 140 has the proper security clearance, he or she could download or recreate the entire original source, plaintext document and the user would be entitled to edit the document or change it in any way or copy it and reproduce it.

The second level of security, path B, results in storage of the common or remainder data in a different memory location on the hard drive 168 as compared with the extracted data. This is noted in step 206. Another words, in a simple example, hard drive 168 or RAM 166 would hold a copy of a remainder data document and another copy of the extracted data document, that is, two separate documents. Since two documents are available in RAM 166 or hard drive 168, these documents are stored in different locations in the memory. In step 208, a map showing the memory location of the common or remainder document and the extracted data document is provided to computer 140. Step 210 commands the processor CPU 165 in computer 140 to interleave the extracted data with the common or remainder data in the video board memory. In this process, the extracted data would typically have placeholders for the missing remainder data. Otherwise, control codes to locate the extracted data into the remainder data would be executed by CPU 165 to properly place the extracted data into the "visual space" of the placeholders in the remainder data document. The extracted data document may have placeholder for the remainder data. Some type of register between the two image documents may be necessary. The compiler, in this embodiment, gathers the document elements and visually compiles and presents the plaintext to the user.

FIG. 8 diagrammatically shows that video board memory 169 is loaded with remainder or common data 1 and a different location of the video memory is loaded with extracted data 1. The next video memory location is loaded with common data 2 and then a different video memory location is loaded with extraction data 2. Since the refresh rate of computer monitor 163 is fast, the display 163 will show the common or the remainder data and then show the extracted data such that the user could not humanly perceive a difference in the document. However, the user could not copy the document from display screen 163 (a "screen shot") since the document is never electronically integrated into a single document. There is only a visual presentation of the combined document by interleaving the extracted data with the common or remainder in the video memory 169. Step 212 notes that the user may be limited in his or her ability to process, edit and store the reconstructed and presented plaintext document.

Security level path C recognizes in step 214 that the data is stored in different memory or computer locations. In this situation, two video boards, video board A and video board B are shown as board 216 and 218. Video board 216 drives display monitor 220. Video board 218 drives display monitor 222. Display screens 220, 222 are overlaid atop each other. Video board 216 is fed with common or remainder data from the remainder data store (see I-com store 154 in FIG. 6) and video board 218 is fed with the extracted data from the extracted data store, for example, I-ext store 156. In this manner, as noted in step 224, the user is presented only with a visual presentation or compilation of the plaintext. Since there was physical separation between video monitor 222 and video monitor 220, there is no electronic integration at all of the plaintext document. Hence, the ability for the user to do any significant editing on the plaintext document is blocked or prohibited because the user only has access to either the data on video board 216 or the video board 218.

Security level path D shows that the extracted data may be parsed or further separated based on a plurality of security clearances in step 226. Step 228 recognizes that the system can repeat process and security process paths A, B and C only with portions of the extracted data presented to the user based upon the user's security clearance.

C.0 Testing the Security System

The prime purpose of the data security system is to limit the disclosure of critical data or select content SC data to persons or organizations who may misuse or abuse the data. A testing module supplies this functionality to the infrastructure. With the advent of cheap memory, fast processors and increasingly dynamic search engines and the high speed communications links established by the Internet, the ability of a suspect person or organization (a person/organization which is not permitted to have the SC or secure data) to associate some low level secure or SC data with public source (or accessible private source) data and "discover" the secret or SC presents a significant problem. Therefore, a system to test the secure nature of the SC or secure data system, with inference engines or knowledge expander KE search engines, is beneficial. The following sections C.1-C.23 discuss such search engines to test the security of the base system described in sections B.1-B.8.

Also, the information infrastructure is flexible enough that the system operator (CIO) initially builds the infrastructure using simple filters and simple access and permission policies and rules. The infrastructure becomes more complex due to testing of the secure storage and the SC storage. The higher degrees of complexity may cause the system operator to employ more complex filter (see sections C.11, C.12 and C.13 and employ aggressive deconstruction techniques (see section D.1, among others). Additional complexity is added to the system with further policies or rules which are prioritized and implemented with hierarchical taxonomic classifications. The hierarchical taxonomic classes must be bought, customized or built. The knowledge expander KE module is used in the development of the contextual filter modules, the testing modules, in the taxonomic filter modules and in the classification generator.

C.1 The Etiology of Information

Security, privacy and information sharing is predicated by the representation of the structure information. The structure has evolved in usage over time from simple linear formats to complex hierarchical trees typified by tags, metadata and modifiers. Although the predominant information delivery and information storage format is in a linear data stream, the internal structure or representations include all possible linear, field defined, metric, tree, compound and combined layouts. In other words, while data is delivered in a linear stream, the complexity of internal structure resolves into specific documented patterns, self-documenting meta data formats like HTML or XML, defined utilitarian and purpose-oriented formats like database management system (DBMS), ODF (open document format) or proprietary document object models (such as the Microsoft DOM model). The combination and recombination of metadata in source documents or data streams complicates finding, location, and expanding one's knowledge base of SC. The issue of the internal format is important to the regulation, interpretation and application of information.

As discussed above, the etiology of information involves a complex hierarchical trees of various types of data such as tags, metadata, and modifiers. Specifically to the issue of semiotic (words and objects in language) and pragmatic (words relationship to user) meaning, the internal format of information is important to its regulation, interpretation and the further use and application of the information. A discussion of the differentiation of the data as to content, context and concept is discussed later herein. The abstraction of information is also relevant here. For example, the database scheme DBMS and the DOM style sheets and the internal metadata all modify the encoding, format, structure, purpose and usage of the information. Links and references establish contextual meaning, just as the environment establishes meaning relevant to the multiple granular data in the information stream or document. Metadata can validate or invalidate meaning in the text of the data, for example, a format or a replace meta data element could indicate the complete deletion of material, the connection between topic and footnote, or modification with non-usage of the data. To perceive data only in context without the effects of format, purpose, reference and access rights, potentially misinterprets the importance of context and concept which may result in a misunderstanding of the information.

C.2 Metasearch Engine for Knowledge Discovery: Search Convergence and Divergence As an overview, the system's metasearch engine is a novel and useful service to uncover unknown or concealed relationships, delivery of higher relevancy search results and connecting the dots. Although metasearch is derived from the technology for security and information sharing, it is useful to augment standard Internet search engines because it enables both search divergence for knowledge discovery and search convergence for assessing information integrity, the full process necessary for connecting the dots. Search divergence extends search with aggregation, inference and data-to-data interaction beyond simple content into the realm of context and concept. The system is a standalone system or can be integrated to process results of other search engines. Presented is a process and a technology for knowledge discovery, security and information sharing that is based on management and control granular data content to secure information while also providing interdomain information sharing. The basic assumption is that all data/content must be monitored, analyzed and categorized at the granular data level for basic security risk management and control. Risk measurement is driven by information recognition, multi-tier overlapping hierarchical meta-tagging technology, and granularization. This same technology, as a standalone deliverable product or service-oriented architecture, is applicable to knowledge discovery, uncovering unknown or concealed relationships, and for connecting the dots. The metasearch process is a serialized and repetitive process of knowledge discovery, usage of the innovation's secure engine, and the application of granular data content, as a standalone service for knowledge discovery. Because the risk measurement is driven by (1) content, (2) context, and (3) concept, it is essential that the system recognize content not only in isolation to itself as a data stream or document but also its value when combined with other private and public sources through aggregation, inference and data-to-data interaction. The metasearch is useful to augment standard Internet search engines because it enables both: (1) search divergence for knowledge discovery and (2) search convergence for assessing information integrity. It completes the process necessary for discovering new knowledge to connect the dots. Although testing for security is discussed above, testing for select content SC is possible. SC is unique information that is of some interest to the enterprise. If the SC store is to be complete and represent a viable and useful knowledge store, the quality of the information in the SC store can be tested to ascertain whether the content is unique or should be supplemented as discussed later herein.

C.3 Initial Process—Metasearch Engine and Knowledge Expander

The automated metasearch KE search engine takes as source any data stream or document. The metasearch engine module (FIGS. 11, 12a, for example) automatically parses the source for content recognition and assessment of granular content. This granular content is automatically metatagged by the search engine—system for range (contextual relevancy), sensitivity level (prioritized), compartmentalization (sensitivity levels at the same hierarchical level, but laterally or orthogonally disposed to one another, see TS—Navy compared to TS—Army wherein the Navy and the Army are compartments), categories (hierarchical taxonomic classes), relevancy (a type of sensitivity), and other multi-tiered overlapping hierarchical factors. The granularized data content becomes the search terms, while these metatags become metafilters for the knowledge discovery process. These search terms are submitted to any number of extant tools and services (other search engines, such as Google, Yahoo), for locating other relevant supplemental data streams, documents, databases, local, Intranet, Internet, and public or private data stores. Likely tools include Internet search engines, data mining tools, database query engines, data collections, indices and other knowledge management (KM) applications or services, which are generally classified as data structures or data collections herein. Inductive and deductive tools are advantageous too. Most tools can be easily integrated with the system, linked through service-oriented architectures (SOA), or their results piped into the source data steam or document (through Web 2.0 mashups). The metasearch engine also works with standard—a priori—search terms or keywords, like any desktop, web-enabled, or Internet search tool. This search operation may bypass the system's secure assessment of a relevant or representative source data stream or document.

C.4 Simple Metasearch Engine

The results from the extant tools (the results sometimes called supplemental documents or supple docs) are logged for auditing, dispersed to maintain a legal chain-of-custody, and aggregated into a single collated result. A List of Abbreviations is set forth in a later section E.1. This collated result (the source, results, reports and links or references) is automatically submitted into the metasearch engine. Inputs include the configuration for either (1) search convergence or (2) search divergence. Search convergence conforms to the standard purpose for using Internet search engines like Google or Alta Vista because it defines, authenticates, and validates the search terms. The first level search results provide for an integrity check for the initial information results in that it does not aggregate or inference the information therein.

The divergence function, on the other hand, is all about aggregation, inference, and data-to-data interaction because it specifically searches for links, references, relationships, outliers, and social networking associations to the search terms. The divergence function will likely ignore anything overlapping the search terms in order to expand the search. In other words, convergence increases the depth of knowledge where divergence increases the breadth of knowledge represented by the collated result. The divergence function explores new, novel, unknown, and hidden connections. If you want to connect the dots, divergence dredges new but factually uncertain information where convergence thereafter authenticates.

The system is automatically run. The source (which is now the aggregated result from the extant tool processes) is automatically parsed by the metasearch engine with secondary recognition and assessment of granular content.

C.5 Automatic Metatagging

This granular content of the source doc is automatically metatagged for: (1) Content categories, (name, location, date, dollar amount etc); (2) sensitivity level, ("Top Secret", "Private", "level 9"); (3) compartmentalization, ("top secret-Finance" "Top secret logistics"); and (4) relevancy, and other multitier hierarchical factors.

C.6 Automatic Secondary Tagging of a "Range"

A secondary level of metatagging may be created to define the "range" or "the area within the document" from which the keywords for the search will be selected. This is a simple contextual select content (SC) or secure content (sec-con) operation. Software modules carry out these functions. To create a higher level of relevancy in the search results the system controls the granular data within the document. Only "areas"/"ranges" with a high relevancy will become the basis for locating keywords for the next search. Range defines the area or areas within a document (characters from the target selected content, lines away, within the same paragraph, on the same page, etc.), which will be the base and platform for locating keywords for the next search cycle. An analogy is the defining the range/area for oil drilling in a suburb of the city of Houston. All the drilling will take place only in that location. As an example of defining a "range," we present the system's creation of automated tear lines.

Each paragraph (the "range" can be also configured to a "sentence" or "line" or "page") is automatically tagged based on an algorithm. The algorithm may be "tag the paragraph based on the highest sensitivity level assigned to any of its words; or if a group of specific words appear in a paragraph," ("ATTA", "Hamburg" "New York" all tagged as Secret "S" security level or importance) and tag the paragraph at a higher sensitivity level than those words (i.e. Top Secret "TS").

The granularized selected content becomes the search terms and the metatags become the metafilters for the systems meta search. The automated results of the meta search process is an augmentation of existing knowledge or a breakthrough to unknown or covert relationships. The convergence search vets the integrity of a priori search terms, while the divergence search generates new search terms and new references. The metasearch is repeated, as configured, for a fixed number of times, for a fixed period of time, until results reach an asymptote, or indefinitely. The metasearch inputs also include the metafilters created prior to the presentation of the aggregated search result. These metafilters define the direction of the search by introducing "fine adjustments" to the search process. In essence the metafilters narrow the scope of all subsequent and serial submissions to the extant tools and services. The search may be configured to include one or a combination of filters as follows:

(1) Selection of keywords for search based on their categories. The system automatically categorizes each word and character. In one embodiment, there are over 50 different categories or hierarchical taxonomic classes. Categories may include name, location, date, dollar amount, credit card number etc. As an example the system may be configured to feed the search engine with words that where automatically categorized by the system as "locations" and "people" in such an example "Rome" "London" and "Muhammad Atta" may be selected automatically as the keywords for the next search cycle.

(2) Selection of keywords for search based on their sensitivity level or important or assigned weight. This is the sensitivity level of the hierarchical taxonomic classes. The system may be configured to select as keywords for its next search only data elements that where classified/tagged with a specific sensitivity classification/tagging. A possible example, is an instruction to use as keywords only words that where given "Top Secret" classification, or "private" classification or assigned with a specific weight (select words that where assigned weight 9 out of 10).

(3) Selection of keywords for search based on the specific importance of their content. For example, use as keywords, words that belong to a list of specific grouping of words. A list of associated words that convey a concept or a contextual relationship and other features and compartmentalization. Metafilters for standard search terms, which bypass the initial system's automatic review of a source, are optional.

C.7 MLS, Multi-Level Security-Compliant Search and Distributions

Because the system and all the extant knowledge management tools may run in a secure system high environment, results are likely to be system high too (classified at the same security level). However, the point of any search or knowledge exploration is to share information and distribute it to the users at the edge. The advantage of the system is that the new search terms, the aggregate result, and all intermediate reports and documents are processed for Multi Level MLS-compliant security and information sharing. Each user will get a result based on his security level (for example, TS or S or C or UC). Specifically, the list of new words, phrases, and other content is either automatically assessed or manually reviewed for addition to the system's dictionaries. Ownership sensitivity level, compartment, group, categories, mission, relevancy, and other multitier overlapping hierarchical metatags are applied to each discovery and distributed to users subject to MLS compliance. The aggregate result are secured with multiple MLS-compliant versions and distributed to the edge on a: (1) per sensitivity-level basis version, or (2) a base redacted document with objective security compliance for universal distribution and pushed to the edge with the system's reconstitution services. In other words, information sharing is implemented either through the delivery of: (1) Multi Level Security—MLS-compliant versions, or (2) Through a base redacted document with objective security compliance for universal distribution with reconstitution.

Reconstitution is supported in whole or in part as: (a) MLS-compliant results, or as (b) Step-wise reconstruction, with defenses-in-depth MLS-compliant results i.e. controlled release layer by layer.

These two options are also applied to all intermediate results, reports, lists, linked or referenced sources. Of note, all links and references, even access to public data sources can be optionally restricted to minimize subsequent risks from aggregation, inference, and data-to-data interaction. An agency with specific intent and knowledge is able to use aggregation, inference, and data-to-data interaction on public sources to create classified results. For example, if unclassified search terms including "president assassination British visit" returned news clippings and RSS feeds of a forthcoming presidential visit to 10 Downing Street, these public results are still unclassified but the context is clear and may be classified.

The systems metasearch is a novel and useful standalone service to uncover unknown or concealed relationships, and connect the dots. It is useful to augment standard Internet search engines because it enables both search divergence for knowledge discovery and search convergence for assessing information integrity, the full process necessary for connecting the dots. Search divergence extends search with aggregation, inference and data-to-data interaction beyond simple content into the realm of context and concept.

One of the main tools in the present knowledge expander (KE) engine is its ability to control granular data with automatic content analysis/filtering and tagging of all the select content SC data and unknown data elements in every document, data stream or input document.

The knowledge expander KE engine: (1) automatically creates a list of search terms; (2) automatically cleans the noise from the search term list; (3) automatically selects from the list of search terms those that will be sent to the next search cycle (preexisting rules for doing the selection)—example: select for search only the items found which are in the "names category" and "locations category"—from the list of search terms—for example the names "Redhouse," "Kohn," "Miami Beach," and "Ft Lauderdale" will be sent to the next search cycle; (4) conduct a divergence search—limit set at 200 supplemental documents (supple doc). Each supple doc goes through an automatic content analysis/filtering and tagging of all the data elements in the document. Key words are located in the supple docs by filtering of categories. The process cleans noise from the extract key words from the supple docs. Rules select which key words will be fed into next search cycle. For example, if 1 of the 200 documents had the name "Bob Smith" location "Sarasota" (as long as the rules for selection were not changed the next search will be fed with search terms—"Bob Smith" and "Sarasota") search is expanding—a diverging search. The last process wherein Bob Smith is added to the KE engine is a convergence filtering process because the search results will converge on Bob Smith.

C.8 Benefits of the Metasearch—Knowledge Expander

Typical search and data mining tools presupposes that the user already knows part of the answer. The user must know how to phrase the question (search terms ir query) in order to get a proper answer. However, this is only partial solution to knowledge management in that does not begin to address the real issues needed to connect the dots. This knowledge management technique as called herein "convergent" because the operator starts with a known entity and the search confirms or denies the basic entity or gathers additional information in depth on the entity topic. The present knowledge expander search, with various modules operating together, automates the convergent process until no additional information is found on the topic.

The present system and process allows knowledge management as a divergent exploration. The basic starting point is any data stream (RSS, blog, documents, a fire hose of data) or multiple data streams, or a collection of search terms for an automated process. A single term defines a manual process with a primary search term. The automated process redacts the data stream(s) and looks for content and context of importance creating a list of primary search terms, metadata contextual filters, and noise reduction tools in order to expand the breath of knowledge with new links and references. Alternate spellings, misspellings, partial matches, duplicates, and other fuzzy technology is used to graft depth to a convergent search or prune a divergent search. In the case of a divergent search, the process is specifically exploring for secondary search terms and information that is not part of the primary search terms. Noise and duplicates are pruned. All hits and information located with URLs, X-links, or other pointers is retained for a chain-of-custody source-indicating data, reproducibility, and human intelligence analysis. Consolidated results are insufficient for legal exploration, search warrants, or plans of action, so the retention is critical to build a rationale for action and review the relationships, connections, and networks of people.

The search is extended with the primary search terms, the secondary search terms, and combinations and permutations thereof. Duplicates and non-duplicates are pruned per the selection of convergence or divergence. Tertiary search terms and information is aggregated in the same manner as the secondary search terms and secondary information. This process would repeat unless manually interrupted, terminated by a timer, manually reviewed midstream and grafted or pruned, or terminated by repetition or lack of new information. When no new information is found both the convergent and divergent search are stopped. The termination rationale is inverted. In the case of convergence, the latest results are only new information that is not wanted and adds no depth to the knowledge. In the case of divergence, the latest results are only old information and represent no new breadth to the knowledge.

C.9 Information Life Cycle Engine

The information life cycle engine has an input configuration which is saved, an indication of the source of the information and text, metadata, data streams, blogs, RSS (Release Simple Syndication or Rich Site Summary), or a compound document. The process is a reduction of the information input into the system into its major elements by format, style, type and data type. Compound documents must be taken apart to basic identified types with tags and metadata separated out.

Figure 11:
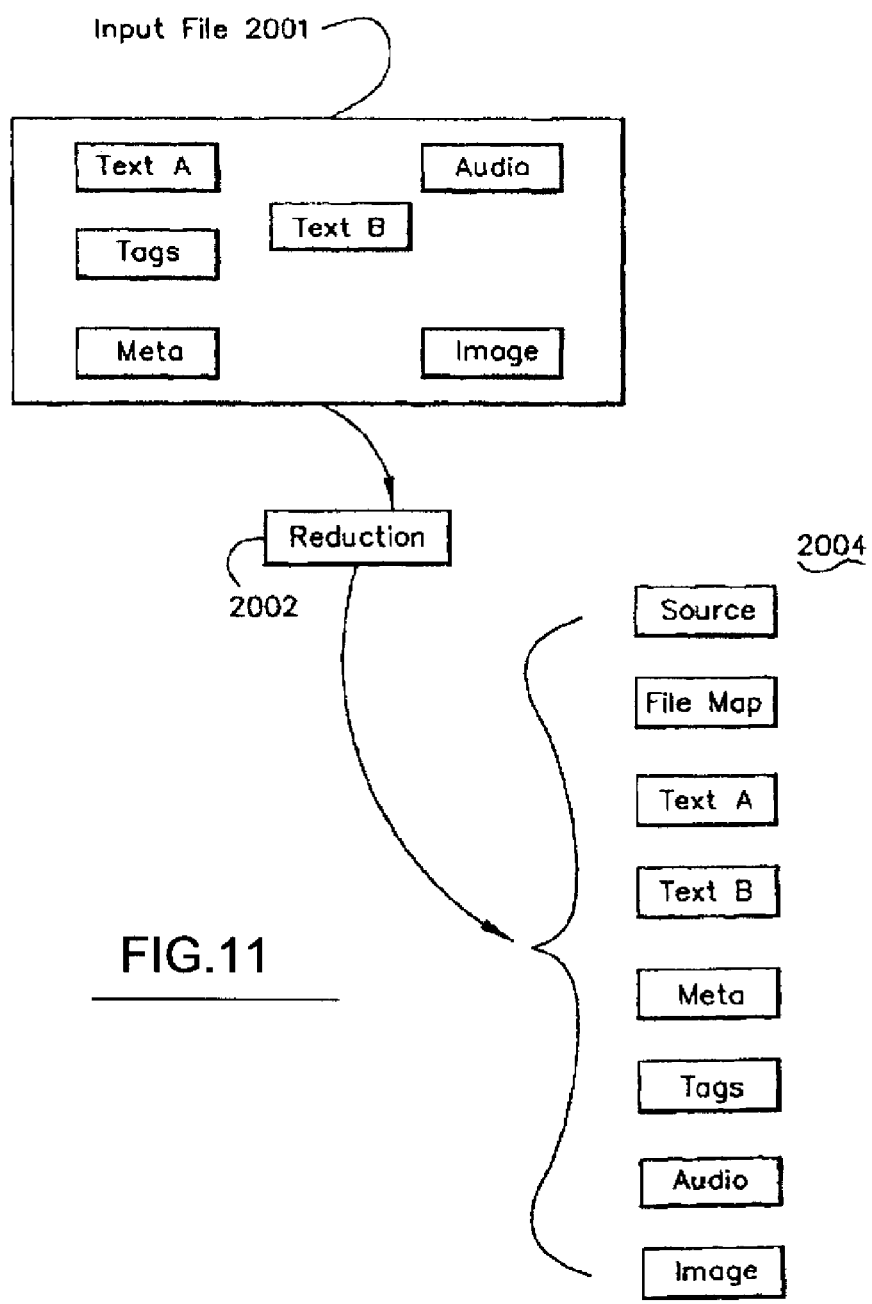
FIG. 11 diagrammatically illustrates deconstruction of an input document into segments.

FIG. 11 shows an input file 2001 (an information file or data stream) having therein text A, Text B, various tags relative to the information in the text (such as paragraph numbers), metadata associated with items and data objects in the document and image elements. The input file is subjected to a reduction or deconstruction step 2002 which creates an expanded information document which includes source data, and file map of the various elements, text A, text B, metadata, tags, audio and image. Of course, multiple audio files, image files, metadata files, tags etc. may be included in the expanded information document represented at 2004. The Editor as an Information Expander section and following sections provides greater detail of the reduction step 2002.

Further defining the source as an information file or data stream is important. "Text" is a basic defined type. The information life cycle engine automatically processes the information document. The process includes selection, extraction and categorization. For example, a document having security sensitive words or selected content (sel. cont. or SC in the figures), phrases, images or sounds, identified as secured content by Department of Defense pre-classification must be processed with a step of filtering, identifying tear lines between classified material (contextual filter or parsing technique) and ultimate identification to a base level of classification. Words, phrases, user defined words and a group list of words, phrases, combination and occurrences within a defined range are employed to identify the security (priority) level of the information document being processed. Pattern and categorization, dictionary categorization, and syntactic categorization is employed.

The information document is also parsed or separated apart by syntax, that is, words, sentences, quotations, parenthesis, other types of textual delineation, and instruction. Complex phrases are resolved for overlapping security levels and complex meanings. Categorization is employed to determine the level of security of the information. Multi tier-overlapping and hierarchical tagging is employed. Any dispute automatically identified by the system upgrades the entire information document 2004 to the next highest security level. The next step in information life cycle engine is to extract and disperse various versions of the document 2004 elements along tear lines or other types of delineation specified by the operator.

Extracted data objects or elements may be replaced by tags, codes, or null field indicators. The system may create various versions of redacted output documents. The base document, redacted of all critical or security sensitive information, should be stored along with a recovery file. The recovery file may include maps to permit a party with a preferred security clearance to recover completely the base or original source document. A metadata table is created with an intermediate resultant document. Reports are generated showing encoding, dispersion of the data and storage location. Lists are also created showing selections of data redacted from the source document, encoding of the data and synopsis of the data. Additional outputs include a recovery file and a categorized meta search file. Displays are permitted either locally or to test the discovery results.

Figure 12A:
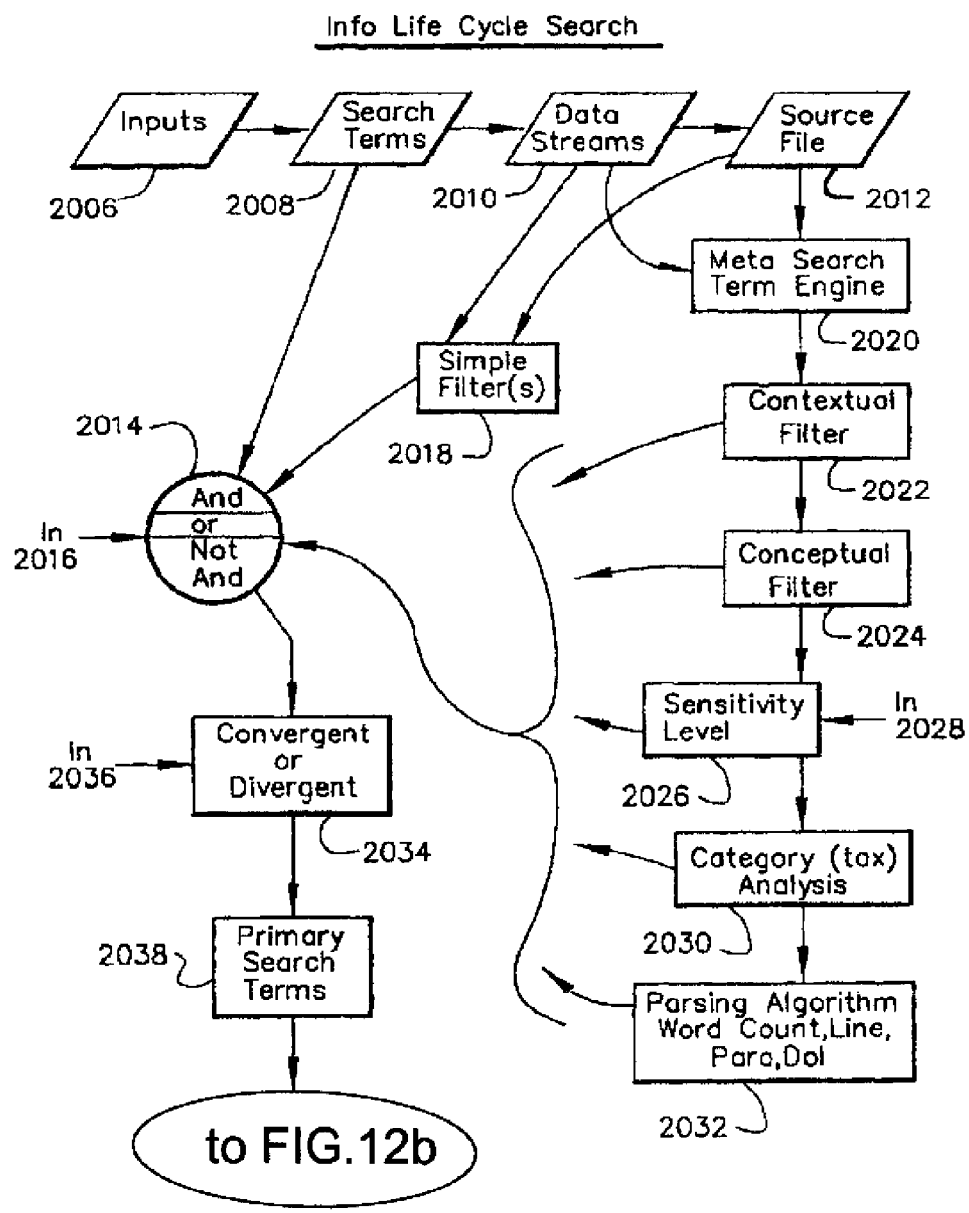
FIG. 12*a* diagrammatically illustrates the information life cycle knowledge expander (KE) search engine process.

FIG. 12a shows information life cycle search module. At the beginning of the program flow in FIG. 12a, an input function 2006 is noted which includes information regarding the source of the information document or "source document" which source doc may, at the operator's discretion, include search terms 2008, data stream 2010 or a source information document file 2012. The search terms may include one or more SC or select content or security sensitive content (sec-con) which is of interest to the user. If search terms are input, these terms are supplied to a summation or discrimination function 2014 (AND, OR or NOT AND operator). In other words, the operator (or the system automatically by default) could conduct an AND conjunctive search obtaining additional information from other documents or an OR exclusionary search showing and processing only the items that are identical are substantially similar from source doc and filter outputs. The AND operation may operate on the terms applied to discrimination function 2014 (e.g., the terms from input 2008 must match one output of the simple filter 2018) or may refer to a summation of all terms from input 2008 and simple filter 2018 and metasearch term engine 2020. The OR function has the same options. The NOT AND discriminator operates only to extract and use terms output from metasearch term engine 2020 which do not match search terms 2008 and the output of simple filter 2018. Some select content SC (or sec-con) must fall within the prioritized hierarchical taxonomic class or classes function 2030 in the NOT AND search. The non-matching search term engine is discussed later in connection with the Expansive Unknown Search Engine. A substantial similarity test, as a subroutine in the discriminator 2014, may ignore duplicates and may truncate search terms by eliminating suffixes (and possibly prefixes) from the search term processor. Input IN 2016 recognizes that the operator may provide a manual input into discrimination function 2014. If data stream 2010 or an information source file or document 2012 are input, these information documents may be processed through one or more simple filters 2018 extracting white list terms (inclusive lists) or black list terms (exclusive lists) or terms not found in dictionaries, the result of which is supplied to the summation-differentiation function 2014. See the Simple Filter and Complex Filter sections C.12, C.13 below. In addition, data stream 2010 and document source file 2012 are submitted to a metasearch term engine 2020. The more highly organized metasearch term engine 2020 filters the data stream or source document with a contextual filter 2022, a conceptual filter 2024, a sensitivity level filter 2026, a hierarchical taxonomic or category analysis 2030 and a parsing algorithm for word count, line, paragraph, or DOL 2032 (contextual filter with range setting module). The order of these metasearch filters may be changed. The filter modules are contextual, semiotic and taxonomic filters. Semiotic include syntactic, semantic and pragmatic features (discussed later in section C.13). Sensitivity level 2026 contemplates potential manual input IN 2028 which establishes the depth or expansive nature of either the contextual filter or conceptual filter. The sensitivity filter and the hierarchical taxonomic filters are used to focus the search in that the operator can select hierarchical taxonomic levels or terms of concern, for example, names of terrorists—priority 1, terrorist location—priority 2, date of source doc—one week—priority 3, temporal (date)—1 month—priority 4, terrorist organization—priority 5. Each "priority" is a SC selection sensitivity factor (or sec-con factor) and the class of the information is a taxonomic analysis, the result of which is a prioritized hierarchical taxonomic classification system and filter for the search. The result of this meta or more highly organized search term engine 2020 is supplied to the summation-discrimination function 2014.

The system then operates on convergent or divergent function 2034 which includes, optionally, input IN 2036 from an operator. The convergent or divergent function 2034 enables the operator to only search for converging search terms or select a more divergent search routine. Function 2038 results in a primary set of search terms.

An element of the information life cycle engine is parsing or deconstructing the original source document or information file. The structure of the source document DOM metadata and compound file format must be simplified and the source document must be broken into its atomic types such as markup data, tags, metadata, links, hyperlinks, references, comment, differing data types, purpose and format. This parsing is discussed later in connection with the DOM data structure in section C.18, among others. Categorization is applied as a resolution or coding to a single overriding security level. Priority is given to the most complex or highest security level. For example, a document with "Bin Laden" as compared with "Bin" next to "Laden" results in "Bin" being identified at the secret "S" level and "Laden" being identified at the classified "C" level wherein "Bin Laden" is classified at the top secret "TS" level. (The security classes including TS top secret, S secret, C classified and UC unclassified). The resulting document would be identified as top secret TS because "Bin Laden" represents the highest level in that paragraph (format or contextual indicator). Adjacent permutations of a linear nature could also be employed. For example, "Khalid Sheik Mohamed of Syria" results in unknown [Khalid], Sheik [title of middle eastern person], and Mohamed [name] "of" [preposition] and "Syria" [geographic territory]. The resulting analysis results in an up coding of categorization to a next higher security level (e.g., S to TS) due to the contextual range grouping of the SC.

The system may employ a "My Group" list or profile which identifies key items and triggers a certain result based upon the "My Group" pre-set profile list. The profile is an SC profile of interest or an sec-con profile of interest. The My Group list would include a profile name such as "first strike capacity" and a list of key terms under that profile such as "nuclear, ballistic, submarine" and a "range" such that anytime that key word is found in a paragraph, a certain classification is assigned. The "range" being the paragraph in the source document. The Profile Name could be used as a search term for a divergence search (discussed later) or a link to a dictionary of search terms. The search terms are either content-derived in nature or conceptual in nature. Certain contextually-derived results, see Bin Laden example above, may automatically trigger use of a specially designated My Group search profile. Further, the Profile Name can be linked to another list of synonyms associated with the specific terms nuclear, ballistic, submarine. Contextual and conceptual terms are employed in this manner.

C.10 Information Life Cycle Searches

The input into the information life cycle search (FIG. 12a) may be one or more search terms, a data stream such as a blog, RSS, or a string of data, or information document (DOM). FIG. 12a graphically shows the procedure for the information life cycle search. The system pre-processes the input and obtains metasearch terms both in a contextual manner and conceptual manner. These are identified with filters discussed later on. Sensitivity levels are set and the information is categorized both in a contextual manner and a conceptual manner. Ranges of data representing format choices are used such as lines, sentences, DOL's (lines of data) and paragraphs. Thereafter, the information life cycle search engine modifies the search terms and the user inputs either a convergent instruction or a divergent instruction. The resulting search terms are then supplemented according to the convergent or divergent system.

The search for the primary search terms (convergent or divergent) results in a federated or confederated as well as a distributed supplemental search term group. Hyperlinks, URL, network references, SQL are submitted to one or more of the following: search engines, databases, data warehouses, addressable data elements, artificial intelligence, data mining sources, text storage, method data storage, indexes, libraries, catalogs as well as other data structures.

The next step involves ascertaining the depth of the search by identifying the number of hits for the first search term and the last search term, the time involved to compile the search, the time involved until no changes, the number of iterations involved as based upon a divergence search as separate from a convergence search. The output is a consolidated search result list.

Figure 12B:
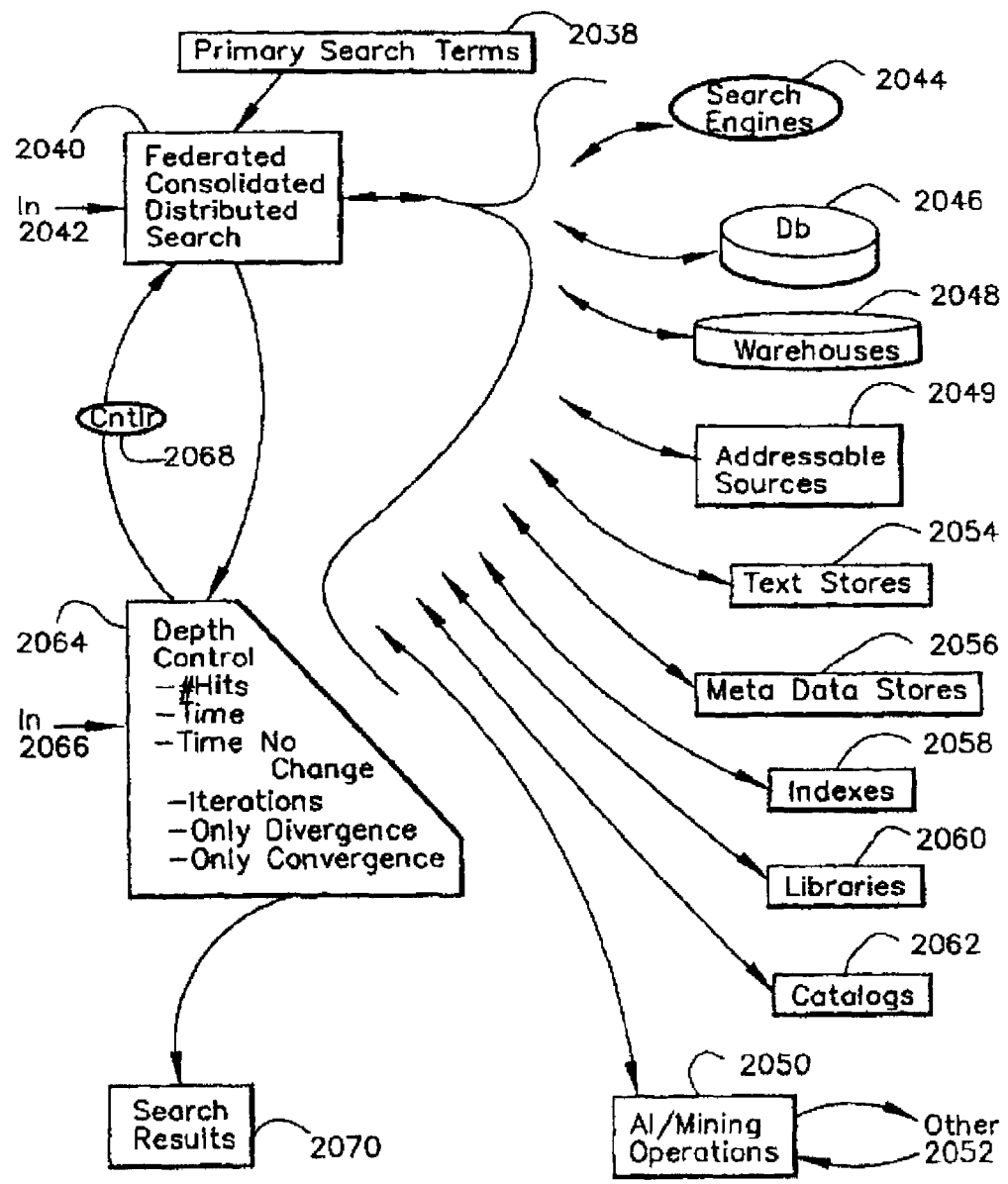
FIG. 12*b* diagrammatically illustrates the KE process of using search terms, data collection and depth-of-search control.

FIG. 12b starts with an input being primary search terms 2038. The search engine module then executes function 2040 which is either a federated, consolidated, or distributed search. A federated search unites the search terms and additional supplemental documents generated and located from those search terms together. A consolidated search is simply a composite of all the search documents obtained without any relationship or affiliation. A distributed search seeks to widely engage a large number of data structures for the search. Operator input IN 2042 directs the selection of the search function 2040. Search function 2040 operates by sending the primary search terms to additional data collection targets such as search engines 2044 (Google, Yahoo, etc.), databases 2046 (representing a plurality of databases), data warehouses such as dictionaries or other sources 2048, addressable data structures 2049, artificial intelligence or mining operation functions 2050 and other data collections, data structures, indices, etc. The mining operation 2050 may access further tertiary data structures 2052. The search function 2040 applies these primary search terms to text stores 2054, metadata stores 2056, indexes 2058, libraries of words, terms, images, data or data objects 2060 and catalogs 2062. The results are compiled back to search function 2040. Step 2064 is a depth or search depth control in which the operator by input IN 2066 delineates either as a pre-set or a default or an active real-time control the number of hits needed from each of the data structures accessed by search function 2040, the amount of time for the search, the amount of time when no change is found from the retrieved documents, the number of iterations (repetitions), and whether the primary goal is a divergent search or a convergent search. Search depth control 2064 provides control information CNTLR 2068 back to search function 2040. The search results 2070 (supplemental documents or supple docs) are obtained either from output of search 2040 or after the depth control 2064 is applied to the search.

The third step is to take the secondary search result or the consolidated search result and apply them in a convergent manner or divergent manner. The output is either a convergent compilation of documents which are obtained via the supplemental search terms (adding known SC to the search term group) or a divergent compilation of documents employing the same search terms. A similar output result can be obtained by using hyperlinks, URLs and other metadata aspects.

Figure 12C:
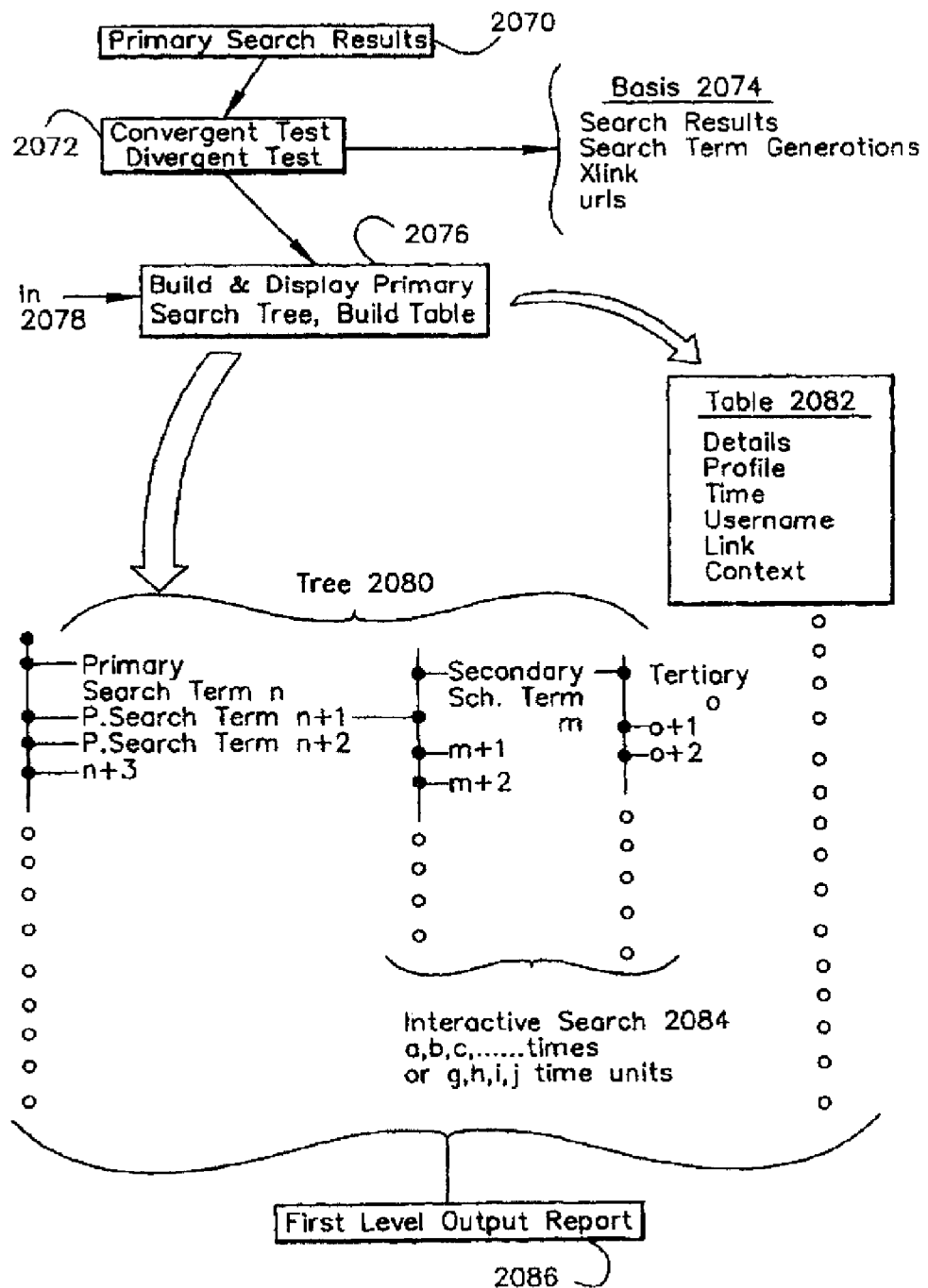
FIG. 12*c* diagrammatically illustrates the KE process for the primary search results.

The fourth step (see FIGS. 12c and 12d) is to build a tree or a table listing the details. The tree shows the hierarchy of the data retrieved in the convergent or divergent search and the table lists the items such as profile, time, username, link, context, etc. FIG. 12c shows that the primary search term generates a certain supplemental group of documents whereas the secondary search results in a different group of documents and the tertiary search generates a third level group of documents. The number of searches is keyed to the time involved and the criticality of the information sought to be searched. The object of the tree building and table building (FIGS. 12c, 12d) is an exploration of information linked or associated with the initial information provided. Further, a social relationship or connect-the-dots matrix display can be obtained based upon this iterative information life cycle search.

The output or yield of the information life cycle engine module results in a convergence search wherein additional supplemental information data is obtained to corroborate or validate the initial search terms and initial information document supplied. Therefore, the sec-con is tested or the SC is tested in the respective storage mediums. A divergent search yields more data which is loosely associated or related, coupled or referenced to the initial information document. Initial search terms result in a divergent documents can be expanded upon by the hierarchical tree with a list of details.

At some point, the operator must prune the hierarchical tree, reduce unnecessary items and augment others. Some of this pruning can be automated with an inference engine or artificial intelligence module. Otherwise, the operator may manually engage in the information life cycle engine.

Figure 12D:
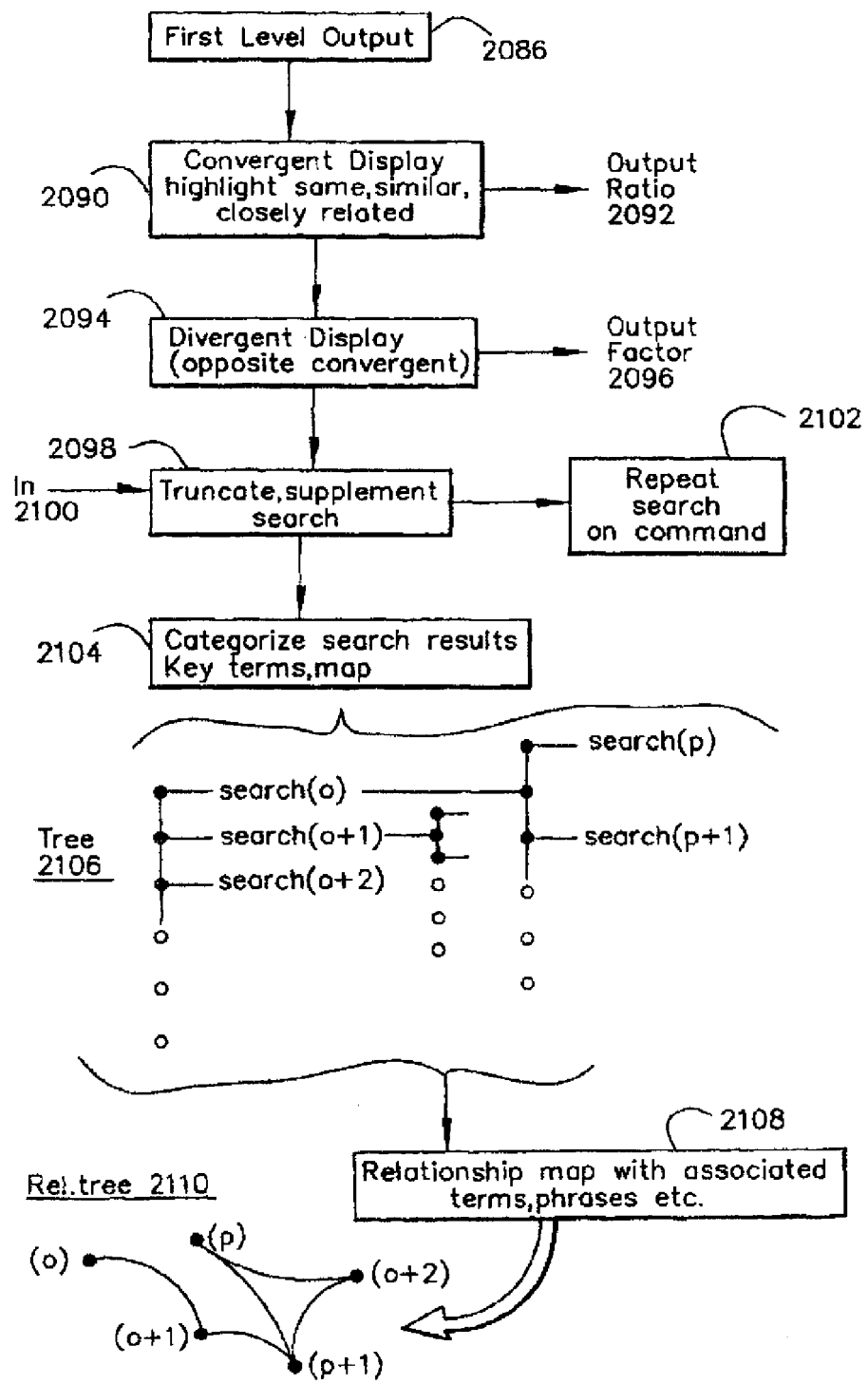
FIG. 12*d* diagrammatically illustrates the KE process for the output representation of search term data and search result data of supplemental documents.

The last step is a relationship map between the initial document and the supplemental documents generated through the convergent or divergent search. The final result is a map of the hierarchical search terms at various levels source, search 1, search 2, search 3 ... search n. See FIG. 12c. A further result is shown in FIG. 12d wherein a social relationship or process relationship between the various documents is established. Some people would call this connecting the dots or relationship mapping. The relationship mapping changes the degree of separation or similarity between each information document.

FIG. 12c begins with the primary search results 2070 and function step 2072 executes a convergent test and a divergent test on the primary search result. The basis 2074 could either be the search results themselves, a search term generation which is search terms extracted from the documents located during the search, hyperlink or x-link and URLs. The convergent test determines whether the search and recovered documents converged into a certain pattern whereas a divergent test shows that the documents, search results, hyperlinks or whatever spread to wider results. The build and display function 2076 takes the primary search terms and builds a search tree and builds a table. Operator input IN 2078 optionally enables the operator to set the scope and format of the search tree and the table. Tree 2080 is a display showing the primary search terms n, n+1, n+2 and secondary search terms m, m+1, m+2 and tertiary search terms o, o+1, o+2, etc. Iterative search function 2084 establishes how many paths or branches are executed in building the primary search tree. This may be one of the input IN 2078 functions for build and display function 2076. The iterative search 2084 may be a number of times counted in branches or may be certain time unit g, h, i, j. Table 2082 is a detail showing the search term including profile, time, username, link and context of the search term. Function 2086 is this first level output report showing the search terms for the information life cycle engine.

FIG. 12d begins with the first level output for the search term 2086. Function 2090 is a convergent display which highlights the same, similar or closely related documents. Also, an output ratio 2092 may show how many of the documents are related by word, term, image segment, hyperlink or metadata factors. Step 2094 is a divergent display which is the opposite of the convergent display. Output factors 2096 may show how many divergent documents having little or no connection to the primary search terms have been discovered by the search engine. Function 2098 permits the operator by input IN 2100 to truncate the search or supplement the search. Function 2102 repeats the search on command of the operator. Step 2104 categorizes the search results by key terms (taxonomic classification) and generates a map. One map is shown by tree 2106 which shows the search results or information documents as document o, o+1, o+2 as well as secondary documents p, p+1. Step 2108 develops a relationship map with associated terms, phrases, documents or hyperlinks. Relational tree 2110 shows that point or document p+1 is related to document o+1, p and o+2. In contrast, document is not related to any document other than o+1. The relationship tree 2110 is sometimes called a "connect-the-dots" map.

C.11 Search with Prioritized Classifications

FIG. 12a shows that the operator or user can input search terms, source document or a data stream 2006 into the system. Search terms function 2008 represents the use of a search term string, document or data stream into the metasearch engine 2020 and through the classification or category analysis filter (hierarchical taxonomic system) function 2030. The sensitivity function 2026 permits the operator or user to pre-select the priority for the hierarchical taxonomic or class system. Alternatively, "My Profile" or pre-set prioritized classes may be used. The user may also select the priority and the class/subclass of the search terms immediately prior to the search. The process, in FIG. 12a, extracts search terms from input data represented by a source document or a data stream, and identifies data elements in the input data with the classification system corresponding to n priorities therein. In one embodiment, the operator selects either a convergent search or a divergent search in function 2034. Optionally, the convergent—divergent search function 2034 may be omitted. The process then applies the prioritized and classified search terms as primary search terms in FIG. 12b, term function 2038, gathers documents and then resets n priorities in said classification system to m priorities in said classification system. This is part of the depth control function 2064 and control function 2068. Secondary search terms from the input data elements (terms 2008), classified corresponding to m priorities are again used in function 2040 and the search is repeated to gather secondary supplemental documents. The system then applies convergent—divergent test function 2072 (FIG. 12*c*) on all supplemental documents to find convergent or divergent characteristics of the gathered documents. The search repeats until a search end parameter is met, such as all supplemental documents exceed a predetermined number, a predetermined number of data elements from all supplemental documents fulfill a predetermined number of priorities in said classification system, a lapse of a predetermined time, a predetermined number of data elements from all supplemental documents fulfill a predetermined number of priorities in said classification system, among other search end parameters discussed herein.

Optionally, the system and process may omit convergence—divergence function input 2034, 2036, and select n priorities from the prioritized hierarchical classification system, extract search terms from input data (functions 2006, 2008, 2010, 2012) represented by a source document or a data stream or a search term string, and identify data elements in said input data with said classification system corresponding to the n priorities. The process then searches data collections with said search terms and gathering supplemental documents based thereon. FIG. 12*b*. The process then extracts secondary search terms as data elements from the supplemental documents with the classification system corresponding to n priorities and repeats the search of data collections with the secondary search terms. Secondary supplemental documents are then gathered. See FIG. 12*d*, truncate, supplement and search function 2098, and repeat search function 2102. Such an optional search ends as described above.

C.12 Simple Filters

The user, prior to initiating the knowledge expander select content (SC) engine module, may be given a choice of filtering out or identifying all SC data objects or sec-con objects with white lists or black lists or a combination thereof as a content filter. Uncommon words, terms or data elements not found in the dictionary, geographic term lists or name lists and other lists are located with a negative content filters used to discover unknown data elements. The negative content filters can be added to the metasearch term engine such that these unknown words, terms or data elements are tagged "unknown" and assigned to the hierarchical taxonomic class as an unknown data element at the hierarchical taxonomic classification level (assigned to a class of words, terms, etc., and assigned an SC sensitivity level—that is—a hierarchical marker). The search terms extracted from the source doc are supplemented with white lists or black lists words, terms, etc. (content filters additions) and the supplemented SC or select content words or terms are filtered out to identify the uncommon or unknown words. Of course, the user may be required to manually input all SC words or download the SC word filter from the Internet or another secure network system or LAN. A "profile" of SC with the hierarchical taxonomic markers can be employed by the user-operator. For select content systems having multiple levels of importance (which may be multiple security levels or multiple levels of SC importance in an organization or related to the organization, for example, primary competitors compared with secondary competitors), a plurality of filters would be created, each filter associated with a different SC level. Further, multiple SC levels may require, remainder SC document or data stores (unknown data stores) and a plurality of extracted data stores. Multiple levels are similar to the MLS security content (sec-con) system described in section D.4 to D.9.

The ability of the program to locate select content or SC words or characters (or sec-con) can be enhanced by using a telephone book, properly dissected, to identify a collection of last names. Cities and towns and street names can also be identified in this manner. The compilation of last names and cities, towns and streets can be used as a list of critical, SC words. The filter is represented by this compilation of words. Similar techniques may be used to create filters for scientific words, or words unique to a certain industry, or country.

C.13 Complex Filters

There is a need to construct filters which supplement the initial list or compilation of SC (or sec-con) words, characters, icons and data objects (herein "word" or "data object" or "word/object"). The need arises either due to the fact that the initial SC search term word/object list is incomplete, or that the author of the initial list is concerned that the list is too limited or in order to defeat an attack or an inference engine "reverse engineering" at the resultant expanded SC document. In a test mode, the complex filter is used to determine how "secret" or "special" the sec-con or SC is compared to outside databases and data collections. Further, the incorporation of a filter generator for SC or sec-con search terms enhances the user friendliness of the program. In one embodiment, the program is configured as an editor compiler to screen and build enhanced SC doc or doc collection from a source document. The user selects, at his option, functional aspects which include: compliance with laws (an application of a type of filter, e.g. HIPAA, GLB, Oxley-Sarbanes, EU privacy, executive orders); privacy (another type of filter which locates SC terms, for example, social security numbers, see also, EU policy); search for and supplement filter; pay per view (which enables the user to buy missing sensitive information (for commercial purposes); survival (which creates a distributed and dispersed copy of the user's source document and other stored documents and items using predetermined storage facilities); security (which triggers the various security routines); and storing (which permits the user to select which of the several storage options the extracted SC data/objects should be employed in the dispersal.

Figure 13:
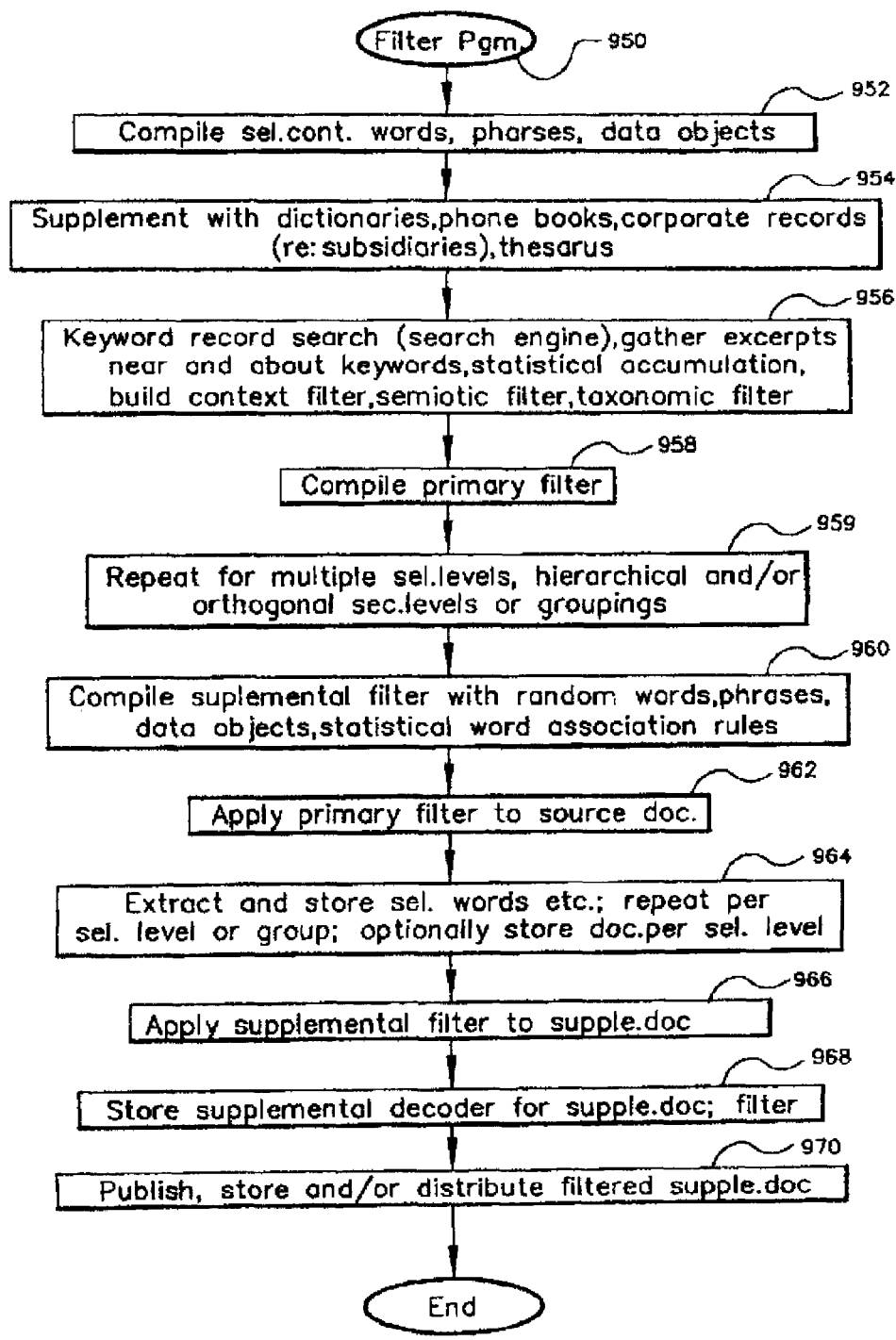
FIG. 13 diagrammatically illustrates a filter program.

The filter routine or module diagrammatically illustrated in FIG. 13 is useful in compiling a SC or sec-con search term filter which separates both the sensitive word/objects and contextual and semiotic and taxonomic aspects of the initial list of SC word/objects. The filter works in conjunction with a compilation of data, typically located on a network which could be private or public. In low level SC situations, the filter may access Internet databases to gather additional data for the filter. In more robust SC systems, the filter could access private data bases (one located at the same organization level as the user) and build or compile the additional SC word/objects. The filter program 950 in FIG. 13 begins with step 952 which compiles the initial list of SC word/objects. In 954, the initial list is supplemented with dictionaries, phone books, corporate records (to obtain subsidiary data and trade names) and thesaurus data. This is a content filter. Each of these represent different compilations of data and the added data is added to the initial list of SC word/objects. In 956 a search is conducted on a network, usually through a search engine, to gather excerpts near and abut the keywords. This is a range or contextual filtering aspect. These keywords are the initial SC word/objects. Statistical algorithms are applied to gather non-common word/objects which are associated with the keywords as found in the additional data compilations. The goal of the adaptive complex filter is to obtain contextual, semiotic and taxonomic words, characters or data objects from the compilation of additional data related to the SC words, characters or data objects. Semiotic is a general philosophical theory of signs and symbols (read language and words and objects) that especially deals with their function. Semiotics include syntactics, semantics and pragmatics. Syntactics is the formal relationship between signs. Semantics is the meaning of signs and pragmatics is the relationship between signs and their users, such as the relationship between sentences to their environment. Taxonomy is the scientific classification and categorization of items. Therefore as an example, a search through the Internet on Google search engine under "Bin Laden" may show a number of uncommon (non-dictionary words)(content filter-based search) within 200 words of the target "Bin Laden" (a contextual filter-based search). This search string would gather documents from the Google search and copy 200 words on either side of "Bin Laden" and then extract only non-dictionary words into a supplemental SC term list. This type of filter algorithm looks for contextual matters close or near to the target. The search is semiotic and statistical in nature. Additionally, the initial supplemental list would identify the Bin Laden is an Arab and this classification (a taxonomic aspect) can be used to expand the list for the filter. The algorithm may include a simple command to gather all 10 words on either side of Bin Laden. This is a pure contextual search and the "10 word" range or format aspect is a statistical number. From the supplemental list, all pronouns, prepositions and conjunctions may be eliminated. Spiders or robots may be used in the gathering of the contextual and semiotic filter data. The contextual, semiotic and taxonomic words, characters or data objects from the compilation of additional data are all related to the initial list of SC words, characters or data objects.

Step 958 compiles the adaptive or complex filter. The above noted contextual, semiotic and taxonomic filter is adaptive since it can be used to expand (and potentially contract or reduce) and adapt an existing list of SC or sec-con word/objects to a larger list which better expands the information content of the source document and supplies SC term data to an inference engine. As a test, the sec-con storage is tested with the complex filter to determine whether the security level is appropriate. For an SC test, the complex filter is used to ascertain whether the SC store should be supplemented with additional outside data or that the H-tax class be changed. Step 959 repeats the filter gathering and compilation for various levels of SC inquiries. Higher SC inquiries require a broader search (1000 uncommon words near Bin Laden and add all Arabic and sub-Asian continent cities). Orthogonal SC groups (those groups having the same level, e.g. S Secret, with each other but being different organizations, e.g, Department of Defense compared to the FBI) often have different methods to keep SC data separate between compartments.

The adaptive filter can be set to automatically gather additive SC word/objects. The test module may be run periodically. The system, with a basic filter, may identify a SC word in a paragraph being scanned by the initial filter. This SC or sec-con word may be a special word in the existing filter or may be a non-common word not found in the initial filter. The adaptive filter system may then obtain this "unknown" or "special" word (a negative filter in that the word-object is not matched to a word-object having the same content), and conduct a search through a compilation or data base of additional words, etc. Any new word/objects falling within the contextual, semiotic and taxonomic SC words, characters or data objects from the compilation of additional data (database) related to said SC words, characters or data objects are then added to the filter. The expanded filter is then used to supplement the source document.

Step 960 compiles a supplemental filter with random words, phrases, etc. in order to further defeat an inference engine reverse engineering assault on the SC supplement document matrix. In some sense, the production and use of a random filter is an encryption technique since the resultant filtered product, in order to be understood by others, must be reverse filtered or decrypted to reveal the source doc and enhanced doc matrix at the appropriate SC level. Nonsense words may be added to this supplemental filter. Step 962 applies the primary filter (with the SC word/objects and the additive word/objects from the contextual et al. filter) to the source document. Step 964 extracts the SC word/objects per SC organizational level. It is noted that several filters are used, on one for each SC level, whether hierarchical or orthogonal. The extracted SC word/objects are stored as a supplemental search term doc and the system gathers supplemental documents (supple docs) which expand the knowledge base about the SC word/object. Step 966 applies the supplemental filter to the supple docs returned per search level 1 with SC search terms. The system then repeats the process of SC search term generation on primary retrieved supple docs level 1, generates SC search terms per level 2, and retrieves SC level 2 supple docs. A tertiary search term generation and supple doc retrieval is possible based upon the operator's initial set-up or upon operator input at steps 964, 970. Step 968 stores the supplemental doc to permit information enhancement of the source doc. Step 970 publishes, distributes or pushes the source and all supple docs and search term data to others having a need to know.

C.14 The Editor as an Information Expander

FIGS. C-7 through C-8D diagrammatically illustrate an editor which may be employed to locate SC or sec-con word/objects in a source document and expand the knowledge base with supple docs. In one embodiment, the editor is a standalone application or a module to add onto other applications for plain text and media creation, editing, and sensitivity SC level tagging. Other types of tagging, wherein the editor supplements the initial group or subset of select content SC or sec-con sensitive words, characters, icons and data objects by categorization, taxonomy classification, privacy, security, compliance, and semiotic meaning, are also available. The editor supports a full range of document management and can be integrated into a unified infrastructure, from creation, editing, document markup, tagging, tag conversion, tag removal, context sensitivity level redaction, context reconstitution, support for complex process work flows, and expanding the knowledge base by adding supplemental documents (supple docs) to the initial collection of source doc. The architecture assures separation of data from metadata so that no security lapses are introduced into the traditional word processing and document management cycle.

The Editor automatically and with nominal operator input (after the Editor is initialized) separates the data stream from all markup and tagging word/objects for SC knowledge generation purposes.

The interlacing of user content with metadata creates significant process, storage, distribution, and workflow security failures that are not resolved with current technologies. Current technologies include encryption, firewalls, intrusion detection, perimeter guards, and locked distribution packages.

The Editor enables text and media creation. However, all additions, deletions, changes, insertions, and reorganizations and reordering are tracked as metadata that does not become part of the document or information file. The document (information file) as seen and shown to the user represents the deliverable format. Since formatting is metadata, it is not included in the representation. Formatting, such font sizing, colors, font selection, footnotes, headers, subscripts, superscripts, line numbering, indexing, and other features characteristic of standard document preparation can be supported but are represented only as metadata. Tagging, including SC sensitivity level, categorization, taxonomy classification, privacy, security, compliance, and semiotic meaning are also represented only as metadata. This separation of representation from meta-representation is critical for creating the infrastructure for knowledge expansion, secure information sharing, privacy, security, and compliance.

The editor is currently set in a WINDOWS environment. Pulldown menus provide access to formatting and tagging features. The document, from source, precursor (marked and tagged but not yet filtered or extracted) and resultant final versions for each SC sensitivity level, as seen and represented to the user, is distributed in resultant final form, thereby assuring SC knowledge level compliance. No hierarchical, hidden, encapsulated, linked, associated, or referential information is part of the data stream, file, or storage.

Metadata (such as formatting, such font sizing, colors, font selection, footnotes, headers, subscripts, superscripts, line numbering, indexing, and other features characteristic of standard document preparation) is usually hidden from the user. This supplemental metadata information contains all markup, tagging, formatting, and process support information for the editing process and enables immediate granular distribution of the data stream subject to the needed SC compliance rules. In other words, the data stream can be automatically processed with other functions to satisfy multiple competing requirements and SC sensitivity levels.

Figure 14:
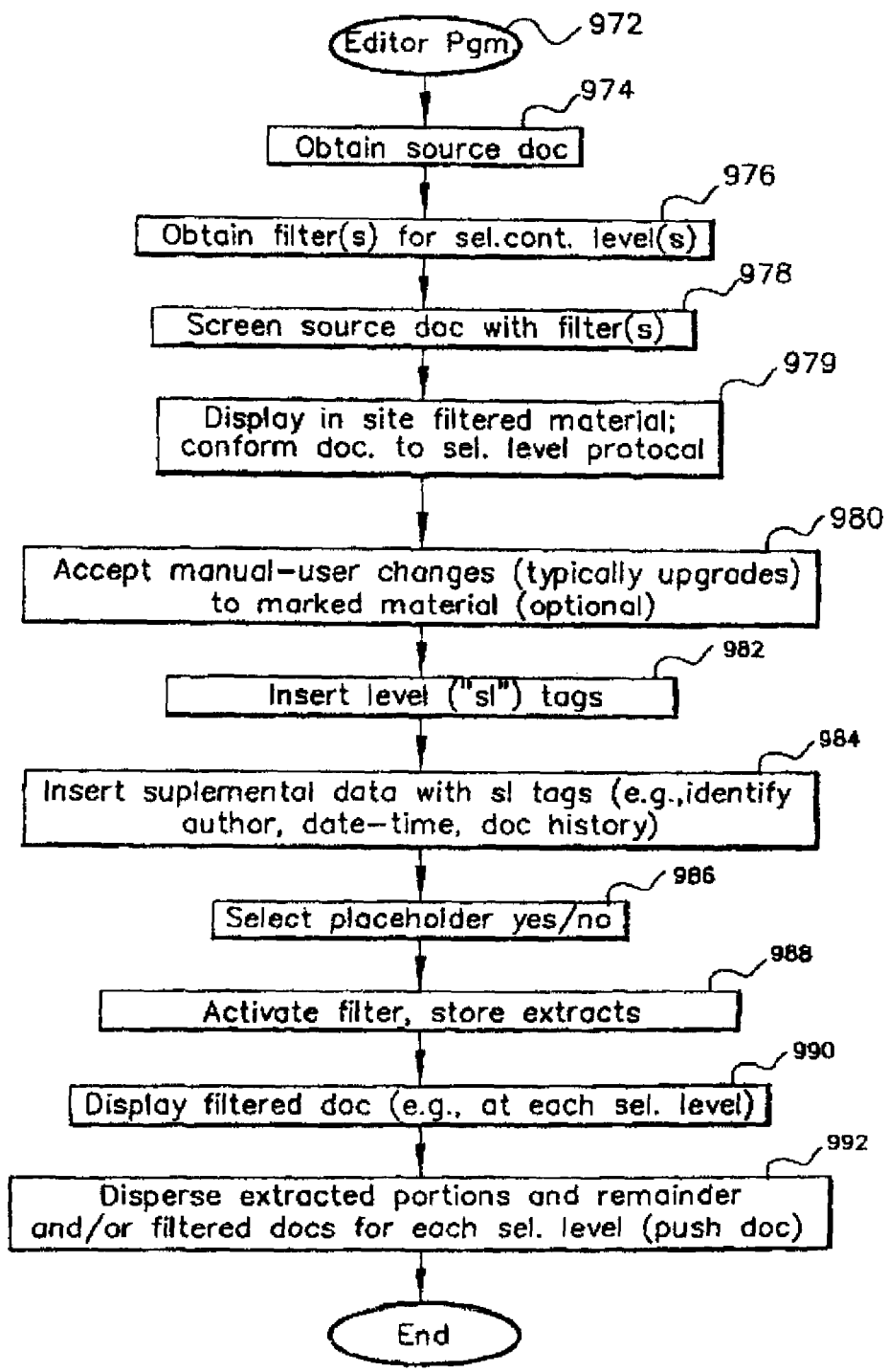
FIG. 14 diagrammatically illustrates an editor program.
Figure 15:
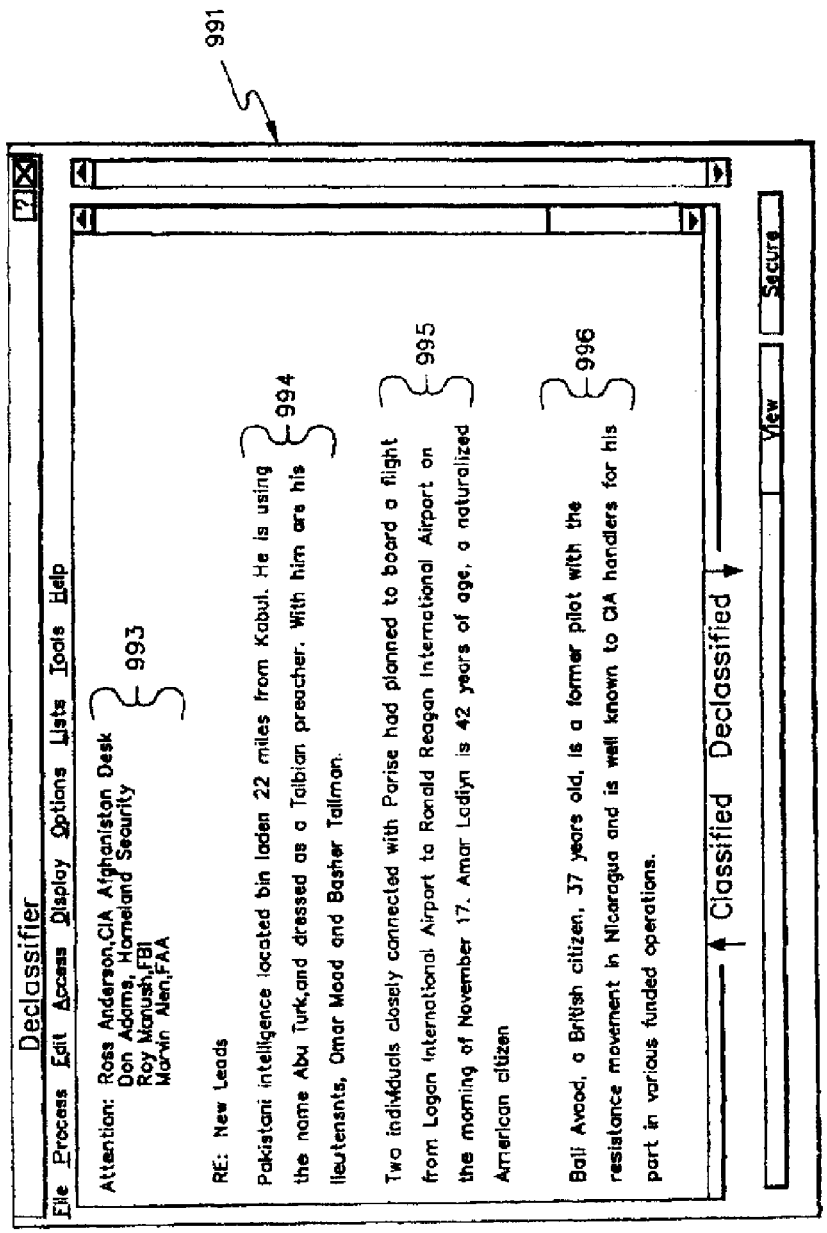
FIGS. 15, 16. 17 and 18 diagrammatically illustrate extraction of select content (SC) and a hierarchical taxonomic system based upon TS, T, C and UC security code classifications.
Figure 16:
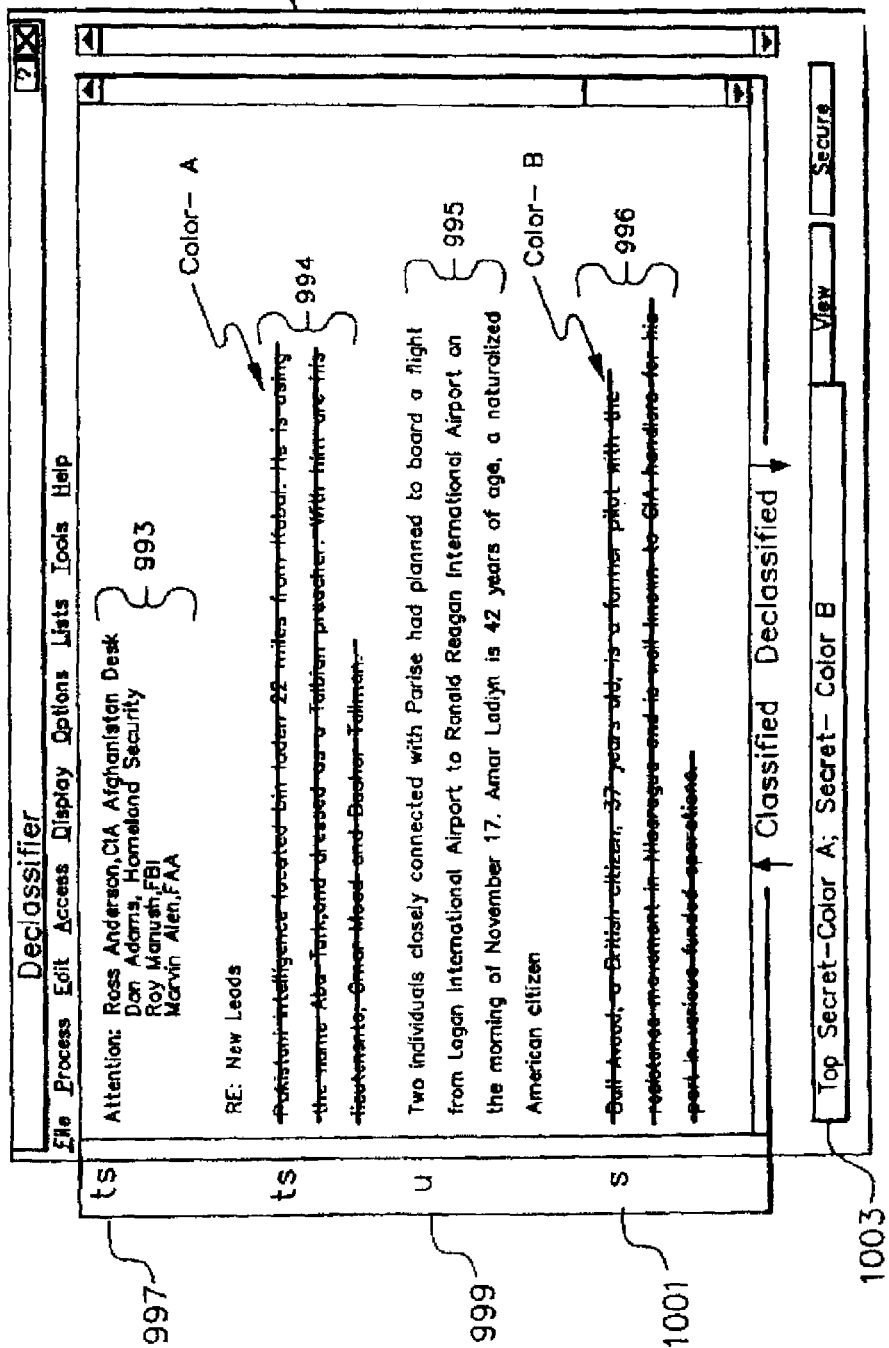

FIGS. 14, 15, 16, 17 and 18 are discussed concurrently herein. FIG. 14 is a basic flow chart for one embodiment of the Editor. Editor program 972 begins with obtaining the source document 974. Of course, the source document may be any type of document or may be a data stream. Of course, the data stream is typically delimited by start and stop characters or codes. Hence, the term "data stream" is similar to "source document" herein and in the claims. Step or function 976 obtains one or more filters for one or more SC or security sec-con or sensitivity levels. Step 978 screens or processed the source document with the filter(s). For example, the source document in FIG. 15 in window 991 has text regions 993, 994, 995 and 996. In step 979, the Editor displays, in situ (in the displayed document), the filtered identified SC or sec-con material and conforms the precursor document to the SC or sec-con sensitivity protocols. As shown, the SC or sec-con sensitivity protocols are security level protocols for the system within which the Editor is employed as an information processing tool. SC or sec-con sensitivity levels 1, 2, 3, etc. correlate to security levels TS, S, C and UC for top secret, secret, classified and unclassified. FIG. 16 shows that the address data 993 is marked TS (top secret), region 994 is displayed in color A for TS coding (please note that the addressee data may also be so marked) and is "red-lined" or struck out. In an information-expansion system, the process marks, labels or tags each word. This is a content filter and tag regime. The user may manually upgrade or downgrade SC or sec-con levels. Region 995 is displayed as presented in the source document and is labeled U (unclassified) and region 996 is shown in color B, is redlined and is labeled S. Labels TS, S, C (classified) and U are the established security labeling protocol used by the organization employing the Editor. The same tagging for each word or character in the source doc can be used. Other labeling schemes for SC elements may be employed. Color is used to assist the user to select (and in some non-standard cases, deselect) the SC or sec-con data marked by the editor. Redline is used to inform the user that the filter(s) will tag and extract the marked data. Labels are used to permit the entity using the editor to employ standard tear line protocol. Tear line protocol is a contextual tool. Any data beneath a security classification of the user is under the tear line and the data is permitted to be distributed to the lower security cleared user. Of course, electronic distribution of secure data need not use the hard copy or print version of the tear line. However, this nomenclature referring to the tear line is used in the prior art systems.

Figure 17:
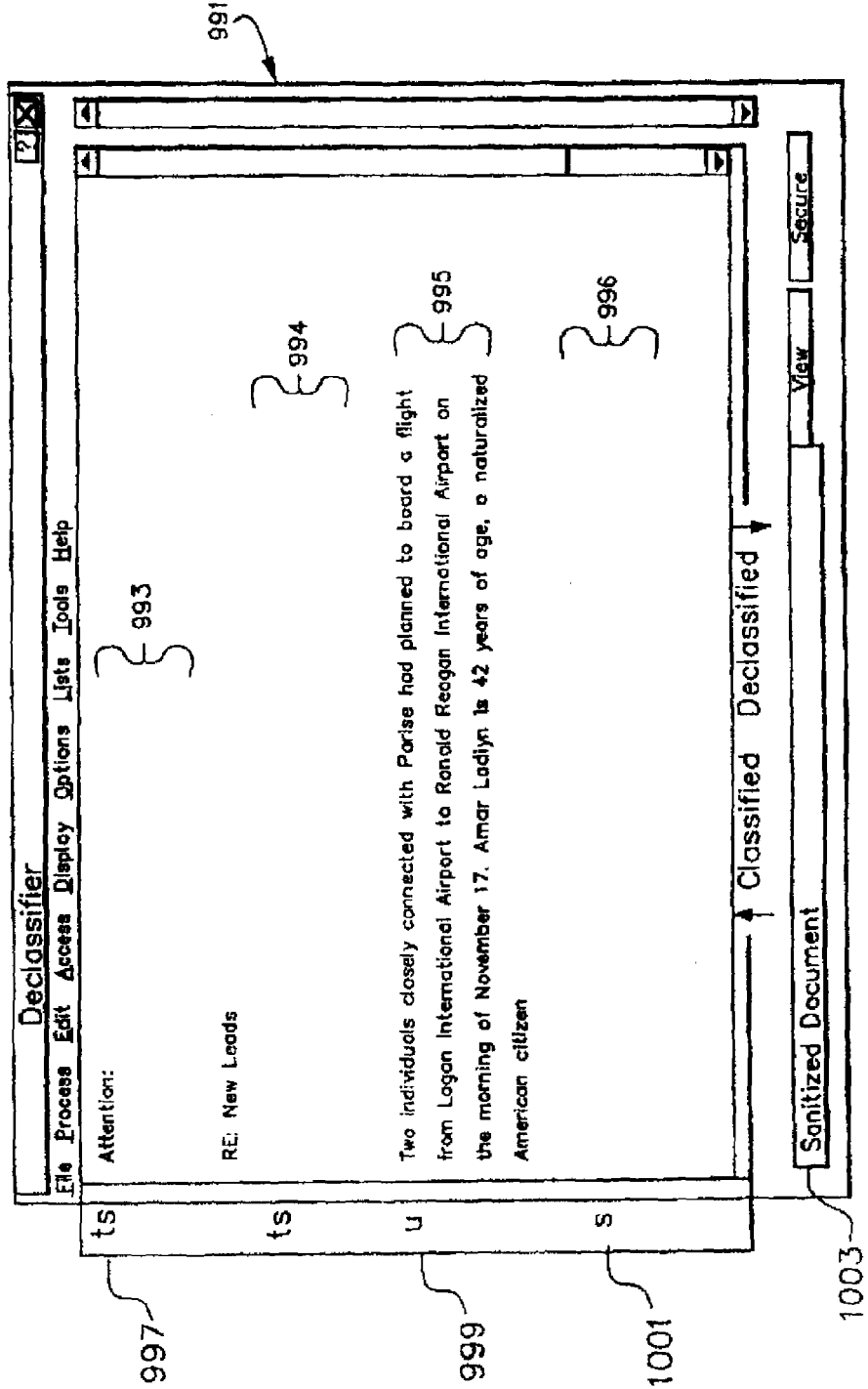
Figure 18:
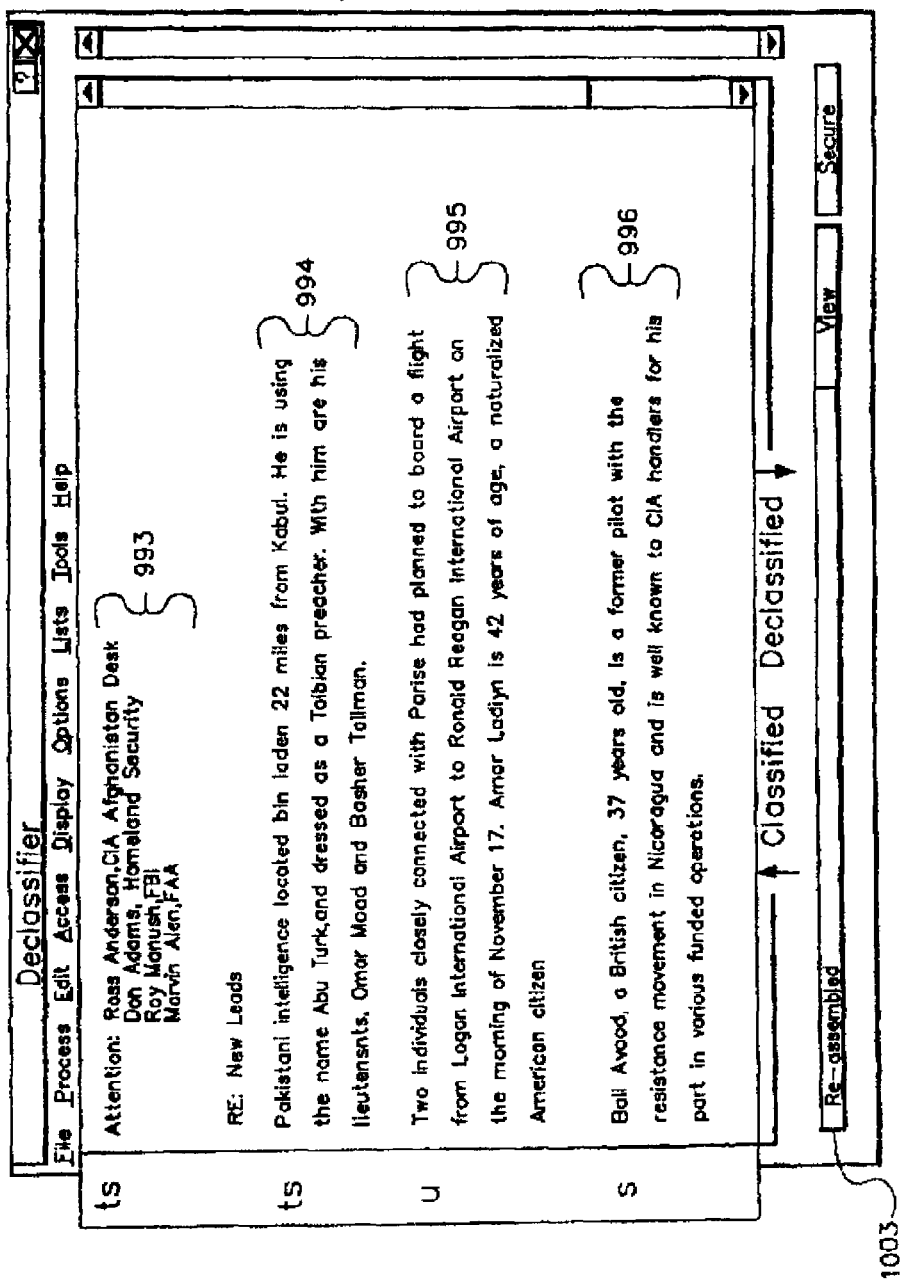

Step 980 accepts the user's manual changes (typically upgrades) to the precursor document. These manual changes are displayed, redlined, colored and labeled. Step 982 inserts the SC or sec-con tags (or security label TS, S, C and U for the sample doc in FIGS. 15, 16, 17 and 18) as discussed above. Step 984 notes that the system takes certain metadata such as author, date-time, version history, change history, etc. and converts this meta data into ordinary text, marks that data at the necessary security level or SC or sec-con sensitivity level and labels the meta data. Step 986 permits the user to add (or omit) placeholders into the final document. FIG. 17 shows placeholders as black lines or as XXXXX symbols (or other symbols) wherein the sensitive SC or sec-con text is not shown but some replacement markers are shown. The byline in region 1003 show "sanitized document." The byline 1003 in FIG. 16 lists the sec-con security level (or SC level of priority) and the color representation.

In a specific knowledge expander engine, each word, term and character is labeled or tagged with a content filter to show data object type (name, town, credit card number, etc.) and an SC or sec-con sensitivity level (a "tax" or taxonomic classification and sensitivity level). See step 982. The user may add tags (step 979, 980). Meta data is also tagged or labeled.

Step 988 activates the filter, extracts the sensitive SC or sec-con data and temporarily stores the extracted SC or sec-con data. The expansive knowledge engine also stores negative filter results which are those words, terms or characters, images, not found in the context filters. Step 990 displays the filtered document and the user may view the filtered document at each SC or sec-con level. Therefore, the user, before transmitting a secured email (or letter) doc may look at the source (FIG. 15), may look at the TS level (FIG. 15) without the redline strike out but with security labels and colors, may look at the T level revealing regions 996 and 994 but not regions 993 and 994 (which are TS coded regions), and look at U versions as shown in FIG. 17. Step 992 disperses the extracted data and the remainder data or disperses partial versions of the document (those partial versions formatted and containing only data at or above the target security level (all TS level data (which includes TS, S, C and U data), or all S data (comprising S, C and U) or all C data and U)).

In step 979, the SC or sec-con level protocol determines whether single words are granularly classified (TS, S, etc.) or whether a line is classified (context filter), or whether an entire paragraph is classified (see FIG. 16). If a commercial/privacy filter is used to exclude all social security numbers, the organizational protocol is set at a granular level to exclude just social security numbers. Different group protocols use algorithms to mark, filter and extract adjunctive security sensitive words, characters, icons and data objects near the target SC or sec-con sensitive words, characters, icons and data objects. The SC or sec-con words may be security sensitive words, characters or data objects defined by compliance with law, regulation or policy, privacy, national, organizational or private security concerns. For example, "Bin Laden" is the target sensitive word in FIG. 16 and this classifies the entire paragraph as TS level. The other words in the paragraph are adjunctive word/objects.

In a knowledge expander mode, the SC or sec-con filters are applied in a negative manner as follows: (a) in the user set-up, the user establishes taxonomic categories or classifications and sets the selection priority of the classes; (b) the source document or source data stream is broken apart to separate all metadata; (c) the source document (may be a data stream) is processed by a taxonomic filter which tags or labels each word or data element with the taxonomic classification and the sensitivity or priority label (multiple "tax" tags, overlapping "tax" tags and "unknown" tags are possible); (d) after labeling, a content and contextual filter is used to separate out the unknown words or data elements (a negative filter). The resulting negative list of search terms is used in various search engines for both public and private data sources, to compile a compilation of supplemental documents (supple docs) and, thereafter, the supple docs are re-cycled through the H-tax and priority filter, then the content and contextual filter and a secondary supple doc collection is obtained. The primary and secondary supple doc collection represents the expanded knowledge search not typically found with commonly available search engines and processing techniques.

C.15 Document Object Model (DOM)—Protection and Processing

The search for expanding the knowledge base from a single source document to a larger compilation of docs has changed from locating content (see the prior art GOOGLE search engine) to expanding the search and search results for concept and context. Sequential text files are the exception rather than the norm. Flat, plain, and sequential files would have disappeared entirely from all but transitional processing steps except for the recent success of HTML web sites and the desire for storage of complex data into sequential XML formats. In spite of the apparent linearity of HTML and XML, in practice these flat files participate in a greater complex hierarchy of structured data mapped by object models. The object models blur the lines between content, concept, and context such that effective security requires a broader stroke than merely encapsulating content with encryption and limiting access with tokens or encrypted certificates.

Linkages to external files, style sheets, and embedded applications or scripts undermine the simplicity of HTML and XML flat formats and compromise point security. Even structured field or line and record-oriented file formats have given way to more complex data storage models. It is insufficient to view security of content and files in terms of encryption and encapsulation alone. Structured object models mix content with metadata and methods such that non-granular access—that is, either/or barrier-based access through encryption keys, dongles, and passwords—undermines any concept of effective security.

Furthermore, simplistic document management and access control overlook the multiple purposes for each compound data document and the adverse impact on organizational processes and work flows. Barrier-based security also fails from any Pacman-style attack, where the barrier, once breached not only provides full access to the once-protected interior also interferes with analysis of the attack and observation of how to prevent the ongoing attack. Granular multi-level control of user data, metadata, data stored through the specifications of a hierarchical data object model, and methods underscores the new security paradigm.

All data sources important to data process workflow are non-linear, non-sequential, and not standalone in that the data sources are interconnected to or required by other data sources. This includes databases, structured documents, desktop application user files, hierarchies of data structures, and work flows. The most advanced data workflow and the focus of attention is the object-oriented models used in data processing today which comprise a cascade of events rather than a single point operation. This complicates SC or sec-con data expansion activities to promote security, survivability, privacy, confidentiality, and anonymity. The present invention improves the security of complex document object models and interdependent workflow by expanding the knowledge base form a source document, thereby testing the classifications levels and generally expanding the knowledge base of a user form the simple source doc.

There are only a handful of counterexamples to complex data structures, mostly monolithic file structures and simplistic processes. This includes text files, raw binary image files, and lists. These are typically inputs to older or uncomplicated computer activities; they do not reflect the complexity and interrelationships consistent with and necessary for most critical networked data processing activities. Examples of flat files are text files, binary images, and lists. Plain-text documents are used only as temporarily or as conversion paths for other activities. Binary graphics are employed for their specific simplicity, speed of display, and small size. It should be noted that they (BMP, GIF, and other formats represent the bulk of web images) are usually stored in an inverted backward last-to-first sequence. List files are rarely important and standalone files are often a temporary part of another process. One of the most ubiquitous of plain-text files, the HTML web page, is rarely a simple text file, but a circular connection to many other like files and one part of a more complex hierarchy. A relative of lists is the field-oriented record structure. This is web page usually a grid-like storage of linear data. However, even a table grid, multi-dimensional indexing, SQL query concept is giving way to object-oriented post-relational database storage methods based on object models in order to augment functionality, speed of performance, cross-platform and application functionality, and compete with easier to use user and developer products. Even the image files are becoming increasingly complex. Hierarchical images formats with vector graphics compress motion and curves into small packages. Examples include Corel Draw, Macromedia Flash, Adobe Photoshop, and Microsoft Photo. These of course contain proprietary and unintentionally-distributed information. Increased reliance on reliable data storage infrastructure and networked storage technologies is enabling the transition to data storage based on object models.

Figure 19:
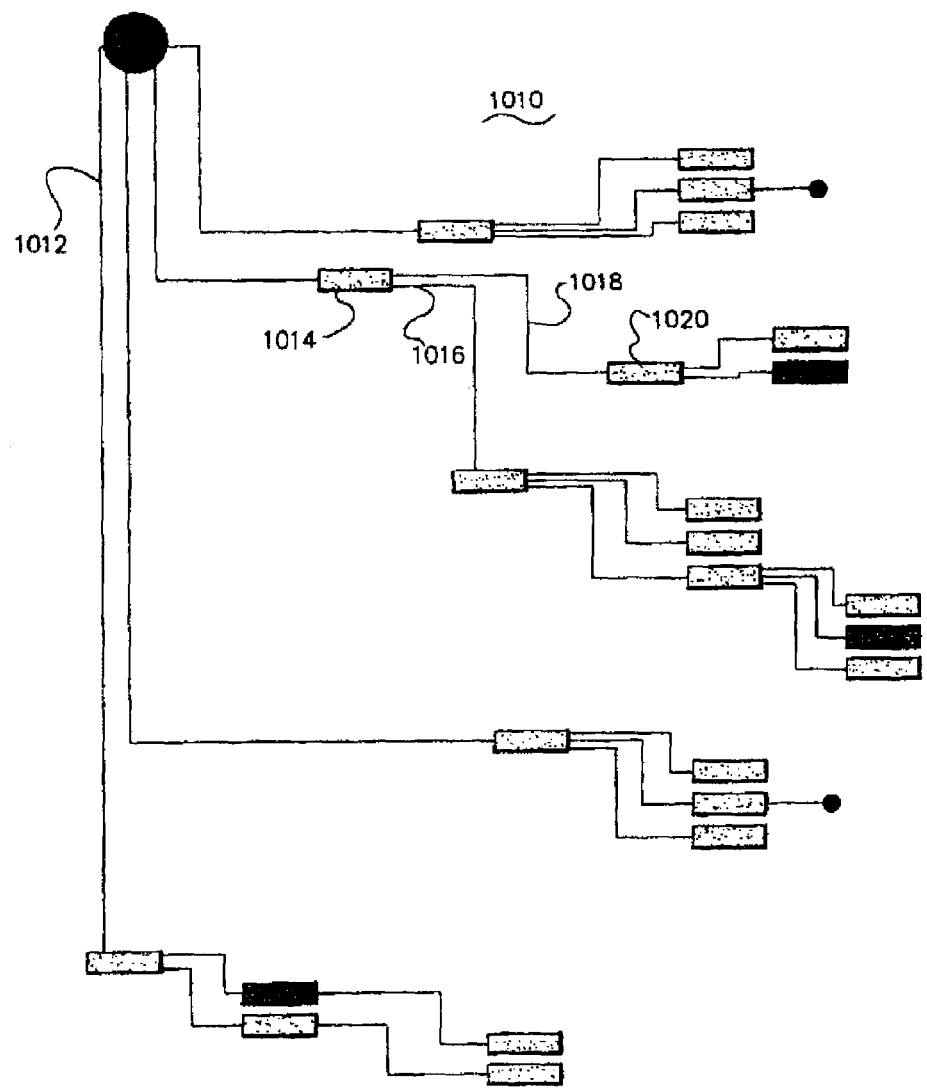
FIG. 19 diagrammatically illustrates a data object tree or map for a document model (DOM).

FIG. 19 shows the root, branch, and leaf paradigm of this principal data storage structure. See root 1012, content leaf 1014, branches 1016, 1018 and leaf 1020. The object model refers to the layout or the map (a blueprint supplied by the document object model (DOM) vendor) of how the data is potentially stored in what is definitely a linear file. The stored file is the document object structure containing the data whereas the model is the schema representation. The model FIG. 19 is just a blueprint for an empty data structure.

The data structure is stored as a binary file populated with data representing a subset of that blueprint. The data file is often referred to as the document binary file so as to make clear that it is not a plain-text file, not in user-friendly format, and generally readable by an ASCII reader only in discontinuous chunks. The model and the structure are not the same. The model (FIG. 19) does not represent a security threat in itself; it just represents how to find and define data stored within an actual data structure. It is the data structure in memory (the source document) or stored as a file that is the security threat. Usually, the file containing the data structure gives enough clues to the purpose, methods, and sources unless addressed by a multi-level security scheme attuned to the complexity of the object model. Although this "file" is stored as linear flat file, the extended structures is dependent on the hierarchical collection of potentially infinite branch and leaf references. Despite this complexity, there are clear reasons based on simplicity for this hierarchical structure, not the least of which is flexibility, self-documentation, and backwards/forwards compatibility.

The subtle differences between a plain-text file, a file containing lightly structured data, the schema, and a file containing data within an object structure becomes very important for security. When files are distributed and those files each contain data within object structures, workflow is complex and cannot be effectively protected with barrier-based security without complicating or disrupting operations. For these reasons, internalized security reflecting leaf content, structural paths, and the mesh of inter-relatedness among the paths, leaves, and external sources becomes the next paradigm for implementing effective content-level and application-level security. Consider the data structure defined by an object model as an organizing container. The contents within can be empty, or collections of containers, with more containers within. It is a security sieve with traditional encryption and the requisite inter-process work flows. The leafs and the security of the leaves does not secure a chain of evidence increasingly necessary in modern data processing activity.

Enhanced security must reflect this distributed requirement since the data sources are not single point sources, but complex relational, object-oriented, or hierarchical. In addition, data access and processing is approaching a worldwide distributed infrastructure, and completion transcends single places, times, and events. When the security problem is dispersed, the security solution cannot be monolithic either but must reflect the dispersed distribution and hierarchical complexity of the data and process. Location is not the problem, so metaphorical perimeter walls are not the answer. To treat security too as a monolithic, static, and walled solution when the security problem is granular and dispersed within a flexible time frame misses its true need. Effective data security must reflect five informational attributes in a newer paradigm for security. The five informational attributes are listed below and examples of the attributes are also listed. For each select content SC or sec-con sensitive organization, the data structure must be analyzed and the five attributes must be applied to each root, branch and leaf to ascertain the level of SC or sec-con sensitivity for that item. For example applying a security schema to the SC knowledge expander problem, a TS level may be established by applying the five attributes that all audio files are "security safe" for that SC or sec-con level but these audio files will not be downgraded or released to a lower SC or sec-con level. Therefore the meta data representing the audio file is designated TS. Another example is that all machines at the SC or sec-con level S ($3^{rd}$ level of the TS-S-C-UC schema) are 2004 machines and programs. The organization may set, as a policy, that all MS Office program meta data need not be backward compatible beyond 2004. This organizational protocol then reduces security issues relative to the backward compatibility issue.

| Informational Attributes Table for Security |
|---|
| Purpose |
| Sources and methods |
| Ownership |
| Date or timeliness |
| Content |

| Purpose Classification - Exemplary Table |
|---|
| .backwards compatibility (purpose: communication across machine platforms |
| .background color (purpose: visual presentation) |
| .font size (purpose: visual presentation) |
| .image |
| .video |
| .audio |
| .version control (purpose: source identification) |
| .etc. |

| Sources and Methods Classification - Exemplary Table |
|---|
| .origin plain text |
| .origin entire document |
| .image |
| .video |
| .audio |

| Ownership Classification - Exemplary Table |
|---|
| .source, author |
| .security level initial document |
| .security level generating modifications to initial document |
| .hierarchical, orthogonal security classification |
| Date or Time lines - Exemplary Table |
| .version control |
| .source identification (includes all contributing authors supplying modifications) |

These five security attributes reflect not only the data content but also the point processes, embedded resources, and work flows. In a similar manner, SC or sec-con sensitivity levels can be applied based upon time (temporal) issues, competitor or size of company, type of product (critical, subcritical, or ancillary), etc.

This metaphor fractures complex data processing workflow. Traditional search methods point only to defined search terms, maybe with a simple truncating algorithm which deletes "s" and plural suffixes from the defined search terms. A monolithic approach to prior art searching ignores metadata, process, multi-tiered files, delivery, and storage. Data sources are not monolithic, and certainly data is not either. Distributed data, distributed processing, and widespread distribution defeats common search techniques. Access and search techniques need to be granular and multi-level, and represent the five informational attributes presented above.

C.16 Recognizing the Document Object Model (DOM)

Many word processed documents, such as those created by MS Office, binary documents which contain confidential information, typically metadata. This ranges—from small amounts of information about authorship—to the editing history complete with deletions, reviewer comments, file attributes, and source and routing information—to extraneous baggage from documents previously edited during the same session.

A multi-faceted SC or sec-con workflow process becomes an issue over control of distribution by document type, recognition and categorization of all user content defined by security exons (discussed later), removal of non-coding or non-activating security introns (discussed later), preparation and distribution by SC or sec-con sensitive levels, content certification and accreditation (C&A) subject to conversion to primitive and certifiable file formats, distribution in print-representative-like packages, with guarded ingress and egress of the source data files. Finally, implementation of a knowledge expander search through granularity of document node elements by analysis for inclusion and exclusion is a far more effective method, permitting collaboration within a multiple-usage infrastructure.

It is important to recognize that there are many file types and document structures associated with a document management program such as MS Office. The structures are shared with other applets and competing products. Each program application, such as Word or Excel, create file binaries or binary files with different object structures but interchangeably read/write and import/export each other's file types, embed portions as formatted text or complete objects, or link through remote procedure calls to these other file types. These object model structures are generically called the Document Object Model (DOM). The DOM is another term for an object-oriented data storage package. The purpose for the DOM with hierarchical storage of metadata is threefold. First, it is useful for backwards and forwards version compatibility. Second, metadata extends the document creation session from one-time event into an ongoing revisional process. Third, metadata provides order and structure otherwise notoriously difficult for inherently free-form and flexible documents.

Metadata provides backwards and forwards version compatibility. Metadata provides the necessary blueprint, format, and structure retention so documents can be revised in future editing sessions. Format information is part of the DOM metadata, although style sheets and schemas maintained in a different storage channel are valuable in HTML and XML and might aid the future transition to a different DOM.

It is incorrect to assume a static basis for any document structure, as a monolithic DOS-based file, or as an in-memory object. For example, the Excel DOM can be embedded inside a Word DOM, which selectively can then be pasted as a formatted object into a PowerPoint presentation. Another concern that arises in almost every document is imports, pastes, and OLE imbedding of other documents and aspects of the object model corresponding to that application type. For example, a base Word document with a spreadsheet and Project waterfall chart now includes editable components referencing a different Office applications with data in a structure referenced by that corresponding application object model, in this case Word, Excel, and Project.

Figure 20:
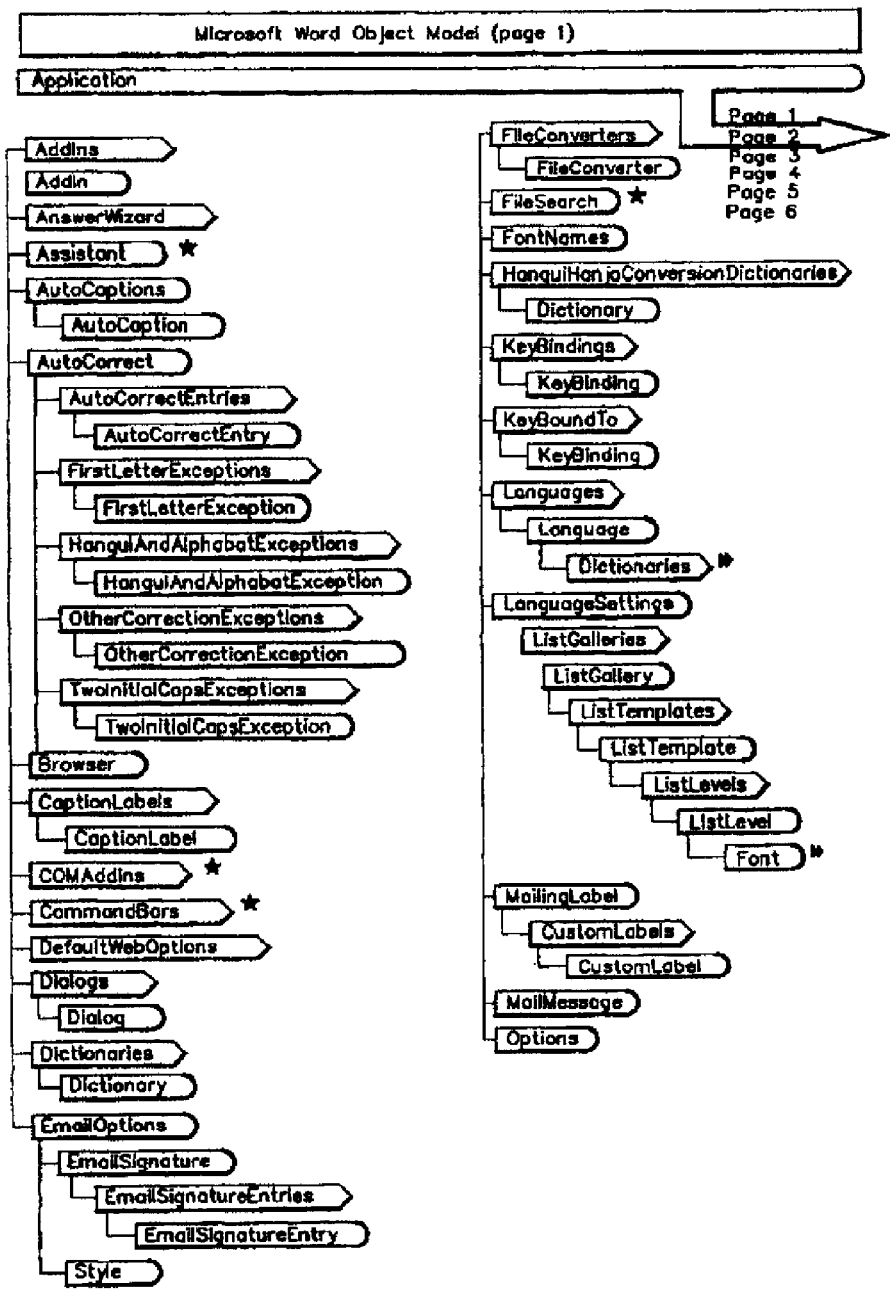
FIG. 20 diagrammatically illustrates varies metadata levels in the DOM.

FIG. 19 shows each branch or leaf can be replicated indefinitely until reaching the limits of RAM or file size. Each application has a different DOM. FIG. 20 shows the object model for word documents circa 2004. Because of DOM evolution, with the assertion of backwards and forwards compatibility, realize that some nodes might exist in the binary document file but not every function appears within each published output because it is not used by the author.

A basic Word document file requires 18 KB on initial saving, but a full 28 KB with edits and deletions, metadata, and redlining. Footnotes, font changes, hidden text, additional changes, headers, and footers, table of content, indexing, an index, macros, .DLL add-ins, .OCX add-ins, and formulae could arbitrarily increase the file size indefinitely. This shows that MS Office security risks are reproducible at any user desktop. A hex editor used in conjunction with an initial raw ASCII file and the corresponding .DOC file also shows risks. ASCII text has only 40 characters despite the directory display of the 1 KB FAT32 block. The internal encoding of the .DOC file with initial content, the binary object structure and additional metadata are partially encoded in a padded form of ASCII. The metadata displays the source location of the document, removing possible doubts of file directory structures, security based on location obscurity, and other rational workflow techniques for securing user files within the context of a network infrastructure.

Microsoft has identified thirteen key categories of metadata: Name; Initials; Organization name; Name of originating computer (desktop); Name of network server and/or hard drive; File properties and summary information; Non-visible embedded documents; Names of previous authors; Document revisions; Document versions; Template; Hidden text; and Author comments. Some of this metadata is accessible through the Office application menu interface through menus and dialog boxes. The exploitation of this metadata in an knowledge expander search is useful. There are also the document file properties exposed by the Tools/Options pulldown menu and the User Information tab. This is not the complete list of metadata. Other visible metadata with potential search characteristics include: Footnotes; Cross-references; Table of Contents tags; Indexing tags; Hyperlinks; and Smart tags. Expect x-link and x-pointers plus style sheets and schemas within documents saved in the XML format. In addition, other undocumented structures are part of the extended and expanding Office document object models. Consider fields and mail-merge fields, which are markers for information automatically inserted by Office or by a user when opening, saving, printing, or emailing documents. These fields create a built-in facility for careless information disclosure or overt hacking. There are also the document file properties exposed by the File/Properties pulldown menu. This includes: File/properties; General; Summary; Statistics; Contents; and Custom.

The knowledge expander search also contemplates finding and using other items not specific to MS Office. Techniques for information camouflage can be used in an knowledge expander search. These are equally valid in most any desktop application, and are most relevant to presentation output rather than binary file delivery. Information camouflaged in a source document includes text set to small font sizes, such as 0 or 1, fonts set to type unlikely to be installed on the system which map to symbols or line drawing, PostScript or Unicode font sets with alternate encoding, and font color set to match the paper color or an applied background. White font on white paper hides text, black font on a black border or shading hides text too. Text can also be hidden with graphics when the graphics are anchored to a specific location congruent with the text. Color games with text and graphics also hides the text. Macros, VBA (Visual Basic Application) codes, VBA add-ins, and applets also represent a search asset. Anything than anyone can imagine as an application can run from within MS Office, productive or destructive. Usually, these bits of code are stored as part of the document metadata. However, they also can be out-of-channel files. Either way, they can be compromised by a new code that overwrites the original. They also can be inserted through fields, formulae, or menu add-ins. Collaborative tools are the most obvious entrée.

New features in Windows and other Microsoft digital rights management (DRM) applications, such as ORAPI, ADSI, and MS IRM provide for collaboration, resiliency, and complex versioning and backup far beyond the capabilities of MS Office.

C.17 Content

The differentiation of content within an MS Office document based on initial owner and target distribution is important for search expansion. Some content will be strategic and some tactical. Content of MS Office documents transcends the actual presentation as a printed page, slide, spreadsheet, database report, email message, an index of documents, UML: or project waterfall, or organization chart. Microsoft Corporation is positioning Office as a platform for delivery of new services; it is not just about a PowerPoint presentation or a Word document printed to a facsimile. The DOM is a project plan, with a structure, with components that do things and are sensitive of their own.

For these reasons, it is important to explore the MS Office DOM factors: Content classification; Tagging; Clearance level; Data mining; Traffic analysis; Inference; Encryption; Digital Signature; Document access linked to Fortezza (an encryption program/system), PC Crypto cards, smartcards, and n-factor authentication; Granularity; Strategic information; Tactical information; Common Criteria or NIST analysis; Covert channels; and Bell-LaPadula model conformance.

Content classification with taxonomic classes occurs with tagging for formatting with bold, indexing, and paragraph marking, explicit element tagging for HTML and XML or database and spreadsheet table, field, ranges, row, and column designations, as well as authorship techniques. Formulae and macros define ranges with informational content (contextual algorithms which link content), as well as indicate purpose and intent of the process as well as the target data. When content is tagged at the sideline, as in "eyes-only," or within-the text with any label name for clearance level, as in "<1>," this attests to a SC sensitivity level with an importance factor. For example, a subtotal of employee salaries within a pro form a business plan matched against a list of employee names compared to a bank check ledger gives away each employee's salary level; each document in isolation does not give away information until several are merged and analyzed together. Direct analysis through record relationships and sorting is one type of data mining, human intelligence through inference or statistical inference with set theory or Bayesian methods is yet another. For example, because you know that 6 employees are traveling to a conference in D.C. and two others are not in the office, you can approach a particular person who by inference is manning the station desk with a very specific social engineering attack. OneNote, InfoShare, Net Meeting and/or Live Meeting, Outlook, and Exchange with MS Project also enable workflow routing, group editing, and acceptance sign off. This information becomes part of the document metadata so that traffic analysis shows where the document originated, what changes were made and by whom, how it was routed by username, network, and IP address, who has seen it and has access to it, and all process flow and comments. One of the secure prizes of organization information thus unintentionally published is the names of people within the organization and functional roles.

Designing a knowledge expander search engine through granularity of MS Office node elements by analysis for inclusion and exclusion is an effective method. Multiple source documents create structure and semiotic meaning not in evidence with subsets. This process breaks the context to prevent useful data mining, routing inferences, and the more powerful semiotic information methods. It allows for the separation of strategic information from the tactical, so that access is granular by role, user, and other discriminators. Many academic and implemented security models are in use today, both as a straw man and for certification processes.

C.18 DOM Process Editor

Document object model (DOM) source documents, and particularly Office document modules, comprise the blueprints, process, external data sources and linkages, and materials for building the resulting presentation; the presentation content is usually the ultimate end product. The blueprints and process often are immaterial to the presentation and represent proprietary and confidential material. This DOM object model complexity and diverse accessibility creates an opportunity for the knowledge expander search engine.

Effective DOM and metadata searches use the object hierarchy structure as variously described as a binary tree, category structure, or hive. In any event, the entry point is the root or base, containing a potentially infinite number of sub-categories, each with a potentially infinite number of leaf items. See FIG. 19. The structure can be pruned, deleted, or rearranged. The items represent object-oriented information, from entire subdocuments, to relational databases, layered graphics with vector elements, to simple plain-text, to a single binary numerical element.

The process requires a parse of all branches to each and every leaf. This process is not recursive, just extensive. Each path is examined for context, each leaf for content, all nodes for external references, and everything must be viewed within the context of sources and methods, not just obvious content. The obvious content is what the user created and sees, but as you now know, that is a minor portion of the data contained within the document object structure. This is a paradigm shift is shown in the hierarchy below:

| DOM Deconstruct Table |
| --- |
| For each document (the file and structure); Access the root; For each limb; For each branch; For each sub-branch; For each leaf (item); and Process each leaf. |

Preservation of the path to each leaf is important as it defines the access to that data element. The existence and/or null value of the leaf represents a security control point. The model defines, with supplemental external knowledge of the object model, potential search opportunities. The model and the content are not separate from external knowledge of sources and methods. The model and the content are part of a contextual analysis of the source document or data stream itself. The leaf the significant search control point. It is possible to review and alter the contents of the leaf within the context of the purpose of the leaf to retain functional access with multi-level SC or sec-con sensitivity.

C.19 Five Informational Attributes

The five information attributes of SC or sec-con sensitivity in context to processing include the leaf, purpose, sources and methods, ownership, date or timeliness, and content. The entity must establish protocols which rate or prioritize the five information attributes on each root, branch and leaf in the DOM source document. With the system initialized in this manner, the processing of the DOM document within the parameters of the knowledge expander search is accomplished.

Purpose: How does the purpose of the leaf provide context, purpose, or informational reference to the document as a whole or the individual leaf? Does it provide source, destination, authorship, viability, validity, verification, or integrity to the document as a whole or the individual leaf? Consider the value of processes imbedded in the document as cell formulae, a help file, or other complex routing wizard. Does it show linkages or references to other documents? What is its status or position within the document? What is its element position, as a headline, footnote, or redlined status? These seemingly minor details transcend actual content but provide clues to the following attributes.

Sources and Method: Intelligence agencies stress the confidentially of the sources and methods used to gather information. The information itself might or might not be important, but the ongoing care of the sources and methods is important for future information gathering activities and retention of any status quo until action is initiated. In addition, the viability, validity, verification, or integrity of the document is predicated by the viability, validity, verification, or integrity of the sources and methods used to create it. In terms of the Office document, this type of information is both contextual, leaf content, and metadata. To presume that the SC search uses only doc content at the leaf misses the value of metadata and the inherent value of the object-oriented document format. For example, authorship, source, source dates, editing dates, deletions, redlining, notes, footnotes, MS hidden text, links, and other structural elements in the source doc describe when, how, where, and who created the document. This speaks to the viability, validity, verification, or integrity of the document as a whole, and can compromise past, ongoing, or future data collection efforts and operations.

Ownership: Ownership is reflected both in leaf-level content—that is obvious when a document is presented or published—but also in the metadata. Ownership is also a characteristic of file storage properties, in ring rights, file storage position, linkages, SMB or network file access rights, and HTML references. Ownership, particular the number of links, the times access and edited, numbers of hits, and the level of churning, suggests the relative importance and merit in the document.

Date-Timeliness: Date or timeliness reflects currency. The dates, in terms of edit times, access times, and frequencies suggest the relative importance and merit in the document. Touch and other file-level commands can only mask the overt date and timestamp of a file, not its purpose or content, true timeliness, or merit. This information is spread through the metadata and leaf content. In some hierarchical structures, this information is stored in tables or other structures apart from the immediate document root. When a document is a relational data structure, as in Access or SQL, hidden system fields and hidden security data define edit and deletion times. It is also important to recognize that in databases, records which are deleted by the user are only marked as deleted but persist until the database is purged, packed, cleaned, compressed, or otherwise processed in a maintenance mode. When relational technology with transactional logs and rollback facilities are enabled, data can be recreated or dated despite many types or natural of instigated disasters. This supplemental metadata defines date and timeliness too.

Security: Security of content can be compared to erecting a barrier around that content and may be viewed as an important SC sensitivity issue. However, when content becomes a collection of simple data elements along with data objects, dispersed and distributed sources, effected by embedded events and triggered methods, a search which ignores the security content characteristic fails to acknowledge that the SC sensitivity may be impacted by such omission.

While content is king in most search systems, it is not the only critical aspect of a source document. In terms of the knowledge expander processing of an Office document, each leaf must be processed and assessed for its metadata. Note again that each leaf may be another object-oriented structure in its own right or a simple element. It will need to be processed and assessed accordingly.

C.20 Select Content Introns and Exons

Terminology employed in connection with the operation DNA (deoxyribonucleic acid) provides an appropriate metaphor for the MS Office document object model or any other DOM model. While the DOM is separate from an MS Office binary file, it defines the purpose of that file and maps its activation. The DOM "genes" are expressed into the file binaries only as specifically referenced, and frequently diverge from the pure MS Office application as genes from other OLE (object linking and embedding) applications are embedded into the document. The DOM and the expressed document can mutate for better or worse, and both backwards and forwards the document is adaptable just like DNA, with unforeseen consequences including the profound security flaws evident within the MS Office workflow.

In genetics, an intron is any non-coding or non-activating sequence of DNA initially copied into RNA but cut from the final RNA transcript or unknown as to singular or recombinant purposes. Introns are excluded or ignored in the DNA process. An exon is a coding or activating sequence with a known purpose that is actually used or one that is unknown as to purpose but nonetheless still used. DNA is, of course, the blueprint for life. RNA is the functional transcript of the DNA blueprint used for cell division and replication. Exons are the useful portions in the DNA cycle.

In the object model, the DOM is metaphorically the DNA blueprint for an MS Office document whereas the actual Word, Excel, or Outlook message is an expression of the RNA as a functional transcript. Correspondingly, the SC select content or sec-con intron is any document branch, leaf, or node element with a non-coding, non-activated, or even unknown control utility for the document. From a select content-search (or sec-con-search) standpoint, each and every intron represents a non-qualified element that is a potential search term that may lead to an expanded knowledge expander supple doc compilation. Rather than ignoring SC or sec-con introns as most common search engines do, the current knowledge expander search engine employs the SC or sec-con introns to expand the scope of the search. A SC or sec-con exon is any document branch, leaf, or node element serving an end purpose. Each SC or sec-con exon in a MS Office document becomes a certifiable data element.

Unless each such SC or sec-con intron and SC or sec-con exon in the source document DOM is vetted for credentials, which vetting includes a prioritized taxonomic label or tag, the knowledge expander search, whether through conventional search engines or the novel search engines described herein, will be incomplete. This is effective for DOM, HTML, XML, databases, and any structured file binaries. The standard 2-phrase process transforms into a 3-phase process where DOM node elements are coded either as exons or introns, and thereafter processed accordingly for inclusion or exclusion.

The improved accuracy of 3-phase scanning of documents within the context of an object model is apparent. While the traditional 2-phase method find SC or sec-con introns and SC or sec-con extrons within a source document, it also miscodes several other sequences as introns. The accuracy of such process will always include statistically measurable false negatives and positives, thereby missing true threats and removing non-threats. The 3-phase process improved on the 2-phase process with granular deconstruction of the document and subsequent recoding of both false positives and false negatives to yield a higher rate of accuracy. SC or sec-con introns are added to the search term list in the knowledge expander search engine and are scalable numerically. Better DOM maps mean better intron handling.

Figure 21:
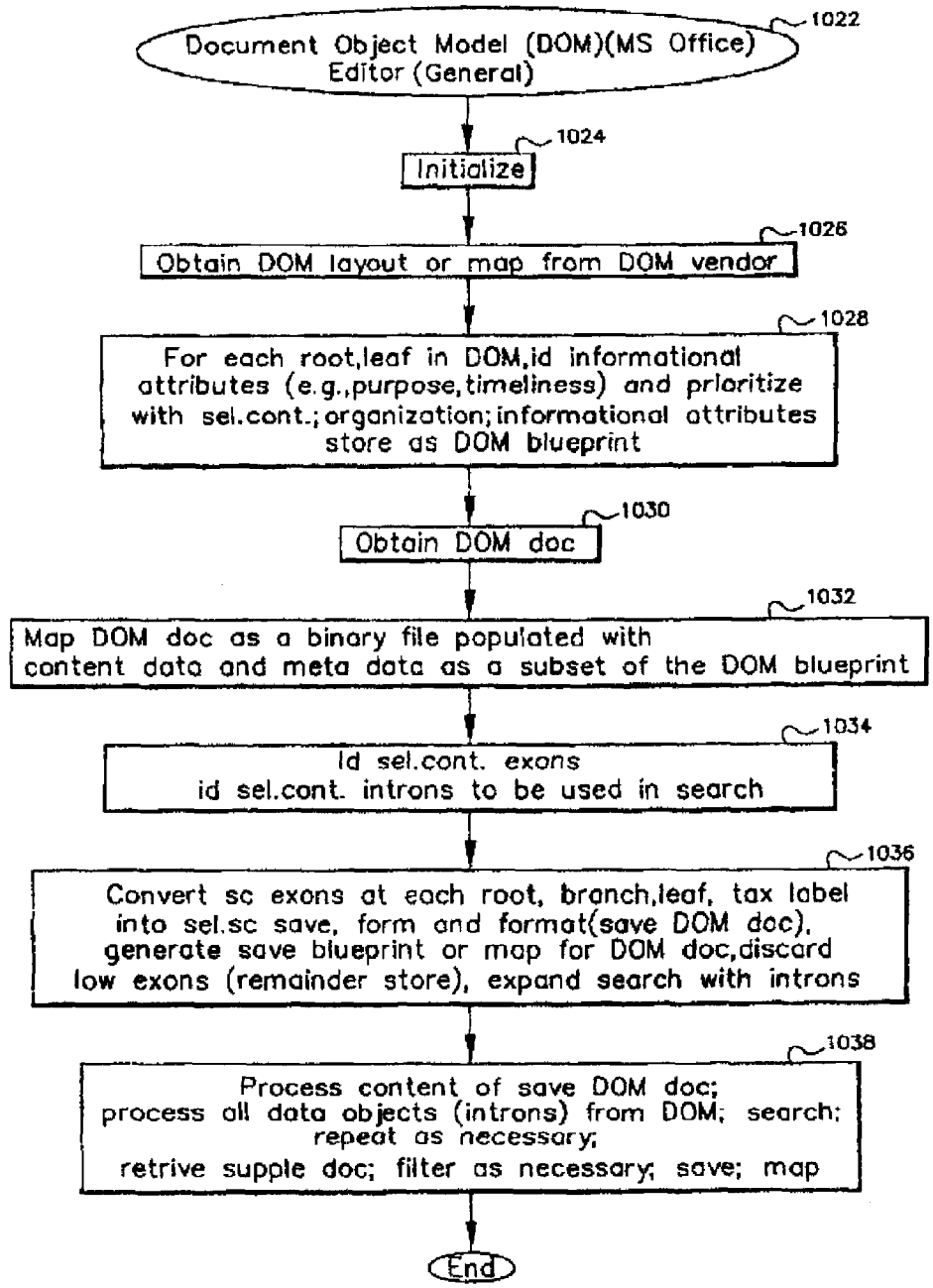
FIG. 21 diagrammatically illustrates a DOM editor process.

FIG. 21 shows the General DOM Editor program 1022 in a flow chart form. Step 1024 is the initialization that is employed by the security entity or SC or sec-con sensitivity supervisor to set up the program. Step 1026 obtains the DOM layout or blueprint from the DOM vendor. Step 1028 notes that for each root, branch and leaf in the DOM, the information attributes must be prioritized with the SC select content or sec-con and organizational informational attributes (a taxonomic routine with prioritization). SC or sec-con introns are identified and SC or sec-con exons are classified, placed in a hierarchical structure and labeled. This step, of course, uses a content filter to identify the SC or sec-con exons. A contextual filter or algorithm is used to taxonomically classify SC or sec-con exons at a higher priority level. For example, when "Bin" is next to "Laden" the SC or sec-con exon combination—Bin Laden—is classified TS or the top level for the SC or sec-con H-tax class.

Step 1030 obtains the source document DOM. Step 1032 maps the DOM source document as a binary file populated with content data and meta data as a subset of the DOM blueprint. Step 1034 identifies SC or sec-con exons and SC or sec-con Introns. Step 1036 labels or tags SC or sec-con exons per the tax class (taxonomic classification) and per priority, to be included in the further processing of the item and identifies SC or sec-con introns to be used as search terms in the knowledge expander search. Multiple tags and overlapping tags are possible and a ruled-based system is employed to upcode multiple tags and overlapping tags to the next higher tax class—priority level. Step 1036 converts SC or sec-con exons at each root, branch and leaf into SC or sec-con level save doc, form and format (for example, a safe DOM template), and generates a save blueprint or map, drops (or alternatively stores in a remainder store) all low priority SC or sec-con exons, and expands the search term list with the SC or sec-con introns and the top group of the SC exons. Step 1038 processes the save DOM doc, that is, the top level SC or sec-con exons and all SC or sec-con introns as search terms through public and/or private databases, indices, search engines, etc. A divergent search uses SC or sec-con intron. A convergent search uses SC or sec-con exon. Supplemental documents are gathered form the search, the filter H-tax class priority tag process is repeated on the supple docs, the SC or sec-con introns are identified and selected top priority SC or sec-con exons are identified and the search and a second tier supple docs compilation is processed. Supple docs are stored and a relational map is generated both with the search terms and the supple docs.

Figure 22:
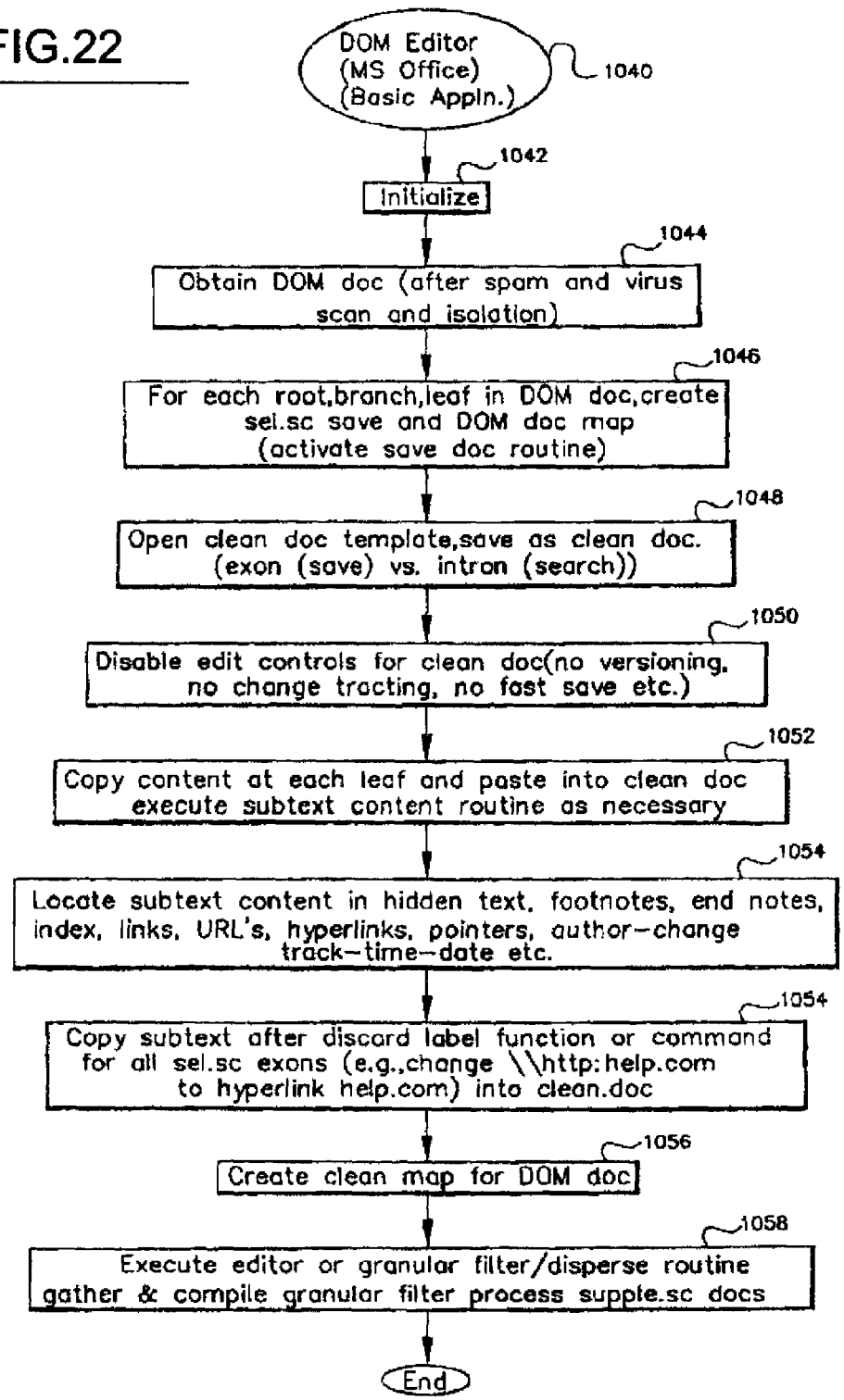
FIG. 22 diagrammatically illustrates another DOM editor process.

FIG. 22 shows a flow chart of a basic application for a DOM Editor-knowledge expander search for MS Office document. Step 1042 initializes the system. Step 1044 obtains the source DOM document and notes that all processing occurs after a spam and virus filter. Step 1046 notes that the program creates or is provided with a security safe or clean DOM document and map. All levels of SC are labeled or tagged and saved in the "save doc" routine. This hierarchical taxonomic (H-tax) tagging labels all SC or sec-con words, terms, etc. and locates and maps exons and introns in the source doc. Step 1048 notes that a template is opened and SC or sec-con exons and SC or sec-con introns (non-standard SC or sec-con and unknown terms, characters, words, etc.) are copied from the source doc into the clean DOC. A clean .DOC template (Word) or whatever the new document type is opened for the specific application. The Normal.DOC or New Spreadsheet.XLS on the MS Office distribution CD is safe. In Visio, for example, start with a new chart. Older documents saved as templates tend to accumulate unanticipated metadata. If one must use a non-standard template, clean it up. View it as both a printed document, as a binary file, and as a document object. Write protect the templates, or store the templates as non-modifiable networked volume. If the templates are used throughout the organization, create a network store for them and configure each user's installation of MS Office to look there for the templates. Search the network for duplicate copies of these templates and eliminate them.

If changes from any version of MS Office to another version are made—this can be a regularly upgrade or a even a downgrade—create new documents and cut-and-paste parts of prior documents into new ones. Lose the older files and templates. If you receive or open an Office document in either an older or newer version, create new documents and cut-and-paste parts of prior documents into new ones consistent with the MS Office version that you use.

Step 1050 disables edit controls and step 1052 copies SC or sec-con exon and SC or sec-con intron content. The point is one must edit cleanly. This is not a single step but rather a process, both one time and ongoing. Disable versioning in step 1050 to prevent a buildup of past versions of the document. With versioning, prior sessions will be stored as document.doc 1, document.doc 2, and so on. These tend to get entwined with the latest version. If workflow with InfoPath, Outlook, or other collaborative workflow tools creates duplicate copies of the source document file for each user. Step 1050 includes the concept that the system is configured to store a single network copy instead. Preserve an audit trail and backup with a system backup rather than versioning. Disable change tracking in step 1050 to curtail the buildup of additions, deletions, and changes that transcend the publishing intent of the document. If redlining is necessary, establish guidelines for periodically accepting changes to purge change log. Use the command to save the document without the change log with File/Save or File/Save As. Do not use nor rely on fast saves, timed saves, or file recovery after a MS Office crash to purge the dirty metadata. After a crash, reopen the document, save the document under a new name. Close the Office application. Delete the old file precipitating the crash. Rename the new file under the old name. Reopen the Office application.

Step 1054 locates text in footnotes, hidden text, etc and labels or tags that content as SC or sec-con exons or SC or sec-con introns and maps those data elements to the SC or sec-con save doc and copies the elements into the Clean DOC. Use comments instead of hidden text. It is documented as a feature so it can be found rather than accidentally uncovered. Hidden text with a font color change or font size change looks like an artifact that most users will ignore or delete. Avoid the use of headers, footers, footnotes, endnotes, inserts for table of contents, index and the like. These appear only in the printed output unless specifically viewed from the View pull-down menu. Such links also create a lot of dirty metadata beyond what is visible even during editing that persists until changes are accepted. Remove references from the source document. This is subtle, but very important when documents are specifically posted or even inadvertently listed on web sites. References include other files, documents, hyperlinks, and other possible embedded formatted materials. These references create the ability to infer quite a lot about the purpose of the document from other related documents in the same directory, by the same authors, and the types of other documents. For example, a spreadsheet stored with a report that is not overtly included in the report suggests that is source material that has not been reviewed with an eye towards privacy, security, or client privilege.

Paste and copy images, cut text, formatted text, pie charts, record sets, slides, waterfalls, milestones, organizational charts as plain text or an image rather than formatted Office objects. If the embed commend is used, all the metadata baggage from the other Office application is now added to the metadata in the target document. Since that metadata baggage is not native to the target document application, it is inaccessible and truly hidden. Tools, such as Metadata Assistant will not find Excel metadata within a Word Document, Word metadata within an Excel spreadsheet, and none of them within an Outlook note or message.

Step 1056 notes that a clean map for the meta data cleared DOM document must be created.

Step 1058 executes the intron search and/or granular search routine, gathers and compiles supple. docs and the processes those supple docs through the granular filters discussed earlier to locate, with the hierarchical taxonomic filter process tags new words, terms, symbols, which are related to the original SC select content or sec-con, thereby expanding the knowledge base of the meaning of the SC or sec-con source document.

C.21 Hierarchical Taxonomic Class Examples

Various type of classification systems (taxonomic systems) may be employed. For example, a dictionary classifies all words as nouns, verbs, adverbs, etc. This is one taxonomic system. A prioritized H-tax system classifies nouns into a name subclass and this name subclass may be priority or sensitivity level 1. Geographic locations (class nouns) may be priority 2. The operator of the present knowledge expander search process may place a high priority or sensitivity on "noun" class, thereby converting the simple taxonomic structure into a hierarchical taxonomic system. Identifying categories and subcategories for SC or sec-con sensitive words, etc. or critical data, creating a compilation of pre-existing data, comparing the compiled pre-existing data to the target data and labeling or tagging the SC or sec-con terms is one of many important aspects of the present invention. Table 1 in FIG. 23 provides categorical identifiers for personal identity. These categories, which may be utilized to identify a person, are not meant to be all encompassing but are mainly provided as examples.

After categories are identified for the critical data, it is important to create the hierarchical taxonomic system against which the target data is tested. Ranking or qualifying the categories at SC or sec-con sensitivity levels is next. Table 2 in FIG. 24 is a general attempt to quantify the categories for personal identification from a high risk value beginning with "name" to a low risk value ending with "personal interests". Again, the Ranked Identity Category Table 2 is not meant to be limiting but is meant to be an example. Individuals skilled in identifying a person may alter the ranking of the identity categories in Table 2, FIG. 24.

The present invention can be employed to use a hierarchical taxonomic system for a business. Table 3 in FIG. 25 set forth below provides examples of categorical identifiers for a manufacturing business. Again, this list is not meant to be exhaustive or complete, but is only provided as an example of the types of categories and subcategories which a manufacturing business would employ in order to establish the risk monitor of the present invention.

With this list, the manufacturing business may assign a SC or sec-con sensitivity level to each category (class, subclass and sub-subclass) thereby creating a prioritized hierarchical taxonomic system.

C.22 Knowledge Expander (KE) Basic Program

Figure 26:
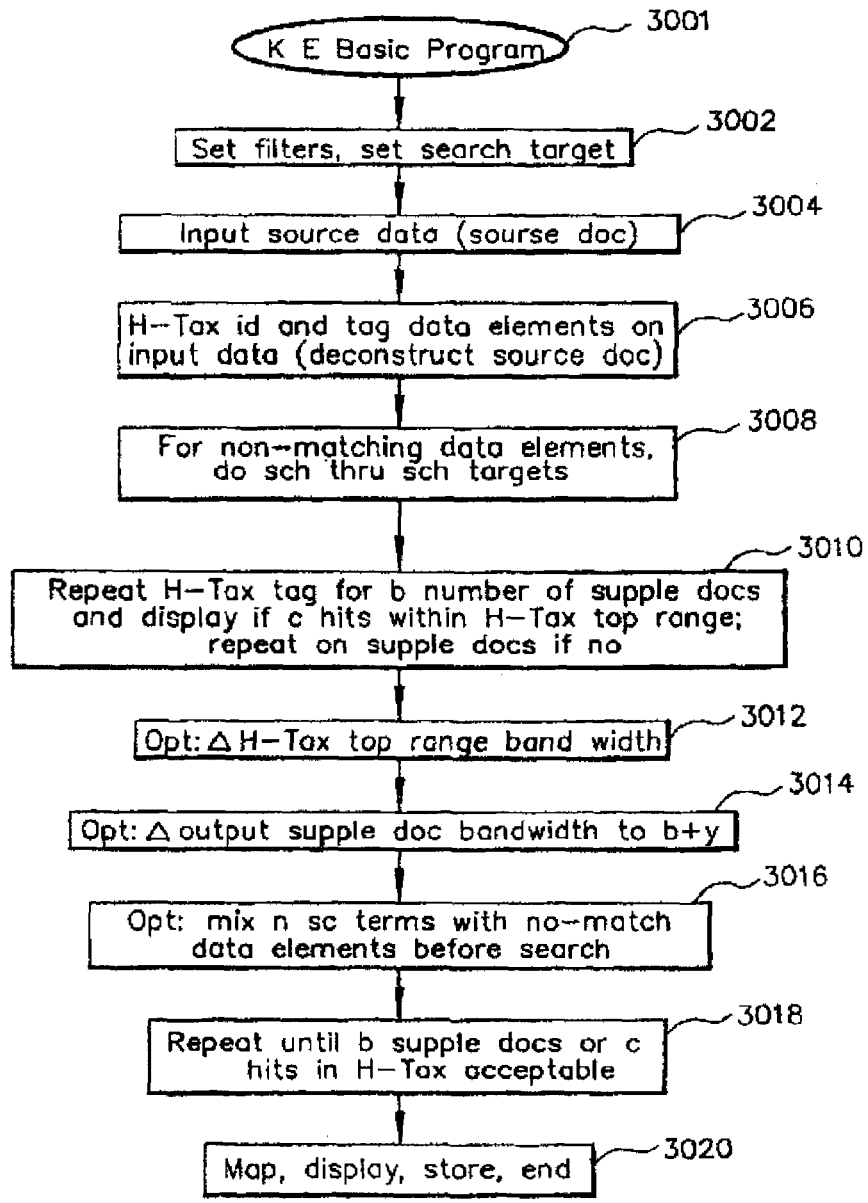
FIG. 26 diagrammatically illustrates a basic KE search process.

As discussed earlier, the information life cycle or knowledge expander search module can be configured with many different modules in order to achieve the objective of the operator. The knowledge expander or KE basic program 3001 in FIG. 26 is one basic implementation of the expander search program. FIG. 26, In step 3002, the operator or user sets various filters and sets the search targets. The search targets may be publicly available search engines or private data bases, data collections, indices or any item that the user wants the KE search to access. Filters are described earlier as hierarchical taxonomic filters or taggers, content, contextual and other types of filters. Filters are used to identify class, subclass and priority in the hierarchical taxonomic or H-tax system, to apply contextual rules or algorithms ("bomb" within 10 words of "arab"), and content (select content SC or sec-con verses non-matching SC or sec-con). Step 3004 obtains the source data or the source is input by the operator. Data input may be from a client computer in a server-client computer system. The source data may be a data stream, a source document or other item. Step 3004 contemplates that if a document is utilized, the document is deconstructed to its basic data elements and appropriately mapped. See the discussion above in connection with DOM branch, leaf and tree deconstruction. In step 3006, the hierarchical taxonomic classification (H-tax) occurs and each data element in the input document is tagged based upon the classification system which has been prioritized by the user (or the user uses a pre-set prioritized H-tax). A note to deconstruct the source document into data elements (see DOM deconstruction into its object hierarchical structure above) is found in step 3006. In step 3008, for non-matching data elements, a search is conducted through the search targets. Non-matching data elements form the input doc are those which do not match SC or sec-con. In step 3010, the system gathers the documents from the search (supplemental documents) and repeats the H-tax tagging operation for b number of supple docs. A relationship mapping function and display function is activated if c number of hits occur within the H-tax top priority range. In other words, if the search for non-matching data elements returns 50 select content or SC or sec-con terms and of those 50 SC or sec-con terms in the supple docs, 20 SC or sec-con terms fall within priority ranges 1-5 of the hierarchical taxonomic classification set by the user (n priority H-tax levels), then the system and process maps the results and displays the representations of the H-tax recovered from the supple docs c is less than 20. If less than b number of H-tax tags are noted in the supplemental documents, the system repeats steps 3006 and 3008 and gathers a second tier of supplemental documents.

Steps 3012, 3014, 3016 are optional. As an option to be set by the user or as an option to be set by the system operator as a default, step 3012 changes the H-tax top range bandwidth from n priorities to be searched to m priorities. This change may be needed to expand the search bandwidth from b to b−10 to b+20. A reduction (m less than n) is needed if too many supple docs are recovered by the search. If too few are recovered, then m is made greater than n priorities in the H-tax. Option 3014 changes the output supplemental document bandwidth to b+y if too few supple docs are recovered. Of course, the output supplemental bandwidth could be reduced with b−y. Optional step 3016 mixes n number of select content search terms with the no-match data element before the search. This effectively is a convergent filter. By adding the known SC or sec-con to the search terms (initially, search terms are generated from the input doc based upon priority H-tax), the search is biased or is set to converge on the known SC or sec-con added to the search term group. By using the no-match (NOT AND) function, the KE search diverges to gather a wider range of docs. Of course, the user may always employ common search engines in addition to the search plans set forth herein. Step 3018 repeats the process until b supplement documents or c hits (SC or sec-con sensitivity matches) are noted within the H-tax top range. Step 3020 maps, displays, stores and ends the program.

Figure 27:
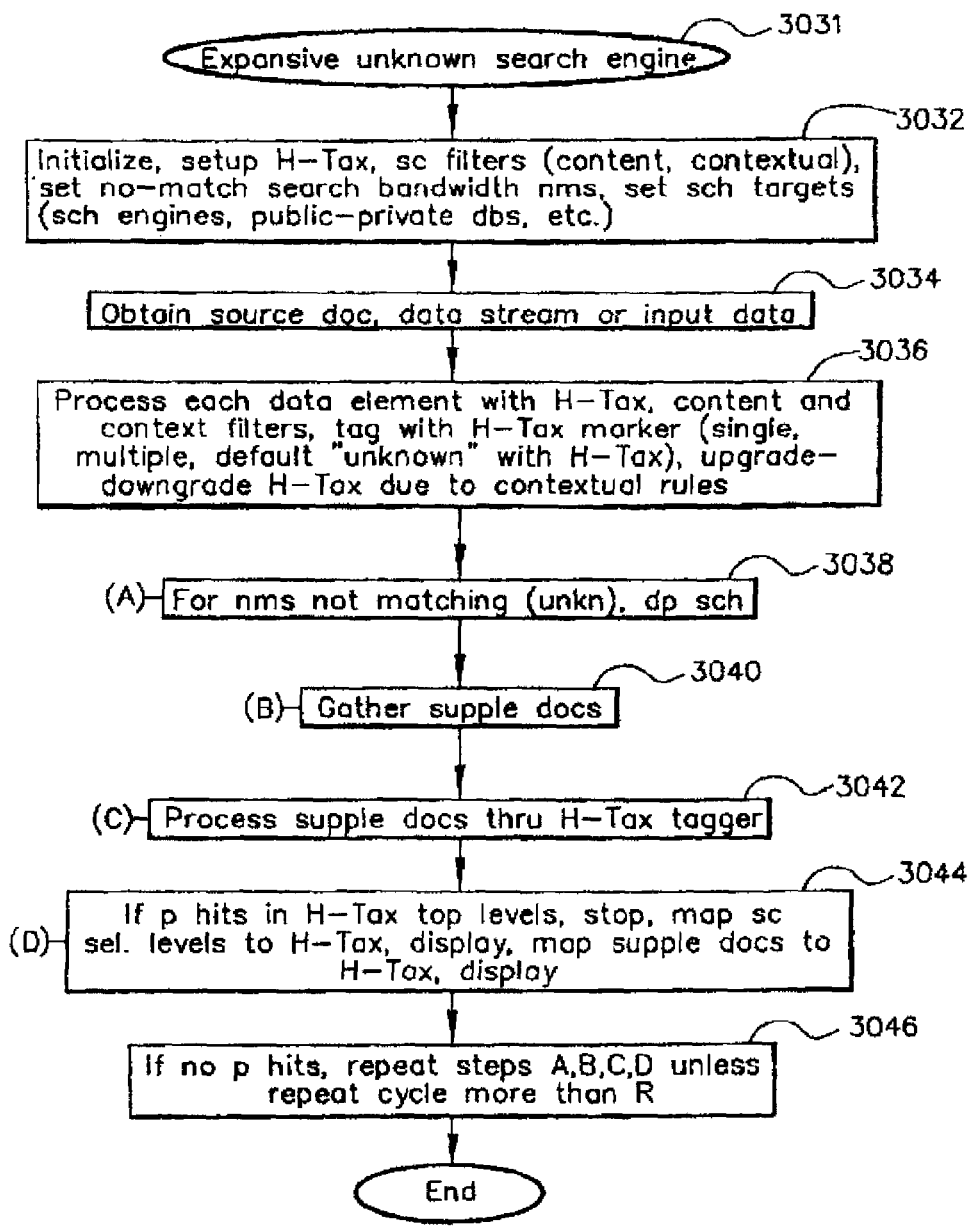
FIG. 27 diagrammatically illustrates an expanded KE search process.

FIG. 27 shows an expansive or expansion unknown search engine 3031. Step 3032 initializes the program with preferably user input, sets up the hierarchical taxonomic H-tax classification system along with a priority or sensitivity level assigned to each level and branch and leaf in the H-tax system. Select content SC or sec-con filter modules for content and contextual range or algorithm tests are also set. At least some select content should fall within the prioritized hierarchical taxonomic system. The select content SC or sec-con encompasses words, terms and data objects that the user wants to expand his or her knowledge base with the search engine. The user sets a no-match search bandwidth nms and sets search targets such as search engines, public or private databases, data compilations, indices, data collections and data structures or whatever. Step 3034 obtains a source or data stream or input document. Step 3036 processes each data element (which may include a document deconstruction) with the H-tax, content and context filters, and tags each data element with an H-tax marker. Multiple, singular, and a default "unknown" H-tax classification indicators are linked or tagged on every data element. The system in step 3036 may upgrade or downgrade the priority or sensitivity H-tax level for a particular word, term, etc., due to contextual rules in the context filter. In step 3038, the system conducts a search for nms number of not matching or unknown data elements. If nms is 10, the system takes the top 10 priority H-tax supple SC or sec-con terms obtained from the input doc and uses the top 10 supple SC or sec-con as search terms in the target data collections. The search is conducted through search targets identified in the set-up step 3032. The no-match search 3038 is sometimes identified as step A herein. Step 3040 gathers supplemental documents. Sometimes, step 3040 is step B herein. In step 3042, the system processes the supplemental documents through the H-tax tagger. The supple docs are classified with the H-tax. This is sometimes step C. In step 3044, the system determines if p hits have been noted in the H-tax top range levels. If YES, the system stops and maps the select content SC or sec-con sensitivity sel. levels to the H-tax mapping structure and displays that SC or sec-con hierarchical representation map to the user. Further, the system in step 3044 maps the supplemental documents to the H-tax map structure and displays that to the user. Sometimes, step 3044 is step D herein. In step 3046, if p number of hits are NOT identified in step 3044, steps A, B, C, D are again executed and repeated unless the repeat cycle is more than R. The nms bandwidth may automatically change (increase) or the n priority H-tax may change to m H-tax levels to increase the supple docs or the hit count for supple SC or sec-con. The same techniques may be used in reverse if too many supple docs are recovered. The system ends after step 3046.

Figure 28:
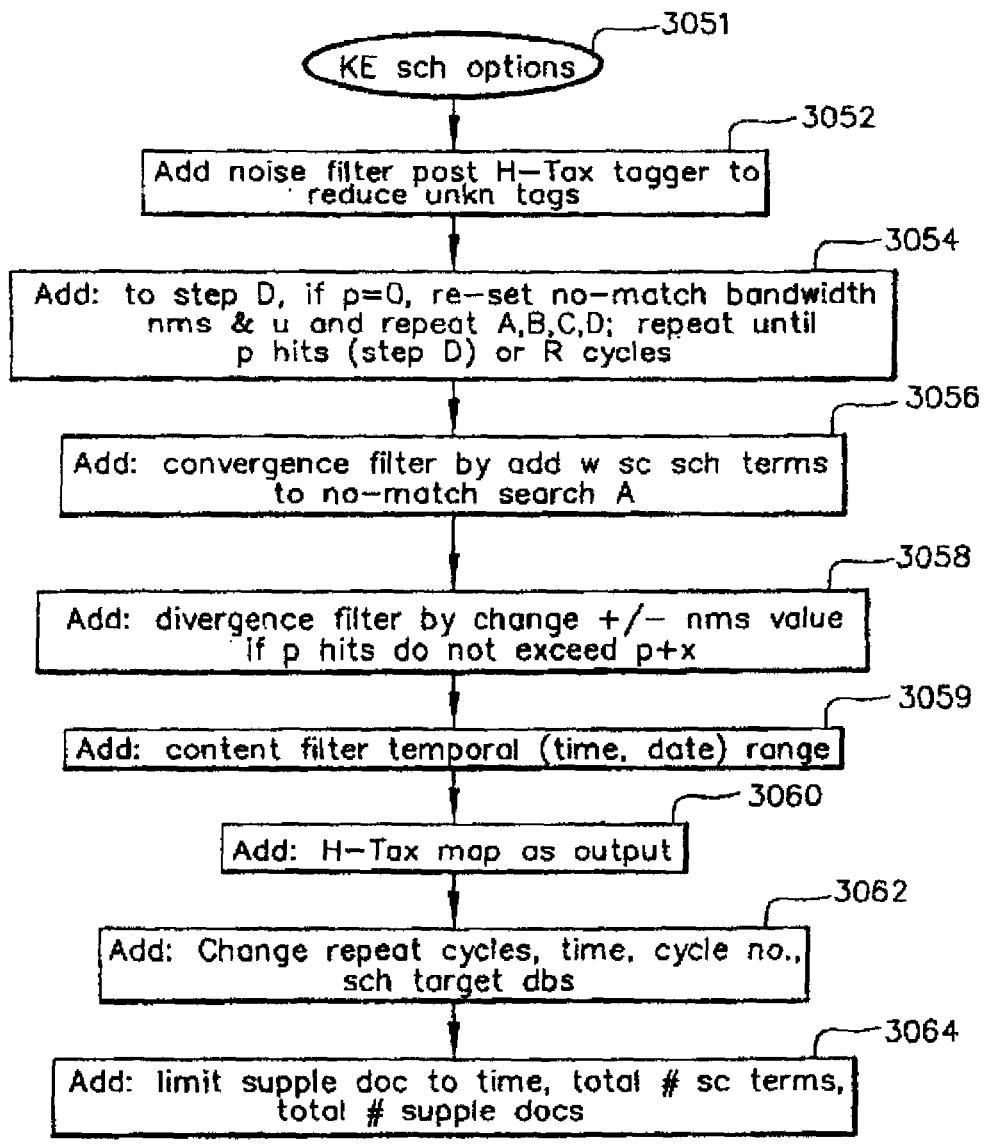
FIG. 28 diagrammatically illustrates KE search process options.

FIG. 28 shows knowledge expander KE search options 3051. Step 3052 is an option to add a noise filter after the H-tax tagger step 3036 in the expansive unknown search engine routine 3031. The noise filter reduces the number of unknown data element and operates on the unknown tags for those unknown data elements. For example, terms "and" and "or" and "the" may be deleted by the noise filter. Optional step 3054 adds to step D, if p hits is equal to zero, then the system resets the no-match bandwidth nms+u and repeats step A, B, C, D and repeats the entire process until p hits in step D or R iterative cycles have been noted (counted). In optional step 3056, a convergence filter is added to the expansive, unknown search engines 3031 by adding w select content SC or sec-con search terms to the no-match search step A. In optional step 3058, a divergence filter is added by changing, either increasing or decreasing, nms value if p hits do not exceed p+x. In optional step 3059, a content filter is added to detect temporal relationships such as time and date ranges. Time may be time of length of search or time may be a time-date range limit on recovered supple docs. The temporal contextual filter (time and date is a matter of context) would be added to step 3036 the H-tax step. In optional step 3060, the H-tax map is output to the user so the user sees the classification and the prioritization of that classification. In step 3062 the operator can change the repeat cycle R, the time the search runs, the number of cycles, and the search target databases, data sets, spreadsheets or public or private search engines. In optional step 3064, the operator can limit the supplemental documents based upon a temporal factor such as time, the total number of SC or sec-con terms located in the supplemental documents, and the total number of supplemental documents.

C.23 Secured Metasearch Engine Based on Granular Data Control

As an overview, the secured metasearch engine technology is based on granular data control. The engine is part of the KE engine described above in sections C.9-C.22. The secured metasearch engine technology enables secured searches and distribution of secured search results including secured information sharing with multi level security (MLS) search capabilities across domains. Data is explored not only by content but also context and concept. Search should occur across domains, with information shared and delivered across domains and through the extraction and integration of both private and public data sources including the Internet. Stovepipes and silos, independent efforts at information collection and intelligence analysis, and air gaps or security guards divide information domains and prevent secured information sharing. Centralization and consolidation of data gives rise to data overload, a problem in part addressed by new web-like searching techniques, but also opens the door to security leaks.

The security of current data mining and search operations as well as the security of the multi level distribution of the search results to users with different access levels is questionable. Furthermore, the current data mining and search is rigid because the starting point for each and every effort requires an index or search terms and the mining is completely content-based. When connecting the dots, it is essential that search be possible without preconceptions of utility, purpose, or cultural bias. Effective search techniques, called "metasearch" herein, comprises more than web-like textual (and other formats such as audio or video, but also compound meta-formats) search technology. It includes data mining, textual and contextual search, aggregation, inference, and data-to-data interaction all based on granular data control subject to security compliance.

Metasearch generally means the usage of multiple web-based search engines based on keywords with results combined into a single unified report; this is better described as a confederated search or federated search. Each web-based search engine is rigid in terms of its reliance on preexisting indexes; it is usually fast but limited in terms of most likely usage bias. However, the combined results reinforce the pre-existing answers based on the implicit search question.

In contrast, the Secured Metasearch Engine (sections C.9-C.22) is designed for searching the unknowns and expands the base of information, as well as conducts the search operations across different domains with different security levels. The Secured Metasearch Engine results provides two distinct and fundamental directions, search convergence and search divergence, both of which are critical to the process of connecting-the-dots. Failure to consider both convergence and divergence leads to incomplete results.

Search divergence is the process of expanding the content, context, and concept beyond the strict scope of the fundamental search. Search convergence is the process of validating, substantiating, and establishing the integrity of the fundamental search. Divergence is the expansion of the search query or data mining operation. There is a need to find outliers useful to expand the scope of the users knowledge and infer new information and intelligence. Some information and intelligence operations require exploration without preconception. Herein, outliers with the least priority, relevance, or ranking frequently provide previously unknown references or interconnections that are purposefully hidden. This is a search divergence because the base search query primes the process but effectively we already know the highest ranking results and reject those results while iterating the search for non-ranking items.

The Security Metasearch Engine starts with known keywords and indexes, but accepts primarily information that is new or different from the direct response to the implicit question, that is the base search query. Validation and integrity is not important to divergence. The search engine is looking for all related metadata, references, links, and relationships without regard to accuracy. Exact matches are in effect usually ignored, but all new references are added into a secondary query yielding subsequent results (supple docs and supple search terms). The subsequent results in turn yield yet more new references. This subsequent query yields subsequent results, which is repeated indefinitely. The iterative results create an asymptotic adjacency list model, which may include a networking relatedness. The networking relatedness is often viewed as flow charts showing betweenness, closeness, and connectedness. The networking relatedness may also be a social network relatedness.

This expansion of the base search query is the process by which the user discovers more dots. Connecting dots the user already knows is pointless and does not expand the user's knowledge; the user wants to expand the set of dots and generate new content, new context, and new concepts. The Secured Metasearch Engine starts with old and/or limited information, but generates new information. The theory of six degrees of separation has some legitimacy, however there is a difference between accidental and active relatedness.

Divergence is also critical to enabling the Secured Metasearch Engine to foster security by exploring the purpose and usage of information beyond the immediate and obvious preconceptions (i.e. foresee reflexivity) of semantic and pragmatic meaning. See beyond the immediate security perception for other possible cross-domain requirements and enable information sharing. The Secure Metasearch Engines is connecting known dots with new dots, the true concept of "connecting the dots". The new dots lack integrity and substantiation. They are not ignored or dismissed outliers because they can reveal the outlines of previously unknown, undiscovered, unforeseen, uninvestigated and unrevealed situations.

The search process is really a metasearch, applying techniques of data mining, textual and contextual search, aggregation, inference, and data-to-data interaction, and the integration is the establishment of relationships. However, some of the new dots will be false and noise. At this point, a search convergence is useful to establish likelihood and risk for the new information and integrity and substantiation of the difference between accidental and active relatedness.

The Convergence Search is described herein. Convergence is the usual web-like search engine or data mining operation. It is rigid. The user starts with known keywords and indexes—search terms—as the base search query and accept hits with the highest relevancy. This information is used aggregately to confirm or deny the integrity of the initial search. The user gets back what the user expects with priority, relevance, or ranking focusing the hits to the content most consistent to the search term context. Outliers are naturally rejected and filtered out. Search convergence might entail a physical inventory, database report verification, an independent party confirmation, or a drone flyover to substantiate the information. The result is in direct response to the implicit question, that is the base search query. The user positions and substantiates the dots the user already knows. The user starts with old information, and the user gets back old information. However, the benefit provides by the Secured Metasearch Engine is that it contextualizes these convergent results with a higher level of relevancy to the user's specific purposes based on tools which manage and control granular data. Those include tools include: (1) metafilters for automatic categorization; and (2) sensitivity level taxonomy. These tools deliver "fine adjustments" to the search process and find the most appropriate results for the user prioritized according to the highest relevancy.

The combination of divergence and convergence operations provides additional information. The Secure Metasearch Engines performs three key functions. (1) First, it selects new data elements of value and recognizes unknowns for automated iterative divergent search. (2) Second, the combined divergence search delivers "fine adjustments" to the divergence search process and finds the most appropriate results for the user prioritized according to the highest relevancy. (3) The Secure Meta search Engine categorizes all aggregated results to sensitivity level and enables distribution subject to MLS-compliance cross domain. While the Secure Metasearch Engines primarily focus on unstructured information, it can be integrated with structured data sources too because it is actually easier to extract context and concept from structured data.

There are multiple starting points to the metasearch process. One or more candidate data streams, news feeds, or documents can be dragged from the desktop into a queue. These items may be monitored for changes and then fed into the Secure Metasearch Engine for granular data selection and metatag categorization with the output result that search terms are generated and metasearch terms are also generated. A document or data stream automatically sets the context of the search and is explored for likely search terms/key words. No index or bias is necessary to begin the process. The resulting search terms of interest are fed into the next search cycle, which may include also one or more URLs for further exploration. Indexes and search terms do not define the implicit question or establish parameters for an effective answer because they represent a single dimension of information. Metafilters are used to control the granular data elements in order to fine-tune the search. The metafilters add both context and concepts to the initial search and all subsequent exploration. Such metafilters may be: (1) Categories of the granular data elements in a document ("name" "location" "date" "amount"); (2) sensitivity levels of the data elements ("top Secret" "Private" "level 9"); (3) phrases, ("Mohammed Atta" "United Nations"); and (4) Group Lists, (Groups of words which represent a concept or a context–"Nuclear"+"Submarine").

Generation of keywords/search terms for conducting the continuing searches is done by controlling of data at the granular data level. Control of data at the granular data level is enabled by combining different filters. The Secure Metasearch Engine recognizes complex content and context by implementing a combination of filters/sieves. Those combinations of different filters/sieves create different permutations of resulting keywords for the search. The different keywords for the continuing searches are selected automatically based on: (1) the words entered into each filter/metafilter; and (2) the configuration of the different filters/metafilters combinations. As an example in one embodiment, all the content of a document is: (1) categorized, i.e. each individual word (or phrase) in the document is tagged by category, "name" "location" "date" etc.; (2) the individual words are also tagged by sensitivity tags "secret" "confidential" "Private" "level 3 sensitivity" etc.; and (3) all the above is presented in a matrix format. The filters will automatically select which words in the matrix will be used as keywords for the continuing search. Different keywords/search terms will be selected based on the different filters or combination of filters used. The entries for such filters may be machine or user defined. The combination and selection of different filters may create different permutation and results. The filters may include the "Word Lists", "Phrases list", and "Word Group Lists" which limit the range or area from which the keywords may be selected. The ideal combination of filters to control granular content for automatic production of keywords may be found also by trial and error. Artificial intelligence tools may be integrated.

Linear adjacent selections may be used as keywords. However, unknown content can slip through this sieve without an explicit human intervention, therefore the Secured Metasearch Engine automates this sieve by creating permutations of both categorized and unknown words and phrases. These permutations are used as new search terms. The likelihood of random combinations (included in the class of the NP! problem space) is so low, that emphasis is focused instead on linear adjacent selections. This result in is a small and focused problem space that can be solved on a typical personal computer and ads disproportionate value. For example, a Google search of "Mohammed Atta" returns "Khalid Sheikh Mohammed" as a disconnected string of categorized and unknown words out of the box; that means parts of the phrase "Khalid Sheikh Mohammed" are recognized without any special configuration, but not as a contextual phrase. Permutations of linear adjacent selections do however create the complete connected phrase and automatically submit the complete phrase for a divergent metasearch, thereby creating new and previously unrecognized relationships to connect the-dots.

The engine can be set for automated contextual pruning with flexibility to discover codes. Many divergent mining and search efforts will expose unknown, deceitfully hidden, and statistically irrelevant relationships. For example, a Google search of "Mohammed Atta" also shows meetings at Aleppo. The relevant thread for Aleppo is that it is Syrian university town with social connections to Hamburg and the 9/11 hijackers associates. However, Aleppo is also a common Lebanese street name, and the original shoemaker character in the Pinocchio story by C. Collodi. The name was changed to Geppetto in the Disney children's movie. While it is tempting just to prune this track, it is also important to explore associative contexts, because the use of codes can mask more sinister meanings. The 9/11 hijackers communicated within the seemingly innocuous context of weddings, guest lists, and dates. So while contextual pruning is easier after the fact, it can be very important before the fact when the use of codes and false contexts are not so clear.

In conclusion, although stovepipes and silos, independent efforts at information collection and intelligence analysis, and air gaps or security guards among domains prevent information sharing, the Secure Metasearch Engine enables security with information sharing including Multi Level Security (MLS) search capabilities across domains. It overcomes security leaks consistent with the needs to both protect national security interests but also enable cross-domain information sharing. The Secured Metasearch Engine technology is based on granular data control. It enables secured searches and distribution of secured search results including secured information sharing with Multi Level Security (MLS) search capabilities across domains. Data is explored not only by content but also context and concept. Search should occur across domains, with information shared and delivered across domains and through the extraction and integration of both private and public data sources including the Internet.

Figure 52:
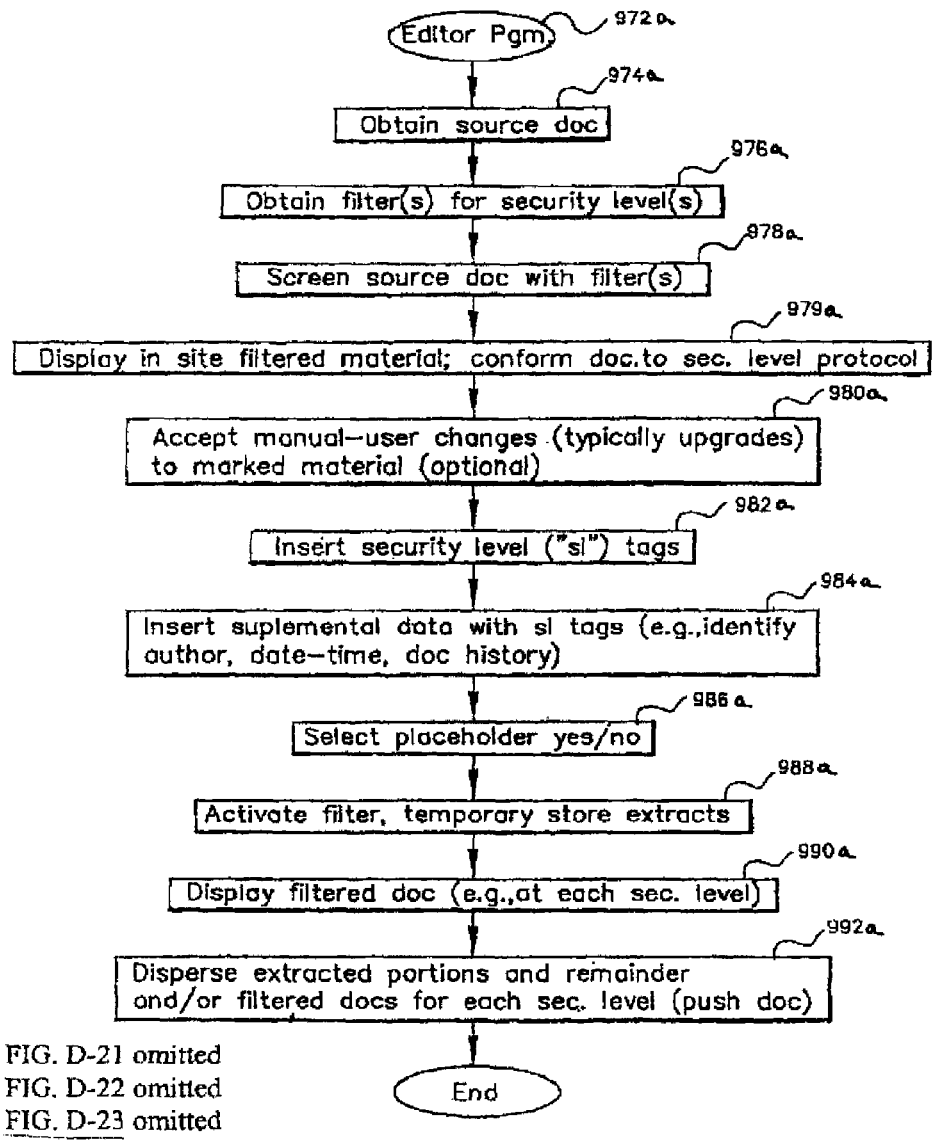
FIG. 52 diagrammatically illustrates a basic security editor program.

D. 1 Secure Editor, DOM Editor (General) and DOM Editor—Basic Applied as Extractor Modules The Secure Editor can be used to generate SC or sec-con data for a search and can also be used to locate and extract security or sec-con data and SC data before storage of the sec-con or SC data in the distributed storage sites. The Secure Editor in FIG. 52 diagrammatically illustrates an editor which may be employed to secure sensitive word/objects in a source document. In a current working embodiment, the secure editor is a standalone application or a module to add into other applications for plain text and media creation, editing, and sensitivity level tagging. Other types of tagging, wherein the editor supplements the initial group or subset of security sensitive (or select content) words, characters, icons and data objects by categorization, taxonomy classification, privacy, security, compliance, and semiotic meaning, are also available. The editor supports a full range of document management and can be integrated into a unified infrastructure, from creation, editing, document markup, tagging, tag conversion, tag removal, context sensitivity level redaction, context reconstitution, and support for complex process work flows. The architecture assures separation of data from metadata so that no security lapses are introduced into the traditional word processing and document management cycle.

FIG. 52 is a basic flow chart for one embodiment of the Secure Editor module. Editor program 972a begins with obtaining the source document 974a. Of course, the source document may be any type of document as explained later herein. Step or function 976a obtains one or more filters for one or more security or sensitivity levels. Step 978 screens or processed the source document with the filter(s). For example, the source document in FIG. 15 in window 991 has text regions 993, 994, 995 and 996. In step 979, the Secure Editor displays, in situ (in the displayed document), the filtered identified material and conforms the precursor document to the security level protocols for the system within which the Secure Editor is employed as an information processing tool. FIG. 16 shows that the address data 993 is marked TS (top secret), region 994 is displayed in color A for TS coding (please note that the addressee data may also be so marked) and is "red-lined" or struck out. Region 995 is displayed as presented in the source document and is labeled U (unclassified) and region 996 is shown in color B, is redlined and is labeled S. Labels TS, S, C (classified) and U are the established security labeling protocol used by the organization employing the Secure Editor. Other labeling schemes may be employed. Color is used to assist the user to select (and in some non-standard cases, deselect) the sensitive data marked by the editor. Redline is used to inform the user that the filter(s) will extract the marked data. Labels are used to permit the entity using the editor to employ standard tear line protocol. Any data beneath a security classification of the user is under the tear line and the data is permitted to be distributed to the lower security cleared user. Of course, electronic distribution of secure data need not use the hard copy or print version of the tear line. However, this nomenclature referring to the tear line is used in the prior art systems.

Step 980*a* (FIG. 52) accepts the user's manual changes (typically upgrades) to the precursor document. These manual changes are displayed, redlined, colored and labeled. Step 982*a* inserts the security label TS, S, C and U has discussed above. Step 984*a* notes that the system takes certain meta data such as author, date-time, version history, change history, etc. and converts this meta data into ordinary text, marks that data at the necessary security level and labels the data. Step 986*a* permits the user to add (or omit) placeholders into the final document. FIG. 17 shows placeholders as black lines or as XXXXX symbols (or other symbols) wherein the sensitive text is not shown but some replacement markers are shown. The byline in region 1003 shows "sanitized document." The byline 1003 in FIG. 16 lists the security level and the color representation.

Step 988*a* (FIG. 52) activates the filter, extracts the sensitive or SC data and temporarily stores the extracted data. Step 990*a* displays the filtered document and the user may view the filtered document at each security level. Therefore, the user, before transmitting a secured email (or letter) may look at the source (FIG. 15), may look at the TS level without the redline strike out but with security labels and colors, may look at the T level revealing regions 996 and 994 but not regions 993 and 994 (which are TS coded regions), and look at U versions as shown in FIG. 17. Step 992*a* disperses the extracted data and the remainder data or disperses partial versions of the document (those partial versions formatted and containing only data at or above the target security level (all TS level data (which includes TS, S, C and U data), or all S data (comprising S, C and U) or all C data and U data)).

One feature of the present invention is that in step 979*a*, the security level protocol determines whether single words are granularly classified (TS, S, etc.) or whether a line is classified, or whether an entire paragraph is classified (see FIG. 16). If a commercial/privacy filter is used to exclude all social security numbers, the organizational protocol is set at a granular level to exclude just social security numbers. Different group protocols use algorithms to mark, filter and extract adjunctive security sensitive (or select content) words, characters, icons and data objects near the target security sensitive words, characters, icons and data objects. The sensitive words may be security sensitive (or select content) words, characters or data objects defined by compliance with law, regulation or policy, privacy, national, organizational or private security concerns. For example, Bin Laden is the target sensitive word in FIG. 16 and this classifies the entire paragraph as TS level. The other words in the paragraph are adjunctive word/objects.

Several steps are prudent to enable MS Office document protection. The first step is have a network guard (see FIG. 48) that filters all incoming and outgoing traffic for MS Office document files and quarantines them. Spam and virus filtering is necessary to preclude system, resource, and file exploits. URL filtering, quarantine lists, black lists, white lists represent the minimum responsible approach. Ingress files can harbor viruses, etc. Outgress files can harbor privileged information at any and all levels of the DOM. With a means to filter and check every node for purpose, content, metadata, formats, structure, comments, links, and so on, there is no other way to vet the integrity of the file.

Figure 53:
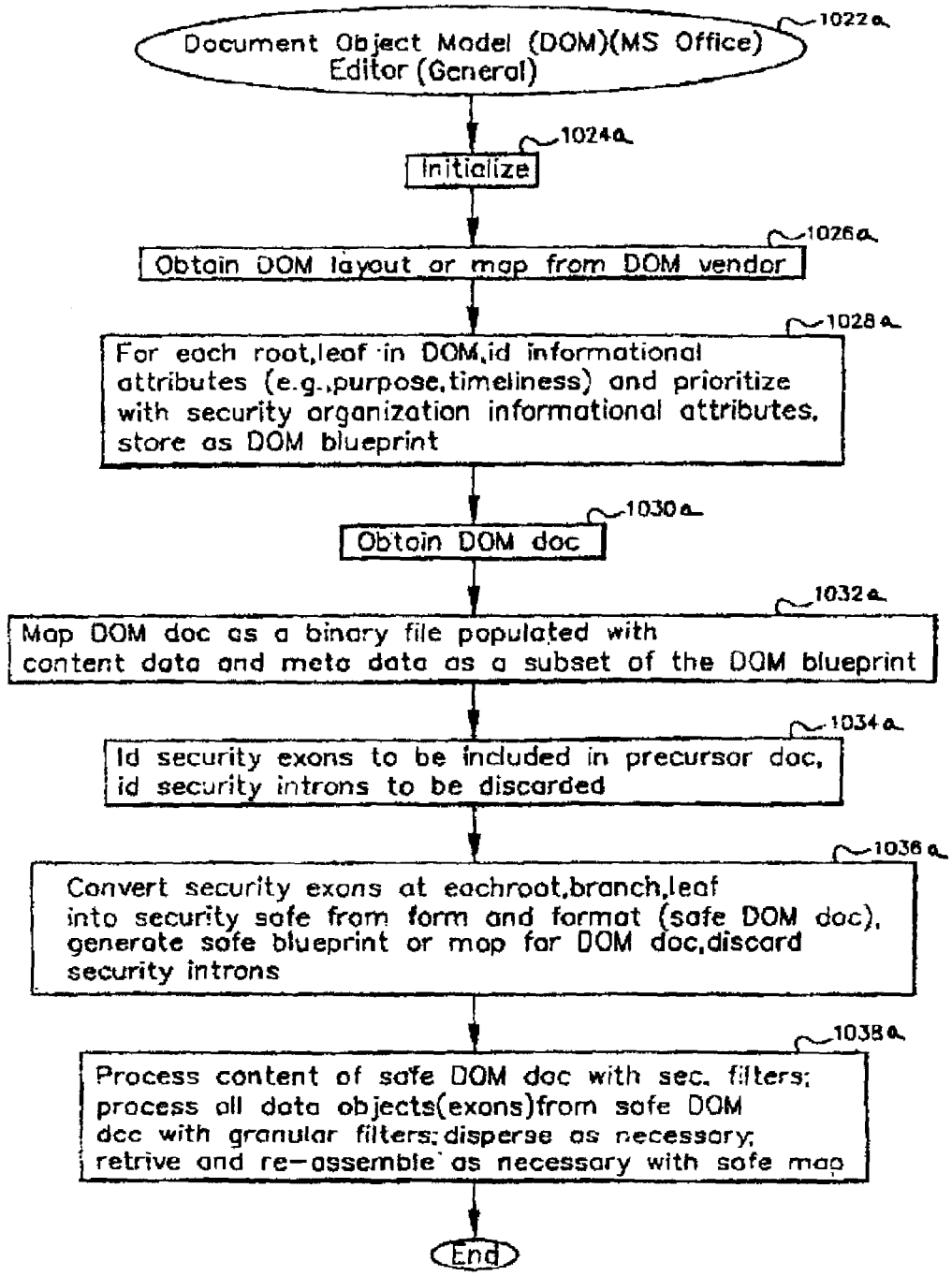
FIG. 53 diagrammatically illustrates a general flow chart for a comprehensive filter operable on a document DOM.

FIG. 53 shows the General DOM Editor program 1022*a* in a flow chart form. Step 1024*a* is the initialization that is employed by the security entity to set up the program. Step 1026*a* obtains the DOM layout or blueprint from the DOM vendor. Step 1028*a* notes that for each root, branch and leaf in the DOM, the information attributes must be prioritized with th the security organizational informational attributes. For example, the audio files of potential Bin Laden voice prints may be critical at TS and S levels but be completely excluded at C and U levels. Therefore, any audio files below C and U are security introns which are excluded or ignored.

Step 1030*a* obtains the source document DOM. Step 1032*a* maps the DOM source document as a binary file populated with content data and meta data as a subset of the DM blueprint. Step 1034*a* identifies security exons to be included in the further processing of the item and identifies security introns to be ignored or excluded in the processing. Step 1036*a* converts security exons at each root, branch and leaf int security safe form and format (for example, a safe DOM template), and generates a safe blueprint or map for the precursor DOM and discards all security introns. Step 1038*a* processes the content of the safe DOM with security filters discussed above. It also processes all data objects (exons) from the safe DOM with granular filters. Data is dispersed as necessary and retrieved and re-assembled as necessary with a safe map.

Figure 54:
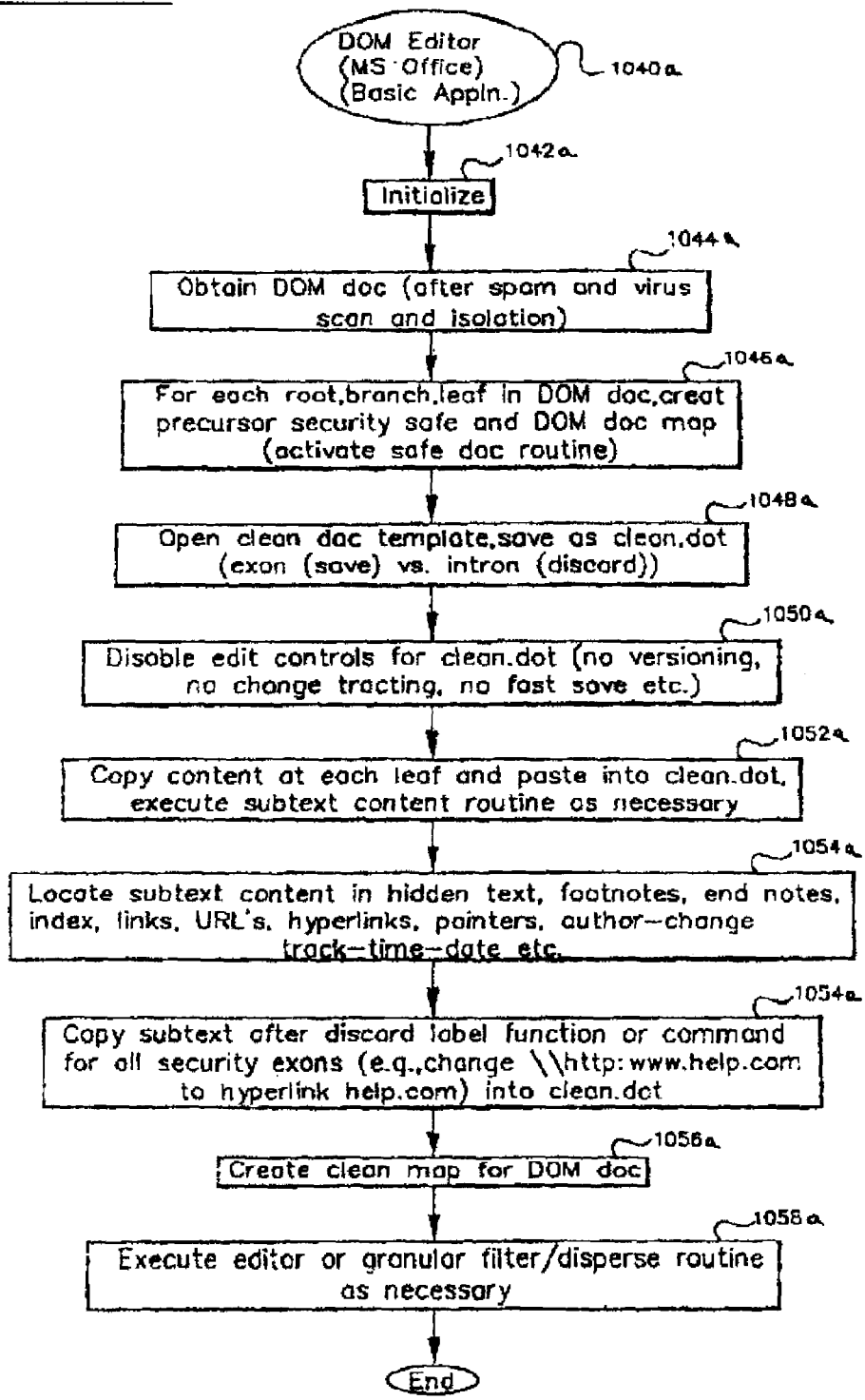
FIG. 54 diagrammatically illustrates a basic application of the comprehensive DOM editor.

FIG. 54 shows a flow chart of a basic application for a DOM Editor for MS Office document. Step 1042*a* initializes the system. Step 1044*a* obtains the source DOM document and notes that all processing occurs after a spam and virus filter. Step 1046*a* notes that the program creates or is provided with a security safe DOM document and map. Step 1048*a* notes that a template is opened. A clean DOT template (Word) or whatever the new document type is opened for the specific application. The Normal.DOT or New Spreadsheet.XLS on the MS Office distribution CD is safe. In Visio, for example, start with a new chart. Older documents saved as templates tend to accumulate unanticipated metadata. If one must use a non-standard template, clean it up. View it as both a printed document, as a binary file, and as a document object. Write protect the templates, or store the templates as non-modifiable networked volume. If the templates are used throughout the organization, create a network store for them and configure each user's installation of MS Office to look there for the templates. Search the network for duplicate copies of these templates and eliminate them.

Step 1050*a* disables edit controls and step 1053*a* copies content. The point is one must edit cleanly. This is not a single step but rather a process, both one time and ongoing. Disable versioning in step 1050*a* to prevent a buildup of past versions of the document. With versioning, prior sessions will be stored as document.doc 1, document.doc 2, and so on. These tend to get entwined with the latest version. If workflow with InfoPath, Outlook, or other collaborative workflow tools creates duplicate copies of the source document file for each user. Step 1050*a* includes the concept that the system is configured to store a single network copy instead. Preserve an audit trail and backup with a system backup rather than versioning. Disable change tracking in step 1050*a* to curtail the buildup of additions, deletions, and changes that transcend the publishing intent of the document. If redlining is necessary, establish guidelines for periodically accepting changes to purge change log. Use the command to save the document without the change log with File/Save or File/Save As. Do not use nor rely on fast saves, timed saves, or file recovery after a MS Office crash to purge the dirty metadata. After a crash, reopen the document, save the document under a new name. Close the Office application. Delete the old file precipitating the crash. Rename the new file under the old name. Reopen the Office application.

Step 1054*a* locates text in footnotes, hidden text, etc and either discards or ignores the subtext because those items are considered security introns or copies them into a safe DOM text form and disables functions, if necessary. Step 1056*a* notes that a clean map for the security cleared DOM document must be created. Step 1058*a* executes the editor or granular filter and dispersal routine as necessary. The distribution or push of partial security cleared versions of the text can be included in step 1058*a*.

D.2 Applications of the Secure and SC Data Systems

The secure data storage systems in Part B, combined with the search engine or KE engine in Part C can be deployed in various applications, some of which are described in this Part D.

D.3 Automatic Features

The system and method described herein may operate substantially automatically, that is, without operator intervention, other than the security clearance function. The clearance function does require some type of operator authentication prior to retrieval of the extracted and remainder data.

The system and the method may operate automatically in that the plaintext or originating data could be identified by a party desiring security. The system could obtain that data from any data input device (hard drive memory, floppy drive memory, flash card memory, personal data assistant (PDA), or any other type of data input device), filter the data, separate the extracted text or the remainder text, encrypt (or not encrypt) the data, separately store the extract and remainder data (all automatically, that is, without operator intervention). Hence, it is not necessary that the system operate with significant operator or manual intervention. Of course, the system may also operate on a plaintext document or data object that is being created "in real time" by an operator and keyboard, mouse or other type of data input device.

The automatic operation of the system and the method can be caused by a triggering event. This triggering event may be a security attack (generating a trigger to start the gathering of plaintext, filtering, extraction and storing) or may be any other type of trigger such as a building burglar alarm, door alarm, fire alarm, or virus detection algorithm trigger. The event may be a time of day, week or month. It may be n seconds after the user stops typing on a keyboard. It may be a timed back-up feature.

D.4 Multiple Security Levels

Multiple filters may be utilized in the system and in connection with the method. These multiple filters may be useful in the operation of the system with a plurality of security levels. Each filter could filter out different levels of security sensitive (or select content) items and each bundle or group of security sensitive items (from each distinct filter) could be stored at different computer storage locations. Multiple filters, multiple security levels and multiple storage areas may also include multiple encryption routines and decryption routines. Encryption and decryption routines can be related to the level of security of a particular group of data.

Multiple maps may also be provided for singular or multiple storage of extracted data and remainder data. These maps may or may not indicate the originating point of the data. Maps can be parsed such that an intruder, upon discovery of a single map or map portion, could not locate the storage locations of all piece of the extracted data and remainder data. Maps may also be encrypted. The map may also be stored at a distinct map store location.

The concept of partial reconstruction also includes the concept that a portion of the plaintext would be reconstructed and the unreconstructed portions of the plaintext could be encrypted or could show blanks or other symbolic indicators. See the placeholder table above. Partial reconstruction of the plaintext also includes a concept that the security sensitive (or select content) items or materials may be subject to different types of encryption. Hence, a single plaintext document may have multiple levels of security and multiple levels of encryption wherein each encryption has a different level of security assigned to it.

The present invention can also be configured to provide a computer network which transparently establishes and manages the separation of user-based communities of interest. The separation is accomplished by extraction pursuant to security levels, dispersion of data into secure storage facilities (memory stores) and reconstruction based upon the assigned security level. A low level security clearance results in only partial reconstruction of the plain text or source document. These user-based communities of interest are a plurality of users each having respective security clearances. As described above, each successively higher level of security clearance permits the user to see greater degrees of reconstructed plain text obtained from the extracted data stored in extract stores and the remainder data from the remainder stores. By integrating encryption (and necessarily decryption), separation of user-based communities of interest are established such that the users in a particular community are permitted access to some or all of the plain text data based cryptographically separated communities and need to know security levels.

Figure 30:
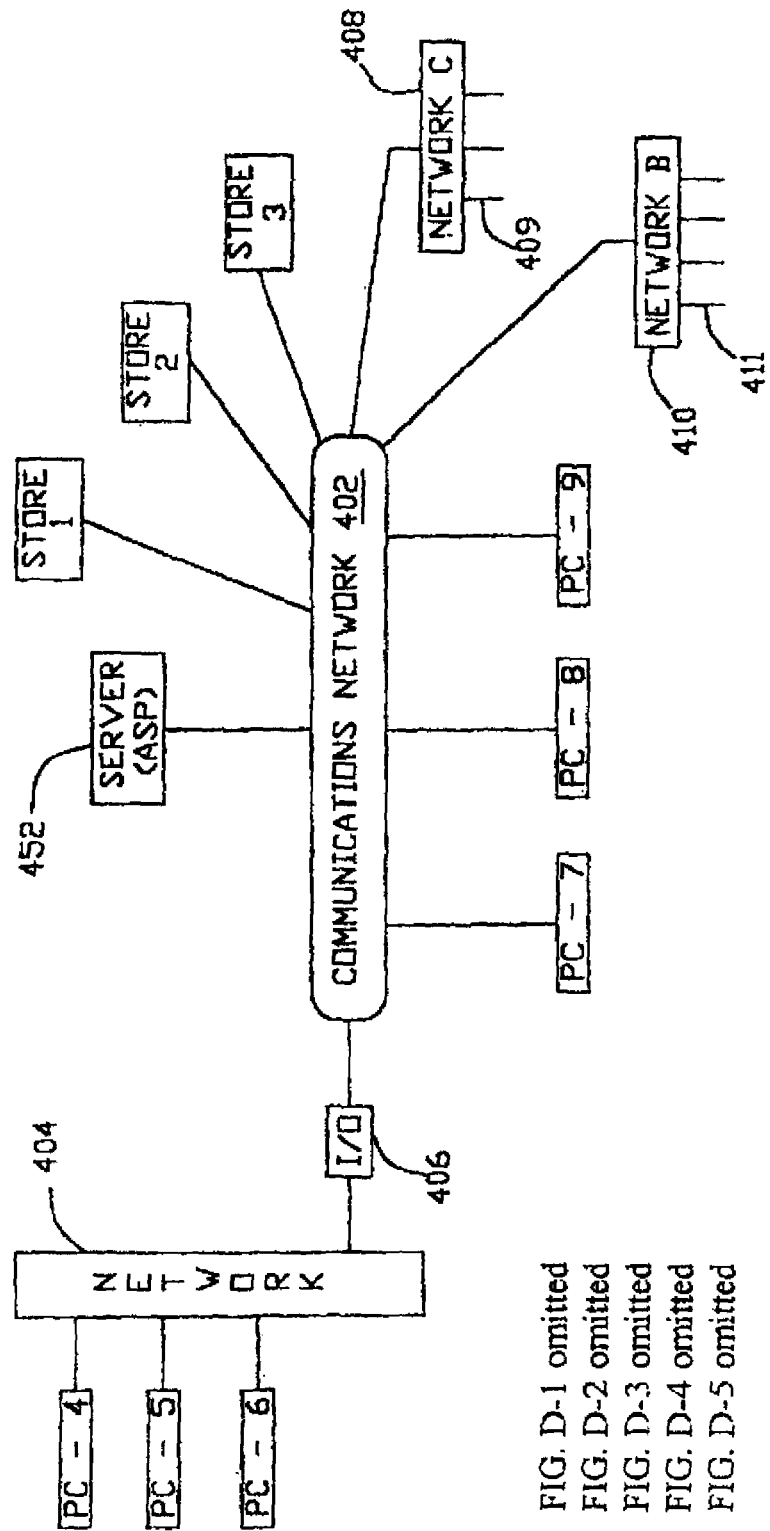
FIG. 30 is a computer network diagram showing various user communities.

FIG. 30 is an exemplary computer network diagram showing various user communities. It should be noted that select content SC data stores may be grouped for different portions of the same enterprise. Therefore, rather than have security groups as discussed herein, the system could provide SC interest groups in an enterprise. An "SC interest group" is the same as a security level group. The telecommunications network 402 is connected to the server application server provider ASP 452 and to various networks and personal computers or PCs. The PCs may be computer work stations. Network A 404 is coupled to telecommunications network 402 via an input/output unit 406. Network A is coupled to various PCs identified in FIG. 30 as PC-4, PC-5 and PC-6. Of course, Network A could be coupled to other PCs not illustrated in FIG. 30. As described earlier, server 452 can facilitate remote or offsite storage of extract data and remainder data in store 1, store 2 and/or store 3. Further, the map showing the storage location may be encrypted and stored in any one or more of these stores. Also as described earlier, the memory in one of the PCs, for example PC-4, PC-5 could be utilized to store extract data and remainder data from PC-6 and PC-6 can be configured as the input data computer. Hence, the present system and methodology encompasses the concept of local storage and remote storage. On the local level, the storage begins by storing the extract data at different locations in the hard drive of the PC. The next level higher is storing the extract data in removable computer media such as floppy disk, removable tape drives, CDs etc. associated with the PC accepting data or associated with a server on Network A. The next higher level of extract store is storage of the extract data on a server or other computer in a particular network. If PC-6 is designated as the input computer, the extract data may be stored on PC-4. Of course, PC-4 could be designated as the server for Network A.

PC-7, PC-8 and PC-9 are coupled to telecommunications network 402. Network C 408 and Network B 410 is coupled to communications network 402. The lines, one of which is line 409 extending from Network C 408, represent a plurality of computers or workstations coupled to Network C. Line 411 represents a plurality of workstations or computers coupled to Network B 410. In an e-mail implementation of one embodiment of the present invention, PC-7, PC-8, etc. may represent computerized devices accepting e-mail (personal data assistant, pager, cell phone, etc.). The sender and the e-mail addressee may utilize simple computerized systems to communicated via e-mail. Further, the network may be any telecommunications network including wire, cable, cellular, wireless, satellite, IR or RF systems.

Figure 31A:
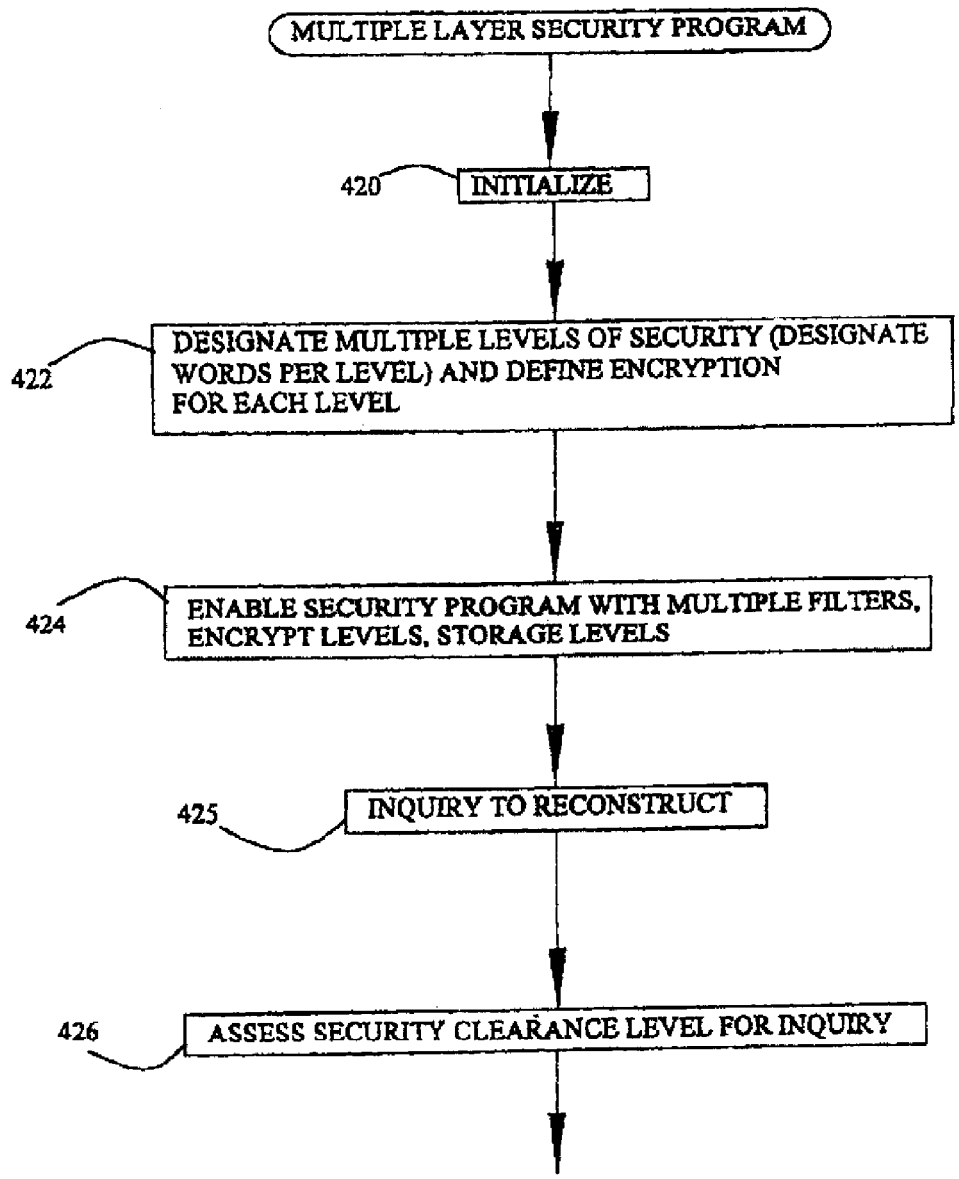

FIG. 31a diagrammatically illustrates a flow chart showing the key component steps for the multiple layer security program for the community of users. The "community of interest" system described herein enables persons and organizations at the same security level to share data on a peer to peer level. Further the security or SC system may operate automatically, with respect to extraction, storage and reconstruction, such that the peer to peer dissemination of data objects is quickly and readily available to all at the same or higher security levels. Step 420 initializes the program. Step 422 enables the user, administrator or system operator to designate multiple levels of security, that is, multiple words, characters, icon, data objects, or whatever, for each security level and further to define encryption for each security level. The designation step 422 also includes identifying the communities of interest and the particular security level and security clearance or SC level for each community of interest. One example of various security levels for communities is set forth below in the Community Security Level Table which is keyed to the computer network diagram of FIG. 30.

| Community Security Level Table | |
|---|---|
| Security level | Community Group |
| High | PC-7; PC-8 |
| Medium high | all high group plus Network B |
| Medium | all above plus Network A |
| Low | all with nominal clearance |
| Special set medium | PC-7; PC-9; Network B |

Further, designation step 422 will include identifying the words, phrases, icons or data objects subject to security or SC concerns and the potential location of the extract data and, if necessary the remainder data and the degree of encryption. The following Selection Table provides some examples.

| Selection Table | |
|---|---|
| Level of encryption/storage | type or category of word or phrase; input specific word, phrase |
| High, web-based storage | dollar values, names of streets, countries, "Smith" and 5 words about "Smith," "avocado" |
| Medium high, remote storage | all addresses, all names |
| Medium network storage | all family names, all client names |
| Low, encrypt and separate store in local memory | all items not in dictionary |

As an example of various encryption methodologies, the following Encryption Table is illustrative.

| Encryption Table |
|---|
| DES, random pad A ("r. pad A") |
| Huffman, r. pad B |
| Crypto API, r. pad 7 |
| Two fish, r. pad C-2 |
| Blowfish |
| RC4 |

| Encryption Table |
|---|
| Skipjack |
| Ghost |

In FIG. 31a, step 424 executes or enables the security program or SC levels with multiple filters, multiple encryption levels and multiple storage levels. Each one of these filters, encryption levels and storage levels correspond to the security level for the various communities of interest. Step 425 responds to an inquiry from a user to reconstruct the document. Step 426 accesses the user's security clearance and the particular inquiry. Decision 428 determines whether the inquiring party is entitled to full or partial access to the source document. If not, the NO branch is taken and the system, in step 429 adds placeholder substitutions. Step 429 may be optional. If YES, the system reconstruct pursuant to the clearance level in step 430. The following provides an example of multiple level encryption utilizing placeholder substitution.

Example

Multiple Level Encryption

Applicants must be _____ zzxx xx _____ xxx _____ _____ _____ citizens and have a high school diploma or equivalent. They must possess a valid subsubsub driver's license and qualify for top SUBWORD _____ clearance.

With this multiple level encryption, substitutions may be utilized "subword" to indicate to the user with a less than superior security level that a certain word, term or phrase has been extracted and stored by he or she is entitled to know that substitute word, term or phrase has been inserted into the plain text document. Of course, any type of substitution character may be used for the placeholder.

In step 432, the system displays the plain text in a normal format or utilizing a split or bifurcated video memory or utilizing overlay display screen. FIG. 7 and the description of that figure set forth above describes the normal display in steps 202, 204, the split video memory display in steps 206, 208, 210 and 212 and the overlay display system in steps 214, 216, 218.

The system, in step 434, monitors and logs the location of the user making the inquiry, the type of inquiry, the time, day, date, clearance level and access level and logs all modifications to the plain text source document. One example of the log is set forth below in the Security Report Table.

| Security Report Table |
|---|
| Privacy Scrubber Report |
|     source file: path\filename |
|     scrubbed file: path\filename-scrub |
|     source file: date, time, size |
|     process: date, time |
|     user: name |
|     system: name |
| Recovery File |
|     (a) storage location, type of encryption, random key |
|     (b) storage location B.... |
|     (c) store C ........ |
|     (d) store D ........ |

Step 436 enables the security program and parses and extracts the data per the security program, filters the data, extracts it and codes it disperses it and stores it as discussed above. The multiple layer security program ends in step 440.

The following Security Level Access Placeholder Table is another example of the type of placeholder substitutions that may be available. The example in the Security Table Access Placeholder Table may be used in conjunction with step 429.

| Security Level Access Placeholder Table |
|---|
| [security level 2] intelligence located [security level 4] 20 miles from [security level 4]. He is using the name [security level 4], and dressed as a [security level 4] preacher. With him are his lieutenants, [security level 4] and [security level 4]. He is communicating with the international media through Mr. [security level 4], who resides at [security level 3], [security level 4], [security level 4]. Telephone is [security level 1] and Facsimile is [security level 1]. |

It should be noted that in order to reconstruct some or all of the plain text source data, some or all of the subsets of extracted data from the extract stores will be utilized dependent upon the respective security level of the inquiring party or user.

D.5 Sharing Data with Different Security Levels—Data Mining

The present invention can be configured to overcome obstacles to intelligence sharing and data sharing between parties by enabling the parties to identify granular critical data and control the release the granular critical electronic data subject to a sharing arrangement with other parties. In some instances, the controlled release process is designed to implement an agreed upon plan to share secured data or SC data based upon arms length negotiations between the parties. The invention enables a party to release specific granular data such as a name, address, or date without releasing the entire "classified" document. In a commercial context, this is akin to data mining in that the inquiring party seeks limited data (not the entire data file, record or document) and is willing to pay for the "mined" data. As an example of a security intelligence system, a local police chief may release granular critical data about a suspect to a federal agency, when in return the federal authority will release further intelligence "mined" or obtained for the secured data storage, about the suspect. The controlled release of data from the higher security level party (the FBI) may be an intelligence document or a granular part of it (a partial reconstruction provided to the local police). The rational behind this implementation of the invention is that there are many obstacles for sharing intelligence and information. There are even many more hurdles when it comes to sharing of raw intelligence. The invention creates a leveled playing field in which the different parties must share and exchange information in order to achieve their objectives.

The invention can be configured to resolve the major challenges facing government by enabling sharing of information between its different organizations in relationship to fighting terrorism. The invention for example can enable organizations, connected to the Homeland Security Department, to search data bases of various other government, state and local organizations, eliminating the fear of the "source" organizations, owning or controlling the source or plaintext documents that their proprietary data or granular critical data is released without their specific permission. The invention enables open negotiations between the parties regarding what data to release and for what consideration. When several organizations are seeking access to a specific document, the invention and can allow a controlled release of different granular data to different parties for different considerations and benchmarks.

The invention's mechanism of controlled release of the located document/data enables other parties to search their documents without the fear that sensitive information will be released to the searching party. This invention is designed to foster sharing of documentation between different parties, taking into consideration the need to limit the access of other parties to the total content of the owner's document.

The invention is a machine and process and its purposes and advantages may be as follows: (a) To automatically control selection of data objects within a data stream and release them in a controlled method only to authorized parties. (b) To automatically separate data objects within a data stream into two or more digital data streams according to the importance and categorization of contents, through extraction and removal of the prioritized content and its replacement by appropriate placeholders. (c) To automatically control selected contents in E-mail, and enable its release in a controlled method only to authorized parties. (d) To enable users to leverage the growth in computer and telecommunications connectivity and electronic commerce by reducing security risks. (e) To enable users to release documents, digital files, and data streams into closed and opened digital networks with the confidence that important, identifying, and critical contents in that documents, digital files, and data streams is secure and will be seen only by authorized parties. (f) To enable real time simultaneous customization and personalization of selected contents within a data stream to different parties, allowing instant display of the selected content or part of it based on, and tailored made to the status of the user or receiving party. (g) To secure the important and critical contents of a document or digital file by transporting said contents into a separated data stream and removing said data stream to a removed storage memory, while eradicating any copies, temporary caches, or traces of the removed extracts on the original computer or machine. (h) To enable instant return transfer to the display or to another display all or part of extracted content instantly with verification of authorized user. (i) To create a projection of the original document, digital file, data objects within a data stream, or variations of it through combined projection of the splinted data streams, while maintaining separation between the data streams. (j) To create an alternative method for security, instead of encryption, which is secure, cost effective, less time-consuming, and flexible. (k) To enable automatic timed removal of specific content items, automatically or manually selected from a document, digital file, or data objects within a data stream. (l) To enable an automatic timed reconstruction (reconstitution) of the said document, digital file, or data objects within a data stream.

Another object of this invention is as a system and method for automatically creating customized and personalized versions of a document, data object, or data stream. In real time, simultaneous versions of the original are created and altered, then disseminated based on the status of the different users and their access privileges. The system and method enables content management and control by automatically locating content items prioritized by importance, transporting them to a secure memory, and releasing them under explicit controls or preset rules.

Another object of the invention is as a system and method for control, analysis and management of important and prioritized information within documents, files, data object, and data streams. The system and method, enables the processing of all data objects at the time in which they are created or imported into the system. The early stage processing, enables early stage inventorying of prioritized contents as well as early stage pattern recognition. Extracting critical information, such as credit card numbers, last names, first names, social security numbers, phones numbers, transaction dollar amounts and addresses, enables the system and method to aggregate data in categories and analyze the data in different optional methodologies including pattern recognition.

Another object of the invention is as a system and method for comprehensive monitoring of various activities including business activities in real time. With this level of detail, the system and method becomes a management information tool and information/data command and control center. The said system and method can include an alert system, which in effect creates a real time apparatus for command and control of the systems activities. In real time, and at any point in time, the user can get a comprehensive view of different activities including: (a) How many transactions are being processed, their content, their context, identity of the involved parties identity, their profiles, and the personnel involved. (b) How much money is being transacted. (c) When, in terms of dates, relevant to the transaction. (d) Where, in terms of geographical location, the transactions are taking place. (e) Where, in terms of geographical location, monies or goods are being transferred. (f) Which departments in the organization are involved.

D.6 Multilevel Security through Sanitization with Reconstruction of Sanitized Content A multilevel security (MLS) or SC level technology secures the targeted, filtered content with extraction and dispersal to storage, bypassing the use of classification labels, in order to achieve stronger security of the source document or data or better understanding of the SC material. During the process of developing security or SC technologies for defending critical infrastructure, it was discovered that the business model was too complex and there was a need to redefine and create new systems and methods for doing business. As a result, one aspect of the present invention provides a system and codifies methods and business processes to automatically identify, extract, store critical data (as an input security system) and permit reconstruction of critical data only in the presence of certain security clearances (as the output of the security system) or as established by the SC policy release rules.

The invention is a method and process to establish a stronger multilevel security (or MLS) architecture and product, than is currently available. The invention introduces multilevel security through sanitization of critical content of a source or plaintext document (or data object) with the unique ability to reconstruct all or part of the original document in conformance to the classification level of the user. A user with top classification may view the entire document, while a user with a lower level classification will view a sanitized document, tailor made automatically for his clearance level. The invention secures the targeted filtered content of a document, file, or data stream, through extraction and dispersal to storage, bypassing the common use of classification labels in order to achieve stronger security. The invention enables secure document storage and secure message transfers between users and networks with different security classification levels while protecting the information on a need to know basis.

Currently multilevel security MLS systems are using multiple PCs for each user, and using physically separate systems for processing data at each classification level. The inventive system, in several embodiments, eliminates the need for the use of multiple computers. All the documents in the user's PC are automatically secured with a granular classification process generally described above with identification of special security data, extraction from the source document or data object, and then separate storage of the security data. The classified granular content is dispersed to different secure, distributed storage locations. The classification level of a user will determine his right and ability to access and release the stored critical extracted content from the various storage locations for reconstruction. A user with top classification will view the entire document, while a user with a lower level classification will view a sanitized document, tailor made automatically for his clearance level.

Types of government security levels are: Top Secret (TS); Secret (S); Confidential (C); and Unclassified (UC). Business identifies security levels as: Restricted to Management (R, for example, attorney-client privilege); Proprietary (P); Sensitive (S); and Public (P). These MLS security levels may be supplemented with "need to know" classification labels, organizational limits (Army, Navy, DoD) and time limits. Prior art security systems identified each file with: owner, size, date and time of creation and security attributes. The Bell Lapadula (BPL) security model uses concepts such as domination of the MLS security level over both a process and the subject (a data object). Some examples of various processes are read, execute, overwrite, append, write, kill (delete), etc. Some examples of process rules under the BPL model are: NRU—No Read Up (a lower security level cannot read a document at a higher security level); NWD—No Write Down (a higher level cannot write down to a lower MLS level).

The invention herein does not use the "classification labels" of the prior art. Instead it creates a situation in which the user gets access rights to specific distributed storage locations based upon his MLS level, each access right can be classified with a different classification level. With respect to the editor described later herein, security labels (for example ("e.g."), TS, S, C and UC labels) are added or inserted into the filtered but not disassembled document. As explained later, the insertion of these SL labels conforms the current inventive system to the prior art methodology and protocol. However, the current inventive system does not use the SL labels for processing purposes. The current system uses a granular or filter approach to make secure the sensitive data in a particular document. SC labels, matching the relevancy of the SC data may be employed rather than security level tags.

Figure 32:
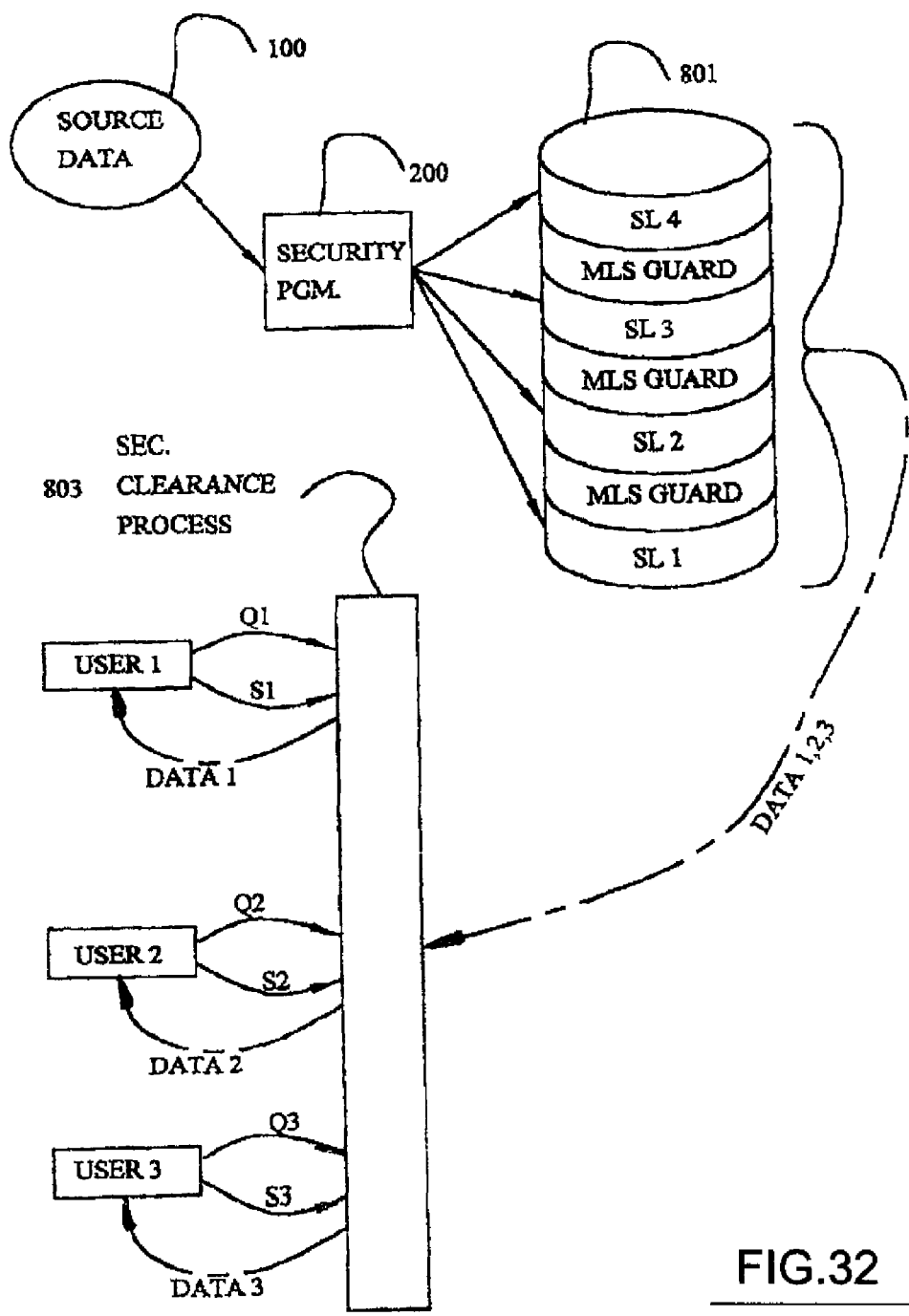
FIG. 32 diagrammatically illustrates a multiple level security system accessed by users having different security clearances (which also represents a data mining system and operation).

FIG. 32 diagrammatically illustrates a multiple level security system accessed by users having different security clearances (which also represents a data mining system and operation). A MLS SC data system uses different SC policy rules permitting access to different SC levels of interest. Source data 100 passes through security program 200. Critical, important data objects or elements are extracted and dispersed into storage 801. In the illustrated embodiment, storage 801 has four security levels SL1-SL4, level SL4 being the most secure data requiring the highest security clearance. Levels SL1-SL4 may refer to SC relevancy levels or organizational levels. Between each level is an MLS or multiple level security guard. The guard (physical or software configured) limits transfer of data objects there between. Upon a request or inquiry from user 1, 2 or 3, each having a security clearance s1, s2 or s3, respectively, the query or request for access to data Q1, Q2, or Q3 is sent to security clearance process 803. The process 803 detects and confirms the user's clearance level and passes a cleared query to storage 801. Cleared data (an entire document/data object or a portion thereof or simply one secured data (i.e., a name)), is sent as Data 1, 2 or 3 to clearance process 803. If clearance is still valid, data 1, 2 or 3 is sent to the respective user.

FIG. 32 can be a data mining system in that the user is permitted to mine the "cleared" data from storage 801. Data mining may be a monetary charge associated with the clearance function in process 803.

In a secured system, the documents in the user's PC may be in "declassified" to his security level 99.9% of the time. The "declassified" or available documents are reconstituted through a controlled release of the critical data from storage, and re-classified only when the user presents his identification and his classification level is being verified. Reclassification is automatic at the user's PC. The result is that the user's PC or workstation can operate in classified and unclassified modes. It is unclassified when the documents are declassified and when the documents are reconstituted the user is working in a classified mode.

The invention introduces a new paradigm whereby computers that are classified as secret or top secret, in actuality will contain 99.9% of the time declassified documents. This capability strengthens substantially the security of such classified systems.

The invention can resolve the major challenges facing government in enabling sharing of information between its different organizations in relationship to conducting military operations as well as fighting terrorism. The invention for example can enable organizations connected to the Department of Defense (DOD) or the Homeland Security Department to search into data bases of various other government, state and local organizations, eliminating the fear of the organizations owning the documents that their proprietary data or granular critical data would be released without their specific permission. The invention's mechanism of controlled release of the located document/data enables other parties to search their documents without the fear that sensitive information will be released to the searching party. This invention is designed to foster sharing of documentation between different parties, taking into consideration the need to limit the access of other parties to the total content of the owner's document. The invention enables overcoming the obstacles of existing multiple level security MLS systems by enabling sharing of sensitive data, and granular data between parties in a much more flexible way which also enables much greater access to information not enabled by the current MLS systems. The invention includes a controlled release mechanism for release of data in conformance to benchmarks, which can include submitting of access identification, the giving of consideration, submitting of other information, etc.

The invention creates better collaboration between users and organizations based on a better flow of information. It enables better efficiency enabling easier communication between users and networks with different levels of classification while maintaining the highest levels of security. The invention enables a much better management of documents in storage and in transport including e-mail. The invention introduces automation to the sanitization process and an automatic reconstruction process. The automation will avoid human error both intentionally as well as unintentionally. The automation will enable a substantial reduction in costs, furthermore the ability to create a multilevel security environment in one PC or workstation will save costs of purchasing operating and maintaining multiple machines as is the current practice.

The challenge of many organizations is in getting mission critical and time sensitive information speedily to the users who need it. In many cases the needed non-classified or low-level classified information is stored in systems but is not provided to the user who needs it, because the information is in documents which are highly classified. This creates situations in which users are unable to access information, which they need to accomplish their tasks, because of a technological classification barrier. This over classification of information results in hampering critical tasks and activities, as well as creating system redundancies inefficiencies. The DoD Department of Defense) multiple level security (MLS) was based upon the Bell-Lapadula (BPL) Model. Many believe that the BLP security model is superior to other models. The Bell-Lapadula Model and the existing MLS uses labels to classify users and subject matter. A professional attacker will use his efforts to change or damage the labels in-order to compromise the machines secured information.

The architecture or the present invention extracts and physically separates data whereby content is being recognized not by labels by automatically based on the semantic content of the plaintext. In some embodiments of the present invention, labels are added to the granular, filtered document to conform to known organizational protocols. These labels are displayed but not used by the system in processing.

In the DoD's MLS, data of multiple security levels are processed and transferred by the system, which separates the varying security levels and controls access to the data. In the prior art MLS system, some applications process only one level of data at a time, (for example, when a user edits a document with a word processing tool, the data in the document are treated as if they were a single level, the classification of the document itself). Other applications treat individual data elements at their actual levels. For example, a word processor enforces paragraph and page MLS classification labels, or an MLS data base brings together data elements of different security levels to allow an analyst a multilevel view of the information.

The vulnerabilities of MLS: The components in the MLS system contain the data in their memories and disks, and the data could be compromised if adequate physical security is not maintained. An attacker who gets access to the system might be able to locate the data or its copies. MLS guards control the flow of information across security boundaries. These MLS guards are known. One concern with the Bell-Lapadula Model and the existing MLS is the use of labels to classify users and subject matter. A professional attacker will use all his efforts to change or damage the labels in-order to compromise the machines secured information. The invention introduces an architecture whereby content is being recognized not by labels by automatically based on the semantic contents of the plain text. The invention sanitizes and enables reconstitution upon valid authentication. It is the only architecture and system which enables both sanitization and reconstitution according to user's verified access identification. The conventional way of classifying documents with high classification (TS), limits the low level clearance users (C) from accessing substantially unclassified information "granular data" which is in the classified document. Furthermore, the invention enables maximum sharing of unclassified information which lies dormant in classified documents. Top security-secret information is dispersed to distributed storage in many locations. The invention is designed to avoid any one point of failure. The theory behind the architecture is the creation of substantial lines of defense in depth. The attacker will need to break through many obstacles before accessing all the dispersed data of the document. Additional levels of security are provided with multi-type encryption. The system and process introduces the capability to encrypt different parts of a document with different types of encryption. Multi type encryption creates a major barrier to an attacker. Should he wish to break the encryption, he would need many super computers. Should the attacker look for implementation mistakes, even if he finds few, he will still not get access to the total plain text. The inventive system provides flexibility. The system and process delivers flexibility to accommodate changing circumstances. By controlling the level of the granularity, the user can boost the level of security according to changing circumstances. For example, if a competitor becomes a partner the user enables him access to more storage locations, by changing the matrix.

The system and process integrates the Internet for dispersal and hiding of contents. If a party needs more information it could be released granularly. There is no need to release the whole secret document. The system and process does not use labeling but rather extracts the critical to storage (bu the system may label sensitive text to conform to known protocols). The system avoids situations, in which, attackers may manipulate the labels or the labeling system. Furthermore, the release of information is based on changing circumstances (time, location-GPS, event).

The invention is a machine and process and its purposes and advantages may be as follows: (a) To automatically control selection of data objects within a data stream and release them in a controlled method only to authorized parties. (b) To automatically separate data objects within a data stream into two or more digital data streams according to the importance and categorization of contents, through extraction and removal of the prioritized content and its replacement by appropriate placeholders. (c) To automatically control selected contents in E-mail, and enable its release in a controlled method only to authorized parties. (d) To enable users to leverage the growth in computer and telecommunications connectivity and electronic commerce by reducing security risks. (e) To enable users to release documents, digital files, and data streams into closed and opened digital networks with the confidence that important, identifying, and critical contents in that documents, digital files, and data streams is secure and will be seen only by authorized parties. (f) To enable real time simultaneous customization and personalization of selected contents within a data stream to different parties, allowing instant display of the selected content or part of it based on, and tailored made to the status of the user or receiving party. (g) To secure the important and critical contents of a document or digital file by transporting said contents into a separated data stream and removing said data stream to a removed storage memory, while eradicating any copies, temporary caches, or traces of the removed extracts on the original computer or machine. (h) To enable instant return transfer to the display or to another display all or part of extracted content instantly with verification of authorized user. (i) To create a projection of the original document, digital file, data objects within a data stream, or variations of it through combined projection of the splinted data streams, while maintaining separation between the data streams. (j) To create an alternative method for security, instead of encryption, which is secure, cost effective, less time-consuming, and flexible. (k) To enable automatic timed removal of specific content items, automatically or manually selected from a document, digital file, or data objects within a data stream. (l) To enable an automatic timed reconstruction (reconstitution) of the said document, digital file, or data objects within a data stream.

The invention differs from the current implementations of multilevel security MLS systems based on the Bell-Lapadula Model, and the prior art use of labels to classify users and subject matter. A professional attacker will use all his efforts to change or damage the labels in-order to compromise the machines secured information. The present invention introduces an architecture whereby content is being recognized not by labels by automatically based on the semantic contents of the plain text. The invention enables overcoming the obstacles of existing multiple level security systems by enabling sharing of sensitive data, and granular data between parties in a much more flexible way which also enables much greater access to information not enabled by the current MLS systems. The invention includes a controlled release mechanism for release of data in conformance to benchmarks, which can include submitting of access identification, the giving of consideration, submitting of other information, etc. The invention creates better collaboration between users and organizations based on a better flow of information. It enables better efficiency enabling easier communication between users and networks with different levels of classification while maintaining the highest levels of security. The invention enables a much better management of documents in storage and in transport including e-mail. The invention introduces automation to the sanitization process and an automatic reconstruction process. The automation will avoid human error both intentionally as well as unintentionally. The automation will enable a substantial reduction in costs, furthermore the ability to create a multilevel security environment in one PC or workstation will save costs of purchasing operating and maintaining multiple machines as is the current practice.

D.7 Multiple Independent Levels of Security (MILS)

Figure 48:
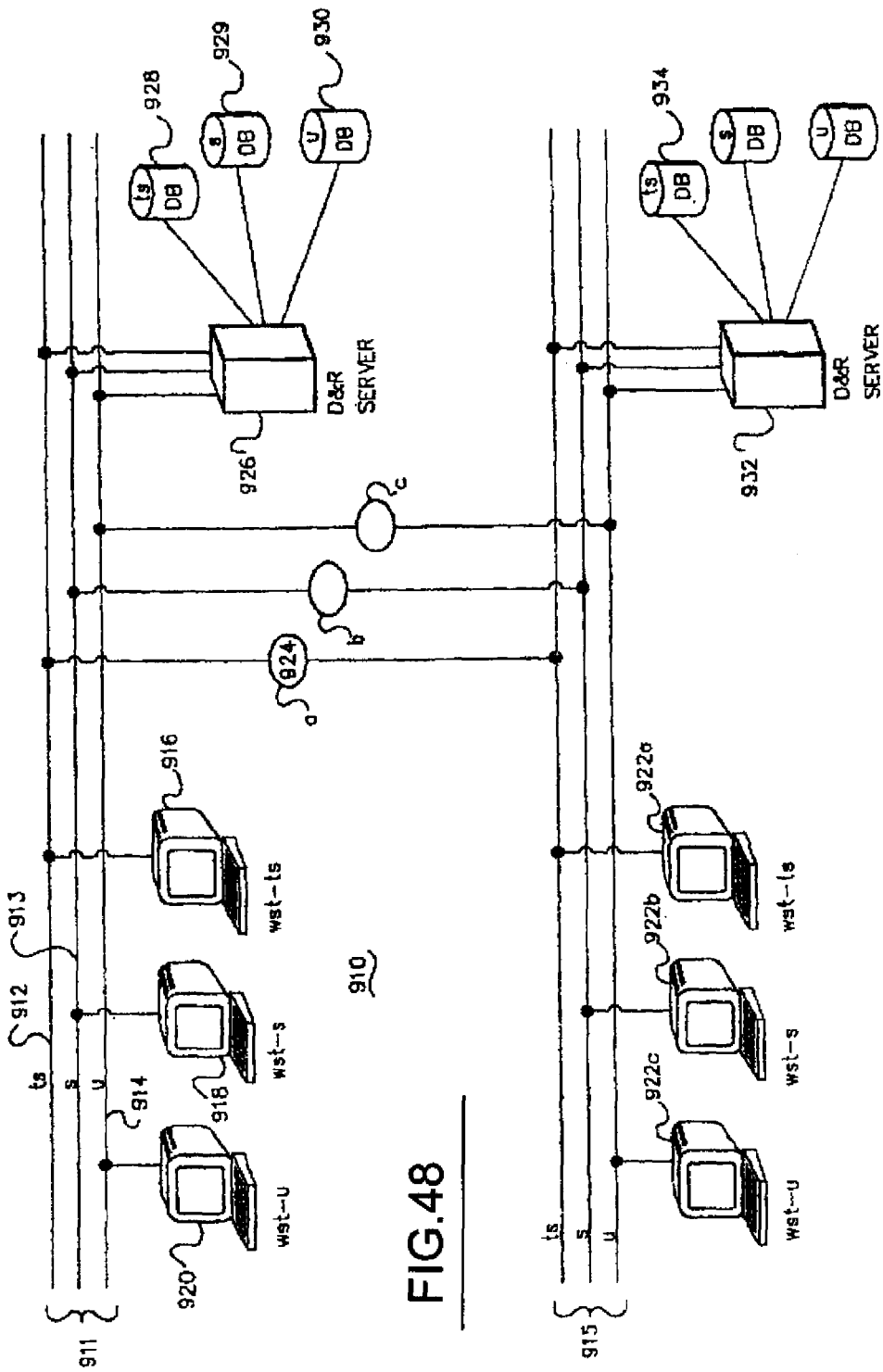
FIG. 48 diagrammatically illustrates a MILS or multiple independent levels of security computer network with three (3) sub-networks at security levels top secret TS, secret S, and unclassified U.
Figure 49:
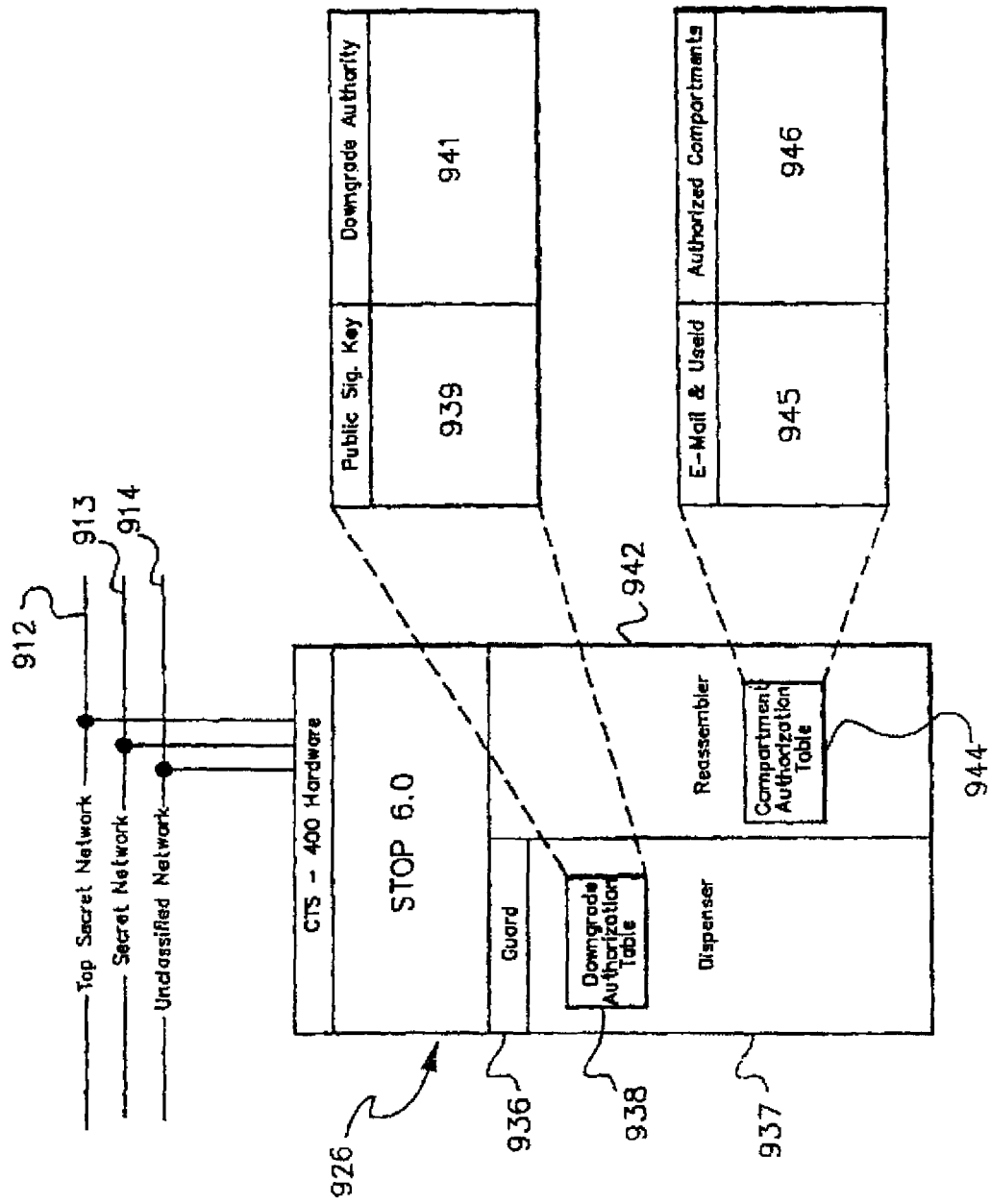
FIG. 49 diagrammatically illustrates a security guard computer useful in the network of FIG. 48.
Figure 50:
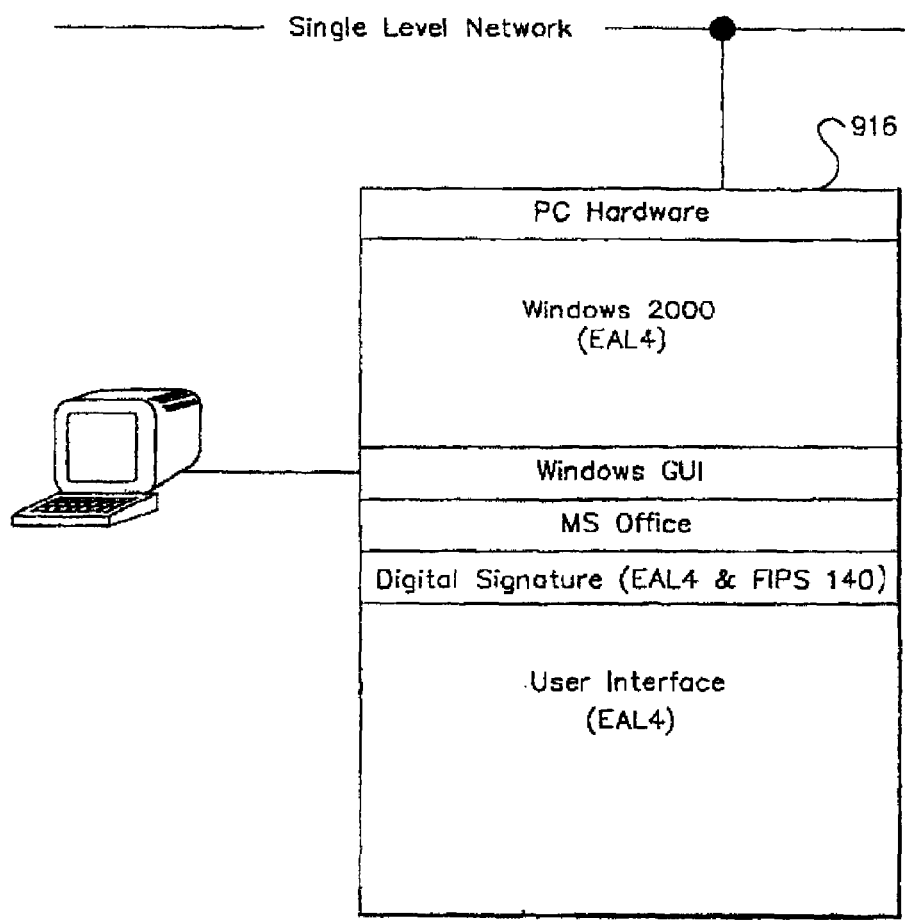
FIG. 50 diagrammatically illustrates a workstation useful in the MILS network.

FIGS. 48, 49 and 50 diagrammatically illustrate a computer system configured as a multiple independent levels of security (MILS) system. Although the general operation and layout of the MILS system is well known, the incorporation of the inventive system, that is, granular filtration, extraction and re-assembly is unique to the inventive system. In the following MILS system 910, the dispersion and retrieval operation of the present application is discussed using, as an example, one of the most common environments for protecting classified data, that is, Multiple Independent Levels of Sensitivity (MILS). The MLS system, discussed in connection with security levels, can be implemented with SC based upon either relevancy or based upon enterprise units who have permission (policy rights) to access the SC data.

As is known in a MILS configuration, each level (TS—top secret; S—secret, U—unclassified) of classified data is isolated from other levels by confining it to set of components dedicated to a single classification level. Data labels are not used within the system, since its components are Commercial-Off-The-Shelf (COTS) products that are not able to handle data labels. The level of the system TS, S or U (top secret, secret or unclassified) establishes an implied sensitivity label. Data is explicitly labeled only in guards 926, 932 (the Dispersal and Re-assembly guard computers) and other MLS devices that connect the MWS system to systems at other sensitivity levels, that connect the TS system to the S system and to the U system. Data transfer between levels is accomplished manually (sneaker net), or through a few, high assurance and closely protected MLS devices, such as guards, digital diodes, etc. A user with the authority to access multiple levels of data is required to use a separate set of interface equipment to access each MILS system. In some cases, keyboard-video-mouse (KVM) switches are permitted.

FIG. 48 shows an implementation of the present invention in a MILS environment. Two similarly configured domains 911,915 are shown (upper region consisting of sub-networks 912,913 and 914 and lower network 915), presumably under different administrative control. Each domain has three networks, one for each of three classification levels. Each network includes a plurality of workstations (only one station being shown in the figure), a Dispersion and Reassembly (D&R) server 926,932, (a MLS device connected to all networks), and database servers TS, S and U data servers (928, 929 and 930 in the upper domain and 934 in the lower domain) to support the D&R server's proxy document server functionality.

The user interface components of the present invention reside on the user workstations W St-U (920), W St-S (918) and W St-TS (916). Dispersion and reassembly functionality is hosted in the D&R servers 926, 932. Digital signatures (encryption) protects the integrity of user data between the user interface at 916, 918, 920 and the D&R server 926. Encryption provides a level of discretionary access controls that prevents disclosure in cases where others have the appropriate clearance ut lack the formal "need to know" level to view the classified information.

The present example discusses an e-mail and a file server to help clarify its operation in a MILS environment. The system may be configured to handle other documents, images, etc. In the e-mail example, a Top Secret user 916 will prepare a multi-level message and send it to a Secret user 922b, and the recipient 922b will only be able to read the "Secret Level" and below parts. In the file server example, a Top Secret user 916 will prepare a multi-level document and post it to a file server, then a Secret user 922b will retrieve it, getting only the Secret and below parts. These are both downgrading examples. Movement of data within a level and to higher level conforms to existing security rules, for example, Bell-LaPadulla rules.

The path an e-mail message takes from a Top Secret workstation 916 in one domain 911 to a Secret workstation 922b in the other domain 915. It would work similarly if both sender and receiver were in the same domain; the local D&R server 926 would perform the functions of both D&R servers 926, 932 in this example. The D&R server 926 hosts an e-mail server that is customized to perform D&R functions, as described below.

An e-mail originator on a Top Secret workstation 916 composes an e-mail using MS Outlook. Originator marks sections of the message with TS, S, and U levels (explained herein), and the system on workstation 916 compartment tags the email document using a combination of the automatic features described earlier and manual tagging (user based), as allowed by the security policy of the accrediting organization. Originator 916 digitally signs and sends the message to the mail server on the D&R system 926.

The Disperser component of the D&R mail server 926 verifies that the originator 916, identified by e-mail address and authenticated by the digital signature key, has the authority to downgrade messages to the requested levels. The Disperser within Server 926 separates the message according to the originator's tags. The Disperser writes the message sections tagged higher than Unclassified to the Secret and Top Secret servers 929, 928. The unclassified part becomes the base message map stored in server 930 and contains pointers to the higher-level components. The pointers map the reassembly path when the document is fully or partially reassembled. This base message map is the only step in the process that requires downgrading. A guard 926 is used to provide increased assurance that the downgrading is done correctly (see FIG. 49, guard 936). The originator's identity is provided to the guard as part of the downgrade credentials. The Disperser forwards the base message and message map, to the D&R e-mail server 932 of the addressee, using its Top Secret network path c. Other paths 924a, b and c link the same security levels in either domain. Using the TS path prevents downgrading if the target server 932 is not a D&R server. Alternately, the D&R servers 926, 932 could authenticate each other before transferring messages.

The target D&R e-mail server 932 determines the clearance of the addressee 922b from its network address and looks up the addressee's compartment authorization in its own tables. It then removes links from the base message and map to all message components that are not dominated by the addressee (as defined by Bell-LaPadula). The target D&R e-mail server 932 then retrieves the data for the remaining message components from S database server 929 via guard server 926, constructs or re-assembles the message that the addressee is cleared to read (secret level, not top secret level), and places the message in the addressee's inbox 922b that is at the security level of the highest component in the message. These steps are executed for each addressee. The addressees 922b connect to their local D&R e-mail servers 932 and download unread e-mail.

A similar method is used for document serving, such as would be used for file service, web service, ftp service, etc. The document creators tag their documents, sign them digitally, and post them to a D&R file server 926,932, which is actually a proxy using storage in the database servers 928, 929, 930, 934, and others not numbered. The server 926, 932 disperses the message components to its database servers on the MILS networks.

The following describes the path a document takes from its creation (or modification) in a Top Secret workstation 922a in one domain 915 to a reader on a Secret workstation 918 in another domain 911. The D&R server 932 hosts file servers that are customized to perform D&R functions, as described. The document posting process follows: A document is created on a Top Secret workstation 922a using MS Word, Excel, etc. The originator 922a marks sections of the document with TS, S, and U, and compartment tags using a combination of automatic and manual tagging features, as allowed by the organization's security policy. Originator at 922a digitally signs and sends the document to the file server on the D&R system 932.

The Disperser component of the D&R file server 932 verifies that the originator 922a, identified by the digital signature, has the authority to downgrade documents to the requested levels. The Disperser in server 932 separates the document according to the originator's tags, creating a base document at the lowest tagged level (U-Db or S-Db) that contains pointers to the more classified components (TS-Db 934). The base document is encrypted using an algorithm appropriate to its level. The Disperser writes the document sections to the file servers (U-Db or S-Db or TS-Db 934) according to their tags. This is the only place in the system where downgrading is performed. A guard 932 is in the downgrade path to provide additional assurance that data is not leaked. The user identity derived from the originator's 922a digital signature on the tagged message will be provided to the guard 932 as part of the downgrade credentials. The disperser places references to the document in the directory of each file server 932,926 for which a version of the document can be built (e.g., if there is no unclassified data in the document, a reference to the document will not be placed in the unclassified directory).

The document retrieval process follows. A user on a workstation 916 logs onto its local D&R proxy document server 926. The strength of user authentication is application specific and determined during system accreditation. The user 916 locates a document and requests that it be downloaded for reading, specifying a requested sensitivity level and compartment. The Re-assembler component of the D&R server 926 loads and decrypts the base document. The Re-assembler in server 926 verifies that the requestor 916 dominates the requested security level and compartment, based on the level of the network over which the request was received and the contents of its compartment authorization table. The Re-assembler in server 926 constructs the document to the authorized security and compartment level. The Re-assembler provides the document to the requester. The re-assembly function does not violate Bell-LaPadula and does not require downgrade authority.

D.8 MLS Server and Workstation Components

FIGS. 49 and 50 diagrammatically illustrate the server and workstation. FIG. 49 shows the D&R Server 926 hosted on a DigitalNet CTS-400 system, which is currently evaluated. It consists of the CTX-400 hardware and the STOP 6.0 operating system. The disperser part 937 of the D&R server 926 has the most security critical functions, since it must move data contrary to the Bell-LaPadula security policy. It maintains a table of user downgrade authorizations 938 keyed by the originator's public digital signature key 939 and downgrade authority 941. A guard 936 is also included, which may employ a version of automated tagging system of the present invention to identify sensitive data. The double check of the security label tag for each part of the message/document provided by the guard 936 is particularly important since the downgrade labels are applied in a single-level system.

The re-assembly side (in re-assembler 942) requires no policy violation, but requires its own table of user compartment authorizations 944 because the MILS systems do not have the ability to label data. The table 944 is keyed by e-mail address (for e-mail routing) or user identity 945 from the user authentication process (for file service). Authorized compartments 946 are coupled to email user id 945.

The components of the user workstations are shown in FIG. 50. A MILS workstation 916 is a single-level component, that is, it is coupled to a single security level network. The user interface will in some cases be installed on existing workstations 916 and in other cases new workstations procured for this use. The workstations include an operating system Windows 2000, a graphical user interface Windows GUI, WS Office as a document processor, digital signature system rated at EAL 4 and a rated user interface.

D.9 Flexibility of the Present MLS Approach

The late-binding techniques or retrieval and reassembly features used in the present invention is a compelling feature, because it provides solutions to some of the most significant problems of sharing data in modern warfare and international coalition operations. A single comprehensive document can include data sensitive to many different environments, yet by tagging its components correctly, maximally useful versions can be provided to readers with widely different authorizations, and without having to identify them all ahead of time.

For example, in a coalition environment, countries or classes of countries, or agencies within countries can be assigned non-hierarchical and hierarchical labels and then a single document, suitably tagged, can be securely distributed to all of them using a properly configured and administrated infrastructure of the present invention.

In the presently configured MILS embodiment, the tagging protocol is, at a minimum, confirmed by the guard in the D&R servers. In prior art systems, only the guard tags documents. In the presently configured system, the thin client applications program on the workstation tags the document segments but the guard confirms this preliminary tagging. One feature which seems to be important in certain security systems is that the re-assembly map be cleaned or scrubbed to match the then current security level where the map is stored. This theory, carried forward, would include the concept that the re-assembly map, stored in each version of the secured document, only point to the next level storage location. Hence, if all portions TS extracts, S extracts, C (classified) extracts and U (remainder) document are dispersed into, for example TS 928, S 929, C (not shown) and U 930, then the document in U 930 only includes a pointer to the location of C extracts and the C extracts only includes a pointer to the S extracts and the S extracts includes only a pointer to the TS extract location. The downgrade discussed above refers to the location of the higher secured extract.

D.10 Multiple Extraction Filters and Application Outline

There is a need to construct filters which supplement the initial list or compilation of security sensitive (sec-con) or select content (SC) words, characters, icons and data objects (herein "word/objects"). The need arises either due to the fact that the initial security or SC word/object list is incomplete, or that the author of the initial list is concerned that the list is too limited or in order to defeat a attack or an inference engine "reverse engineering" the sanitized document and ascertaining not only the filter (a type of code) but also the sensitive word/object removed from the source document. Further, the incorporation of a filter generator enhances the current user friendliness of the program. In its current embodiment, the program is configured as an editor to screen and sanitize a source document. The user selects, at his option, functional aspects which include: compliance with laws (an application of a type of filter, e.g. HIPAA, GLB, Oxley-Sarbanes, EU privacy, executive orders); privacy (another type of filter which excludes, for example, social security numbers, see also, EU policy); search for and supplement filter; pay per view (which enables the user to buy missing sensitive information (for commercial purposes); survival (which creates a distributed and dispersed copy of the user's document and other stored documents and items using predetermined storage facilities); security (which triggers the various security routine discussed herein); and storing (which permits the user to select which of the several storage options the extracted sensitive or SC data/objects should be employed in the dispersal.

Figure 51:
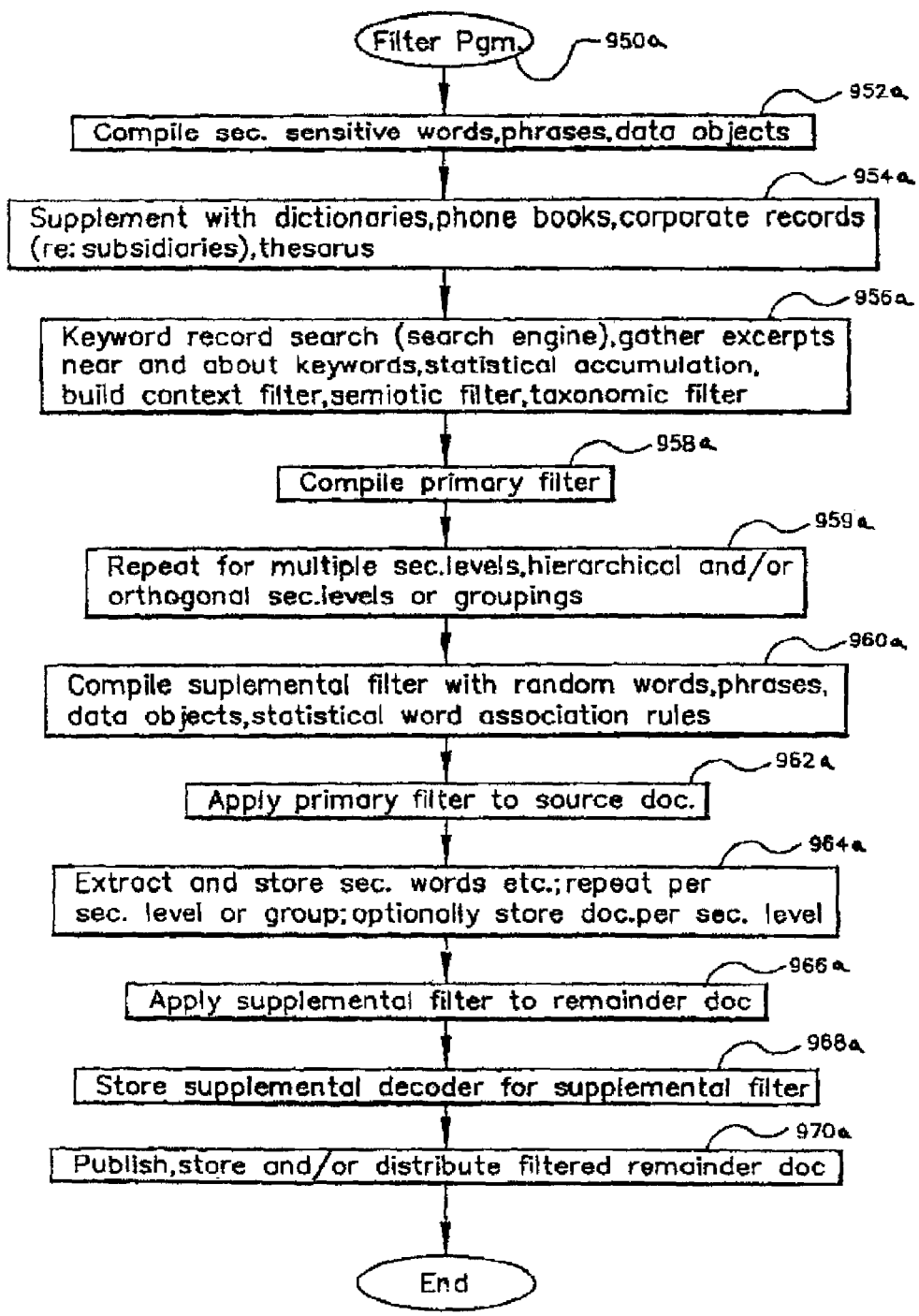
FIG. 51 diagrammatically illustrates a filter program flow chart.

The filter routine diagrammatically illustrated in FIG. 51 is useful in compiling a filter which separates both the sensitive word/objects and contextual and semiotic and taxonomic aspects of the initial list of security sensitive (or select content) word/objects. The filter works in conjunction with a compilation of data, typically located on a network which could be private or public. In low level security or SC situations, the filter may access Internet databases to gather additional data for the filter. In more secure or SC systems, the filter could access a secure or SC data base (one located at the same security level as the user) and build or compile the additional word/objects. The filter program 950a in FIG. 51 begins with step 952a which compiles the initial list of security sensitive (or select content) word/objects. In 954a, the initial list is supplemented with dictionaries, phone books, corporate records (to obtain subsidiary data and trade names) and thesaurus data. Each of these represent different compilations of data and the added data is added to the initial list of sensitive word/objects. In 956a, a search is conducted on a network, usually through a search engine, to gather excerpts near and abut the keywords. These keywords are the initial sensitive word/objects. Statistical algorithms are applied to gather non-common word/objects which are associate with the keywords as found in the additional data compilations. The goal of the adaptive filter is to obtain contextual, semiotic and taxonomic words, characters or data objects from the compilation of additional data related to the security sensitive (or select content) words, characters or data objects. Semiotic is a general philosophical theory of signs and symbols (read language and words and objects) that especially deals with their function. Semiotics include syntactics, semantics and pragmatics. Syntactics is the formal relationship between signs. Semantics is the meaning of signs and pragmatics is the relationship between signs and their users, such as the relationship of sentences to their environment. Taxonomy is the scientific classification and categorization of items. Therefore as an example, a search through the Internet on Google search engine under "Bin Laden" may show a number of uncommon (non-dictionary words) within 200 words of the target "Bin Laden." This search string would gather documents form the Google search and copy 200 words on either side of "Bin Laden" and then extract only non-dictionary words into a supplemental list. This type of filter algorithm looks for contextual matters close or near to the target. The search is semiotic and statistical in nature. Additionally, the initial supplemental list would identify the Bin Laden is an arab and this classification (a taxonomic aspect) can be used to expand the list for the filter. The algorithm may include a simple command to gather all 10 words on either side of Bin Laden. This is a pure contextual search and the "10 word" aspect is a statistical number. From the supplemental list, all pronouns, prepositions and conjunctions may be eliminated. Spiders or robots may be used in the gathering of the contextual and semiotic filter data. The contextual, semiotic and taxonomic words, characters or data objects from the compilation of additional data is all related to the initial list of security sensitive (or select content) words, characters or data objects.

Step 958a compiles the adaptive filter. The above noted contextual, semiotic and taxonomic filter is adaptive since it can be used to expand (and potentially contract or reduce) and adapt an existing list of sensitive word/objects to a larger list which better protects the source document and inhibits the operation of an inference engine. Step 959a repeats the filter gathering and compilation for various levels of security. Higher security may require a broader search (1000 uncommon words near Bin Laden and add all Arabic and sub-Asian continent cities). Orthogonal security groups (those groups having the same level, e.g. S Secret, with each other but being different organizations, e.g, Department of Defense compared to the FBI) often have different methods to keep data secret between compartments.

The adaptive filter can be set to automatically gather additive sensitive word/objects. The system, with a basic filter, may identify a sensitive word in a paragraph being scanned by the initial filter. This sensitive word may be a special word in the existing filter or may be a non-common word not found in the initial filter. The adaptive filter system may then obtain this "unknown" or "special" word, and conduct a search through a compilation or data base of additional words, etc. Any new word/objects falling within the contextual, semiotic and taxonomic words, characters or data objects from the compilation of additional data (database) related to said security sensitive (or select content) words, characters or data objects are then added to the filter. The expanded filter is then used to screen the source document.

Step 960a compiles a supplemental filter with random words, phrases, etc. in order to further defeat an inference engine reverse engineering assault on the secured and sanitized document. In some sense, the production and use of a random filter is an encryption technique since the resultant filtered product, in order to be understood by others, must be reverse filtered or decrypted to reveal the document at the appropriate security level. Nonsense words may be added to this supplemental filter. Step 962a applies the primary filter (with the security word/objects and the additive word/objects from the contextual et al. filter) to the source document. Step 964a extracts the sensitive word/objects per security level. It is noted that several filters are used, on one for each security level, whether hierarchical or orthogonal. The extracted word/objects are stored or th partially extracted document per security level is stored in the corresponding security cleared data base or storage. Step 966a applies the supplemental filter to the remainder or lowest classified document. Step 968a stores the supplemental random filter to permit the low level user to decrypt the document. Step 970a publishes, distributes or pushes the document to others having a need to know. The pointer to the location of the supplemental filter decoder is encrypted and stored in the filtered remainder document. This permits the low level person to decode the remainder document.

D.11 Multiple Security Features for Data

Figure 40:
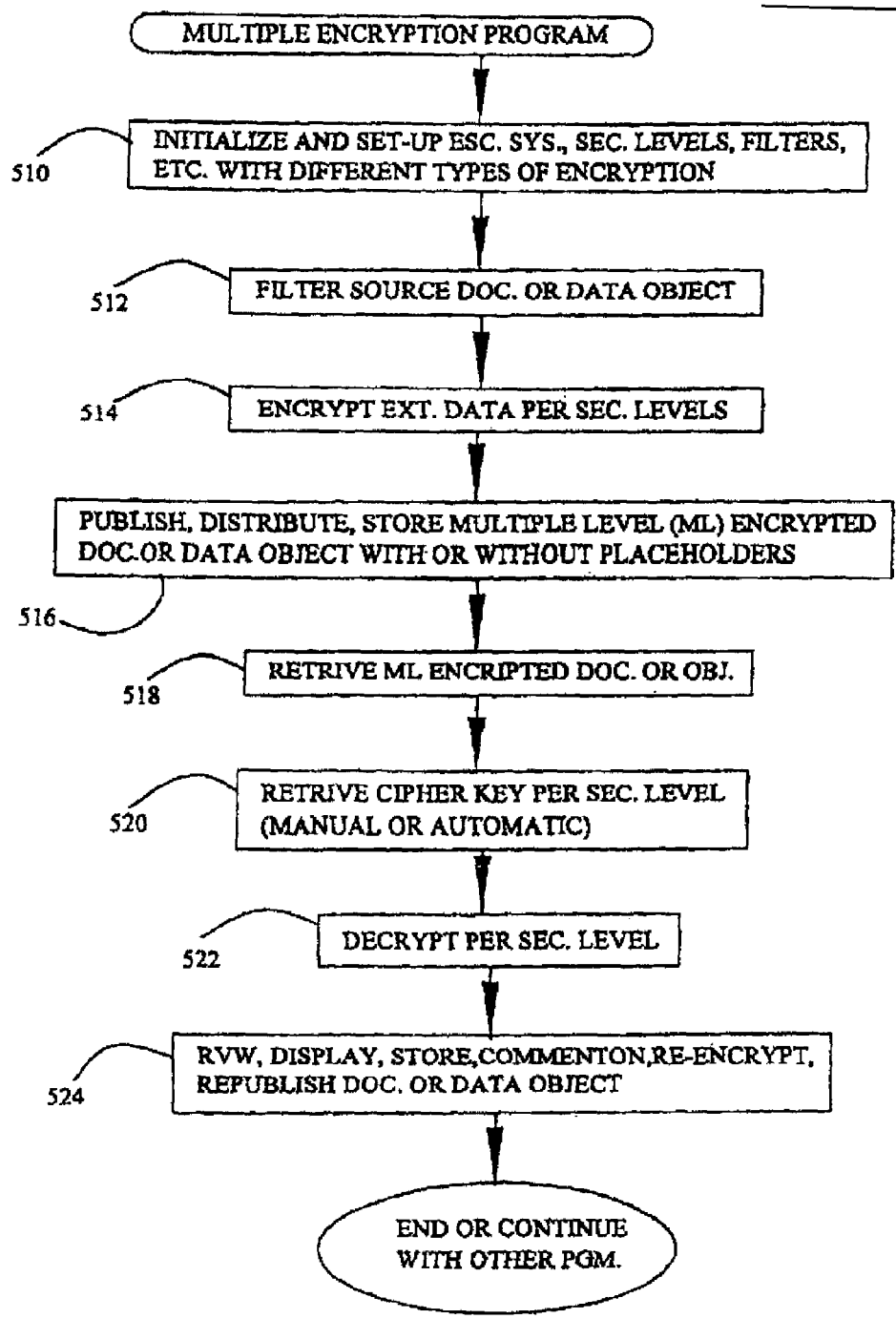
FIG. 40 diagrammatically illustrates a flowchart showing the key components of a multiple encryption program using multiple types of encryption in one document or data object. Encryption may include data compression and/or expansion or parsing techniques.

FIG. 40 diagrammatically illustrates a flowchart showing the key components of a multiple encryption program using multiple types of encryption in one document or data object. Multiple levels, types or modes of encryption are utilized in the same document or data object to enable securing data and transparently managing the separation of user-based communities of interest based upon crypto-graphically separated, need to know security levels. These security levels are associated with a plurality of encryption types or with different cipher keys using the same encryption. An example of a multiple level encrypted document is shown above in the Multiple Level Encryption sample. Different levels or modes or types of encryption are listed in the Encryption Table above.

Step 510 in FIG. 40 initializes the system by organizing different security levels with different encryption types and cipher keys. Also, the program sets filters to create the multiple encryption or ML document or data object. Step 512 filters the document or data object. Step 514 encrypts the extracted data for each security level. These steps 510, 512 and 514 utilize many of the routines discussed above in connection with FIGS. 9 and 31a, steps 232, 234, 236, 238, 240, 422 and 424. Step 516 recognizes that the secured document or data object may be stored for later use (with associated multiple decryption), published, distributed, or otherwise utilized to achieve the primary purpose of the document, i.e., to communicate information or to safely store security critical information. Step 518 permits the user, with the proper security clearance to retrieve the document or data object. Step 520 illustrates that the user must retrieve his or her cipher key to decode all or a portion of the ML encrypted document or data object. This step may be manual which engages the user to into certain codes or may be automatic such that the user's computer automatically, without operator input, decodes all or part of the document or data object. Step 522 decrypts the document pursuant to the user's security clearance. Step 524 recognizes that the user may review, re-publish, store, comment on, re-encrypt or otherwise deal and handle the full or partially decoded document or data object. The program ends or otherwise continues with other programs set forth herein. It should be noted that storage of the extracted data may be included in the flow path of the program in FIG. 40 is necessary.

Figure 41:
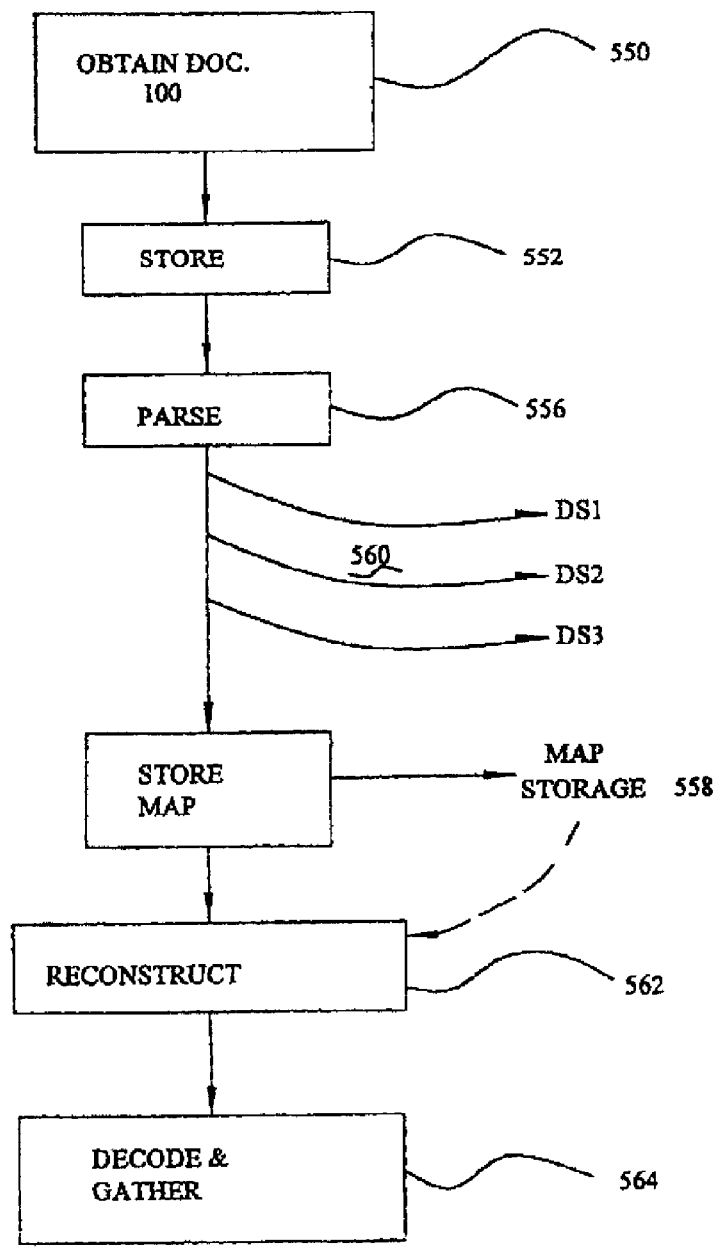
FIG. 41 diagrammatically illustrates a chart showing the key components of the parsing, dispersion, multiple storage and reconstruction (under security clearance) of data.

FIG. 41 diagrammatically illustrates a chart showing the key components of the parsing, dispersion, multiple storage and reconstruction (under security clearance) of data. Document or data object 100, in function element 550, is created or obtained by the input computer device. The document is stored in a normal manner in customary data store 552. A parsing algorithm function 554 is utilized in parsing step 556. The parsing algorithm, as stated earlier, targets the plain text document or data object 100 and splits, cuts and segments (that is, parses) the document by bit count, word, word count, page, line count, paragraph count, any identifiable document or icon characteristic, or other identifiable feature such as capital letters, italics, underline, etc. Hence, the parsed document 100 constitutes at least remainder data and data which is extracted or parsed or segmented out. A plurality of data extracts may be obtained. The parsed data (which is both the extract data and remainder data) is then dispersed into storage facilities data store DS 1, 2, 3, 4, etc. Preferably, the parsed documents are encrypted as shown by "e" in FIG. 41. In order to facilitate the potential reconstitution of document 100, a map is stored in a map storage 558. Hence, the dispersement 560 largely spreads out or distributes the parsed document 100 to a plurality of memories in the distributed computer system. These memories may be removable memory devices (floppy disc, removable tape drive, CDs) or may be more fixed devices such as hard drives, Internet storage facilities, etc. Preferably, the map is also encrypted.

Reconstruction step 562 enables a person with the appropriate security to obtain the map from map storage 558, decode the map, gather the dispersed, parsed segments of document 100 and compile the document. This is noted in function 564.

Since the original document 100 is stored in a customary manner in data storage 552, the parsed document stored in multiple data storage units DS1-DS4 provides a unique backup for document 100. The algorithm can employ many different mathematical constructions but is, in the current embodiment, primarily based upon one or more of a bit count, a word, a word count, a page count, a line count, a paragraph count, and identifiable document characteristic, and identifiable word characteristic, and identifiable icon characteristic and identifiable data object characteristic, capital letters, italics, and underline found in the plaintext document or data object. Further, the parsing algorithm can generate different security levels wherein parsed segments are stored at different storage facilities having various degrees of security clearance. This establishes a hierarchy of data storage units and corresponding degrees of security clearances. The parsing algorithm may identify unique words or strings of data, i.e., credit card numbers. The hierarchy of security clearances may involve first a password, second a biometric confirmation such as a voice match and a third highly unique biometric characteristic such as a fingerprint or retinal scan. The parsing system enables a large distribution of data in a secured environment. In this manner, if the original data object 100 at customary data storage 552 is destroyed, a person with an appropriate security clearance can reconstitute the original data document 100 due to the secured parsing and dispersal of document 100 through data storage units DS1-DS4 and map storage 558. The parsing may occur on a granular level. In particular, the parsing may occur on a financial document in electronic form.

Financial Document Table

Startcode; Abel, Robert, NMI; 100567; TRANSFER803; To8900586943; FROM3897622891; $700.00; end code In the Financial Document Table, the start code and end code is typically represented by a digital code unique to the communications channel, the name on the account has no middle initial (NMI and the various words "transfer 803" and "to 8900586943" and the words "from" and "$" are represented by predefined numeric or alpha numeric codes. The electronic financial document complies with an established protocol. In any event, financial documents are often times transmitted through electronic communications and telecommunications channels. The present invention, in one embodiment, enables a higher level of security by parsing the financial document or data stream. Further, a higher level of security may be employed by extracting identified text or characters and storing the extracted text as discussed above in connection with FIGS. 4, 5 and 6.

To some extent, the present system can also be utilized for key management and encryption systems.

In a broad sense, the parsing methodology disclosed herein is not based upon the separation of critical versus non-critical or classified versus non-classified security information. The primary focus of the parsing methodology is (1) automatic transparent parsing of data content into granular data groups which are thereafter dispersed to different storage locations in order to maintain a very high level of security with or without encryption; (2) dispersal of the segmented data to different storage locations each which, potentially, demand additional identification or security clearance prior to the release of the stored segmented data, including, possibly, the creation of a digital bureaucracy, in order to hinder or circumvent digital attacks on the plaintext document or data object; (3) proposing and implementing a system wherein the user has a very basic appliance since most of the user's data is stored both locally (customary data storage 552; FIG. 41) and parsed and stored in a distributed system (DS1-DS4) and wherein an important asset is the map stored in map location 558; (4) enabling an institutional system to parse highly confidential information and extract the same in granular form and disperse the same throughout the Internet or other storage locations with or without encryption without compromising the document's security privacy and integrity.

The process involves parsing the documents or content into granular data groups and optionally creating small groups of data wherein the data segments cannot be recognized even to the level of providing 2-4 data objects in each file; dispersing the granular data groups into different storage locations; creation of a map of dispersal to the different storage locations (wherein the map is secured and encrypted and stored); and reconstructing the documents or data content. The reconstruction utilizes the map of dispersed and distributed storage and requires the presentation of security clearances such as passwords, biometric information and/or physical identifiers for access at the storage level and potentially at all the other data storage sites. The data is compartmentalized through distributed storage and sometimes requires separate security clearance. This need for presenting additional security clearance at different storage locations (DS1-DS4) creates a digital bureaucratic process which enhances the security level of the entire system. The selection and extraction of data and dispersal of that data to select storage locations can be established under different criteria. For example, one level of criteria extracts last name, address and social security numbers. Another criteria extracts every other line, every third word, etc. The parsing algorithm can utilize random selection or systematic selection as long as the parsing algorithm is documented and utilized in reconstruct step 562. The parsing algorithm may be stored with map and map store 558 or may be stored separately. An additional feature, as discussed above, involves utilizing place holders or adding substitute content to the remainder data of the parsed document 100. The use of place holders and substitute content may be thought of as an algorithm for the parsing. By using place holders and substitute data, private or highly confidential data is masked insuring privacy, security, and confidentiality. The ability to parse the information and/or extract security information is important for financial transactions. The transactions which require account numbers (see Financial Document Table above) are useless without the account numbers. The security of the account numbers, whether identified and extracted or severely parsed and segmented, stored and reconstituted under security clearances, is enhanced by the present system.

To achieve a very high level of security, the system can optionally incorporate a two-man key system. The system automatically separates the selected data stream into one or more data groups and extracts one or more of these data groups and disperses them into data storage DS1-DS4. To release the extracted data groups and/or critical content, the reconstruct step 562 may require two persons submitting identification credentials or security clearances. This two-man key method is a further protection against identity theft and insider attacks. The two-men key system can be implemented on a regular basis or on an emergency basis when there is need for a higher level of security.

Financial documents sometimes include substantial amounts of numerical data such as financial projections, balance sheets, electronic funds transfer messages, etc. It should be noted that the extraction may be based upon a particular item such a digit and a nine digit number representing money or may be parsed automatically based upon some parsing facility. Of course, the financial document may also be viewed as a data stream with delimiters ";" separating fields in the data stream. The parsing algorithm may work on the data in each field as well as different fields in the entire data stream.

Most storage facility systems require a map in order to reconstruct the original plaintext document 100. The map may be encrypted and may require a secret key sharing scheme for access thereto. Further, the map may be a physical map (a printout) or may be stored on a removable data storage medium, rather than be an electronic representation. In some instances, a map is not necessary. For example, if the security data or the parsed or segmented data were automatically stored on a floppy disc, the originator of plaintext document 100 could move the floppy disc from the computer system thereby physically safeguarding the security data or the segmented, parsed data. Without the disc, another person or the originator of plaintext document 100 could not reconstitute the document. The originator may deliver the floppy disc to another in order to permit reconstitution. The same is true regarding removable tapes and CD-ROMs.

Advantages of the present parsing system, methodology and program, include the ability to connect to unsecured networks without adversely affecting the overall security of the plaintext document 100; less dependence on existing security system including fire walls; the reduction of the requirement to keep daily updates regarding vulnerabilities of the computer system originating plaintext document 100; the security of plaintext document 100 is not dependent upon the number of access points into the network or number of users located on the network originating plaintext document 100; there is no damage to the parsed and stored backup version of plaintext document 100 if new security systems are installed wrong or misconfigured and there is no damage if system administrators turn OFF the existing security systems or improperly install or operate the security systems.

The parsing system can operate as a main security operation or an emergency backup system or as a customary backup system. The plaintext source document or data object may be preserved with or without encryption, or destroyed as a further data security step. The parsing and dispersement of data protects plaintext document 100 and insures the survivability of plaintext document 100 if the system originating plaintext document 100 comes under significant electronic or physical attack. That is, if customary data storage 552 is destroyed electronically or physically, the survivability of data in the plaintext document 100 is established by the present system. The storage of granular data groups most likely would defeat any attempt to view the entire content of plaintext document 100. Only verified user users with a confirmed security clearances or identifications verified at reconstruct step 562 and in data storage sites DS1-DS4 are permitted to reconstruct plaintext document 100. Further, the parsing of the system can be triggered based upon an electronic attack, an electronic hack or a physical environmental detection scheme. This system immediately protects of the critical data plaintext document 100 with a transparent, automatic parsing, dispersal and storage system.

It should be noted that various aspects of the methodology and program described above in connection with FIGS. 4 through 9 and 30 through 40 can be incorporated into the parsing methodology and program in order to enhance or modify the system.

D.12 Adaptive Data Security—Event Responsive System

The present invention can also be configured as an adaptive security program which adapts and adjusts the security provisions based upon intrusion into a particular network or attempts to electronically attack or hack into that network or successful hack events. Programs are available to track electronic attacks or hacking attempts. One of these programs is manufactured by Cisco and identified as the Cisco Intrusion Detection System (IDS). The Cisco IDS system can work on a server or on PCs in a network. The Cisco IDS is an electronic intrusion detector, or an electronic attack detector or a hacking monitor. The hack or attack monitor is software loaded into a designated computer.

The output of the electronic attack or hacking monitor loaded into PC 142 (FIG. 6) for example, or loaded into PC-6 acting as a server for Network A 404 in FIG. 30, generates a plurality of attack warnings. The attack warnings progressively and incrementally indicate the severity and degree of intrusion and hacking attacks directed to the computer system. The following Security Level Table illustrates an example of various responses to increasing levels of attacks. These increasing security responses include engaging the filter and extracting critical data and storing it locally; the next level involves storing the critical data on removable storage media; the next higher level involves offsite storage of all security data; the subsequent security alert results in multiple offsite storage for multiple levels of security or critical data and the highest level involves offsite storage of both common data (remainder data) and security data. Of course, other combinations responsive to the hack attack may be provided. The electronic attack monitor may use artificial intelligence AI to (a) assess the severity of the attack, (b) plan an appropriate "secure data" response, (c) select the degree of filter, extraction and/or encryption, and (d) locate secure extract data storage sites. AI or inference machines can ascertain (a) traffic on communications channels, both intra and inter network, (b) storage limit issues, (c) transmission failures in the communications links, and (d) the degree of security necessitated by exterior events, i.e., terrorism alerts, virus alerts, war, data security warnings posted by trusted sources, MicroSoft, Norton, NASA, DoD, CDC, FBI, etc. Higher security alerts trigger the AI security monitor to heighten the security level (or to decrease that security level in view of a reduction or withdrawal of an electronic attack). Aspects of AI systems, inference engines and neural networks are discussed above in conjunction with the AI configured filter. These AI aspects can be utilized with an AI configured security sensor.

| Security Level Table |
|---|
| Attack (low threat level) Level One |
|     engage filter |
|     local storage - disk drive |
|     encrypt map |
| Attack (moderate threat level) Level Two |
|     same as Level One but use removable storage media (local) |
| Attack (nominal attack) Level Three |
|     Engage higher level filter |
|     Off site storage, single storage for all security data |
| Attack (moderate attack) Level Four |
|     Multiple off site storage, multiple levels of security data |
| Attack (severe attack) Level Five |
|     Off site storage both common data and security data |

Hence, the filtering of data is based upon respective ones of the plurality of attack or hack warnings and the extraction of data and degree of extraction is dependent upon respective ones of the plurality of attack—hack warnings. Storage of the extracted data and the remainder data is also based upon the degree of attack which is reflected in the attack—hack warning issued by the monitor.

Figure 33A:
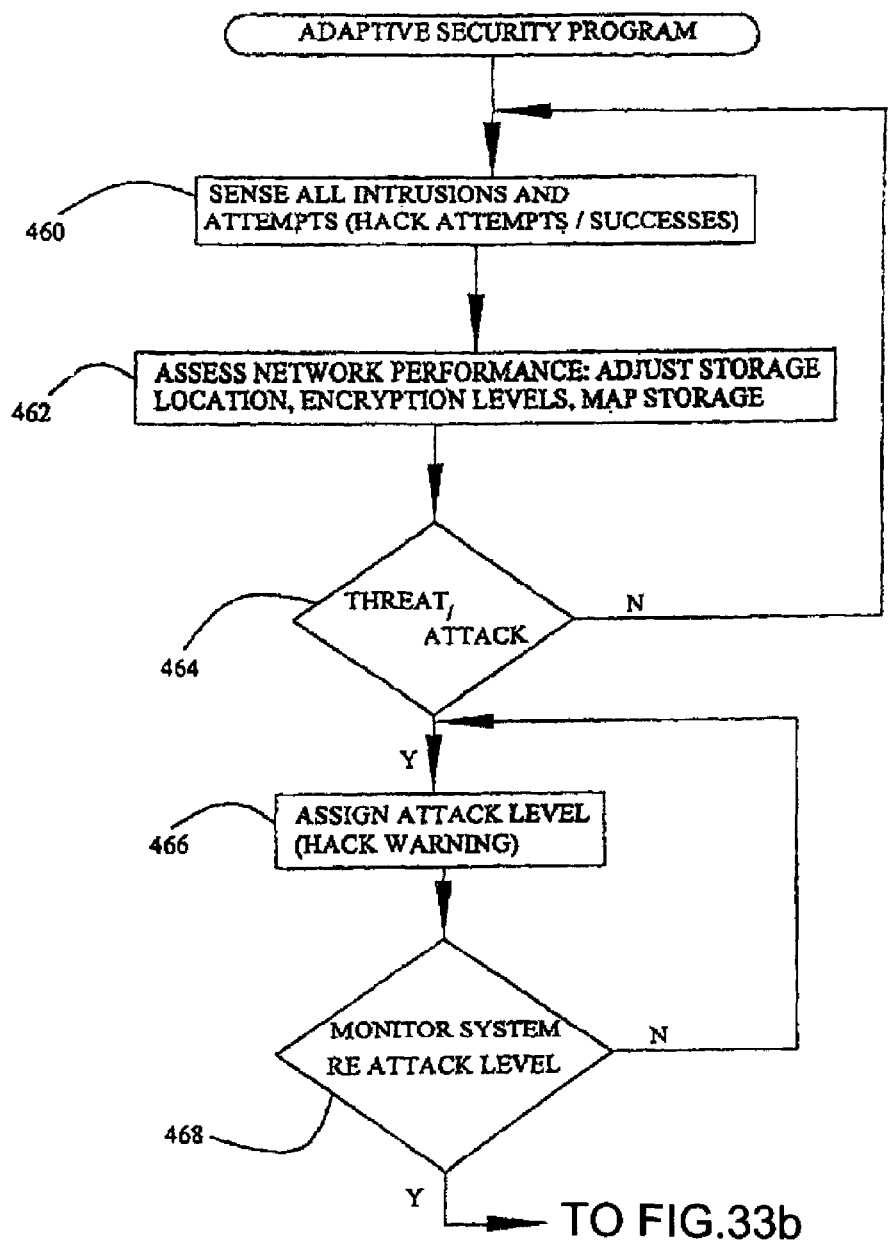
FIGS. 33a, 33b diagrammatically illustrates a flowchart showing the key components of an adaptive security program adaptable to various levels of electronic attacks, hacker or hack attacks.
Figure 33B:
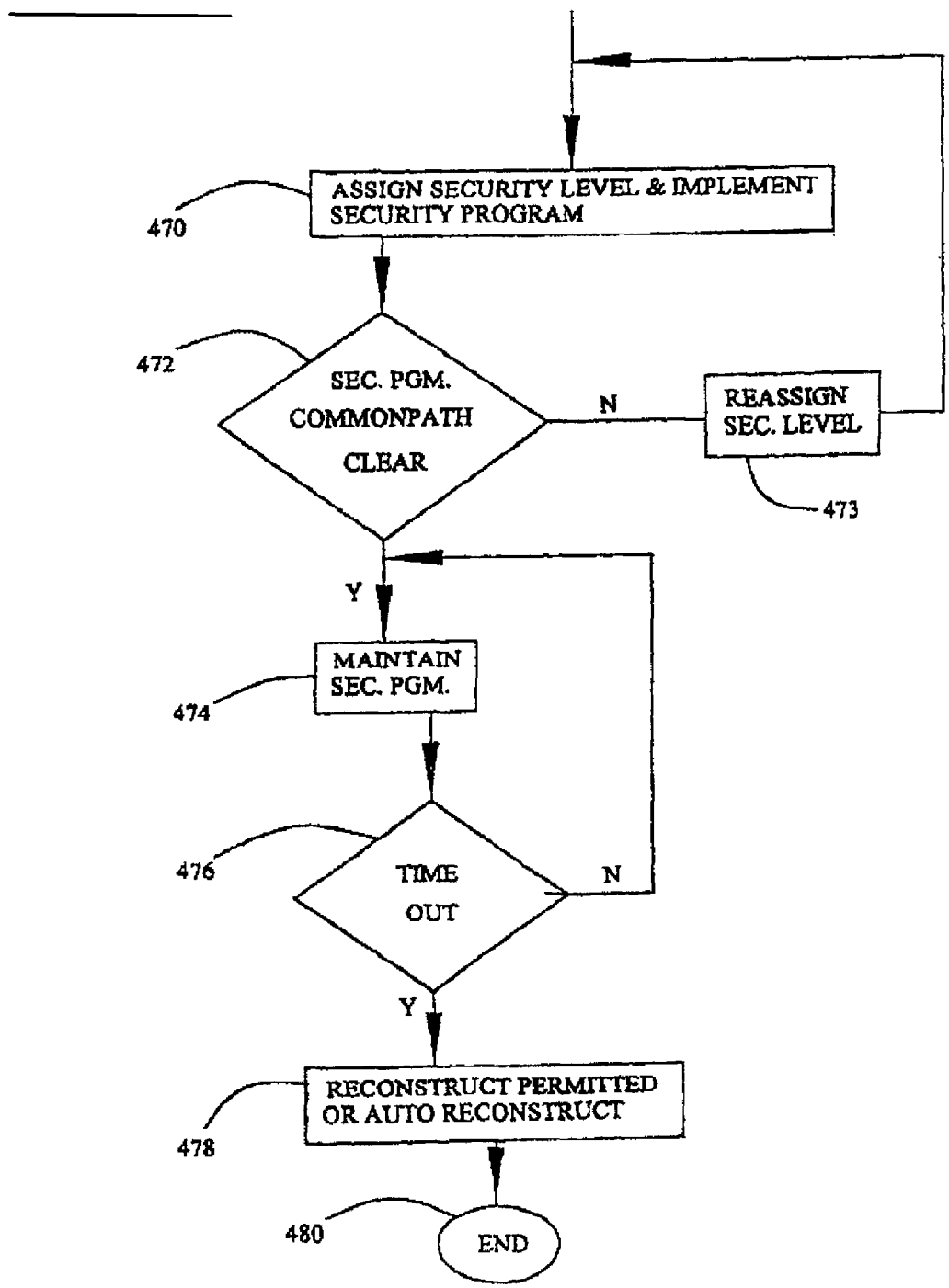

FIG. 33a diagrammatically illustrates a flow chart showing the key components of the adaptive security program adaptable to various levels of hacker of electronic attacks. Step 460 senses all intrusions and attempts, that is, electronic attacks, hack attacks or hacking actions on a computer or a computer network. This step is equivalent to the output of the attack—hack monitor. Step 462 assesses the current network performance, adjusts the storage location for the extract data (the location of the extract store), the encryption level (the degree of encryption) and the storage of the map showing the extract data storage (if necessary) and storage of remainder data, if necessary given the severity of the attack. For example, during high utilization of the computer network (high utilization in a server computer in a server-client environment), local storage of extracted data may be preferable as compared with offsite storage of critical data. However, if the attack occurs during non-working hours, the performance of the network is very high, and the security system could utilize all the resources in the computer network to achieve the security goal of safe guarding the data during the attack. System resources include processing resources (for encryption/decryption), bandwidth resources to store extract data and any other resources that are critical for the utilization of the security system described herein. Decision step 464 determines whether a threat or attack as occurred. If not, the system takes the NO branch returns to step 460. If YES, the system in step 466 assigns an attack level or a hack warning level to the threat or attack. The system in decision step 468, monitors the network during the attack. If the network performance or the computer performance does not change, the YES branch is taken. If the computer performance or network performance changes based upon or during the attack, the NO branch is taken and the system returns to step 466 which reassigns an attack level or a warning level to the next higher or significantly higher warning levels.

After decision step 468, the system executes step 470 which assigns the security level and implements the security program based upon the attack. It should be noted that the administrator establishes the degree of security level, the encryption, the extract store and remainder store (if necessary) for various levels of attacks or hack warnings. The security level assigned to a particular attack warning is implemented in step 470. Decision step 472 determines whether the security program's communication path is clear. For offsite storage of extract and/or remainder data, a communication path is important. If the path is blocked or compromised by the attack, the NO branch is taken and the system in step 473 reassigns the security level to a next higher level or a different, safer security level and returns to step 470. If the security and communications path is clear, the YES branch is taken from decision step 472 and, in step 474, the system maintains the security program. Decision step 476 determines whether sufficient time has passed from the attack. If not, the system loops to step 474. If YES, the system executes step 478 which either permits reconstruction of the user operating the plain text or source document or automatically reconstructs those documents that were filtered, parsed, extracted, and subject to outside storage. The system ends in step 480. To provide additional security, the attack monitor can be configured to monitor security warnings from trusted parties such as MicroSoft, Norton, NASA, DoD, CDC, FBI, etc. Emails or electronic communications from trusted parties can trigger higher levels of security. The attack monitor described above can be configured to accept messages from trusted parties. These messages are equivalent to detecting an electronic attack.

Further, the attack—hack monitor can be configured to monitor and assess other environmental conditions such as fire, power failure, equipment failure, unauthorized physical entry into the building, plant, or computer room. These exterior threats or events are monitored by the attack monitor since they may quickly develop into an electronic attack on the secured data retained by the computer system. In response to these exterior events, the attack monitor generates corresponding attack warnings similar in nature to the hack attack warnings discussed above.

There are various methodologies that may be utilized in the adaptive system. The tables in FIGS. 34 (Standard Automatic Defenses Matrix Table), 35 (Optional Automatic Defenses Matrix Table), 36 (Security Meter Module Table), 37 (Normal Work Mode Table), 38 (Threat Made Table), and 39 (Attack Mode Table) sets forth these various security methodologies.

Another object of the system and method is to enhance the survivability of a system, network, or an organization through distribution of critical information. The objective is to enable a network or organization to carry on its critical missions even while under attacked or damaged. Survivability is the ability of a system to execute its mission and provide critical operational services during and after a successful intrusion or damage. Providing critical operational services includes maintaining availability of information and data such as credit card numbers, names, phone numbers, transaction amounts, shipment details without compromising the security of the information and data.

The invention is designed to enable a network to adapt to ongoing attack and react in a way that permits critical missions to continue. With the current state of the art, when firewalls or other security measures are compromised, no real obstacles curtail or hinder intruders. The system and method is very adaptable and flexible to provide additional layers of security, privacy, anonymity, redundancy, and backup through the selection, extraction, storage, transportation, and reconstruction processes. The dynamic architecture of the invention enables it to conduct an automatic real time configuration of its extraction/transport/recovery activities, in response to the challenge of attacks.

The invention's survivability modes enable: (a) Presetting of rules for computer or network functioning under attack or alert. (b) An automatic assessment of damage and automatic reaction to enable functionality of critical missions.

D.13 Email, Web-based and Other Types of Applications

Figure 42:
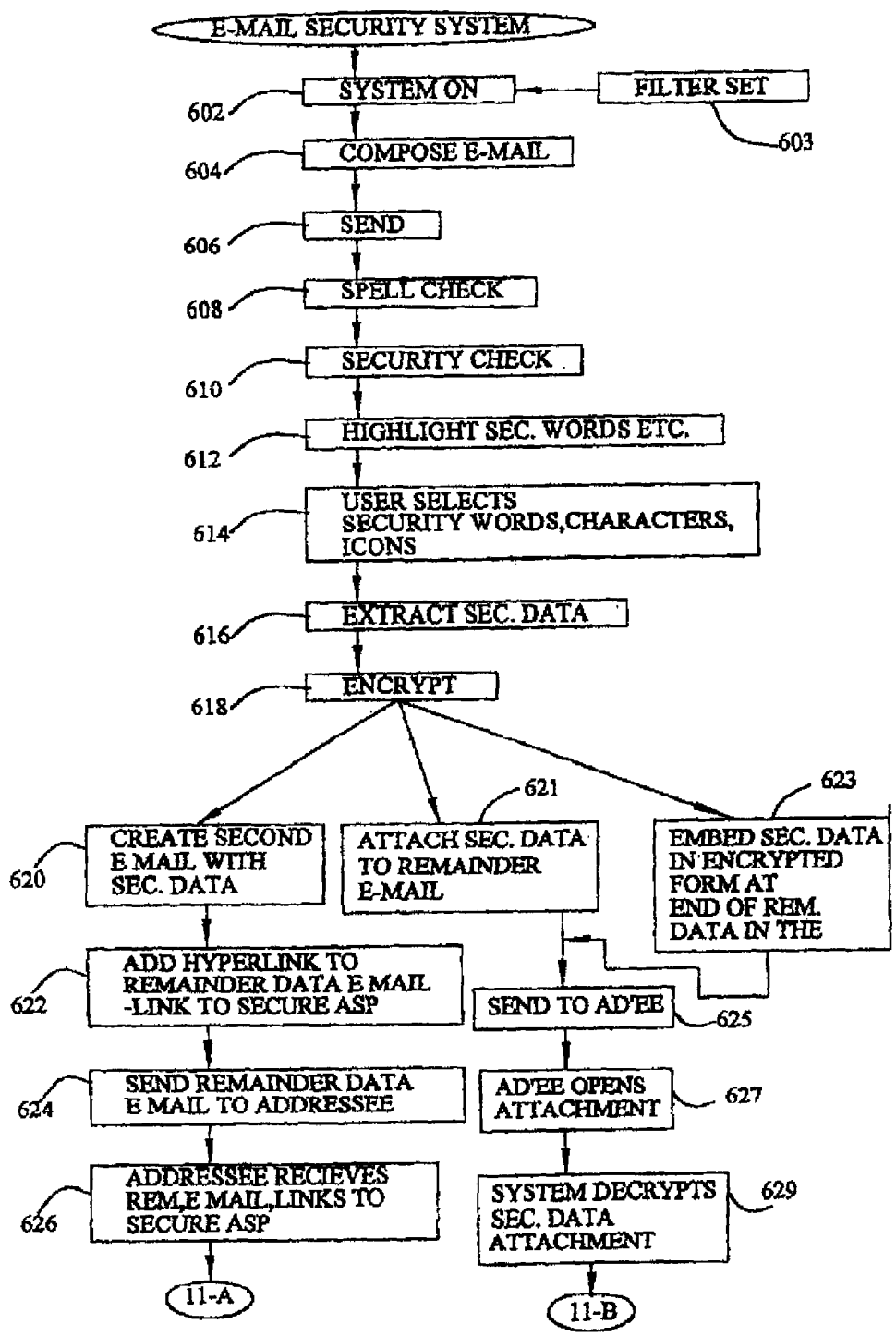
FIGS. 42 and 43 diagrammatically illustrate a flowchart showing the key components of one embodiment of the e-mail security system (jump points 42 and 43 link the flow charts).
Figure 43:
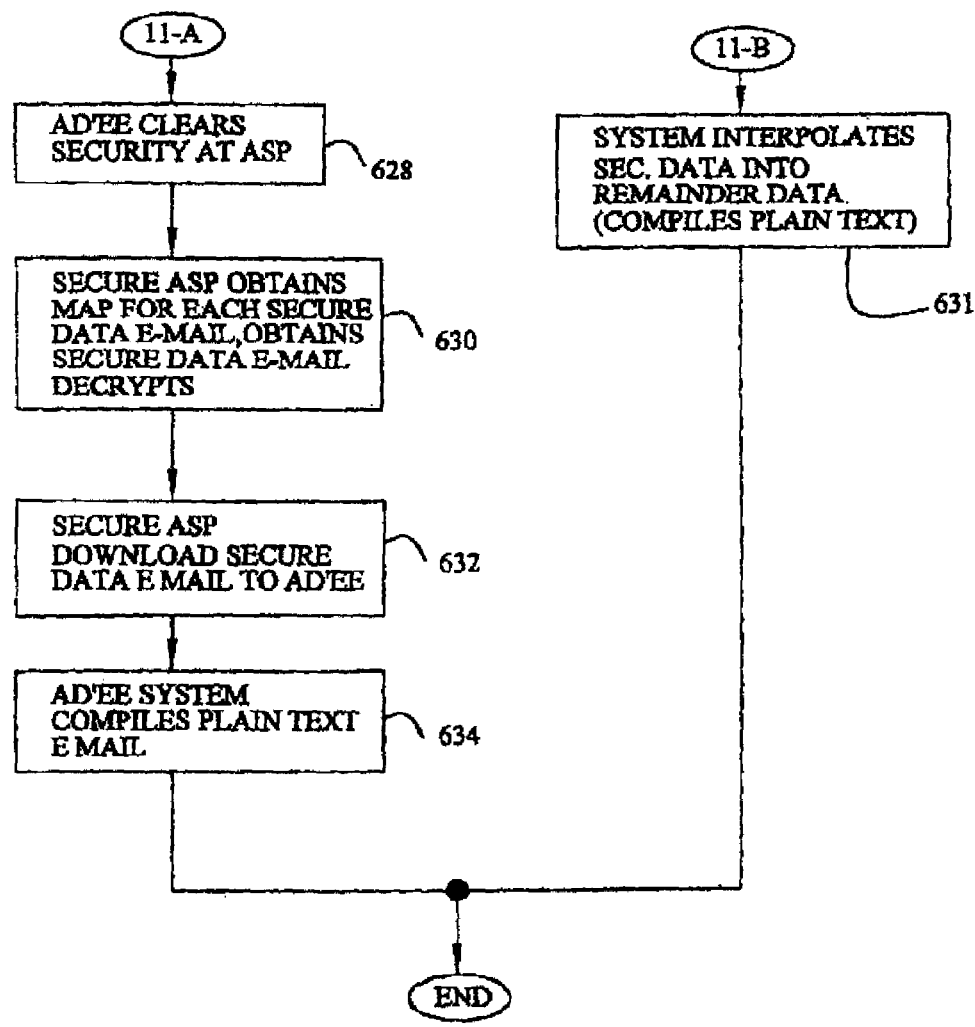

FIGS. 42 and 43 diagrammatically illustrate a flowchart showing the key components of one embodiment of the present invention, that is, an e-mail security system. A similar system may be deployed to capture select content Sc data in real time FIG. 42 is linked to FIG. 43 via jump points 42 and 43. The method of securing e-mail data operates on a distributed computer system which at least includes a remote memory designated as an extract store. Of course, the extract store may comprise a plurality of extract stores operative in conjunction with a plurality of security clearance levels. The extract stores may be SC stores. A singular security or SC relevancy level is identified in FIG. 42. Further, the e-mail may be subject to a parsing algorithm which, as discussed above, is generally independent of the identification of security sensitive (or select content) data. However, with respect to the parsing aspect of the present invention, the original e-mail data is split into extracted data and remainder data and the extracted data is stored in an extract store. Hence, the parsing algorithm operates essentially independent of the content whereas the secured e-mail program operates based upon content identification. Although FIGS. 42 and 43 primarily relate to identification of security or SC data, the same is true regarding the use of securing e-mail data with a parsing algorithm.

The e-mail security or SC system begins with step 602 wherein the system or program is turned ON or is activated. Step 603 recognizes that the user originating plaintext document 100 (not shown) has set a security or SC filter identifying one or more security sensitive (or select content SC relevant) words, characters or icons. In step 604, the user composes the e-mail representative of plaintext document 100. In step 606, the user selects the "send" command in the typical e-mail program. As is customary, the system in step 608 conducts a spell checking routine prior to sending the e-mail. In step 610, the system conducts a security or SC check on the plaintext document or composed e-mail generated in step 604. The filter is used in step 604. In step 612, security or SC words are highlighted or distinguished in the e-mail prior to the actual sending of the e-mail to the addressee. This step 612 is optional. In step 614, the user selects the security or SC words for data to be extracted out. The highlighting step facilitates this selection. In step 616, the system extracts the security or SC data and, preferably, in step 618, the security or SC data is encrypted. Step 618 is optional. In a parsing application to secure e-mail, the parsing algorithm operates automatically at step 610 thereby eliminating steps 612 and 614. The extracting step 616 simply represents that the segmented data obtained from the original plaintext e-mail generated at step 604 is separated from remainder data.

After encryption step 618, the e-mail security or SC system generally operates in one of three manners. Other systems may be formulated based upon the systems and subsystems discussed herein. In one methodology, a second e-mail is created (see step 629), in a second methodology the secured or SC data in encrypted form is attached or appended to the original e-mail containing remainder data (step 621) or, in a third methodology, the encrypted security or SC data is simply added to or inserted into the end of the remainder data of the e-mail (step 623). The methodology of generating a second e-mail is initially discussed.

A second e-mail having encrypted security or SC data is created in step 620. Further, the system in step 622 adds a hyperlink to the remainder data in the original e-mail created in step 604. The hyperlink presents a pointer for the addressee to a secured application service provider ASP or SC application service provider ASP. See the discussion of FIG. 6 above. The ASP represents a data storage facility for the secured or SC e-mail data. In step 624, the remainder data from the original e-mail is sent to the addressee in a normal manner. This step also includes the concept that the second e-mail containing the encrypted security or SC data is sent to the ASP. In step 626, the addressee receives the remainder e-mail which includes a hyperlink to the secured or SC data ASP. The system jumps at jump step D-11-A from FIG. 42 to FIG. 43.

In step 628, the addressee receives the remainder e-mail, visits the ASP via the hyperlink and clears the security levels at the secured ASP. In the SC system, the SC data is stored in the SC storage and this data capture is logged into the system. In step 630, the secured or SC data ASP obtains a map for each secured or SC data e-mail (since the original e-mail may be broken up into a plurality of extracted, secured or SC data e-mails) obtains all secured or SC data e-mail and decrypts the same. In step 632, the secured or SC ASP downloads the secured or SC data as an e-mail to the addressee. In step 634, the addressee system compiles the original plaintext e-mail 100. In the SC mode, the SC data in added to the remainder data and the user-viewer is permitted to see additional SC content associated with that relevancy level. In this sense, the SC email is a knowledge expander permitted the user-viewer to enhance his or her knowledge with additional SC content. A reconstruction program may be necessary to decode the secured or SC data and insert the data into the document via the placeholders.

Optionally, the decryption could occur at the recipient's e-mail device somewhat prior to the reconstitution of the e-mail plaintext document 100 during step 634. This requires the addressee to have the encryption routine and the correct key or decrypt code. The e-mail security or SC system described above may include many of the features discussed earlier in connection with the other figures. For example, both the security or SC data and the remainder e-mail data can be encrypted prior to transmission to the addressee and the secured or SC data ASP. The encryption may include multiple levels of encryption and decryption may require multiple levels of security clearance. The encryption may be mixed in the remainder e-mail. Partial as well as full reconstruction is enabled as discussed above in connection with FIG. 7.

From the senders or originator's viewpoint, the e-mail facility described herein facilitates the storage of the extracted data at one or more secured or SC sites.

Another implementation of the secured or SC e-mail system attaches the encrypted and secured or SC data to the remainder e-mail data as indicated in step 621. For an SC email system, the addressee may add the SC sent with the email to the addressee's SC database. E-mail attachments are well known. Alternatively, the encrypted secured or SC data may be embedded or copied in encrypted form at the end of the remainder data in the original e-mail as indicated in step 623. In either case, in step 625, the e-mail is sent to the addressee. In step 627, the addressee opens the attachment. In step 629, the system of the recipient decrypts the secured or SC data attachment or the embedded data attachment. In step 631, the recipient's system integrates the now decrypted secured or SC data with the remainder data. Of course, this a compilation step. Place holders or other position indicators are customarily utilized. Appending the encrypted security or SC data is generally equivalent to attaching a file to the original e-mail which constitutes, after extraction, the remainder data. Including the encrypted security or SC data is adding the security or SC data to the original e-mail at a predetermined location (either the top of the e-mail, the bottom of the e-mail or some predetermined line number). All SC data may be added to the addressee's SC store. Relevancy of the SC is based upon SC relevancy markers transmitted with the email, similar to the security levels for the MLS secure email system.

It should be appreciated that the e-mail or SC security system may work automatically or may be selected manually by the user. The highlighting or special distinguishing manner for the security or SC words in step 612 is optional. By highlighting the security or SC words, the user may select or deselect those words for extraction. At the addressee's side, the addressee's system may be configured to automatically seek out the secured or SC data ASP, enter security clearance data, download the secure or SC data and integrate the secure or SC data in the remainder data e-mail (or SC data structure). The present invention contemplates automatic as well as manual steps in steps 626, 628, 630, 632 and 634. The hyperlink with the original remainder e-mail essentially maps the remainder data to the secured or SC data and the remote storage locations handling the secure or SC data. Multiple security clearances may be required of the recipient or addressee. The e-mail system can be combined with other features of the security or SC system discussed above such as multiple security data locations, secret key sharing schemes, multiple encryption of the data in a single document, multiple security clearance levels required for a plurality of storage facilities, the two man key system, automation of key management and a plurality of levels of access to the data such as partial reconstruction in step 634 and full reconstruction.

Figure 44A:
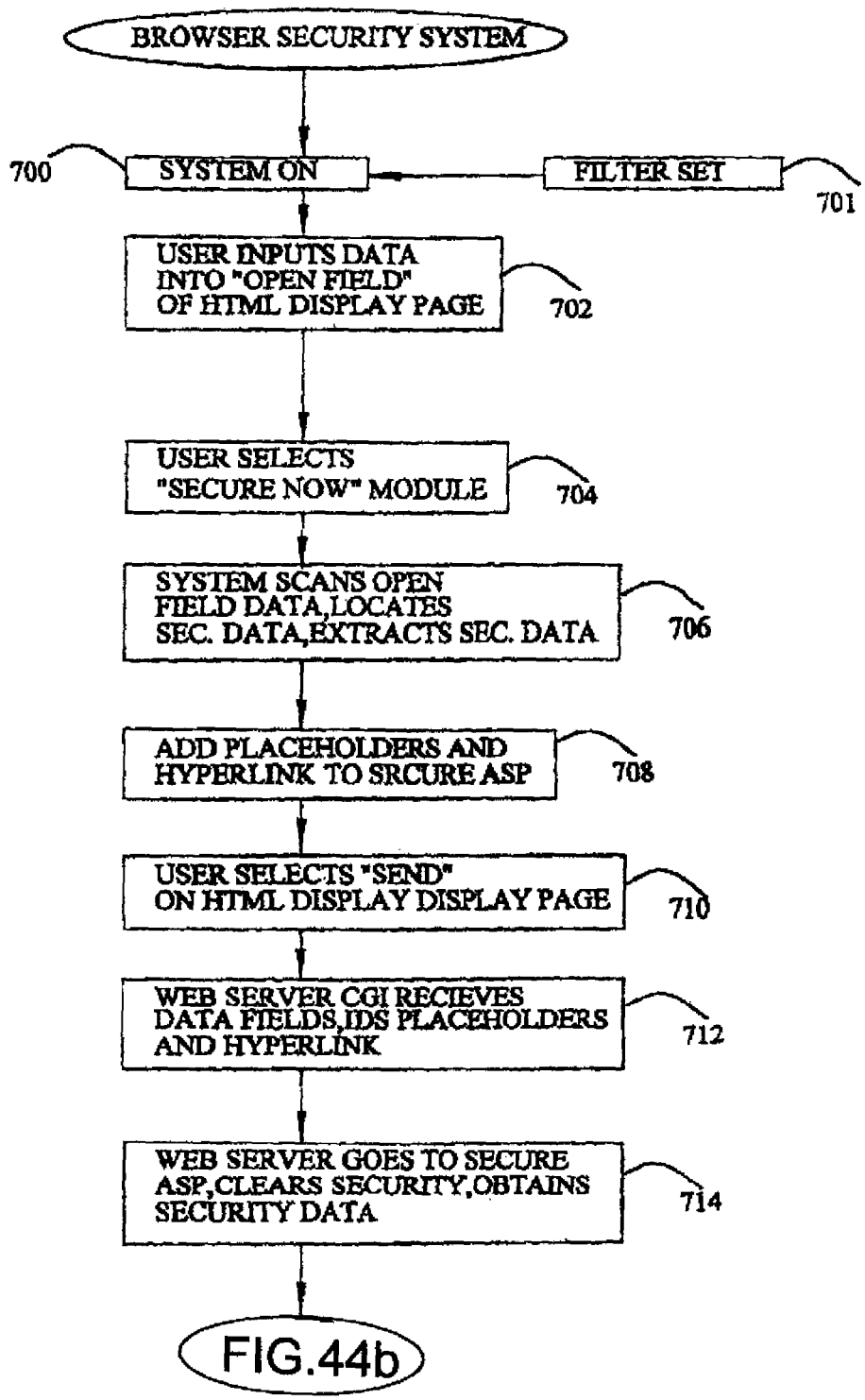
FIGS. 44a and 44b diagrammatically illustrate a flowchart showing the key components of one embodiment of the invention implements the security system on a web browser (jump point 12-A links the flow charts).
Figure 44B:
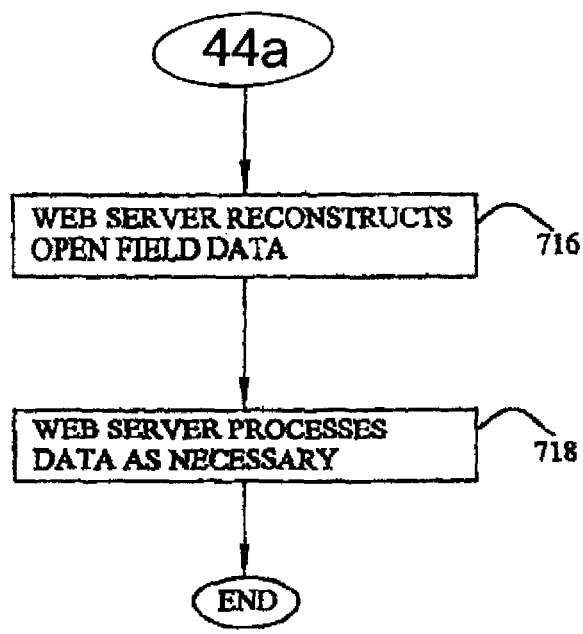

FIGS. 44*a* and 44*b* diagrammatically illustrate a flowchart showing the key components of one embodiment of the system and the invention which implements the security or SC system on a web browser. Jump point 12-A links FIG. 44*a* to FIG. 44*b*. The system, at step 700 is ON. The filters establishing either the parsing or the identification of security or SC data are established in the filter set step 701. In step 702, the user inputs data into open field of an HTML display page which the user has previously downloaded from a web server. In step 704, the user may select "secure now" turning ON the system (or ON SC operator) or the system may automatically be ON such that the filter is screening all the data input by the user in the open field. In step 706, the system scans all the open field data, locates security or SC data and extracts security or SC data. In step 708, place holders are added to replace the extracted security or SC data in the remainder data and a hyperlink is added to the open field remainder data providing a link to the secure or SC data ASP. In the SC system, the placeholders show the addressee critical terms subject to the SC knowledge expander feature. In step 710, the user selects the "send button" or any other indicator on the HTML page triggering an operation which transmits the open field data (which is now remainder data) to the web server. In step 712, the web server and particularly the common gateway interface (CGI) receives the remainder data fields, identifies the place holders in the data and the hyperlink to the secure or SC data ASP. In step 714, the web server receiving the data from user's browser goes to the secure or SC data ASP, inputs and clears any security level, and obtains the secured or SC data. In step 716, the web server reconstructs the open field data which generally is represented by plaintext document 100. In step 718, the web server processes the data as necessary. Many of the features discussed above in connection with the above figures may be implemented on the browser system.

The credit card scrubber or financial data scrubber operates in a similar manner to the email and browser data security system described above. A similar system can be designed to comply with privacy laws or other governmental regulations. A credit card number is similar to a social security number and patent name, address and phone are common personal identifiers that some privacy laws require extraction and special handling. The credit card or financial data or social security number scrubber (herein collectively "CC scrubber") typically operates on a defined sequence of numbers. For example, if a credit card number is 17 digits, whenever the email or browser security system or program detects 17 sequential numerical digits (a pre-set filter), a pop-up window may appear enabling the user to select or turn ON the scrubber. If ON, the data security program strips or parses the credit card number and sends, for example, five of the 17 digits to a secure store. In an SC system, the CC data may be data mined by affiliated companies. Placeholders or substitute characters may be inserted into the remainder CC data. To reconstitute the entire CC data, the intended recipient would be required to pass security clearance levels at the secure store. An SC system requires SC relevancy clearances set by the policy administrator. Of course, the CC scrubber could be set to detect bank account numbers, personal or business account holder names, pre-set passwords, etc. In an OFF state, the CC scrubber would let pass the CC number, account number or pre-set data stream or string. The user may select (i) always ON; (ii) pop-up window, select ON or OFF per transaction; (iii) pop-up window to select OFF (default being ON); or (iv) always OFF but minor reminder (audible sound, icon appearance, etc.) of data security risk. The CC scrubber may encrypt the extracted data for security. Other visual ques may rather than a pop-up window may be used (for example, a drop down menu). The scrubber can also be deployed on wireless devices to scrub sensitive data such as credit card and other financial data.

Figure 45:
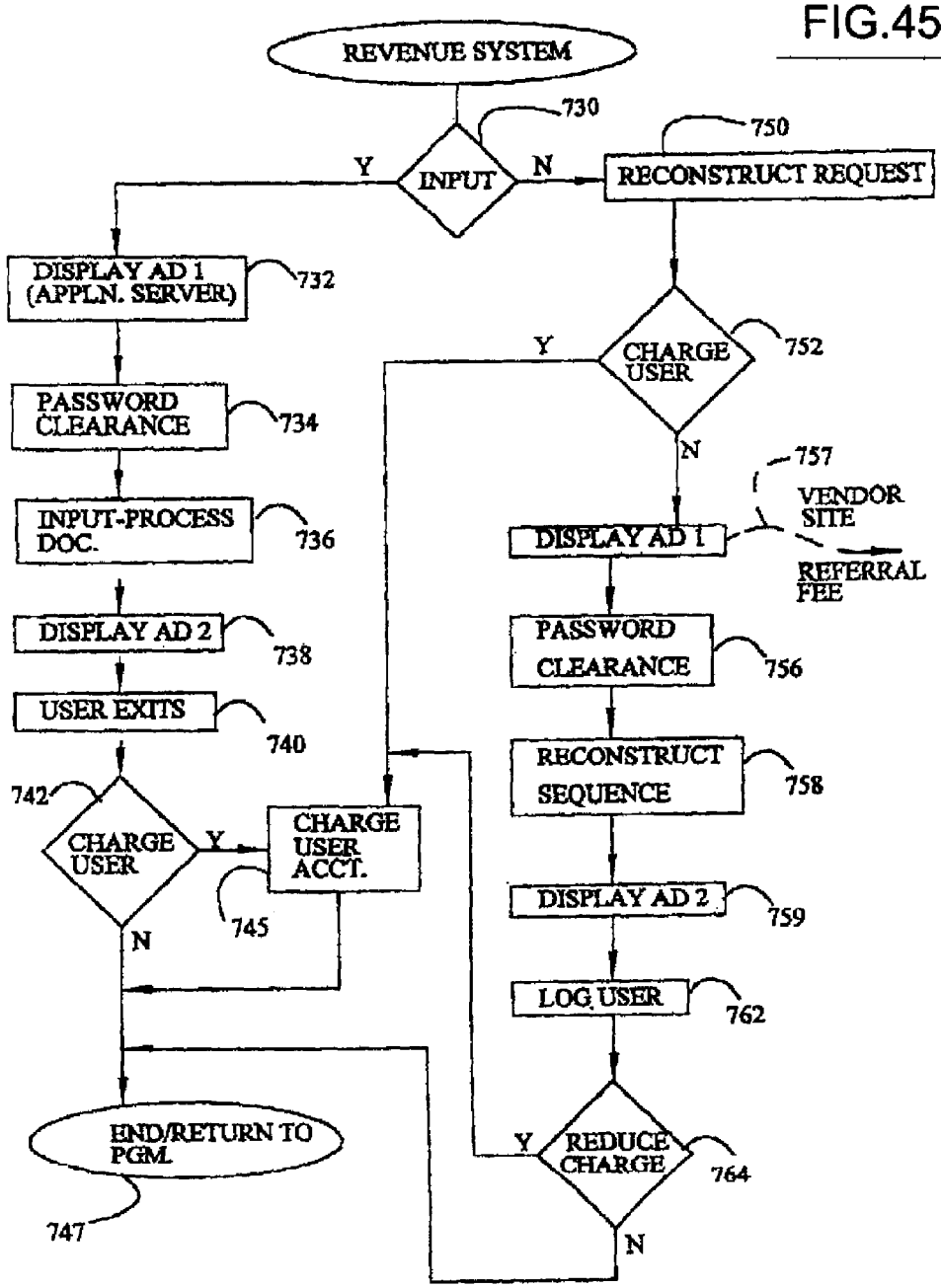
FIG. 45 diagrammatically shows several revenue systems which may be employed with the data security systems described herein.

FIG. 45 diagrammatically shows several revenue systems which may be employed with the data security systems described herein. Many types of revenue systems may be employed in conjunction with the present invention. FIG. 45 shows two basic systems, one at the data input stage and the second at the data output or reconstruction phase. Release of the reconstructed document or portions thereof are based upon security clearance or SC relevancy and compensation. "Compensation" includes an exchange of information, particularly for the SC storage system. Within each revenue subsystem are two types of revenue generators, an advertising revenue generator and a user charge generator. The user charge system contemplates charging or assessing a fee to the user's employer or organization. Therefore, the system operator may select up to four (4) revenue generation systems (ads at the input, charges at the input, ads at the output and charges at the output). It is well known that vendors selling goods and services over the Internet are willing to pay a certain percentage of their sales revenue to other entities referring customers to the vendor's web sites. The concept of display ads in FIG. 45 includes this revenue stream. The system operator may choose all, one, several or none of these revenue systems to be deployed in conjunction with the data security system described earlier herein. Other revenue system may also be utilized. The steps in the revenue system described herein may be reorganized to attain higher consumer and user acceptance and/or to maximize the revenue to the system operator. Swapping SC content may include an evaluator module that tests the "proposed" SC data file and determines whether the proposed SC data file is worthy or being exchanged for an existing SC data file.

Decision step 730 determines whether the system is deployed at the data input phase or not. It is clear that the system operator may utilize the data reconstruction revenue system and hence the decision step 730 is not necessary. If the data input system is employed, step 732 displays the ad to the user. The user may be uploading a complete document to an application server on the Internet or may be using a application service provider on the Internet or an private LAN to secure his or her data. The display ad 732 step enables the user to click on the ad and visit the vendor, thereby potentially generating a referral fee. See referral fee branch 757. Step 734 requires password clearance. Step 736 processes the document or data object with the security or SC system. The user may input the document real time or input it to the application server or may upload the complete document to the server. Alternatively, the ad could be buried in the email or application program run on the user's computer and the user would be shown an ad and given a link to the vendor's Internet site. Selecting the link points the user's browser to the vendor's site.

Step 738 shows display ad 2 to the user thereby potentially generating referral revenue for the system operator. Step 740 notes that the user exits the revenue system. Step 742 determines whether the system charges the user for the security or SC service. If YES, the program processes the charge in step 745 (charge systems are known). If NO, the system ends or returns to other programs in step 747.

The NO branch from determination step 730 leads to the receipt of a reconstruction request by the user in step 750. Step 752 determines whether the user will be charged. If YES, the system executes step 745. If NO, the system displays the ad 1 in step 754. Referral generation is noted by branch 757 from step 754. In step 756, the user's password is subject to clearance. In step 758, the user's request is processed, the document or data object is reconstructed (fully or partially as described earlier), and in step 759 the system displays ad 2. In step 762, the user's activity is logged in to the system. Step 764 determines whether the charge to the user is reduced (because he or she viewed the ads) and if not, the system ends in step 747, if YES, the system processes the charge in step 745. Alternatively, the user may be shown display ads and/or charged for services upon storage of extracted data. Step 750 includes this concept.

D.14 Portable Computing Device Environment

The invention can be applied to portable computing devices to secure files and data objects in such devices. The invention extracts, disperses, via a controlled release of data segments to storage locations, and permits reconstruction utilizing security protocols to provide a security or SC system for data based upon the location of the portable device, typically detected by a global position signal generator (GPS) or based upon triangulation data from several broadcast points. In an SC system, the sensitive data may be made available to the user-viewer for a period of time or as long as the user is in a geographic territory. Beyond that time-space limit, the SC data is removed from the user's portable data device. Scrubbing security or SC icons from maps, credit card data or financial data from text, a data object or data stream is part of the portable security system.

As used herein, the term "portable computing device" means a laptop computer, a PC with a movable feature, such as a PC mounted in a car, plane, truck or trailer, PDAs or personal data assistants, mobile or cellular phones configured with a memory, a processor and some type of GPS or locator system to determine where the phone or cellular unit is located within a territory and digital pagers having similar electronic systems.

The present invention can be linked with a location sensing circuit, such as a global position sensor or system (GPS) or other type of location sensing system, such as a system which utilizes triangulated signals. The concept is a location based access oriented security (or SC relevancy) such as an automated trigger (which activates the security or SC program discussed hereinabove when the portable computing device is beyond a predetermined region); an automated safety system; a trip wire; an interlock; a method to disable systems, activity or access to data; and means to limit functionality or access in whole or in granular parts. The portable security system operates on text, data objects, images or other digitally configured data objects. Security access (or relevancy access) is limited by a location way point (in relation to a reference point) or a calculated range (using satellite GPS, high altitude services, or earth-based range finding GLS (geographic location services)) about a way point with physical means or mathematical calculations to define a geographic area by equations or geometric shapes or aggregated ranges (the shapes including rectangles, solids, cubes, circles, oval, spherical region or other areas defined by algorithms). Physical and logical access or entry control to weapons, devices, vehicles, computers, equipment, tools, data, networks, local access, remote access beyond a physical location (reference point), can be enabled or disabled with the system of the present invention. The regions (sometimes identified as a single predetermined region or a plurality of predetermined regions), can consist of complex definitions of three dimensional areas of arbitrary shape and sizes, as long as those regions can be defined by algorithms. The region can also be defined as an area circumscribed internally by a perimeter or by an area external to that perimeter. In other words, access can be denied if the portable device is within a certain region as compared with denying access when the device is beyond a predetermined regions. The claims are meant to cover both situations.

Figure 46:
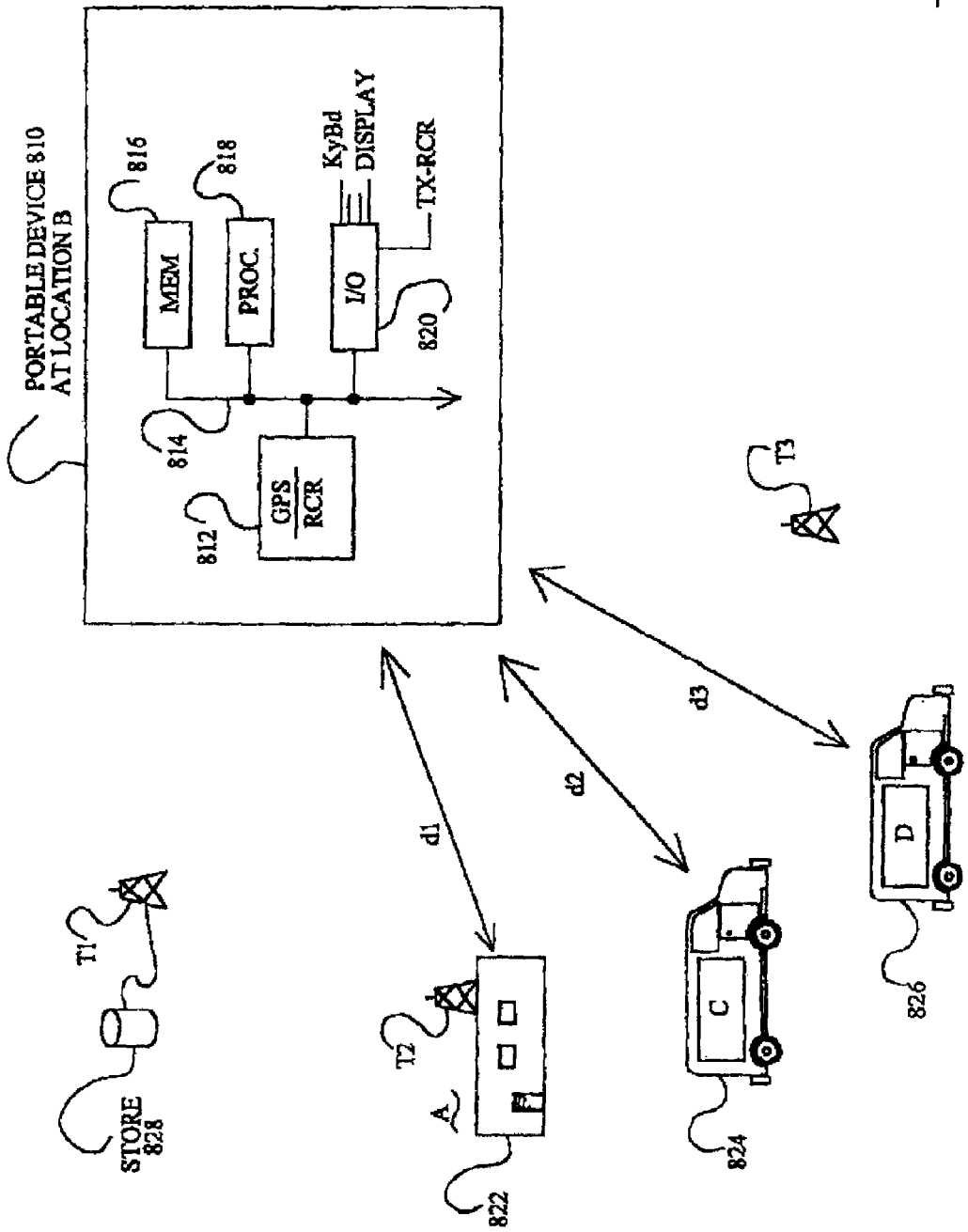
FIG. 46 diagrammatically illustrates a portable computing device (or the critical parts thereof, see FIG. B-2 for further details) associated with the portable data security locator system and method.

FIG. 46 diagrammatically illustrates a portable computing device 810 at location B. The portable computing device 810 includes, in the illustrated embodiment, a GPS system (or a receiver system) 812 coupled to a bus 814 and further coupled to memory 816, a processor 818 and an input/output system 820. Input/output 820 is coupled to, among other things, a key board or key pad, a display, and possibly a transmitter and receiver subsystem. As is known, GPS Systems detect satellite positioning signals and generate an output indicative of the location of the GPS system. In the illustrated embodiment, this location is location B in FIG. 46.

A simple implementation of the present security or SC system provides that upon detection of d1 from location A, defined by building 822, certain security events occur, e.g., automatic extraction and a denial of reconstruction rights. In one example, GPS subsystem 812 continually monitors the location of portable device 810. When the location of device 810 exceeds a predetermined distance (d1-limit), the program operating in memory 816, operable by processor 818, either extracts data and stores the extracted data as discussed in detail above or prohibits reconstruction of data as requested by the operator of portable device 810. Alternatively, automatic extraction may occur without prohibiting reconstruction due to device 810 being located beyond the predetermined region d1-limit. The portable computing device 810 in FIG. 46 may have many other electronic components such as those shown in FIG. 6 in connection with computer 165. Alternatively, the security or SC system can be configured in a reverse manner such that the extraction of security or SC information is triggered when portable 810 is within a predetermined region (less than d1-max) close to location A and building 822, that is, the security or SC system disclosed above is triggered to extract information when distance d1 is less than d1-max.

The security or SC system can also be configured such that GPS or locator system 812 detects a variable distance such as distance d2 between truck 824 and location B of portable device 810. In this sense, the location of portable device 810 is obtained by GPS circuit 812 and further some type of communications must be established between truck 824 at location C and the portable device 810. For example, the receiver coupled to input/output 820 receives this information from location of truck 824 and location C. This reference location C is then processed in conjunction with the location data from GPS circuit 812 by processor 818 and memory 816. The same results as discussed above in conjunction with fixed reference location A can be achieved with a variable reference location C. Truck 826 at variable location D enables the system to provide an additional level of security. In other words, within distance d2 (d2-limit), the operator of portable device 810 may be able to reconstruct information upon request. However, if portable device 810 intrudes upon or is less than distance d3 (d3-max) the distance between location B and location D, the security system may trigger an immediate extraction routine thereby disbursing, on a granular basis, the secured or SC words, data objects or whatever and further prohibit reconstruction. Of course, the security or SC system could be configured simply to extract the information and permit reconstruction. Otherwise, the security or SC system could be configured to simply extract information and prohibit reconstruction. In this manner, the security or SC system discussed in conjunction with the portable computing device 810 can have multiple triggers or location established events enabling the security or SC program to extract security or SC information or disabling the security or SC program to prohibit reconstruction based upon a fixed location A or one or more variable locations C, D.

Another configuration of the present invention utilizes triangulation to obtain location B for the portable computing device 810. In a triangulation situation, the receiver system 812 for the locator receives signals from one or more fixed locations, and preferably three locations diagrammatically illustrated by tower T1, T2 and T3 in FIG. 46. The triangulation of signals to obtain location B is known in the art. However, the combination of such location position coupled to extraction of security or SC data and/or reconstruction of security or SC data based upon certain location parameters is part of the present invention.

For illustration purposes only, the present security or SC system for the portable computing device 810 can remotely store extracted security or SC information. Remote store 828 coupled to receiving tower T1 illustrates this concept.

Figure 47:
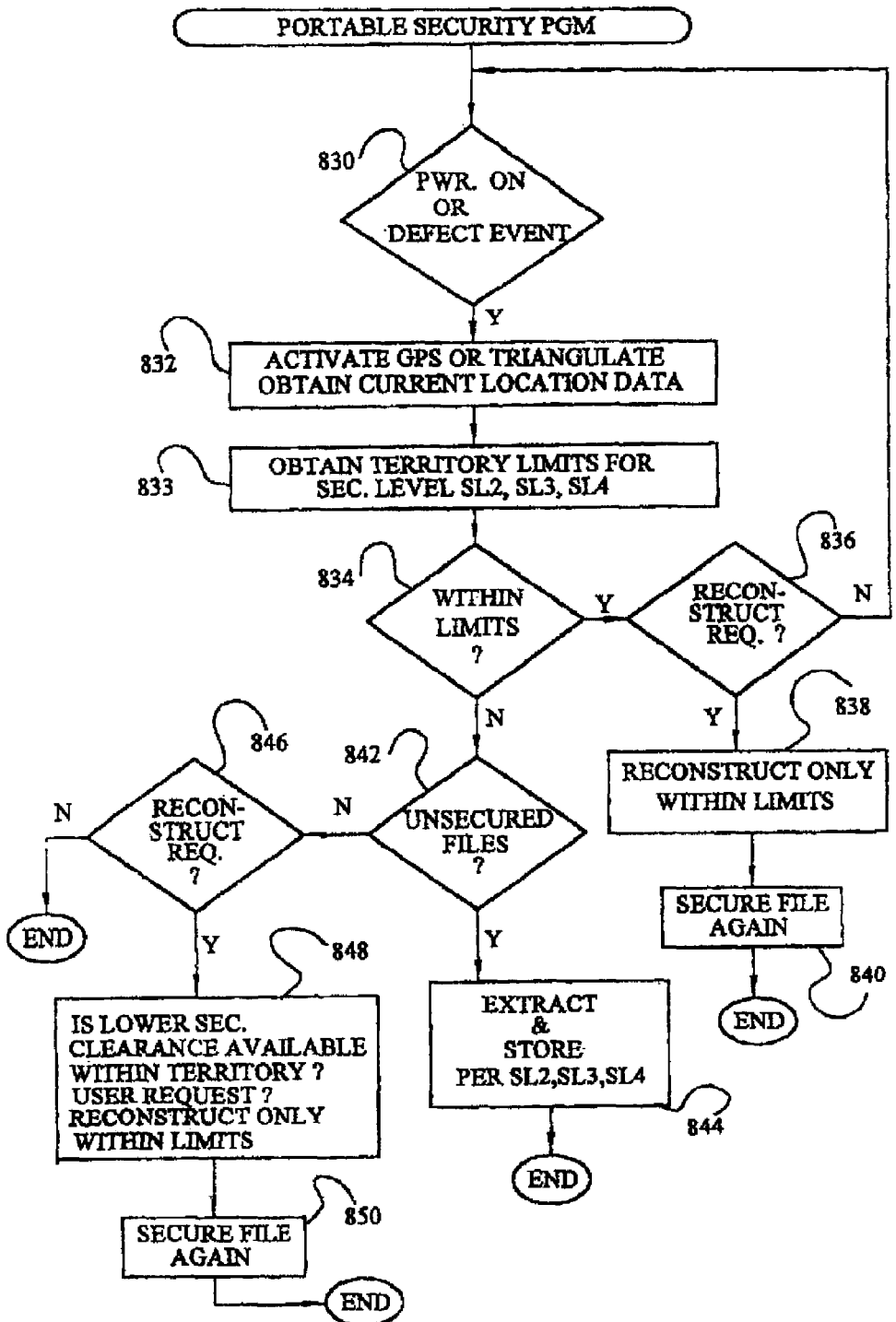
FIG. 47 diagrammatically illustrates a basic flow chart for the portable security system program in accordance with the basic principles of the present invention.

FIG. 47 diagrammatically illustrates a basic flow chart for the portable security or SC system program utilized in connection with portable computing device 810. Decision step 830 determines whether a certain event has occurred. This event may include a power ON for the portable computing device, may be a "save document" command, may be a screen ON event or may be a timed function. For example, if the portable computing device 810 is continually ON, the program may periodically poll the locator circuit (GPS 812) and determine whether location B is within or beyond the predetermined regions (d-max or d-limit). Step 832 activates the GPS or the triangulation circuit to obtain current location data. This may include locating variable locations C, D. Step 833 obtains territory limits for various security levels or SC relevancy levels. As discussed earlier, security or SC level SL1 is public or non-confidential information, security or SC SL2 confidential or proprietary information, level SL3 is secret information and level SL4 is top secret or SC information. This system can be configured such that various territories or predetermined regions correspond to respective ones of the security or SC levels SL1-SL4.

Decision step 834 determines whether location B of portable computing device 810 is within or without the predetermined territory limits or predetermined region. If YES, the system determines in decision step 836 whether the user has initiated a reconstruction request. If not, the system returns to a point preceding decision step 830, the detect event function or step. If YES, the system, in step 838, reconstructs the document only if location B is beyond a predetermined region. Of course, a negative operation could occur in that reconstruction would be prohibited if location B was within a predetermined region. The claims appended hereto are meant to cover both within a region and without a region and independently, extract or permit reconstruction. Step 840 secures the reconstructed file again as necessary.

Returning to decision step 834, if location B is not within the predetermined regions or territories defined by security or SC levels SL1-SL4, the NO branch is taken and decision step 842 determines whether portable computing device 810 has any unsecured files. If YES, the system executes step 844 which is extract and store the security or SC sensitive words, data objects etc. in accordance with security or SC levels SL2-SL4. As stated above, the storage could be on media in a local drive or can be remotely distributed to memory segments designated as a remote extract store. If the NO branch is taken from decision step 842, the system executes decision step 846 which determines whether the user has requested a reconstruction of data. If not, the program ends or returns to the event detection step 830. If YES, the system executes step 848 which determines whether a lower security or SC clearance is available within the current territory, determines whether the user has the proper pass code to access the reconstruction and process the reconstruction or whether the system prohibits all reconstruction. Partial reconstruction for lower security or SC items may be permitted. For example, reconstruction at top secret or SC level SL4 may be prohibited when distance d2 is greater than d2-limit but reconstruction at a lower security or SC level such as confidential level SL2 may be permitted beyond limit d2-limit. In this sense, the present invention can be configured to generate extraction for various security or SC levels at various predetermined regions based upon a fixed reference point or a variable reference point. Alternatively, reconstruction can be permitted or denied based on a plurality of security or SC levels and a plurality of corresponding regions or distances. The term "mobile predetermined region" is sometimes utilized in conjunction with variable regions d2 and d3.

As an example, the data object retained by portable computing device 810 may be a map having security or SC sensitive icons on the map. These icons are extracted if location B is less than a predetermined defined distance d3-limit between variable location D and location B. If location B is beyond d3-minimum, the map can be viewed by the operator on portable device 810. If location B is less than distance d3-minimum, the security or SC icons are removed from the map. In a similar sense, security or SC sensitive credit card characters can be extracted from plain text documents carried on portable computing device 810 when device 810 is a certain distance beyond d1-limit from fixed reference point A. This location A may be a bank headquarters. Encrypting and decrypting the data based upon the geographic event is also contemplated by the present invention. Of course, portable device 810 may be a plurality of portable devices linked via a hard wire network or via a wireless network. The same security or SC program disclosed above in herein can be utilized with one computer or a series of computers. Further, portable computing device 810 can include a plurality of memory segments (see FIG. 8) and may include a plurality of display screens as discussed above in conjunction with FIG. 7. The extraction and storage and reconstruction of streaming data is possible as is operation on voice data. Additionally, the portable computing device may set off an audible and/or visual alarm prior to extraction of data. For variable territories or predetermined regions, step 832 or 833 may include gathering information regarding the variable location of vehicles 824, 826 prior to determining the territorial limits for various security or SC levels SL2, SL3 and SL4.

E.1 General System Comments

It is important to know that the embodiments illustrated herein and described herein are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views. The section titles are not meant to limit the detailed description of the system and process described therein.

The present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits. Furthermore, the computer readable medium may include computer readable information in a transitory state medium such as a network link and/or a network interface, including a wired network or a wireless network, that allow a computer to read such computer readable information.

In the drawings, and sometimes in the specification, reference is made to certain abbreviations. The following Abbreviations Table provides a correspondence between the abbreviations and the item or feature.

| Abbreviations Table | |
|---|---|
| A-com | computer or memory store for common or remainder data |
| ASP | application service provider - server on a network |
| B-ext | computer or memory store for extracted data |
| bd | board |
| CD-RW | compact disk drive with read/write feature for CD disk |
| CIO | Chief Information Officer or system administrator |
| comm. | communications, typically telecommunications |
| comp | computer |
| CPU | central processing unit |
| DB or db | data base or structured data file |
| D & R | dispersion and re-construct or re-assemble |
| Distrib | distribution or transmission of data (information) files |
| DS | data storage |
| doc | document |
| dr | drive, e.g., computer hard drive |
| e | encryption |
| ext-data | extracted data |
| F | floppy computer drive or flash drive memory |
| H-tax | hierarchical taxonomic system, a prioritized classification system |
| I/O | input/output |
| I-com | Internet storage for common or remainder data |
| id | identify |
| I-ext | Internet storage for extracted data |
| KE | knowledge expander, such as a knowledge expander search |
| loc | location |
| MLS | multilevel security |
| mem | memory |
| mod | module or software-firmware-hardware function |
| obj | object, for example, a data object |
| opt | optional |
| PC | personal computer or any other type of general computer |
| pgm | program |
| re | regarding or relating to |
| recon | reconstruct |
| rel | release |
| req | request |
| rev | review |
| SC | select content - e.g., words, terms, images, sound that is of particular interest to the user |
| sec | security |
| sec-con | security sensitive content |
| sec. level | TS top secret, S secret, C classified, UC unclassified |
| sel | SC sensitivity level, sometimes SC sel. level |
| sel cont | select content |
| sel levels | SC levels, hierarchical taxonomic classification levels of SC |
| sch | search |
| SL | security level (sometimes S1 for sec. Level 1, S2 is Level 2, etc., also, for example, TS is Top Secret, S is Secret, C is Classified, U is Unclassified)) |
| supple | supplemental |
| supple doc | supplemental document of data object |
| sys | system |
| sys-admin | CIO or system operator |
| t | time |
| tax | taxonomic or classification system |
| tele-com | telecommunications system or network |
| unkn | unknown item or data element or data object |
| URL | Uniform Resource Locator, x pointer, or other network locator |
| W St | computer work station |

"Data," as used herein, includes any data object, e.g., text, image, icons, audio, video, still images, etc. and data is sometimes referred to herein as a "data object." A source document is either a document, any data structure, or a data stream.

Since a data stream has a start bit or term and an end bit or term, the data stream is structured data, and reference to a "document" refers to any document, data structure, or data stream. Likewise a "supplemental document" is any document, data structure, or data stream. The select content (SC) is any critical or security sensitive word, character, image, or data object as pre-defined or as established by the user. The user may specifically design the filter, begin with a dictionary to define common terms, identify any additional SC words, letters, images, icons, partial versions of the foregoing or any other granular aspect of the source document.

Figure 29:
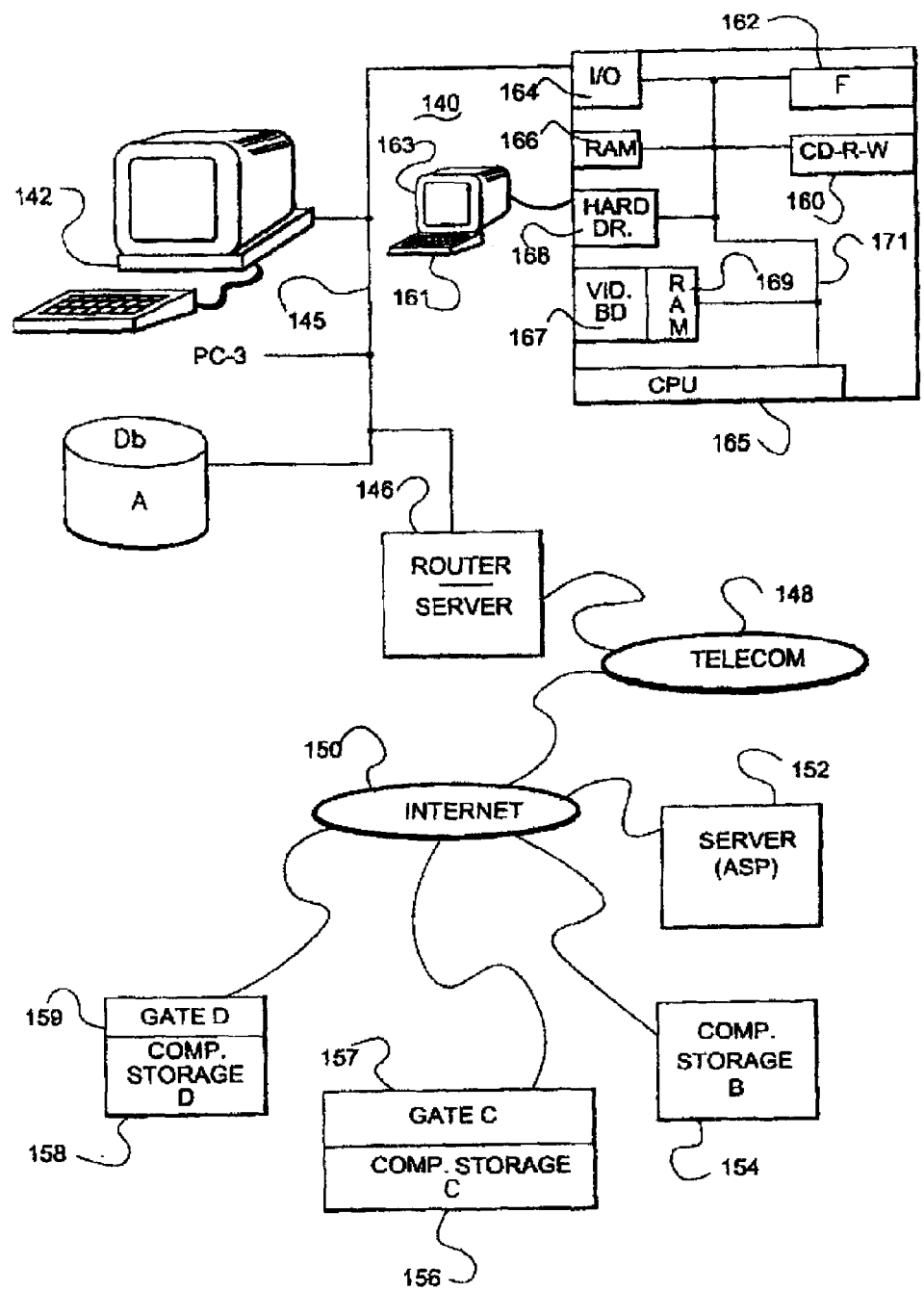
FIG. 29 diagrammatically illustrates a hardware implementation for the KE search system.

FIG. 29 diagrammatically illustrates a personal computer or PC computer system 140, a second PC or computer 142, and a third PC-3. Similar numerals designate similar items in FIGS. 29 and 6. PCs 140, 142 and PC-3 are connected together via a network 145 (LAN or WAN) and connected to one or more private databases or data structures which are represented by Db A. The LAN 145 is also connected to an input/output device 146 that may be generally described as a router or an I/O device to an outside communications system. The input/output device 146 is connected to a telecommunications system 148 which leads to Internet 150. The Internet is a global computer network. Internet 150 is coupled to a plurality of servers, one of which is server 152. Server 152 may be designated as an application service processor ASP. The ASP provides various tools to the user on computer 142 such a Google search through other data bases, indices and data structures. Internet 150 also includes various computer memory storage devices such as computer storage B 154a, computer storage C 156a accessible through Gate C 157a (via password or other control device) and computer storage D 158a accessible via Gate D 159a. Access to computer storage C and D is permitted via, in one instance, security level clearance modules or Gate C and D 157a, 159a. Maps to the computer stores C and D may require security level clearance.

Typically, PCs include a keyboard or data input device 161, a display 163, a central processing unit CPU 165, a video board 167 having video board memory 169, a fixed disc hard drive 168, a RAM 166, and input/output device 164, a removable memory F media (flash or floppy) drive 162 and a removable compact disk (CD) read-write (CD-RW) device or drive 160. The system may include other removable disk drives, tape drives, or flash memory units. Internal units CPU 165, video board 167, hard drive 168, RAM 166 input/output device 164, floppy drive 162 and CD-ROM device 160 are all coupled together via an internal bus 171. Bus 171 represents a plurality of buses as is known to persons of ordinary skill in the art.

One methodology of implementing the present invention utilizes filters on the PC or on removable memory F. The present invention may also be embodied utilizing an Application Service Provider (ASP) on server 152 and in a client-server network. The user or operator on the PC 142 calls up an ASP on system 152 and operates the KE process on the computer system 152. Filters and rules may be located with a uniform research locator or URL to find filters, data collections, target files from computer store B, C and D. In a client-server environment, server 152 acts as a server generally cooperating with data operations with client computer 140. Of course, persons of ordinary skill in the art recognize that the server may be located on the local area network 145 rather than being interconnected with Internet 150 as shown in FIG. 29. The claims appended hereto are meant to cover the alternative embodiments.

As an example of a client-server or web-based implementation of the present invention, the user at computer 140 may define the SC 2018 as described above, and input data via keyboard 161 or load source data from F drive 162 or CD-ROM drive 160 into RAM 166. Alternatively, the data stream on LAN 145 may be monitored by PC 140. In any event, whether the source data is input via keyboard 161 or copied or accessed in or from F drive 162 or CD-RW drive 160, the source data is filtered as discussed above in connection with FIGS. 11-12a. Prior to filtering, it is appropriate for the user at computer 140 to identify the hierarchical taxonomic system and the location of SC filters and My Group Profiles. Off site data storage and processes are available permitting activation of server 152 and enabling the server to take over the process directly from user 140. In other words, the user at computer 140 could call up the URL of the server 152, the server could request certain user information (user name, password), and would request data from the client computer to establish the SC filter and H-tax classes pursuant to input selected by the user. The client compute may (a) filter the source doc thereat or (b) send the data to the server for filtering. The server could store data either locally on computer 140 or remotely at computer memories 154a, 156a. Either the PC or the server could conduct the knowledge expander search and return the compiled data, supple docs, and map results to the PC.

The claims appended hereto are meant to cover modifications and changes within the scope and spirit of the present invention.

What is claimed is:

1. A distributed computer system for organizing and processing data, the data to be processed having select content represented by one or more predetermined words, characters, images, data elements or data objects, said distributed computing system having (a) a plurality of select content data stores in a server cloud for respective ones of a plurality of security designated data and (b) a plurality of granular data stores, each said select content data store and granular data store having respective access controls thereat, said plurality of data stores and said server cloud operatively coupled over a communications network, comprising:

means for identifying plurality of select content data stores for respective ones of a plurality of security designated data in said server cloud, an extractor for extracting and storing said security designated data in respective select content data stores of said server cloud;

a processor activating at least one of said select content data stores in said server cloud thereby permitting access to said select content data stores and respective security designated data based upon an application of one or more of said access controls thereat;

means for parsing remainder data not extracted from said data to be processed and storing the parsed data as data segments in respective granular data stores;

said processor having means for applying a reconstruction data process employing said respective access controls to combine one or more of said security designated data and remainder data.

2. The distributed computer system for organizing and processing data as claimed in claim 1 including means for applying a monetization algorithm to said security designated data based upon non-secure availability of said security designated data and means for generating and assigning either a financial value to said security designated data or generating and assigning a risk-release value to said security designated data.

* * * * *